US012737705B2

(12) United States Patent
Mystetskyi et al.

(10) Patent No.: US 12,737,705 B2
(45) Date of Patent: Sep. 15, 2026

(54) MODULAR AI AGENT SYSTEM WITH DYNAMIC SKILL REGISTRY AND RESOURCE MANAGEMENT FOR ENTERPRISE APPLICATIONS

(71) Applicant: monday.com Ltd., Tel Aviv (IL)

(72) Inventors: Vlad Mystetskyi, Ashdod (IL); Matan Lachmish, Netanya (IL); Shai Mishali, Shoham (IL); Elad Douenias, Tel Aviv (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 19/344,252

(22) Filed: Sep. 29, 2025

(65) Prior Publication Data

US 2026/0024037 A1 Jan. 22, 2026

Related U.S. Application Data

(63) Continuation-in-part of application No. PCT/IL2024/050822, filed on Aug. 14, 2024, and a (Continued)

(51) Int. Cl.
*G06Q 10/0631* (2023.01)
*G06F 3/04847* (2022.01)

(Continued)

(52) U.S. Cl.
CPC ... *G06Q 10/06316* (2013.01); *G06F 3/04847* (2013.01); *G06F 9/5027* (2013.01);

(Continued)

(58) Field of Classification Search
CPC ............ G06F 21/44; G06F 2221/2141; G06Q 10/06398
See application file for complete search history.

(56) References Cited

U.S. PATENT DOCUMENTS 7,076,048 B2 7/2006 Lee et al.
9,576,033 B2 2/2017 Barrett et al.

(Continued)

FOREIGN PATENT DOCUMENTS

CN 105122288 12/2015
CN 116566737 A * 8/2023 ............ H04L 63/08

(Continued)

OTHER PUBLICATIONS

L. A. de C. Gatti, F. M. Santoro and V. T. Nunes, "An agent-based architecture for knowledge management in context-aware business processes," The 2010 14th International Conference on Computer Supported Cooperative Work in Design, Shanghai, China, 2010, pp. 318-323 (Year: 2010).*

(Continued)

*Primary Examiner* — Jerry O'Connor
*Assistant Examiner* — Ayanna Minor

(57) ABSTRACT

Systems and methods for integrating generative artificial intelligence (AI) within Software-as-a-Service (SaaS) platforms to automate data operations, synchronize cross-platform workflows, and enable intent-based interactions. A platform displays table structures of items and characteristics linked to a common objective, provides input interfaces, and enrolls AI agents as credentialed users with read/write privileges. The system prompts agents with column types, structural relations, and role profiles to generate and execute editing instructions that progress workflow objectives, detect missing or inconsistent data, and notify users or request information as needed. Hierarchical access schemes permit multiple agent instances with inherited privileges and resource limits managed through an AI center. Agents can operate as autonomous team members, analyze outputs, and support natural-language explanation sessions. Additional embodiments coordinate inter-service updates, maintain (Continued)

deviation detection tools, and construct tailored products and platform elements. These capabilities improve robust automation, decision support, and operational efficiency in complex SaaS environments.

23 Claims, 75 Drawing Sheets

Related U.S. Application Data continuation-in-part of application No. PCT/IL2024/050821, filed on Aug. 14, 2024, and a continuation-in-part of application No. PCT/IL2024/050820, filed on Aug. 14, 2024.

(60) Provisional application No. 63/802,765, filed on May 9, 2025, provisional application No. 63/645,998, filed on May 13, 2024, provisional application No. 63/548,339, filed on Nov. 13, 2023, provisional application No. 63/519,519, filed on Aug. 14, 2023.

(51) Int. Cl.

| | |
|---|---|
| ***G06F 9/50*** | (2006.01) |
| ***G06F 16/3329*** | (2025.01) |
| ***G06F 16/903*** | (2019.01) |
| ***G06F 16/9035*** | (2019.01) |
| ***G06F 16/9038*** | (2019.01) |
| ***G06F 21/44*** | (2013.01) |
| ***G06N 5/022*** | (2023.01) |
| ***G06N 5/04*** | (2023.01) |
| ***G06Q 10/0639*** | (2023.01) |
| ***H04L 9/40*** | (2022.01) |
| ***H04L 67/306*** | (2022.01) |
| ***H04L 67/50*** | (2022.01) |

(52) U.S. Cl.

CPC .. *G06F 16/33295* (2025.01); *G06F 16/90335* (2019.01); *G06F 16/9035* (2019.01); *G06F 16/9038* (2019.01); *G06F 21/44* (2013.01); *G06N 5/022* (2013.01); *G06N 5/04* (2013.01); *G06Q 10/06398* (2013.01); *H04L 63/105* (2013.01); *H04L 63/20* (2013.01); *H04L 67/306* (2013.01); *H04L 67/535* (2022.05); *G06F 2221/2141* (2013.01)

(56) References Cited

U.S. PATENT DOCUMENTS 9,965,553 B2 5/2018 Lyren
10,560,579 B1 2/2020 Wu et al.
10,904,169 B2 1/2021 Barve et al.
10,956,300 B1 3/2021 Yamane et al.
10,956,833 B1 3/2021 Yamane et al.
11,037,554 B1 6/2021 Le Chevalier et al.
11,069,001 B1 7/2021 Mascaro et al.
11,159,457 B2 10/2021 Liang et al.
11,526,661 B2 12/2022 Haramati et al.
11,537,627 B1 12/2022 Baskaran et al.
11,695,834 B1 7/2023 Aggarwal et al.
11,743,212 B2 8/2023 Truong et al.
11,770,476 B2 9/2023 Clodore et al.
11,914,588 B1 2/2024 Das et al.
11,941,362 B2 3/2024 Campos Ortega et al.
11,962,546 B1 4/2024 Hattangady et al.
12,041,098 B2 7/2024 B M S et al.
12,106,205 B1 10/2024 Jain et al.
12,210,847 B2 1/2025 Saito et al.
12,339,886 B1 6/2025 Jackson et al.
12,367,011 B2 7/2025 Mann et al.
12,418,555 B1 9/2025 Skarphedinsson et al.
12,499,318 B1 12/2025 Setlur et al.
12,511,497 B1 12/2025 Oks et al.
12,556,559 B1 2/2026 Bhattacharya et al.
12,566,769 B1 3/2026 Sun et al.
2003/0142141 A1 7/2003 Brown et al.
2006/0248045 A1 11/2006 Toledano et al.
2007/0011281 A1* 1/2007 Jhoney .................. G06Q 10/10 709/220
2009/0031286 A1 1/2009 Yee et al.
2009/0288004 A1 11/2009 Strandell et al.
2011/0004565 A1 1/2011 Stephenson et al.
2011/0070901 A1 3/2011 Alward et al.
2012/0062473 A1 3/2012 Xiao et al.
2012/0166258 A1 6/2012 Clemm et al.
2012/0304079 A1 11/2012 Rideout et al.
2014/0359439 A1 12/2014 Lyren
2015/0178876 A1 6/2015 Kapadia et al.
2016/0035353 A1 2/2016 Chen et al.
2017/0336940 A1 11/2017 Townsend et al.
2017/0337287 A1 11/2017 Gill
2018/0077088 A1 3/2018 Cabrera-Cordon et al.
2018/0122363 A1 5/2018 Braz et al.
2018/0131574 A1 5/2018 Jacobs et al.
2019/0036850 A1 1/2019 Kushwaha et al.
2019/0108265 A1 4/2019 Barmentloo et al.
2019/0108417 A1 4/2019 Talagala et al.
2019/0155577 A1 5/2019 Prabha et al.
2019/0171925 A1 6/2019 Arnold et al.
2019/0258953 A1 8/2019 Lang et al.
2019/0259377 A1 8/2019 Mertens et al.
2019/0340524 A1 11/2019 Kirchhoff et al.
2020/0059483 A1 2/2020 Weingarten et al.
2020/0183750 A1 6/2020 Abdelsalam et al.
2020/0320172 A1 10/2020 Kalia et al.
2020/0335097 A1 10/2020 Seol et al.
2021/0012404 A1 1/2021 Kannan et al.
2021/0042662 A1 2/2021 Pu et al.
2021/0117893 A1 4/2021 Sohum et al.
2021/0126984 A1 4/2021 Parekh et al.
2021/0273973 A1 9/2021 Boyer et al.
2021/0288927 A1 9/2021 Wang
2021/0342785 A1 11/2021 Mann et al.
2021/0406713 A1 12/2021 Chauhan et al.
2022/0021652 A1 1/2022 Moghe et al.
2022/0036153 A1 2/2022 O'Malia et al.
2022/0044266 A1 2/2022 Latka et al.
2022/0092116 A1 3/2022 Gupta et al.
2022/0269957 A1 8/2022 Rangan
2022/0374340 A1 11/2022 Brown
2022/0391729 A1 12/2022 Duford et al.
2023/0004896 A1 1/2023 Hartwig et al.
2023/0067222 A1 3/2023 Filji et al.
2023/0080417 A1 3/2023 Kwatra et al.
2023/0099604 A1 3/2023 Coman et al.
2023/0121307 A1 4/2023 Benchetrit et al.
2023/0186203 A1 6/2023 Kulkarni et al.
2023/0195885 A1 6/2023 Khurana et al.
2023/0196015 A1 6/2023 Coman et al.
2023/0214461 A1 7/2023 Brooks
2023/0245651 A1 8/2023 Wang
2023/0252224 A1 8/2023 Tran
2023/0259705 A1 8/2023 Tunstall-Pedoe et al.
2023/0297889 A1 9/2023 Lopez, Jr.
2023/0308460 A1 9/2023 Thomas et al.
2023/0316138 A1 10/2023 Nguyen et al.
2023/0342131 A1 10/2023 Keezhana et al.
2023/0368284 A1 11/2023 Sheikh et al.
2023/0412653 A1 12/2023 Khurana et al.
2024/0015126 A1 1/2024 Boyd et al.
2024/0070439 A1 2/2024 Segars et al.
2024/0104094 A1 3/2024 Li et al.
2024/0187376 A1 6/2024 Moghe et al.
2024/0193418 A1 6/2024 Guillame-Bert et al.
2024/0220831 A1* 7/2024 Wyman ................. G06N 20/00
2024/0256588 A1 8/2024 Biscof et al.
2024/0257096 A1 8/2024 Doumar et al.
2024/0267344 A1 8/2024 Mulligan et al.
2024/0296316 A1 9/2024 Simgh et al.
2024/0314587 A1 9/2024 Nair et al.

(56) References Cited

U.S. PATENT DOCUMENTS

| | | | |
|---|---|---|---|
| 2024/0320251 A1 | 9/2024 | Hemington et al. | |
| 2024/0333666 A1 | 10/2024 | Desmond et al. | |
| 2024/0346568 A1 | 10/2024 | Burt | |
| 2024/0354567 A1 | 10/2024 | Duggal et al. | |
| 2024/0362404 A1 | 10/2024 | Raees et al. | |
| 2024/0370479 A1 | 11/2024 | Hudetz et al. | |
| 2024/0370708 A1 | 11/2024 | Raghavan et al. | |
| 2024/0378515 A1 | 11/2024 | Nakamura et al. | |
| 2024/0412720 A1 | 12/2024 | Vasylycv | |
| 2024/0414156 A1* | 12/2024 | Crabtree ............. | H04L 63/1416 |
| 2024/0419983 A1 | 12/2024 | Verma et al. | |
| 2024/0420129 A1 | 12/2024 | Ramde et al. | |
| 2024/0427994 A1 | 12/2024 | Odland et al. | |
| 2025/0004452 A1 | 1/2025 | Anthony et al. | |
| 2025/0005050 A1 | 1/2025 | Krishnan et al. | |
| 2025/0005288 A1 | 1/2025 | Amatriain-Rubio et al. | |
| 2025/0013963 A1 | 1/2025 | Qazvinian et al. | |
| 2025/0016128 A1 | 1/2025 | Wheeler et al. | |
| 2025/0045256 A1 | 2/2025 | Gottlob et al. | |
| 2025/0053142 A1 | 2/2025 | Oppl | |
| 2025/0063140 A1 | 2/2025 | Grillo et al. | |
| 2025/0095642 A1 | 3/2025 | Ghose et al. | |
| 2025/0095808 A1 | 3/2025 | Davelaar et al. | |
| 2025/0110951 A1 | 4/2025 | Roychowdhury | |
| 2025/0118022 A1 | 4/2025 | Fitzmaurice et al. | |
| 2025/0139382 A1 | 5/2025 | Mohammed et al. | |
| 2025/0156898 A1* | 5/2025 | Crabtree ............ | G06Q 30/0277 |
| 2025/0245258 A1 | 7/2025 | Buller et al. | |
| 2025/0259041 A1 | 8/2025 | Crabtree et al. | |
| 2025/0298816 A1 | 9/2025 | Hunter et al. | |
| 2025/0299675 A1 | 9/2025 | Lee et al. | |
| 2025/0315866 A1 | 10/2025 | Kelly et al. | |
| 2025/0322153 A1 | 10/2025 | Malviya et al. | |
| 2025/0328727 A1 | 10/2025 | Choladze et al. | |
| 2025/0371226 A1 | 12/2025 | Galvin et al. | |
| 2025/0371278 A1 | 12/2025 | Schyma et al. | |
| 2025/0373508 A1 | 12/2025 | Kulikowski et al. | |
| 2025/0384216 A1 | 12/2025 | Nallam | |
| 2026/0003874 A1 | 1/2026 | Jootoo Ramesh Bapu et al. | |
| 2026/0031155 A1 | 1/2026 | Mystetskyi et al. | |
| 2026/0032155 A1 | 1/2026 | Mystetskyi et al. | |
| 2026/0057422 A1 | 2/2026 | Martis et al. | |
| 2026/0058997 A1 | 2/2026 | Qureshi | |
| 2026/0067119 A1 | 3/2026 | Shernan et al. | |
| 2026/0080013 A1 | 3/2026 | Pillai et al. | |
| 2026/0087447 A1 | 3/2026 | Makhija et al. | |
| 2026/0093544 A1 | 4/2026 | Mystetskyi et al. | |
| 2026/0094029 A1 | 4/2026 | Mystetskyi et al. | |
| 2026/0106846 A1 | 4/2026 | Agarwal et al. | |
| 2026/0127199 A1 | 5/2026 | Mystetskyi et al. | |
| 2026/0134038 A1 | 5/2026 | Mystetskyi et al. | |
| 2026/0140791 A1 | 5/2026 | Chilakamarri et al. | |
| 2026/0154115 A1 | 6/2026 | Mystetskyi et al. | |
| 2026/0163752 A1 | 6/2026 | Mishra et al. | |
| 2026/0181056 A1 | 6/2026 | Mystetskyi et al. | |

FOREIGN PATENT DOCUMENTS

| | | |
|---|---|---|
| WO | WO 2025/037311 | 2/2025 |
| WO | WO 2025/037312 | 2/2025 |
| WO | WO 2025/037313 | 2/2025 |
| WO | WO 2025/058832 | 3/2025 |

OTHER PUBLICATIONS

International Search Report and the Written Opinion Dated Dec. 18, 2024 From the International Searching Authority Re. Application No. PCT/IL2024/050820. (11 Pages).

International Search Report and the Written Opinion Dated Dec. 19, 2024 From the International Searching Authority Re. Application No. PCT/IL2024/050821. (16 Pages).

International Search Report and the Written Opinion Dated Dec. 30, 2024 From the International Searching Authority Re. Application No. PCT/IL2024/050822 (9 Pages).

Invitation to Pay Additional Fees Dated Oct. 7, 2024 From the International Searching Authority Re. Application No. PCT/IL2024/050820. (3 Pages).

Invitation to Pay Additional Fees Dated Oct. 7, 2024 From the International Searching Authority Re. Application No. PCT/IL2024/050821. (2 Pages).

Invitation to Pay Additional Fees Dated Oct. 17, 2024 From the International Searching Authority Re. Application No. PCT/IL2024/050822. (3 Pages).

Notice of Allowance Dated Sep. 22, 2025 from the US Patent and Trademark Office Re. U.S. Appl. No. 19/179,061. (10 pages).

Notice of Allowance Dated Jun. 30, 2025 from the US Patent and Trademark Office Re. U.S. Appl. No. 19/179,092. (9 pages).

Official Action Dated May 19, 2025 from the US Patent and Trademark Office Re. U.S. Appl. No. 19/179,061. (28 pages).

International Preliminary Report on Patentability Dated Feb. 26, 2026 From the International Bureau of WIPO Re. Application No. PCT/IL2024/050820 (10 Pages).

International Preliminary Report on Patentability Dated Feb. 26, 2026 From the International Bureau of WIPO Re. Application No. PCT/IL2024/050821 (13 Pages).

International Preliminary Report on Patentability Dated Feb. 26, 2026 From the International Bureau of WIPO Re. Application No. PCT/IL2024/050822 (8 Pages).

Official Action Dated Mar. 3, 2026 from the US Patent and Trademark Office Re. U.S. Appl. No. 19/344,291. (23 Pages).

Official Action Dated Mar. 9, 2026 from the US Patent and Trademark Office Re. U.S. Appl. No. 19/437,414. (31 pages).

Official Action Dated Mar. 10, 2026 from the US Patent and Trademark Office Re. U.S. Appl. No. 19/344,329. (26 pages).

Google "Web Search History", Google, 1 P., Feb. 12, 2026.

Restriction Official Action Dated Dec. 11, 2025 From the US Patent and Trademark Office Re. U.S. Appl. No. 19/344,291. (9 pages).

Interview Summary Dated May 14, 2026 from the US Patent and Trademark Office Re. U.S. Appl. No. 19/437,414. (2 pages).

Interview Summary Dated Apr. 17, 2026 from the US Patent and Trademark Office Re. U.S. Appl. No. 19/344,291. (2 pages).

Notice of Allowance Dated Apr. 28, 2026 from the US Patent and Trademark Officc Rc. U.S. Appl. No. 19/432,254. (15 pages).

Official Action Dated Apr. 1, 2026 from the US Patent and Trademark Office Re. U.S. Appl. No. 19/437,406. (20 pages).

Official Action Dated May 4, 2026 from the US Patent and Trademark Office Re. U.S. Appl. No. 19/450,906. (21 pages).

Official Action Dated May 4, 2026 from the US Patent and Trademark Office Re. U.S. Appl. No. 19/450,923. (16 pages).

Official Action Dated May 7, 2026 from the US Patent and Trademark Office Re. U.S. Appl. No. 19/344,305. (35 Pages).

Official Action Dated Apr. 13, 2026 from the US Patent and Trademark Office Re. U.S. Appl. No. 19/450,863. (21 pages).

Official Action Dated Mar. 17, 2026 from the US Patent and Trademark Office Re. U.S. Appl. No. 19/344,215. (59 pages).

Official Action Dated Mar. 26, 2026 from the US Patent and Trademark Office Re. U.S. Appl. No. 19/392,271. (28 pages).

Official Action Dated May 29, 2026 from the US Patent and Trademark Office Re. U.S. Appl. No. 19/450,907. (30 pages).

International Search Report and the Written Opinion Dated Jun. 8, 2026 From the International Searching Authority Re. Application No. PCT/IL2026/050061 (26 Pages).

Interview Summary Dated Jul. 2, 2026 from the US Patent and Trademark Office Re. U.S. Appl. No. 19/450,906. (4 pages).

Notice of Allowance Dated Jun. 30, 2026 from the US Patent and Trademark Office Re. U.S. Appl. No. 19/437,414. (26 pages).

Official Action Dated Jul. 7, 2026 from the US Patent and Trademark Office Re. U.S. Appl. No. 19/344,329. (42 pages).

Official Action Dated Jul. 7, 2026 from the US Patent and Trademark Office Re. U.S. Appl. No. 19/655,816. (17 pages).

Official Action Dated Jun. 12, 2026 from the US Patent and Trademark Office Re. U.S. Appl. No. 19/450,833. (40 pages).

Official Action Dated Jul. 14, 2026 from the US Patent and Trademark Office Re. U.S. Appl. No. 19/655,825. (37 pages).

(56) References Cited

OTHER PUBLICATIONS

Official Action Dated Jun. 25, 2026 from the US Patent and Trademark Office Re. U.S. Appl. No. 19/344,291. (33 pages).

* cited by examiner

FIG. 3
302. Maintain AI agent
304. Store alphanumeric data in table structures
305. Maintain credentials management process
306. Display items in table structure
307. Display input interface
308. Receive user inputs
309. Select AI agent
310. Interact with items
311. Add AI agent
312. Prompt generative AI model
313. Identify editing instructions
314. Perform editing instructions

MODULAR AI AGENT SYSTEM WITH DYNAMIC SKILL REGISTRY AND RESOURCE MANAGEMENT FOR ENTERPRISE APPLICATIONS

RELATED APPLICATION(S)

This application is a Continuation-in-Part (CIP) of PCT Patent Application Nos. PCT/IL2024/050820, PCT/IL2024/050821, and PCT/IL2024/050822, all having an International Filing Date of Aug. 14, 2024, and each of which claim the benefit of priority of U.S. Provisional Patent Application Nos. 63/519,519 filed on Aug. 14, 2023, 63/548,339 filed on Nov. 13, 2023, and 63/645,998 filed on May 13, 2024.

This application also claims the benefit of priority of U.S. Provisional Patent Application No. 63/802,765 filed on May 9, 2025.

The contents of the above applications are all incorporated by reference as if fully set forth herein in their entirety.

BACKGROUND

Some embodiments described in the present disclosure relate to implementing artificial intelligence capabilities in digital environments and, more specifically, but not exclusively, to integrating generative artificial intelligence capabilities within digital environments such as Software as a Service platforms, cloud-based software solutions, and/or the like, optionally aimed to enhance data management, project coordination, cross-platform synchronization, data interaction and/or analysis functionality, product customization, and/or the like.

In recent years, the software industry has seen a significant shift towards cloud-based solutions, with Software as a Service (SaaS) emerging as a dominant model for delivering applications to users, and the adoption of SaaS platforms for various business operations growing exponentially. These cloud-based solutions, and SaaS platforms specifically, offer numerous advantages, including accessibility, scalability, and cost-effectiveness. These platforms typically provide a wide range of applications and services to meet various business needs such as customer relationship management (CRM), human resources management (HRM), project planning and/or management, accounting, marketing automation, data analysis, and/or the like.

Concurrently, the field of artificial intelligence (AI) has experienced rapid advancements, particularly in the area of generative AI. Generative AI models, such as large language models (LLMs), have demonstrated remarkable capabilities in natural language processing (NLP), content generation, and complex problem-solving. These AI models can learn patterns and structures from input data and generate new content with similar characteristics. In particular, generative AI models, via capabilities of creating new content and providing intelligent responses based on vast amounts of training data, have shown immense potential in enhancing user interactions and automating complex tasks.

As used herein, a cloud-based solution or a cloud-based service or a software service may be any service made available to users on demand via the Internet from a cloud computing provider's server, as opposed to being provided from a company's own on-premises servers.

SUMMARY

It is an object of the present disclosure to describe systems and methods of artificial intelligence capabilities integration in software applications, enhanced management and cross synchronization of software platforms, and intent-based interactions in software platforms.

The foregoing and other objects are achieved by the features of the independent claims. Further implementation forms are apparent from the dependent claims, the description and the figures.

The disclosed subject matter, in some embodiments thereof, relates to systems and methods for implementing artificial intelligence (AI) capabilities in software applications and, more particularly, but not exclusively, to systems and methods for integrating generative artificial intelligence capabilities within Software as a Service (SaaS) platforms.

In one aspect, embodiments of the disclosed subject matter provide a method and a system for using generative artificial intelligence (AI) in a Software as a Service (SaaS) platform. The system comprises one or more processors configured to cause a display of a table structure including multiple items, each with multiple item characteristics, associated with a common table objective. The system further displays at least one input interface for receiving user inputs to interact with items in the table structure. A generative AI agent is added as a SaaS platform user with credentials to read and write data in certain items. The system prompts the generative AI agent with data type of item characteristics and/or structural relations between items, generates instructions for performing an action by interacting with item characteristics, and executes the generated instructions.

In another aspect, embodiments of the disclosed subject matter provide a method and a system for using generative artificial intelligence (AI) for intent-based interaction within a Software as a Service (SaaS) platform. The method involves maintaining a generative AI agent configured to interact with sets of alphanumeric data stored in table structures, each with a plurality of items comprising the alphanumeric data. The generative AI agent is associated with a profile defining its role in a team assigned to a project. The role refers to a set of rules according to which the generative AI agent is guided to interact with data in a predetermined manner, although these rules can be changed, corrected, or amended later as needed. The method further maintains a credentials management process for defining user credentials, displays the items in a table structure with an input interface, and allows adding the generative AI agent to interact with the alphanumeric data under control of the credentials management process, all for example as described below.

Embodiments of the disclosed subject matter also encompass a system for interactive analysis of artificial intelligence outputs. This system maintains a generative AI agent capable of autonomously performing project-related tasks and generating outputs. It stores these outputs along with metadata, provides a user interface for initiating natural language interaction sessions regarding the outputs, and generates explanatory responses based on user queries.

Furthermore, embodiments of the disclosed subject matter include a method and a system for managing artificial intelligence resources in a SaaS platform. This method involves maintaining an AI center interface displaying multiple generative AI agents, enabling deployment of multiple instances of each generative AI agent as limited resources, and managing their deployment to ensure they do not exceed assigned resource limits.

Additionally, embodiments of the disclosed subject matter provide a method and a system for contextual data analysis in a structured environment. This method involves accessing a data structure containing multiple items associated with columns, analyzing each column's properties, and utilizing an AI model to perform contextual analysis of given items.

These aspects of the disclosed subject matter, individually and in combination, represent significant advancements in the integration of AI capabilities within SaaS environments. They address critical challenges in data management, task automation, and decision support, while maintaining essential controls for data privacy and security. The disclosed subject matter has the potential to transform how businesses interact with their SaaS platforms, leading to enhanced productivity, more informed decision-making, and improved operational efficiency across various industries and use cases.

In some embodiments of the disclosed subject matter, a system for using generative artificial intelligence (AI) in a software as a service (SaaS) platform is provided, comprising one or more processors configured to: cause a display a table structure including multiple items, each with multiple item characteristics, associated with a common table objective; cause a display at least one input interface for receiving user inputs to interact with items in the table structure; add a generative AI agent as a SaaS platform user with credentials to read and write data in certain items; prompt the generative AI agent with data type of item characteristics and/or structural relations between items; generate instructions for performing an action by interacting with some or all of the multiple item characteristics based on the data type and structural relations; and execute the generated instructions.

Optionally, the generative AI agent is added as the SaaS platform user based on the user inputs.

Optionally, the user inputs are indicative of adding a graphical representation of the generative AI agent to at least one cell of the table structure.

Optionally, the items are arranged in rows and item characteristics in columns of the table structure.

Optionally, the one or more processors are configured to: analyze patterns in the table structure; identify missing or inconsistent data, autonomously update item characteristics based on the analysis, and generate reports summarizing changes made to the table structure.

Optionally, the prompt includes deducing the common table objective from data type and/or structural relations between item characteristics, and generating instructions based on the deduced objective.

Optionally, the action is calculated to promote the common table objective; wherein the common table objective is achieved through completing a series of activities defined by the table structure; and the action is part of this series of activities.

Optionally, the common table objective can be deduced using log history.

Optionally, actions include generating data for an empty first cell of a first data characteristic of an item, and processing this data based on a value in a second cell of a second data characteristic.

Optionally, the generative AI agent reports to its assigning user when no further actions are required for an item.

Optionally, the system is further configured to: notify a human user of missing data; and await receipt of missing data before proceeding with further actions.

Optionally, the system is further configured to send reminders for missing data.

Optionally, adding a generative AI agent is done by selecting from a reservoir of available users in a data characteristic containing user identities.

Optionally, selection is made via a drop-down menu with user avatars, and the generative AI agent is selected by choosing its avatar.

In some embodiments of the disclosed subject matter, a system for using generative artificial intelligence (AI) for intent-based interaction within a Software as a Service (SaaS) platform is provided, comprising one or more processors configured to: maintain an artificial intelligence (AI) agent configured to interact with sets of alphanumeric data of the SaaS platform stored in one or more table structures, each with a plurality of items comprising the alphanumeric data, and with a profile defining a role of the generative AI agent in a team assigned to the project; maintain a credentials management process for defining for a plurality of users credentials for interacting with the alphanumeric data; cause a display of the plurality of items in a table structure and at least one input interface configured to receive user inputs for: interacting with the plurality of items and adding the generative AI agent to interact with the alphanumeric data under a control of the credentials management process; prompt a generative AI model with the profile and at least one or more indications of the plurality of items or the table structure to identify editing instructions to be executed by the generative AI agent on one or more of the plurality of items; perform the editing instructions using the user credentials.

In some embodiments of the disclosed subject matter, a system for using generative artificial intelligence (AI) for intent-based interaction within a Software as a Service (SaaS) platform is provided, comprising one or more processors configured to: maintain an artificial intelligence (AI) agent configured to interact with alphanumeric data of a SaaS platform stored in a plurality of items arranged in a table structure, wherein the table structure is one of a plurality of tables associated with one of a plurality of different departments within an account; maintain a hierarchical access control scheme mapping the plurality of table structures of the SaaS platform to a plurality of privilege classes defining inheritable edit privileges; identify a user input indicative of adding the generative AI agent as a user to one or more of the plurality of table structures associated with one of the plurality of different departments; grant the generative AI agent edit privileges inherited based on the hierarchical access control scheme of that department.

Optionally, granting the generative AI agent edit privileges is made by an onboarding process that provides the generative AI agent with information specifying how to adapt its output based on either the role of the user adding it or the context of the place to which it is added within the hierarchical structure.

Optionally, multiple instances of the generative AI agent can be added to different levels of the hierarchical structure, each instance inheriting different edit privileges based on its location in the structure.

Optionally, the system comprises: a first AI agent associated with a first level of the hierarchical structure and having a first set of edit privileges; and a second AI agent associated with a second level of the hierarchical structure and having a second set of edit privileges, wherein the second set of edit privileges includes the first set of edit privileges and at least one additional edit privilege.

Optionally, the one or more processors are further configured to: perform an onboarding process for the generative AI agent, wherein the onboarding process includes providing the generative AI agent with context-specific information related to the project.

Optionally, the context-specific information includes know-how specific to the role of the generative AI agent in the team assigned to the project.

Optionally, the profile defining the role of the generative AI agent is customizable based on the specific context of the project.

Optionally, the one or more processors are further configured to: adapt the output of the generative AI agent based on the role of a user interacting with the generative AI agent.

Optionally, the one or more processors are further configured to: adapt the output of the generative AI agent based on a location in which the generative AI agent is engaged within the SaaS platform.

Optionally, the generative AI agent is configured to respond differently to similar queries based on a role of a user making a query.

Optionally, the one or more processors are further configured to: maintain multiple AI agents with different profiles, each profile corresponding to a different role within the team assigned to the project; wherein each AI agent is configured to provide different responses to the same query based on its specific role defined by its profile.

Optionally, the generative AI agent is configured to: maintain a personalized knowledge base for each department; update its responses and actions based on department-specific terminologies and workflows; adapt its communication style based on the hierarchical level of the user it's interacting with.

Optionally, the one or more processors are configured to perform editing instructions without requiring specific instructions on how to perform the one or more actions from a team member.

Optionally, the one or more processors are configured to analyze user interactions with the generative AI agent, identify patterns in user preferences and behaviors, and dynamically adjust the generative AI agent's responses and recommendations based on the identified patterns; wherein the generative AI agent is trained based on a plurality of datasets documenting interactions with other alphanumeric data stored in a plurality of other items.

Optionally, the generative AI agent is granted limited access permissions to interact only with the alphanumeric data related to a specific task.

Optionally, the generative AI agent is embodied as an avatar, and introducing the avatar to a task grants the generative AI agent permission to access log history and context of items associated with the task.

Optionally, the generative AI agent is personalized based on the context of the request and adapts its output depending on the requester and the location in which the generative AI agent is engaged.

Optionally, the personalization is a result of an onboarding process the generative AI agent undergoes after inclusion in a task or account, during which it gains access to know-how specific to the context of the task in the account.

Optionally, the mapping is of the plurality of items.

In some embodiments of the disclosed subject matter, a system for using generative artificial intelligence as an autonomous team member within a project management platform is provided, comprising one or more processors configured to: maintain an artificial intelligence (AI) agent configured to interact with alphanumeric data stored in a plurality of items in a table structure comprising the alphanumeric data; cause a display of the plurality of items in the table structure and at least one input interface configured to receive user inputs for assigning tasks to the generative AI agent; analyze assigned tasks and assess whether sufficient information is found in the plurality of items in the table structure and identify missing information necessary for task completion; autonomously identify relevant team members based on context derived from the table structure and past user interactions therewith; proactively reach out to the identified team members to obtain the missing information; complete the assigned task using the obtained information without requiring further user intervention.

Optionally, the user inputs are indicative of adding a graphical representation of the generative AI agent to at least one cell of the table structure.

In some embodiments of the disclosed subject matter, a system for interactive analysis of artificial intelligence outputs is provided, comprising one or more processors configured to: maintain an artificial intelligence (AI) agent configured to autonomously perform tasks related to a project and generate outputs based on project data; store the outputs generated by the generative AI agent along with metadata identifying platform elements used in generating each output; provide a user interface for initiating a natural language interaction session regarding the outputs generated by the generative AI agent; receive, via the user interface, a user query about a specific output generated by the generative AI agent; analyze the user query to identify the specific output being discussed; retrieve the metadata associated with the identified output; generate a natural language response explaining the reasoning behind the output, including references to the platform elements identified in the metadata; present the natural language response to the user via the user interface; engage in an interactive dialogue with the user to provide further clarification about the output and its underlying reasoning based on the platform elements.

In some embodiments of the disclosed subject matter, a method for using generative artificial intelligence (AI) for intent-based interactions within a Software as a Service (SaaS) platform is provided, comprising: maintaining alphanumeric data stored in a plurality of items representing the alphanumeric data within the SaaS platform; maintaining a first artificial intelligence agent with a first set of credentials and a second artificial intelligence agent with a second set of credentials different from the first set, the first and second artificial intelligence agents being maintained in a common account of the SaaS platform; causing a display of at least one input interface configured to receive user inputs for: a) interacting with the plurality of items, b) selecting the first AI agent to interact with the alphanumeric data to perform an analysis of at least some of the user inputs accessed using the first set of credentials, and c) selecting the second AI agent to interact with the alphanumeric data to perform an analysis of at least some of the user inputs accessed using the second set of credentials; identifying one or more actions for interacting with the alphanumeric data according to the analysis only using information obtained through the corresponding set of credentials; automatically performing at least one of the one or more actions on the alphanumeric data accessible thereto using the corresponding credentials.

Optionally, the first and second agents are initialized as processes of a common agent code.

Optionally, the first and second agents differ only by their set of credentials.

Optionally, the method further comprises: requesting permission to perform an action in another element to which the generative AI agent does not have credentials.

Optionally, the method further comprises: maintaining a third AI agent with a set of credentials partially overlapping with the credentials of the first and second AI agents.

Optionally, the method further comprises: displaying a GUI element showing all different variations of the same AI agent and details for each of their credentials.

Optionally, the first and second AI agents are selected from a marketplace of agents with different credentials.

Optionally, the method further comprises: updating the credentials of at least one of the generative AI agents based on user input or system-determined requirements.

Optionally, identifying one or more actions comprises: analyzing the user inputs to determine user intent; matching the determined user intent with potential actions within the scope of the generative AI agent's credentials.

Optionally, the method further comprises: logging all actions performed by the generative AI agents for auditing purposes.

Optionally, automatically performing at least one of the one or more actions comprises: executing the action without further user intervention if the action falls within a predefined set of low-risk operations; requesting user confirmation before executing the action if the action falls outside the predefined set of low-risk operations.

Optionally, the method further comprises: providing a natural language interface for users to interact with and instruct the generative AI agents.

In some embodiments of the disclosed subject matter, a computerized method for managing artificial intelligence (AI) resources in a Software as a Service (SaaS) platform is provided, comprising: maintaining, by one or more processors, an AI center interface displaying a plurality of AI agents for incorporation within an account of the SaaS platform, each AI agent representing different AI functionalities and configured to interact with alphanumeric data stored or associated with platform elements of the SaaS platform; enabling, by the one or more processors, deployment of multiple instances of each AI agent as limited resources; causing, by the one or more processors, a display of a plurality of items in a table structure and at least one input interface configured to receive user inputs for assigning AI agent instances to one or more items or platform elements; tracking and managing, by the one or more processors, the deployment of AI agent instances to ensure they do not exceed their assigned resource limits; executing, by the one or more processors, actions using the deployed AI agent instances within their assigned scope in the SaaS platform and their resource limits.

Optionally, the method further comprises: displaying, via a GUI element within the SaaS platform, information about all AI functionalities available in an account, with each functionality represented by a different AI agent.

Optionally, the method further comprises: displaying, via the GUI element, utilization information for each AI agent resource.

Optionally, executing actions comprises: consuming multiple instances of a generative AI agent for certain actions and a single instance for other actions.

Optionally, the method further comprises: treating the plurality of AI agents as limited resources, with multiple instances of the same AI agent available for purchase and assignment to a limited number of items concurrently, further comprising: notifying a user when an attempt to assign a generative AI agent instance exceeds the resource limit; providing an option to purchase additional resources.

Optionally, the computerized method further comprises: implementing a dynamic pricing model for AI agent instances based on demand and availability; providing a resource forecasting tool to predict future AI resource needs based on historical usage and project plans; automatically scaling AI resources up or down based on predefined thresholds and usage patterns; implementing a queuing system for managing requests to AI agents when demand exceeds available resources.

Optionally, tracking and managing the deployment of AI agent instances comprises: maintaining a count of assigned instances for each AI agent; comparing the count to a predefined limit for each AI agent.

Optionally, the method further comprises: receiving a request to assign a generative AI agent instance to an item or platform element; determining whether the assignment would exceed the resource limit for the generative AI agent; allowing or denying the assignment based on the determination.

Optionally, the method further comprises: providing an interface for purchasing additional instances of a generative AI agent.

Optionally, each AI agent instance is configured to be assigned to up to a predetermined number of items concurrently.

In some embodiments of the disclosed subject matter, a method for contextual data analysis in a structured environment is provided, comprising: accessing, by one or more processors, a data structure containing multiple items, each item associated with a plurality of columns; for each column: a) analyzing the column header to determine its descriptive label; b) determining the data type of the column; c) assessing the values contained within the column across multiple items; for a given item in the data structure: a) extracting values from each of its associated columns; b) utilizing an AI model to perform a contextual analysis of the given item, including one or more of: i) interpreting respective values based on its column context; ii) identifying patterns or trends from previous items in the same data structure that are similar to the given item; iii) inferring relationships between different columns and their values; providing an interface for users to query the AI model about the contextual analysis.

Optionally, the method further comprises: presenting, via the interface, explanations on how different column types influence data interpretation.

Optionally, determining the data type of the column includes categorizing the column as one of: status, text, numeric, or date.

Optionally, the method further comprises: inferring a workflow or utilization process represented by the data structure based on interpreting the structure of the data.

Optionally, utilizing the AI model to perform contextual analysis includes: differentiating between the usage and interpretation of data stored in a status column versus the same data stored in a text column.

Optionally, the method further comprises: training the AI model to understand different uses for each column type and the implications of using one column type instead of another.

Optionally, assessing the values contained within the column across multiple items includes: analyzing how values change in other items of the same type over time or across different contexts.

Optionally, providing the interface includes: enabling natural language queries about the contextual relationships and patterns identified by the AI model.

Optionally, the method further comprises: updating the AI model based on user feedback regarding the accuracy and relevance of the contextual analysis.

Optionally, the method further comprises: implementing a machine learning model to: identify correlations between columns across multiple items; predict future values for specific columns based on historical trends; detect anomalies in data patterns and flag them for user review; providing a visual representation of the identified correlations and predictions; enabling users to interactively explore the contextual relationships through a graphical interface.

In some embodiments of the disclosed subject matter, a system for using generative artificial intelligence (AI) in a software as a service (SaaS) platform is provided, comprising one or more processors configured to: display a table structure including multiple items, each with multiple item characteristics, associated with a common table objective; display at least one input interface for receiving user inputs to interact with items in the table structure; add a generative AI agent as a SaaS platform user with credentials to read and write data in certain items; prompt the generative AI agent with data type of item characteristics and/or structural relations between items; generate instructions for performing an action by interacting with item characteristics; execute the generated instructions; wherein the items are arranged in rows and item characteristics in columns of the table structure.

Optionally, the action is calculated to promote the common table objective.

Optionally, the prompt includes deducing the common table objective from data type and/or structural relations between item characteristics, and generating instructions based on the deduced objective.

Optionally, the common table objective is achieved through completing a series of activities defined by the table structure and the action is part of this series of activities.

Optionally, the common table objective can be deduced using log history.

Optionally, actions include: generating data for an empty first cell of a first data characteristic of an item; and processing this data based on a value in a second cell of a second data characteristic.

Optionally, the generative AI agent reports to its assigning user when no further actions are required for an item.

Optionally, the system is further configured to: notify a human user of missing data; and await receipt of missing data before proceeding with further actions.

Optionally, the system is further configured to send reminders for missing data.

Optionally, adding a generative AI agent is done by selecting from a reservoir of available users in a data characteristic containing user identities.

Optionally, a selection is made via a drop-down menu with user avatars and a generative AI agent is selected by choosing its avatar.

In some embodiments of the disclosed subject matter, a method for managing a generative artificial intelligence (AI) agent marketplace in a SaaS platform is provided, comprising: displaying a catalog of generative AI agents, each with defined capabilities and credential sets; providing a user interface for filtering and comparing generative AI agents based on specific criteria; enabling users to test generative AI agents in a sandbox environment before deployment; implementing a rating and review system for generative AI agents based on user feedback; and automatically recommending generative AI agents to users based on their usage patterns and business needs.

The disclosed subject matter, in some embodiments thereof, relates to systems and methods for integrating generative artificial intelligence (AI) capabilities within Software as a Service (SaaS) platforms, addressing the challenges of data fragmentation, manual synchronization, limited cross-platform visibility, and inefficient workflow management in modern business environments.

In one aspect, embodiments of the disclosed subject matter comprise a system and a method for managing data updates across multiple Software as a Service (SaaS) platforms. This system includes processors configured to maintain an object data source containing data objects linked to project boards, receive data messages from various software services, analyze these messages to identify deviations between task statuses and process statuses, and automatically update the boards to reflect the current project state.

In another aspect, embodiments of the disclosed subject matter involve a system and a method for managing software services and coordinating actions across multiple platforms. This system analyzes data from various software services, identifies deviations between task statuses and process statuses, calculates instructions for software processes based on these deviations, and transmits these instructions to the relevant software services.

Some embodiments of the disclosed subject matter may also encompass a system and a method for managing communication between services and a project management software platform using AI agents. This method involves maintaining a project management software platform AI agent, establishing question-and-answer sessions between this agent and multiple software service AI agents, and using the data from these sessions to calculate update instructions for project management boards and action instructions for software processes.

Furthermore, some embodiments of the disclosed subject matter include a system and a method for using generative AI for intent-based interaction within a SaaS platform. This system maintains an AI model trained on user interactions, analyzes logical relations between items in a target board, and performs actions to optimize the board's structure and efficiency without requiring specific user instructions.

Further yet, some embodiments of the disclosed subject matter comprise a system and a method for AI-driven cross-departmental account health monitoring and notification within a SaaS platform. This system uses an AI model to analyze work management platform data across different departments, identify deviations from regular workflows, determine underlying causes, and automatically route notifications to the most appropriate departments for addressing these issues.

These aspects of the disclosed subject matter work in concert to provide a comprehensive solution for enhancing data synchronization, workflow optimization, and cross-platform integration in complex SaaS ecosystems. By leveraging advanced AI techniques, the disclosed subject matter aims to significantly improve organizational efficiency, decision-making processes, and overall productivity in modern, digitally-driven business environments.

In some embodiments of the disclosed subject matter, a system for managing data updates is provided, comprising one or more processors configured to execute code to: maintain an object data source containing multiple data objects linked to one or more boards, wherein the boards indicate a plurality of task statuses for multiple tasks assigned to multiple users assigned with credentials to access the one or more boards documenting data of a project; receive multiple data messages from a plurality of software services connected to a network, wherein the plurality of software services manage multiple software processes which are executed independently from the one or more boards and related to the project, and at least some of the data messages indicate a plurality of process statuses of at least some of the multiple software processes; analyze data from the data messages and data objects to identify one or more deviations between the plurality of task statuses and the plurality of process statuses; calculate instructions to update the one or more boards based on the identified one or more deviations; and execute the instructions to update the one or more boards based on the identified deviation.

Optionally, the one or more processors are configured to execute code to analyze the data from the data messages and the data objects using a machine learning model.

Optionally, the machine learning model is trained based on: (1) multiple historical data objects linked to historical boards indicating the plurality of task statuses for multiple historical tasks assigned to multiple historical users assigned with credentials to access a plurality of historical boards and related to historical projects, and (2) historical multiple data messages from the plurality of software services when managed multiple historical software processes which are executed independently from the one or more historical boards but in relation to the historical projects.

Optionally, the one or more processors are further configured for executing the code to display on a graphical user interface a notification indicative of the deviation and a selectable graphical element adapted to receive a user selection indicative of a user intent to execute the instructions.

Optionally, the instructions to update the one or more boards are based on outputs of the machine learning model.

Optionally, the plurality of software services are cloud-based services and the multiple data messages are received using Application Programming Interface (API).

Optionally, the multiple data messages are received from one or more generative AI agents executed on the plurality of software services as one or more users of the plurality of software services.

Optionally, the data messages are received from one or more generative AI agents by another generative AI agent executed as a user having credentials to access the one or more boards documenting data of the project.

Optionally, the one or more processors are further configured to: analyze historical patterns of deviations and updates; predict future deviations based on current project data and historical patterns; proactively suggest preventive actions to mitigate predicted deviations.

Optionally, the system further comprises a natural language processing module configured to: interpret unstructured data from the data messages; extract relevant information for updating the one or more boards; generate human-readable summaries of the identified deviations and updates.

Optionally, the one or more processors are further configured to: analyze update patterns and user behavior; automatically adjust the frequency and timing of updates based on user activity patterns to minimize disruptions.

Optionally, the system further comprises a permission management module configured to: dynamically adjust user permissions across the one or more boards based on their activities in the connected third-party applications; ensure data privacy and security when propagating updates from one platform to another.

Optionally, the one or more processors are further configured to: generate and maintain a dependency graph of tasks across multiple platforms; use the dependency graph to prioritize updates and identify critical path changes.

Optionally, the system further comprises an anomaly detection module configured to: identify unusual patterns or outliers in the data messages or update patterns; flag potential data quality issues or security concerns for review.

Optionally, the one or more processors are further configured to: analyze the efficiency of different third-party tools based on the frequency and nature of updates; generate reports on tool usage and effectiveness to inform IT strategy and tool selection.

In some embodiments of the disclosed subject matter, a system for managing software services is provided, comprising one or more processors configured to execute code to: maintain an object data source containing multiple data objects linked to one or more boards assigned to a project, wherein the boards indicate a plurality of task statuses for multiple tasks assigned to multiple users assigned with credentials to access the one or more boards; receive multiple data messages from a plurality of software services connected to a network, wherein the plurality of software services manage multiple software processes which are executed independently from the one or more boards with regard to the project, and at least some of the data messages indicate a plurality of process statuses of at least some of the multiple software processes; analyze data from the data messages and data objects to identify one or more deviations between the plurality of task statuses and the plurality of process statuses; calculate instructions for at least some of the multiple software processes based on the identified one or more deviations; and transmit the instructions to at least some of the plurality of software services.

Optionally, calculate instructions comprises calculate instructions to execute a sub process of one of the at least some software processes based on one or more task statuses of one or more other of the at least some software processes.

Optionally, the analysis of data from the data messages and data objects is performed using a machine learning model.

Optionally, the machine learning model is trained based on: (1) multiple historical data objects linked to historical boards indicating the plurality of task statuses for multiple historical tasks assigned to multiple historical users assigned with credentials to access a plurality of historical boards and related to historical projects, and (2) historical multiple data messages from the plurality of software services when managing multiple historical software processes which were executed independently from the one or more historical boards but in relation to the historical projects.

Optionally, the instructions are transmitted to the at least some of the plurality of software services using a generative AI agent having credentials to access the one or more boards.

Optionally, the plurality of software services includes one or more of collaborative platforms, project management tools, communication systems, and productivity applications.

Optionally, the plurality of software services receives the data using generative AI agents registered as users in these software services.

Optionally, the generative AI agents registered as users in the software services have specific credentials and permissions within those services.

Optionally, the generative AI agent is configured to formulate instructions in a format compatible with a receiving software service.

Optionally, the machine learning model is periodically updated based on the outcomes of previously calculated instructions.

Optionally, the one or more processors are further configured to: maintain a log of the identified deviations and the calculated instructions for auditing purposes.

Optionally, the system is configured to adapt its communication protocols based on the specific requirements of each software service platform.

In some embodiments of the disclosed subject matter, a method for managing communication between services and a project management software platform is provided, comprising: execute on one or more processors a code for: maintaining a project management software platform AI agent that interacts with alphanumeric data stored in multiple data objects, establishing question-and-answer sessions on text-based communication channels between the project management software platform AI agent and one or more of multiple software service AI agents where: some or all software service AI agents interact with software services managing multiple software processes and run independently from project management boards, based on data from the question-and-answer sessions, calculating update instructions for the project management boards, and/or action instructions for the software processes, and executing the update instructions and/or transmitting the action instructions over a network.

Optionally, the project management software platform AI agent utilizes a machine learning model to interact with the alphanumeric data and conduct the question-and-answer sessions.

Optionally, the machine learning model is trained based on: (1) historical data objects linked to historical boards indicating task statuses for historical tasks assigned to historical users with credentials to access historical boards related to historical projects, and (2) historical question-and-answer session data between the project management software platform AI agent and the software service AI agents related to historical software processes.

Optionally, the software services include various types of collaborative platforms, project management tools, communication systems, and productivity applications commonly used in professional environments.

Optionally, the software service AI agents are registered as users with specific credentials and permissions within their respective software services.

Optionally, calculating update instructions and/or action instructions is performed using a machine learning model that analyses patterns and discrepancies between project management board data and software process data.

Optionally, the method further comprises: maintaining a log of the question-and-answer sessions, calculated instructions, and outcomes for auditing and model improvement purposes.

Optionally, the project management software platform AI agent and the software service AI agents use natural language processing to conduct the question-and-answer sessions.

Optionally, the action instructions transmitted to the software services are formulated by the project management software platform AI agent in a format compatible with the receiving software service.

Optionally, the method further comprises: periodically updating the project management software platform AI agent based on the outcomes of previously calculated instructions and executed actions.

Optionally, the question-and-answer sessions are initiated automatically based on predefined triggers in either the project management boards or the software processes.

In some embodiments of the disclosed subject matter, a system for using generative artificial intelligence for intent-based interaction is provided, comprising: one or more processors configured to: maintain a generative artificial intelligence (AI) model trained on multiple interactions of multiple users with alphanumeric data stored in a plurality of items representing the alphanumeric data in a plurality of different boards, wherein the interactions include types of actions performed on the data without including the content itself; perform an analysis of a plurality of logical relations between a plurality of items in a target board using the generative AI model to calculate, based on the analysis, one or more actions to be performed on the target board, wherein the actions include modifications to the board structure or metadata; and perform the identified one or more actions without requiring specific instructions on how to perform the one or more actions from a user.

Optionally, the analysis includes an analysis of user inputs provided to edit or update data within the target board.

Optionally, the one or more actions include executing an AI agent for autonomously reaching out to users to receive missing information necessary to perform the one or more actions.

Optionally, the AI agent deduces which user is responsible for at least one of a bottleneck and a mismatch in a workflow and approaches the one or more relevant users for a solution.

Optionally, the system further comprises an interface for chatting about outputs provided by the AI agent and receiving platform context based on which the reasoning for an output was generated.

Optionally, the one or more processors are further configured to analyze user interaction logs to identify patterns of repetitive tasks that can be automated.

Optionally, the one or more processors are further configured to generate and present to the user automated workflow suggestions based on the identified patterns of repetitive tasks.

Optionally, the one or more processors are further configured to detect instances of suboptimal use of platform elements within the target board.

Optionally, the one or more processors are further configured to generate and present to the user recommendations for more efficient use of platform elements.

Optionally, the generative AI model is further trained to identify best practices for board organization and data management across the multiple boards.

Optionally, the one or more processors are further configured to monitor user interactions with the target board in real-time and provide proactive suggestions for improving board utilization.

Optionally, the analysis of logical relations includes identifying dependencies between items and optimizing workflows based on these dependencies.

Optionally, the one or more processors are further configured to generate a natural language explanation of the performed actions and their expected impact on board efficiency.

Optionally, the generative AI model is periodically updated based on new user interactions and feedback to improve its recommendations and automated actions.

Optionally, the one or more processors are further configured to track the effectiveness of performed actions over time and adjust future recommendations based on observed outcomes.

In some embodiments of the disclosed subject matter, a system for AI-driven cross-departmental account health monitoring and notification within a SaaS platform is provided, comprising: one or more processors configured to: maintain a generative artificial intelligence (AI) model trained on organizational structures, departmental interactions, and work management platform data from multiple accounts; access an account and analyze SaaS platform data to determine different departments within the account; analyze work management platform data of each of the different departments to interpret actions in the context of their respective divisions and find a deviation from a regular workflow within a first department from the different departments; use the AI model to identify at least one work pattern or underlying cause for the deviation; select one or more of the other departments best positioned to address the identified issue based on the AI model's analysis; and automatically route a notification detailing at least one of the identified deviation, a potential impact of the deviation, at least one recommended action to handle the deviation to the selected department(s).

Optionally, the one or more processors are further configured to: track the resolution progress of the identified issue; analyze the effectiveness of the selected department in addressing the issue; update the AI model based on the resolution progress and effectiveness analysis to improve future department selection and notification routing.

Optionally, the one or more processors are further configured to: analyze task completion patterns across multiple sprints; identify recurring postponements or delays in task completion; use the AI model to deduce potential staffing issues in specific departments; generate and route notifications to relevant departments with recommendations for addressing the identified staffing issues.

Optionally, the generated notification includes AI-driven recommendations for remedying the identified deviation, tailored to the capabilities and resources of the selected department.

Optionally, the AI model is continuously updated based on the outcomes of previous notifications and remedial actions across multiple accounts, improving its ability to identify deviations, select appropriate departments, and suggest effective solutions.

Optionally, the one or more processors are further configured to: analyze interdepartmental dependencies and workflows; identify potential bottlenecks or inefficiencies in cross-departmental processes; generate recommendations for optimizing interdepartmental collaborations based on the AI model's analysis.

Optionally, the AI model is capable of prioritizing identified deviations based on their potential impact on overall account health and business objectives.

Optionally, the system provides a user interface for authorized personnel to review, modify, and approve AI-generated notifications before they are routed to the selected department(s).

Optionally, the AI model is capable of predicting future deviations based on historical data and current trends, enabling proactive notification and prevention of potential issues.

Optionally, the system is configured to integrate with existing communication channels and work management tools used by the account to seamlessly deliver notifications and track resolution progress.

Optionally, the one or more processors are further configured to: analyze, using a generative AI model, the utilization of resources before and during the identified deviation; determine, based on the analysis, a probable cause of the deviation, wherein the probable cause is categorized as one of: (a) over-utilization of resources, indicating overworked employees, employee churn, or insufficient staffing; (b) under-utilization of resources, indicating ineffective work processes or missing tools; incorporate the determined probable cause into the notification routed to the selected department(s); and generate, using the generative AI model, specific recommendations to address the probable cause of the deviation.

The disclosed subject matter, in some embodiments thereof, relates to systems and methods for integrating generative artificial intelligence (AI) capabilities within Software as a Service (SaaS) platforms. In various embodiments, the disclosed subject matter enables enhanced data interaction, analysis, and product customization in cloud-based software environments.

According to an aspect of some embodiments of the disclosed subject matter, there is provided a computer-implemented method for querying a generative AI model about structured data in a SaaS platform. The method comprises displaying a table structure of data on a display device, displaying a selectable element allowing a user to change a status of a graphical cursor to an AI supported state, identifying an area, for example a plurality of pixels, marked using the graphical cursor in the AI supported state as defining a target attribute, querying a generative AI model with the target attribute, and presenting descriptive information acquired from the generative AI model to the user.

In another aspect, some embodiments of the disclosed subject matter provide a system and a method for querying a generative AI model about information presented by a SaaS platform. The system maintains an AI agent configured to interact with SaaS platform data as a virtual team member. The system identifies portions of displayed data marked by a user, queries the generative AI model to identify platform elements and determine actions to perform, and instructs the AI agent to notify the user of performable actions.

A further aspect of some embodiments of the disclosed subject matter provides a system and a method for color-context aware data analysis in structured data. The method maintains a table structure and a generative AI model, receives user queries and color associations for portions of the table structure, and queries the generative AI model to acquire contextual outputs that differ based on color associations.

Some embodiments of the disclosed subject matter provide a system and a method for generating interactive elements in a messaging session with an AI agent. The method displays tabular data, identifies queries about the data, prompts a generative AI model to generate responses, and creates interactive elements in the messaging interface that share graphical characteristics with the tabular data.

Another aspect of some embodiments of the disclosed subject matter provides a system and a method for cross-application AI agent interaction in a SaaS platform. The method identifies user mentions of an AI agent in one platform element, determines instructions spanning multiple platform elements, and executes actions across different elements or applications based on a single user interaction.

The disclosed subject matter further provides systems and methods for using generative AI to create custom SaaS platform products by combining functionalities from existing products based on user requirements. This enables rapid development of tailored solutions without extensive manual development.

These and other aspects of the disclosed subject matter provide significant advancements in integrating AI capabilities within SaaS platforms, enhancing data analysis, customization, and cross-application functionality in cloud-based software environments.

In some embodiments of the disclosed subject matter, a computer-implemented method for querying a generative AI model about structured data is provided, comprising: displaying at least one table structure of data on a display device; displaying a selectable element allowing a user to change a status of a graphical cursor presented on a display for instance to show the user a position in a graphical user interface from a general state to an AI supported state; when the status of the graphical cursor is the AI supported state, identifying an area, for example a plurality of pixels, marked using the graphical cursor on the display device in a region of the at least one table structure as a marked area, the marked area defines at least one target attribute for the region; querying the generative AI model with the target attribute to acquire descriptive information about the target attribute; and presenting descriptive information to the user. The curser may also be understood as a user selection indicator, for instance in response to a user touching a touch screen.

Optionally, the selectable element is a graphical button or a virtual toggle switch displayed in a graphical user interface.

Optionally, the status of the state of the graphical cursor to the AI-assisted state replaces standard mouse functionality with AI-dedicated functionality.

Optionally, the AI-dedicated functionality triggers a presentation of an input user interface adapted to receive from the user query specific portions of the target attribute.

Optionally, when the graphical cursor is in the AI-assisted state: a) a mouse-click operation triggers an AI query based on visual and contextual information from the marked area; b) a different mouse-click operation generates automatic suggestions for the clicked portion of the display.

Optionally, the method further comprises: a) determining a context of the target attribute within the data presentation; b) including the determined context in the query to the generative AI model.

Optionally, the descriptive information includes recommendations based on the determined context of the target attribute.

Optionally, the at least one table structure includes project management data, and the target attribute corresponds to a project element.

Optionally, the method further comprises: a) storing a history of queries and corresponding descriptive information; b) using the stored history to improve subsequent queries to the generative AI model.

In some embodiments of the disclosed subject matter, a computer-implemented method for querying a generative AI model about information presented by a Software as a Service (SaaS) platform is provided, comprising: maintaining an artificial intelligence (AI) agent configured to interact with SaaS platform data of a project as a member of a team assigned to the project; displaying on a screen SaaS platform data comprising at least one table structure with a plurality of interactive cells; identifying a portion of the screen marked by the user using a graphical user interface (GUI) controlling device; querying the generative AI model with the identified portion of the screen to: i) identify one or more platform elements included in the identified portion; ii) determine relationships between the identified platform elements; iii) determine at least one action to perform on the identified platform elements based on the determined at least one action; instructing the generative AI agent to notify the user of performable actions that suit the determined relationships and the identified platform elements.

Optionally, identifying the portion of the screen further comprises: a) determining a number of UI elements selected within the marked area; b) associating the selected UI elements into one or more subgroups based on their characteristics.

Optionally, associating the selected UI elements into subgroups comprises: identifying similar UI elements, such as headlines or columns, and grouping them together regardless of the total number of individual elements selected.

Optionally, the method further comprises: analyzing a context within which the identified portion is found in the table structure and performing the querying accordingly.

Optionally, the at least one action to perform includes providing context-based recommendations.

Optionally, the method further comprises: updating the table structure to reflect changes made by the generative AI agent after performing the at least one action.

Optionally, identifying the platform elements is based on both the marked portion and the context of the surrounding data in the table structure.

Optionally, the method further comprises: presenting a preview of the at least one action to the user before instructing the generative AI agent to perform the action.

Optionally, the generative AI model is trained on historical project data to improve its ability to identify relevant platform elements and actions.

Optionally, a) when the identified portion includes two columns, the generative AI agent provides automation that includes both columns; b) when the identified portion includes an icon for an action, the generative AI agent checks whether this action is relevant or recommended for the displayed table; c) when the identified portion includes a plurality of unconnected platform elements, a notification for clarification of intent is sent to the user; d) when the identified portion includes a majority of connected platform elements, the generative AI agent determines that output will be provided for those elements.

Optionally, the SaaS platform data is stored as a plurality of items representing the data in tables.

In some embodiments of the disclosed subject matter, a computer-implemented method for querying a generative artificial intelligence (AI) model about color context in structured data is provided, comprising: maintaining and displaying a at least one table structure; maintaining a generative AI model adapted to be prompted with at least a portion of the at least one table structure; receiving a first user query for a selected portion of the at least one table structure; querying the generative AI model with the selected portion to acquire a first contextual output; receiving a user input associating at least one component of the selected portion with a color; querying the generative AI model with the color-associated selected portion to acquire a second contextual output; wherein the difference between the first and second outputs is associated with the color associated with the at least one component of the at least one table structure.

Optionally, the method further comprises: identifying an area, such as a plurality of pixels, marked by the user in a region of the at least one table structure, defining color attributes for the region; querying the generative AI model with the selected portion and the color attributes to acquire additional contextual information; calculating instructions to color another region of the at least one table structure based on the acquired contextual information; executing the calculated instructions.

Optionally, the generative AI model is configured to interpret the same alphanumeric value differently based on its associated color properties within the at least one table structure.

Optionally, the color association provides additional context for the generative AI model's interpretation, such as red indicating urgency or green indicating approval.

Optionally, the method further comprises: analyzing relationships between color-associated components and non-color-associated components within the selected portion to derive additional context.

Optionally, the generative AI model is trained to recognize common color-coding conventions used in various industries or project management methodologies.

Optionally, the method further comprises: generating recommendations for color usage based on the generative AI model's interpretation of existing color context within the at least one table structure.

Optionally, the at least one table structure is part of a Software as a Service (SaaS) platform interface.

Optionally, the method further comprises: maintaining a history of color-context interpretations to improve the generative AI model's future analysis of similar color-coded data.

Optionally, the generative AI agent can suggest color coding for unmarked portions of the at least one table structure based on its interpretation of existing color-coded sections.

In some embodiments of the disclosed subject matter, a computer-implemented method for generating interactive elements in a messaging session is provided, comprising: displaying data in a tabular structure comprising a plurality of interactive cells, each having graphical characteristics; b) maintaining a messaging session with a generative AI agent in a messaging GUI element; identifying a query about the tabular structure in the messaging session; prompting a generative artificial intelligence (AI) model with the query to acquire a response pointing to a subgroup of the plurality of interactive cells; generating an interactive element within the messaging GUI element that is adapted to enable a user to change at least one value of at least one of the plurality of interactive cells of at least one member of the subgroup; wherein the interactive element and the corresponding at least one member of the subgroup share common graphical characteristics; adding the interactive element as at least part of a message response in the messaging session.

Optionally, the common graphical characteristics include color, font, size, or style of the interactive cells.

Optionally, the method further comprises: updating the tabular structure in real-time when the user changes a value using the interactive element in the messaging session.

Optionally, the generative AI model is trained to recognize and replicate the graphical characteristics of the tabular structure in its generated interactive elements.

Optionally, the method further comprises: providing context-aware suggestions or validations when the user interacts with the generated interactive element.

Optionally, the messaging GUI element is part of a Software as a Service (SaaS) platform interface.

Optionally, the method further comprises: maintaining a history of interactions with the generated interactive elements to improve the generative AI model's future responses and suggestions.

Optionally, the generative AI agent can generate multiple interactive elements for different subgroups of the tabular structure within a single message response.

Optionally, the method further comprises: allowing the user to expand or collapse the interactive element to view or hide additional details or related data from the tabular structure.

Optionally, the generative AI model interprets color-based context in the tabular structure and reflects this interpretation in the generated interactive elements.

In some embodiments of the disclosed subject matter, a computer-implemented method for operating a software as a service (SaaS) platform is provided, comprising: maintaining a messaging session with a generative AI agent; identifying a section of text message issued by a user that textually refers to an alphanumeric identifier of the generative AI agent in a first platform element; using text and platform elements in the first platform element to identify one or more user instructions in the messaging session; identifying references to one or more platform elements other than the first platform element that are associated with the instructions; prompting a generative artificial intelligence (AI) model associated with the generative AI agent to generate SaaS platform instructions for changing one or more values in the one or more platform elements in accordance with the user instructions; executing the SaaS platform instructions for changing the one or more values; and notifying the user of the execution.

Optionally, the first platform element and the other platform elements are different applications within the SaaS platform.

Optionally, the first platform element and the other platform elements are different platform elements within the same application of the SaaS platform.

Optionally, notifying the user comprises sending a notification in either the first platform element or one of the other platform elements.

Optionally, the method further comprises: providing a visualization of the other platform elements to the user following the execution of the SaaS platform instructions.

Optionally, the alphanumeric identifier of the generative AI agent is a mention symbol followed by the generative AI agent's name.

Optionally, the method further comprises: providing the generative AI agent with credentials to access the messaging session upon identification of the alphanumeric identifier, where the generative AI agent did not have access to the messaging session before.

Optionally, notifying the user comprises adding a message in the messaging session indicative of the performance of changing the one or more values.

Optionally, the generative AI model is trained to interpret context across different platform elements or applications within the SaaS environment.

Optionally, the method further comprises: maintaining a history of cross-platform actions triggered by generative AI agent mentions to improve the generative AI model's future interpretations and actions.

Optionally, the generative AI agent is capable of performing actions across multiple platform elements or applications based on a single mention and instruction set in the messaging session.

In some embodiments of the disclosed subject matter, a system for using generative artificial intelligence for intent-based interaction with a SaaS platform is provided, comprising: one or more processors configured to: maintain a plurality of task tables, wherein each task table contains a plurality of items, each item being defined by a row of cells, at least two of the cells associated with a workflow step; maintain a generative artificial intelligence (AI) model trained based on analysis of interactions with alphanumeric data stored in the plurality of task tables; receive user selection indicative of a desired platform element to be added to the SaaS platform; use the generative AI model to calculate instructions for adding the platform element; identify at least one workflow step that can be implemented by two or more platform elements; use the generative AI model to calculate which of the two or more platform elements would be most suitable for the workflow in the SaaS platform context; perform the instructions to implement the platform element.

Optionally, the one or more processors are further configured to: a) receive a natural language request to build a platform element; b) analyze the request using the generative AI model to deduce the main requirement of the platform element in the context of the request.

Optionally, the one or more processors are further configured to: use the generative AI model to deduce required functionalities and data to be displayed to satisfy the main requirement.

Optionally, the one or more processors are further configured to: determine, using the generative AI model, which platform elements are most suitable to satisfy the deduced requirements and functionalities.

Optionally, the one or more processors are further configured to: automatically build the platform element by combining the determined suitable platform elements based on the deduced requirements and functionalities.

Optionally, the platform element comprises at least one of a board, a dashboard, or a workflow.

Optionally, the generative AI model is further trained on user feedback and usage patterns of previously created platform elements.

Optionally, the instructions for adding the platform element include arranging visual components, configuring data sources, and setting up interactive features.

Optionally, the one or more processors are further configured to: a) present a preview of the platform element to the user before performing the instructions; b) receive user feedback on the preview; c) adjust the instructions based on the user feedback.

Optionally, the one or more processors are further configured to: continuously update the generative AI model based on user interactions with the created platform elements to improve future recommendations and builds.

Optionally, the one or more processors are further configured to: analyze the context of the SaaS platform, including existing platform elements and user roles, to optimize the generated platform element for seamless integration.

Optionally, the generative AI model is capable of suggesting improvements or modifications to existing platform elements based on usage patterns and performance metrics.

In some embodiments of the disclosed subject matter, a system for using generative artificial intelligence for creating SaaS platform products is provided, comprising: one or more processors configured to: maintain a plurality of products of a SaaS platform, each of the plurality of products having a plurality of shared functionalities and one or more product-specific functionalities; receive an input comprising specification of user requirements for a new SaaS platform product; prompt a generative model, trained with data documenting the plurality of the products, with the specification to identify required product-specific functionalities to be included together with the shared functionalities in the new SaaS platform product from two or more of the plurality of the products; calculate instructions to assign the required functionalities to the new SaaS platform product, wherein the required functionalities are originated from at least two different products from the plurality of products; and execute the instructions.

Optionally, the one or more processors are further configured to: identify two or more overlapping functionalities from the required functionalities; and determine, using the generative model, which of the overlapping functionalities should be included in the new SaaS platform product.

Optionally, the one or more processors are further configured to: analyze the specification of the new product to identify key functionalities required.

Optionally, the generative model is trained to recognize unique functionalities across different products within the SaaS platform.

Optionally, the required functionalities are selected to fulfill together the requirements of the new product.

Optionally, the one or more processors are further configured to: customize the required functionalities to fit the specific needs of the new product before assigning them to the new product.

Optionally, the one or more processors are further configured to: calculate a licensing cost for the new product based on the number and type of product specific functionalities included for the new SaaS platform product.

Optionally, the one or more processors are further configured to: generate a user interface for the new product that integrates the functionalities of the required functionalities seamlessly.

Optionally, the instructions to assign the required functionalities include steps to adapt the data structures of the required functionalities to work cohesively in the new product environment.

Optionally, the one or more processors are further configured to: provide recommendations for additional complementary functionalities that could enhance the functionality of the new product.

Optionally, the generative model is periodically updated with data from newly created products to improve its selection capabilities.

Optionally, the one or more processors are further configured to: generate documentation for the new product, explaining how the functionalities from different required functionalities have been combined and how to use them effectively.

Optionally, the one or more processors are further configured to: perform compatibility checks between selected functionalities and suggest alternatives or modifications when conflicts are detected.

Optionally, the new SaaS platform product is dynamically adjustable, allowing users to add or remove functionalities post-creation based on evolving needs.

In some embodiments of the disclosed subject matter, a system for using generative artificial intelligence for creating SaaS platform products is provided, comprising: one or more processors configured to: maintain a plurality of products of a SaaS platform, each of the plurality of products having a plurality of product-specific functionalities; receive a specification of user requirements for a new SaaS platform product; prompt a generative model trained with data documenting the plurality of products with the specification to identify required functionalities to be included in the new SaaS platform product from two or more of the plurality of products; calculate instructions to assign the required functionalities to the new SaaS platform product, wherein the required functionalities are originated from at least two different products from the plurality of products; and execute the instructions.

Optionally, one or more of the required functionalities are created for the respective product by one or more users assigned to the respective product.

Optionally, the one or more processors are further configured to: analyze the specification of the new product to identify key functionalities required.

Optionally, the generative model is trained to recognize unique functionalities across different products within the project management platform.

Optionally, the required functionalities are selected to fulfill together the requirements of the new product.

Optionally, the one or more processors are further configured to: customize the required functionalities to fit the specific needs of the new product before assigning them to the new product.

Optionally, the one or more processors are further configured to: calculate a licensing cost for the new product based on the number and type of functionalities included from the required functionalities.

Optionally, the one or more processors are further configured to: generate a user interface for the new product that integrates the functionalities of the required functionalities seamlessly.

Optionally, the instructions to assign the required functionalities include steps to adapt the data structures of the required functionalities to work cohesively in the new product environment.

Optionally, the one or more processors are further configured to: provide recommendations for additional complementary functionalities that could enhance the functionality of the new product.

Optionally, the generative model is periodically updated with data from newly created products to improve its selection capabilities.

Optionally, the one or more processors are further configured to: generate documentation for the new product, explaining how the functionalities from different required functionalities have been combined and how to use them effectively.

Optionally, the new SaaS platform product is built on a WorkOS base, and the one or more processors are further configured to: select the most fitting components for each element of the product's data structure based on the user requirements and compatibility with the selected functionalities.

Optionally, the one or more processors are further configured to: create specialized features for specific industries by combining functionalities from different products, such as combining work management functionalities with email tracking functionalities to create a docketing feature for law firms.

It is also an object of the present disclosure to describe systems and methods for comprehensive artificial intelligence agent integration, personalized user interaction, modular skill management, compliance-guided operation, unified multi-agent coordination, and centralized marketplace management within software platforms.

The foregoing and other objects are achieved by the features of the independent claims. Further implementation forms are apparent from the dependent claims, the description and the figures.

The disclosed subject matter, in some embodiments thereof, relates to systems and methods for implementing comprehensive artificial intelligence (AI) agent ecosystems in software applications and, more particularly, but not exclusively, to systems and methods for integrating personalized, modular, compliant, and coordinated generative artificial intelligence capabilities within Software as a Service (SaaS) platforms.

In one aspect, embodiments of the disclosed subject matter provide a method and system for personalized artificial intelligence agent responses based on user profiles. The system comprises a storage subsystem maintaining a user registry that maps user identifiers to user profiles, where each profile defines credentials for accessing applications, knowledge base access permissions, and historical interaction patterns. The system instantiates AI agents that receive user inputs, perform access actions using stored credentials and permissions to acquire task-specific data, and generate personalized responses based on acquired data and historical patterns.

Optionally, the AI agent maintains continuous memory state and operational context across multiple application sessions.

Optionally, the AI agent processes and optimizes task-specific data to reduce computational token consumption while maintaining response accuracy.

Optionally, the system includes cross-application conversation continuity functionality that automatically presents conversation history from a first application within a second application interface when users transition between applications.

Optionally, the system includes conflict resolution logic that determines precedence when user-configured agent settings conflict with organizational policies.

Optionally, the AI agent supports distributed deployment across computing environments including local execution, network-based execution, cloud platforms, and edge devices while maintaining consistent behavior.

Optionally, the system includes a historical analysis module configured to maintain behavioral profiles capturing interaction patterns, agent intervention levels, and communication preferences.

Optionally, the system includes a visual configuration interface with interactive graphical elements for assembling AI agent configurations from modular components.

Optionally, the system includes natural language-based personalization functionality with conversational interfaces for customizing agent behavior.

Optionally, the system includes dynamic knowledge base combination functionality that combines modular knowledge bases to provide unified information access.

In another aspect, embodiments of the disclosed subject matter provide a method and system for modular AI agent operation using skills and resources. The method involves maintaining a skill registry containing available skills configured to be utilized by AI agents, each comprising distinct executable capabilities, and a resource registry maintaining knowledge resources accessible to AI agents within an account. The system instantiates AI agents that identify relevant skills and accessible knowledge resources based on credentials, select needed skills for requested tasks, and execute operations using selected skills and resources.

Optionally, each skill in the skill registry has defined parameters and operational scope, and each knowledge resource comprises a distinct information repository with defined access parameters.

Optionally, the system includes a credential management subsystem configured to provision authentication credentials and manage provided credentials for AI agents to access respective skills and knowledge resources.

Optionally, the system includes an agent profile registry maintaining AI agent profiles that define which skills and knowledge resources are associated with each AI agent.

Optionally, the user interface enables users to select and associate available skills and knowledge resources with AI agents for creating new agent profiles.

Optionally, the system implements access control mechanisms that restrict operations to verified capabilities and authorized knowledge resources through permission validation protocols.

Optionally, the system includes profile sharing functionality that enables copying and sharing of capability permissions and resource access rights between different AI agents.

Optionally, capability management operates through dynamic assessment without requiring persistent agent identity storage across sessions.

Optionally, selected skills execute in isolated execution environments separate from core agent logic to prevent unauthorized access to agent configuration data. Optionally, the system includes a unified interface that enables AI agents to coordinate capability usage with resource access without requiring user specification of data sources.

In a further aspect, embodiments of the disclosed subject matter provide a method and system for metadata-guided AI agent operation with compliance monitoring. The system maintains a database containing agent operational guidelines associated with user accounts, where each guideline defines compliance rules for AI agent operations. The system instantiates AI agents that evaluate input requests against compliance rules, prevent execution when violations are detected, and when no violations exist, generate responses while evaluating and modifying them to eliminate any compliance rule violations before delivery.

Optionally, each agent operational guideline comprises structured metadata defining permitted actions, operational parameters, and behavioral constraints governing agent decision-making processes.

Optionally, the structured metadata is stored in hierarchical format with scope boundaries, temporal restrictions, user role-based limitations, execution context requirements, and escalation procedures.

Optionally, agent operational guidelines are integrated into AI agent context windows for real-time compliance evaluation, and AI agents suggest alternative actions when compliance violations are detected.

Optionally, alternative actions are generated by analyzing user intent and mapping intent to permitted actions that achieve equivalent functional outcomes within compliance rules.

Optionally, AI agents process third-party data sources by selectively incorporating compliant data portions while excluding violating data portions.

Optionally, selective incorporation comprises parsing third-party data to identify compliant segments and omitting violating segments without indicating data has been filtered.

Optionally, the system includes escalation procedures for handling actions that exceed defined permissions and audit and logging requirements for tracking AI agent compliance.

Optionally, AI agents process natural language input through interpretation algorithms comprising semantic analysis, capability matching, and permission validation before executing actions.

Optionally, the system includes cross-context action replication functionality and isolated memory management for confidential information storage.

Additionally, embodiments of the disclosed subject matter include a method and system for orchestrated multi-agent communication with integrated coordination within a collaborative platform. The method involves instantiating communication environment instances as shared communication layers, acquiring agent profiles of available AI agents, providing cross-agent memory synchronization for collaborative task completion, and implementing orchestration layers that maintain agent profiles and coordinate task distribution based on communication input analysis.

Optionally, the orchestration layer implements structured processing protocols comprising capturing communication inputs with metadata, routing inputs to AI agents through semantic analysis, and coordinating agent-generated responses through output management protocols.

Optionally, the system includes response-halting mechanisms that pause pending agent responses upon receiving higher-priority contextually relevant inputs for re-evaluation.

Optionally, AI agent instances appear with distinctive graphical characteristics including unique avatar representations, color coding, and visual ownership indicators.

Optionally, the cross-agent memory synchronization subsystem ensures all participating AI agents share consistent context enabling collaborative task completion without redundant queries.

Optionally, the orchestration layer implements cross-thread task synthesis enabling AI agents to monitor multiple concurrent conversation threads and extract tasks across thread boundaries.

Optionally, the system includes multilingual communication support with automatic language detection and real-time translation with user-configurable preferences.

Optionally, the system includes a credential management system that stores authentication data and enables each AI agent to access multiple different software applications.

Optionally, the system includes user access control mechanisms that require user approval before AI agents access new application contexts or data sources.

Optionally, the orchestration layer implements intelligent agent participation management that regulates AI agent involvement through automated assessment algorithms.

Furthermore, embodiments of the disclosed subject matter provide a method and system for centralized management and control of AI agents within a SaaS platform. The system monitors AI agents deployed across platform portions, presents management interfaces displaying agent information, and provides control functionality for performing actions on monitored agents.

Optionally, the system tracks data associated with AI agents including computational tokens consumed by each agent over specified time periods and expected token usage based on workload and historical patterns.

Optionally, the management interface displays agent utilization metrics and resource consumption data, real-time agent status and activity summaries, and token usage analytics with cost projections and optimization recommendations.

Optionally, the control functionality enables activation and deactivation of specific agents, modification of agent operational parameters and permissions, and resource allocation adjustments and usage limit configurations.

Optionally, agent utilization metrics comprise task completion rates, response time measurements, error frequency indicators, and user satisfaction scores.

Optionally, the system includes agent marketplace display functionality with visual representations showing agent capabilities and specialization areas.

Optionally, performance analytics including task completion rates and user satisfaction scores are integrated into visual representations of AI agents.

Optionally, the control functionality comprises skill deployment management enabling simultaneous deployment of skills to multiple compatible agent instances.

Optionally, the system includes version control management functionality that stores skill version history for each AI agent and enables selective rollback of skills to previous versions.

Optionally, the control functionality comprises deployment isolation management that monitors skill deployments in secure sandbox environments for each agent instance.

Optionally, the system includes architecture-agnostic credential management that provides centralized credential management accessible by AI agents regardless of deployment architecture.

These aspects of the disclosed subject matter, individually and in combination, represent significant advancements in the comprehensive integration of AI agent capabilities within software environments. They address critical challenges in personalization, modularity, compliance, coordination, and management while maintaining essential controls for security, efficiency, and scalability. The disclosed subject matter has the potential to transform how businesses deploy and manage AI agents, leading to enhanced personalization, improved compliance adherence, seamless multi-agent collaboration, and efficient resource utilization across various industries and use cases.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the disclosed subject matter can involve performing or completing selected tasks manually, automatically, or a combination thereof. Moreover, according to actual instrumentation and equipment of embodiments of the method and/or system of the disclosed subject matter, several selected tasks could be implemented by hardware, by software or by firmware or by a combination thereof using an operating system.

For example, hardware for performing selected tasks according to embodiments of the disclosed subject matter could be implemented as a chip or a circuit. As software, selected tasks according to embodiments of the disclosed subject matter could be implemented as a plurality of software instructions being executed by a computer using any suitable operating system. In an exemplary embodiment of the disclosed subject matter, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

Figure 26A:
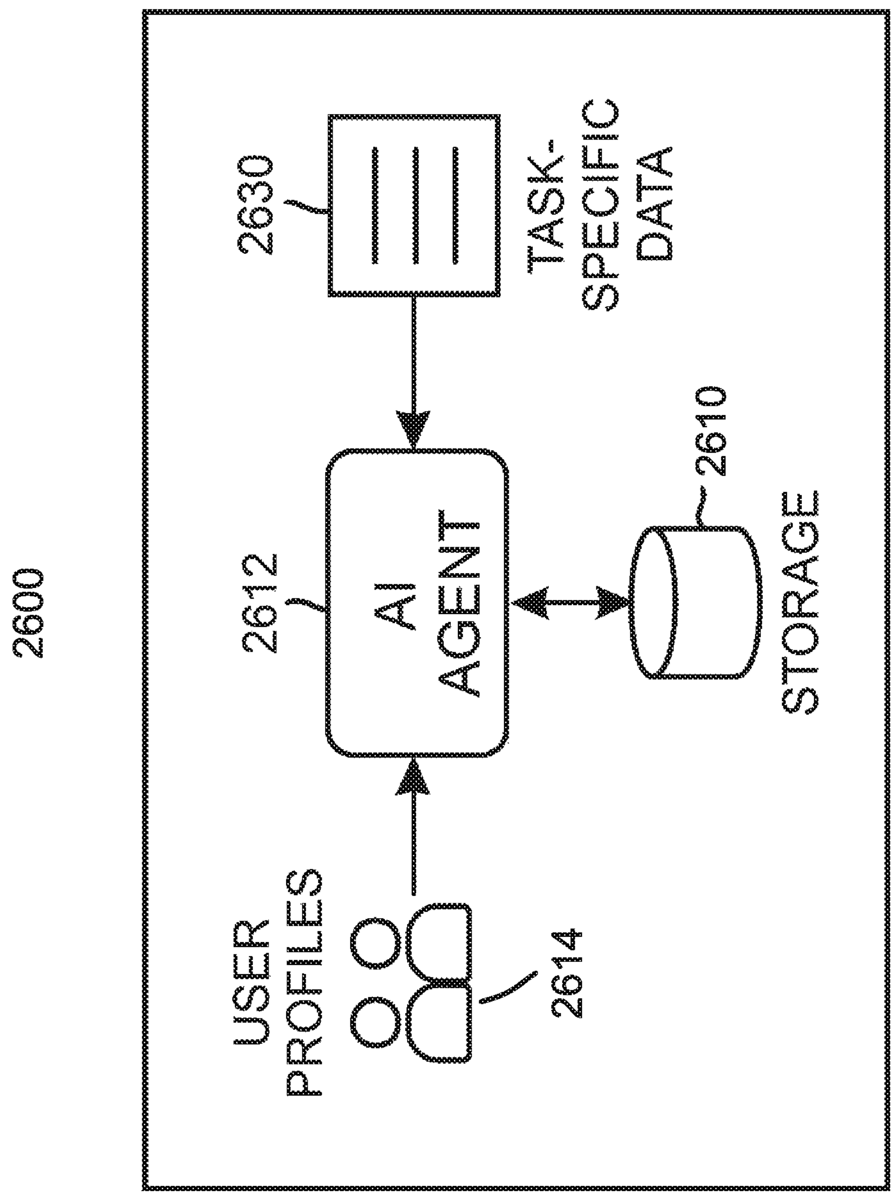
FIG. 26A is a block diagram illustrating an embodiment of a personalized artificial intelligence agent system configured to deliver adaptive, context-aware interactions, consistent with some embodiments of the present disclosure.
Figure 26B:
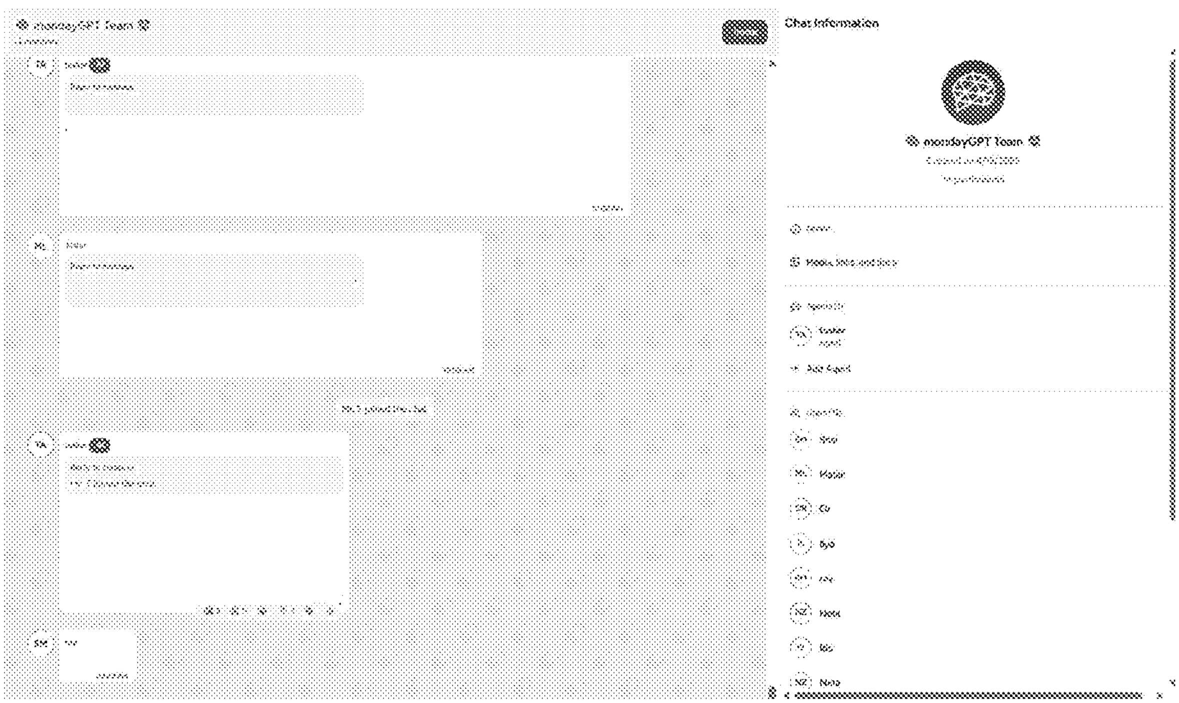
Figure 26C:
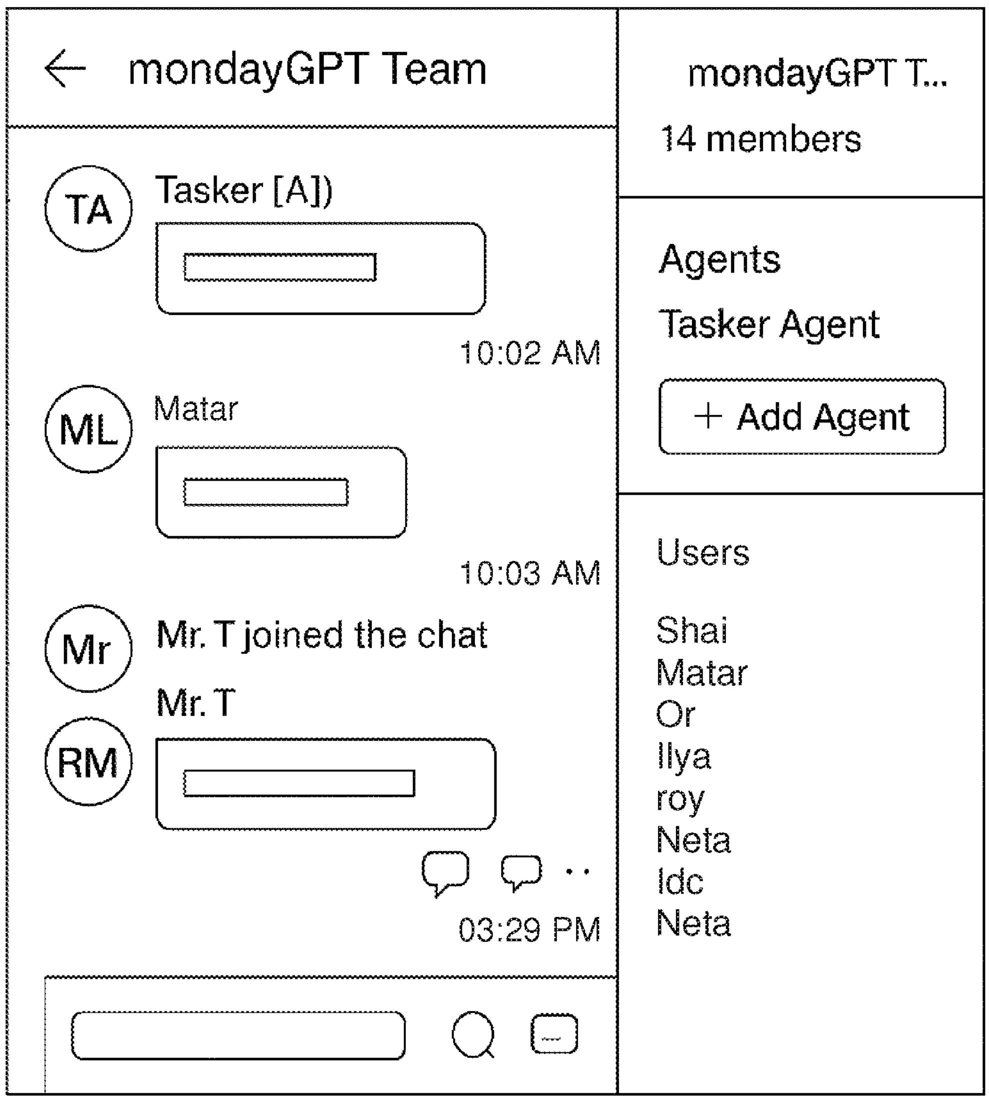
Figure 26D:
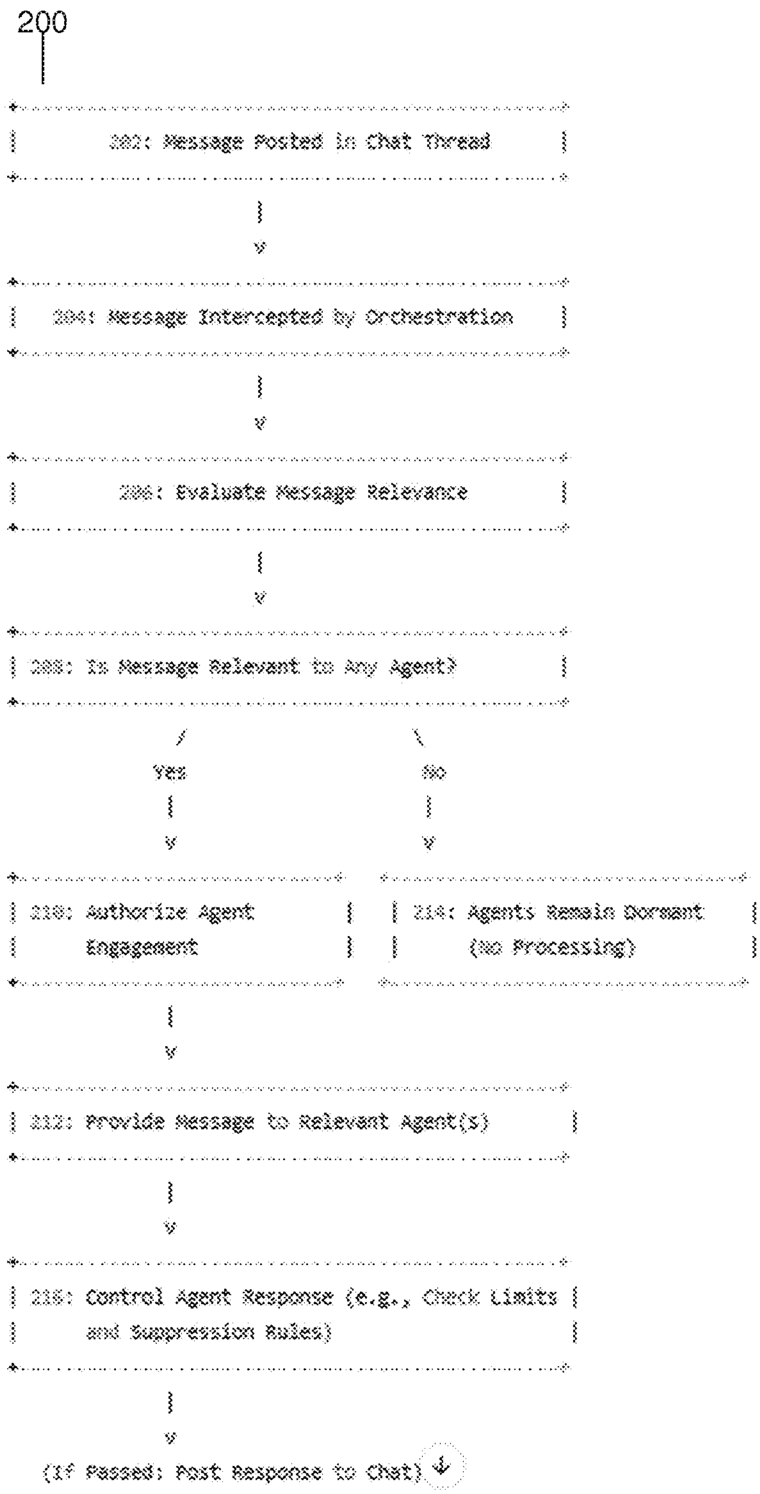
Figure 26E:
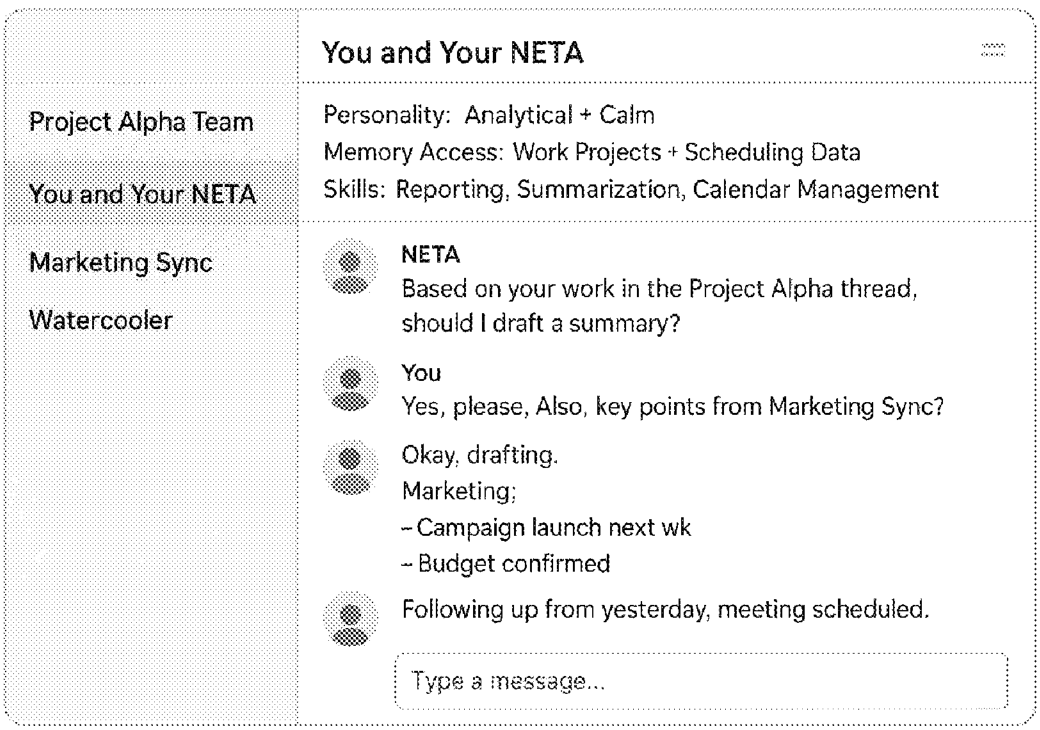
Figure 26F:
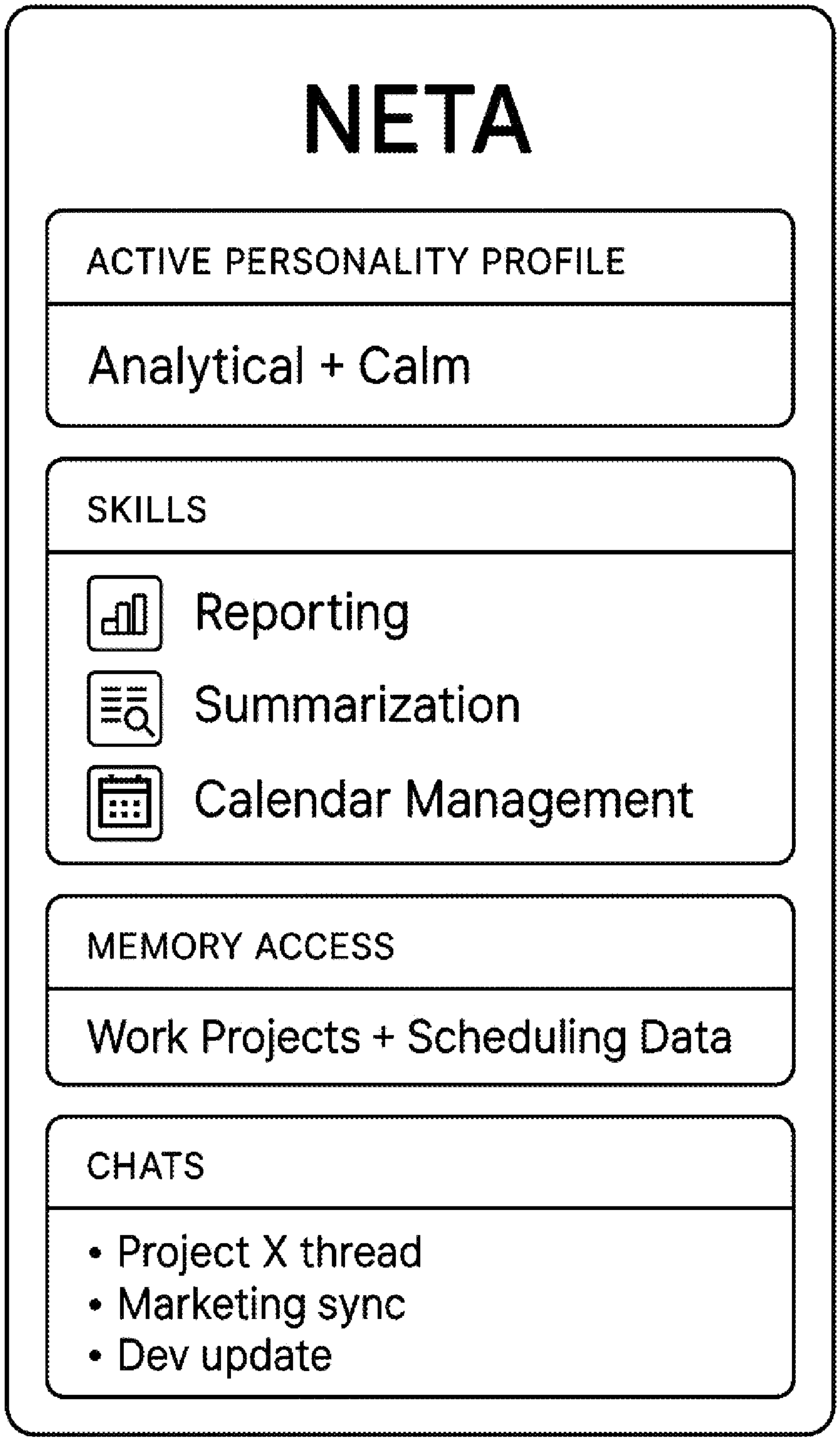
Figure 26G:
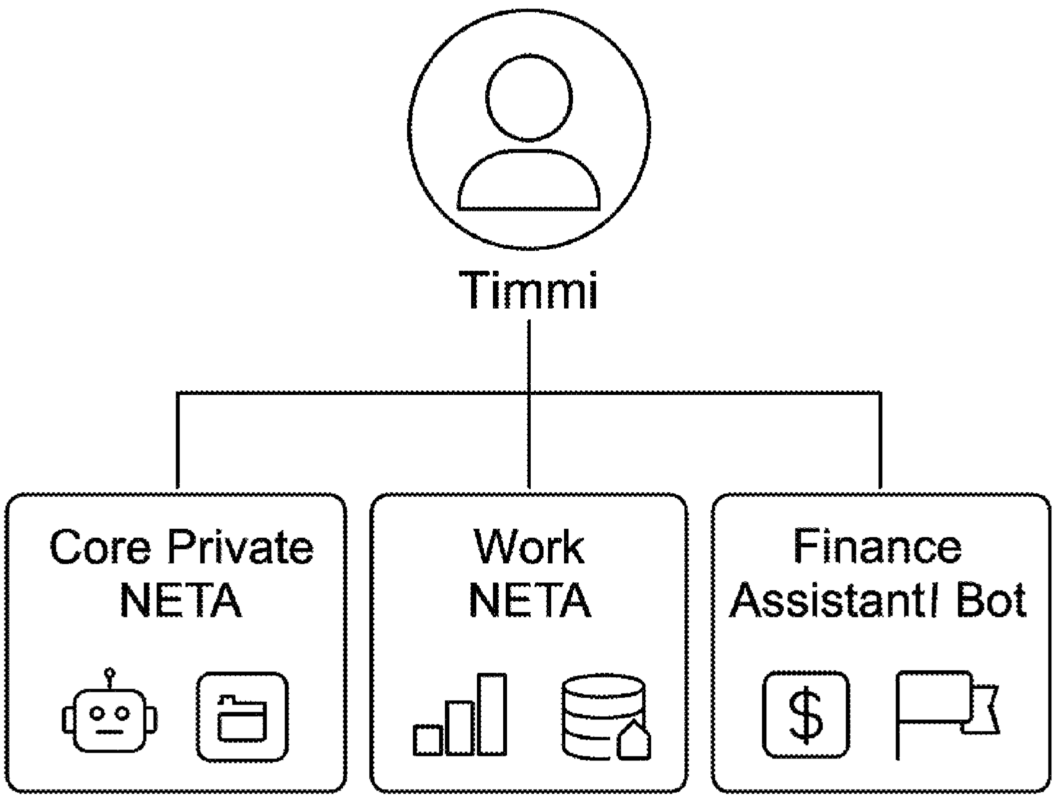
Figure 26H:
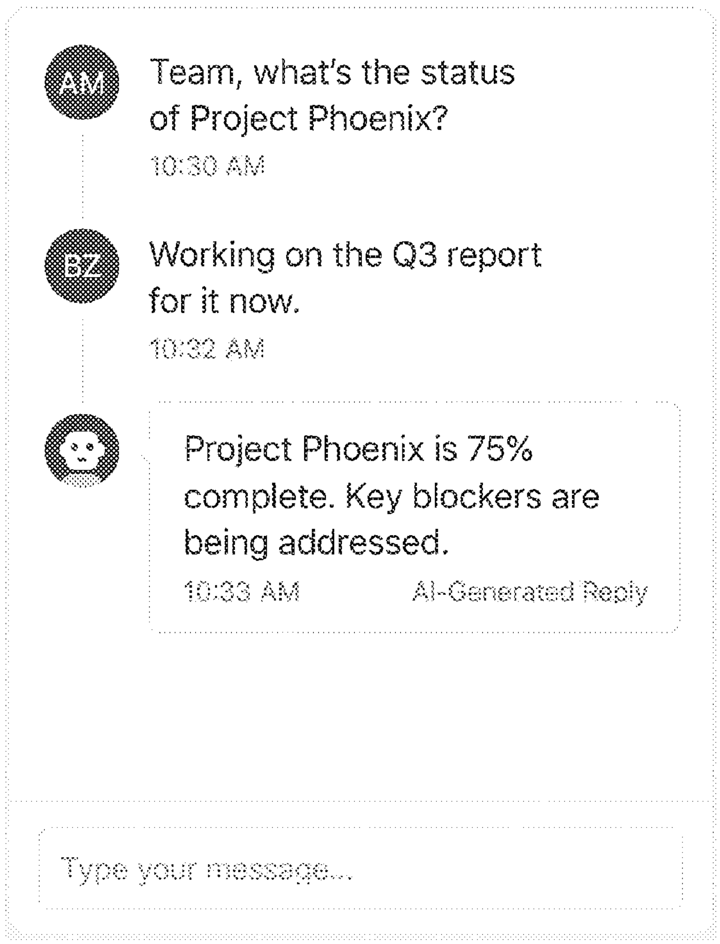
Figure 26I:
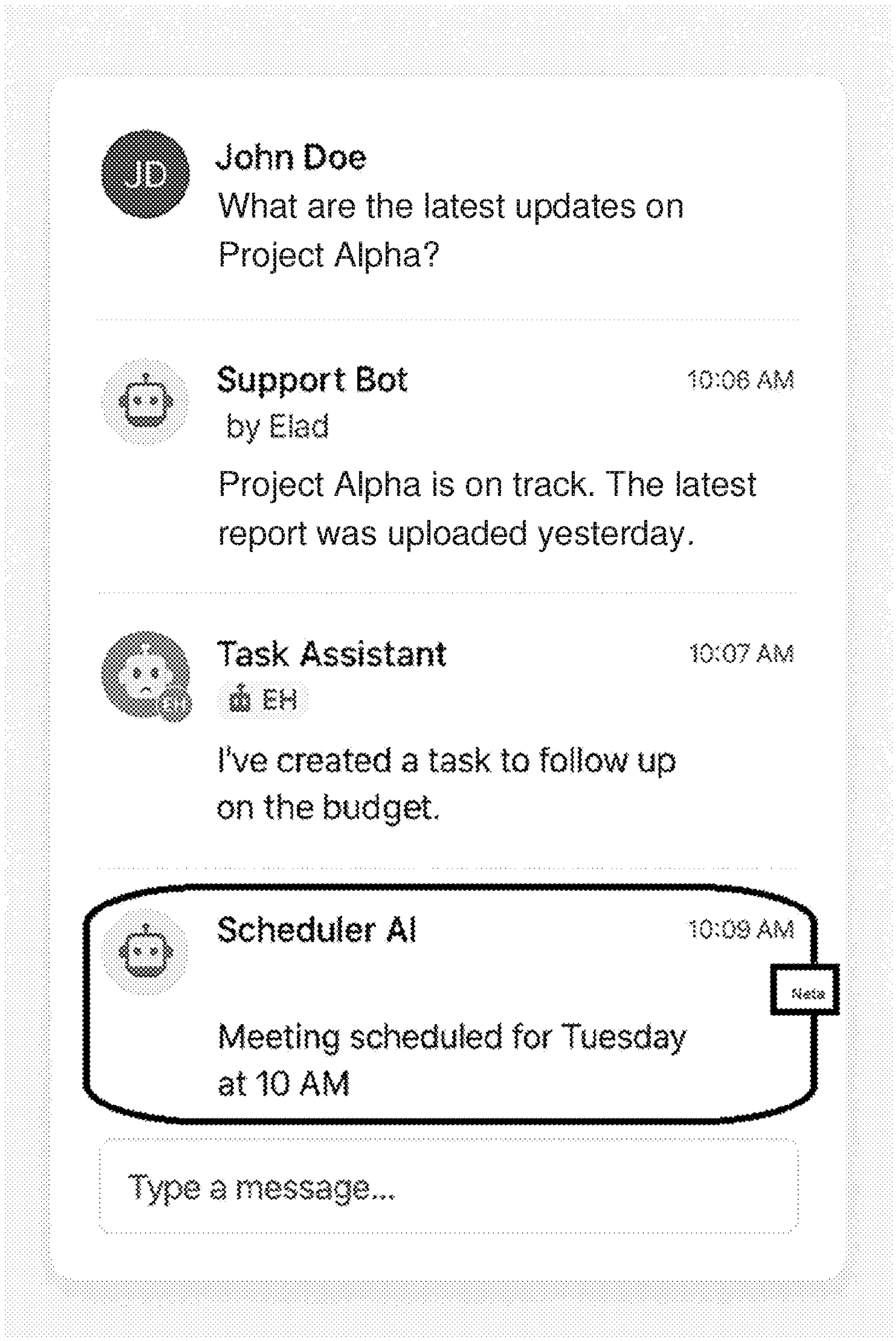
Figure 26J:
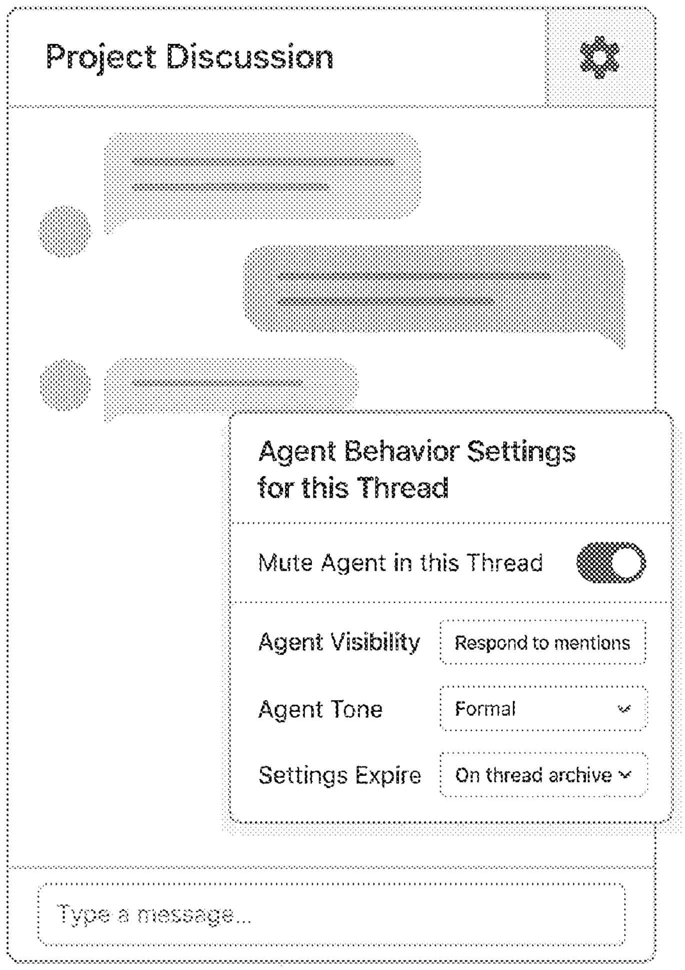
Figure 26K:
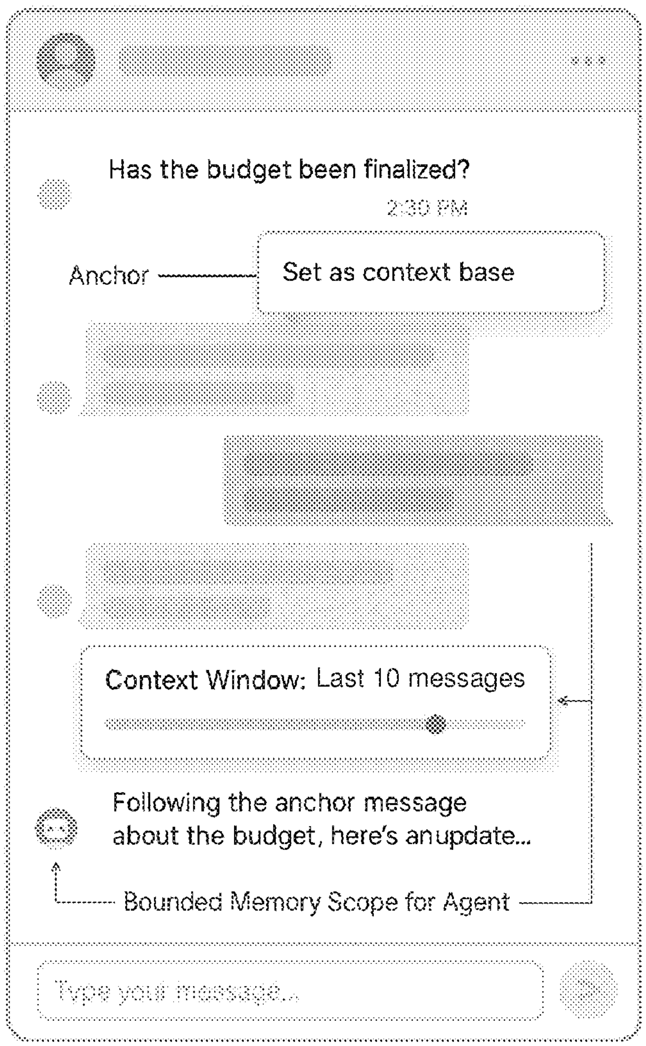
Figure 26L:
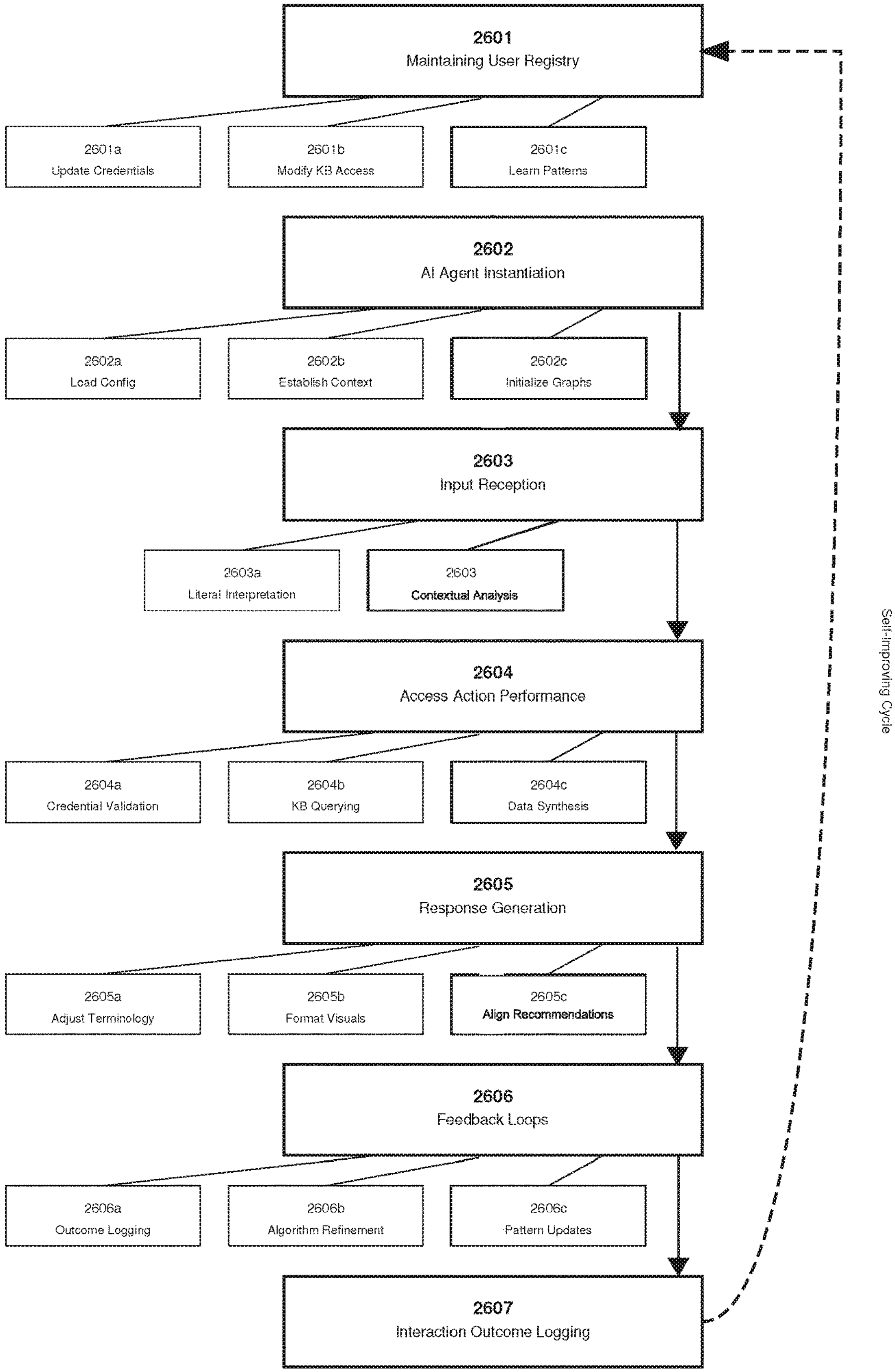
Figure 27A:
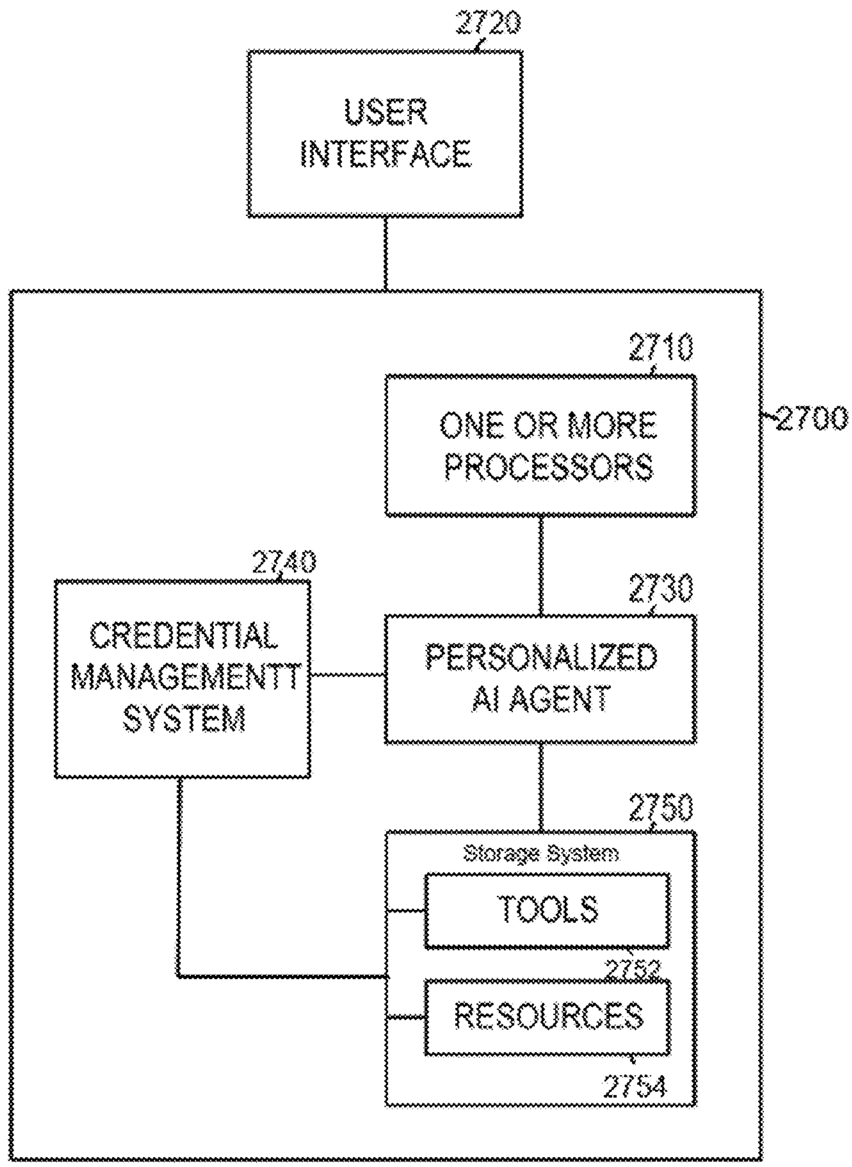
Figure 27B:
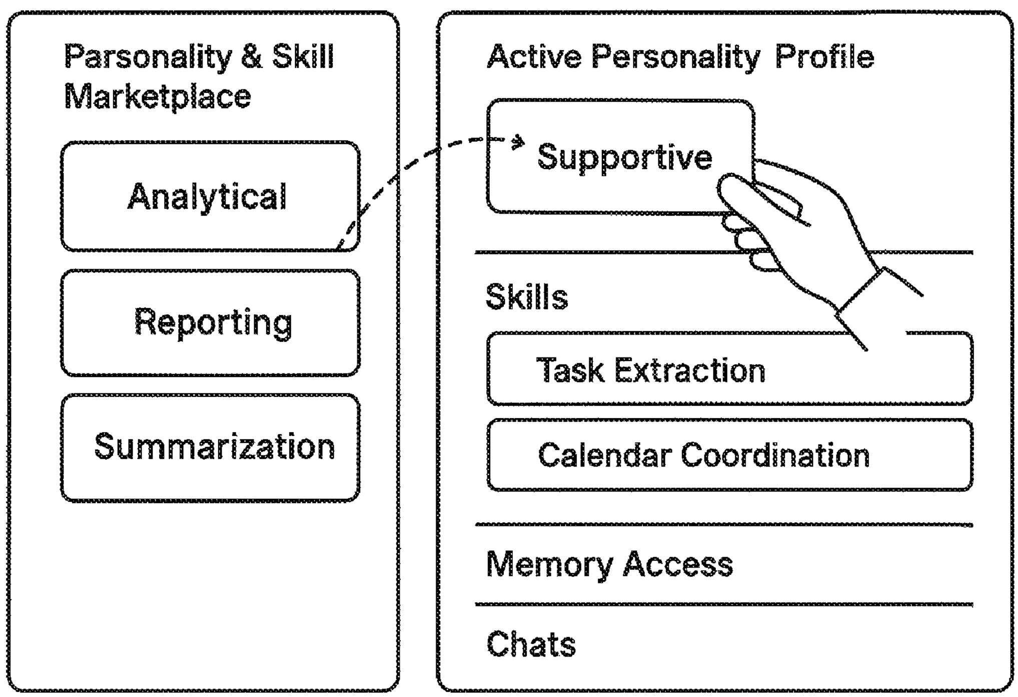
Figure 27C:
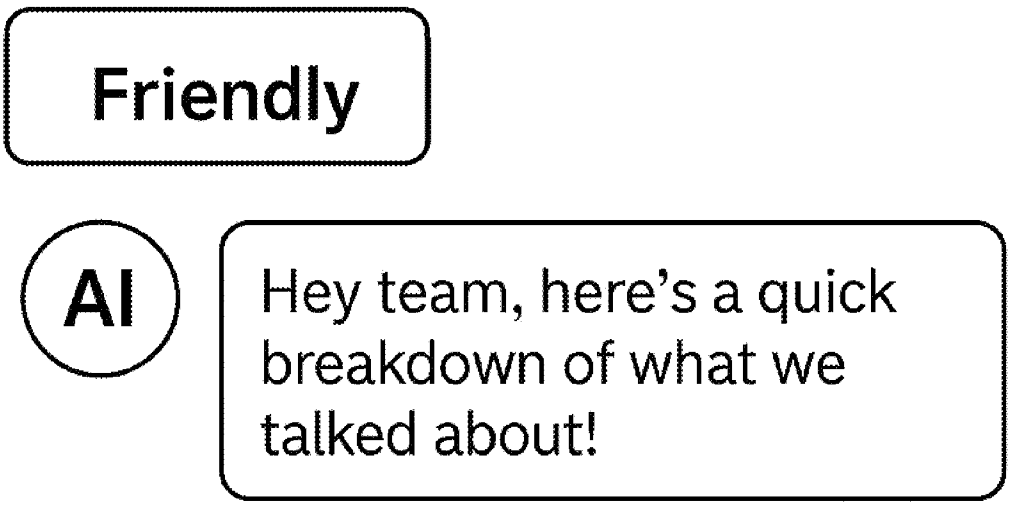
Figure 27D:
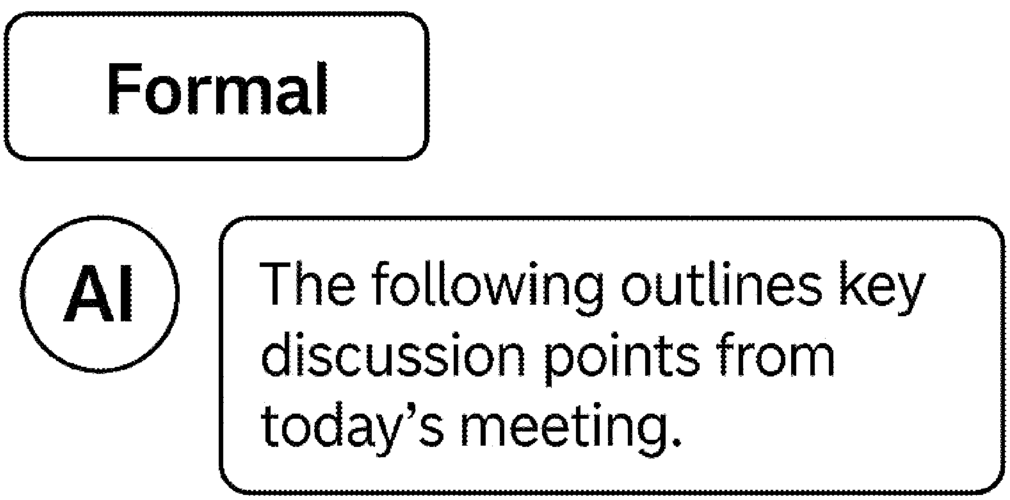
Figure 27E:
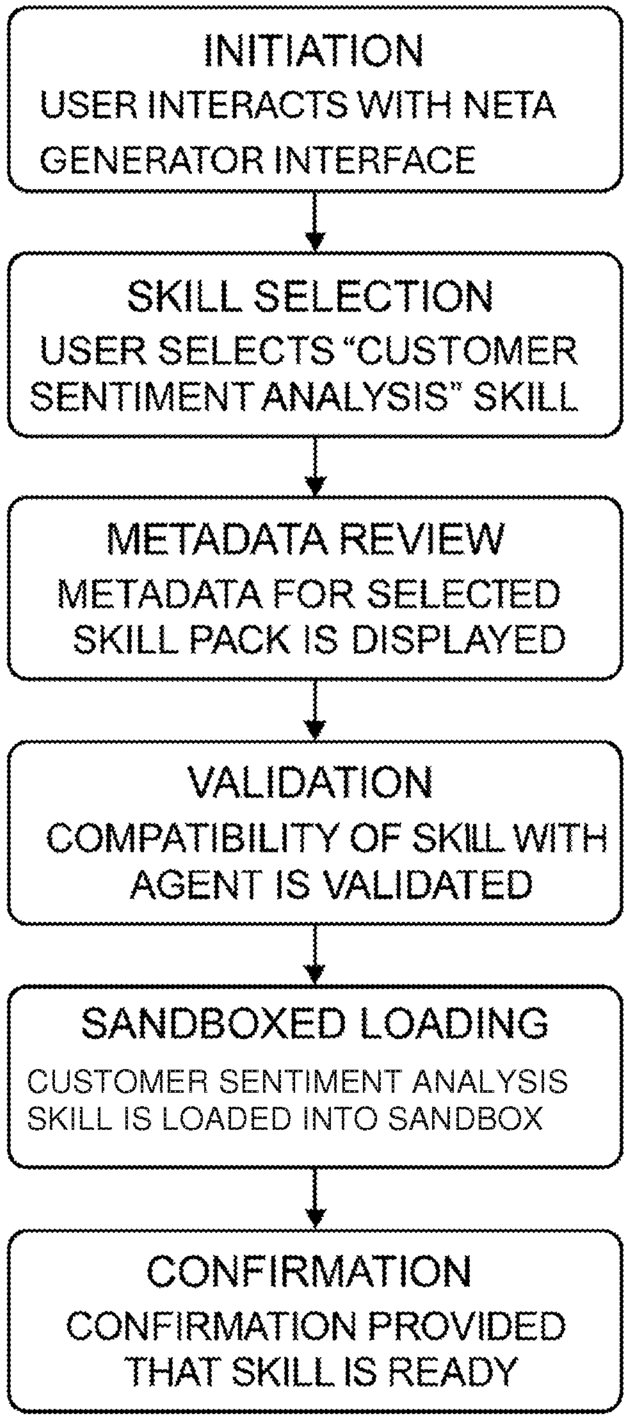
Figure 27F:
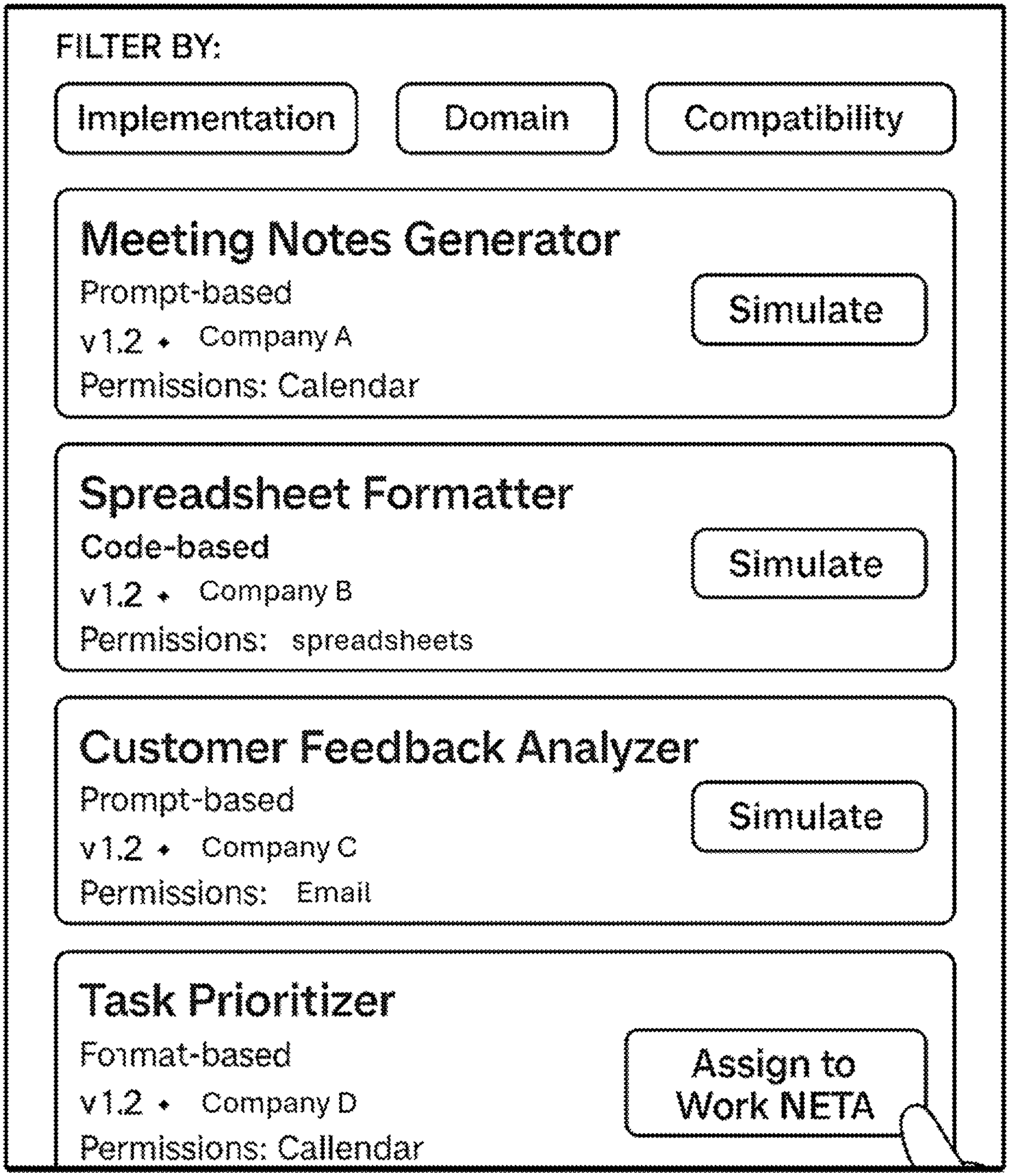
Figure 27G:
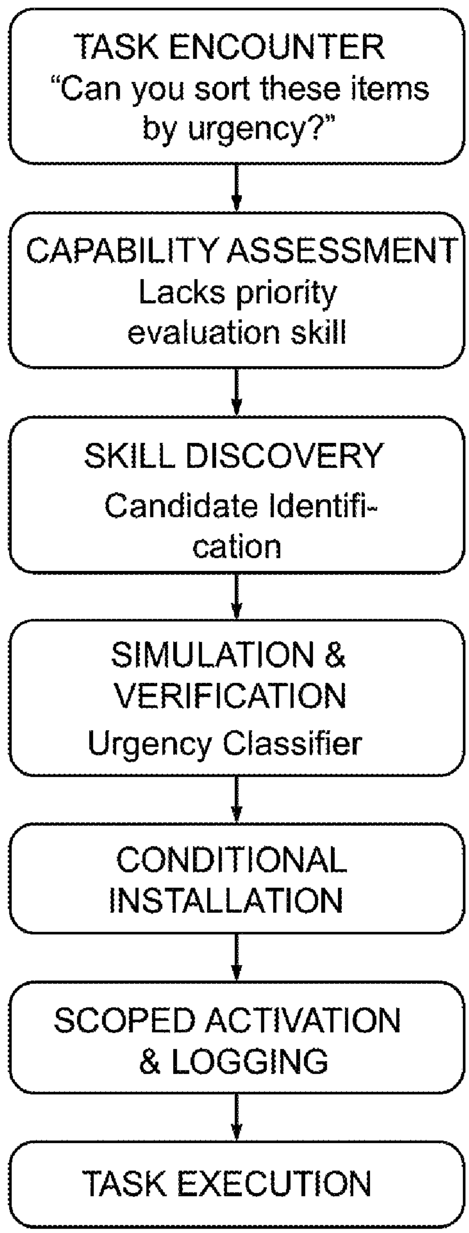
Figure 27H:
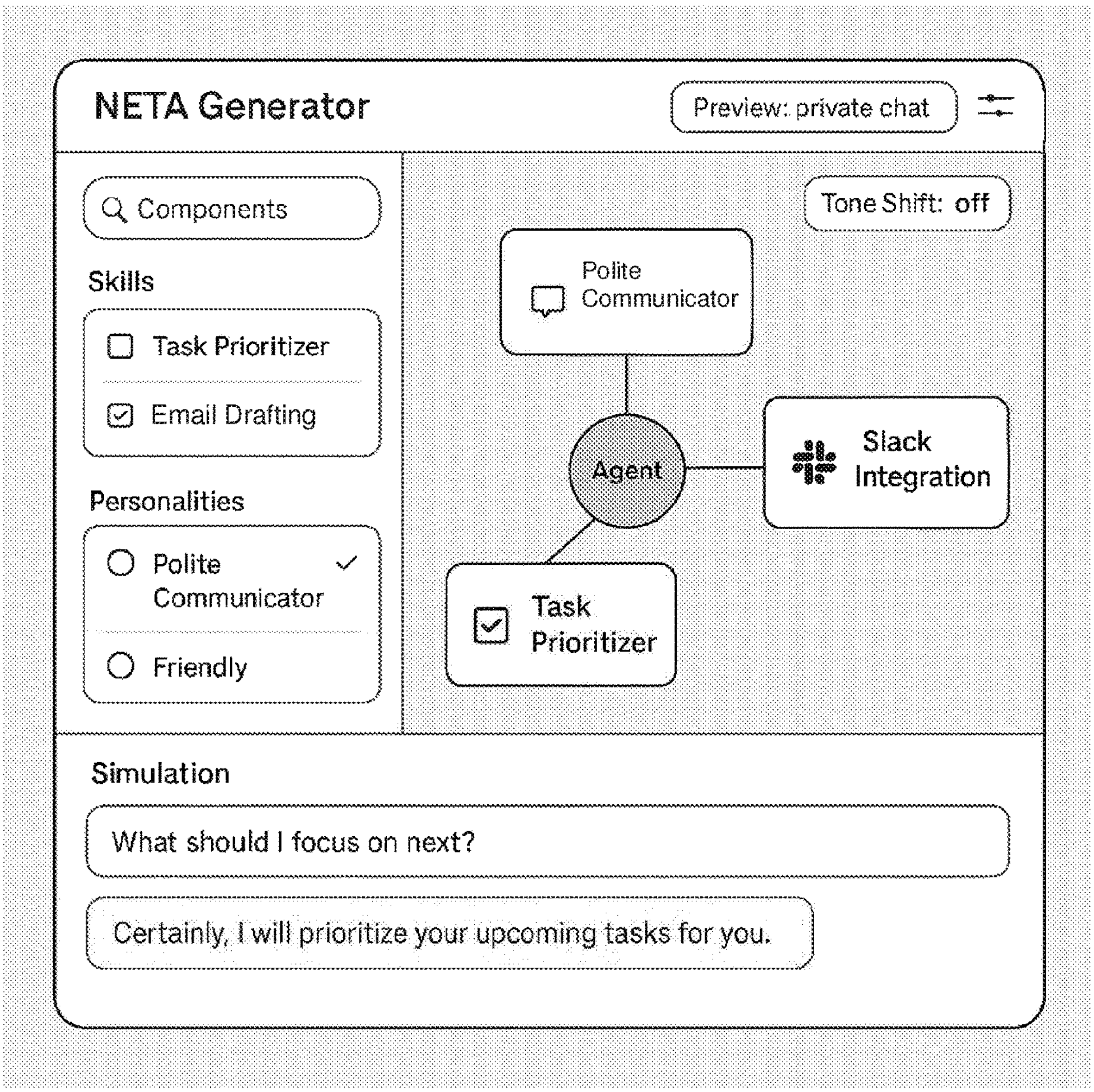
Figure 27I:
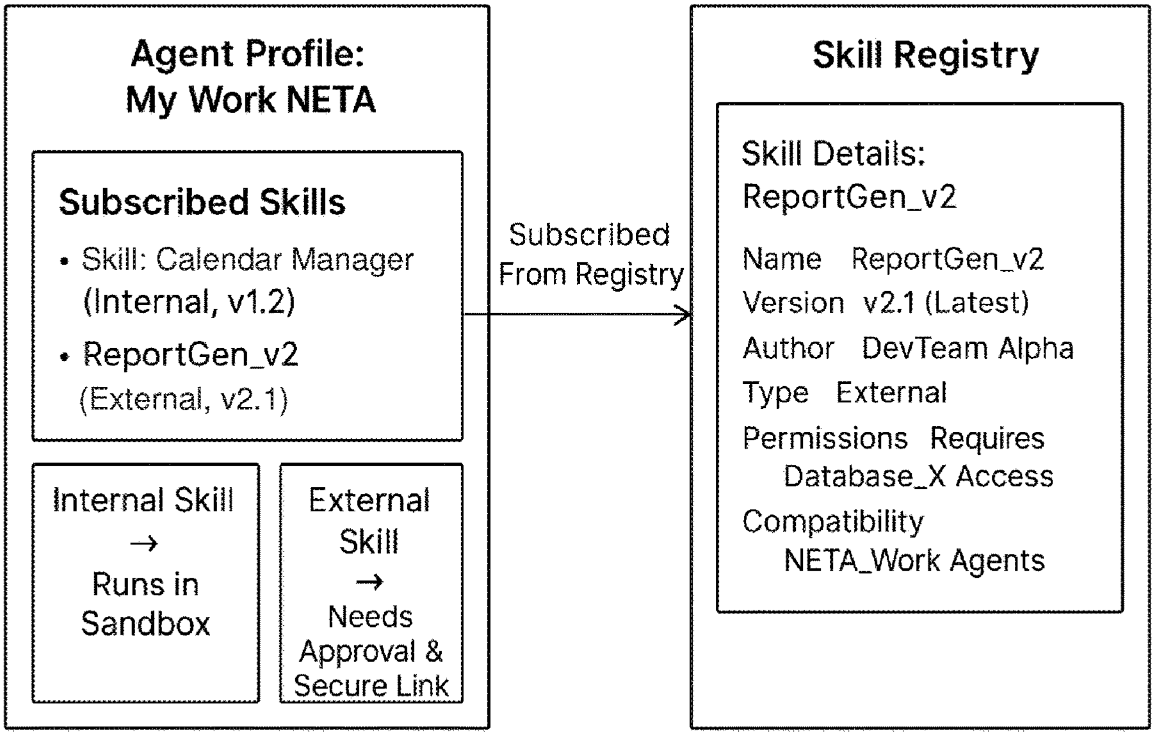
Figure 27J:
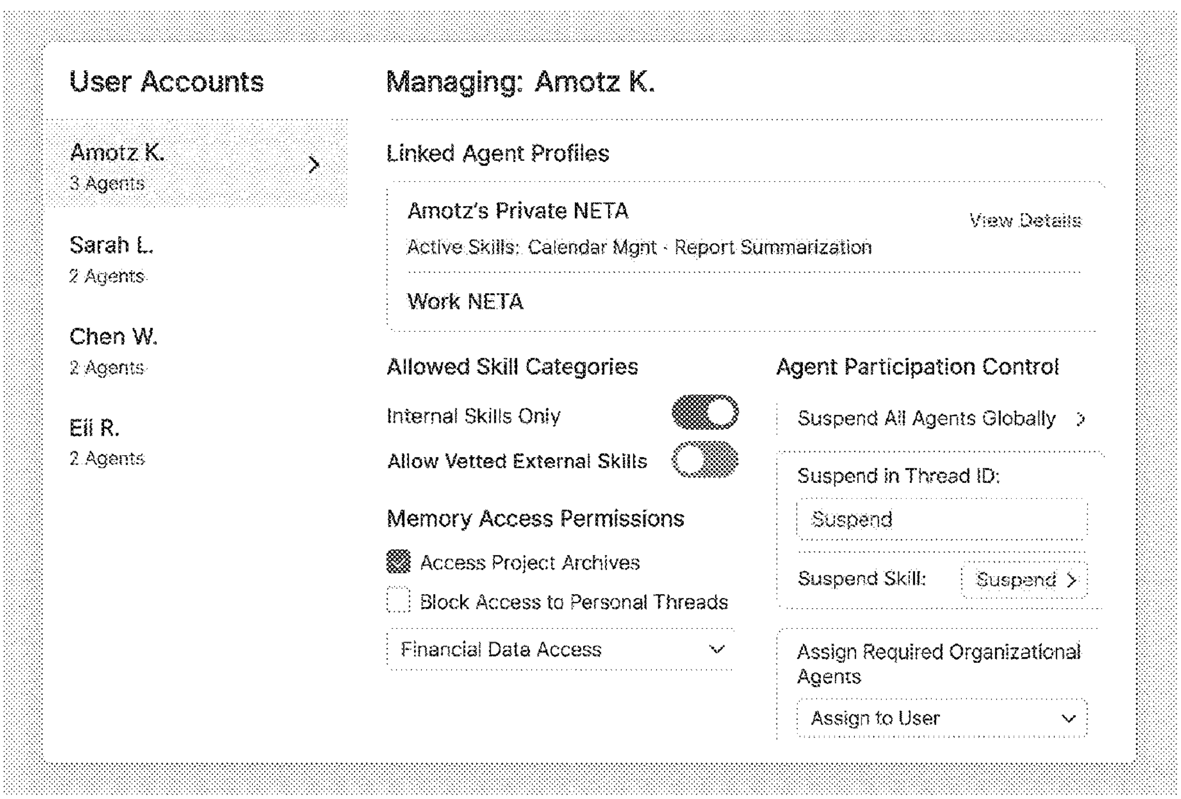
Figure 27K:
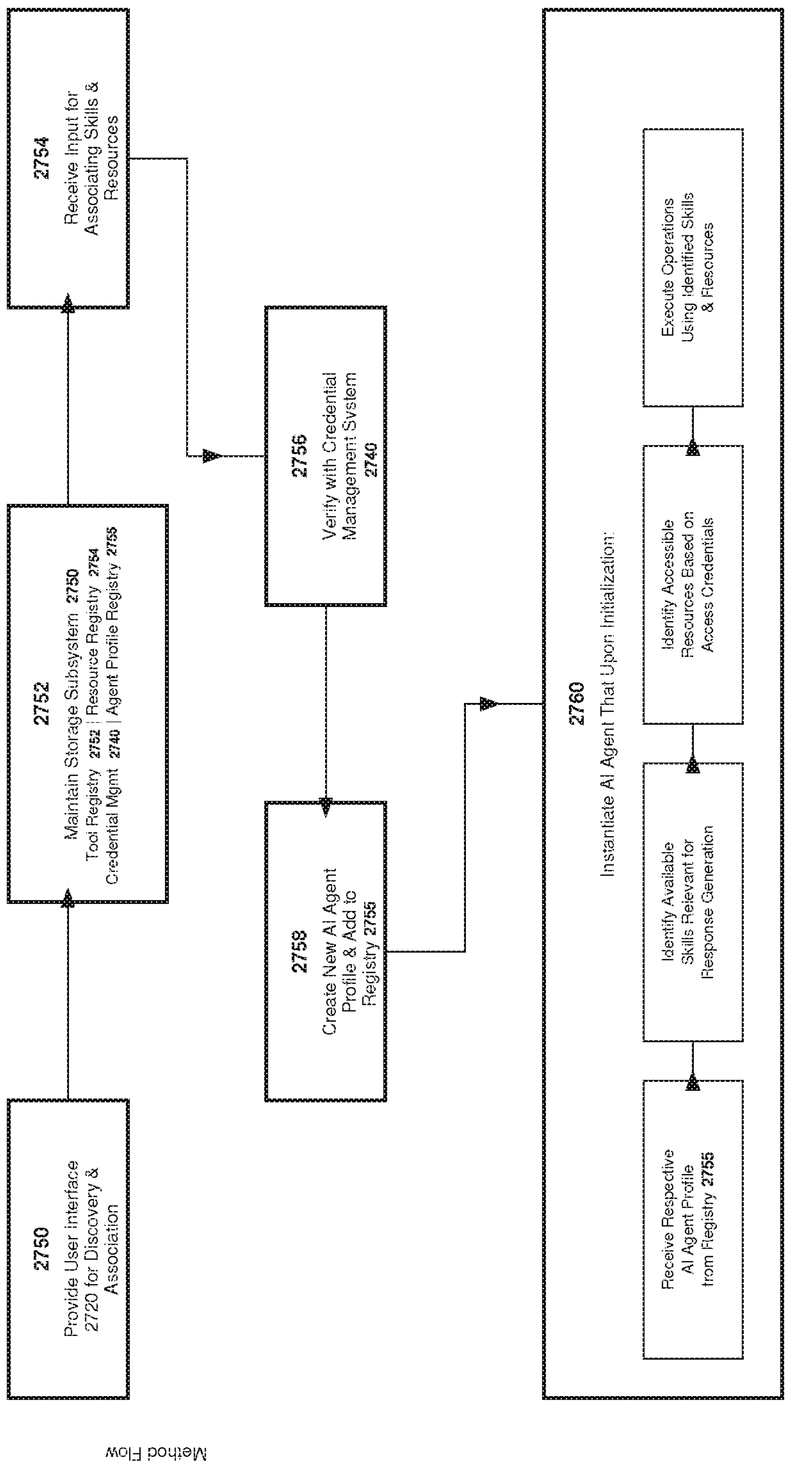
Figure 28A:
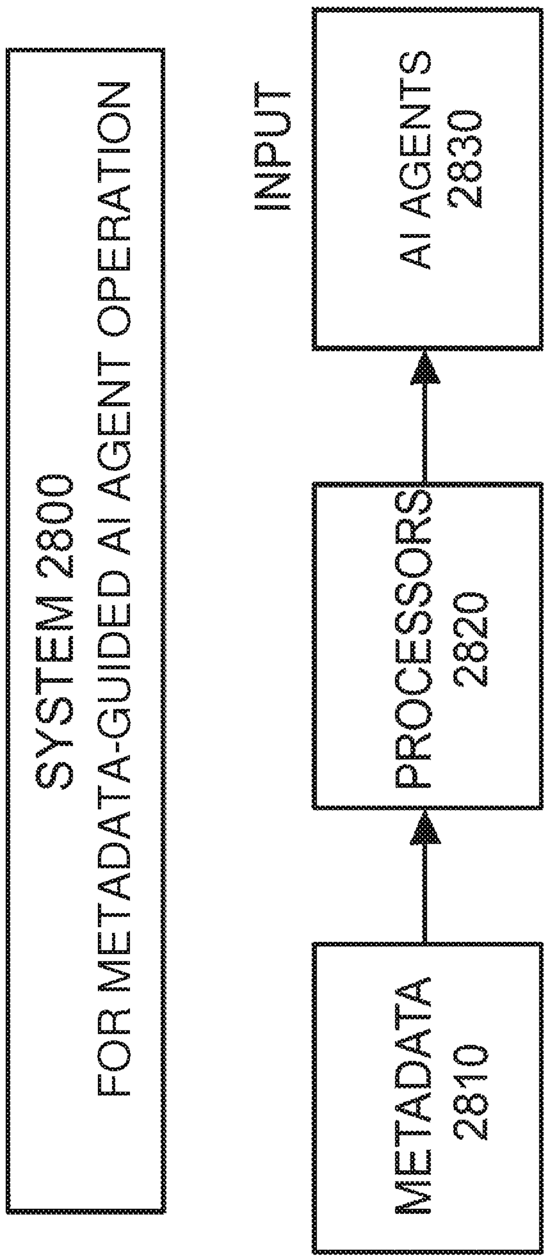
Figure 28B:
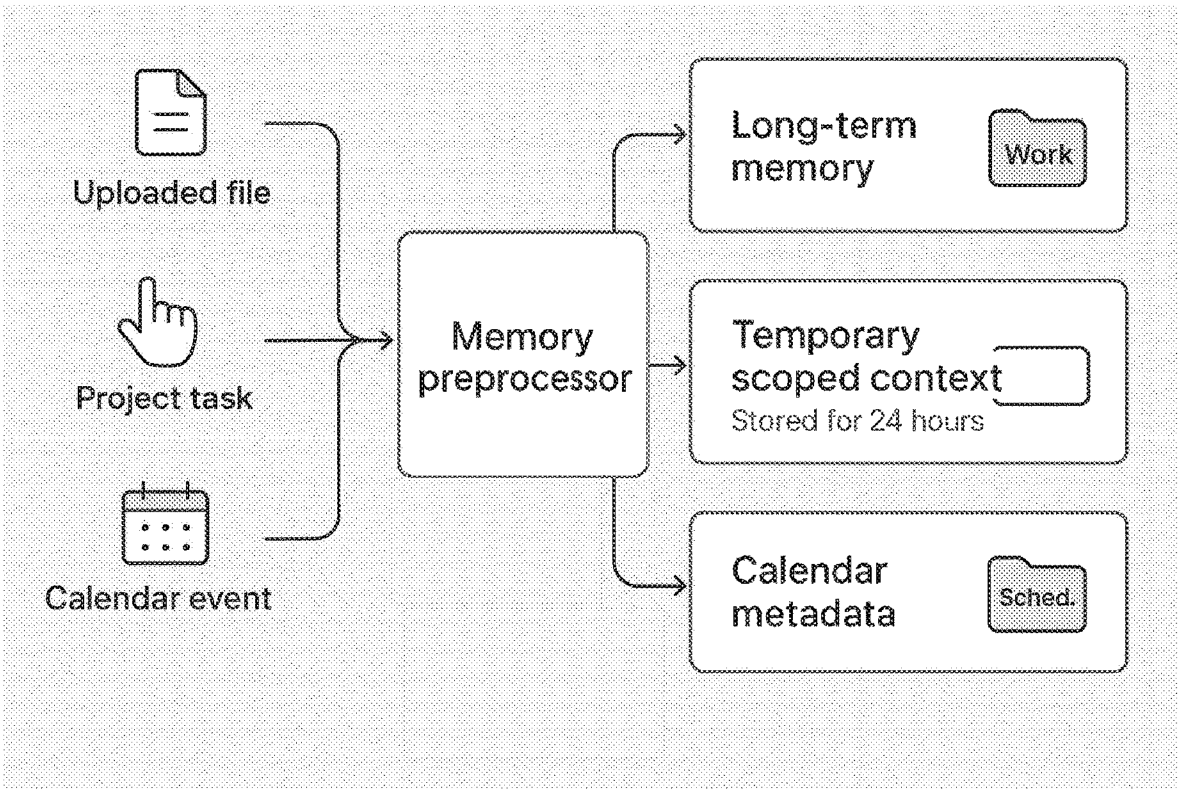
Figure 28C:
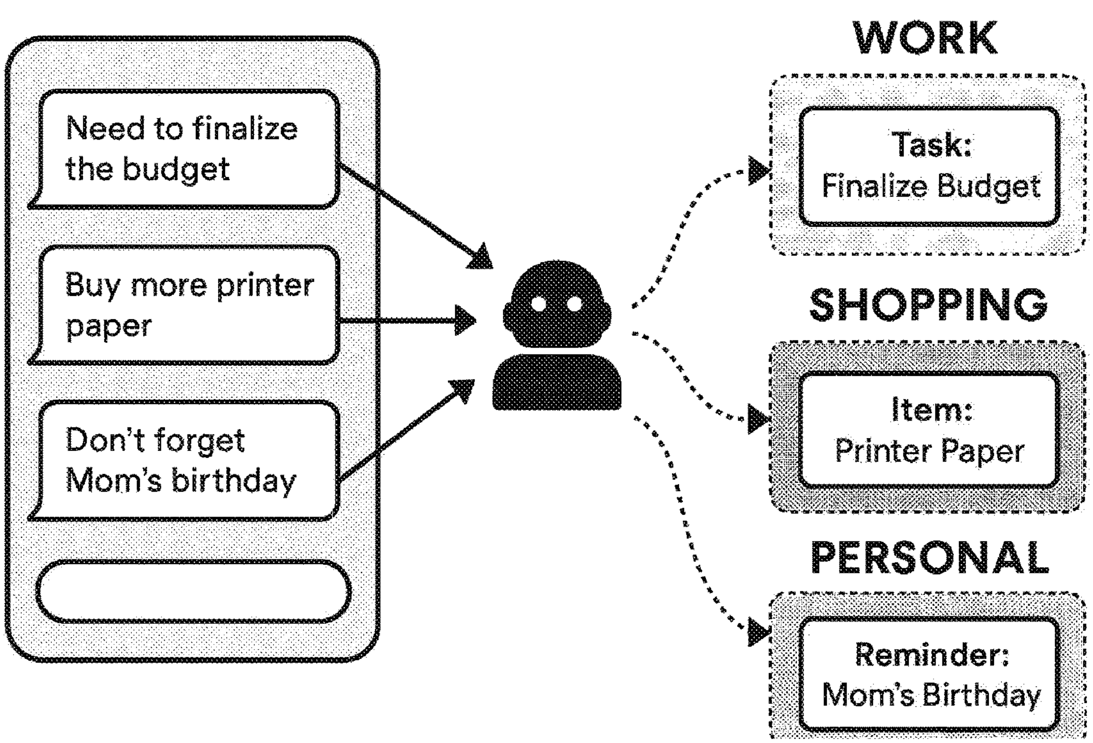
Figure 28D:
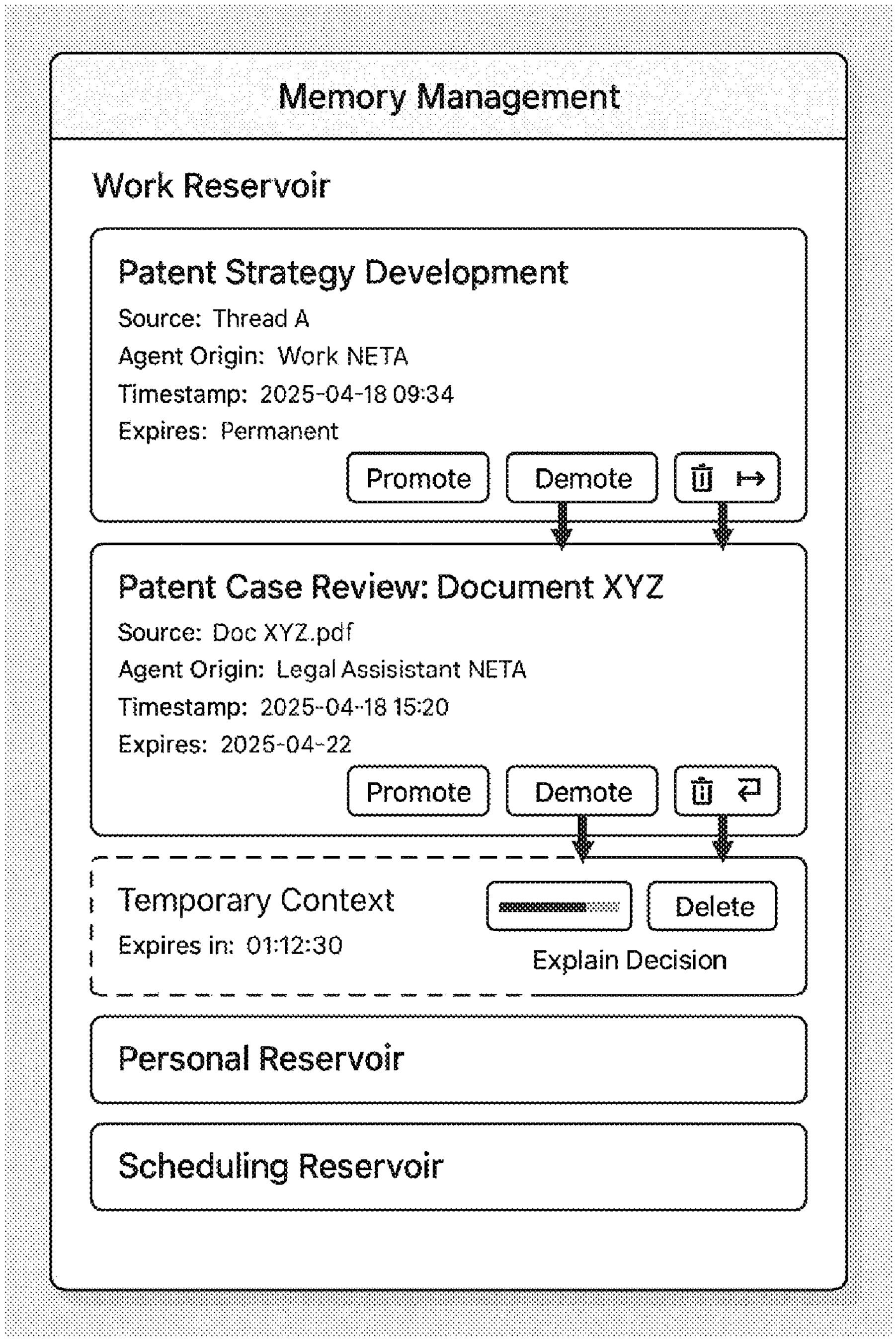
Figure 28E:
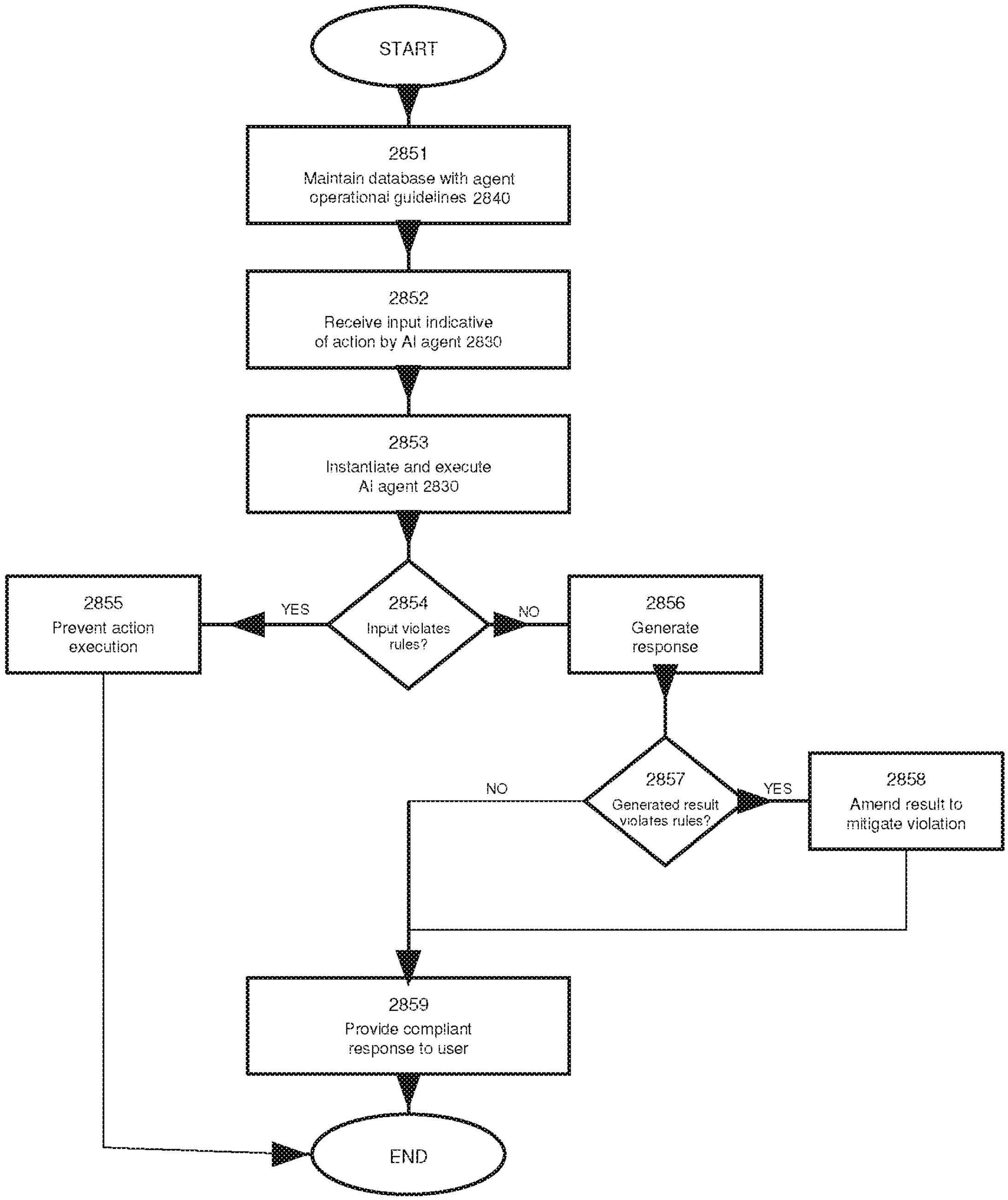
Figure 29A:
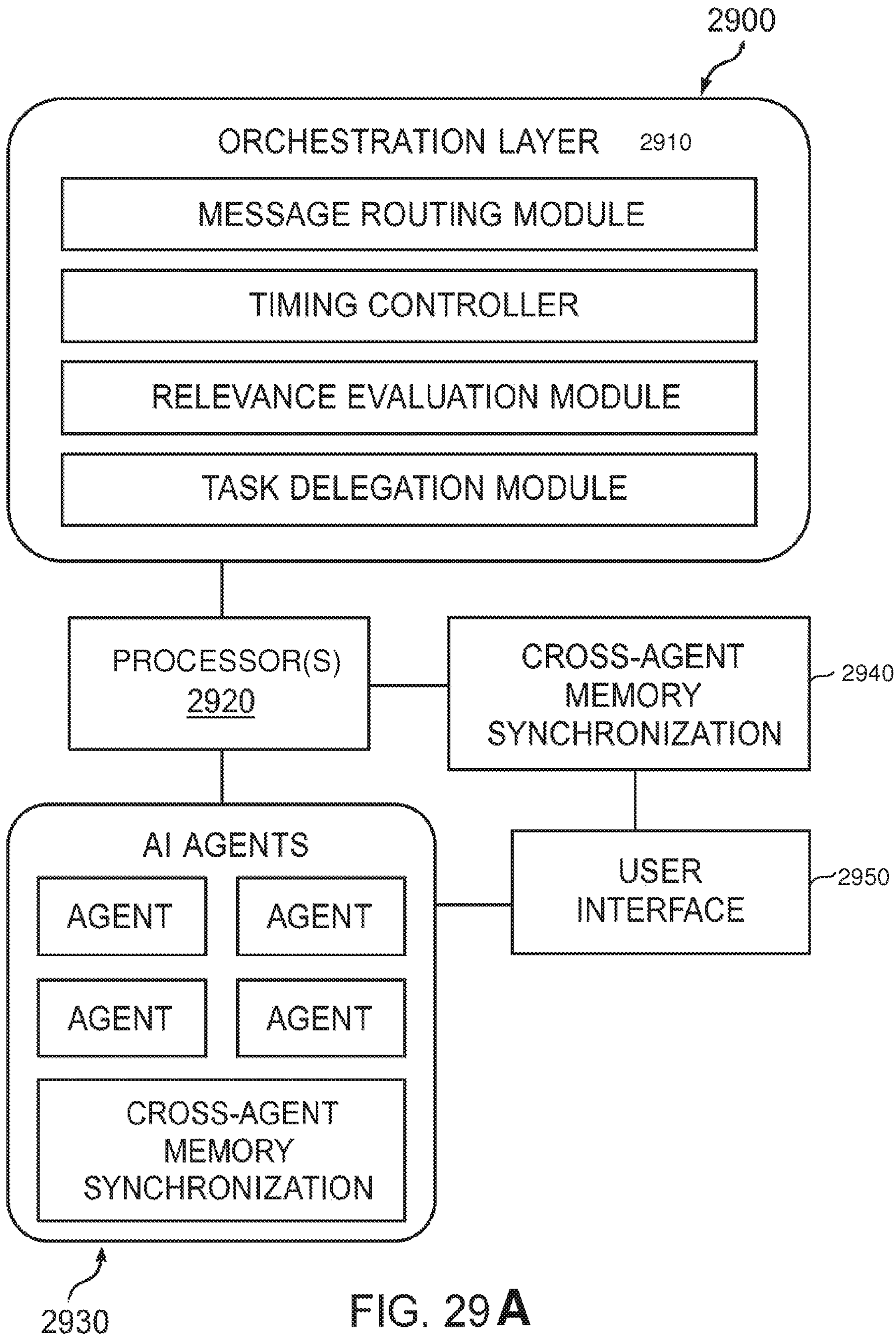
Figure 29B:
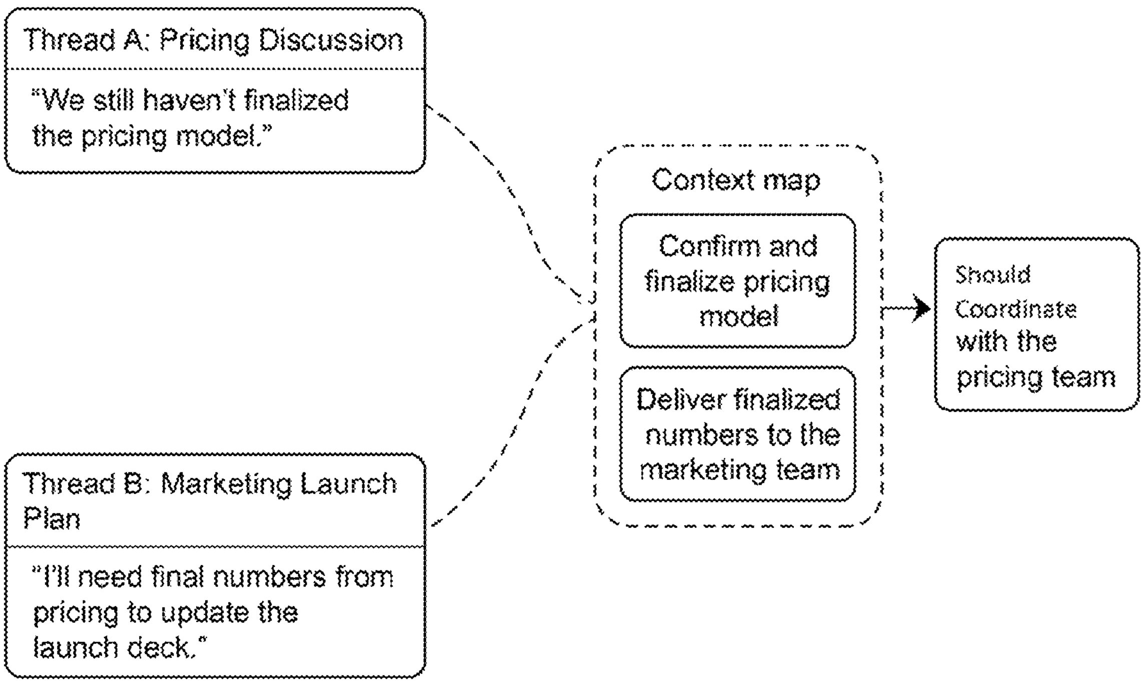
Figure 29C:
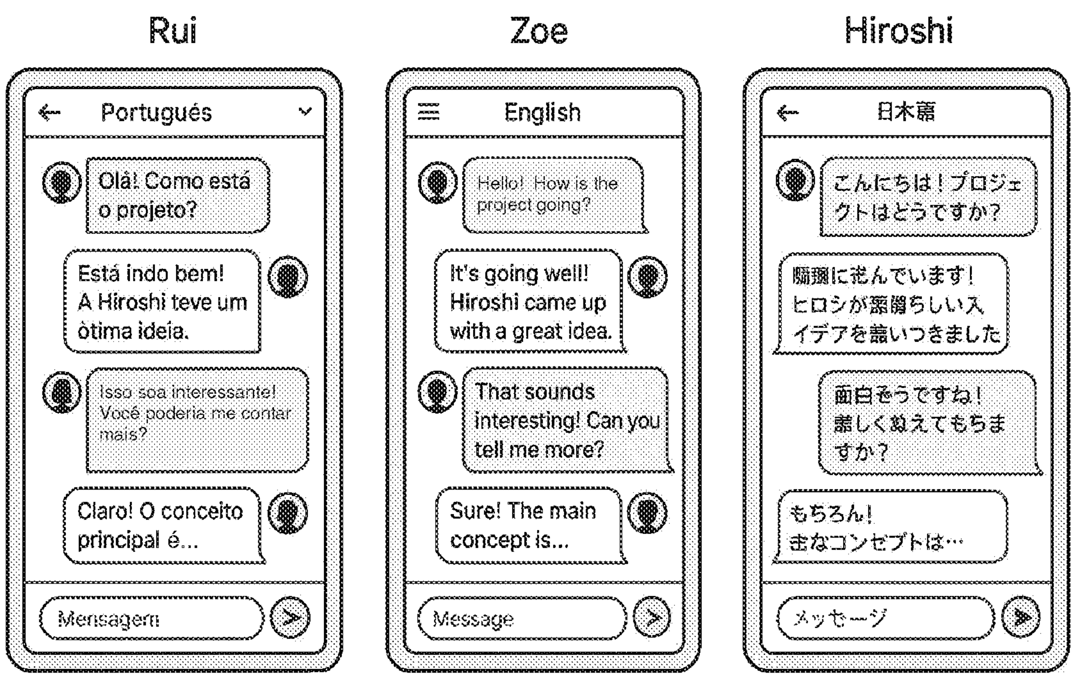
Figure 29D:
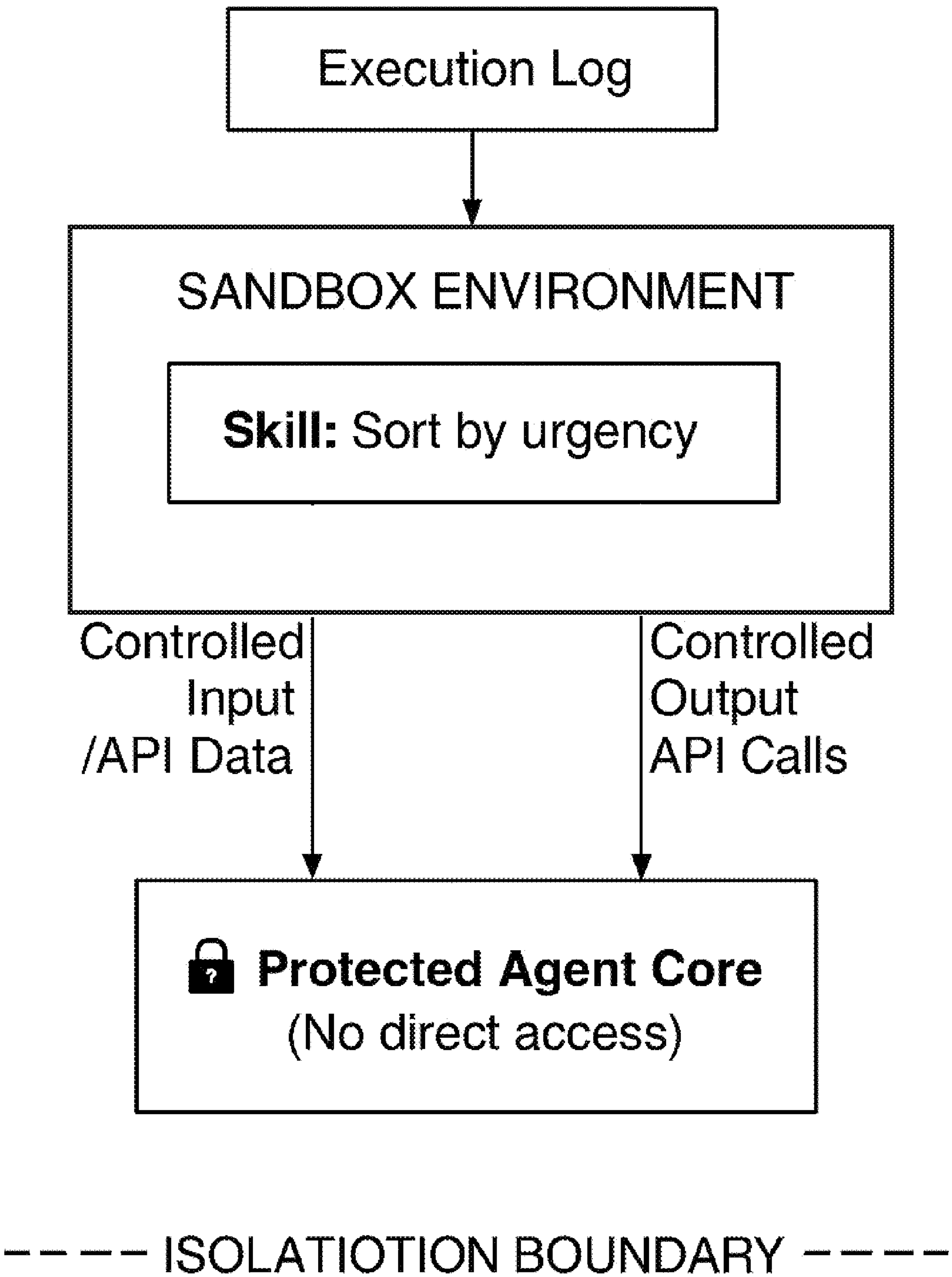
Figure 29E:
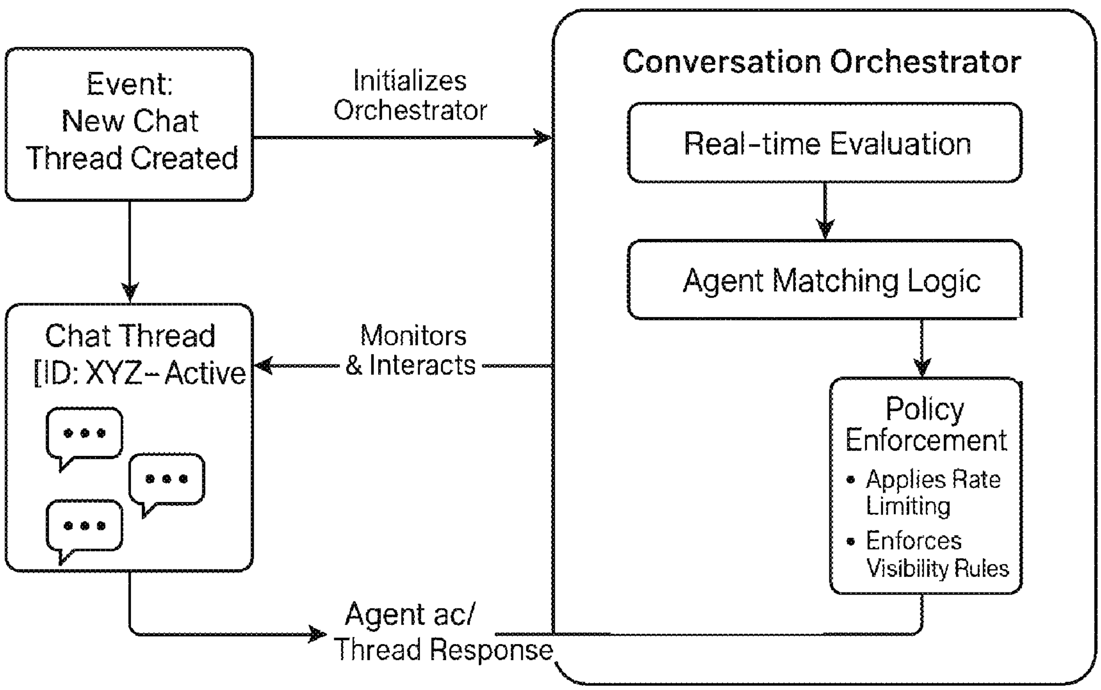
Figure 29F:
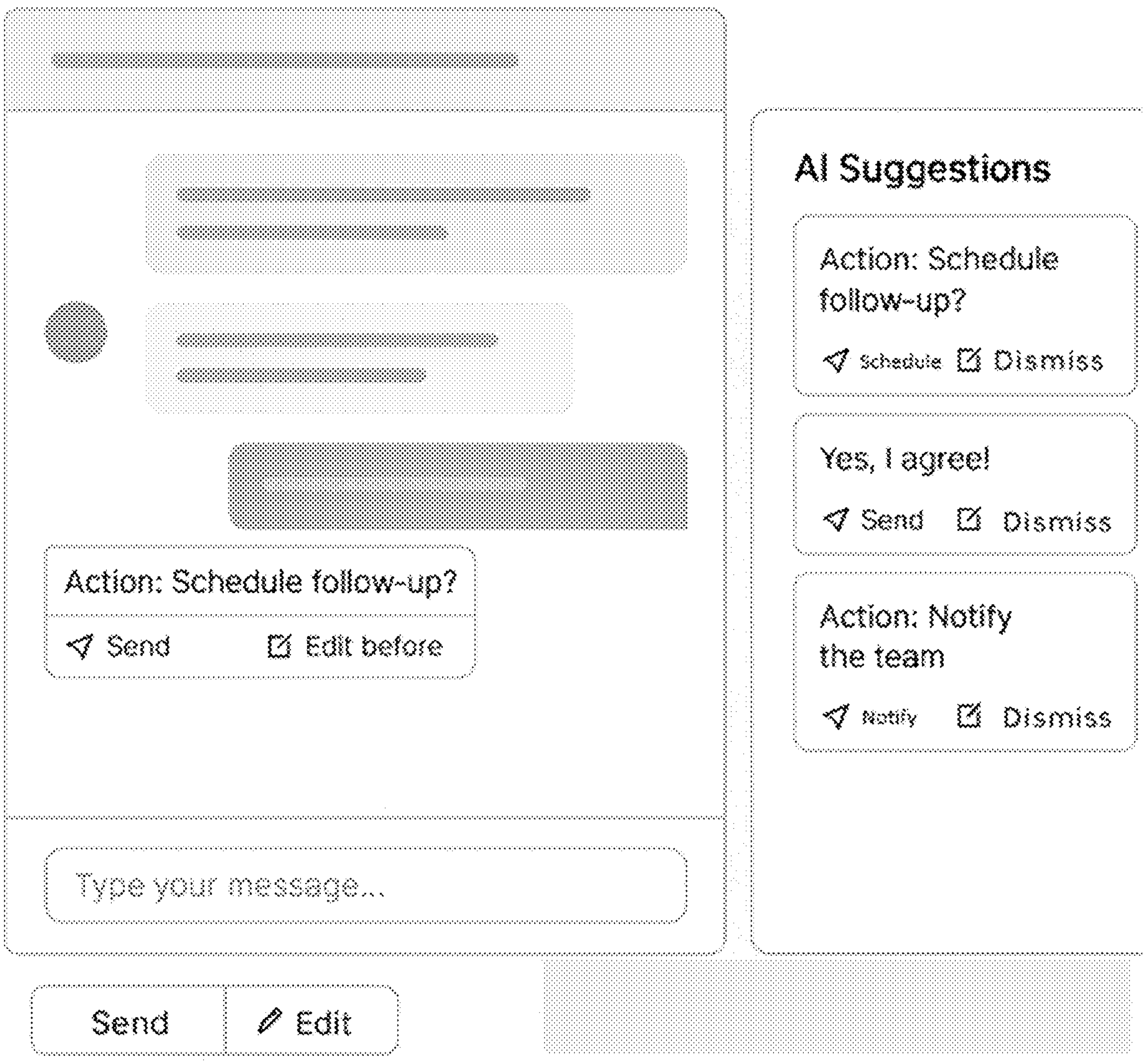
Figure 29G:
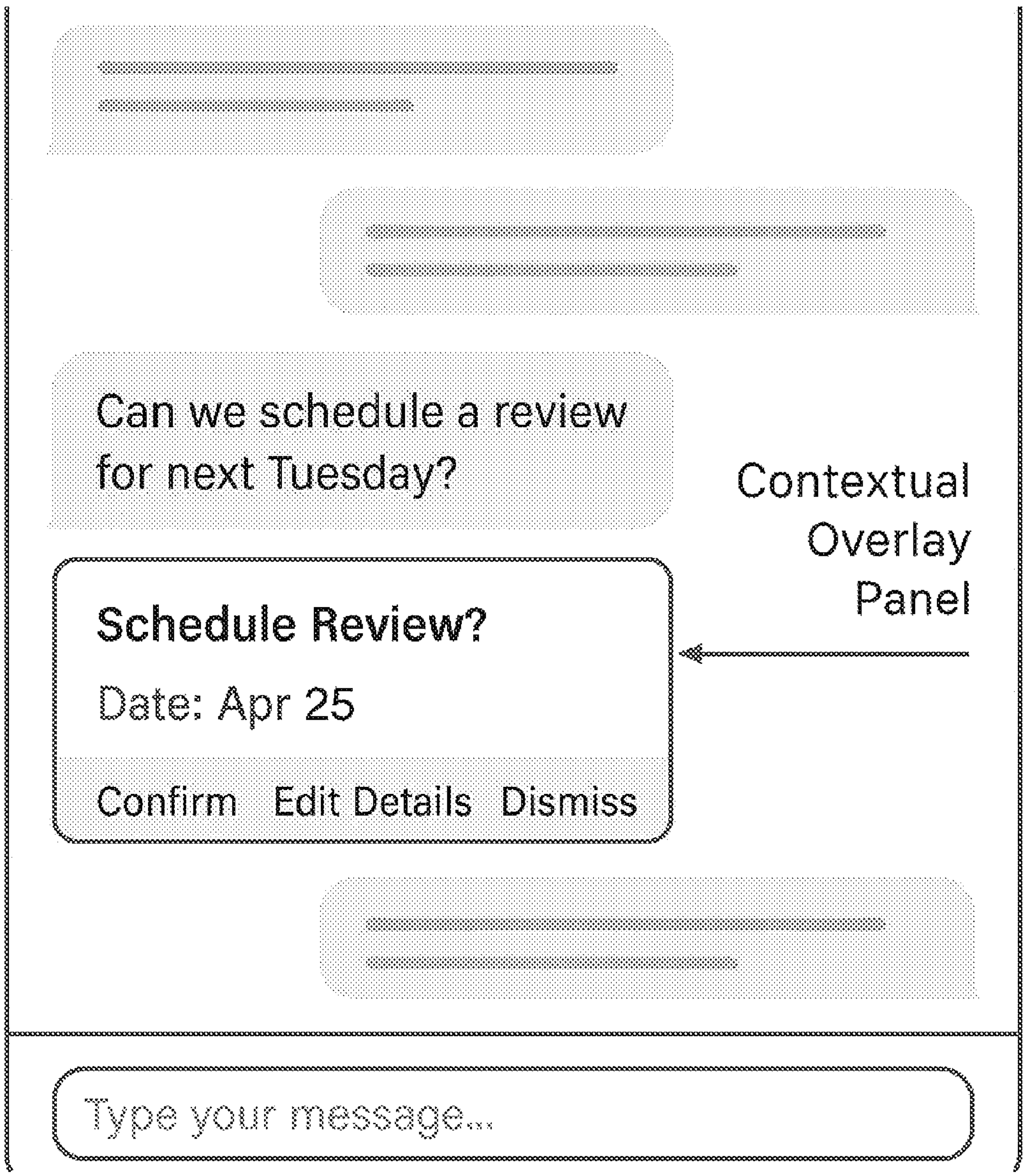
Figure 29H:
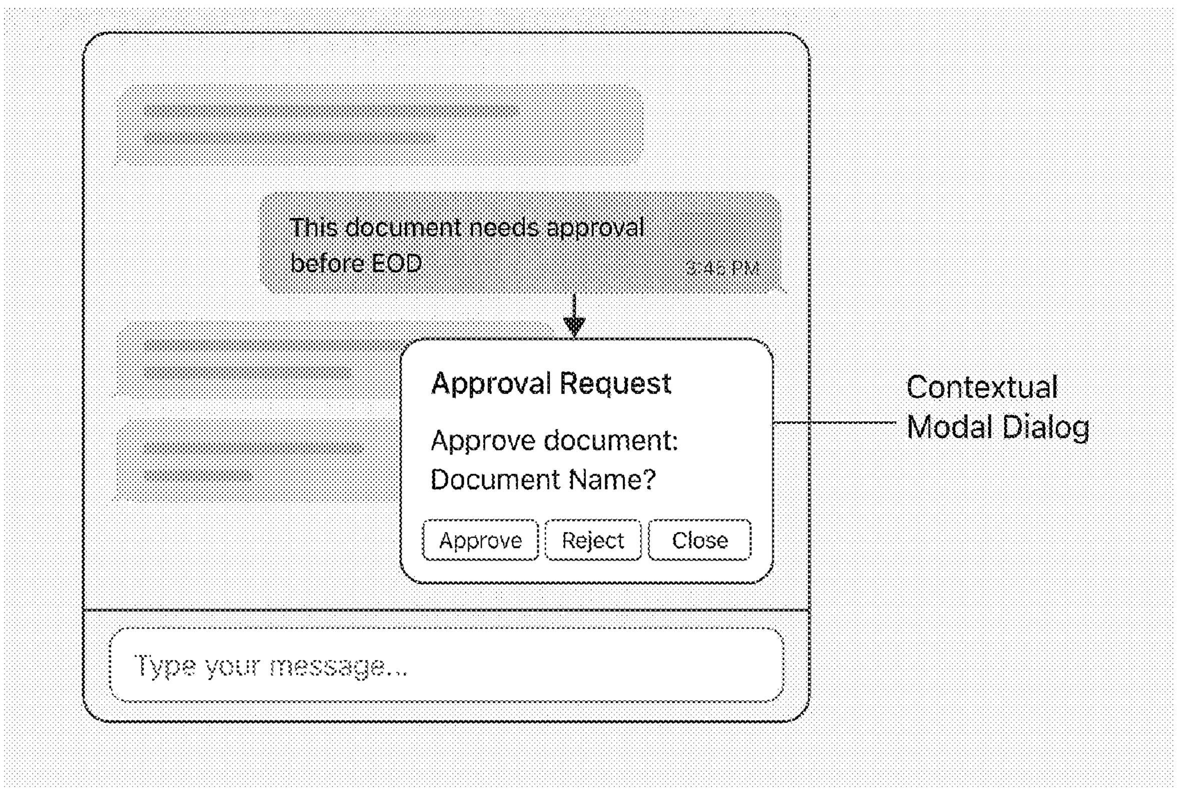
Figure 29I:
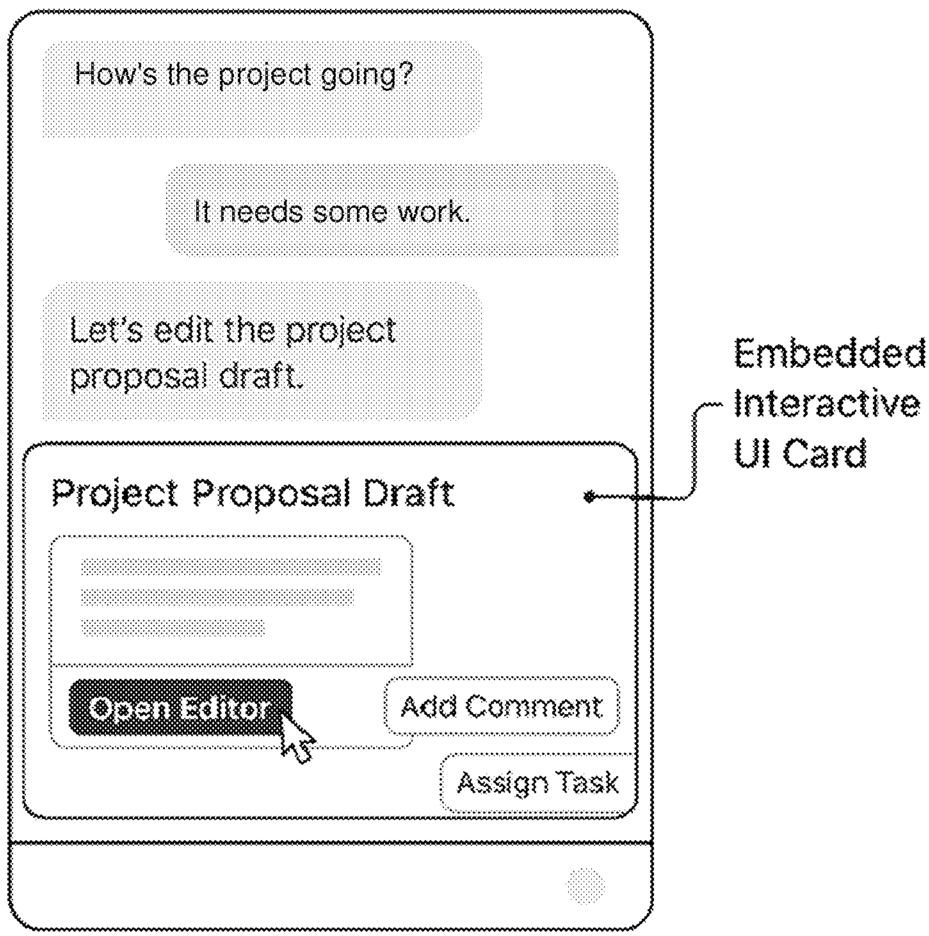
Figure 29J:
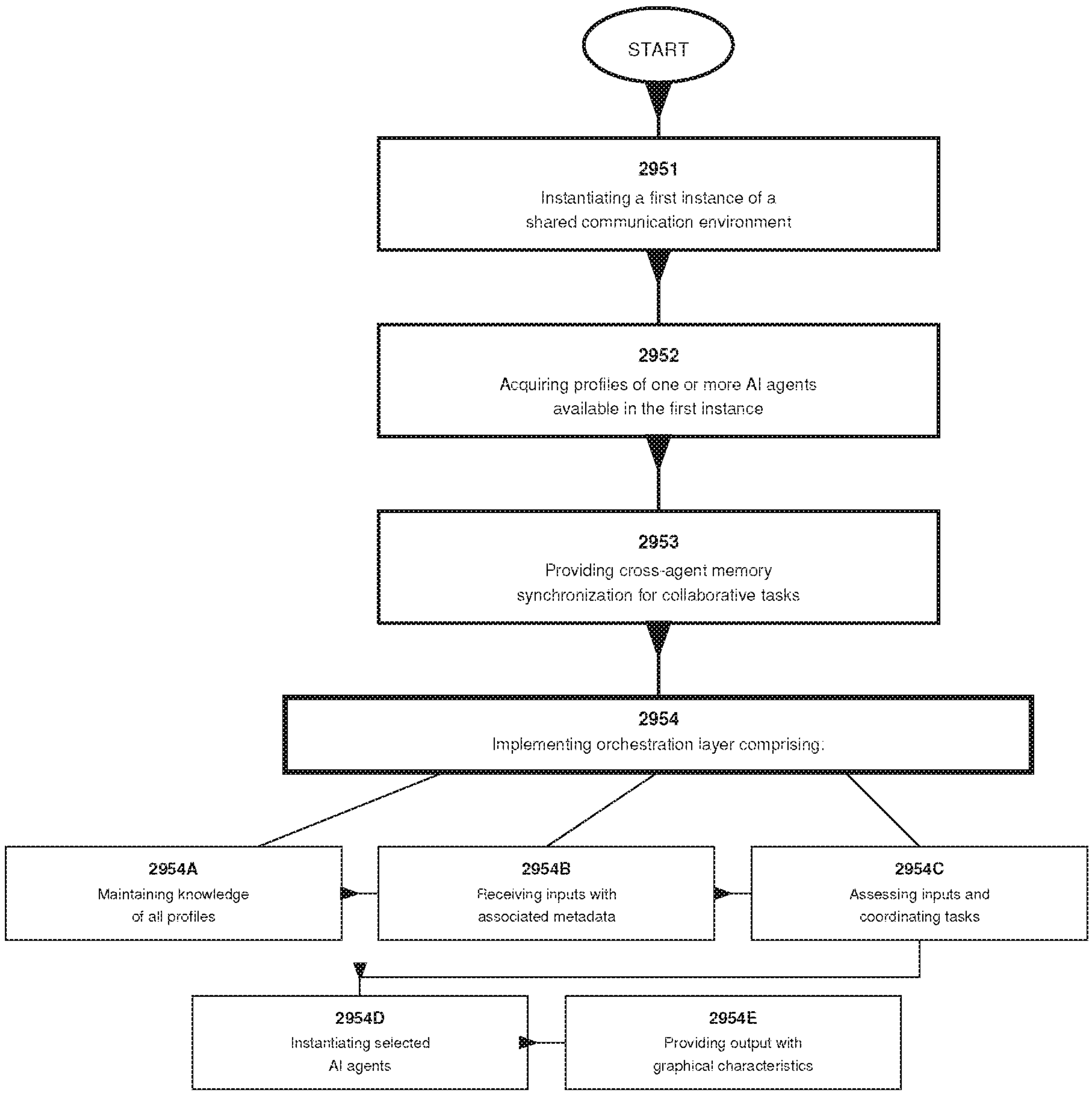
Figure 30A:
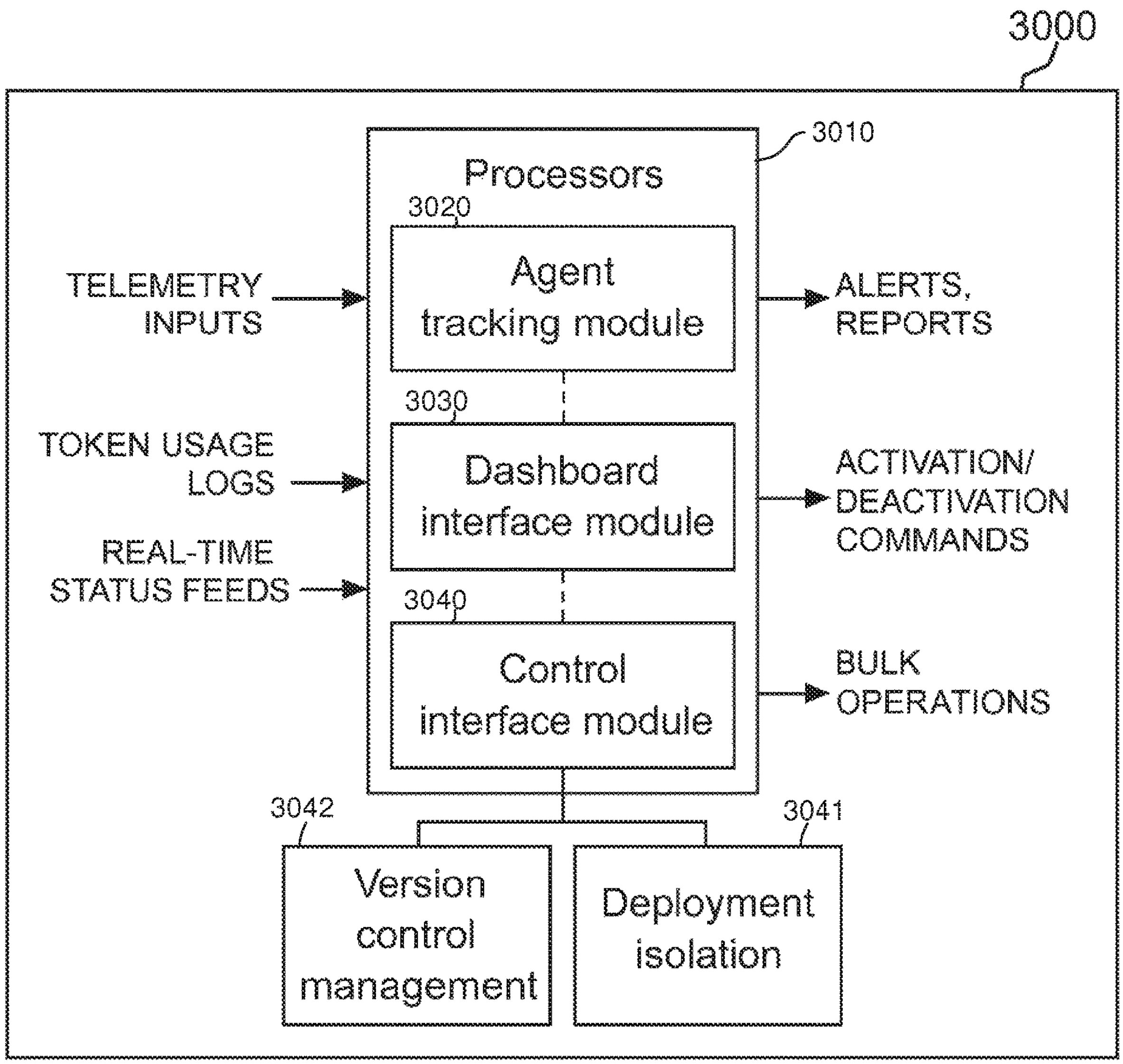
Figure 30B:
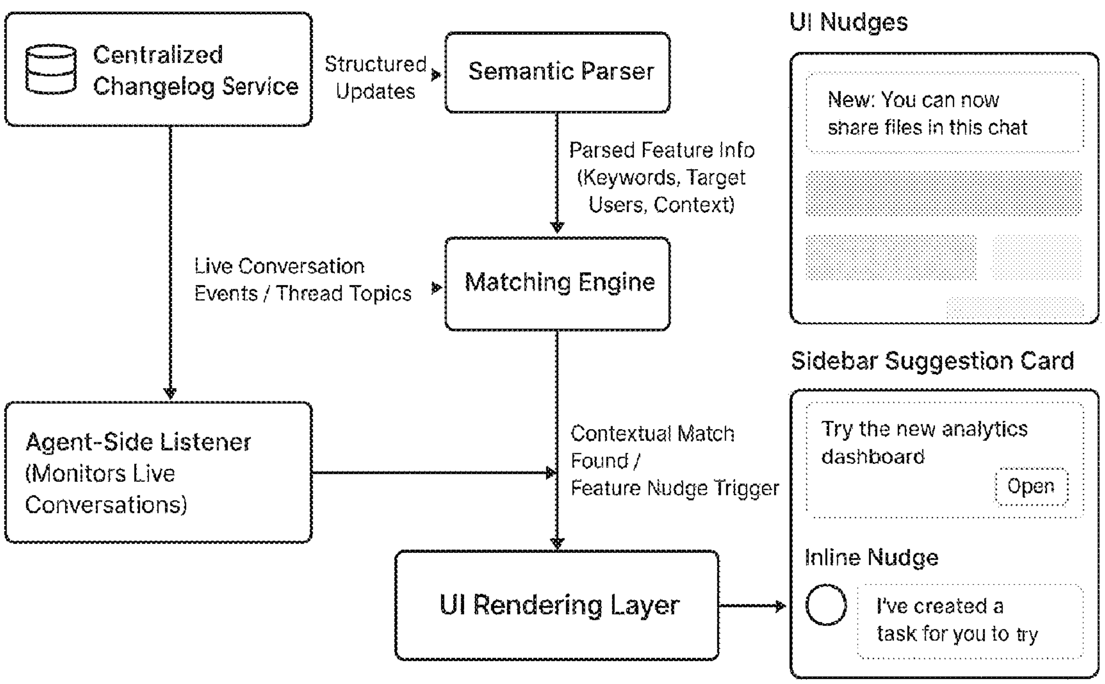
Figure 30C:
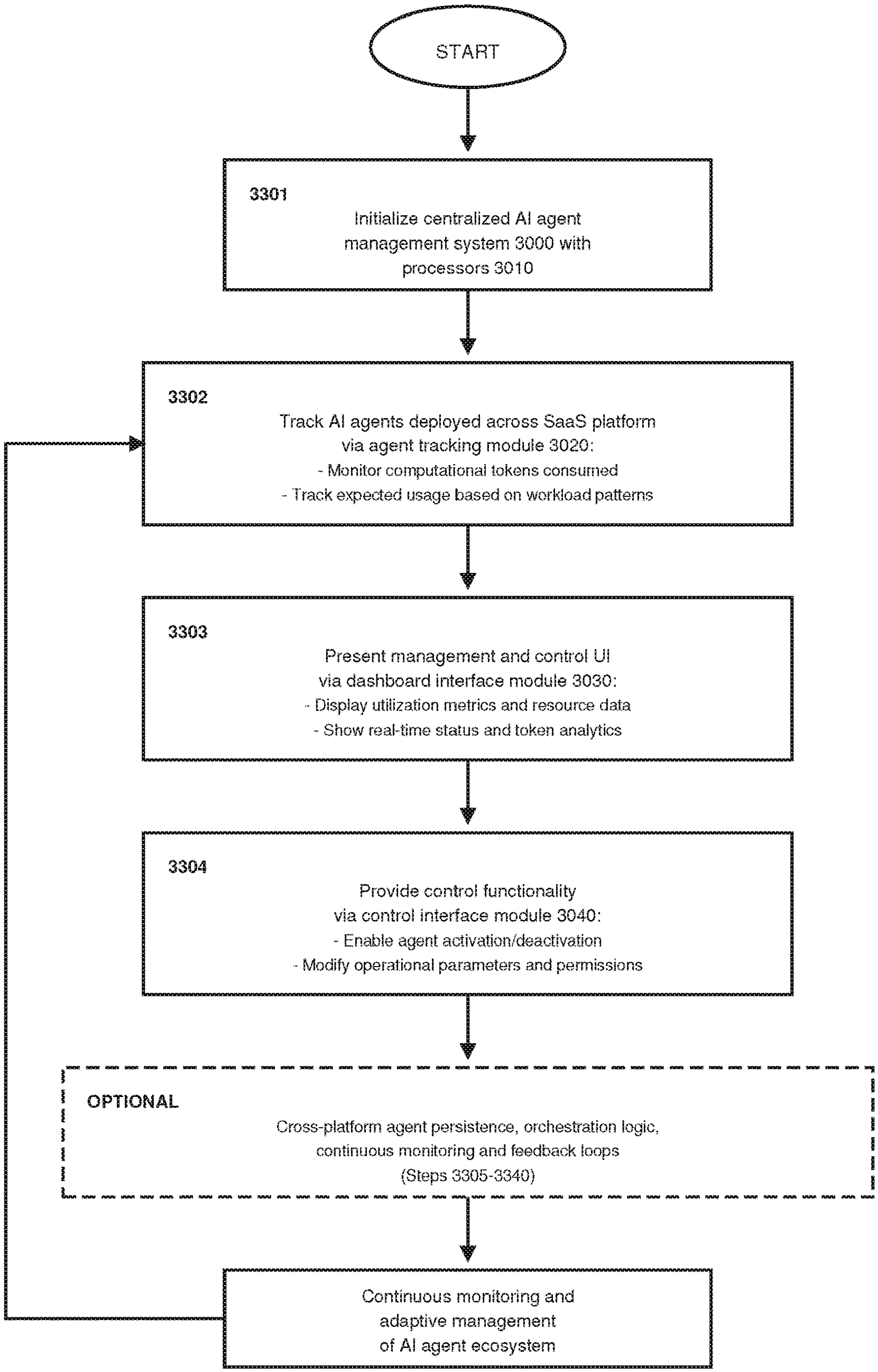

FIGS. 26B and 26C demonstrate an exemplary unified human-agent chat interface illustrating the agent-first communication model, consistent with some embodiments of the present disclosure;

FIG. 26D illustrates intelligent orchestration logic governing agent participation in conversational threads, consistent with some embodiments of the present disclosure;

FIGS. 26E and 26F demonstrate personalized one-to-one interaction channels between users and their dedicated AI agents, consistent with some embodiments of the present disclosure;

FIG. 26G demonstrates support for multiple specialized agent instances per user operating under distinct operational paradigms, consistent with some embodiments of the present disclosure;

FIGS. 26H and 26I illustrate agent response integration into human communication patterns with ownership attribution, consistent with some embodiments of the present disclosure;

FIGS. 26J and 26K demonstrate granular, context-specific behavioral controls for customizing agent behavior, consistent with some embodiments of the present disclosure;

FIG. 26L is a flowchart illustrating a computer-implemented method for providing personalized artificial intelligence agent responses based on user profiles, consistent with some embodiments of the present disclosure;

FIG. 27A is a block diagram illustrating an embodiment of a system for modular AI agent operation providing secure orchestration of skill modules and knowledge resources, consistent with some embodiments of the present disclosure;

FIG. 27B illustrates an exemplary agent configuration panel for defining automated agent instance behavior and capabilities, consistent with some embodiments of the present disclosure;

FIGS. 27C and 27D demonstrate how different personality profiles affect agent communication style while executing identical core functions, consistent with some embodiments of the present disclosure;

FIG. 27E illustrates an exemplary workflow for installing functional skill modules into automated agent instances, consistent with some embodiments of the present disclosure;

FIG. 27F shows an exemplary skill store marketplace interface for discovering and installing agent capabilities, consistent with some embodiments of the present disclosure;

FIG. 27G illustrates conditional, on-demand skill acquisition triggered by task analysis during active conversation, consistent with some embodiments of the present disclosure;

FIG. 27H illustrates a comprehensive agent generator interface for configuring, testing, and refining automated agent instances, consistent with some embodiments of the present disclosure;

FIG. 27I demonstrates agent architecture composed of modular skills sourced from a centralized registry, consistent with some embodiments of the present disclosure;

FIG. 27J shows an administrative dashboard interface for agent management portal operations, consistent with some embodiments of the present disclosure;

FIG. 27K is a flowchart illustrating a computer-implemented method for modular AI agent operation using skills and resources, consistent with some embodiments of the present disclosure;

FIG. 28A is a block diagram illustrating an embodiment of a system for metadata-guided AI agent operation implementing compliance controls, consistent with some embodiments of the present disclosure;

FIG. 28B illustrates an exemplary workflow for memory ingestion and processing by an automated agent, consistent with some embodiments of the present disclosure;

FIG. 28C illustrates an exemplary memory sorting and distribution flow performed by an automated agent, consistent with some embodiments of the present disclosure;

FIG. 28D presents an exemplary graphical user interface for agent memory management, consistent with some embodiments of the present disclosure;

FIG. 28E is a flowchart illustrating an exemplary method for metadata-guided AI agent operation implementing compliance controls for response generation monitoring, consistent with some embodiments of the present disclosure;

FIG. 29A is a block diagram illustrating an embodiment of a system for orchestrated multi-agent communication providing integrated coordination for collaborative environments, consistent with some embodiments of the present disclosure;

FIG. 29B illustrates an exemplary implementation of cross-thread task synthesis with multi-thread analysis and coordination, consistent with some embodiments of the present disclosure;

FIG. 29C demonstrates multilingual communication support capabilities of the orchestration layer, consistent with some embodiments of the present disclosure;

FIG. 29D illustrates secure skill execution architecture through sandbox isolation, consistent with some embodiments of the present disclosure;

FIG. 29E depicts thread-level orchestrator lifecycle and operation of conversation-specific orchestrator agents, consistent with some embodiments of the present disclosure;

FIG. 29F shows structural implementation of conversational AI suggestion popups with action injection capabilities, consistent with some embodiments of the present disclosure;

FIGS. 29G, 29H, and 29I illustrate auto-surfacing UI overlay systems triggered by task inference, consistent with some embodiments of the present disclosure;

FIG. 29J is a flowchart illustrating a computer-implemented method for orchestrated multi-agent communication with integrated coordination, consistent with some embodiments of the present disclosure;

FIG. 30A is a block diagram illustrating an embodiment of a system for centralized AI agent management and control implementing modular management components, consistent with some embodiments of the present disclosure;

FIG. 30B illustrates an exemplary changelog-driven feature promotion workflow demonstrating intelligent feature promotion capabilities, consistent with some embodiments of the present disclosure; and FIG. 30C is a flowchart illustrating a computer-implemented method for centralized management and control of AI agents within a SaaS platform, consistent with some embodiments of the present disclosure.

DETAILED DESCRIPTION

The present disclosure, in some embodiments thereof, relates to methods for implementing artificial intelligence capabilities in software applications and, more particularly, but not exclusively, to systems and methods for integrating generative artificial intelligence within SaaS platforms.

Despite parallel developments of SaaS platforms wide adoption and artificial intelligence (AI) technological advancement as discussed herein, the integration of advanced AI capabilities, particularly generative AI, into SaaS platforms has been limited. Traditional SaaS applications often lack the ability to autonomously perform complex tasks, adapt to user contexts, or provide intelligent insights based on the vast amounts of data they manage. This gap presents an opportunity to enhance SaaS platforms with AI-driven functionalities that could significantly improve user productivity, decision-making processes, and overall business outcomes.

Moreover, the implementation of AI in SaaS environments raises important considerations regarding data privacy, security, and the ethical use of AI. As generative AI agents interact with sensitive business data, there is a need for robust systems to manage access controls, ensure data protection, and maintain transparency in AI-driven decision-making processes.

Embodiments of the present disclosure address these challenges by providing novel methods and systems for seamlessly integrating generative AI capabilities into SaaS platforms. These innovations aim to enhance the functionality, efficiency, and intelligence of SaaS applications while maintaining necessary safeguards for data security and ethical AI use.

Disclosed embodiments provide new and improved techniques for implementing generative AI solutions enabling enhanced data representation and management, for instance solutions involving deep learning algorithms, such as Generative AI models, for example large language models (LLM) based algorithms that can perform a variety of NLP tasks. The used generative AI models may learn the patterns and structure of input training data from systems such as described in FIG. 1A and then generate new data that has similar characteristics.

Disclosed embodiments relate to methods and systems for integrating generative AI capabilities into SaaS platforms. The disclosed innovations address the growing need for intelligent, adaptive, and efficient software solutions in cloud-based environments.

Central to at least some of the disclosed embodiments is a system for utilizing generative AI within a SaaS platform. This system displays a table structure containing items and their characteristics, incorporates a generative AI agent as a platform user, and provides it with contextual information about data types and structural relationships. The generative AI agent then generates and executes actions based on this information, enhancing the platform's functionality and user experience.

At least some of the disclosed embodiments introduce a method for intent-based interactions using generative AI agents with varying credentials within a SaaS platform. This approach allows for selective access and actions based on specific credential sets, ensuring appropriate use of AI capabilities across different aspects of the platform.

Furthermore, the at least some of the disclosed embodiments present a system for implementing hierarchical access control for generative AI agents within a SaaS platform. This system grants inherited edit privileges based on departmental structures, allowing for fine-grained control over generative AI agent activities while maintaining organizational hierarchies.

A key feature of at least some of the disclosed embodiments is a method for proactive information gathering by generative AI agents. This method involves analyzing tasks, identifying missing information, and autonomously reaching out to team members to collect necessary data, thereby streamlining workflows and reducing manual interventions.

At least some of the disclosed embodiments encompass a system for interactive analysis of AI outputs. This system enables users to query and receive detailed explanations about AI-generated results within a project management context, fostering transparency and trust in AI-driven decision-making processes.

Additionally, at least some of the disclosed embodiments provide a method for managing AI resources as limited assets within a SaaS platform. This includes the deployment, tracking, and execution of generative AI agent instances within defined resource limits, ensuring efficient utilization of AI capabilities.

Furthermore, at least some of the disclosed embodiments introduce a method for contextual data analysis in structured environments. This method utilizes AI to interpret data based on column types, patterns, and relationships within a data structure, providing deeper insights and more accurate analysis of complex datasets.

The present disclosure, in some embodiments thereof, further relates to methods for implementing artificial intelligence capabilities in software applications and, more particularly, but not exclusively, to systems and methods for integrating generative artificial intelligence within SaaS platforms.

As organizations increasingly rely on multiple SaaS tools for different aspects of their operations, several challenges have emerged:

1. Data Fragmentation: Information often becomes siloed across different platforms, leading to inconsistencies and inefficiencies.
2. Manual Synchronization: Keeping data updated across multiple systems often requires time-consuming manual efforts, prone to human error.
3. Limited Cross-Platform Visibility: Decision-makers struggle to gain a holistic view of projects and processes spanning multiple tools.
4. Inefficient Workflow Management: The lack of seamless integration between platforms can result in workflow bottlenecks and reduced productivity.
5. Inconsistent User Experiences: Different interfaces and functionalities across various tools can lead to user confusion and decreased adoption rates.
6. Scalability Issues: As organizations grow, manually managing data across an increasing number of platforms becomes increasingly challenging.

While some integration solutions exist, they often rely on static, pre-defined rules that lack the flexibility to adapt to evolving business needs. Additionally, these solutions typically focus on data transfer rather than intelligent analysis and decision-making. The rapid adoption of multiple SaaS platforms and project management tools in modern businesses has led to a fragmented digital ecosystem. While these tools offer specialized functionalities, their lack of seamless integration creates significant challenges:

1. Data Inconsistency: Information often becomes outdated or contradictory across different platforms, leading to confusion and inefficient decision-making.
2. Manual Synchronization Burden: Employees spend considerable time manually updating information across various systems, reducing productivity and introducing human error.
3. Limited Cross-Platform Visibility: Managers struggle to gain a comprehensive view of projects and processes that span multiple tools, hindering effective oversight and strategic planning.
4. Workflow Inefficiencies: The lack of intelligent, automated coordination between platforms results in process bottlenecks and reduced operational efficiency.
5. Siloed Departmental Operations: Different departments using separate tools often leads to communication gaps and reduced collaboration.
6. Scalability Constraints: As organizations grow and adopt more tools, the complexity of managing and integrating these systems increases exponentially.
7. Inability to Leverage AI Potential: Current integration solutions lack the sophisticated AI capabilities needed to provide predictive insights and adaptive automation across platforms.

Embodiments of the present disclosure address these challenges by providing a novel system and method for seamlessly integrating generative AI capabilities into SaaS platforms. By doing so, it aims to enhance data synchronization, automate cross-platform workflows, provide intelligent insights, and ultimately improve organizational efficiency and decision-making in the increasingly complex landscape of cloud-based business tools.

Some embodiments of the present disclosure teach how to continuously monitor and analyze data across multiple SaaS platforms, automatically identifying and reconciling discrepancies to maintain data consistency without manual intervention.

Some embodiments of the present disclosure teach how to use AI to coordinate tasks and processes across different software services, ensuring that actions in one platform trigger appropriate updates or workflows in others.

Some embodiments of the present disclosure teach how to establish an AI-driven communication channel between different SaaS platforms, enabling them to exchange information and coordinate actions autonomously.

Some embodiments of the present disclosure teach analysing patterns across platforms to predict potential issues and bottlenecks, proactively suggesting or implementing optimizations to improve overall efficiency.

Some embodiments of the present disclosure teach how to provide a unified, AI-driven interface that adapts to user roles and preferences, offering seamless access and control across multiple integrated platforms.

Some embodiments of the present disclosure teach how to monitor account health across departments, automatically identifying issues and routing notifications to the most appropriate teams for resolution.

Some embodiments of the present disclosure teach how to use generative AI to understand user intents across platforms, automating complex multi-step processes based on simple, natural language instructions.

Each of these embodiments leverages advanced AI capabilities to create a more cohesive, efficient, and intelligent SaaS ecosystem, addressing the core challenges faced by organizations in managing their diverse digital toolsets.

Disclosed embodiments provide new and improved techniques for implementing generative AI solutions enabling enhanced data representation and management, for instance solutions involving deep learning algorithms, such as Generative AI models, for example large language models (LLM) based algorithms that can perform a variety of NLP tasks. The used generative AI models may learn the patterns and structure of input training data from systems such as described in FIG. 12 and then generate new data that has similar characteristics.

Disclosed embodiments relate to methods and systems for integrating generative AI capabilities into SaaS platforms. The disclosed innovations address the growing need for intelligent, adaptive, and efficient software solutions in cloud-based environments.

Central to at least some of the disclosed embodiments is a system for utilizing generative AI within a SaaS platform. This system displays a table structure containing items and their characteristics, incorporates an AI agent as a platform user, and provides it with contextual information about data types and structural relationships. The AI agent then generates and executes actions based on this information, enhancing the platform's functionality and user experience.

At least some of the disclosed embodiments introduce a method for intent-based interactions using AI agents with varying credentials within a SaaS platform. This approach allows for selective access and actions based on specific credential sets, ensuring appropriate use of AI capabilities across different aspects of the platform.

As used herein, the term "intent" refers to the user's desired end goal or outcome, rather than the specific steps needed to achieve that goal. An intent-based interaction allows users to express what they want to accomplish at a high level, without needing to specify the exact sequence of actions or processes required. For example, an intent-based interaction might involve a user stating "I want to set up a new project for the marketing team to launch our upcoming product." This expresses the user's intent or end goal. The AI system would then interpret this intent and automatically take care of the underlying steps needed, such as creating a new project workspace, setting appropriate permissions for marketing team members, creating initial task lists and timelines, setting up integrations with relevant marketing tools, and generating a basic project structure based on best practices for product launches. No indication for these steps may be provided by the user or presented to him explicitly. The AI system, with its varying levels of credentials, may perform the necessary actions across different aspects of the platform to fulfill the user's expressed intent. This allows reducing the cognitive load on users and leveraging the AI's capabilities to handle complex, multi-step processes automatically.

Furthermore, the at least some of the disclosed embodiments present a system for implementing hierarchical access control for AI agents within a SaaS platform. This system grants inherited edit privileges based on departmental structures, allowing for fine-grained control over AI agent activities while maintaining organizational hierarchies.

The present disclosure, in some embodiments thereof, yet further relates to methods for implementing artificial intelligence capabilities in software applications and, more particularly, but not exclusively, to systems and methods for integrating generative artificial intelligence within SaaS platforms.

Despite parallel developments of SaaS platforms wide adoption and artificial intelligence (AI) technological advancement as discussed herein, the integration of sophisticated AI capabilities within SaaS platforms has remained limited. Traditional SaaS solutions often struggle with several challenges.

First, users frequently find it difficult to efficiently explore and analyze large datasets within SaaS platforms. The ability to intuitively query and manipulate data remains constrained by traditional user interface paradigms. Second, existing systems often lack the ability to understand and utilize the context in which data exists, leading to less insightful analysis and recommendations. Third, many SaaS platforms operate in silos, with limited ability to perform actions across different applications or modules seamlessly. Fourth, creating custom solutions or scaling existing ones to meet specific business needs often requires extensive development efforts, increasing costs and time-to-market. Fifth, while some level of automation exists in current SaaS platforms, truly intelligent automation that can understand user intent and adapt to evolving requirements remains elusive. Also, the ability to present data in intuitive, interactive formats that aid in quick understanding and decision-making is often limited and efficient allocation and management of AI resources within SaaS environments to balance performance and cost considerations is an ongoing challenge.

These limitations have created a significant gap in the market for more intelligent, adaptive, and user-centric SaaS solutions. There is a clear need to address these challenges and unlock new possibilities in cloud-based software delivery.

Embodiments of the present disclosure aim to bridge this gap by introducing a suite of methods and systems that deeply integrate generative AI capabilities within SaaS platforms. By doing so, it seeks to transform how users interact with data, how applications communicate within the SaaS ecosystem, and how custom solutions are created and deployed.

Embodiments of the present disclosure represent a significant step forward in the evolution of SaaS platforms, promising to enhance productivity, decision-making, and overall user experience in cloud-based software environments. The following detailed description will elucidate the novel approaches and technologies employed to achieve these objectives.

Embodiments of the present disclosure relate to advanced methods and systems for integrating generative artificial intelligence (AI) capabilities within Software as a Service (SaaS) platforms. This suite of innovations addresses key challenges in data interaction, analysis, and product customization within cloud-based software environments.

According to some embodiments of the present disclosure there are described methods and system for AI-Assisted data interaction (e.g., FIG. 19A-19E). These embodiments introduce an AI-supported cursor state that allows users to interact with structured data in novel ways. By toggling into an AI-supported state, users can mark areas of interest and query a generative AI model about the data. This method significantly enhances data exploration and analysis capabilities within SaaS platforms.

Figure 20:
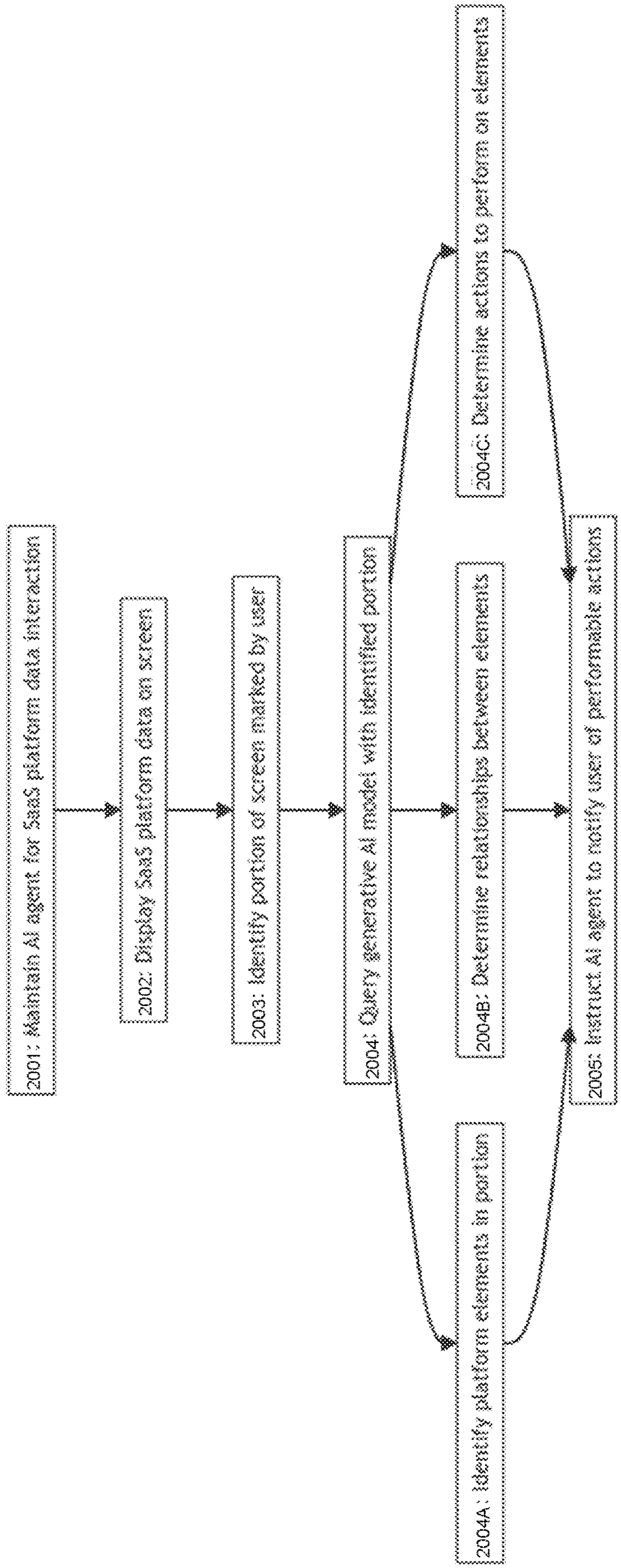
FIG. 20 is a flowchart illustrating a process for querying a generative AI model about information presented by a SaaS platform, according to some embodiments of the present disclosure.

According to some embodiments of the present disclosure there are described methods and system for context-aware AI Querying (e.g., FIG. 20). Building on the AI-assisted interaction, this disclosed subject matter enables the generative AI model to understand and utilize the context of selected data elements. It allows for more nuanced and relevant AI responses, taking into account relationships between different data elements and their surrounding context within the SaaS platform.

Figure 21:
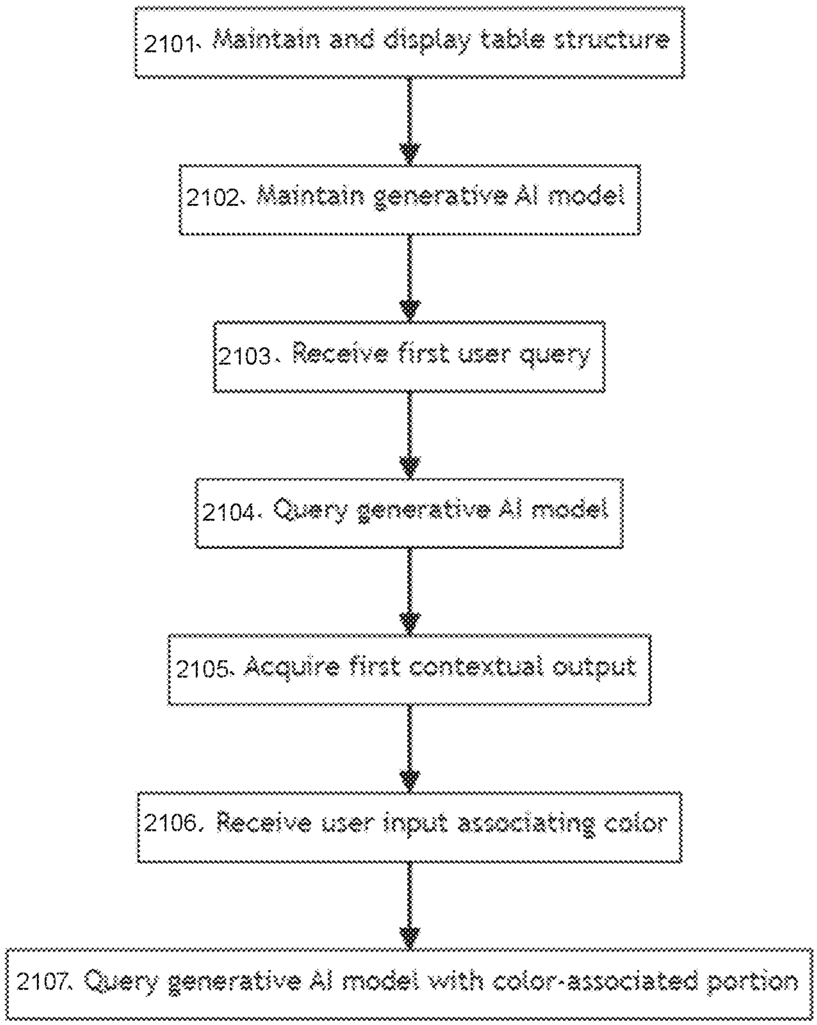
FIG. 21 is a flowchart illustrating a process for querying a generative AI model about color context in structured data, according to some embodiments of the present disclosure.

According to some embodiments of the present disclosure there are described methods and system for color-context aware data analysis (e.g., FIG. 21). These embodiments allow the generative AI model to interpret and utilize color-based context in structured data. By understanding the semantic meaning of colors in data presentation, the system can provide more insightful analysis and recommendations, enhancing data visualization and interpretation.

Figure 22:
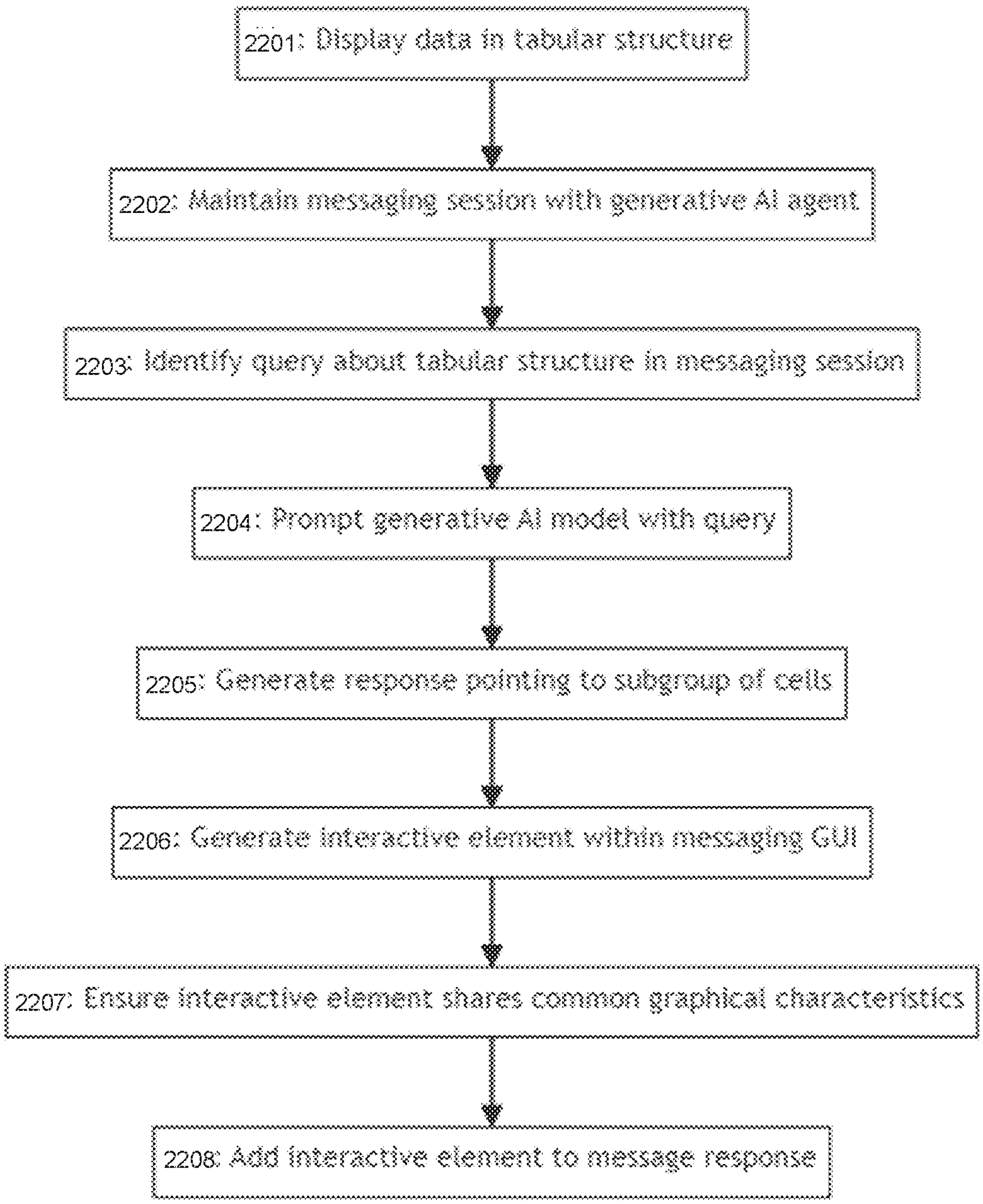
FIG. 22 is a flowchart illustrating a process for generating interactive elements in a messaging session, according to some embodiments of the present disclosure.

According to some embodiments of the present disclosure there are described methods and system for interactive ai-generated elements in messaging (e.g., FIG. 22). These embodiments teach focus on generating interactive elements within messaging sessions that mirror the visual characteristics of source data. It bridges the gap between conversational interfaces and data manipulation, allowing users to interact with and modify data directly within chat-like interfaces.

Figure 23:
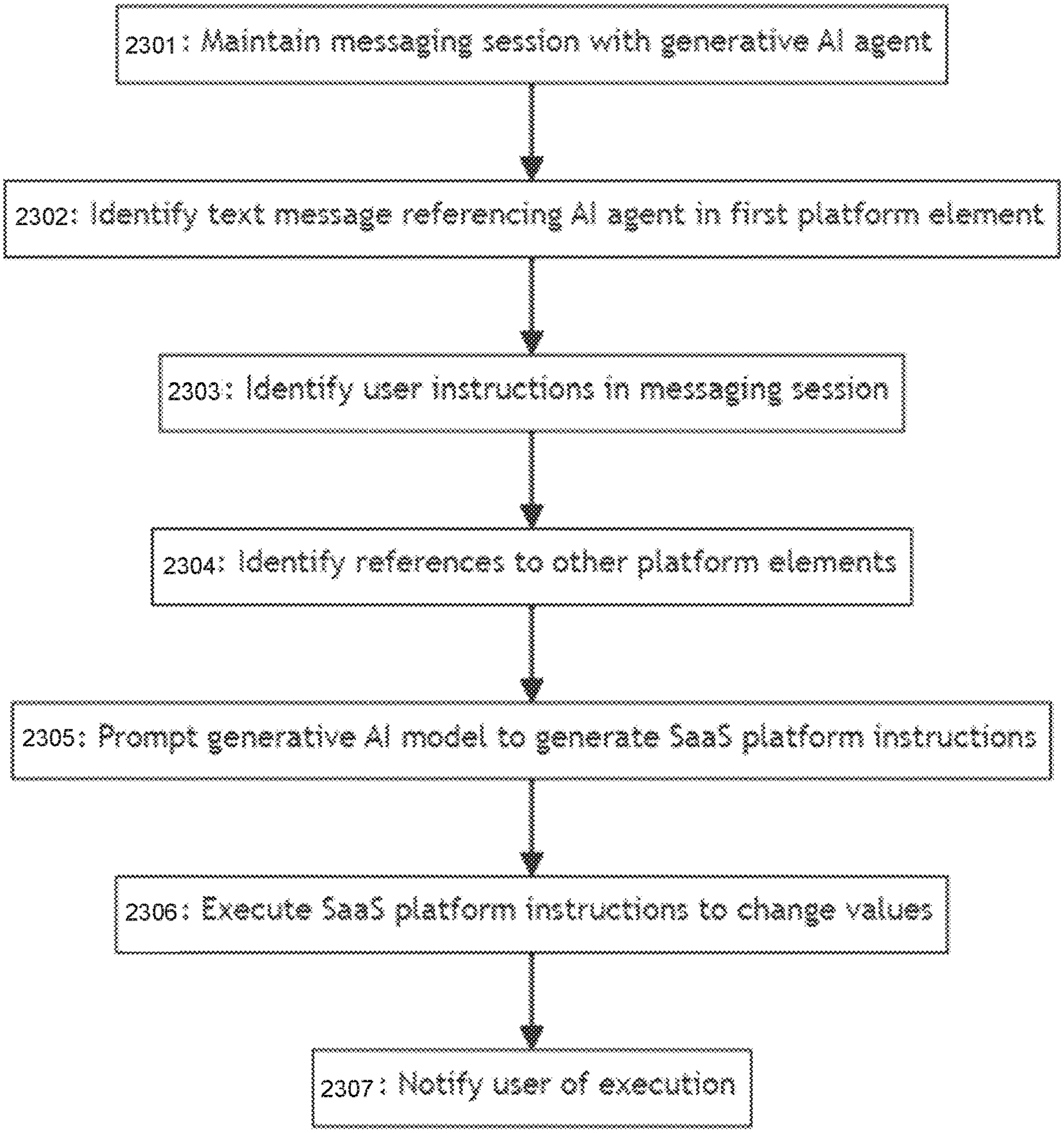
FIG. 23 is a flowchart illustrating a process for operating a SaaS platform with cross-application generative AI agent interaction, according to some embodiments of the present disclosure.

According to some embodiments of the present disclosure there are described methods and system for cross-application generative AI agent interaction (FIG. 23). These embodiments enable generative AI agents to perform actions across multiple platform elements or applications based on a single user mention. It significantly enhances workflow efficiency by allowing seamless integration of AI capabilities across different parts of the SaaS platform.

Figure 24:
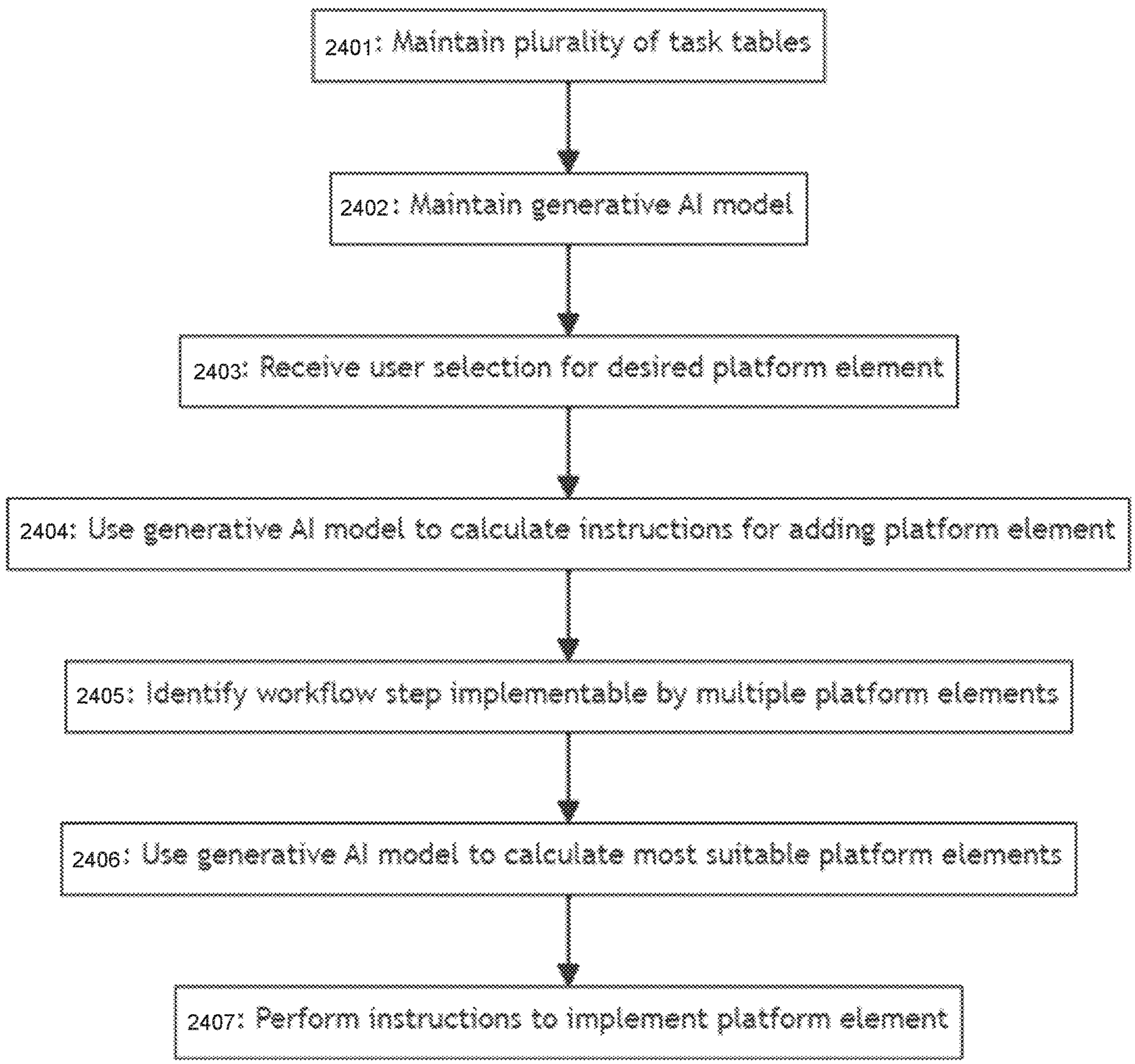
FIG. 24 is a flowchart illustrating a process for using generative artificial intelligence for intent-based interaction with a SaaS platform, according to some embodiments of the present disclosure.

According to some embodiments of the present disclosure there are described methods and system for intent-based platform element creation (FIG. 24). These embodiments teach generative AI to create new platform elements based on user requirements. It automates the process of identifying, selecting, and implementing the most suitable components to fulfill user needs, streamlining the customization of SaaS platforms.

Figure 25:
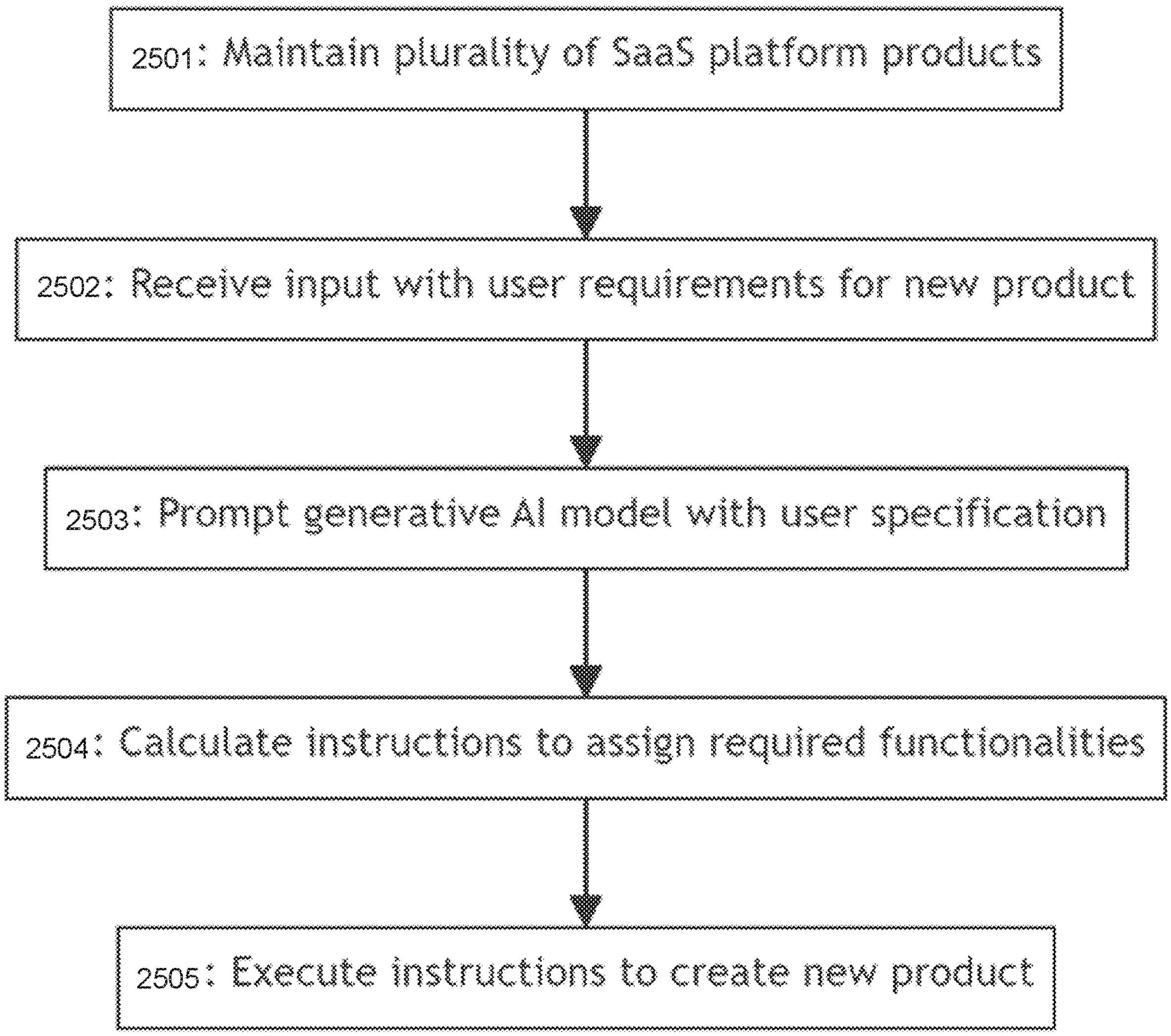
FIG. 25 is a flowchart illustrating a process for using generative artificial intelligence to create custom SaaS platform products, according to some embodiments of the present disclosure.

According to some embodiments of the present disclosure there are described methods and system for AI-driven custom product creation (FIG. 25). These aspects of the disclosed subject matter detail methods for creating custom SaaS products by combining functionalities from existing products using generative AI. They enable rapid development of tailored solutions that meet specific client requirements without extensive manual development.

Collectively, these aspects of the disclosed subject matter represent a significant advancement in the field of SaaS and AI integration. They enable more intuitive data interactions, enhance the adaptability and customization capabilities of SaaS platforms, and leverage AI to automate complex tasks across various aspects of cloud-based software solutions.

The synergy between these aspects of the disclosed subject matter creates a powerful ecosystem where AI not only assists in data analysis and interaction but also plays a crucial role in shaping and evolving the SaaS platform itself. This approach positions the SaaS platform to dynamically adapt to user needs, potentially revolutionizing how businesses interact with and benefit from cloud-based software solutions.

By addressing key challenges in data interaction, cross-application functionality, and product customization, these aspects of the disclosed subject matter pave the way for next-generation SaaS platforms that are more intelligent, responsive, and aligned with specific business needs.

The methods and systems described herein provide numerous significant advantages over conventional SaaS platforms and AI integration approaches. These benefits stem directly from the novel architectural choices and implementation strategies outlined in the preceding sections. Enhanced user interaction and productivity wherein the AI-supported cursor state and interactive element generation (as described in FIG. 19A and FIG. 22) significantly streamline user interactions with complex data structures. By allowing users to query and manipulate data through natural language and AI-generated interactive elements, the system reduces cognitive load and increases productivity. For instance, the ability to change multiple cells with a single AI-interpreted command can drastically reduce the time required for data entry and modification tasks.

Moreover, the color-context aware data analysis (FIG. 21) and the generative AI model's ability to interpret data based on visual cues provide a level of contextual understanding previously unattainable in SaaS platforms. This feature enables more nuanced and accurate data interpretation, leading to better decision-making and insights. The system's continuous learning capabilities ensure that it becomes more attuned to user needs and industry-specific requirements over time.

The method for operating across multiple platform elements or applications based on a single mention (FIG. 23) breaks down silos typically found in SaaS environments. This seamless integration across different parts of the platform enhances workflow efficiency and data coherence, providing users with a more unified and powerful toolset.

The system's ability to create custom SaaS platform products by combining functionalities from existing products (FIG. 25) offers unprecedented levels of customization. This feature allows businesses to tailor the SaaS platform to their specific needs without extensive custom development, reducing costs and time-to-market for new solutions.

The generation of interactive elements that maintain visual consistency with source data (FIG. 22) aids in data comprehension and analysis. Users can more easily understand complex data relationships and trends, leading to more informed decision-making.

The hierarchical access control system for generative AI agents ensures that organizations can maintain their existing security protocols and data governance policies while benefiting from advanced AI capabilities. This feature is crucial for industries with strict regulatory requirements, allowing them to leverage AI without compromising on compliance.

The management of AI resources as limited assets enables organizations to optimize their use of AI capabilities. This approach ensures efficient allocation of computational resources, potentially reducing costs associated with AI implementation while maximizing the value derived from these advanced features.

The modular architecture and the system's ability to incorporate new functionalities make it inherently extensible. As new AI technologies emerge, they can be integrated into the existing framework, ensuring that the SaaS platform remains at the cutting edge of technological capabilities.

By integrating these advanced AI capabilities into the core functionality of a SaaS platform, the present disclosure represents a significant leap forward in business software solutions. It not only enhances current operational efficiencies but also opens up new possibilities for data analysis, decision-making, and process automation that were previously unattainable in traditional SaaS environments.

For clarity, teaching of any method described herein, provides teaching for a system implementing this method and the teaching of any system described herein, provides teaching for a method implemented using this system.

The integration of generative AI capabilities into SaaS platforms, as described herein, offers numerous significant benefits to users and organizations alike. One primary advantage is the substantial increase in productivity and efficiency. By automating complex tasks and providing intelligent assistance, generative AI agents can significantly reduce the time and effort required for data analysis, decision-making, and routine operations. This allows human users to focus on higher-value activities that require creativity and strategic thinking. The proactive information gathering capability of the generative AI agents addresses a common challenge in project management and team collaboration. By autonomously identifying and collecting missing information, the system minimizes delays and reduces the likelihood of oversights, leading to smoother project execution and improved outcomes. The hierarchical access control system for generative AI agents ensures that organizations can maintain their existing security protocols and data governance policies while benefiting from AI capabilities. This feature allows for the seamless integration of AI into established workflows without compromising sensitive information or disrupting existing organizational structures. The interactive analysis of AI outputs provides a layer of transparency that is crucial for building trust in AI-driven systems. By allowing users to query and understand the reasoning behind AI-generated results, the disclosed subject matter promotes informed decision-making and helps mitigate concerns about the "black box" nature of AI algorithms. The management of AI resources as limited assets enables organizations to optimize their use of AI capabilities. This approach ensures that AI resources are allocated efficiently, preventing overuse or underutilization, and potentially reducing costs associated with AI implementation. The contextual data analysis feature significantly enhances the depth and accuracy of insights that can be derived from structured data. By understanding the nuances of different data types and their relationships, the generative AI agent or generative AI model can provide more meaningful and actionable insights, leading to better-informed business strategies. Furthermore, the intent-based interaction system, which uses generative AI agents with different credential sets, allows for a more personalized and secure user experience. Users can interact with generative AI agents that are appropriately scoped to their needs and permissions, enhancing both the relevance of AI assistance and the overall security of the platform.

As used herein intent-based interaction is a capability of user interaction with a software system where the system interprets the user's underlying intention or goal, rather than relying solely on explicit commands. The system may use natural language processing, context analysis, and machine learning to understand and act on the user's intent, allowing for more intuitive and flexible interactions.

As used herein a generative AI model is a function trained using machine learning technical to receive inputs such as text, image, audio, video, and code and generate new content into any of defined modalities. For example, it can turn text inputs into an image, turn an image into a song, or turn video into text. One example of a language-based generative model is a large language model (LLM). Another example is a model adapted for creation of 3D images, avatars, videos, graphs, and other illustrations. Generative AI models can create graphs, realistic images, produce 3D models, logos, enhance or edit existing images, and the like. Another example is a model adapted for generating synthetic data to train AI models when data doesn't exist.

As used herein a generative AI agent is a software application or an interface that is designed to mimic human conversation through text or voice interactions based on usage of generative AI models. For example, the generative AI agent is capable of maintaining a conversation with a user in natural language and simulating the way a human would behave as a conversational user of the described SaaS platform. Such agents may use deep learning and natural language processing.

Optionally, the generative AI agent model and/or the AI model is pre-trained on a large corpus of general text data. The model may be fine-tuned on SaaS-specific datasets, including anonymized interaction logs from one or more SaaS platforms, including SaaS platform depicted in FIG. 1A. The synthetic datasets may be generated to cover rare or sensitive scenarios and documentation and knowledge base articles related to SaaS operations. Optionally, the model is updated periodically using federated learning techniques to incorporate new patterns and knowledge without compromising data privacy.

The generative AI model described herein with reference to any of the figures may be used for enabling interactions with the SaaS platform data and user queries. The architecture may be based on a hybrid approach, combining several advanced machine learning techniques such as transformer-based Architecture, similar to GPT (Generative Pre-trained Transformer) models. Multi-head self-attention mechanisms for processing both textual and structured data may be used, for instance with positional encoding to maintain sequence information in input data and/or layer normalization and residual connections for stable training and inference. Optionally, multimodal processing that incorporates separate encoding branches for different data types (text, tabular data, images) is used. Optionally, byte-pair encoding (BPE) for tokenization is used. Entity embeddings for categorical variables and normalized numerical inputs is used for processing tabular data. A convolutional neural network (CNN) backbone, such as Reset or EfficientNet is used for analyzing image built from marked area and/or pixels as described below. Cross-attention layers may be added to allow interaction between different modalities and to enable the model to align information from text queries with relevant parts of tabular or image data. Optionally, in multi-interaction process described herein below, a context buffer is maintained to store relevant information from previous interactions. Attention mechanisms may be used to selectively retrieve and apply contextual information. An autoregressive decoder may be used for generating text responses, optionally, with pointer network for referencing specific parts of the input data in responses and/or a mixture of expert modules for specialized outputs (e.g., SQL generation, data visualizations). As used herein the generative AI model may be an outcome of pre-training on large corpus of SaaS platform data and optionally general knowledge bases. Optionally the model is fine-tuned on specific customer datasets and use cases.

All aspects of the entertainment industry, from video games to film, animation, world building, and virtual reality, are able to leverage generative AI models to help streamline their content creation process. Creators are using generative models as a tool to help supplement their creativity and work.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspects of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience and form the word "embodiment" as used herein is intended to refer to a single embodiment or multiple embodiments of the disclosure.

Certain embodiments disclosed herein include devices, systems, and methods for collaborative work systems that may allow one or more users to interact with information in real time. To avoid repetition, the functionality of some embodiments is described herein solely in connection with a processor or at least one processor. It is to be understood that such exemplary descriptions of functionality apply equally to methods and computer-readable media and constitute a written description of systems, methods, and computer-readable media. The underlying platform may allow a user to structure systems, methods, or computer-readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond what is displayed in a table. For example, a board may further contain cell comments, hidden rows and columns, formulas, data validation rules, filters, specific formatting, audits logs, version history, cross-referencing with different boards, external linking with data sources, permissions of access or a combination thereof. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining one or more associated data types and may further include metadata (e.g., definitions, validation rules, ranges, hyperlinks, macros . . . ). When used herein in combination with a column, a row may be presented horizontally and a column vertically. However, in the broader generic sense as used herein, the term "row" may refer to one or more of a horizontal and/or a vertical presentation. A table or table structure as used herein, refers to data presented in horizontal and vertical rows, (e.g., horizontal rows and vertical columns) defining cells in which data is presented. A table structure may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the table structure defined by the structure of the table. For example, a cell may be defined as an intersection between a horizontal row with a vertical column in a table structure having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure but rather may be practiced in conjunction with any desired organizational arrangement. In addition, table structure may include any type of information, depending on intended use. As an example, when used in conjunction with a project/task management application, the table structure may include any information associated with one or more tasks, such as one or more status values, projects, time-frames/deadlines, countries, persons, teams, progress statuses, a combination thereof, or any other information related to a task. In some cases, a hierarchy may be established between different items/cells in the same row. For example, a unique identifier (UID) may be assigned to an item and the other cell of the same row may then be associated with the item or the assigned UID.

While a table view may be one way to present and manage the data contained on a board, a table or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics (which may also be referred to more generically as "widgets"). In some instances, dashboards may also include table structure. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. In alternative scenarios, permission may not only be provided at the board level, but also at a more granular level such as rows, columns, and even individual cells, allowing for fine-grained control over who may access, view, edit, or interact with the data included in the board, particularly useful when dealing with collaborative boards. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real-time in collaborative work systems involving electronic collaborative word-processing documents. Electronic collaborative word processing documents (and other variations of the term) as used herein are not limited to only digital files for word processing but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information and may be linked to other sources of data for dynamic updates. Blocks may be automatically organized by the system or may be manually selected by a user according to preference. In one embodiment, a user may select a segment of any information in an electronic word-processing document and assign it as a particular block for input, editing, formatting, or any other further configuration.

An electronic collaborative word-processing document may be stored in one or more repositories connected to a network accessible by one or more users through their computing devices. In one embodiment, one or more users may simultaneously edit an electronic collaborative word-processing document. The one or more users may access the electronic collaborative word-processing document through one or more user devices connected to a network. User access to an electronic collaborative word processing document may be managed through permission settings set by an author of the electronic collaborative word processing document. Alternatively, permissions to specific portions of the electronic collaborative word-processing document may be provided in order to control access, facilitate collaboration, and ensure that different users have appropriate levels of involvement and authority over different parts of the content. An electronic collaborative word-processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer-readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as temporary storage. Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuits (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random-Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated into a single circuit. When more than one processor is used, the processors may be configured to operate independently or collaboratively and may be co-located or located remotely from each other. The processors may be coupled electrically, magnetically, optically, acoustically, mechanically, or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the foregoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or an unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near-field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column-oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), or virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multi-dimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database, or NoSQL alternatives for data storage/search such as MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data with different levels of granularity (e.g., a specific board, a plurality of boards . . . ) or across an entirety of an account or entity (e.g., multiple boards, workspaces, or projects within the account). An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more automations, logical rules, logical sentence structures, and logical (sentence structure) templates. While these terms are described herein in differing contexts, in the broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that responds to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, NLP algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyperparameters, where the hyperparameters are set manually by a person or automatically by a process external to the machine learning algorithm (such as a hyperparameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

Project management platforms are digital tools or software designed to streamline and automate various processes within an organization. They help to coordinate and manage tasks, activities, and information flow among several team members or different departments, ensuring efficient collaboration and productivity. These platforms typically provide features such as task assignment, progress tracking, notifications, and document management. In some cases, these platforms may correspond to a Software-as-a-Service (SaaS) platform. Within the context of this disclosure, a SaaS platform may refer to any kind of cloud-based software delivery model where service providers host software applications and make them accessible to users over the Internet. Instead of installing, managing, and maintaining the software locally, users access and utilize it through a web browser or thin client interface.

SaaS platforms offer a wide range of applications and services to meet various business needs such as customer relationship management (CRM), human resources management (HRM), project management, accounting, marketing automation, and more. In most scenarios, these platforms operate on a subscription basis, with customers paying recurring fees for software access and usage. SaaS platforms may provide several advantages including:

- Accessibility: Users may conveniently and securely access software and data from any device with an internet connection.
- Scalability: SaaS platforms may easily scale up or down to accommodate changing business requirements, providing flexibility and cost-effectiveness.
- Cost-effectiveness: By eliminating upfront investments in hardware and software, SaaS may reduce initial costs. Customers may pay subscription fees based on their usage.
- Maintenance and Updates: Service providers handle software maintenance, updates, and security patches, relieving customers of these responsibilities.
- Collaboration: SaaS platforms often offer collaboration features, enabling multiple users to work together, share data, and communicate within the platform.
- Customization: SaaS platforms can offer a high level of customization, allowing businesses to tailor the software to their specific needs. These applications can be seamlessly integrated with other business applications, particularly those offered by the same software provider. This integration enables smooth data flow and collaboration between different software systems, enhancing overall productivity and efficiency.

Some examples of SaaS platforms include Monday.com™ for project management, Salesforce™ for CRM, Slack™ for team collaboration, Dropbox™ for file hosting and sharing, Microsoft 365™ for productivity tools, Google Workspace™ apps for productivity and collaboration tools, Zendesk™ for customer support, HubSpot™ for marketing, and Shopify™ for e-commerce.

SaaS platforms may include a plurality of SaaS platform elements which may correspond to components or building blocks of the platform that work together to deliver software applications and services over the Internet. Examples of such elements may include application software, infrastructure, or user interface. For example, a platform may offer project management capabilities to its users via dashboards, tables, text documents, a workflow manager, diverse applications offered on a marketplace, all of which constitute building blocks and therefore elements of the platform. Application offered on the marketplace may be provided by developers external to the SaaS platform, accordingly, they may utilize a user interface different from a generic user interface provided by the SaaS platform. In addition, each SaaS platform element may include a plurality of SaaS platform sub-elements which may refer to smaller components or features that are part of a larger element within a SaaS platform. These sub-elements may be designed to perform specific tasks or provide specialized functionality. The collaboration of multiple sub-elements aims to create a comprehensive and integrated SaaS solution. Examples of SaaS platform sub-element may include a widget associated with a dashboard, a column or a cell associated with a table, a workflow block associated with a workflow manager, or management tools. As used herein, a SaaS platform element is a discrete component or building block within a SaaS platform that provides specific functionality or serves a particular purpose. These elements can include, but are not limited to, tables, dashboards, workflows, text documents, and applications available through a marketplace. SaaS platform elements can be combined or customized to create tailored solutions within the platform.

Figure 1A:
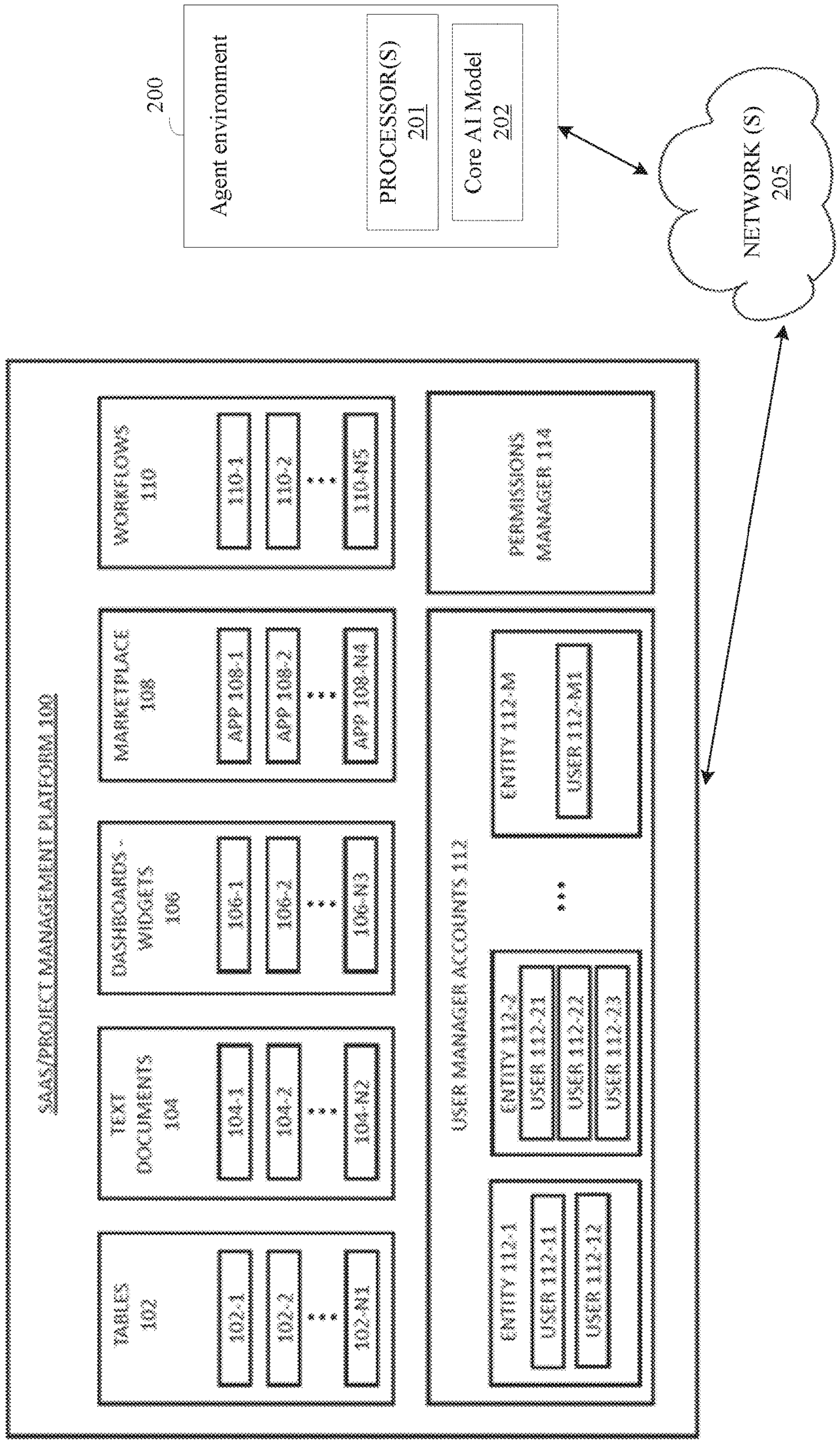
FIG. 1A is a block diagram of an exemplary SaaS platform and agent environment, consistent with some embodiments of the present disclosure.

Reference is now made to FIG. 1A which is a block diagram of an exemplary SaaS platform 100 and agent environment 200, consistent with some embodiments of the present disclosure. Although the agent environment 200 is depicted as a separate environment it can be part of the SaaS platform 100 itself. The agent environment 200 may be in communication with the SaaS platform 100 as described in any of the embodiments below, for instance via network 205 or directly based on any common software component communication protocols or in the common process of executing software components.

As illustrated, SaaS platform 100 includes a plurality of SaaS platform elements, namely Tables 102, Text documents 104, Dashboards 106, Marketplace 108, and Workflows 110. Each of these SaaS platform elements includes a plurality of SaaS platform sub-elements respectively 102-1 through 102-N1 for Tables 102, 104-1 through 104-N2 for Text documents 104, 106-1 through 106-N3 for Dashboards 106, APP 20 through APP 108-N4 for Marketplace 108 and 110-1 through 101-N5 for Workflows 110, wherein N1, N2, N3, N4 and N5 represent natural numbers.

It is to be appreciated that these SaaS platform elements may collaborate seamlessly. For instance, a text document (e.g., 104-1) might incorporate data from a table (e.g., 102-1), and a dashboard/widget (e.g., 106-1) might display data originating from a table (e.g., 102-1). This integration may ensure a cohesive and flexible user experience, allowing different components of the platform to work together effectively and dynamically share data. Additionally, it is to be appreciated that the utilizations of data originating from a first SaaS platform element (e.g., a table), by a second SaaS platform (e.g., a widget included a plurality of graphical representations) may not necessarily lead to additional memory allocation on a SaaS platform server. This efficiency may be achieved because the data is not duplicated for each view (a table view or a dashboard/widget view). Instead, the data may be dynamically imported from the first SaaS platform element, often using pointers to their specific locations in memory. This approach ensures that the original data remains intact and avoids the overhead associated with creating multiple copies, thereby optimizing memory usage and improving the overall performance of the server. For example, when a user of the SaaS platform requests a graphical representation (widget view) of data from a table, the platform may retrieve the necessary data by referencing the memory locations where the data is stored, rather than creating new instances of the data. These references, or pointers, serve as links to the original data, enabling the server to efficiently handle multiple requests without incurring significant memory costs. By leveraging this method, the SaaS platform may support numerous simultaneous views and graphical representations without a proportional increase in memory usage. Furthermore, this approach allows for real-time data updates to be reflected instantly across all views. Since all views point to the same data source, any changes to the data are immediately visible, ensuring consistency and accuracy. This method may be advantageous in environments where data is frequently updated, such as in financial systems, real-time analytics, and monitoring applications.

Several entity or organization accounts (user management accounts) 112 (112-1 to 112-M, M being a natural number) may be affiliated with SaaS platform 100 and managed via a user manager. Each of these entity accounts may include at least one user account. For example, entity account 112-1 includes two user accounts 112-11, 112-12, entity account 112-2 three user accounts 112-21, 112-22, and 112-23, and entity account 112-M one user account 112-M1. Within the context of the disclosed embodiments, an entity account may refer to the central account managing the overall SaaS platform subscription, billing, and settings. Within this entity account, multiple user accounts may be created for different individuals within the entity/organization. User accounts may have their own login credentials, access privileges, and settings. The entity account owner or administrators may have control over access, permissions, and data segregation. User accounts may collaborate and share resources within the entity account while maintaining a personalized experience. Each of the user accounts 112 may include different permutations of SaaS platform elements such as a plurality of tables, text documents, dashboards, marketplace applications (e.g., 108) or management tools (not shown in FIG. 1A) in association with the above-mentioned SaaS platform elements 102, 104, 106, 108, and 110. Accordingly, various SaaS platform elements or sub-elements may include metadata associated with users. Metadata associated with users may provide additional information and context about the users themselves, their profiles, roles, preferences, and interactions within the SaaS platform. Examples of metadata may include user profiles, roles and permissions, activity logs, usage indications, preferences and settings, user associations/relationships, user history or a combination thereof.

As used herein a user account may be associated with a human or a generative AI agent. The generative AI agent may be implemented in a computerized agent environment 200 using a Core AI Model 202 that incorporates Natural Language Understanding (NLU) and Natural Language Generation (NLG) capabilities. This Core AI Model can be a transformer-based model (e.g., GPT-3.5, GPT-4, or open-source alternatives like BERT or T5) executed in a framework such as PyTorch or TensorFlow and deployed on the environment 200 (e.g., part of platform 100 or a separate system communicating with the platform 100) such as an NVIDIA Triton Inference Server or TensorFlow Serving.

When the computerized agent environment 200 is executed separately from the platform it may communicate therewith via digital data communication (e.g., a communication network 205). Examples of communication networks include a local area network ("LAN"), a wide area network ("WAN"), and the Internet.

The core model provides the foundation for both NLU and NLG functionalities. It receives processed input from the NLU component and sends raw output to the NLG component for refinement.

The NLU processes incoming messages, extracting intents and entities. It feeds processed information to the Core AI Model and updates Context Management. The NLG receives raw output from the Core AI Model, refines it based on context, and produces human-readable responses.

The NLU may be implemented using libraries such as spaCy or NLTK for text processing and intent/entity extraction. The NLG may be implemented using template-based systems like Jinja2 or neural-based approaches such as GPT-3 Application Programming Interface (API) or fine-tuned GPT-2, which receive raw output from the Core AI Model, refine it based on context from Context Management, and produce human-readable responses.

Optionally, the generative AI agent can be executed as in the agent environment 200 or as part of the platform 100 by one or more processors 201. When executed in a separate environment, an API Integration Layer may be implemented to facilitate communication between the generative AI agent or generative AI model and the SaaS platform. This layer may include a RESTful API client (e.g., Python requests library), GraphQL client (e.g., gql for Python), and/or OAuth 2.0 for authentication (e.g., authlib library). It sends platform responses to the Core AI Model and Context Management and receives actions to execute from a decision engine. The decision engine processes information from the Core AI Model, consults a memory and knowledge base, and determines actions. It then either initiates tasks via the Task Planning Module or generates responses through NLG.

Optionally, the agent environment includes a context management module, task planning module, and a decision engine to provide contextual information to the Core AI Model. The task planning module receives high-level objectives from the decision engine, breaks them down into steps, and coordinates with the API integration layer for execution. The Memory and Knowledge Base component interacts with the Core AI Model, Decision Engine, and Context Management, providing long-term storage and retrieval of information. It's queried by the Core AI Model and Decision Engine and updated based on new interactions and learning.

All or some of the components collect data from other components for performance tracking, error detection, and system optimization. In operation, the Decision Engine orchestrates overall behavior, the Task Planning Module manages multi-step processes, and the Context Management ensures coherence across interactions. This interconnected architecture allows for flexible, context-aware interactions while maintaining security and scalability.

In addition, each of these user accounts may include one or more private apps, that have been specifically designed and tailored to suit the needs of a user and that employ functionalities offered by or in association with SaaS platform 100 (via SaaS platform elements 102, 104, 106, 108, and 110 or their associated sub-elements). Private apps are exclusively accessible to users who are affiliated with an entity owning or implementing that app. These applications may not be publicly available (i.e., not on the market/publicly offered on the marketplace 108) and may only be accessed by individuals who have specific authorization or are part of the designated user group. The privacy settings associated with these apps restrict access to ensure that only authorized users can use and interact with them. This level of privacy and restricted access helps maintain confidentiality, control, and security over the app's functionalities and data, limiting usage to approved individuals within the user account. Centralization of user access and authorization management is performed by a permission manager 114 enabling administrators to control and regulate user privileges, ensuring that users have appropriate levels of access to data, features, and resources based on their roles and responsibilities. Permissions Manager 114 may offer granular control, and role-based access, facilitating efficient user management, collaboration, and compliance monitoring. Its objective is to enhance data security, streamline user administration, and maintain proper governance within the SaaS platform.

Still referring to FIG. 1A, SaaS platform 100 may include one or more management tools that may involve a combination of one or more SaaS platform element or sub-element. For example, a solution may leverage data stored in one or more tables and offer comprehensive data visualization through prebuilt dashboards and widgets, furnishing users with deep and meaningful insights into their operations. In some embodiments, these tools may enable visualization of alphanumeric data in a non-alphanumeric manner. For instance, instead of conventional tables or charts, these tools may employ immersive graphical interfaces or interactive simulations to depict complex datasets. These visualizations may encompass versatile views such as Kanban boards, timeline representations, Gannt charts, or other representations, offering users diverse perspectives and facilitating informed decision-making. This approach enables users to interact with the data in a more intuitive and engaging manner, facilitating deeper understanding and analysis. Each of these management tools may be coupled to one or more user accounts 112 and may operate synergistically within SaaS platform 100, empowering users to streamline and optimize their sales processes, from lead generation to deal closure. These tools leverage the analytical capabilities of the SaaS platform to provide users with actionable insights and facilitate efficient management of their sales pipelines.

In order to provide meaningful data visualizations, management tools may access one or more data structures. A data structure refers to any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include a data pool (whether a structured or an unstructured pool), an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. Additionally or alternatively, some or all of the data structure may be organized using the Ruby on Rails web application framework. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures. A data structure may include a plurality of data items and may define the relationship between the items and the operations that may be performed on them. Each item may include one or more characteristics associated with a value (e.g., an alphanumeric value). A data structure may include a plurality of items. Examples of items may include but are not limited to a deal, a transaction, a client account, a prospect, a task, a user record, or an order. A characteristic of an item may include any distinctive feature or quality that helps to identify or define an item. The characteristics of items may include, for example, a deal size, an associated level of risk, one or more associated salespersons, a client name, a phase in the sales funnel, a client type, one or more due dates, a rate of completion, comments, or any additional feature or quality relevant to an item included in a data structure. The characteristics of an item may present relationships and patterns that offer valuable insights into customer behavior, sales trends, and operational efficiencies. For instance, analyzing the relationship between deal size and associated risk levels can help identify high-risk, high-reward opportunities or tracking the performance of salespersons in relation to deal phases and completion rates can highlight strengths and areas for improvement within the sales team. The plurality of items of a data structure may be associated with a common objective. A common objective refers to a shared goal or aim. Examples of common objectives in a business context include increasing revenues, sales, profitability, customer retention, or number of customers; or decreasing waste, expense, or loss of customers. In general, a common objective can refer to increasing a positive measure and/or decreasing a negative measure. In this context, a common objective may guide the arrangement and interaction of the individual elements towards a shared purpose or goal. This objective could span a broad spectrum, ranging from high-level aspirations, such as maximizing profitability or efficiency, to more specific aims, such as streamlining processes or achieving targeted outcomes. Whether the objective is overarching or focused, the association between the items and the common objective underscores the cohesion and purposefulness of the data structure, driving meaningful insights and outcomes. A comprehensive visualization of the data structure may provide valuable insights into the common objective. By presenting the relationships and patterns inherent within the data structure, such a visualization may enable a deeper understanding of how individual items contribute to the overarching goal. This comprehensive view may facilitate the identification of key trends, dependencies, and potential optimizations that can propel progress towards achieving the common objective. Moreover, by offering a holistic perspective, the visualization may empower user (e.g., salesperson, salesperson manager etc.) to make informed decisions and strategic adjustments, leveraging the collective knowledge embedded within the data structure to drive towards the desired common objective.

Some disclosed embodiments may involve stored data such as alphanumeric data which are accessible when a user interacts with graphical elements having a plurality of graphical characteristics. Within the context of this disclosure, alphanumeric data refers to data composed of either or both letters (alphabetic) and numbers. This type of data may include any combination of the 26 letters of the English alphabet (A-Z, a-z) and the 10 numeric digits (0-9). Additionally, alphanumeric data may also encompass ideograms, such as those used in Chinese or Japanese characters, or characters from any other alphabet, such as Cyrillic, Hebrew, Greek, or Arabic. A graphical element is a visual component that conveys information. By way of non-limiting examples, graphical elements can include shapes, lines, colors, textures, images, icons, and symbols. Discrete graphical elements refer to individual visual components that are distinct from one another, enabling visual comparison between them. Each element may adopt a plurality of graphical characteristics such as shape, color, size/dimensions, borderline, texture or position with respect to a screen and/or other presented elements, that may be used to visually encode information. In this disclosure, unless specified otherwise, a graphical element may equally refer to the visual representation/entity as presented on a display and/or to the underlying data model of the visual representation that can be readily understood and manipulated by a processing device and that includes properties defining the graphical characteristics of the visual representation.

Based on the system overview, we now examine the specific processes that enable AI integration within the SaaS platform using the agent environment 200.

Figure 1B:
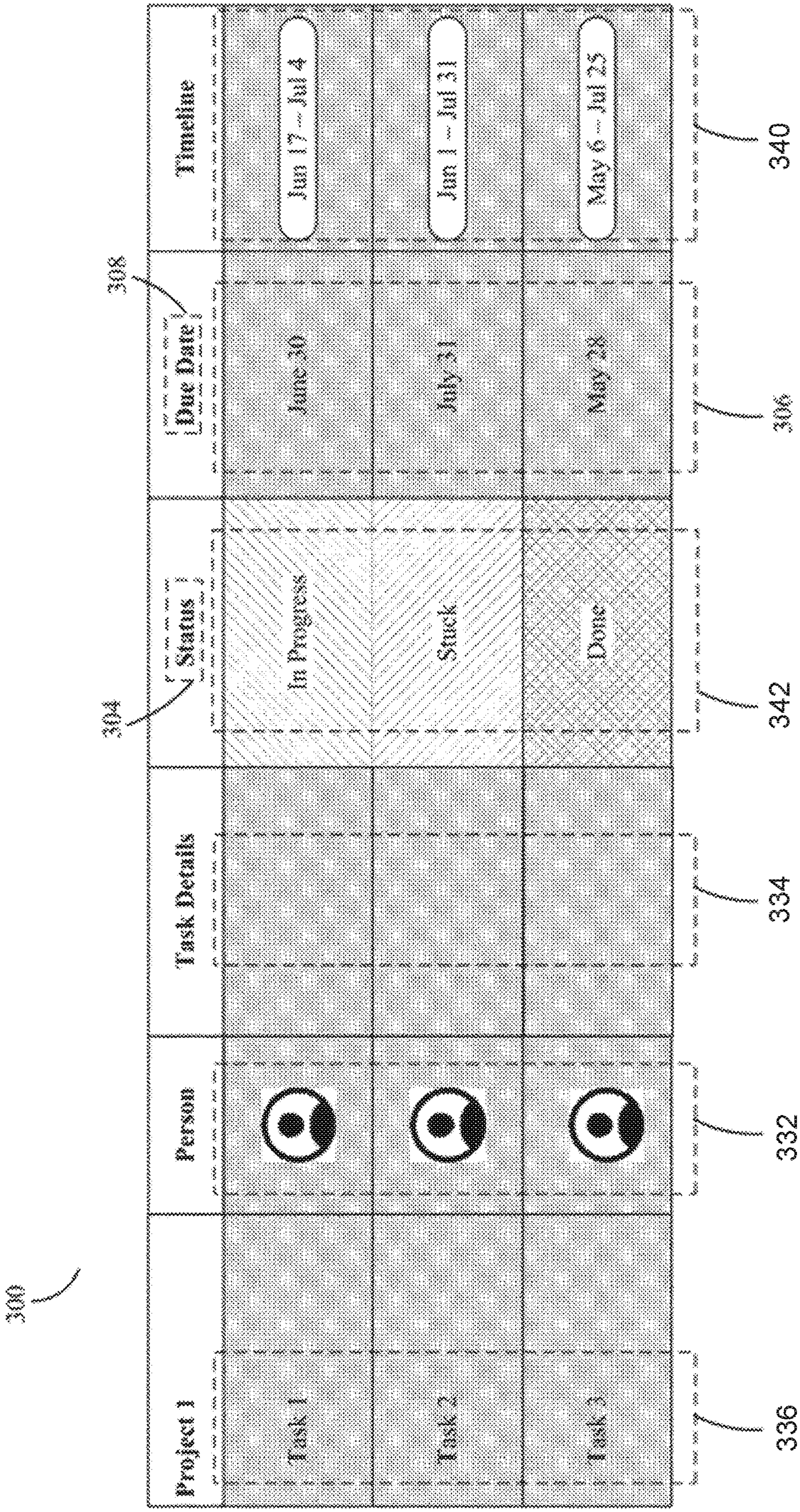
FIG. 1B illustrates an example of a table that includes multiple columns and rows, consistent with some embodiments of the present disclosure.

By way of example with reference to FIG. 1A, a platform 100 may maintain tables 102 by storage, or any combination thereof. FIG. 1B illustrates an exemplary table structure, referred to herein as table 300, that may include multiple columns and rows, consistent with some embodiments of the present disclosure. In some embodiments, the table 300 may be displayed using a computing device (e.g., the computing device or software running thereon). The table 300 may be associated with a project (e.g., "Project 1" in FIG. 1B) and may include, in the multiple rows and columns, tasks (e.g., in rows including "Task 1," Task 2," or "Task 3") and data characteristics for the tasks. Such data characteristics can be persons (e.g., in a column 332), indicating which user entities are associated with the task/are assigned to the tasks, details (e.g., in a column 334) of the tasks, statuses (e.g., in a column 342) of the tasks, due dates (e.g., in a column 336) of the tasks, timelines (e.g., in a column 340) of the tasks, or any other data characteristic of the task. For example, in a project with the common objective of launching a new product, the table might be structured as follows: Task 1 could be "Market Research," assigned to a generative AI Agent. Task 2 might be "Product Design," assigned to John from the R&D department. Task 3 could be "Financial Projections," assigned to Michael from the Finance department. Each task contributes to the common goal of product launch, and people are assigned from the departments most relevant to each task's requirements. This structure enables cooperation across departments to reach the common objective efficiently. The status column might show "In Progress" for Market Research, "Not Started" for Product Design, and "Completed" for Financial Projections, giving a quick overview of the project's progress towards the launch goal. A task may refer to a part or a portion of a project. A task may be performed by an entity (e.g., an individual or a team or a generative AI agent assigned to the task). In some embodiments, a task may be represented by a row of cells in a task table. In some embodiments, a task may be represented by a column of cells of a task table. An entity may refer to an individual, a team, a group, a department, a division, a subsidiary, a company, a contractor, a generative AI agent, or any independent, distinct organization (e.g., a business or a government unit) that has an identity separate from those of its members, or a combination thereof.

As illustrated in FIG. 1B, the at least one processor may maintain a plurality of tables (e.g., including the tables 300) and other information (e.g., metadata) associated with the plurality of tables. Each table (e.g., one of the tables 300) of the plurality of tables may include a plurality of rows (e.g., the rows of "Task 1," Task 2," and "Task 3" in the table 300) and columns (e.g., columns 332, 336, 340, 332, and 334 of the table 300).

Consistent with some disclosed embodiments, at least one processor may be configured to maintain a second table with rows and columns defining second cells. A second table may include a sub-table of the first table, a sub-table of another table, a separate table associated with the same project as the first table, a separate table associated with a different project from the project of the first table, a table associated with a same project of a same entity, a table associated with a different project of the same entity, a table associated with a same project of different entity (e.g., a second user or a teammate or a generative AI agent), or any other combinations and permutations thereof. A second table may include tables as previously described above, including horizontal and vertical rows for presenting, displaying, or enabling access to information stored therein.

A relationship between the first and the second table may be hierarchical. A hierarchical relationship, as used in the context of this disclosure, may refer to a relationship based on degrees or levels of superordination and subordination. For example, in some embodiments, the first table may be a table associated with a task or a project and the second table may be a sub-table of the first table associated with the same project or a different project. In such a scenario, the first table may be considered a superordinate table and the second table may be considered a subordinate table.

Other examples of hierarchical relationships between a first and a second table are described herein. In some embodiments, an entity may be associated with one or more projects, and the first table may be a table associated with a first project of the entity, and the second table may be a table associated with a second project of the entity. In such a case, the first table may be the superordinate table and the second table may be the subordinate table. Alternatively, the first table may be the subordinate table and the second table may be the superordinate table. In some embodiments, the first table and the second table may be tables or sub-tables associated with different entities, different projects of a same entity, different projects of different entities, or other combinations thereof.

In some disclosed embodiments, the first and the second tables may be associated with or may be a part of a workflow. A workflow may refer to a series of operations or tasks performed sequentially or in parallel to achieve an outcome. A workflow process may involve managing information stored in tables associated with one or more entities, one or more projects within an entity, or projects across multiple entities. In an exemplary workflow process, a freelancer may create an invoice and send it to a client, the client may forward the invoice to the finance department, the finance department may approve the invoice and process the payment, the customer relations department may pay the freelancer. Similarly, the workflow process may involve sending a notification from the freelancer to the client in response to a status of the invoice being "Done," mirroring the received invoice to the finance department, updating a status (e.g., not yet paid, in process, approved, and so on) of the invoice processing, and updating a status in response to payment transmitted to the freelancer.

In the context of this disclosure, it is important to note that the assignment of a generative AI agent to a cell of a table such as 300 by a user triggers the assignment of that AI agent to the respective task and its associated information, characteristics, or entities of the project as documented in the respective row or column to which the agent is added. This assignment process is designed to be automatic and seamless when the user adds the agent to the respective cell, table, or sub-table. For instance, if a user assigns a generative AI agent to a cell in the "Person" column (332) of a specific task row, the generative AI agent is automatically granted access and assigned to all relevant information pertaining to that task, including its details, status, due date, and/or timeline. This automatic assignment may extend to any sub-tables or linked data sources associated with that task. Furthermore, the system may automatically provision appropriate credentials to the generative AI agent, allowing it to perform actions and access information within the scope of its assigned task. These credentials are dynamically adjusted based on the context of the assignment, ensuring that the AI agent has the necessary permissions to fulfill its role while maintaining data security and access control protocols. This streamlined approach to AI agent assignment and credential management enables efficient integration of AI capabilities into project workflows, enhancing productivity and decision-making processes. As used herein, any assignment of the generative AI agent as a user to task or action may be performed by the addition of the agent by a human user who uses an interactive graphical user interface presenting the respective table to a cell in the respective table, for instance by adding or selecting an avatar of the agent to the cell.

As described herein, when indicating that the generative AI agent is assigned with a role, for instance in a team assigned to a project documented in one or more table structures, the role may be given as an outcome of adding the generative AI agent to a table such as 300, by a user. In use, post adding the agent to a cell, the environment 200 automatically creates a role for that agent based on the context of its assignment. This role definition process is dynamic and contextual, taking into account the specific characteristics of the table, the task, and/or the project as a whole. For example, when an AI agent is assigned to a row having a marketing campaign task indicated in the "Task Details" column (334), the system might automatically define its role as a "Content Strategy Assistant." In this role, the AI agent would be granted permissions to analyze past campaign data, suggest content ideas, and even draft preliminary marketing copy. Similarly, if an AI agent is added to a row having a software development task indicated in the "Task Details" column (334), it might be assigned the role of "Project Progress Monitor." In this capacity, the AI could be authorized to track task completions, identify potential bottlenecks, and send automated status updates to team members. These automatically generated roles are not static; they can evolve based on the AI agent's interactions and performance within the project ecosystem and/or changes in the values of the cells of the table. This dynamic role creation and evolution allow for a flexible and adaptive integration of AI capabilities into diverse project environments, enhancing the overall efficiency and intelligence of the project management process.

Figure 2A:
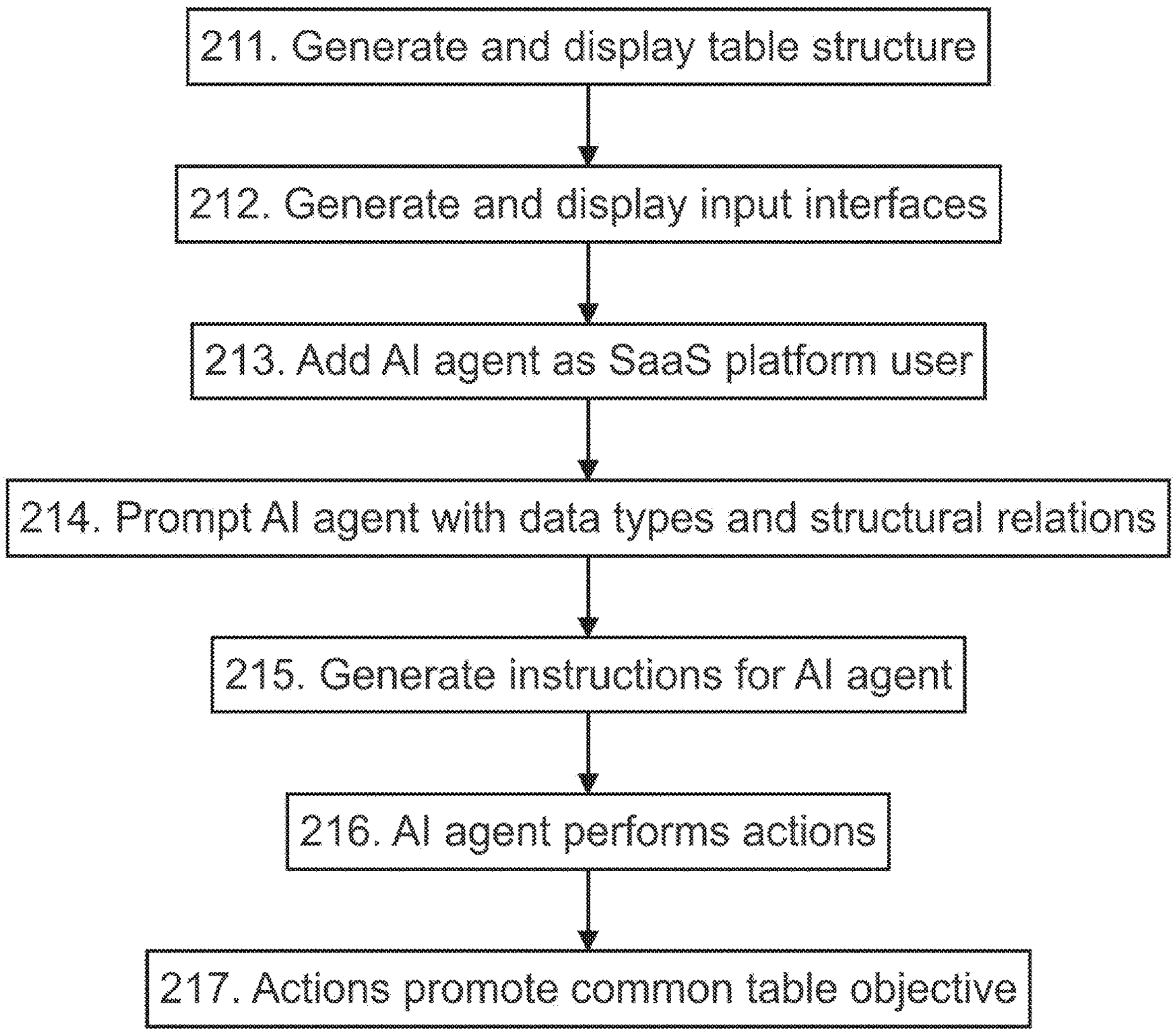
FIG. 2A is a flowchart of an exemplary process for integrating generative artificial intelligence into a SaaS platform, consistent with some embodiments of the present disclosure.

Reference is now also made to FIG. 2A is a flowchart of an exemplary process implemented by one or more processors (201) of the agent environment 200 for integrating generative AI into a SaaS platform consistent with some embodiments of the present disclosure. The flowchart is implemented using a SaaS platform, such as the system depicted in FIG. 1A, consistent with some embodiments of the present disclosure, for instance using the agent environment.

As shown at 211, a table structure is generated and displayed within the SaaS platform. This structure organizes multiple items, each associated with multiple item characteristics, all oriented towards a common table objective. The table structure may have multiple items (rows) each having multiple item characteristics (columns), associated with a common table objective. The table structure may be a board as described above.

For example, in a customer relationship management (CRM) SaaS platform, the processor(s) may induce a display of a table where each row represents a customer account (item), and columns represent characteristics such as contact information, purchase history, and engagement metrics. The common objective might be to increase customer retention. In another example, the processor(s) if the SaaS platform may induce a display of a table where each row represents a user account (item), and columns represent characteristics such as contact information, task to perform, and a state of the task to perform.

As shown at 212, input interface(S) are generated and displayed, enabling users to interact with and modify items in the table structure. For instance, the processor(s) may display an interactive tubular version of the table structure or a portion thereof, allowing users to update customer or user information, log interactions, or change the status of an account.

As shown at 213, a generative AI agent may now be added as a SaaS platform user, granting it specific credentials to read and write data for certain items within the table structure. As an example, the processor(s) of the agent environment 200 may integrate an AI customer service assistant, giving it permissions to update customer interaction logs and suggest next actions based on historical data patterns. The process of adding a generative AI agent as a SaaS platform user, as described in step 213, is exemplified in the hierarchical access control scheme detailed in FIG. 4A. This integration ensures that the generative AI agent's credentials are properly managed within the organizational structure.

Optionally, the generative AI agents are trained with data indicative of functionalities of the platform 100, components of the platform 100, actions of the platform 100, and/or interrelations of data accessible using the platform 100. This enables the generative AI agent to analyze user inputs and determine users' intent, even when specific instructions are not provided.

Optionally, the generative AI agent is added as a user, for instance in a new row of users, for example as depicted in FIG. 2A. Optionally, the generative AI agent is assigned to specific items in a table structure, granted with access privileges limited to access data associated with these items only.

As shown at 214, after 213, the generative AI agent is now prompted with information about the data types of item characteristics and/or the structural relations between items in the table. For instance, the generative AI agent is prompted with that information indicative that "purchase frequency" is a numerical field, "customer satisfaction" is a percentage, and "account status" is a categorical field with predefined options like "Active", "At Risk", and "Churned". This information can be extracted from metadata of data types or using a generative model deducing the information about the data types of item characteristics and/or the structural relations from an input indicative of a respective data structure.

This allows, as shown at 215, to generate instructions which are fed into the SaaS platform 100. Based on the provided information and the table structure, the processor(s) generate instructions for the generative AI agent to perform specific actions by interacting with item characteristics. As an example, the processor(s) may generate instructions for the generative AI agent to analyze historical data and update the status for accounts showing signs of undesired behavior such as disengagement.

To further illustrate the generative AI agent's capabilities, we now consider its autonomous actions within the system. Optionally, as shown at 216, the generative AI agent can perform its designated actions within the table structure. For instance, the processor(s) may execute instructions that cause the generative AI agent or generative AI model to automatically update the status of customer accounts based on its analysis, flagging those at risk of churning, for example as detailed below.

Optionally, as shown at 217, actions performed by the generative AI agent are calculated to promote the common table objective. For example, the processor(s) may direct the generative AI agent or generative AI model to prioritize engagement actions for high-value customers showing early signs of disengagement, in line with the objective of increasing customer retention. The common table objective may be deduced from data types and structural relations between item characteristics, then generate instructions based on this deduced objective. For instance, by analyzing the table structure and data types, the processor(s) may deduce that the objective is to maximize the product of (customer lifetime value*retention probability) across all accounts to which the AI was assigned to, and generate instructions for the generative AI agent or generative AI model to act accordingly.

Optionally, the platform 100 manages a series of activities defined by the table structure to achieve the common table objective. As an example, the processor(s) may guide the generative AI agent through a customer retention process involving steps like regular check-ins, personalized offers, and escalation to human intervention when necessary.

Optionally, the generative AI agent is trained with a log history to deduce or refine understanding of the common table objective. This log history is not limited to the system itself but may also include data from third-party applications that are associated with the item the AI agent was assigned to, provided the user has granted the AI agent access to these external sources. For instance, by processing user activity logs either within the platform or from connected third-party apps (such as CRM systems, marketing tools, or project management software), and analyzing outcomes over time, the processor(s) may learn that actions leading to higher customer satisfaction scores correlate strongly with retention. This comprehensive analysis across multiple data sources allows the AI to adjust its priorities accordingly, taking into account a more holistic view of the project or task at hand. The AI agent's ability to access and interpret data from various sources, both internal and external to the primary system, enhances its capability to provide more accurate and context-aware insights and recommendations. This multi-source data integration enables the AI to identify patterns and correlations that might not be apparent when looking at data from a single system in isolation, thereby improving the overall effectiveness of the AI's decision-making and predictive capabilities.

Optionally, the generative AI agent is guided by prompts to generate data for empty cells and process this data based on values in other cells, for instance based on analysis of history log documenting interactions between users of the platform. For example, the processor(s) may instruct the generative AI agent or generative AI model to generate an initial engagement score for a new customer based on their industry and company size, then adjust it based on their initial product usage patterns. Optionally, the generative AI agent executes a reporting function, ensuring it notifies, for example its assigning user, when no further actions are required for an item. As an illustration, the processor(s) may trigger a notification to the customer success manager when all accounts have been reviewed and updated by the AI. The reporting function may be executed to emulate a human behavior, based on training data.

Optionally, missing data is identified and team members assigned to a common data structure are notified. Optionally, further actions are suspended until the data is provided from the notified users. For example, if a customer's contact information is outdated, the processor(s) may notify the account manager and pause automated outreach until the information is updated.

Optionally, the generative AI agent manages the sending of reminders for missing data according to a learned pattern. For instance, if the missing contact information isn't provided within 48 hours, the processor(s) may trigger a reminder email to the account manager. Optionally, the generative AI agent facilitate the addition of AI agents by managing selection from available users in the agent environment 200 based on learned pattern. As an example, when assigning an AI assistant to a customer success team, the processor(s) may present a list of available AI agents with different specializations for the team leader to choose from.

Optionally, the processor(s) generate and manage a user-friendly interface with visual representations for AI agent selection. For instance, the processor(s) may display AI agents as avatars in a drop-down menu, allowing users to easily distinguish and select the appropriate AI assistant for their team.

In addition to these capabilities, the generative AI agent in some embodiments is equipped with interaction and task management features that further enhance its ability to function as an intelligent user within the SaaS platform. The generative AI agent may be configured with advanced interaction capabilities to enhance its functionality within the SaaS platform. For example, the generative AI agent may dynamically change the number of components and their interconnections in response to user input. Specifically, the generative AI agent may create new components to be associated with a user, remove existing components from being associated with a user and/or create, delete, and change interconnections between components associated with a user. This functionality allows users to perform actions by providing instructions to the generative AI agent (via language-based interactions, UI interactions, or similar methods) instead of performing the actions themselves.

Optionally, when analyzing user input, if the generative AI agent determines that the input lacks sufficient details for performing desired actions, it initiates an iterative information gathering process. The generative AI agent may output a request for the user to provide further information. It may provide general suggestions on the type of missing information or specific suggestions based on calculated predictions. Optionally, the predictions are calculated using the user's information, information on associated components, general application information, and past usage information by other users. The generative AI agent may continue this process, refining its understanding with each user response, until it has sufficient information to perform the requested action.

In some embodiments, the agent environment 200 includes an adaptive component management module configured to modify the number of components and their interconnections in response to user input. This module enables users to perform actions by providing instructions to the generative AI agent, rather than directly executing the actions themselves. The module can create new components, remove existing ones, and alter connections between components associated with a user.

When analyzing user input, if the generative AI agent determines that the input lacks sufficient details for performing desired actions, it initiates an iterative information gathering process. The agent outputs a request for the user to provide further information. It may provide general suggestions on the type of missing information or specific suggestions based on calculated predictions. These predictions are calculated using the user's information, information on associated components, general application information, and past usage information by other users.

Upon receiving a second input from the user, the generative AI agent re-analyzes the initial input in light of the new information. If the analysis is now sufficient, the agent proceeds with the required actions. If further information is still needed, a second output is sent to the user requesting more details.

The generative AI agent is designed to recognize and address various types of information gaps, including lack of context for certain terminology in the input, absence of one or more concise actions to be performed, and inability to understand the desired component from those associated with the user or available in the software application.

This iterative process continues until all necessary information is gathered. If a user's response doesn't change the results of the initial analysis, the generative AI agent provides a further elaboration of its original output. When partial information is provided, the generative AI agent narrows the scope of its inquiry but continues to seek missing information. When new information creates additional gaps, the generative AI agent identifies these and continues the information-gathering process.

After gathering necessary information, the generative AI agent may actively seek out and fill necessary information for each task, produce initial outcomes for the user to review, and prepare groundwork for tasks that can't be fully automated, easing the user's decision-making process.

For example, when a user requests to reschedule a meeting, the generative AI agent demonstrates its contextual understanding by: a) Not assuming which meeting is being referred to or which platform it's scheduled on. b) Prompting the user with specific, clarifying questions about the meeting title, date, and preferred new time. c) Confirming its understanding before proceeding with the rescheduling action.

In another example, when assisting in creating a table for planning an event, the generative AI agent showcases its ability to: a) Inquire about the type of event (e.g., corporate training workshop). b) Request details such as the number of sessions, attendee tracking requirements, and additional planning aspects (logistics, budget tracking). c) Create a table to track the desired information based on user responses. d) Actively seek out and fill necessary information for each task, producing initial outcomes for user review.

This adaptive component management capability enables a more intuitive and efficient user experience, allowing users to accomplish complex tasks through natural language interactions with the generative AI agent.

In some embodiments, the agent environment 200 includes a data enrichment module configured to analyze newly introduced data and identify opportunities to enhance existing information within the application. When a user introduces new data, the generative AI agent scans this information to determine whether it can enrich other stored data or initiate actions for other application components.

The data enrichment process is triggered by a signal indicating the introduction of new data. The generative AI agent first assesses the type of information to determine if it is suitable for the data enriching capability. This assessment is based on predefined data type criteria or by analyzing the new data's relevance to the user's existing information in the application. Users may also explicitly instruct the application to scan newly received information for enhancement purposes. In some instances, information received by one user in an account may be used to enrich data for other users within the same account.

Upon activation, the generative AI agent analyses the newly received information to determine its type and content. It then examines all components associated with the receiving component, as well as those associated with the user or the entire account, to identify potential relevance.

When the agent environment 200 determines that the new information is relevant to existing data or components, the generative AI agent performs a benefit analysis. This analysis determines how the new information can improve current data and components, and how existing data should be amended. Options may include incorporating the new information (fully or in summary), replacing old data, or populating empty components.

For example, when a user uploads a file to a cell in a table row, the generative AI agent analyses the document's content and scans associated components, such as other cells in the row. If it identifies empty cells where the column types match information found in the document (e.g., project deadlines or cost estimates), the AI agent suggests populating these cells with the relevant information. Upon user approval, the cells are automatically filled with high accuracy.

Furthermore, if the generative AI agent identifies important information in the document that doesn't correspond to existing column types, it may recommend creating new columns to capture this data. This decision is based on an analysis of existing columns and user information (as well as examples of similar table structures used in the SaaS platform) to determine the potential importance of the new data type.

This intelligent data enrichment capability enables more efficient data management and utilization, reducing manual data entry and ensuring comprehensive capture of relevant information across the application.

In some embodiments, the agent environment 200 includes a cross-structure data integration module configured to analyze and transfer information between components with different structures. This module can process information received in a first component with one structure (e.g., an unstructured component like a post-it note) and identify its relevance to a second component with a different structure (e.g., a structured component like a table). In some cases, the first and the second components can be associated with two different components of the same SaaS platform. In other cases, the first component can be associated with a third-party application and the second component can be associated with the SaaS platform.

When new information is received in the first component, the generative AI agent analyzes the content to determine the types of information present. It then examines other components associated with the user, including those not directly linked to the first component, to assess the relevance of the new information to existing data and structure compatibility.

The module employs a matching algorithm that assigns scores to potential target components based on the correlation between portions of information in the first structure and components in the second structure. The agent environment 200 notifies the user about highly relevant matches, offering to enrich the data in the second component. This notification can be automatic or triggered by an assessment of the information's importance, based on predetermined thresholds or user-defined settings.

For example, when a user adds a bullet point to a to-do list component, the generative AI agent analyzes the information and evaluates it against the user's array of components, such as project tables. If the information best corresponds to a new row in a specific table or as an addition to existing columns, the agent environment 200 suggests and, with user permission, automatically integrates the information into the appropriate location.

The cross-structure data integration module can also handle complex scenarios, such as processing instructions to import and analyze data from third-party applications. For instance, if a user requests a meeting summary and deal status update in an unstructured to-do list, the generative AI agent can reduce the need to import data from a third-party meeting application, transcribe the conversation, summarize key points, and update the relevant structured components accordingly.

Furthermore, the agent environment 200 includes a context recognition model that provides the generative AI agent with information about components relevant to ongoing processes and their graphic representations. This enables the generative AI agent to incorporate visual elements in its outputs when beneficial, enhancing the clarity of instructions or explanations.

When responding to queries about components, the generative AI agent analyzes whether the query pertains to general component functionality or specific user-associated instances. It can then generate appropriate graphical representations, such as screenshots, icons, or animations, to supplement textual information in its responses.

This capability allows the agent environment 200 to create visually enriched, customized guides for component usage tailored to a user's specific field of work. For example, when asked how to configure a component for a particular industry, the generative AI agent can generate a step-by-step guide with relevant images of the component as it would appear at each stage of the process. Alternatively, or in addition, this capability allows the agent environment to incorporate graphical representations from the SaaS platform in textual correspondences to enhance clarity of a response, or to emphasize a portion of a SaaS platform component in a correspondence.

These advanced data integration and visual enhancement capabilities significantly improve the agent environment 200 ability to provide clear, context-specific guidance and streamline information flow across diverse component structures within the application.

Optionally, the generative AI agent is designed to recognize and address various types of information gaps, including lack of context for certain terminology in the input, absence of one or more concise actions to be performed, and/or inability to understand the desired component from those associated with the user or available in the software application.

Optionally, after gathering necessary information, the generative AI agent may actively seek out and fill necessary information for each task and/or produce initial outcomes for the user to review and/or prepare groundwork for tasks that can't be fully automated, easing the user's decision-making process.

Optionally, the generative AI agent adapts its queries and responses based on the user's inputs. When a user's response doesn't change the results of the initial analysis, the generative AI agent may provide a further elaboration of its original output. When partial information is provided, the generative AI agent may narrow the scope of its inquiry but continues to seek missing information. When new information creates additional gaps, the generative AI agent may identify these and continues the information-gathering process.

For example, a user interacts with the generative AI agent to reschedule a meeting. The generative AI agent demonstrates its contextual understanding by:

a) Deducing which meeting is being referred to or which platform it's scheduled on, for instance from an analysis of text indicative of user identifiers or meeting subject.

b) Prompting the user with specific, clarifying questions about the meeting title, date, and preferred new time.

c) Confirming its understanding before proceeding with the rescheduling action.

In another example, the generative AI agent may be configured to assist in creating one or more tables for planning an event, showcasing its ability to:

a) Inquire about the type of event (e.g., corporate training workshop).

b) Request details such as the number of sessions, attendee tracking requirements, and additional planning aspects (logistics, budget tracking).

c) Create a table, using SaaS platform components chosen to fit a structure that would benefit the common objective of planning the task, based on . . . , to track the desired information based on user responses d) Actively seek out and fill necessary information for each task, producing initial outcomes for user review.

These enhanced capabilities allow the generative AI agent to function as a more intelligent and proactive user within the SaaS platform, capable of understanding complex requests, gathering necessary information, choosing a specific permutation of components from a plurality of components with similar functionalities, and performing actions with minimal direct user intervention.

In some embodiments, the generative AI agent is designed to streamline post-meeting processes and deal management within the SaaS platform. This functionality addresses the often-tedious tasks of updating meeting notes, providing activity reports, and keeping the platform current with the latest information.

Figure 2B:
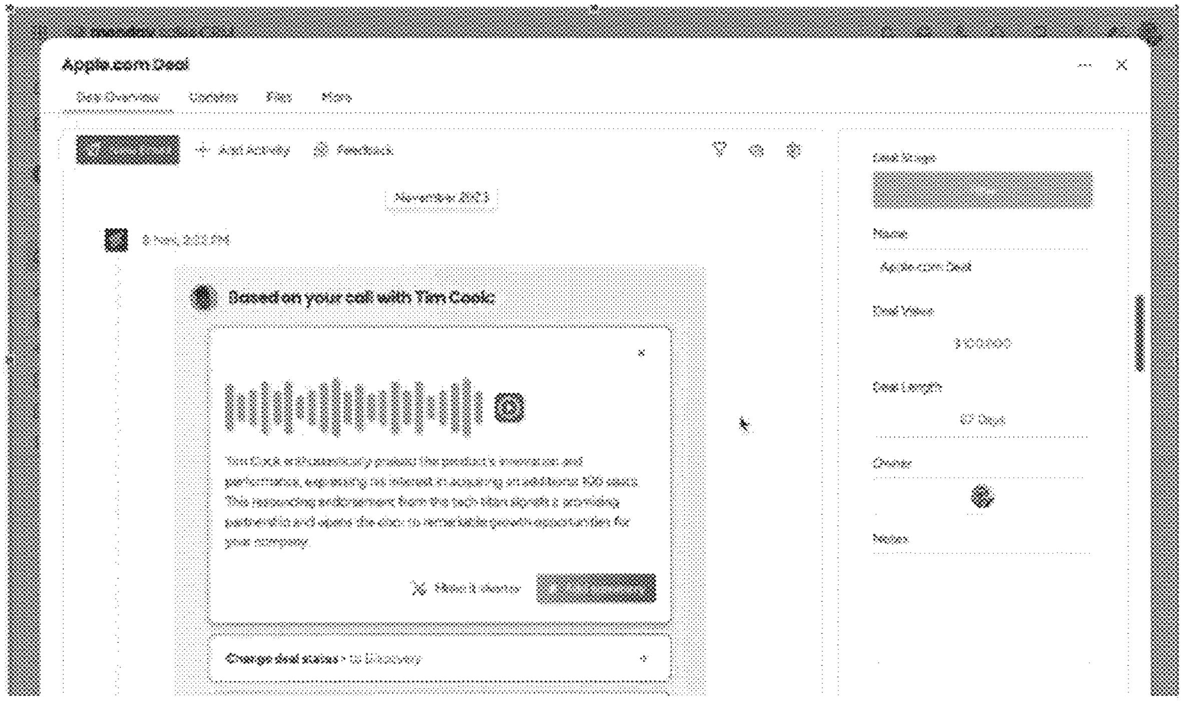
FIGS. 2B-2F are exemplary user interfaces allowing a user to interact with a generative AI agent, consistent with some embodiments of the present disclosure.
Figure 2C:
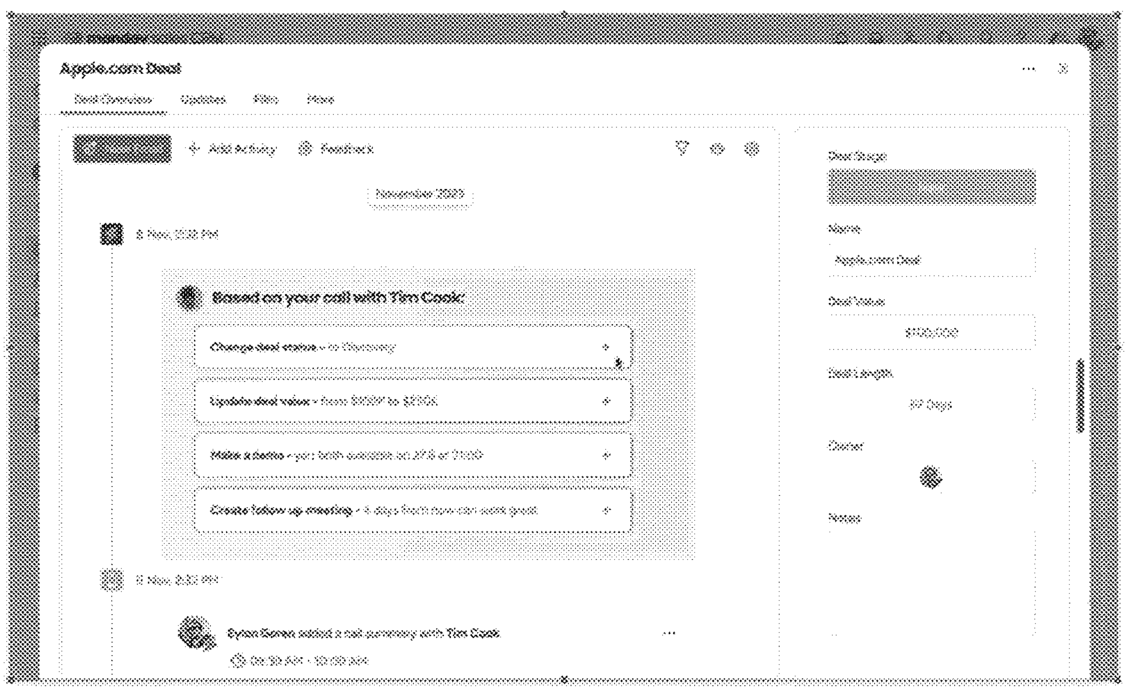

When the generative AI agent has access to meeting audio (either during the call or afterwards), it can analyze the transcript to create a comprehensive meeting summary and present it to the user, for instance as depicted in FIG. 2B. The summary for user review may be incorporated into an item managed by the platform 100 Furthermore, the platform 100 includes a deal interaction log component, which records and stores all interactions associated with a specific deal or project. This deal interaction log is directly accessible from the item itself, allowing users to easily review the history of interactions, including meeting summaries, without navigating away from the current context. The generative AI agent can leverage this deal interaction log to provide more contextually relevant summaries and insights, taking into account the full history of interactions related to the deal. The summary as an input in an item may represent a task to perform or an outcome of an allocated task. The generative AI agent may analyze meeting transcripts and provide users with suggestions for updates to be made in the relevant one or more items based on the meeting discussion. For example, as depicted in FIG. 2C, if a deadline extension is agreed upon, the generative AI agent can suggest updating the corresponding date cell. The generative AI agent may propose changes to status, value, or other relevant item fields based on the meeting content. The meeting summary and its distinct portions remain available for future inquiries by users directly through the item itself, allowing them to revisit discussions or individual contributions as needed. These meeting records, suggestions, and official client communications are presented in a dedicated interface, as shown in FIGS. 2B and 2C. This interface may serve as a centralized component for displaying meeting summaries, AI-generated suggestions, and tracking any official communication with the client. This interface may not only present the AI's analysis and suggestions but also a chronological record of interactions related to the deal. By consolidating meeting records, AI insights, and client communications, the Deal Interaction Hub provides a holistic view of the deal's progress and history, enabling users to make informed decisions and maintain a clear audit trail of all deal-related activities.

In some embodiments, the generative AI agent includes a calendar management module configured to assist users with scheduling and deadline decisions. This module may analyze multiple data sources including:

User-specific information and application data

The user's current data profile

Context of the scheduling decision

Account policies

Data from external connected applications

The calendar management module utilizes machine learning algorithms to process this data and provide data-driven scheduling suggestions to users. For example, when a user opens a calendar interface to set a project deadline, the generative AI agent may automatically activate to analyze factors such as:

Historical completion times for similar tasks

The user's current workload

Events already scheduled in the user's calendar

Calendar information and workload of other team members

Project dependencies and SLAs associated with the user's account

Based on this analysis, the generative AI agent can suggest an optimal due date for the task. The calendar interface may allow users to interact with the generative AI agent through natural language inputs, which are translated into actionable dates reflected on the calendar. The generative AI agent can also provide explanations for its suggested timelines.

The generative AI agent's calendar management capabilities may be initiated in several ways:

1. User-initiated—The user may provide a natural language input requesting scheduling assistance or click a designated button to activate the generative AI agent or generative AI model analysis.
2. Automatic activation—The generative AI agent or generative AI model activates automatically when a user access calendar-related component.
3. Trigger-based—The generative AI agent or generative AI model activates based on predefined triggers or backend configurations.

In some cases, the agent environment 200 tracks utilization rates of these calendar AI features. When usage of a specific calendar-related AI capability exceeds a threshold, the agent environment 200 may adapt to automatically activate that capability whenever calendar usage occurs or is predicted based on user patterns.

As illustrated in FIG. 2B, the generative AI agent may create update suggestions within the deal overview UI, presenting a summary of the client call and offering options to modify or post the summary as an update. FIG. 2C demonstrates how the generative AI agent provides amended update suggestions after the initial summary is added. These suggestions include various actions determined by the generative AI agent based on the call transcript, such as changing the deal status or updating the deal value.

To address privacy concerns and limit the generative AI agent's exposure to sensitive information, the agent environment 200 provides mechanisms for controlled information sharing. In general, the generative AI agent's exposure to a specific account information is limited to SaaS platform elements/components to which a user has provided access to. For example, users can assign a generative AI agent to a specific item in a table, granting access only to that item's data without exposing other items in the same table. Optionally, the generative AI agent may be represented by an avatar similar to user avatars but with distinguishing features (e.g., rectangular shape) to differentiate it from human users. When items are interconnected, the agent environment 200 may request additional user permission for the generative AI agent to access related information. Alternatively, the generative AI agent can be associated with a GUI element displaying a list of accessible items. Users can add or remove items from this list to grant or revoke permissions. Users can mark elements in a specific mode to add them to the generative AI agent's accessible items list.

Consistent with some embodiments of the present disclosure the generative AI agent enhanced with personal assistant functionalities, further extending its role as an intelligent user within the SaaS platform. These functionalities are designed to assist users in managing tasks, time, and communications more effectively. The generative AI agent may identify tasks assigned to the user and determine necessary information for task fulfillment, analyze and request access to resources needed for responding to queries or completing assignments and/or track items assigned to users and provide reminders, similar to a project manager.

Optionally, the generative AI agent send reminders through the platform or other enabled communication channels (e.g., Slack, WhatsApp), provide item information with reminders and perform actions like summarization, assist users in modifying item details and/or analyze justifications for task delays and suggest corresponding actions, considering cascading effects on dependent and interconnected items.

Optionally, the generative AI agent may analyze and arrange user tasks in order of importance, assign estimated completion times to tasks, considering various constraints (deadlines, urgency, teamwork, dependencies, holidays, capacity, churn rate, etc.), populate a calendar with time blocks for tasks, creating daily itineraries, provide users with information on the next task requiring attention, offer custom task suggestions based on user-provided constraints (e.g., tasks that can be completed alone in under 45 minutes), and/or adjust subsequent time blocks based on early or late task completion.

The generative AI agent may act as a communication gateway, receiving communications on behalf of or in addition to the user, analyze communications to determine if sufficient information is available for response, track and summarize resolved communications for user review and/or reach out to third parties (with permission) to obtain missing information for proper responses.

Figure 2E:
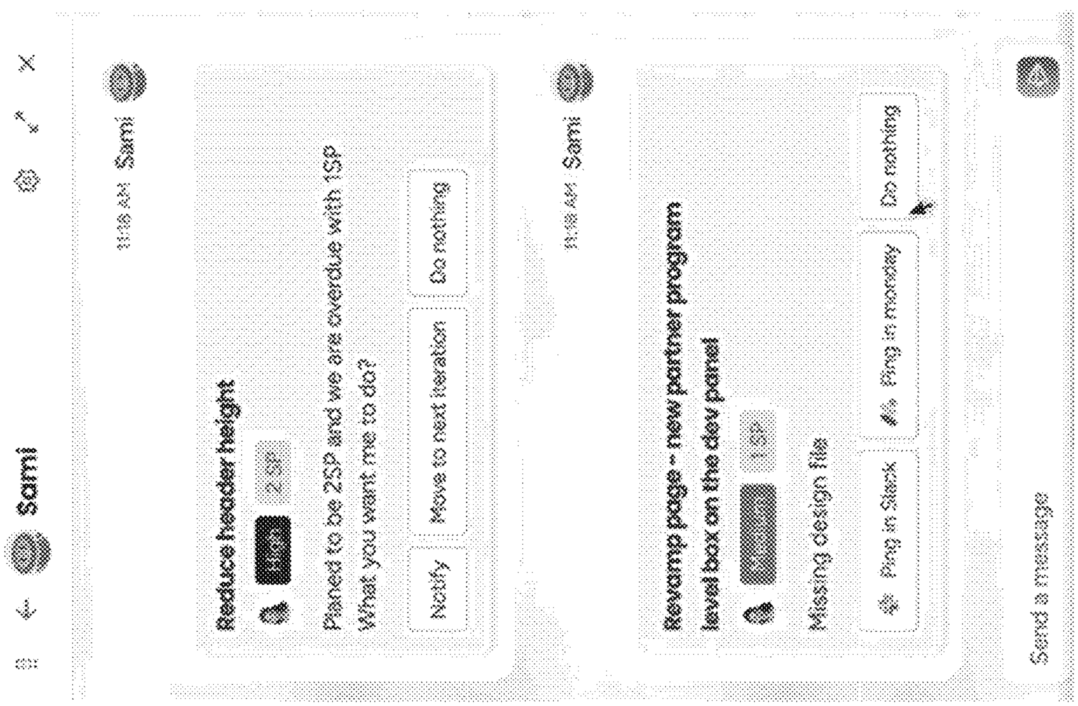
Figure 2D:
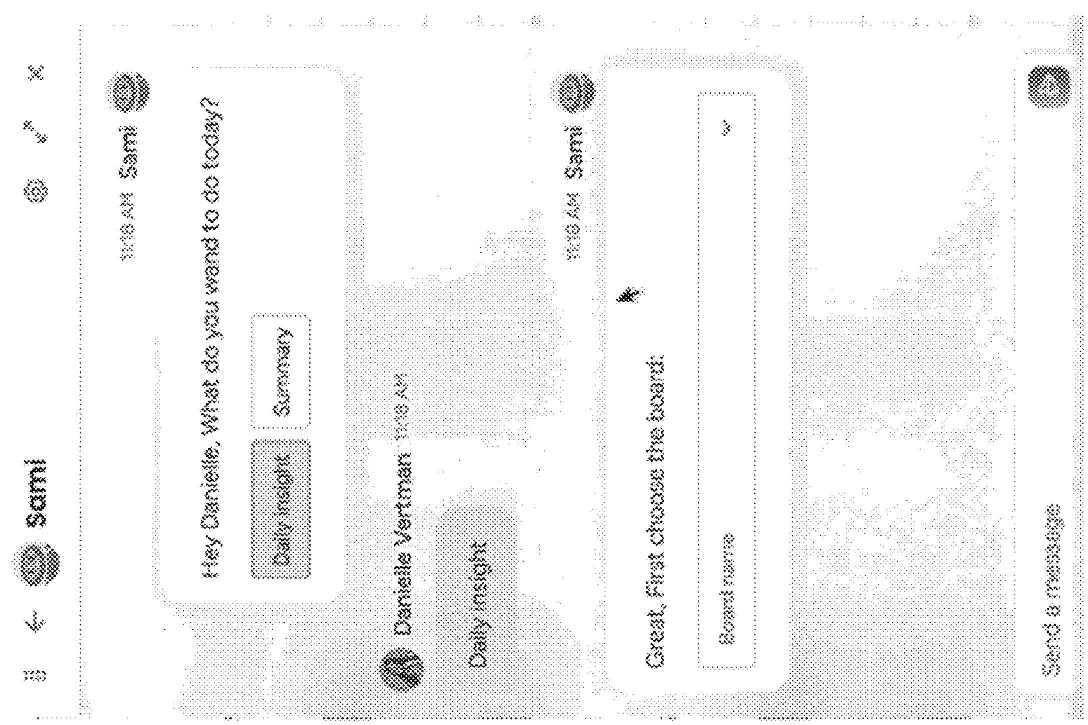
Figure 2F:
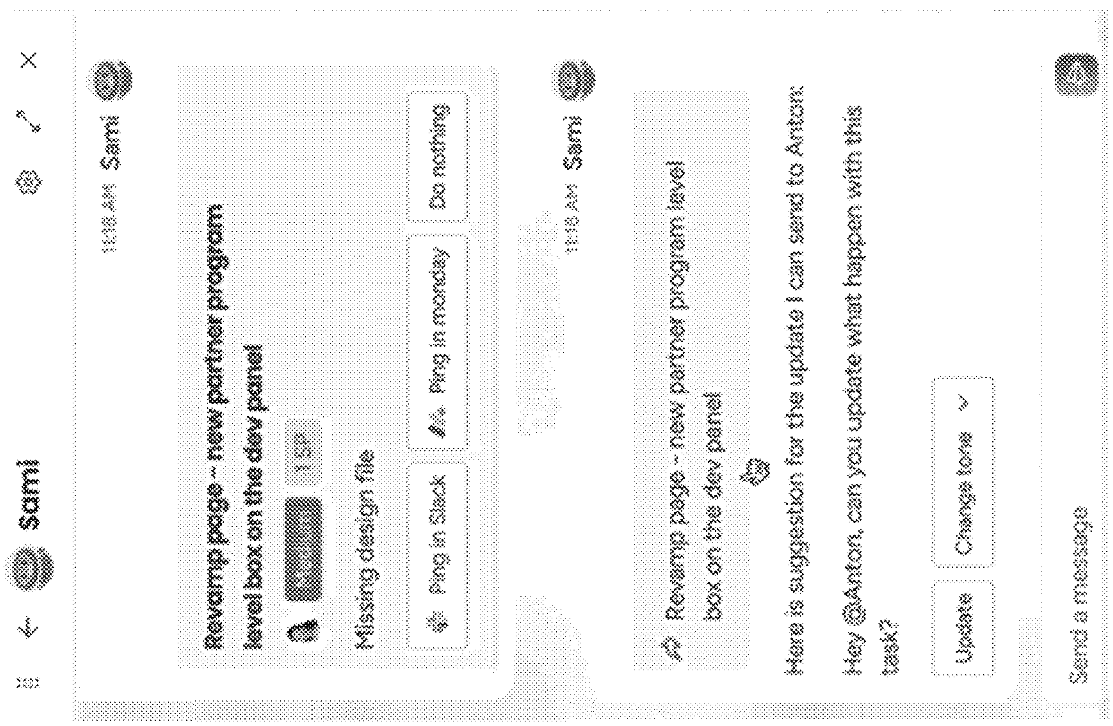

In some implementations, the generative AI agent may present as a single entity with a unified avatar and 'personality', while actually comprising multiple AI agents centrally managed to perform different tasks. As illustrated in FIG. 2D, the generative AI agent can provide daily insights upon user request. It may ask for specifics, such as which board/table to focus on for insights. FIG. 2E demonstrates how the generative AI agent can provide multiple insights about elements/items/projects in a selected board, along with suitable options for each insight. FIG. 2F shows the generative AI agent's ability to draft notifications based on user selection, accumulating relevant data and determining appropriate wording.

Users may modify the tone or approve the notification for sending. The generative AI agent may recognize patterns in user requests and suggest automating recurring tasks, such as setting up daily notifications for insights that are frequently requested.

Consistent with some embodiments of the present disclosure the generative AI agent is assigned with a profile defining its role in a team assigned to a project documented in one or more table structures. The role allows a permission manager such as 114, to assign permissions to the agents based on his position in the team and/or role, for instance as a team support member, an accountant specialist, a programmer, a legal advisor and/or the like. The role may be automatically deduced by prompting an AI model with information about one or more team members, for instance from user accounts assigned to the table structures, and/or automatically deduced from the table structures themselves, for instance by prompting a generative AI model with information about the team members and/or the table structures themselves.

As described in detail above, the process depicted in FIG. 2A, implemented by the agent environment 200's processors (201), represents a significant advancement in the integration of AI capabilities within SaaS platforms, enhancing user productivity, data analysis, and decision-making processes in a structured and objective-oriented manner.

The flow depicted in FIG. 2A may describe, for example, a use case where in a software development project, a generative AI agent is added to a sprint planning board. It analyzes past sprint performances, team velocity, and current backlog items to suggest optimal task distributions and sprint goals. The generative AI agent updates the board with these suggestions, allowing the project manager to make informed decisions quickly.

In some embodiments, the agent environment 200 includes a user behavior monitoring module configured to continuously monitor and record actions performed by users within the SaaS platform, identify and analyze user work patterns, defined as sequences of interactions with system components to perform tasks and advance processes, recognize opportunities for more efficient work patterns, and suggest improvements to user workflows. The user behavior monitoring module utilizes machine learning algorithms to process interaction data and identify patterns. Specifically, it may implement event logging to capture detailed user interactions with platform components, use sequence mining algorithms to detect recurring patterns in user workflows, maintain a knowledge base of optimal work patterns for various tasks, employ similarity measures to compare observed patterns against known efficient patterns and utilize natural language processing to analyze content relationships between components accessed in sequence. When a potentially inefficient work pattern is detected, the agent environment 200 analyzes: components involved in the current workflow, available automations or AI-powered features that could optimize the process, user permissions and enabled features and/or content relationships between sequentially accessed components.

Based on this analysis, the agent environment 200 may generate suggestions for workflow improvements. For example, if a user is observed repeatedly switching between two components to manually summarize text, the agent environment 200 may detect the repetitive pattern of alternating component access, analyze text content in both components to infer a summarization task, identify an available AI-powered summarization feature and/or generate a suggestion to implement the generative AI agent or generative AI model summarization to automate the workflow. The agent environment 200 presents these suggestions via a non-intrusive interface, providing details on the detected inefficiency, proposed optimization using available platform features, estimated time/effort savings, and/or step-by-step guidance for implementing the suggested changes. This intelligent workflow optimization capability continually adapts to evolving user behavior and newly available platform features to drive ongoing efficiency improvements.

Figure 3:
FIG. 3 is a flowchart depicting actions performed by the described system, consistent with some embodiments of the present disclosure.

While FIG. 2A focused on one process, we now delve into other actions performed by the agent environment 200. Reference is now also made to FIG. 3 which is a flowchart depicting actions performed by the described system, consistent with some embodiments of the present disclosure. The flowchart is implemented using a SaaS platform, such as the agent environment 200 depicted in FIG. 1A, consistent with some embodiments of the present disclosure, for instance using the agent environment Before discussing this flowchart, it's should be noted that alphanumeric data within the SaaS platform may be found in various locations, including but not limited to project boards, task lists, user profiles, communication logs, and document repositories. In these embodiments, there is described a system for using generative artificial intelligence for intent-based interaction within a SaaS platform having one or more processors configured to maintain a generative AI agent, as shown at 302. This AI agent is designed to interact with sets of alphanumeric data stored in one or more table structures within the SaaS platform, see for example 304. Each table structure contains a plurality of items comprising the alphanumeric data, such as task descriptions, due dates, assigned team members, and status indicators.

The generative AI agent is associated with a profile that defines its role within a team assigned to a specific project. A profile in this context refers to a set of parameters that determine the AI agent's capabilities, access permissions, and behavioral characteristics. For example, a profile might specify that the AI agent has read-write access to certain project boards, can analyze meeting transcripts, and is authorized to suggest task reassignments.

The concept of a team in this platform refers to a group of users, both human and AI, who collaborate on a specific project or set of tasks. The platform includes a team management interface where teams may be created, modified, and assigned to projects. This interface allows for the seamless integration of AI agents as team members alongside human users.

For example, a marketing team working on a product launch might include human team members such as a project manager, content writers, and designers, as well as an AI agent profiled to assist with task scheduling and resource allocation. The AI agent's role within this team would be defined by its profile, which could include permissions to access marketing campaign data, analyze team performance metrics, and suggest optimizations to the project timeline.

As shown at 302 and 305, the agent environment 200 also maintains a credentials management process such as the permission manager 114 that defines and controls access rights for a plurality of users, determining their ability to interact with the alphanumeric data. This ensures proper data security and granular access control within the platform.

As shown at 306, the processors are configured to cause a display of the plurality of items in a table structure, along with at least one input interface, as shown at 307. As shown at 308 and 309, this interface is designed to receive user inputs for two primary purposes: interacting with the plurality of items (310) and adding the generative AI agent to interact with the alphanumeric data (311). The interaction of the generative AI agent with the data is controlled by the credentials management process, ensuring that it operates within the defined access parameters. The process of adding the generative AI agent to interact with the alphanumeric data can be accomplished through one or more methods within the platform. For example, one way to add the AI agent is through the user column in the table structure. In this method, users can assign the AI agent to specific items or tasks by selecting the AI agent's avatar or identifier from a dropdown menu in the user column, similar to how human team members are assigned. This allows the AI agent to be directly associated with and granted access to the data related to that specific item or task. For example, when a user wishes to assign a generative AI agent to a task, the cell of the people column in a desired row can be selected by a user. Then, a list of all the available entities that can be assigned to the task, including generative AI agents, is shown, either textually or graphically (e.g., via a graphical representation of each entity). Upon selection of one or more entities, their representations are introduced into that cell, and the SaaS platform updates the database to associate the entities with that Item. In case where one of the entities is the generative AI agent, permissions to access data, and log history associated with the assigned task will be provided thereto automatically.

Additionally or alternatively, the board users' interface may be used. In this interface, administrators or users with appropriate permissions can add the AI agent as a "user" of the board. This grants the AI agent broader access to the entire board's data, allowing it to interact with multiple items and perform board-wide analyses and actions. Additionally or alternatively, users can also assign the AI agent to specific tasks or processes within a board. This can be done through a dedicated button or option within each task's detailed view, allowing for granular control over which tasks the AI agent can interact with. Additionally or alternatively, the AI agent can be added to interact with data based on predefined roles. For example, a "Data Analyst AI" role could be created and then assigned to relevant boards or projects, automatically granting the AI agent the necessary permissions to interact with data typically accessed by a data analyst. Additionally or alternatively, the platform may offer an API that allows programmatic integration of the AI agent. This method enables developers or system administrators to automate the process of adding the AI agent to multiple boards or projects based on predefined criteria or triggers. In all these methods, the credentials management process ensures that the AI agent's interactions are limited to the scope defined by its assignment and role, maintaining data security and access control. This process checks the AI agent's permissions against the access requirements of the data it attempts to interact with, allowing or denying operations based on these defined parameters.

When activated, as shown at 312, the agent environment 200 prompts a generative AI model with the generative AI agent's profile and one or more indications of the plurality of items or the table structure. As shown at 313, this prompting enables the AI model to identify editing instructions that the generative AI agent should execute on one or more of the plurality of items. As shown at 314, the agent environment 200 then performs these editing instructions using the user credentials, ensuring that all actions are authorized and traceable.

The generative AI agent's functionality is dynamic and changes based on its assigned role within the team. For instance, a generative AI agent with a compliance-focused role would scan inputs for policy violations, while one assigned a language-teaching role would track grammar and vocabulary issues. Similarly, a generative AI agent with a visionary role might suggest additions to align with company goals. This role-based approach allows the generative AI agent to adapt its behavior and actions according to its assigned profile within the team, enhancing its effectiveness in supporting the project documented in the table structures.

The agent environment 200's design allows for seamless integration of AI capabilities into the workflow, enabling users to leverage advanced AI functionalities without requiring deep technical knowledge. By analyzing data and context, the generative AI agent can understand user intent and suggest or perform actions accordingly. This might include updating items, generating reports, or providing insights based on the data available in the table structures and the alphanumeric data contained therein.

These embodiments allow organizations to incorporate AI-driven assistance into their project management and collaborative workflows, enhancing productivity and decision-making processes within the SaaS platform without man guidance.

Figure 4A:
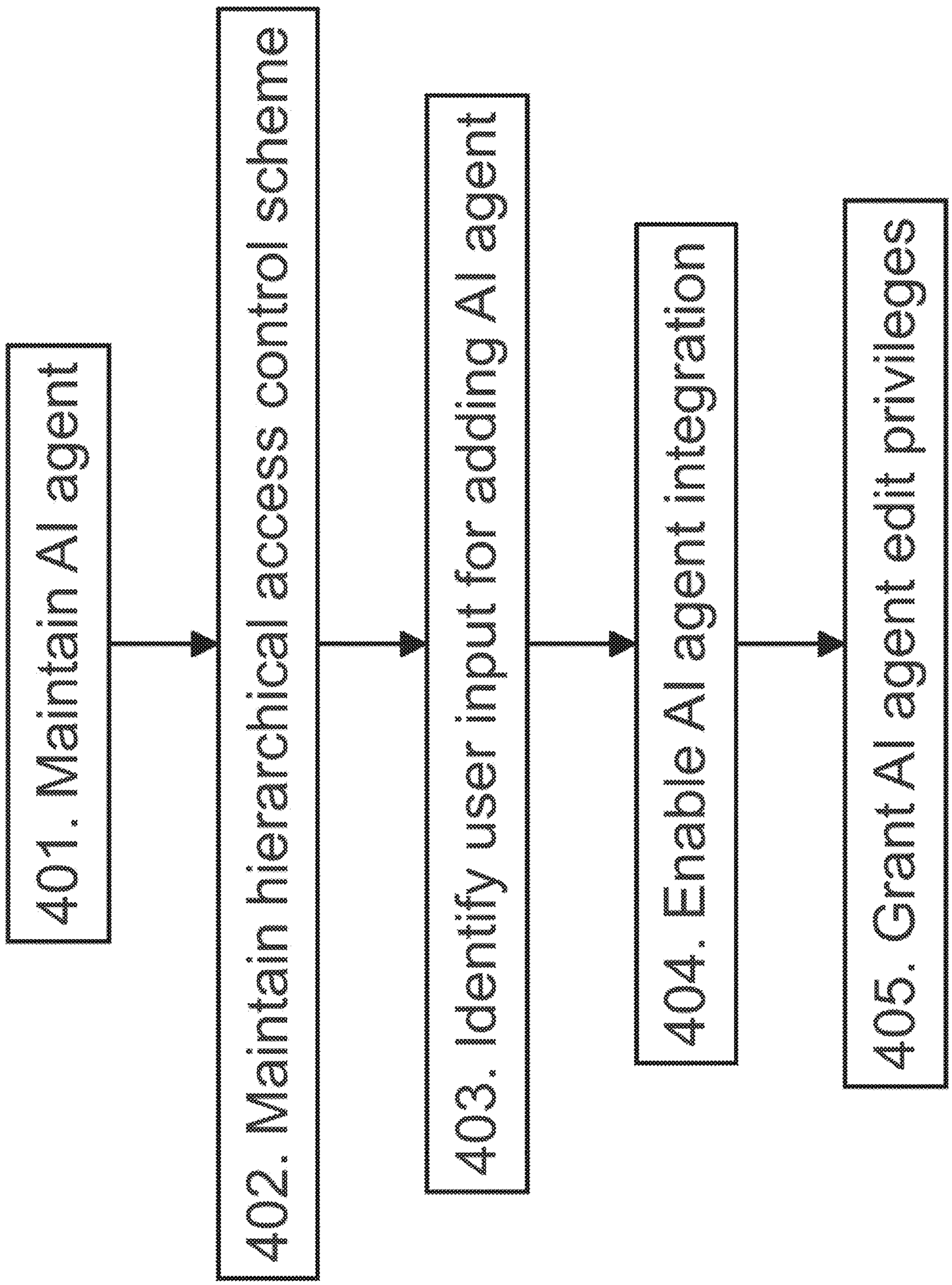
FIG. 4A is a flowchart of a computerized method for using generative artificial intelligence for intent-based interaction within a SaaS platform, consistent with some embodiments of the present disclosure.

Having explored the above workflows, we now turn our attention to the hierarchical access control scheme. Reference is now also made to FIG. 4A which is a flowchart of a computerized method for using generative artificial intelligence for intent-based interaction within a SaaS platform, consistent with some embodiments of the present disclosure. The flowchart is implemented using a SaaS platform, such as the agent environment 200 depicted in FIG. 1A, consistent with some embodiments of the present disclosure, for instance using the agent environment. This method, implemented by one or more processors, provides a solution for integrating AI agents into a hierarchical SaaS environment with controlled access privileges.

The process begins with maintaining a generative AI agent (step 401) configured to interact with alphanumeric data stored in table structures within the SaaS platform. In this case, these table structures are associated with different departments within an account. Concurrently to 401, the process maintains a hierarchical access control scheme (step 402) that maps the table structures to privilege classes, defining inheritable edit privileges. This scheme forms the basis for the generative AI agent's access rights within the agent environment 200. The method then identifies a user input (step 403) indicating the addition of the generative AI agent as a user to one or more table structures associated with a specific department. This step enables the integration of the generative AI agent into the desired area of the SaaS platform (404).

Finally, the method grants the generative AI agent edit privileges (step 405) inherited based on the hierarchical access control scheme of the department to which it's added. This ensures that the generative AI agent's capabilities are appropriately scoped to its assigned area.

Figure 5:
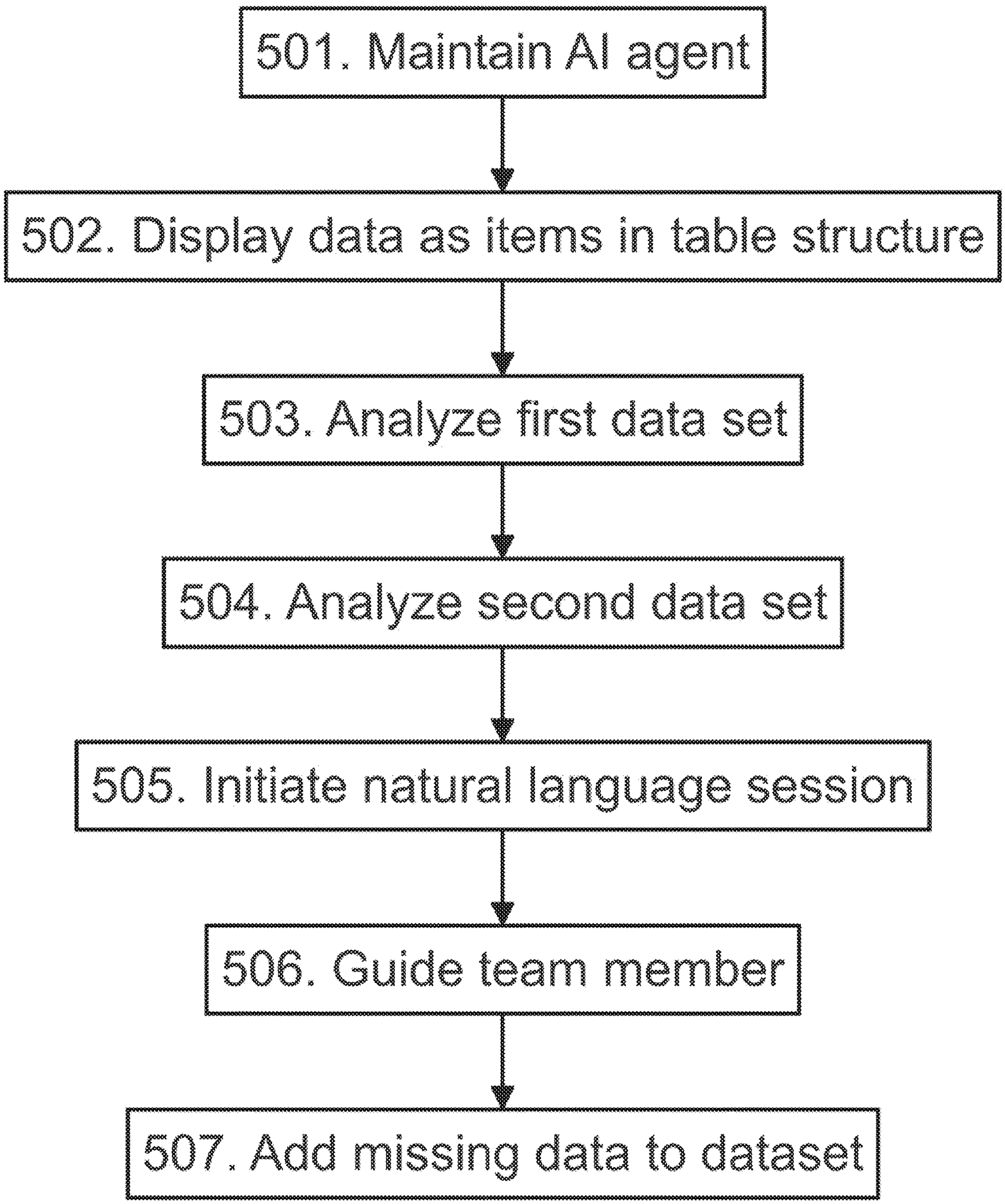
FIG. 5 is a flowchart depicting a process for automatically identifying missing data or actions in a data structure and AI-driven task assignment, consistent with some embodiments of the present disclosure.

The hierarchical access control scheme described here may complement the proactive information gathering process outlined in FIG. 5. By combining these features, the generative AI agent may autonomously collect information while respecting the access privileges defined by its position in the organizational hierarchy.

The process can be extended with additional features as described in the subsequent description. These include an onboarding process for the generative AI agent, the ability to add multiple instances of the generative AI agent with different privileges, and mechanisms for adapting the generative AI agent's output based on user roles and context.

Furthermore, the process allows for maintaining multiple AI agents with different profiles, training the AI model on diverse datasets, and personalizing the generative AI agent based on task context.

This method provides a flexible and powerful approach to integrating AI capabilities into a SaaS platform, with built-in safeguards for data access and customization options to suit various organizational needs.

For example, in an exemplary use case of a multi-level Marketing Campaign Management a global marketing team is using the described SaaS platform. A generative AI agent at the global level has access to overall brand guidelines and campaign performance data. Regional AI agents, inheriting some privileges from the global agent, access and analyze region-specific data to tailor campaigns, while country-level AI agents have the most granular access to local market data for hyper-local campaign optimization.

In this hierarchical structure, the flow of information and insights is designed to move both upwards and downwards. Country-level AI agents, which are assigned to tables associated with a single country, provide summaries of their analyses and local campaign performance to the Regional AI agents. These Regional AI agents, while not directly associated with the country-level boards, have access to regional boards that aggregate data from multiple countries.

The Regional AI agents, in turn, synthesize the information from various country-level reports, identifying regional trends, best practices, and areas for improvement. They then provide consolidated regional summaries to the global AI agent. This global agent, with its overarching view of all regions and countries, can identify global trends, ensure brand consistency across all markets, and disseminate high-level strategies back down through the regional and country-level agents.

This multi-tiered AI agent structure allows for efficient information flow and decision-making at all levels of the organization that may focus on a hyper-local optimization and provides granular insights, aggregate country data and ensure overall brand consistency. Each level of AI agent may operate within a defined scope, with carefully managed access permissions that allow for necessary data sharing while maintaining appropriate data segregation and security. This structure enables the organization to balance global consistency with local relevance in their marketing campaigns, leveraging AI at each level to enhance decision-making and campaign effectiveness.

In some embodiments, the agent environment 200 includes an organizational development module configured to analyze utilization data, component usage patterns, and account information to provide data-driven insights for account managers, administrators, and other roles. This module processes information to identify work management processes involving one or more components of the software application.

The organizational development module monitors inputs and behaviors across all account users to establish standard timings and behaviors for various workflows. It then compares current processes against these deduced standards to identify gaps or abnormalities. By analyzing the components involved in these discrepancies, the module can infer high-level conclusions about organizational management, such as resource allocation issues, component misuse, or process inefficiencies.

Optionally, the organizational development module manages agents with different domains of expertise and/or permission level. For example, some agents, referred to as task-level agents, are assigned to specific types of tasks or projects within a department to monitor and analyze the time taken for completion, common bottlenecks, and typical user behaviors associated with these specific tasks. For example, a "software development task" AI agent might focus on coding, testing, and deployment workflows. In parallel other agents may aggregate data from multiple task-level agents within a single department. They identify department-specific patterns and establish benchmarks for different types of workflows within that department. For instance, an AI agent would analyze and compare various marketing campaign workflows, content creation processes, and analytics tasks. Additionally or alternatively some agents are granted with permissions to access data across multiple departments. They focus on identifying interdependencies between different departmental workflows and how they impact overall organizational efficiency. For example, they might analyze how delays in the product development department affect marketing campaign timelines. Additionally or alternatively some agents have access to aggregated data from all departments. They provide high-level insights on organizational efficiency, identify macro-level trends, and suggest strategic improvements to workflows across the entire organization. Such a hierarchical structure of AI agents allows for nuanced analysis at various levels of the organization. Each AI agent operates within its domain of expertise and permission level, recognizing the unique characteristics and requirements of different tasks and departments. This approach ensures that workflow analysis and optimization are context-aware and relevant to each specific area of the organization, while still allowing for broader, organization-wide insights and improvements.

The module may incorporate knowledge of common industry practices, comparing current processes or established standards against relevant market norms to generate additional insights. These insights can address current situations or predict future performance issues. For example, the module may calculate typical task completion rates and compare them against available resources to forecast potential bottlenecks.

Insights generated by the organizational development module can be directed to predetermined roles within the account, such as administrators. Alternatively, the module may determine which users would benefit most from specific insights and target delivery accordingly. This intelligent routing ensures that insights reach the most appropriate decision-makers, even in cases where the subject of an insight might not be the ideal recipient.

When a user initiates a new process, the organizational development module can be configured to provide contextually relevant information. Once it has gathered sufficient data to infer the process type, the module queries its database for relevant information, drawing from previous implementations, established standards, or a combination of available external information and known application component usage patterns.

The module can also analyze provided or inferred roadmaps to identify missing resources or components necessary for timely completion. For instance, it may deduce required staffing levels based on projected work hours and compare this against current staffing, notifying HR or roadmap designers of potential shortfalls.

Additionally, the organizational development module can generate suggested plans to achieve specified company goals. By analyzing past work management processes and current resources, the module identifies gaps in resources, processes, or methodologies. It then constructs a roadmap to address these gaps, potentially including risk assessments and mitigation strategies based on the relevant work management field.

The module is also capable of identifying dependencies between software application components, such as task interdependencies within project lists. It can automatically define these dependencies within the agent environment 200 and optionally notify relevant users of their existence.

This comprehensive organizational development capability enables data-driven decision-making and proactive resource management, continually adapting to evolving business needs and available platform features to drive ongoing efficiency improvements and strategic alignment.

The generative AI agent may be built on a generative AI model, for instance using a transformer-based architecture such as GPT (Generative Pre-trained Transformer). This model is trained on a diverse dataset of interactions with alphanumeric data stored in various table structures across the SaaS platform and optionally other platforms. The training process involves supervised learning techniques, where the model learns to generate appropriate responses and actions based on input queries and context.

The generative AI agent may be designed with a modular architecture, allowing it to interface with different components of the SaaS platform such as:

a) Data Access Module: Interfaces with the SaaS platform's database to read and write alphanumeric data in table structures.

b) NLP Module: Processes user queries and generates human-like responses.

c) Task Execution Module: Translates high-level instructions into specific database operations or API calls within the SaaS platform.

d) Context Management Module: Maintains and updates the generative AI agent's understanding of its current context within the SaaS platform's hierarchical structure.

Optionally, the generative AI agent is capable of performing editing instructions without requiring specific step-by-step guidance from team members, leveraging its training and context understanding to infer the appropriate actions.

Optionally, the hierarchical access control system is implemented using a tree-like data structure, where each node represents a level in the organizational hierarchy and may contains one or more of the following:

a unique identifier for the hierarchical level;

a list of associated table structures; and a set of privilege classes defining edit permissions.

The agent environment 200 can be configured to use an inheritance mechanism, where child nodes inherit privileges from their parent nodes and may have additional privileges. This may be implemented using a recursive function that traverses the tree structure to compile the complete set of privileges for any given node. Multiple instances of the generative AI agent may be added to different levels of this hierarchical structure. Each instance is associated with a node in the tree and inherits the privileges of that node. The agent environment 200 maintains a mapping between AI agent instances and their corresponding nodes in the hierarchy. For example, a first AI agent at a higher level might have a base set of edit privileges, while a second AI agent at a lower level inherits these privileges and gains additional, more specific edit rights.

Figure 4B:
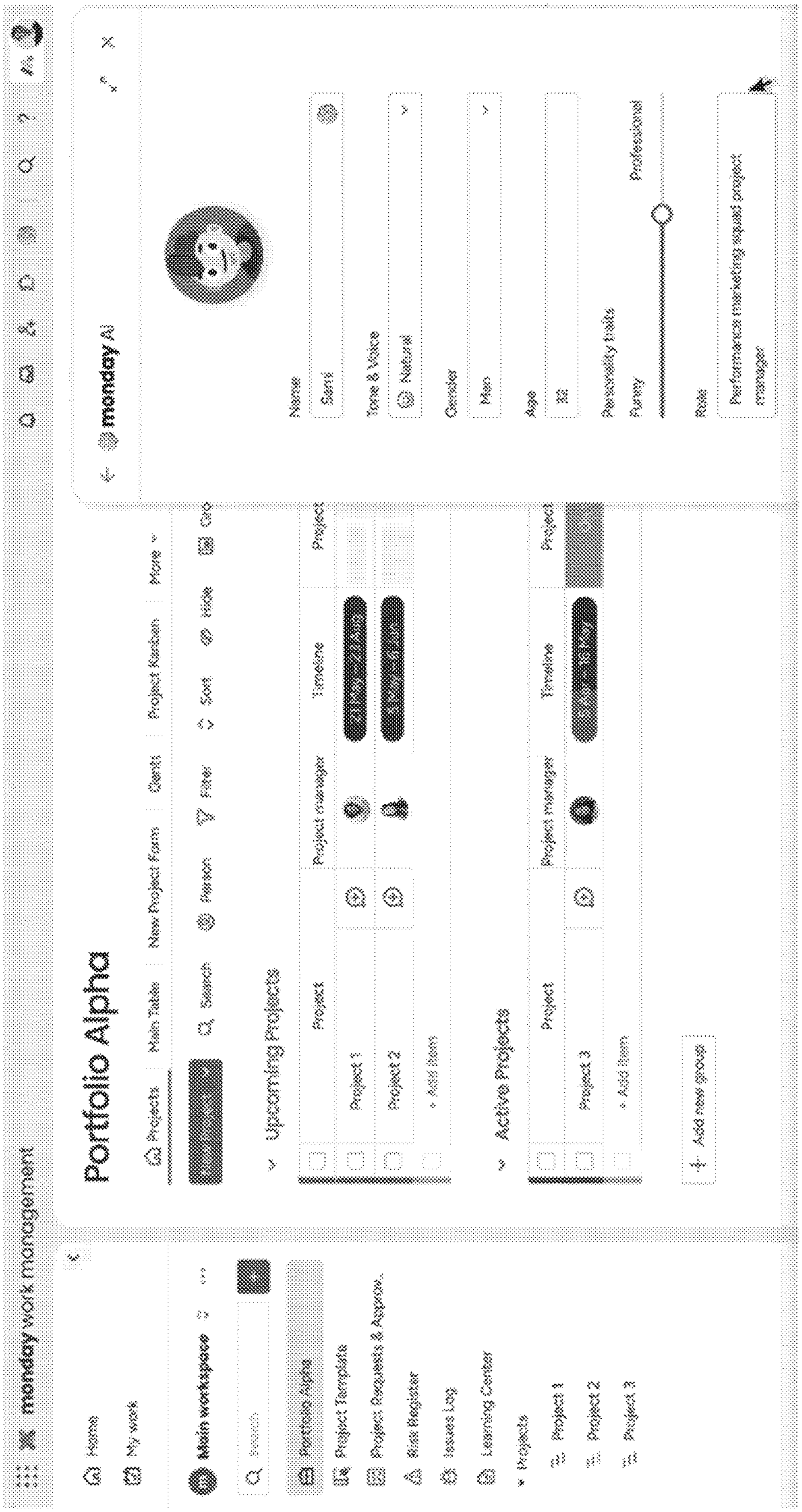
FIG. 4B is an exemplary user interface allowing a user to interact with a generative AI agent, consistent with some embodiments of the present disclosure.

Optionally, the onboarding process for the generative AI agent involves a role assignment where the generative AI agent is assigned a specific role within the team or project. In this case, the agent environment 200 collects relevant information about the project, team structure, and specific tasks. For example, FIG. 4B depicts a window 450 allowing a user to define a role of an added AI agent, a definition which may be converted into prompt(s) provided as an input to the generative AI agent.

Based on the role and context, the agent environment 200 sets appropriate access permissions for the generative AI agent. A tailored knowledge base is created for the generative AI agent, containing context-specific information and know-how related to its role. The personalization of the generative AI agent may be achieved through one or more of the following (separately or a combination thereof):

a) Fine-tuning: The base AI model is fine-tuned on the context-specific data gathered during onboarding.

b) Prompt Engineering: A set of role-specific and context-specific prompts are created to guide the generative AI agent's behavior in different situations.

c) Dynamic Context Updating: The generative AI agent continuously updates its understanding of the context based on interactions and changes in the SaaS platform.

The generative AI agent may employ a context-aware response generation system that considers:

a) User Role: The agent environment 200 maintains a database of user roles and their associated permissions and responsibilities.

b) Interaction Location: The generative AI agent tracks its current location within the SaaS platform's structure.

c) Query Context: NLP techniques are used to understand the context and intent of user queries.

In some embodiments, the agent environment 200 includes a persona-specific knowledge base module configured to artificially limit the information accessible to the generative AI agent and tailor its outputs accordingly. This module can be instructed to restrict its knowledge to information contained within a designated database or to the information familiar to a specific user, as deduced from analyzing that user's log records and interactions within the agent environment 200.

The persona-specific knowledge base module is capable of adapting the style, phrasing, and editing of its outputs to mimic a particular user's communication patterns. It achieves this by analyzing the manner in which the target user has historically styled, phrased, and edited their inputs to the application. This stylistic mimicry can be combined with the knowledge limitation feature to create an AI persona that closely approximates a specific user's knowledge and communication style.

This functionality proves particularly useful in scenarios where a query needs to be directed to a user who is absent, unavailable, or no longer associated with the account. Other users can interact with this AI persona to access information known to the absent user, maintaining continuity of knowledge within the organization.

For instance, when an employee leaves the company, instead of deleting their account, an administrator can instruct the generative AI agent or generative AI model to create an AI persona for that account. This persona's knowledge of the application is limited to the information the departing user was exposed to during their tenure. The module studies the style in which the user interacted with the application and any connected third-party applications to accurately mimic their communication style. This approach allows other users to benefit from the knowledge accumulated by the departing user, preserving valuable institutional memory that might otherwise be lost.

The persona-specific knowledge base module employs sophisticated natural language processing and machine learning algorithms to analyze and replicate user communication patterns. It maintains separate knowledge graphs for each user persona, ensuring that information access is appropriately limited. When generating responses, the module first queries the restricted knowledge base, then applies the learned stylistic patterns to format the output.

This capability not only preserves knowledge but also maintains the familiar interaction patterns that team members have come to expect from their colleagues. It can smooth transitions during personnel changes and ensure that critical information remains accessible even after key team members have departed.

Based on these factors, the generative AI agent dynamically adjusts its output using:

a) Response Templates: Pre-defined templates for different types of responses, customized for different roles and contexts.

b) Content Filtering: A filtering mechanism that ensures the generative AI agent only provides information appropriate to the user's role and permissions.

c) Tone Adjustment: NLP techniques to modify the tone and complexity of responses based on the user's role and the query context.

Figure 4C:
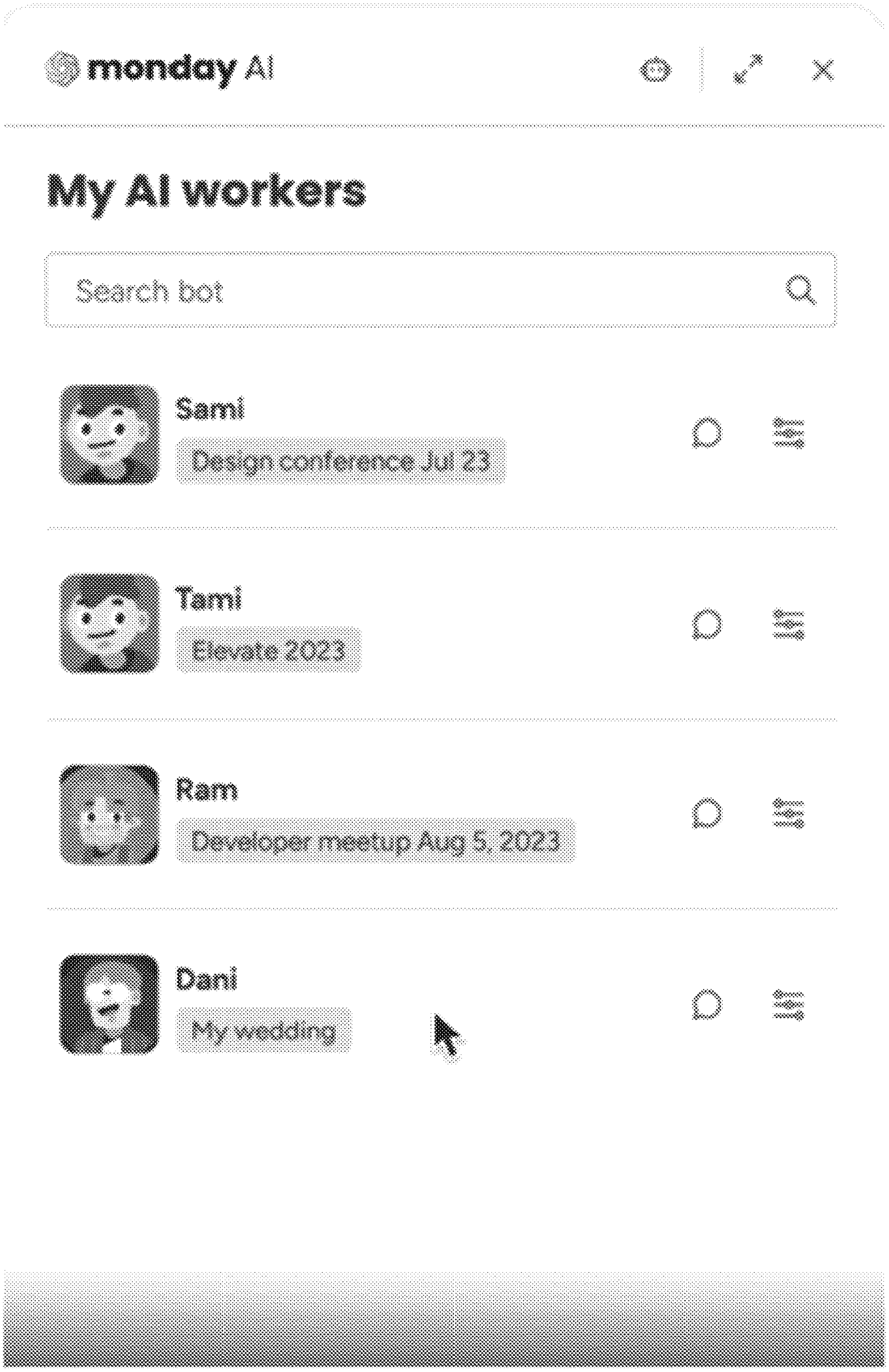
FIG. 4C is an exemplary user interface including a list of multiple AI agent assigned to a user account, for instance purchased or other used by a user of the user account, consistent with some embodiments of the present disclosure.

Multiple AI agents with different profiles can be maintained, each with its own set of response templates and content filters tailored to its specific role. For example, FIG. 4C depicts a list of multiple AI agent assigned to a user account, for instance purchased or other used by a user of the user account. Each one of the generative AI agents may differ from one another in credentials, privileges, cost, training datasets, used models, identifiers and/or availability, for example as described herein with reference to any of the cited references. The generative AI agent may work separately and/or communicate with one another either via the system platform user interfaces and/or via different channels, optionally based on textual inputs.

Optionally, the generative AI agent can be embodied as an avatar, implemented as a graphical user interface (GUI) element within the SaaS platform. This avatar serves as a visual representation of the generative AI agent and provides a point of interaction for users. When introduced to a task, the avatar may trigger one or more of the following:

a) Access Grant: The agent environment 200 automatically grants the generative AI agent permission to access relevant log history and context items.

b) Context Loading: The generative AI agent loads the task-specific context into its working memory.

c) Interface Update: The avatar's appearance or behavior may change to reflect its current task context and permissions.

This technical specification provides a comprehensive overview of the agent environment 200's architecture and functionality, covering both the main method and its various extensions as described in the dependent claims. The actual implementation would involve detailed coding of each component, database design for storing hierarchical structures and permissions, and integration with the existing SaaS platform infrastructure.

Optionally, the data in the SaaS platform 100 is organized with privacy settings that control visibility and access within an account:

a) Shared Tables: These tables contain data that is visible and accessible to all users within the account. They typically store common, non-sensitive information that is relevant to all team members.

b) Dedicated Tables: These tables have restricted visibility and are only accessible to a selected portion of users within the account. Access to these tables can be controlled based on various factors such as:

User groups or teams

Job titles or roles

Specific permissions assigned to individual users

Project assignments

Departments or divisions within the organization

This structure allows for fine-grained control over data access, ensuring that sensitive or specialized information is only visible to those who need it, while still maintaining a collaborative environment where common data is shared across the account.

Optionally, the training process includes data preprocessing and anonymization, token embedding generation, multi-head attention mechanism training and output layer fine-tuning for task-specific performance. Optionally, the NLP is used for processing user queries and generating responses includes:

a) Tokenization: Using sub word tokenization techniques like Byte-Pair Encoding (BPE) or Sentence Piece.

b) Intent Classification: A separate neural network model (e.g., BERT-based) to classify user intents.

c) Named Entity Recognition (NER): To identify and extract key entities from user queries.

d) Semantic Parsing: To understand the logical structure of complex queries.

e) Coreference Resolution: To handle queries that reference previous context.

f) Response Generation: Using the core LLM with beam search decoding for generating multiple candidate responses.

g) Response Ranking: A separate model to rank and select the most appropriate response based on relevance and context.

Optionally, the edit privilege inheritance is implemented using a directed acyclic graph (DAG) data structure, allowing for multiple inheritance paths. Each node in the DAG represents a privilege class and contains:

Unique identifier

Set of allowed operations (CRUD—Create, Read, Update, Delete)

List of table structures the privileges apply to

Pointers to parent privilege classes

Optionally, the agent environment 200 for adapting AI output based on context uses a multi-layer perceptron (MLP) neural network that takes as input:

Embeddings of the user's role

Embeddings of the current location in the SaaS platform

Embeddings of the query context

The raw output from the core LLM

Optionally, a multi-agent system is implemented using a microservices architecture, with each AI agent instance running as a separate service. Inter-agent communication may be handled through a message queue system (e.g., RabbitMQ or Apache Kafka) to ensure asynchronous, reliable communication. The agent environment 200 includes: a centralized service that maintains metadata about all active AI agents, their roles, and their current assignments and a load balancer that distributes incoming queries to appropriate AI agents based on context and availability. A service that dynamically updates and enforces access privileges for each AI agent may be used. Records all actions taken by AI agents for accountability and debugging purposes.

Optionally, the avatar system is implemented as a web-based front-end using technologies such as React or Vue.js. It may include:

a) WebSocket Connection: For real-time communication between the avatar interface and the generative AI agent backend.

b) State Management: Using libraries like Redux to manage the avatar's state, including its current task, permissions, and interaction history.

c) Animation System: Implements subtle animations to make the avatar more engaging, using CSS animations or a library like GreenSock.

d) Accessibility Features: Ensures the avatar interface is usable with screen readers and keyboard navigation.

When the avatar is introduced to a task:

1. A secure token is generated and sent to the backend to authorize access to task-specific data.

2. The backend loads relevant log history and context items into a cache (e.g., Redis) for quick access.

3. The avatar's appearance is updated using a theme system that reflects its current permissions and task context.

Optionally, to ensure the generative AI agent stays up-to-date with the latest data patterns without compromising data privacy, a federated learning approach can be implemented. Each instance of the generative AI agent maintains a local copy of the model that is updated based on interactions within its specific context. Periodically (e.g., weekly), a secure aggregation protocol may be initiated:

Local model updates are encrypted using homomorphic encryption.

A central server aggregates these encrypted updates.

The aggregated update is decrypted and applied to the global model.

As indicated above, the agent environment 200 described in FIG. 1A is used for providing AI interactions within a project management/SaaS platform. It allows executing processes that enhance team collaboration and workflow efficiency. These processes are implemented through the agent environment 200's processors and the maintained AI agent.

Reference is now also made to FIG. 5 which is a flowchart depicting a process that allows automatically identifying missing data or actions in a data structure such as a board, reducing manual oversight and minimizes project delays. The process also allows AI-driven task assignment that ensures that a suitable team member may be engaged, optimizing resource allocation. The flowchart is implemented using a SaaS platform, such as the system depicted in FIG. 1A, consistent with some embodiments of the present disclosure, for instance using the agent environment.

This process begins with the maintenance of a generative AI agent (step 501) configured to interact with data associated with tasks assigned to a team sharing a common objective. The data is stored in the system's table structures, which may include one or more databases or data structures optimized for quick access and manipulation. As indicated above, the generative AI agent may be executed using an AI engine built on a transformer-based architecture, such as a fine-tuned BERT model or GPT-3. This engine is responsible for NLP and generation, enabling intelligent interactions with team members. TensorFlow is employed for developing and running machine learning models that analyze user behavior and predict task assignments.

In step 502, a display of the data as items in a table structure is presented. This table structure is designed to represent the workflow for each item, providing a visual representation of the project's progress and individual task statuses. The process then proceeds to perform two critical analyses. First, in step 503 a first data set is analyzed to identify any missing data or actions in the workflow. This analysis may involve scanning through the items in the table structure, checking for incomplete fields, or identifying steps in the workflow that have not been initiated or completed.

Following this, in step 504, the agent environment 200 analyzes a second data set. This set comprises interactions with the data and metadata of previous items in the table. The purpose of this analysis is to identify at least one team member associated with performing the missing action or providing the missing data. This step leverages the agent environment 200's understanding of team members' roles, past contributions, and areas of expertise.

In one example, the first data set, analyzed in step 503, primarily focuses on the current state of the project or workflow as represented in the table structure. It may include task descriptions and their current status, due dates and timelines, assigned team members, priority levels, dependencies between tasks, completion percentages, and/or custom fields specific to the project such as budget allocations or resource requirements. This data set represents the "static" or current snapshot of the project. The analysis of this set aims to identify gaps, such as tasks with missing due dates, unassigned tasks, tasks stuck in a particular status for an unusually long time, missing dependencies, or incomplete information in critical fields.

In contrast, the second data set, analyzed in step 504, focuses on historical interactions and metadata which may be related to the project and/or team members or to similar projects and/or team members. It includes logs of changes made to tasks (e.g. detailing who made the changes and when), communication history related to specific tasks (e.g. including comments and discussions), past performance metrics of team members on similar tasks, frequency and patterns of interactions with specific types of tasks by different team members, time spent on various stages of similar tasks in the past, and/or historical data on who typically resolves certain types of issues or provides specific types of information. This data set is more "dynamic" and historical in nature. The analysis of this set may be used to identify patterns and make informed predictions about who might be best suited to address the missing actions or data identified in the first analysis.

In the above example, in terms of time frame, the first data set represents the current state, while the second data set covers historical information and patterns over time. The first data set is used to identify what is missing or incomplete in the current project state, while the second data set is used to determine who might be best suited to address these gaps based on past behavior and expertise. The first data set may be focused on the specific project or workflow at hand, whereas the second data set may draw from a broader range of projects and team interactions to inform its analysis. The nature of the data in each set is distinct as well. The first data set is more structured and directly related to task attributes, while the second data set includes more unstructured data like communication logs and interaction patterns.

Finally, the analysis approach for each data set may differ. The first data set analysis may more straightforward, often involving direct comparisons and checks against predefined criteria. In contrast, the second data set analysis may involve more complex pattern recognition and predictive modeling. By analyzing both sets, the system may not only identify what needs to be done but also make intelligent suggestions about who might be best suited to do it, based on a comprehensive understanding of both the current project state and historical team performance. This dual analysis approach enables a more nuanced and effective project management strategy, leveraging both immediate project needs and long-term team dynamics.

In another example, the first and second data sets analyzed in steps 503 and 504 encompass a broader range of information sources. The first data set, analyzed in step 503, includes both the current state of the project or workflow as represented in the table structure within the SaaS platform, as well as historical interactions and metadata from within the same SaaS platform. This might encompass the current task lists, deadlines, assigned team members, and progress status, along with past changes to tasks, previous project timelines, communication logs related to the project, and patterns of task completion or delay. The second data set, analyzed in step 504, can include data associated with the project itself, which may be stored either within the SaaS platform or in connected third-party applications. This allows for a more comprehensive analysis by incorporating specialized tools and data sources specific to the project's nature. For example, in a software development project, the first data set might include a task in the SaaS platform about generating a new application feature. This task would have associated metadata such as the person assigned, the due date, any related discussions, and its current status. The second data set could include the actual code repository in GitHub (a third-party application) where the application is being developed. This would provide detailed information about code commits, pull requests, code reviews, and the actual progress of the feature development at a technical level.

By analyzing both sets of data, the system can provide a more holistic view of the project's progress. It can correlate the high-level task management data from the SaaS platform with the granular development activity data from GitHub. This might reveal insights such as discrepancies between reported task progress and actual code development, identification of bottlenecks or challenges not reflected in the task management system, more accurate predictions of completion times based on both project management data and actual development pace, and improved resource allocation suggestions by understanding both the assigned tasks and the actual work being done. This dual-data set approach allows the system to bridge the gap between project management oversight and the actual work being performed, leading to more accurate insights and better-informed decision-making. It combines the structured, high-level view of project management with the detailed, technical progress data, providing a comprehensive understanding of the project's true status and potential issues or opportunities. Optionally, data sets are acquired using an API Layer. Communication between the client and server is facilitated through one or, more of RESTful APIs built using FastAPI, and a GraphQL interface. This dual approach allows for efficient handling of both simple data transfers and complex, nested queries. The agent environment 200 may implement OAuth 2.0 for secure authentication with external services. A plugin architecture allows for easy addition of new integrations, enabling the agent environment 200 to interface with a wide range of third-party applications.

Finally, in step 505, the method initiates a natural language session between the generative AI agent and the identified team member. The process of identifying missing information and reaching out to team members, as described in steps 503-505, can be enhanced by the interactive analysis capabilities detailed in FIG. 8. This combination allows for more transparent and user-friendly interactions when the generative AI agent seeks to fill information gaps.

As shown at 506 and 507, during this session, the generative AI agent may notify the team member about the missing data or actions and/or guide it through the process of performing the missing action or adding the missing data to the dataset.

Reference is now also made to a description of additional optional modules and capabilities of the agent environment 200.

In some embodiments, the agent environment 200 includes an AI-driven dashboard module configured to enhance visibility of work patterns derived from user-utilized components. This module leverages the generative AI agent's knowledge of usage patterns, component understanding, and user data context to deduce relevant data points or key metrics from components associated with the user and processes relevant to their specific field of work or operational goals. If unable to deduce such data points, the agent environment 200 may query the user with possible relevant data points for confirmation or correction.

The AI-driven dashboard module analyzes these data points to determine the most beneficial graphical representations for presenting the information in an easily digestible manner. It utilizes a repository of data visualization graphical elements, such as graphs or widgets, each suited for presenting different data types. The module can associate these graphical elements with data points based on known best practices, usage history of other users in similar fields, or direct associations with system components.

Once associations are established, the module generates a visual component, such as a dashboard, presenting the selected data visualization graphical elements in a context suitable for the user's field of work or operational goals. Users may also initiate dashboard creation by providing specific data points they wish to visualize.

The agent environment 200 also includes a context-aware chatbot activation module that allows the generative AI agent to receive permission to access previously restricted information through user invitations. This can be achieved through a mentioning function, where users can notify the generative AI agent about information stored in a component, granting it access. This functionality extends to third-party applications, where the generative AI agent can listen for mentions through connected apps.

Furthermore, the agent environment 200 incorporates a communication overlay module that enables the generative AI agent to introduce secondary components onto primary components, adjusting its output based on the primary component's data and context. For example, it can overlay a chat interface onto a graph component, allowing users to discuss specific data points directly on the visualization.

This module employs context-based deduction to determine logical methods for introducing secondary components, considering the functionalities of both components involved. It can analyze associated data to deduce reasons or conclusions explaining changes in visualized data, not limited to displayed data but incorporating relevant information from across the agent environment 200.

The communication overlay module initiates a structured reason discovery process when significant changes are detected in components, employing both syntactic and semantic search mechanisms to provide explanations. This process can utilize pre-existing data that contains explanations not directly associated with the displayed component.

For instance, users can initiate discussions about specific data points on a graph by clicking interest points, with the agent environment 200 instructing the SaaS platform to add a discussion component in response. These discussions can be associated with the graph generally, specific locations on the graph, or the data source, while maintaining context for AI utilization. The discussions are stored in a repository for use by other users in the account.

The agent environment 200 can also display snapshots of current states near relevant discussion points on graphs, providing users with clearer understanding of data fluctuations relevant to the time of discussion. This comprehensive approach to data visualization and interaction significantly enhances user understanding and engagement with complex data sets and work processes.

In an exemplary customer support scenario, the generative AI agent reviews incoming support tickets. It identifies a complex issue requiring input from multiple departments. The generative AI agent autonomously reaches out to the relevant team members from product, engineering, and account management, gathering the necessary information to compile a comprehensive solution for the customer, significantly reducing resolution time.

In another example, consider a software development project with multiple team members, including developers, designers, and quality assurance specialists. The project is managed using the AI-enhanced platform described herein.

In this exemplary scenario a critical bug has been reported, but the necessary fix requires information from multiple team members and coordination across different stages of the development process. The generative AI agent analyzes the project data and identifies that a critical bug report has been added to the SaaS platform, but no action has been taken yet. Based on the nature of the bug and historical data, the generative AI agent determines that John, a back-end developer, is the most suitable person to initially address this issue. The generative AI agent autonomously initiates a natural language session with John through the platform's chat interface. AI: "Hello John, I've noticed a critical bug report (ID: BUG-2024) has been added to the agent environment 200. Based on your expertise, you're best suited to start addressing this issue. Would you like me to guide you through the process?" John agrees, and the generative AI agent provides relevant context. AI: "The bug appears to be related to the user authentication module you worked on last week. It's causing login failures for approximately 15% of users." The generative AI agent guides John through the initial investigation process. AI: "Let's start by examining the error logs. Can you please navigate to the 'Logs' section in the dashboard and filter for authentication errors from the past 24 hours?" John follows the instruction and confirms completion. AI: "Great. Now, let's analyze the pattern. Do you notice any commonalities among the affected users?" John identifies that the issue seems to affect users who recently changed their passwords. AI: "Excellent observation. This narrows down our focus. We should involve Sarah from the database team to check if there are any issues with password updates in the user table. Would you like me to bring her into this conversation?". With John's agreement, the generative AI agent or generative AI model initiates a group chat, adding Sarah to the conversation. It provides a summary of the issue and John's findings to Sarah. Based on the discussion, the generative AI agent or generative AI model suggests creating subtasks and assigns them to relevant team members. AI: "I've created the following subtasks in our project management board:

1. Investigate password update process (Assigned to Sarah)
2. Review authentication code for recent changes (Assigned to John)
3. Prepare database patch if needed (Assigned to Sarah)
4. Implement and test fix (Assigned to John)
5. Conduct QA on the fix (Assigned to Alex from QA team)

I've also updated the bug ticket status to 'In Progress' and linked these subtasks to it. Does this plan look appropriate to both of you?"

As John and Sarah confirm the plan, the generative AI agent updates the project board in real-time. Other team members, including the project manager, receive notifications about the updated bug status and new subtasks. The generative AI agent or generative AI model continues to monitor the progress of these subtasks, providing reminders, answering questions, and offering assistance as needed. For instance: AI: "John, I noticed you've been working on the authentication code review for over two hours. Do you need any additional resources or assistance? I can provide access to the recent code merge logs if that would be helpful.". Throughout this process, the generative AI agent or generative AI model learns from the interactions, improving its ability to handle similar situations in the future. It may, for example, learn to associate certain types of authentication bugs with password change processes, allowing for faster diagnosis in future occurrences. This example demonstrates how the generative AI agent guides team members through a complex problem-solving process, facilitating collaboration, providing relevant information, and managing the workflow in real-time in the platform, assign users and inset data when needed as a user.

The agent environment 200 is capable of executing several additional methods that enhance its functionality. The agent environment 200 can select team members based on affiliation determinations, allowing for more accurate assignment of tasks and responsibilities where it can interface with third-party applications, expanding the scope of data it can analyze and interact with. Optionally, a graph database, such as Neo4j, models team relationships and project structures. PageRank-like algorithms determine the most relevant team member for a given task based on expertise, availability, and past performance. Alternatively, team members may be identified using a trained AI model, for instance a model trained on historical logs documenting behavior and communication of other teams.

Optionally, the agent environment 200 supports autonomous initiation of natural language sessions, enabling proactive problem-solving without human intervention. Optionally, it can analyze log records and context information to determine ownership of different workflow steps, improving task allocation accuracy. Optionally, the generative AI agent can be configured to proactively seek out missing data or actions, initiating communication with relevant team members as needed. Optionally, during guidance sessions, the agent environment 200 can provide step-by-step instructions tailored to the specific workflow context. The agent environment 200 updates workflows in real-time as actions are performed or data is added, ensuring all team members have access to the most current project status. Through machine learning capabilities, the generative AI agent may continuously improve its ability to identify responsible parties for specific tasks based on past interactions. The agent environment 200 may integrate with external communication platforms, facilitating seamless interaction across various team collaboration tools.

During natural language sessions, the generative AI agent may provide relevant contextual information from the project data, (including links to the one or more data sets in which the data is found), assisting team members in resolving identified issues more effectively. When necessary, the generative AI agent may request permission to access relevant user accounts to resolve problems, ensuring data privacy and security protocols are maintained.

Figure 6:
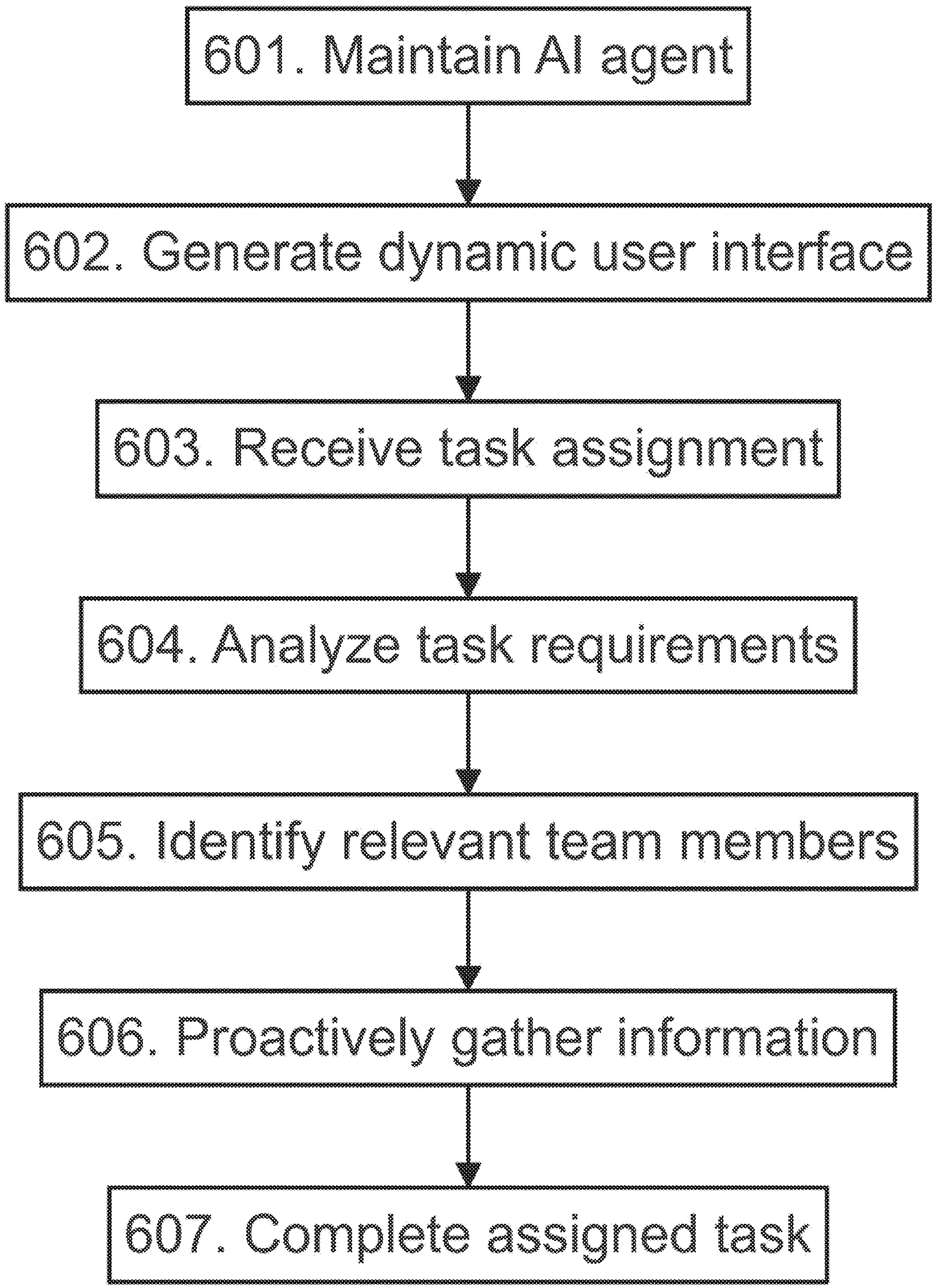
FIG. 6 is a flowchart of a method of proactive information gathering, consistent with some embodiments of the present disclosure.

Building upon the concept of AI-driven task management, we now examine the process of proactive information gathering. Reference is now also made to FIG. 6, which is a flowchart of a method of proactive information gathering, consistent with some embodiments of the present disclosure. The flowchart is implemented using a SaaS platform, such as the agent environment 200 depicted in FIG. 1A, consistent with some embodiments of the present disclosure, for instance using the agent environment.

As shown at 601, the agent environment 200 maintains a generative AI agent capable of interacting with alphanumeric data stored in the table structure for example as described above. This may involve updates to the AI model using federated learning techniques to improve performance without compromising data privacy, continuous monitoring of the generative AI agent's performance metrics, with automatic alerts for any deviations from expected behavior and/or periodic retraining of the AI model using anonymized project data to enhance its understanding of project contexts and team dynamics.

Now, the agent environment 200 generates a dynamic user interface that displays the table structure and provides input mechanisms for task assignment. This may involve implementing a responsive design using React.js for seamless display across various devices and screen sizes and utilizing WebSocket connections for real-time updates to the displayed data. Now, as shown at 603 and 604, upon receiving a task assignment, the generative AI agent analyzes the task requirements and assesses the available information. This process includes NLP techniques to interpret task descriptions and requirements and/or semantic analysis of the table structure data (combining the item name with titles of the data characteristics for that item and the data type in which the data characteristics are stored in the table), to identify relevant information and/or implementation of a custom-built knowledge graph to map relationships between different data points and identify information gaps. As shown at 605, the agent environment 200 can now autonomously identify relevant team members based on context. This may be performed as described above and/or by utilizing a graph database (e.g., Neo4j) that models team relationships and expertise and/or implementing collaborative filtering algorithms to predict which team members are most likely to have the required information and/or analyzing historical data using time series analysis to consider team members' past contributions and current availability.

As shown at 606 this allows proactive information gathering. The generative AI agent reaches out to identified team members to obtain missing information. Now, as shown at 607. the generative AI agent completes the assigned task using the obtained information. Optionally, a skills taxonomy using ontology-based information extraction from team member profiles and project documentation is used for identifying a suitable member. Optionally, sentiment analysis is used on past communications to tailor the tone and style of outreach messages and a machine learning model may be used to predict optimal times for reaching out to each team member.

Figure 7A:
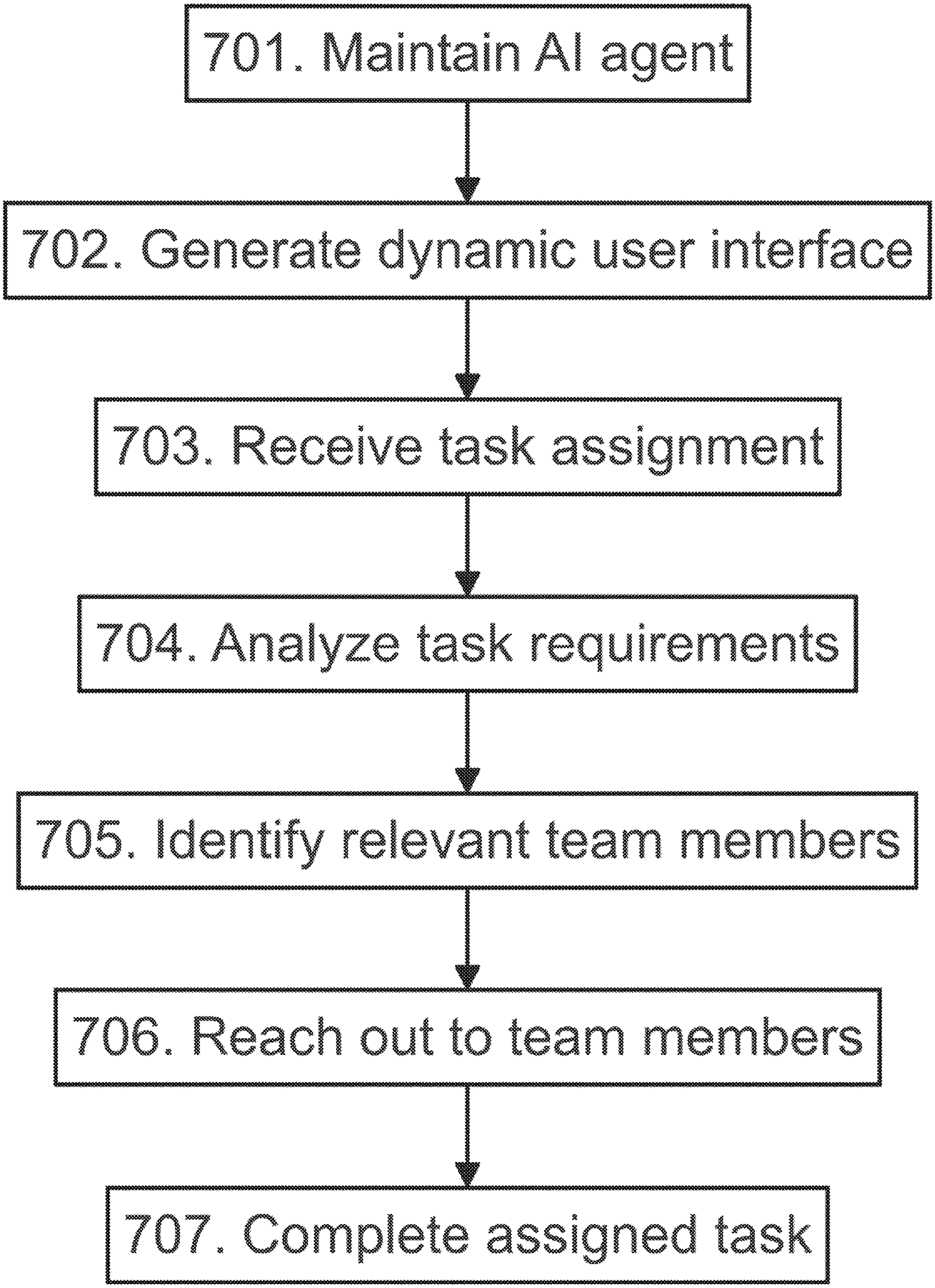
FIG. 7A is a flowchart of an exemplary process wherein the generative AI agent reaches out to identified team members to obtain information missing in a tabular structure, consistent with some embodiments of the present disclosure.

Reference is also made to FIG. 7A which is a flowchart of another exemplary process wherein the generative AI agent reaches out to identified team members to obtain information missing in a tubular structure such as a board consistent with some embodiments of the present disclosure.

The flowchart is implemented using a SaaS platform, such as the agent environment 200 depicted in FIG. 1A, consistent with some embodiments of the present disclosure, for instance using the agent environment.

As shown at 701, the agent environment 200 maintains a generative AI agent capable of interacting with alphanumeric data stored in the table structure. This involves:

- Regular updates to the AI model using federated learning techniques to improve performance without compromising data privacy.
- Continuous monitoring of the generative AI agent's performance metrics, with automatic alerts for any deviations from expected behavior.
- Periodic retraining of the AI model using anonymized project data to enhance its understanding of project contexts and team dynamics.

As shown at 702, the agent environment 200 generates a dynamic user interface that displays the table structure and provides input mechanisms for task assignment. This involves:

- Implementing a responsive design using React.js for seamless display across various devices and screen sizes.
- Utilizing WebSocket connections for real-time updates to the displayed data.
- Incorporating accessibility features to ensure the interface is usable by team members with diverse needs.

As shown at 703-4, upon receiving a task assignment, the generative AI agent analyzes the task requirements and assesses the available information. This process includes:

- NLP techniques to interpret task descriptions and requirements.
- Semantic analysis of the table structure data to identify relevant information.
- Implementation of a custom-built knowledge graph to map relationships between different data points and identify information gaps.

As shown at 705, the agent environment 200 Team Member Identification (Step 205): The agent environment 200 autonomously identifies relevant team members based on context. This involves:

- Utilizing a graph database (e.g., Neo4j) to model team relationships and expertise.
- Implementing collaborative filtering algorithms to predict which team members are most likely to have the required information.
- Analyzing historical data using time series analysis to consider team members' past contributions and current availability.

As shown at 706, the agent environment 200 The generative AI agent reaches out to identified team members to obtain missing information. This process includes:

- Generating contextually appropriate messages using a fine-tuned language model.
- Implementing a multi-channel communication system that integrates with email, chat applications, and the platform's internal messaging system.
- Utilizing a priority queue system to manage multiple outreach attempts and follow-ups.

Figure 9A:
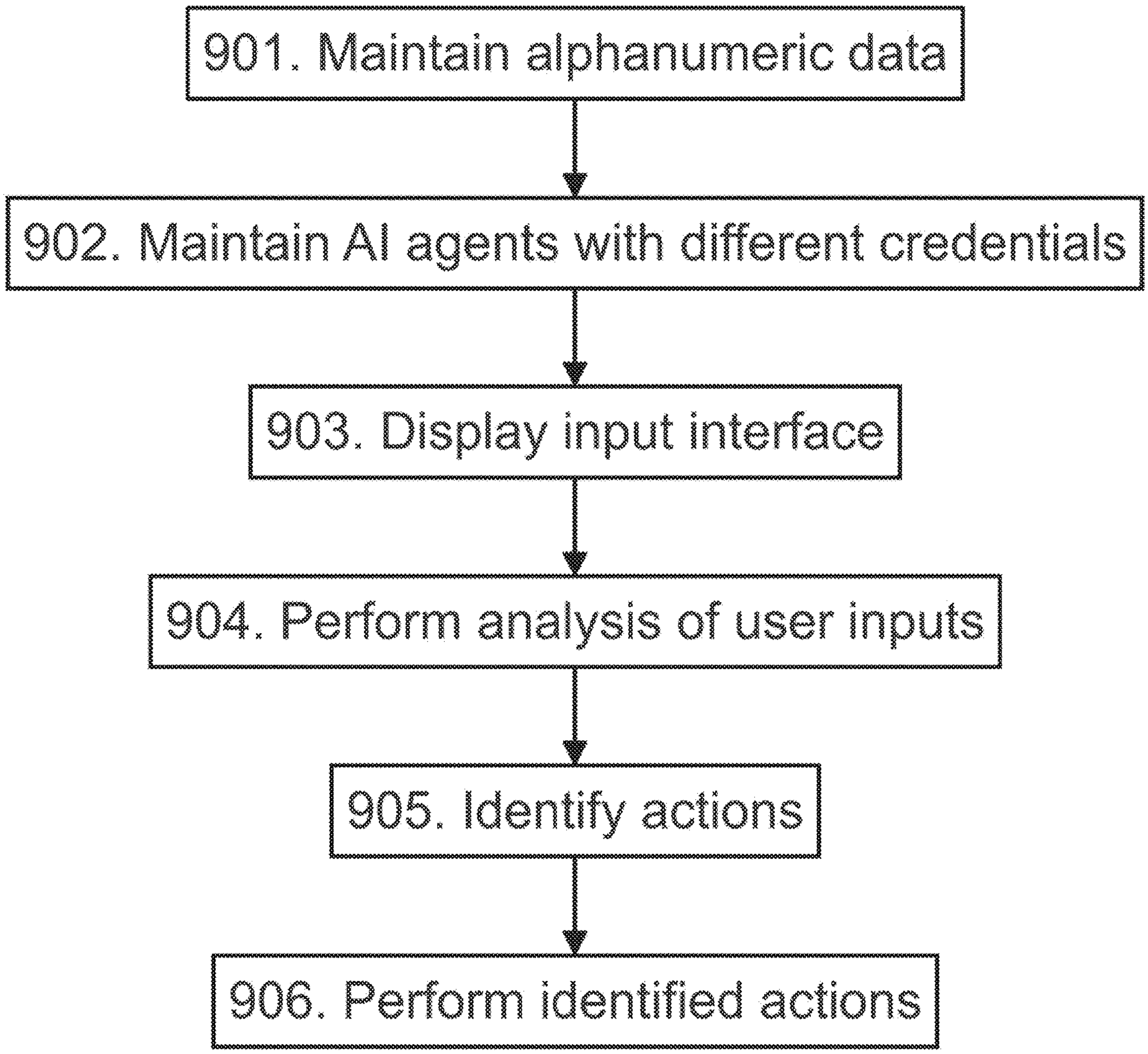
FIG. 9A is a flowchart of a process for using generative artificial intelligence for intent-based interactions within a SaaS platform, consistent with some embodiments of the present disclosure.

The process of the generative AI agent reaching out to team members, as described in step 706, may be implemented using the intent-based interaction system outlined in FIG. 9A. This integration ensures that the generative AI agent's communications are tailored to the specific credentials and context of each interaction.

As shown at 707, the agent environment 200 The generative AI agent completes the assigned task using the obtained information. This involves implementing a rule-based system combined with machine learning models to determine the appropriate actions for task completion and/or utilizing robotic process automation (RPA) techniques for tasks that involve interaction with other software systems and/or generating comprehensive reports using natural language generation (NLG) techniques to summarize the task completion process and results.

Optionally, skills taxonomy using ontology-based information extraction from team member profiles and project documentation is implanted, for example with a workload balancing algorithm that considers current task assignments and estimated completion times.

Figure 7B:
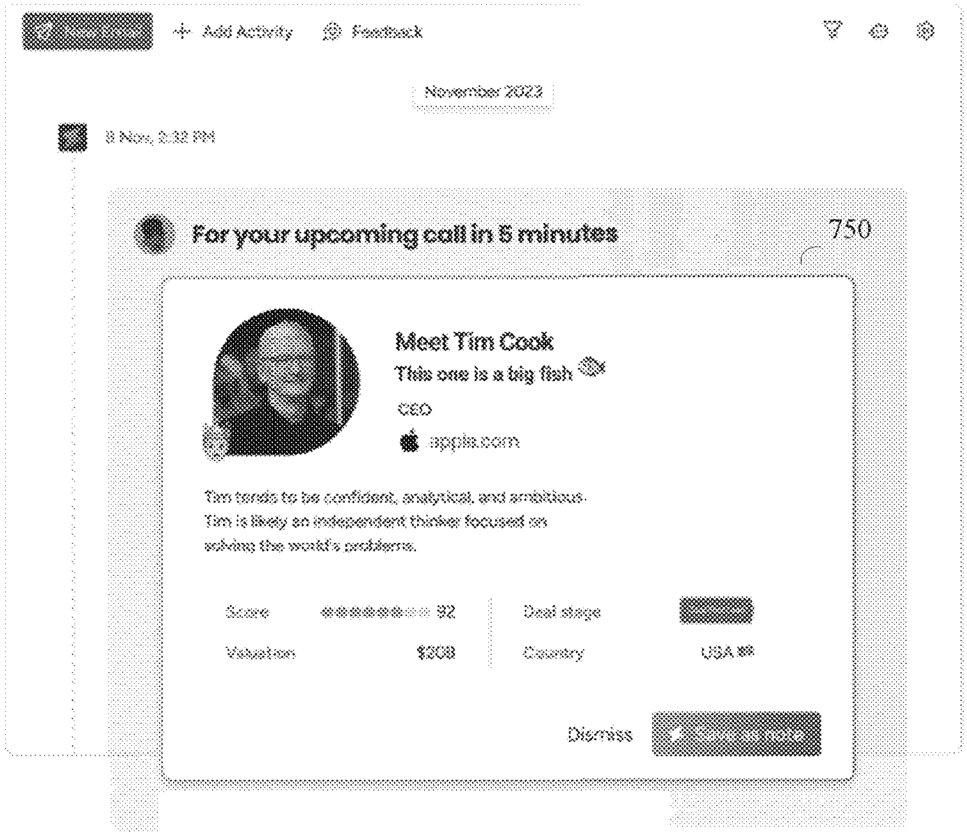
FIGS. 7B-7C are exemplary user interfaces allowing a user to receive messages and optionally to interact with a generative AI agent, consistent with some embodiments of the present disclosure.
Figure 7C:
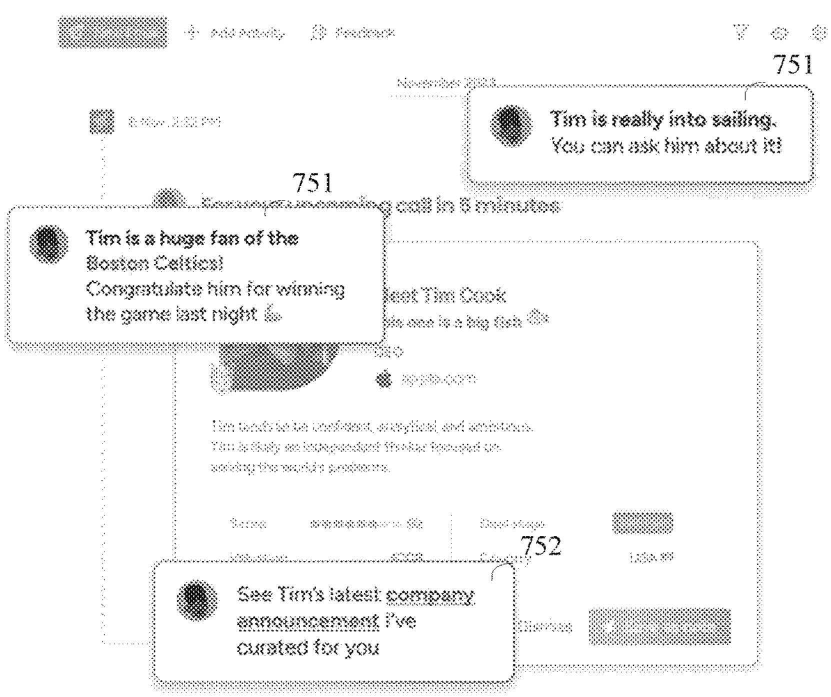

Optionally, sentiment analysis is utilized on past communications to tailor the tone and style of outreach messages and/or a machine learning model is executed to predict optimal times for reaching out to each team member. For example, FIG. 7B depicts an interactive window presenting a message sent from the generative AI agent summarizing information extracted from past communications to recommend how to approach a team member. FIG. 7C exemplify how the generative AI agent can provide details gathered about the team member to induce further discussion 751 and links to data related to the team member 752.

In an exemplary sales environment, the generative AI agent may analyze the current communications to identify a high-value opportunity lacking critical information. It automatically schedules brief check-ins with the assigned sales representative and the product specialist, collecting missing data about client needs and product fit. The generative AI agent or generative AI model then updates the CRM table structures with this information, ensuring the sales manager has a complete picture for the upcoming forecast meeting.

Figure 8:
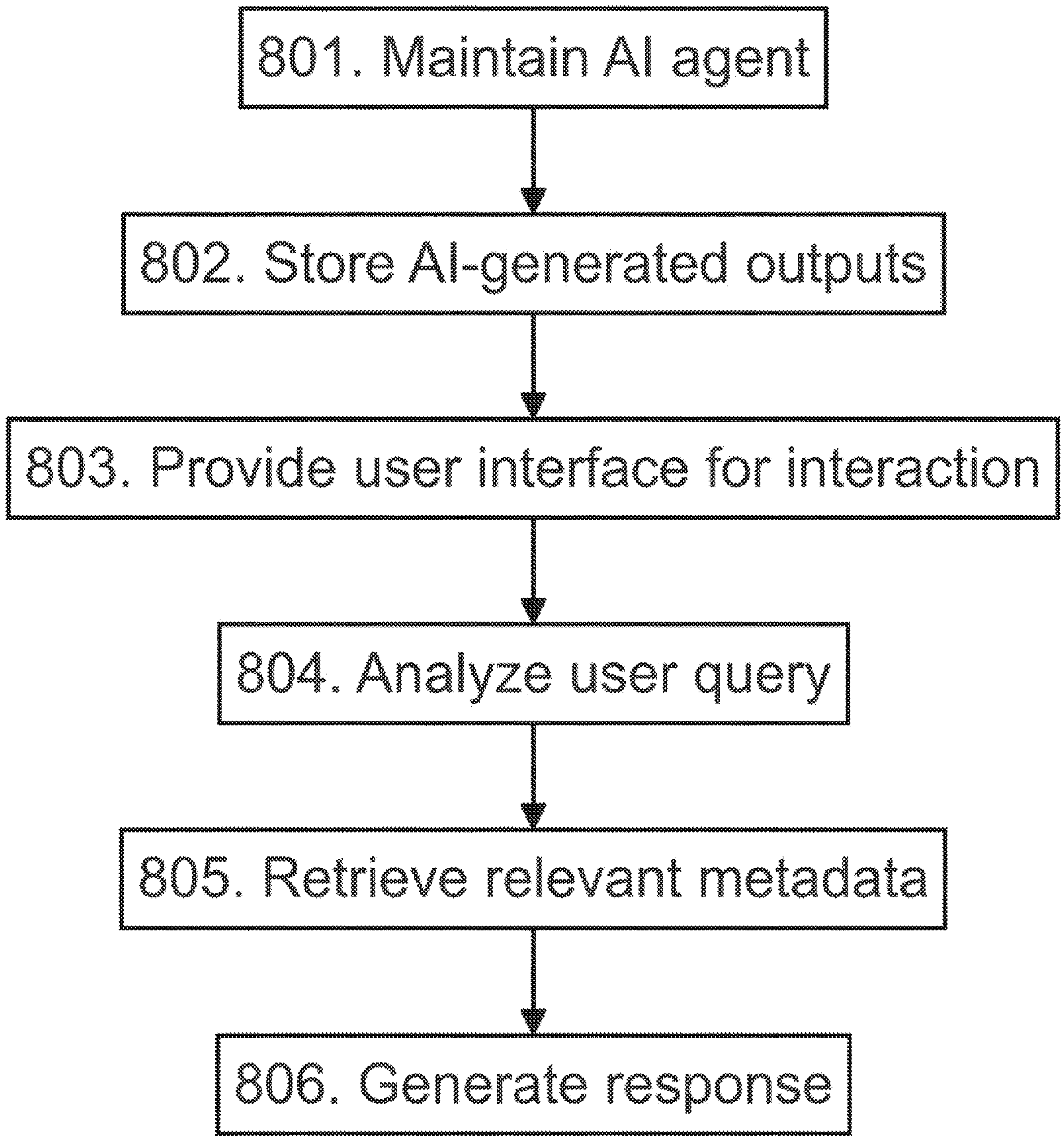
FIG. 8 is a flowchart depicting a process for interactive analysis of artificial intelligence outputs within a project management platform, consistent with some embodiments of the present disclosure.

To complement the task execution capabilities, we now also consider how the system facilitates interactive analysis of AI outputs. Reference is now also made to FIG. 8 which illustrates a flowchart depicting a process executed by a system as described above for interactive analysis of artificial intelligence outputs within a project management platform.

First, as shown at 801, a generative AI agent capable of autonomously performing project-related tasks is maintained. This AI agent may utilize a combination of rule-based systems and machine learning models, such as decision trees and neural networks, to execute tasks based on project data. A task queue system, implemented using Redis or similar technology, manages and prioritizes incoming tasks. The AI model is continuously updated using online learning techniques to improve task performance over time. Now, as shown at 802, as the generative AI agent generates outputs, the agent environment 200 stores these along with relevant metadata for instance in a NoSQL database, such as MongoDB. This approach allows for flexible storage of outputs and associated metadata. A custom metadata schema captures all relevant platform elements used in generating each output, and indexing techniques ensure fast retrieval of outputs and metadata. As shown at 803, a user interface for initiating natural language interaction sessions regarding the AI-generated outputs is provided. Now as shown at 804, upon receiving a user query about a specific AI-generated output, the agent environment 200 analyzes the query using NLP techniques, including named entity recognition and semantic parsing. This analysis helps identify the specific output being discussed. A query understanding module, utilizing machine learning, classifies the type of information the user is seeking, such as an explanation, clarification, or additional details. As shown at 805, based on the analyzed query, the agent environment 200 retrieves relevant metadata using an efficient retrieval system. This may involve technologies like Elasticsearch for fast, full-text search capabilities. A caching layer, implemented using memcached or similar technology, stores frequently accessed metadata to reduce database load. As shown at 806, a response such as a natural language response explaining the reasoning behind the output may be generated. This process utilizes a large language model, such as GPT-3 or a custom-trained model, to generate human-like explanations. A template-based system incorporates references to platform elements identified in the metadata. Named entity linking connects referenced platform elements to their definitions or additional context within the agent environment 200. The generated response is presented to the user via the interface. A message queueing system, such as RabbitMQ, manages the flow of responses, especially in high-load scenarios. Progressive loading techniques display long responses in a user-friendly manner. When relevant to the explanation, the agent environment 200 incorporates rich media elements like charts or graphs. The agent environment 200 may engage in an interactive dialogue to provide further clarification about the output and its underlying reasoning. A dialogue management system, implemented using a finite state machine, tracks the conversation state and context. Intent recognition techniques understand follow-up questions and requests for clarification. A knowledge graph of project elements and their relationships provides comprehensive, interconnected explanations. The user interface may include a feedback mechanism allowing users to rate the helpfulness of explanations. This data is used to continuously improve the agent environment 200's response quality through machine learning techniques.

In an exemplary use case, a generative AI agent has autonomously generated a risk assessment for a software development project, a project manager, curious about the assessment, initiates an interaction through the system's interface.

Project Manager: "Why has the AI classified the database migration as high risk?"

The agent environment 200 analyzes this query, identifies the specific output (risk assessment) and the element in question (database migration). It retrieves the associated metadata, which includes information about the project timeline, team expertise, and historical data from similar migrations.

System Response: "The database migration has been classified as high risk due to several factors. First, the metadata indicates that the project timeline allocates only 3 days for this task, which is 40% less than the average time taken for similar migrations in past projects. Additionally, the team assigned to this task has limited experience with the target database system, as per their skill profiles. Historical data from our knowledge base suggests that rushed migrations with inexperienced teams have a 75% chance of encountering critical issues."

Project Manager: "Can you provide more details about the potential issues?"

The agent environment 200 recognizes this as a request for clarification and delves deeper into its knowledge base.

System Response: "Certainly. Based on our analysis of similar projects, the most common issues in rushed database migrations include:

Data loss or corruption during transfer (occurred in 35% of cases)

Incompatibility issues between old and new systems (25% of cases)

Performance degradation post-migration (20% of cases)

Extended system downtime (15% of cases)

Would you like me to suggest some mitigation strategies for these potential issues?"

This interactive process continues, with the agent environment 200 providing detailed, context-aware responses and the project manager gaining a comprehensive understanding of the AI's risk assessment. The agent environment 200's ability to explain its reasoning, provide supporting data, and engage in a dialogue showcases the sophisticated nature of this interactive analysis system for AI outputs.

In another example, the generative AI agent flags a series of transactions as potentially fraudulent. When the compliance officer queries the system about this flagging, the generative AI agent or generative AI model provides a detailed explanation of the pattern it identified, references to similar past cases, and the specific regulations that might have been violated. This allows the compliance team to quickly understand the AI's reasoning and take appropriate action.

While previous sections focused on some internal processes, we now explore how the system handles intent-based interactions with users. Reference is now also made to FIG. 9A, which is a flowchart of a process for using generative artificial intelligence for intent-based interactions within a SaaS platform for instance as described above. The process comprises several steps executed by one or more processors configured to manage and utilize artificial intelligence agents with varying credentials.

As shown at 901, in a first step, the method involves maintaining alphanumeric data stored in a plurality of items representing the alphanumeric data within the SaaS platform, for instance as described in any of the embodiments above. This data may include project details, user information, task lists, and other relevant information managed within the platform. As shown at 902, a first artificial intelligence agent with a first set of credentials and a second artificial intelligence agent with a second set of credentials different from the first set are maintained. Both artificial intelligence agents are maintained in a common account of the SaaS platform. These agents may be initialized as processes of a common agent code, differing primarily in their set of credentials. As shown at 903, a display of at least one input interface configured to receive user inputs is presented. This interface allows users to interact with the plurality of items and select either the first or second AI agent to interact with the alphanumeric data. As shown at 904, the selected AI agent is performing an analysis of at least some of the user inputs, accessed using its corresponding set of credentials. This analysis is conducted to understand the user's intent and determine appropriate actions. As shown at 905, the method identifies one or more actions for interacting with the alphanumeric data according to the analysis. This identification process only uses information obtained through the corresponding set of credentials of the selected AI agent. Now, as shown at 906, one or more of the identified actions on the alphanumeric data accessible to the generative AI agent is performed using its corresponding credentials.

In some implementations, the method may include requesting permission to perform an action in another element to which the generative AI agent does not have credentials. This ensures that the generative AI agents operate within their authorized boundaries while still providing flexibility for extended operations when necessary.

The method may also involve maintaining a third AI agent with a set of credentials partially overlapping with the credentials of the first and second AI agents. This allows for more nuanced task allocation and data access within the platform.

To enhance user interaction and transparency, the method may include displaying a GUI element showing all different variations of the same AI agent and details for each of their credentials. This provides users with a clear understanding of each AI agent's capabilities and access levels.

Figure 9B:
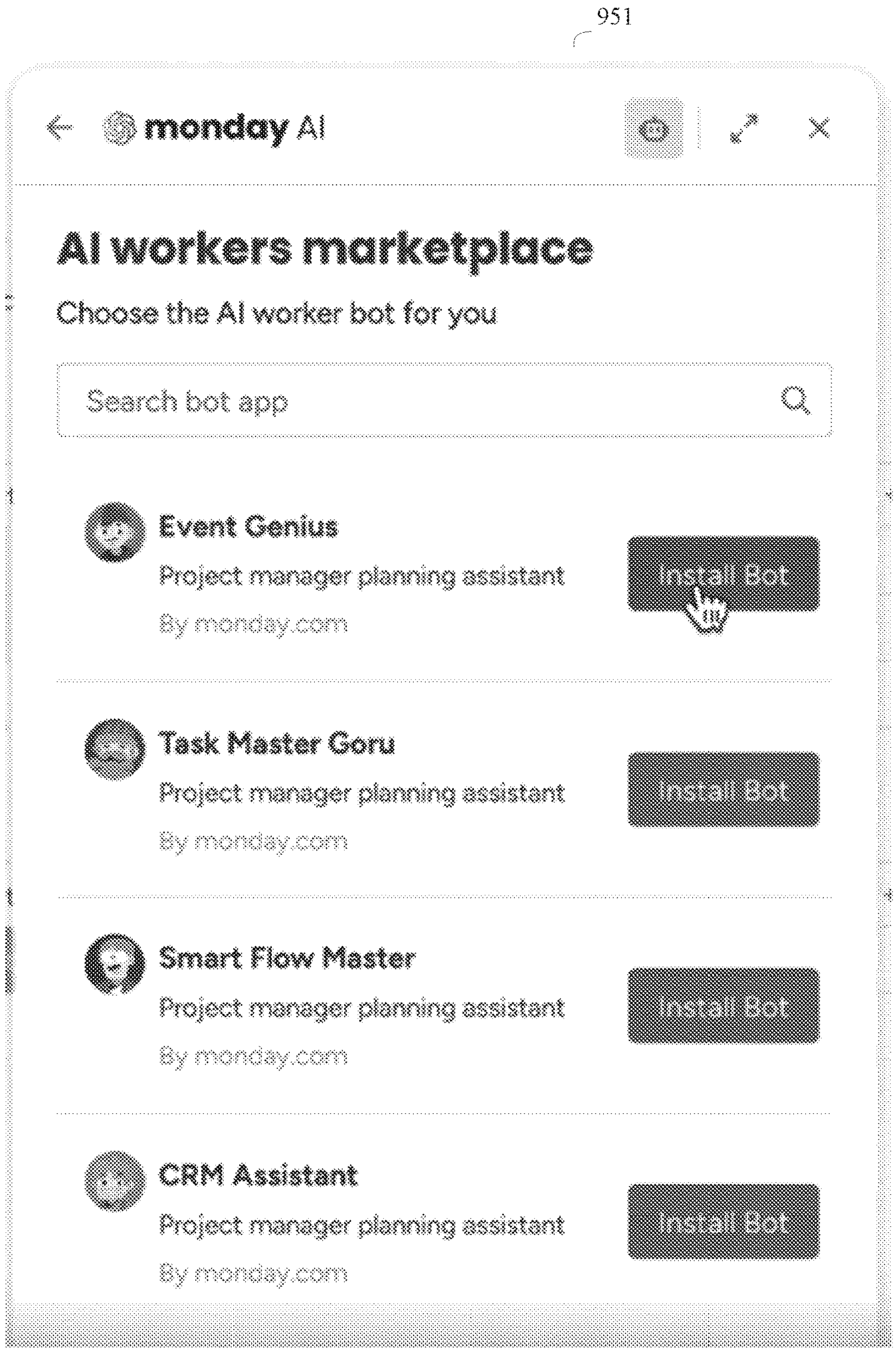
FIG. 9B is a screenshot of a window facilitating a user to select a generative AI agent from a list of optional AI agents marked as workers, consistent with some embodiments of the present disclosure.

The generative AI agents used in this method may be selected from a marketplace of agents with different credentials, allowing for customization and specialization based on specific project or organizational needs (e.g., 108). For example, FIG. 9B is a screenshot of a window 950 facilitating a user to select a generative AI agent from a list of optional AI agents marked as workers. The workers are AI agents which differ from one another in credentials, privileges, cost, training datasets, used models, identifiers and/or availability, for example as described herein with reference to any of the cited references. This selection interface may be part of a broader AI Marketplace functionality within the SaaS platform.

The AI Marketplace may serve as a central hub for users to discover, compare, and integrate various AI agents into their accounts for integration, directly or indirectly, with their workflows. It may offer features designed to enhance the user experience and facilitate informed decision-making. Generative AI agents may be meticulously categorized based on their primary functions, such as data analysis, content generation, or project management, allowing for easy browsing and selection. Each generative AI agent may boast a comprehensive profile that outlines its capabilities, pricing model, performance metrics, and user ratings, providing potential users with a clear understanding of what to expect. Customization may be provided in the marketplace, allowing a user to adapt AI agent parameters to suit specific user needs before integration. For example, while all the iterations of the AI agent may initially be provided with the same general configurations, each iteration thereof may be customized differently in accordance to the subject matter it is configured to process in the platform and to the relative location in the account in which it is assigned to.

The marketplace may support implementation by providing step-by-step guides on how to effectively integrate chosen AI agents into existing workflows and projects. Once an AI agent is integrated, users may access detailed analytics on its performance, helping them assess its value and optimize its use over time. The marketplace also manages updates and version control for the AI agents, ensuring users always have access to the latest features and improvements without the need for manual updates. A standout feature of this marketplace may be the ability for users to upload and incorporate their own specific AI agents into the SaaS platform. This functionality caters to organizations with unique needs or those who have developed proprietary AI models. The process begins with users submitting their AI agents through a dedicated portal in the marketplace. The platform then runs a series of tests to ensure the submitted AI is compatible with the SaaS platform's architecture and security protocols.

Users may be given the opportunity to specify how their AI agents should integrate with existing platform functionalities, including data access permissions and interaction points, which may be hardcoded to prevent accidental association of AI agents to non-permitted platform elements. The uploaded AI agent may undergo testing in a sandbox environment to verify its functionality and identify any potential issues. Platform administrators review the submitted AI agent for compliance with platform policies and standards before approval. Once approved, the AI agent may be made available for use within the user's account or, if desired, listed in the marketplace for other users. The platform provides robust tools for monitoring the custom AI agent's performance and offers support for troubleshooting and optimization.

This allows organizations to leverage AI agent developments within a standardized environment of the SaaS platform, combining the benefits of custom solutions with the robust infrastructure and integration capabilities of the platform. It also opens up possibilities for AI agent developers to monetize their creations by offering them to other users through the marketplace, subject to platform approval and licensing agreements. This marketplace thus serves as a dynamic ecosystem, fostering innovation and collaboration in the AI space while providing users with a wide array of tools to enhance their productivity and decision-making processes.

For auditing and security purposes, the method includes logging all actions performed by the generative AI agents. Additionally, the method may involve requesting user confirmation before executing actions that fall outside a predefined set of low-risk operations.

Optionally the above-described process for dynamically adjusting the credentials of AI agents based on usage patterns and security protocols includes a credential audit process. This process periodically reviews the actions performed by each AI agent and compares them against their current credential set. If a generative AI agent frequently requests access to data or actions outside its current credentials, the agent environment 200 may suggest an expansion of that agent's credentials, subject to administrative approval.

Conversely, if a generative AI agent rarely uses certain credentials, the agent environment 200 may suggest a reduction in that agent's access rights, thereby adhering to the principle of least privilege and enhancing overall system security.

Optionally, when a complex task requires actions across multiple credential sets, the agent environment 200 orchestrates a collaborative effort among multiple AI agents, each operating within its authorized domain. For example, if a task requires both financial analysis and marketing expertise, FinanceAI and MarketingAI may work in tandem, sharing outputs through a secure, credential-respecting interface. This collaboration is managed by a higher-level orchestration layer that ensures no unauthorized data access occurs during the collaborative process. Agent may be added as a user, for example as described above. The agent environment 200 also implements an NLP module that interprets user inputs and translates them into specific action requests for the generative AI agents. This NLP module is context-aware, understanding not just the literal content of user inputs but also the user's role, historical interaction patterns, and current project context. In addition, after a generative AI agent performs an action, it may generate a natural language summary of what it did and why, including references to the specific credentials and data sources it used. This explanation is presented to the user in an easily understandable format, promoting transparency and user trust. Based on historical usage patterns and current project status, likely user requests may be identified to pre-emptively prepare AI agents, reducing response times for common tasks. Furthermore, the disclosed subject matter comprises a method for handling edge cases where required actions fall in a gray area between different AI agents' credential sets. In such cases, the agent environment 200 implements a decision tree algorithm to determine the most appropriate agent for the task, potentially involving a human administrator for final approval.

Figure 9C:
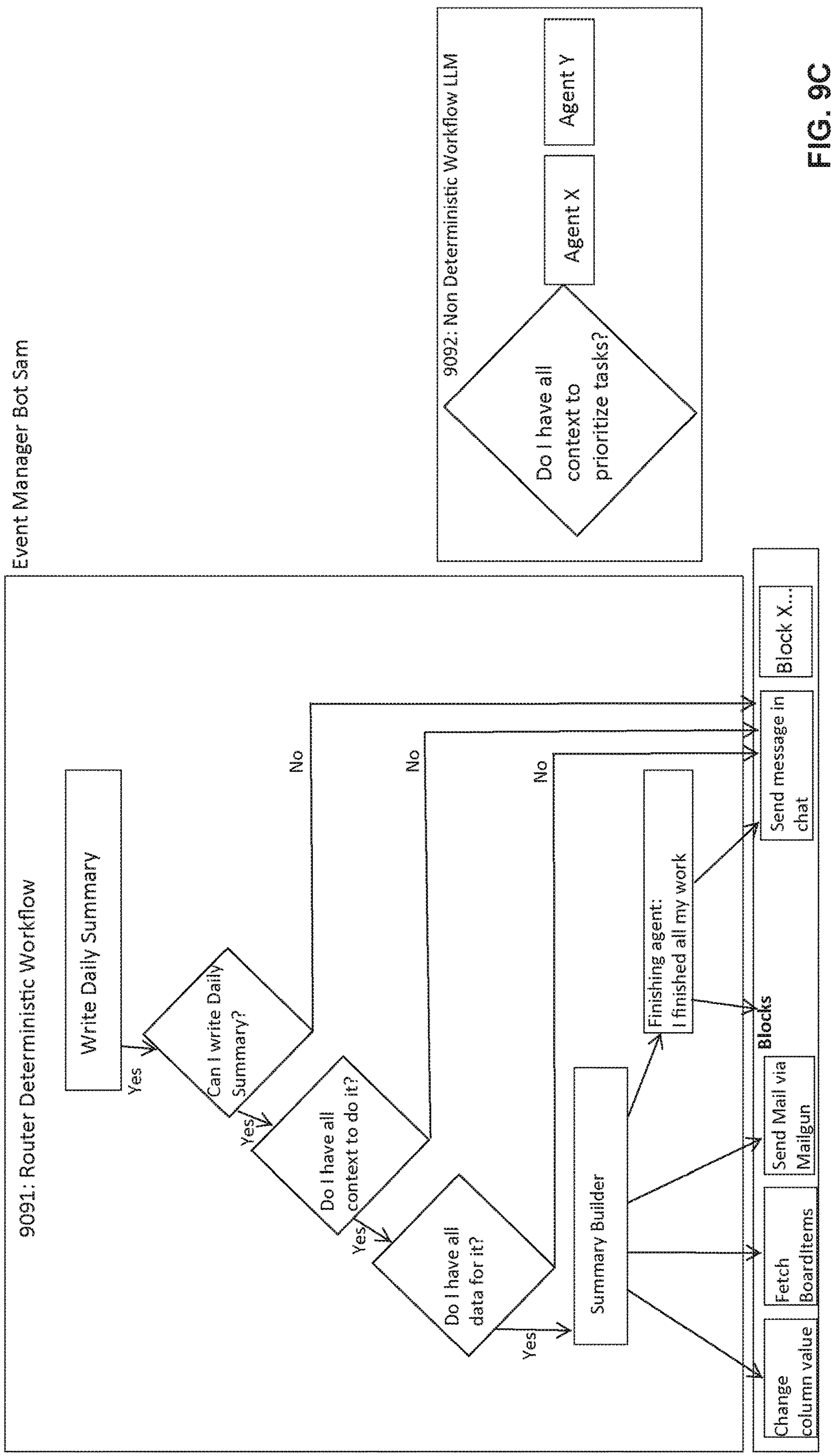
FIG. 9C is a detailed workflow for an Event Manager Bot, which operates within the SaaS platform previously described according to the process described in FIG. 9A, consistent with some embodiments of the present disclosure.

Reference is now also made to FIG. 9C, which is a detailed workflow for an Event Manager Bot, which operates within the SaaS platform previously described according to the process described in FIG. 9A. This technical description will explain the components and processes shown in the diagram, relating them to the concepts discussed earlier.

The diagram depicts two main workflow types: a Deterministic Workflow (9091) and a Non-Deterministic Workflow (9092), both of which are part of the Event Manager Bot's functionality. The Deterministic Workflow (9091) is controlled by a Router, which acts as a state machine, managing the flow of operations through various agents. This aligns with the concept of AI agents with specific functionalities, as described in the earlier patent description.

The workflow begins with a "Write Daily Summary" input, which triggers the Capabilities Agent. This agent checks if it can perform the requested task, demonstrating the agent environment 200's ability to assess its own capabilities within its assigned scope and resource limits.

If capable, the process moves to the Daily Summary Context Agent, which checks for all necessary context. This step relates to the method of contextual data analysis described earlier, where the generative AI agent or generative AI model analyzes the structure and content of data to understand its context.

The Data Fetcher agent then verifies if all required data is available. This corresponds to the step of accessing and extracting data from the platform's data structures, as outlined in the flow of the process. Optionally, when all data is available, the Summary Builder agent constructs the summary and requests verification. This step likely involves the AI model performing contextual analysis of the data, as depicted in FIG. 9A. The Finishing Agent marks the completion of the task, potentially updating the status of the task in the platform, which aligns with the agent environment 200's ability to interact with and modify data in the SaaS platform. The Non-Deterministic Workflow section shows a separate process for prioritizing tasks, which includes its own context agent and additional agents (X and Y). This demonstrates the agent environment 200's capability to handle more complex, non-linear processes that may require different types of AI agents or decision-making processes. The "Blocks" section on the right represents various actions that can be taken based on the outcomes of the workflow, such as changing column values, fetching board items, sending emails, or sending chat messages. These actions correspond to the agent environment 200's ability to perform operations within the SaaS platform based on AI analysis and decisions. Throughout the workflow, there are decision points (represented by "Yes" and "No" paths) that determine the flow of the process. These decision points likely utilize the AI's contextual understanding of the data and tasks, as described in the method claims for contextual data analysis. The inclusion of tasks like "Prioritize Tasks", "Set timeline for tasks", and "Nudge people on due" in the Capabilities Agent section demonstrates the AI's ability to manage and optimize workflow processes, aligning with the described functionality of AI agents in the SaaS platform.

This flow illustrates how the previously described AI agent functionalities, contextual data analysis, and workflow management capabilities are implemented in a practical, structured process within the SaaS platform. It provides a visual representation of how different AI agents interact, make decisions, and perform tasks based on their analysis of data and context within the platform.

Reference is now made to another Use Case. Consider a large corporate environment using a SaaS platform for project management across multiple departments. The platform maintains data about various projects, including sensitive financial information, general project timelines, and public-facing marketing materials. The first AI agent, referred to herein as a "FinanceAI" has credentials that allow it to access and analyze financial data. The second AI agent, "MarketingAI" has credentials for accessing and working with marketing-related data. A user from the finance department inputs a request: "Analyze the budget allocation for our upcoming product launch and suggest optimizations."

The agent environment 200 recognizes that this request requires access to financial data and automatically selects FinanceAI to handle the task. FinanceAI analyses the budget data, compares it with historical data from similar product launches, and generates a report with suggested optimizations. Later, a marketing team member inputs: "Create a social media campaign timeline for the new product launch.", The agent environment 200 selects MarketingAI for this task. MarketingAI accesses the marketing materials and project timeline, but when it attempts to access the budget information to align the campaign with financial constraints, it requests permission as this fall outside its credential set. This example demonstrates how the process allows for efficient, secure, and context-aware use of AI agents within a complex SaaS environment, ensuring that sensitive data is only accessed by appropriately credentialed agents while still allowing for collaborative work across departments.

Figure 10:
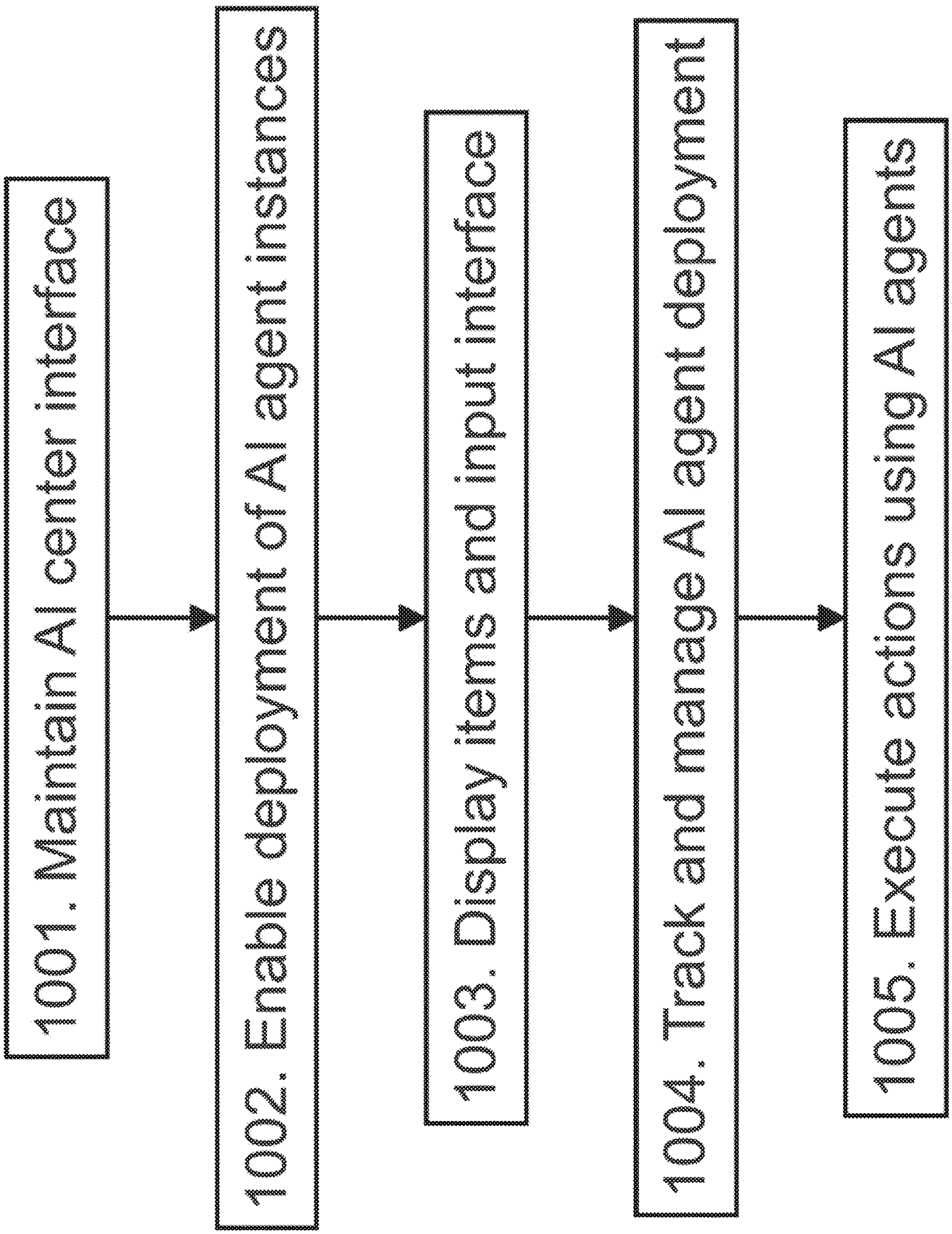
FIG. 10 is a flowchart of a process for managing artificial intelligence resources in a SaaS platform, consistent with some embodiments of the present disclosure.

The intent-based interaction system described here may be combined with the AI resource management process detailed in FIG. 10. This integration ensures that the generative AI agents' interactions are not only context-appropriate but also optimized within the available AI resource.

Having discussed various AI functionalities, we now turn to the crucial aspect of managing AI resources within the platform. Reference is now also made to FIG. 10, which is a flowchart of a process for managing artificial intelligence resources in a SaaS platform. The process comprises several steps executed by one or more processors configured to manage and utilize artificial intelligence agents as limited resources within the platform. The flowchart is implemented using a SaaS platform, such as the agent environment 200 depicted in FIG. 1A, consistent with some embodiments of the present disclosure, for instance using the agent environment.

In a first step (1001), the process involves maintaining an AI center interface displaying a plurality of AI agents for incorporation within an account of the SaaS platform. Each AI agent represents different AI functionalities and is configured to interact with alphanumeric data stored or associated with platform elements of the SaaS platform.

The second step (1002) involves enabling deployment of multiple instances of each AI agent as limited resources. This allows for scalable and controlled use of AI functionalities across the platform.

In a third step (1005), the process causes a display of a plurality of items in a table structure and at least one input interface. This interface is configured to receive user inputs for assigning AI agent instances to one or more items or platform elements.

The fourth step (1004) involves tracking and managing the deployment of AI agent instances to ensure they do not exceed their assigned resource limits. This step may include maintaining a count of assigned instances for each AI agent and comparing the count to a predefined limit for each AI agent.

In a fifth step (1005), the process executes actions using the deployed AI agent instances within their assigned scope in the SaaS platform and their resource limits. This may involve consuming multiple instances of a generative AI agent for certain actions and a single instance for other actions, depending on the complexity and resource requirements of the task.

The process further includes displaying, via a GUI element within the SaaS platform, information about all AI functionalities available in an account, with each functionality represented by a different AI agent. This GUI element also displays utilization information for each AI agent resource, providing users with a clear overview of their AI resource usage.

In some implementations, the process treats the plurality of AI agents as limited resources, with multiple instances of the same AI agent available for purchase and assignment to a limited number of items concurrently. Each AI agent instance is configured to be assigned to up to a predetermined number of items concurrently.

The process also includes notifying a user when an attempt to assign a generative AI agent instance exceeds the resource limit and providing an option to purchase additional resources. An interface for purchasing additional instances of a generative AI agent is provided to facilitate this process.

When receiving a request to assign a generative AI agent instance to an item or platform element, the process determines whether the assignment would exceed the resource limit for the generative AI agent and allows or denies the assignment based on this determination.

Example Use Case:

Consider a large marketing agency using the SaaS platform for managing multiple client campaigns. The platform offers several AI agents, including:

1. Contantia: For generating and optimizing content
2. AnalyticsAI: For analysing campaign performance
3. Audience AI: For audience segmentation and targeting The agency has purchased the following resources:

10 instances of ContentAI 5 instances of AnalyticsAI 3 instances of AudienceAI

A marketing manager, Sarah, is working on a new campaign for a major client. She accesses the AI center interface, which displays all available AI agents and their current utilization.

Sarah assigns 2 instances of ContentAI to generate social media posts for the campaign. The agent environment 200 tracks this assignment, updating the ContentAI utilization to 2/10.

Next, Sarah attempts to assign 3 instances of AnalyticsAI to continuously monitor the campaign's performance across multiple channels. However, this would exceed the available resources (5 instances). The agent environment 200 notifies Sarah that this assignment exceeds the resource limit and offers the option to purchase additional AnalyticsAI instances.

Sarah decides to purchase 2 additional AnalyticsAI instances. The agent environment 200 processes the purchase and updates the available resources. Sarah can now successfully assign the 3 AnalyticsAI instances to her campaign.

Later, another team member, John, tries to assign 2 instances of AudienceAI to a different project. The agent environment 200 checks the current utilization (2/3) and allows the assignment as it's within the resource limits.

Throughout these interactions, the GUI element in the SaaS platform updates in real-time, showing the current utilization of each AI agent:

ContentAI: 2/10

AnalyticsAI: 3/7 (after the purchase)

AudienceAI: 2/3

This use case demonstrates how the method manages AI resources as limited assets, tracks their utilization, facilitates resource expansion when needed, and ensures efficient allocation across multiple projects within the SaaS platform.

Consistent with some embodiments of the present disclosure, the agent environment 200 is executing a code for estimating computational resources required for AI resource usage such as AI actions of the generative AI agents and above-described automations within the SaaS platform 100. The environment 200 implements a token-based approach for quantifying the AI resource usage where each action is assigned a specific number of AI tokens based on its estimated resource consumption. In use, the agent environment 200 tracks real-time token usage for users, teams, and/or accounts within the SaaS platform. Historical usage patterns may be analyzed to predict future token consumption and generate trend points forecasting the number of automation activations expected within a predetermined timeframe. This allows administrators to set token limits for users, teams, or entire accounts, and provide warnings when usage approaches these limits. Optionally, expected token consumption for each run is displayed when users create or modify automations, thereby informing users of the resource implications of their automation designs. Optionally, a central panel is generated to provide comprehensive visualizations of AI resource utilization across the account, offering insights into usage patterns and dynamically adjust token allocations based on usage patterns and priorities set by administrators, ensuring optimal distribution of AI resources across the platform.

The environment 200 may comprise a distributed counting mechanism, with token counts stored in a high-performance, distributed cache for real-time access. The system also includes a predictive analytics component utilizing machine learning models to generate accurate usage projections. The resource estimation algorithm may consider multiple factors, including complexity of AI model interactions, volume and type of data processed, and historical performance metrics of similar operations.

The environment 200 enables efficient utilization of AI capabilities within the SaaS platform, provides clear visibility into resource consumption, and allows for fine-grained control over AI usage. It supports scalable deployment of AI features while maintaining performance and cost-effectiveness.

The token-based approach allows for accurate quantification of AI resource usage, with different AI-powered actions consuming varying numbers of tokens based on their complexity. For instance, a simple text analysis might consume one token, while a complex multi-step automation might consume five or more tokens.

The system's predictive analytics ability may use historical data to forecast future token consumption, allowing administrators to proactively manage AI resources. This feature is particularly useful for preventing resource shortages and ensuring consistent performance of AI-powered features across the platform.

The central panel for visualizing AI resource utilization provides administrators with a comprehensive view of how AI resources are being used across the account. This dashboard can display various metrics, such as token consumption by user, team, or automation type, helping administrators identify patterns and optimize resource allocation.

The dynamic token allocation feature allows the system to adapt to changing usage patterns and priorities. For example, when certain teams or projects are identified as high-priority, the system may automatically allocate more tokens to their associated automations, ensuring critical AI-powered processes continue to function optimally.

By providing users with immediate feedback on the token consumption of their automations, the system encourages efficient design of AI-powered processes. Users can see the resource impact of their automation designs in real-time, allowing them to make informed decisions about the complexity and frequency of their AI-powered actions.

This environment 200 thus provides a comprehensive solution for deploying, monitoring, and optimizing AI capabilities within a SaaS platform, ensuring efficient use of computational resources while maintaining transparency and control for both users and administrators.

Figure 11A:
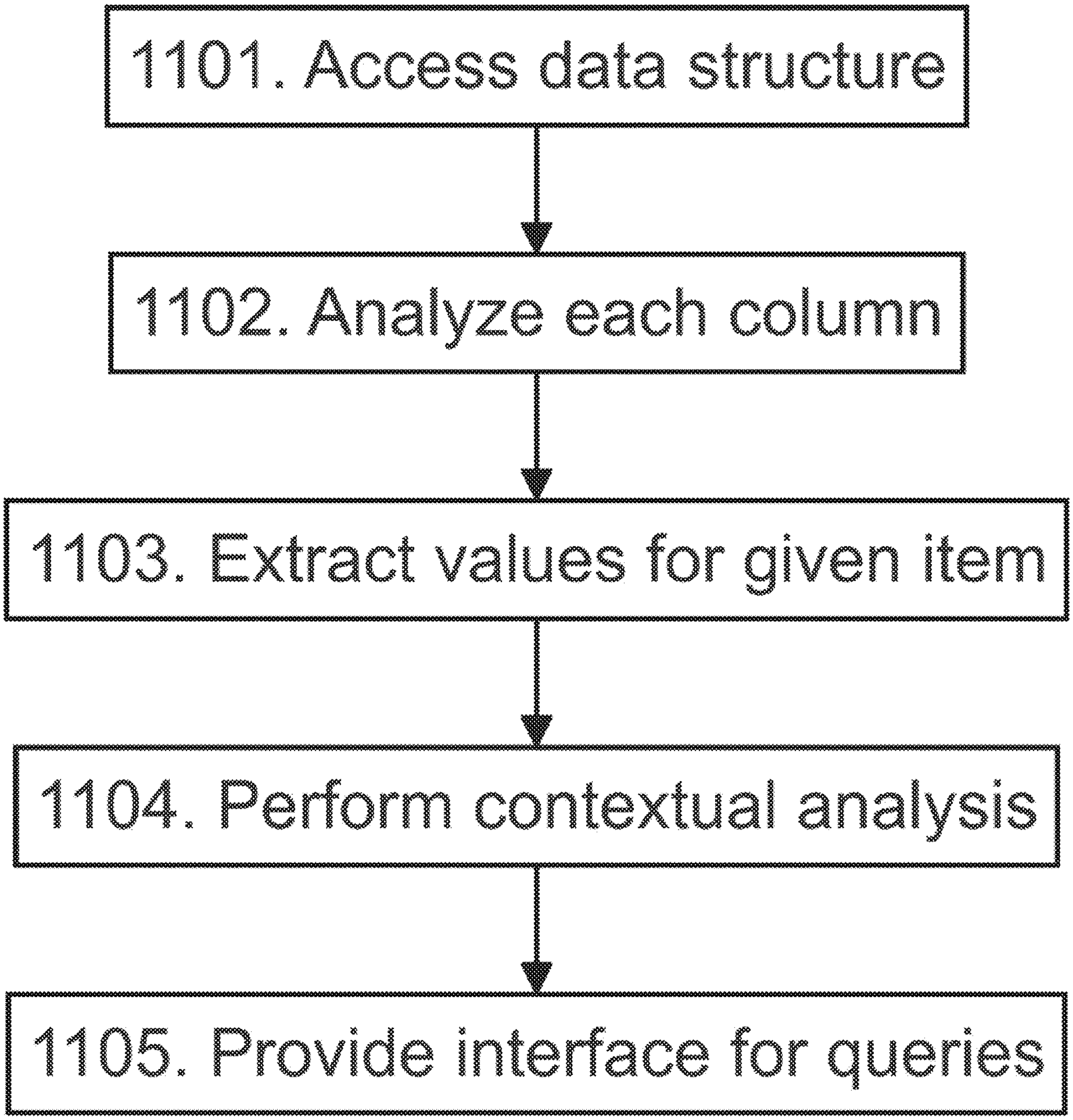
FIG. 11A is a flowchart of a process for contextual data analysis in a structured environment, particularly within a SaaS platform, consistent with some embodiments of the present disclosure.
Figure 11B:
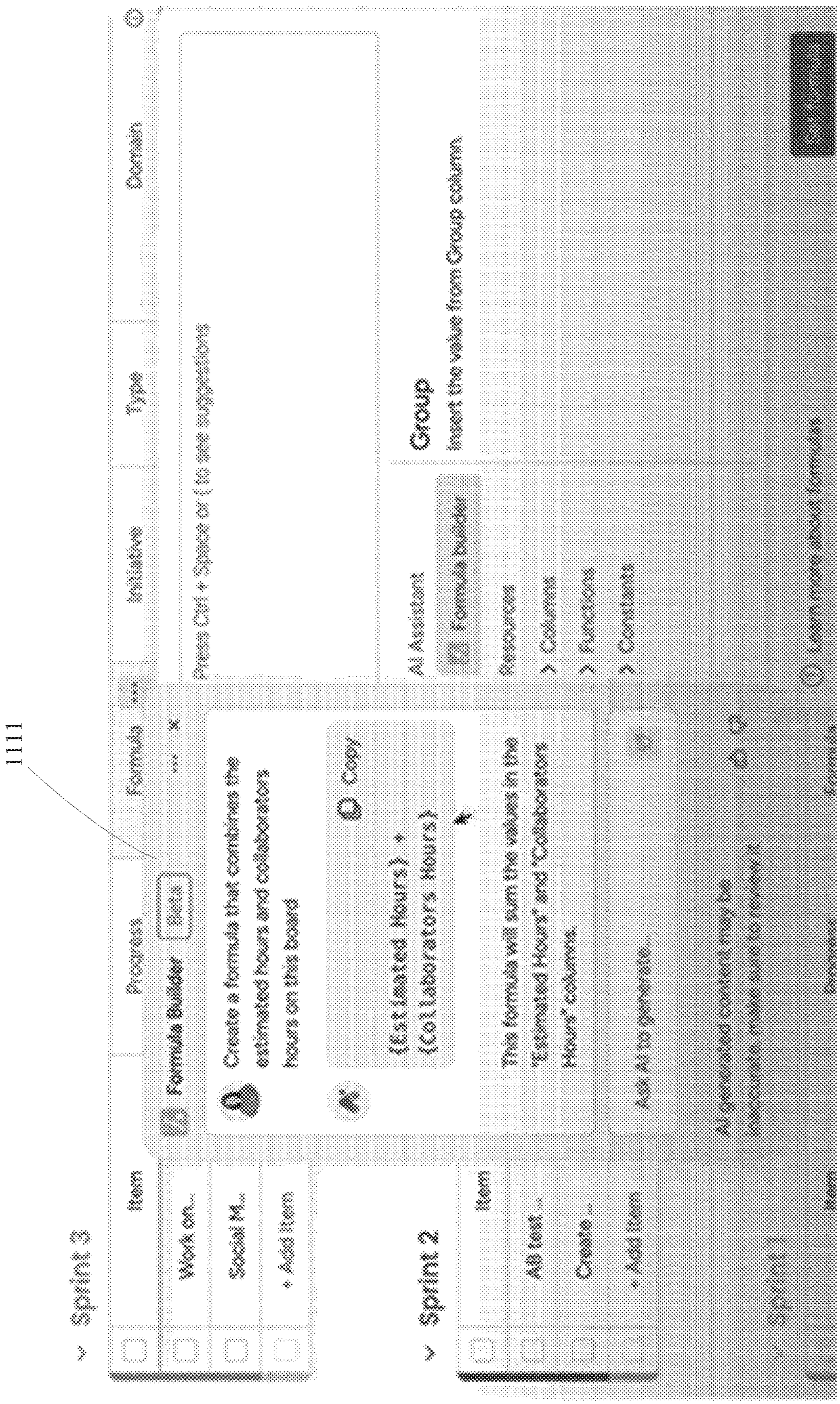
FIG. 11B is a screenshot of a board generated by the platform overlayed with a window facilitating a user to correspond with a generative AI agent that suggests a formula based on a request and also presents an explanation therefore, consistent with some embodiments of the present disclosure.

The management of AI resources as described in this process can be further enhanced by incorporating the contextual data analysis method outlined in FIG. 11A. This combination allows for more efficient allocation of AI resources based on the specific data structures and contexts within the SaaS platform.

To round out our examination of the system's capabilities, we now consider its approach to contextual data analysis. Reference is also made to FIG. 11A which is a flowchart of process for contextual data analysis in a structured environment, particularly within a SaaS platform. The process may be implemented using a system that comprises one or more processors configured to execute several steps for understanding the context of items within a data structure by assessing values within columns, the type of data these columns present, and how values change in other items of the same type. The flowchart is implemented using a SaaS platform, such as the agent environment 200 depicted in FIG. 1A, consistent with some embodiments of the present disclosure, for instance using the agent environment.

In a first step (1101), the agent environment 200 accesses a data structure containing multiple items, each item associated with a plurality of columns. This data structure may represent a workflow or process within the SaaS platform.

The second step (1102) involves analyzing each column within the data structure. For each column, the agent environment 200 performs the following sub-steps: a) Analyze the column header to determine its descriptive label. b) Determine the data type of the column (e.g., status, text, numeric, date). c) Assess the values contained within the column across multiple items.

Now (1103), the agent environment 200 focuses on a given item in the data structure and extracts values from each of its associated columns. This process involves a sophisticated data parsing mechanism that recognizes various data types and formats across different columns. For instance, it can differentiate between date formats, numerical values, text strings, and even more complex data types like JSON objects or nested arrays.

In step (1104), an AI model is utilized to perform a contextual analysis of the given item. This analysis is multi-faceted and leverages advanced machine learning techniques to derive meaningful insights. When interpreting respective values based on column context, the AI model considers not just the raw data, but also the column's metadata, such as its name, data type, and any associated tags or descriptions. For example, a value of "5" in a column labelled "Priority" would be interpreted differently than the same value in a "Version" column.

The identification of patterns or trends from previous items involves complex pattern recognition algorithms. These algorithms can detect both obvious and subtle similarities between the current item and historical data. This might include identifying cyclical patterns in time-series data, recognizing common sequences of status changes, or spotting correlations between seemingly unrelated columns.

Inferring relationships between different columns and their values may be performed using the AI model while techniques from the field of causal inference to hypothesize potential cause-and-effect relationships between different data points are utilized. For instance, it might infer those changes in a "Budget" column tend to precede changes in a "Project Scope" column, suggesting a causal link between these aspects of a project.

The interface provided in step (1105) for users to query the AI model about the contextual analysis is designed with user experience in mind. It may offer natural language processing capabilities, allowing users to ask questions in plain English rather than requiring specialized query languages. The explanations provided about how different column types influence data interpretation are generated using explainable AI techniques, ensuring that the AI's reasoning is transparent and understandable to users.

The agent environment 200's ability to understand the different uses of data in various column types is a result of extensive training on diverse datasets. This training enables the AI to recognize that a "Status" column typically contains a finite set of predefined values representing stages in a process, while a "Description" column allows for free-form text input. The AI can then apply this understanding to interpret the significance of data placement and movement between different column types.

By interpreting the structure of the data, the agent environment 200 may employ mining techniques to infer the underlying workflows or business processes represented by the table. This involves identifying common sequences of data changes, recognizing decision points, and mapping out the flow of information across different columns and items as described above.

Understanding of context allows the agent environment 200 to provide insights that go beyond the surface level of the data. It may identify inefficiencies in workflows, suggest process improvements, and even predict future states based on historical patterns and current data. This level of analysis transforms the SaaS platform from a mere data repository into an intelligent assistant that actively helps users optimize their processes and make data-driven decisions.

In an exemplary case, a contextual analysis is performed on patient records. It interprets lab results in the context of the patient's age, medical history, and current medications. For instance, it might flag a 'normal' test result as potentially concerning for a patient with a specific pre-existing condition, prompting the healthcare provider to take a closer look.

Reference is now made to another exemplary use case wherein a project management SaaS platform is used by a software development company. The platform contains a data structure representing ongoing projects, with each project as an item and various attributes as columns. The data structure includes the following columns:

Project Name (Text)

1. Start Date (Date)
2. Status (Status: Not Started, In Progress, Testing, Completed)
3. Priority (Numeric: 1-5)
4. Assigned Team (Text)
5. Budget (Numeric)

A project manager, Alice, wants to understand the context of a specific project named "Mobile App Redesign". She uses the system's interface to query about this project. The agent environment 200 performs its contextual analysis:

1. It recognizes "Status" as a status column and interprets "In Progress" as an active state, different from how it would interpret the same text in a regular text column.
2. It identifies that project with similar priority (4) and budget range have historically taken an average of 3 months to complete.
3. It infers a relationship between the "Assigned Team" and "Status" columns, noting that projects assigned to this particular team often move from "In Progress" to "Testing" faster than other teams.
4. It recognizes a pattern where projects with high priority (4-5) and "In Progress" status often have budget adjustments in the near future.

When Alice queries about the "Mobile App Redesign" project, the agent environment 200 provides insights such as: "The 'Mobile App Redesign' project is currently In Progress, which indicates active work. Based on historical data of similar projects (Priority 4, comparable budget), we estimate a completion time of about 3 months from the start date. The assigned team typically moves projects to the Testing phase quicker than average. Given the high priority, there's a 70% chance of a budget adjustment within the next month based on patterns observed in similar high-priority, in-progress projects." This example demonstrates how the agent environment 200 uses contextual analysis to provide rich, insightful information about items in the data structure, taking into account the specific meanings and relationships implied by different column types and their values.

In the described embodiments, the generative AI agent may interface with the data structure through a table format, where items are typically arranged in rows and their characteristics in columns. This tabular structure provides a structured framework for the generative AI agent or generative AI model to process and analyze information. The generative AI agent may be granted specific credentials that allow it to read and write data within certain items of this table structure, ensuring that its access is controlled and aligned with organizational security protocols.

Before interacting with the data, the generative AI agent may be prompted with crucial contextual information. This includes details about the data types of item characteristics and the structural relations between items in the table. For instance, the generative AI agent or generative AI model is informed about whether a particular column contains numerical data, text, dates, or categorical information. This context-setting step is critical as it enables the generative AI agent or generative AI model to interpret the data accurately and make informed decisions about how to interact with it.

The generative AI agent's interaction with the data structure is not limited to passive analysis. It may generate and execute instructions for performing actions by interacting with item characteristics. These actions are calculated to promote the common objective associated with the table structure. For example, in a customer relationship management context, the generative AI agent or generative AI model might analyze purchase history and engagement metrics to suggest personalized retention strategies for at-risk customers.

Furthermore, the generative AI agent may proactively identify missing data or necessary actions within the data structure. When it encounters incomplete information, it can autonomously reach out to relevant team members to obtain the missing data. This proactive approach ensures that the data structure remains complete and up-to-date, enhancing the overall efficiency of the SaaS platform.

The generative AI agent also may demonstrate adaptability in its interactions with the data structure. It can adjust its output and behavior based on the specific context of its engagement, including the role of the user it's interacting with and its location within the hierarchical structure of the organization. This context-aware interaction ensures that the AI's actions and recommendations are always relevant and appropriate to the specific use case.

Optionally, the generative AI agent may perform analysis for the data structure, including identifying patterns or trends from previous items, inferring relationships between different columns and their values, and even deducing the overall objective of the table based on its structure and content. This deep analytical capability allows the generative AI agent or generative AI model to provide insights and take actions that go beyond simple data manipulation, truly augmenting the decision-making processes within the organization.

It should be noted that the features and processes described in the above embodiments (FIG. 2A through FIG. 11A) are not mutually exclusive. They can be combined and integrated in various ways to create comprehensive AI solutions within SaaS platforms, tailored to specific organizational needs and use cases. For instance, the proactive information gathering capability outlined in the flowchart of FIG. 5 can be combined with the hierarchical access control scheme detailed in FIG. 4A. Similarly, the contextual data analysis method presented in FIG. 11A can be incorporated into the AI resource management process described in FIG. 10. This modularity and interoperability of features allow for flexible and customizable AI implementations tailored to specific organizational needs. For example, the intent-based interaction system from FIG. 9 could be enhanced with the interactive analysis capabilities from FIG. 8, creating a more comprehensive and user-friendly AI interface. These cross-embodiment integrations are not limited to the examples provided and can be applied across all described flowcharts and embodiments, offering a rich set of possibilities for implementing AI within SaaS platforms. This flexibility ensures that the disclosed subject matter can adapt to diverse use cases and evolving requirements in various business environments.

Reference is now made to a description of some embodiments of optional elements of the agent environment 200.

In some embodiments, the generative AI agent is designed to customize non-AI components of the software application to process and reflect data from other components. This module is activated when a user provides input describing a desired result for a non-AI component, particularly for programmable components that can be customized with specific logic.

The generative AI agent allows users to define logic for programmable components without directly writing code. Instead, users can provide instructions in plain language, which the generative AI agent interprets to deduce the user's intention. This capability is particularly useful for components that receive input from other AI or non-AI components and output a value based on defined logic.

Upon receiving a natural language input, the generative AI agent analyzes the text to understand the user's intention. It then searches for relevant components within the software application that align with the user's goals or may be necessary to fulfill the intended logic. Once identified, the generative AI agent or generative AI model generates appropriate code, including references to these relevant components.

The generative AI agent offers flexibility in how this generated code is utilized. Users can manually implement the code, or the generative AI agent or generative AI model can automatically integrate it into the software application, effectively programming the component as intended.

This generative AI agent is particularly valuable for creating complex calculations or data manipulations. For example, when calculating expected revenue from deals in a pipeline, users can describe the calculation process in natural language, and the generative AI agent or generative AI model will translate this into a proper formula referencing the correct columns and applying the appropriate mathematical operations.

The module's response includes the computed formula in the correct syntax for the programmable component, such as a formula column. This approach eliminates guesswork and potential syntax errors, making the process of setting up complex calculations more accessible to users without extensive coding knowledge. Furthermore, the generative AI agent can handle follow-up questions or requests for modifications. If a user needs clarification or wants to adjust the formula, they can continue the interaction in natural language. The generative AI agent or generative AI model can explain each part of the formula, suggest optimizations, or make requested changes, all while maintaining the correct syntax and references to the appropriate components. See for example FIG. 11B which is a screenshot of a board generated by the platform 100 overlayed with a window facilitating a user to correspond with a generative AI agent that suggests a formula based on a request and also presents an explanation therefore, consistent with some embodiments of the present disclosure.

This capability extends the no-code approach to traditionally code-based components, significantly lowering the barrier to entry for users to create sophisticated, custom functionalities within the software application. It enables users to focus on their business logic and desired outcomes rather than the intricacies of coding syntax.

In some embodiments, the generative AI agent analyzes user inputs provided in response to AI component outputs, deducing the user's intention and measuring the significance of their modifications. The generative AI agent assesses the extent and nature of changes made to an output. Substantial modifications may indicate a divergence from the user's original instructions or signal a need for systemic adjustments to future outputs. Minor alterations might suggest user preferences to be incorporated in subsequent interactions. Upon detecting a significant discrepancy, the generative AI agent initiates a correction process. This involves a self-evaluation of the AI's analysis models, sentiment recognition algorithms, and other relevant components. The generative AI agent then adjusts its configurations to align future outputs with the insights gained from the user's modifications. Following self-improvement, the generative AI agent may conduct a retrospective analysis of past inputs for the affected AI components. It identifies any previous outputs that may require updates based on the newly amended configuration. The generative AI agent can then automatically revise relevant past outputs or alert users to these findings, offering the option to apply similar amendments.

For changes deemed stylistic or insignificant, the generative AI agent logs the input for future consideration. If the volume of logged inputs for a particular type of change reaches a predetermined threshold, the agent environment 200 re-evaluates its initial classification of the change as purely stylistic.

In scenarios where the generative AI agent or generative AI model cannot conclusively determine the significance of a user's input, such as when an output is completely rewritten, the agent environment 200 either logs the change for future analysis or directly queries the user about their intention behind the modification.

This self-correction capability extends to various AI functionalities within the agent environment 200. For instance, in sentiment analysis tasks, if a user corrects an AI-generated sentiment classification, the module analyzes the discrepancy, updates its sentiment analysis model, and then reviews historical classifications for similar patterns that may require revision.

Optionally, the generative AI agent is adapted to handle formula columns. This feature allows users to describe desired calculations or data manipulations in natural language, which the generative AI agent or generative AI model then translates into appropriate formulas or code. The agent environment 200 can handle complex requests, breaking them down into manageable steps and providing explanations for each part of the generated formula.

As users interact with the generated formulas, making modifications or corrections, the natural language programming assistant learns from these interactions. It refines its understanding of user intent and improves its translation of natural language requests into accurate formulas over time.

This comprehensive approach to AI self-correction and natural language formula generation significantly enhances the system's ability to adapt to user needs, improve accuracy over time, and provide more intuitive interfaces for complex data operations.

Optionally, the environment 200 is capable of engaging in text-based interactions with users within the SaaS platform by implementing a dual-mode interaction system for the AI module, comprising: a transparency mode, wherein information provided by a user to the AI module during a specific interaction is made available for use with other users in the software application, and an individual privacy mode, wherein information provided by a user to the AI module during a specific interaction is restricted from use with other users in the software application. In use, a user interface element allowing users to switch between the transparency mode and the individual privacy mode for each interaction with the generative AI agent is provided. Interaction data may be stored in a secure database, with metadata indicating the selected visibility mode for each interaction and access control mechanisms to enforce the selected visibility mode when retrieving or utilizing stored interaction data may be implemented. This enables utilizing information from transparent interactions to enhance its knowledge base and improve responses to future queries from all users and restrict the generative AI agent from utilizing information from private interactions for any purpose other than responding to the specific user who provided the information. This also may provide administrators with configurable policies to set default visibility modes for different types of interactions or user roles. Optionally, a logging system is provided to track mode switches and usage patterns of the visibility settings.

The system may further comprise a machine learning component that analyzes the content and context of interactions to suggest appropriate visibility modes to users, based on the nature of the information being discussed and historical usage patterns.

In the transparency mode, the system implements additional safeguards to prevent the sharing of sensitive or personally identifiable information, utilizing natural language processing techniques to detect and redact potentially sensitive data before making the interaction available for broader use.

The individual privacy mode may employ encryption techniques to secure the interaction data, ensuring that even system administrators cannot access the content of private interactions without explicit user permission.

The system may allow granular control of information sharing, enabling users to selectively make portions of an interaction transparent while keeping other parts private. This is achieved through a user interface that allows in-line tagging of content with visibility attributes.

In collaborative team environments, the system may provide an option for team-level transparency, where interactions can be shared within a defined group of users but remain private to the broader user base. This team-level visibility is managed through integration with the platform's existing user and group management systems. The environment 200 may include a feature for retroactive visibility changes, allowing users to modify the visibility settings of past interactions within a configurable time frame. This feature is coupled with a notification system that alerts relevant parties about significant visibility changes. To support compliance with data protection regulations, the environment 200 may implement data retention policies that automatically archive or delete interaction data based on its age and visibility settings, in accordance with configurable rules set by platform administrators.

Figure 12:
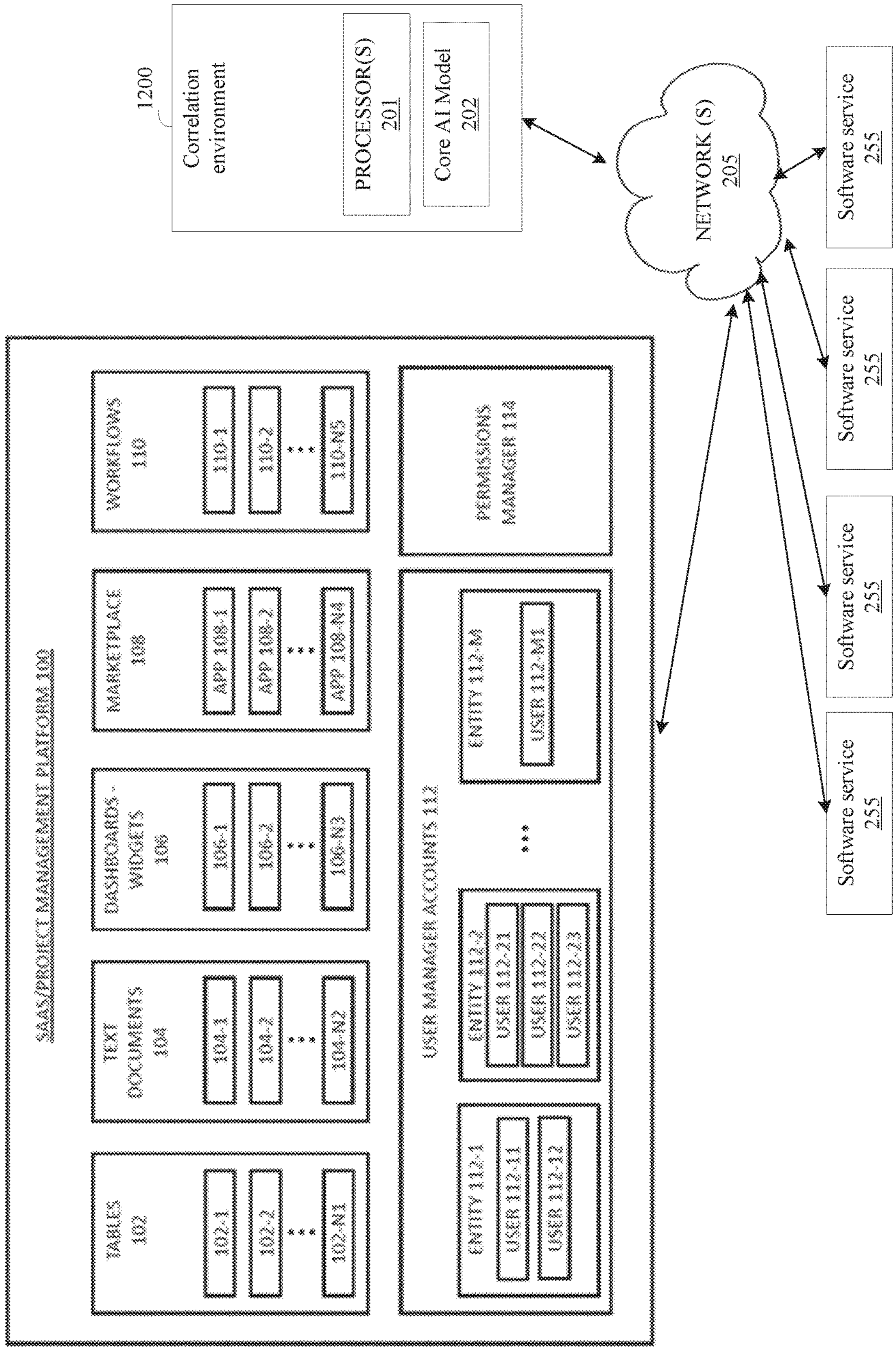
FIG. 12 is a block diagram illustrating an exemplary SaaS platform and correlation environment, consistent with some embodiments of the present disclosure.

Reference is now made to FIG. 12 which is a block diagram of an exemplary SaaS platform 100 and correlation environment 1200, according to some embodiments of the present disclosure. Although the correlation environment 1200 is depicted as a separate environment it can be part of the SaaS platform 100 itself. The correlation environment 1200 may be in communication with the SaaS platform 100 as described in any of the embodiments below, for instance via network 205 or directly based on any common software component communication protocols or in the common process of executing software components.

As illustrated, SaaS platform 100 includes a plurality of SaaS platform elements, namely Tables 102, Text documents 104, Dashboards 106, Marketplace 108, and Workflows 110. Each of these SaaS platform elements includes a plurality of SaaS platform sub-elements respectively 102-1 through 102-N1 for Tables 102, 104-1 through 104-N2 for Text documents 104, 106-1 through 106-N3 for Dashboards 106, APP 20 through APP 108-N4 for Marketplace 108 and 110-1 through 101-N5 for Workflows 110, wherein N1, N2, N3, N4 and N5 represent natural numbers.

It is to be appreciated that these SaaS platform elements may collaborate seamlessly. For instance, a text document (e.g., 104-1) might incorporate data from a table (e.g., 102-1), and a dashboard/widget (e.g., 106-1) might display data originating from a table (e.g., 102-1). This integration may ensure a cohesive and flexible user experience, allowing different components of the platform to work together effectively and dynamically share data. Additionally, it is to be appreciated that the utilizations of data originating from a first SaaS platform element (e.g., a table), by a second SaaS platform (e.g., a widget included a plurality of graphical representations) may not necessarily lead to additional memory allocation on a SaaS platform server. This efficiency may be achieved because the data is not duplicated for each view (a table view or a dashboard/widget view). Instead, the data may be dynamically imported from the first SaaS platform element, often using pointers to their specific locations in memory. This approach ensures that the original data remains intact and avoids the overhead associated with creating multiple copies, thereby optimizing memory usage and improving the overall performance of the server. For example, when a user of the SaaS platform requests a graphical representation (widget view) of data from a table, the platform may retrieve the necessary data by referencing the memory locations where the data is stored, rather than creating new instances of the data. These references, or pointers, serve as links to the original data, enabling the server to efficiently handle multiple requests without incurring significant memory costs. By leveraging this method, the SaaS platform may support numerous simultaneous views and graphical representations without a proportional increase in memory usage. Furthermore, this approach allows for real-time data updates to be reflected instantly across all views. Since all views point to the same data source, any changes to the data are immediately visible, ensuring consistency and accuracy. This method may be advantageous in environments where data is frequently updated, such as in financial systems, real-time analytics, and monitoring applications.

Several entity or organization accounts (user management accounts) 112 (112-1 to 112-M, M being a natural number) may be affiliated with SaaS platform 100 and managed via a user manager. Each of these entity accounts may include at least one user account. For example, entity account 112-1 includes two user accounts 112-11, 112-12, entity account 112-2 three user accounts 112-21, 112-22, and 112-23, and entity account 112-M one user account 112-M1. Within the context of the disclosed embodiments, an entity account may refer to the central account managing the overall SaaS platform subscription, billing, and settings. Within this entity account, multiple user accounts may be created for different individuals within the entity/organization. User accounts may have their own login credentials, access privileges, and settings. The entity account owner or administrators may have control over access, permissions, and data segregation. User accounts may collaborate and share resources within the entity account while maintaining a personalized experience. Each of the user accounts 112 may include different permutations of SaaS platform elements such as a plurality of tables, text documents, dashboards, marketplace applications (e.g., 108) in association with the above-mentioned SaaS platform elements 102, 104, 106, 108, and 110. Accordingly, various SaaS platform elements or sub-elements may include metadata associated with users. Metadata associated with users may provide additional information and context about the users themselves, their profiles, roles, preferences, and interactions within the SaaS platform. Examples of metadata may include user profiles, roles and permissions, activity logs, usage indications, preferences and settings, user associations/relationships, user history or a combination thereof.

The correlation environment 1200 may be a computerized system having processors and storage adapted to execute a machine learning model trained for correlating between states of statues in external software services 255 including third-party applications (e.g., JIRA, Slack, SAP, Salesforce) and data documenting the progress in tasks or related statues in one or more collaborative boards or any other table structure managed by the platform 100.

The machine learning model may be a generative AI model implemented in the correlation environment 1200 using a Core AI Model 202 that incorporates Natural Language Understanding (NLU) and Natural Language Generation (NLG) capabilities. This Core AI Model can be a transformer-based model (e.g., GPT-3.5, GPT-4, or open-source alternatives like BERT or T5) executed in a framework such as PyTorch or TensorFlow and deployed on the correlation environment 1200 (e.g., part of platform 100 or a separate system communicating with the platform 100) such as an NVIDIA Triton Inference Server or TensorFlow Serving.

When the correlation environment 1200 is executed separately from the platform it may communicate therewith via digital data communication (e.g., a communication network 205). Examples of communication networks include a local area network ("LAN"), a wide area network ("WAN"), and the Internet.

The core model provides the foundation for both NLU and NLG functionalities. It receives processed input from the NLU component and sends raw output to the NLG component for refinement.

The NLU processes incoming messages, extracting intents and entities. It feeds processed information to the Core AI Model and updates Context Management. The NLG receives raw output from the Core AI Model, refines it based on context, and produces human-readable responses.

The NLU may be implemented using libraries such as spaCy or NLTK for text processing and intent/entity extraction. The NLG may be implemented using template-based systems like Jinja2 or neural-based approaches such as GPT-3 Application Programming Interface (API) or fine-tuned GPT-2, which receive raw output from the Core AI Model, refine it based on context from Context Management, and produce human-readable responses. As used herein API (Application Programming Interface) is a set of protocols, routines, and tools for building software applications that specifies how software components should interact.

Optionally, the generative AI model can be executed as in the correlation environment 1200 or as part of the platform 100 by one or more processors 201. When executed in a separate environment, an API Integration Layer may be implemented to facilitate communication between the AI and the SaaS platform. This layer may include a RESTful API client (e.g., Python requests library), GraphQL client (e.g., gql for Python), and/or OAuth 2.0 for authentication (e.g., authlib library—an open standard for access delegation, commonly used as a way for internet users to grant websites or applications access to their information on other websites but without giving them the passwords). It sends platform responses to the Core AI Model and Context Management and receives actions to execute from a decision engine. The decision engine processes information from the Core AI Model, consults a memory and knowledge base, and determines actions. It then either initiates tasks via the Task Planning Module or generates responses through NLG.

Optionally, the correlation environment 1200 includes a context management module, task planning module, and a decision engine to provide contextual information to the Core AI Model. The task planning module receives high-level objectives from the decision engine, breaks them down into steps, and coordinates with the API integration layer for execution. The Memory and Knowledge Base component interacts with the Core AI Model, Decision Engine, and Context Management, providing long-term storage and retrieval of information. It's queried by the Core AI Model and Decision Engine and updated based on new interactions and learning.

All or some of the components collect data from other components for performance tracking, error detection, and system optimization. In operation, the Decision Engine orchestrates overall behavior, the Task Planning Module manages multi-step processes, and the Context Management ensures coherence across interactions. This interconnected architecture allows for flexible, context-aware interactions while maintaining security and a capability handle a growing amount of work, or its potential to be enlarged to accommodate that growth (scalability).

In addition, each of these user accounts may include one or more private apps, that have been specifically designed and tailored to suit the needs of a user and that employ functionalities offered by or in association with SaaS platform 100 (via SaaS platform elements 102, 104, 106, 108, and 110 or their associated sub-elements). Private apps are exclusively accessible to users who are affiliated with an entity owning or implementing that app. These applications may not be publicly available (i.e., not on the market/publicly offered on the marketplace 108) and may only be accessed by individuals who have specific authorization or are part of the designated user group. The privacy settings associated with these apps restrict access to ensure that only authorized users can use and interact with them. This level of privacy and restricted access helps maintain confidentiality, control, and security over the app's functionalities and data, limiting usage to approved individuals within the user account. Centralization of user access and authorization management is performed by a permission manager 114 enabling administrators to control and regulate user privileges, ensuring that users have appropriate levels of access to data, features, and resources based on their roles and responsibilities. Permissions Manager 114 may offer granular control, and role-based access, facilitating efficient user management, collaboration, and compliance monitoring. Its objective is to enhance data security, streamline user administration, and maintain proper governance within the SaaS platform.

Still referring to FIG. 12, SaaS platform 100 may include one or more management tools that may involve a combination of one or more SaaS platform element or sub-element. For example, a solution may leverage data stored in one or more tables and offer comprehensive data visualization through prebuilt dashboards and widgets, furnishing users with deep and meaningful insights into their operations. In some embodiments, these tools may enable visualization of alphanumeric data in a non-alphanumeric manner. For instance, instead of conventional tables or charts, these tools may employ immersive graphical interfaces or interactive simulations to depict complex datasets. These visualizations may encompass versatile views such as Kanban boards, timeline representations, Gannt charts, or other representations, offering users diverse perspectives and facilitating informed decision-making. This approach enables users to interact with the data in a more intuitive and engaging manner, facilitating deeper understanding and analysis. Each of these management tools may be coupled to one or more user accounts 112 and may operate synergistically within SaaS platform 100, empowering users to streamline and optimize their sales processes, from lead generation to deal closure. These tools leverage the analytical capabilities of the SaaS platform to provide users with actionable insights and facilitate efficient management of their sales.

In order to provide meaningful data visualizations, management tools may access one or more data structures. A data structure refers to any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include a data pool (whether a structured or an unstructured pool), an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. Additionally or alternatively, some or all of the data structure may be organized using the Ruby on Rails web application framework. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures. A data structure may include a plurality of data items and may define the relationship between the items and the operations that may be performed on them. Each item may include one or more characteristics associated with a value (e.g., an alphanumeric value). A data structure may include a plurality of items. Examples of items may include but are not limited to a deal, a transaction, a client account, a prospect, a task, a user record, or an order. A characteristic of an item may include any distinctive feature or quality that helps to identify or define an item. The characteristics of items may include, for example, a deal size, an associated level of risk, one or more associated salespersons, a client name, a phase in the sales funnel, a client type, one or more due dates, a rate of completion, comments, or any additional feature or quality relevant to an item included in a data structure. The characteristics of an item may present relationships and patterns that offer valuable insights into customer behavior, sales trends, and operational efficiencies. For instance, analyzing the relationship between deal size and associated risk levels can help identify high-risk, high-reward opportunities or tracking the performance of salespersons in relation to deal phases and completion rates can highlight strengths and areas for improvement within the sales team.

The plurality of items of a data structure (such as a single table, a plurality of interconnected tables, or the entirety of tables in a predetermined group), may be associated with a common objective. A common objective refers to a shared goal or aim. Examples of common objectives in a business context include increasing revenues, sales, profitability, customer retention, or number of customers; or decreasing waste, expense, or loss of customers. In general, a common objective can refer to increasing a positive measure and/or decreasing a negative measure. In this context, a common objective may guide the arrangement and interaction of the individual elements towards a shared purpose or goal. This objective could span a broad spectrum, ranging from high-level aspirations, such as maximizing profitability or efficiency, to more specific aims, such as streamlining processes or achieving targeted outcomes. Whether the objective is overarching or focused, the association between the items and the common objective underscores the cohesion and purposefulness of the data structure, driving meaningful insights and outcomes. A comprehensive visualization of the data structure may provide valuable insights into the common objective. By presenting the relationships and patterns inherent within the data structure, such a visualization may enable a deeper understanding of how individual items contribute to the overarching goal. This comprehensive view may facilitate the identification of key trends, dependencies, and potential optimizations that can propel progress towards achieving the common objective. Moreover, by offering a holistic perspective, the visualization may empower user (e.g., salesperson, salesperson manager etc.) to make informed decisions and strategic adjustments, leveraging the collective knowledge embedded within the data structure to drive towards the desired common objective.

Some disclosed embodiments may involve stored data such as alphanumeric data which are accessible when a user interacts with graphical elements having a plurality of graphical characteristics. Within the context of this disclosure, alphanumeric data refers to data composed of either or both letters (alphabetic) and numbers. This type of data may include any combination of the 26 letters of the English alphabet (A-Z, a-z) and the 10 numeric digits (0-9). Additionally, alphanumeric data may also encompass ideograms, such as those used in Chinese or Japanese characters, or characters from any other alphabet, such as Cyrillic, Hebrew, Greek, or Arabic. A graphical element is a visual component that conveys information. By way of non-limiting examples, graphical elements can include shapes, lines, colors, textures, images, icons, and symbols. Discrete graphical elements refer to individual visual components that are distinct from one another, enabling visual comparison between them. Each element may adopt a plurality of graphical characteristics such as shape, color, size/dimensions, borderline, texture or position with respect to a screen and/or other presented elements, that may be used to visually encode information. In this disclosure, unless specified otherwise, a graphical element may equally refer to the visual representation/entity as presented on a display and/or to the underlying data model of the visual representation that can be readily understood and manipulated by a processing device and that includes properties defining the graphical characteristics of the visual representation.

By way of example with reference to FIG. 12, a platform 100 may maintain tables 102 by storage, or any combination thereof. FIG. 1B illustrates an exemplary table structure, referred to herein as table 300, that may include multiple columns and rows, consistent with some embodiments of the present disclosure. In some embodiments, the table 300 may be displayed using a computing device (e.g., the computing device or software running thereon). The table 300 may be associated with a project (e.g., "Project 1" in FIG. 1B) and may include, in the multiple rows and columns, tasks (e.g., in rows including "Task 1," Task 2," or "Task 3") and data characteristics for the tasks. Such data characteristics can be persons (e.g., in a column 332), indicating which user entities are associated with the task/are assigned to the tasks, details (e.g., in a column 334) of the tasks, statuses (e.g., in a column 342) of the tasks, due dates (e.g., in a column 336) of the tasks, timelines (e.g., in a column 340) of the tasks, or any other data characteristic of the task. For example, in a project with the common objective of launching a new product, the table might be structured as follows: Task 1 could be "Market Research," assigned to a generative AI Agent. Task 2 might be "Product Design," assigned to John from the R&D department. Task 3 could be "Financial Projections," assigned to Michael from the Finance department. Each task contributes to the common goal of product launch, and people are assigned from the departments most relevant to each task's requirements. This structure enables cooperation across departments to reach the common objective efficiently. The status column might show "In Progress" for Market Research, "Not Started" for Product Design, and "Completed" for Financial Projections, giving a quick overview of the project's progress towards the launch goal. A task may refer to a part or a portion of a project. A task may be performed by an entity (e.g., an individual or a team or a generative AI agent assigned to the task). In some embodiments, a task may be represented by a row of cells in a task table. In some embodiments, a task may be represented by a column of cells of a task table. An entity may refer to an individual, a team, a group, a department, a division, a subsidiary, a company, a contractor, a generative AI agent, or any independent, distinct organization (e.g., a business or a government unit) that has an identity separate from those of its members, or a combination thereof.

As illustrated in FIG. 1B, the at least one processor may maintain a plurality of tables (e.g., including the tables 300) and other information (e.g., metadata) associated with the plurality of tables. Each table (e.g., one of the tables 300) of the plurality of tables may include a plurality of rows (e.g., the rows of "Task 1," Task 2," and "Task 3" in the table 300) and columns (e.g., columns 332, 336, 340, 332, and 334 of the table 300).

Consistent with some disclosed embodiments, at least one processor may be configured to maintain a second table with rows and columns defining second cells. A second table may include a sub-table of the first table, a sub-table of another table, a separate table associated with the same project as the first table, a separate table associated with a different project from the project of the first table, a table associated with a same project of a same entity, a table associated with a different project of the same entity, a table associated with a same project of different entity (e.g., a second user or a teammate or a generative AI agent), or any other combinations and permutations thereof. A second table may include tables as previously described above, including horizontal and vertical rows for presenting, displaying, or enabling access to information stored therein.

A relationship between the first and the second table may be hierarchical. A hierarchical relationship, as used in the context of this disclosure, may refer to a relationship based on degrees or levels of superordination and subordination. For example, in some embodiments, the first table may be a table associated with a task or a project and the second table may be a sub-table of the first table associated with the same project or a different project. In such a scenario, the first table may be considered a superordinate table and the second table may be considered a subordinate table.

Other examples of hierarchical relationships between a first and a second table are described herein. In some embodiments, an entity may be associated with one or more projects, and the first table may be a table associated with a first project of the entity, and the second table may be a table associated with a second project of the entity. In such a case, the first table may be the superordinate table and the second table may be the subordinate table. Alternatively, the first table may be the subordinate table and the second table may be the superordinate table. In some embodiments, the first table and the second table may be tables or sub-tables associated with different entities, different projects of a same entity, different projects of different entities, or other combinations thereof.

In some disclosed embodiments, the first and the second tables may be associated with or may be a part of a workflow. A workflow may refer to a series of operations or tasks performed sequentially or in parallel to achieve an outcome. A workflow process may involve managing information stored in tables associated with one or more entities, one or more projects within an entity, or projects across multiple entities. In an exemplary workflow process, a freelancer may create an invoice and send it to a client, the client may forward the invoice to the finance department, the finance department may approve the invoice and process the payment, the customer relations department may pay the freelancer. Similarly, the workflow process may involve sending a notification from the freelancer to the client in response to a status of the invoice being "Done," mirroring the received invoice to the finance department, updating a status (e.g., not yet paid, in process, approved, and so on) of the invoice processing, and updating a status in response to payment transmitted to the freelancer.

In the context of this disclosure, it is important to note that the assignment of a generative AI agent to a cell of a table such as 300 by a user can be configured to trigger the assignment of that AI agent to the respective task and its associated information, characteristics, or entities of the project as documented in the respective row or column to which the agent is added. This assignment process is designed to be automatic and seamless when the user adds the agent to the respective cell, table, or sub-table. For instance, if a user assigns a generative AI agent to a cell in the "Person" column (332) of a specific task row, the generative AI agent is automatically granted access and assigned to all relevant information pertaining to that task, including its details, status, due date, and/or timeline. This automatic assignment may extend to any sub-tables or linked data sources associated with that task. Furthermore, the system may automatically provision appropriate credentials to the generative AI agent, allowing it to perform actions and access information within the scope of its assigned task. These credentials are dynamically adjusted based on the context of the assignment, ensuring that the AI agent has the necessary permissions to fulfill its role while maintaining data security and access control protocols. This streamlined approach to AI agent assignment and credential management enables efficient integration of AI capabilities into project workflows, enhancing productivity and decision-making processes. As used herein, any assignment of the generative AI agent as a user to task or action may be performed by the addition of the agent by a human user who uses an interactive graphical user interface presenting the respective table to a cell in the respective table, for instance by adding or selecting an avatar of the agent to the cell.

As described herein, when indicating that the generative AI agent is assigned with a role, for instance in a team assigned to a project documented in one or more table structures, the role may be given as an outcome of adding the generative AI agent to a table such as 300, by a user. In use, post adding the agent to a cell, the environment 1200 automatically creates a role for that agent based on the context of its assignment. In some cases, this role definition process is dynamic and contextual, taking into account the specific characteristics of the table, the task, and/or the project as a whole. For example, when an AI agent is assigned to a row having a marketing campaign task indicated in the "Task Details" column (334), the system might automatically define its role as a "Content Strategy Assistant." In this role, the AI agent would be granted permissions to analyze past campaign data, suggest content ideas, and even draft preliminary marketing copy. Similarly, if an AI agent is added to a row having a software development task indicated in the "Task Details" column (334), it might be assigned the role of "Project Progress Monitor." In this capacity, the AI could be authorized to track task completions, identify potential bottlenecks, and send automated status updates to team members. These automatically generated roles are not static; they can evolve based on the AI agent's interactions and performance within the project ecosystem and/or changes in the values of the cells of the table. This dynamic role creation and evolution allow for a flexible and adaptive integration of AI capabilities into diverse project environments, enhancing the overall efficiency and intelligence of the project management process. In other cases, the role definition process is rigid, and the AI agent is preconfigured with a specific role to perform, and the dynamic nature thereof comes into play by utilizing the same predetermined row on a varying structure of tables with different column structure.

While the third-party applications are described herein as external to the collaborative work management platform, the platform described herein may function as a multiproduct hub, encompassing the third-party applications as distinct applications that utilize a common framework but potentially operate with different data clusters. This multiproduct approach enhances the platform's versatility and integration capabilities. For instance, the platform may include a project management application and a customer relationship management (CRM) application, both built on the same underlying SaaS infrastructure. In this multiproduct ecosystem, actions in one product can trigger reactions or updates in another, demonstrating the interconnected nature of the platform. The AI-driven features described throughout this document, such as deviation detection, workflow optimization, and predictive analytics, can operate across these multiple products, providing a cohesive and intelligent user experience throughout the entire platform ecosystem. This emphasizes the platform's capability to serve as an integrated, multi-application environment, further highlighting its potential for comprehensive business process management and cross-functional optimization.

Figure 13:
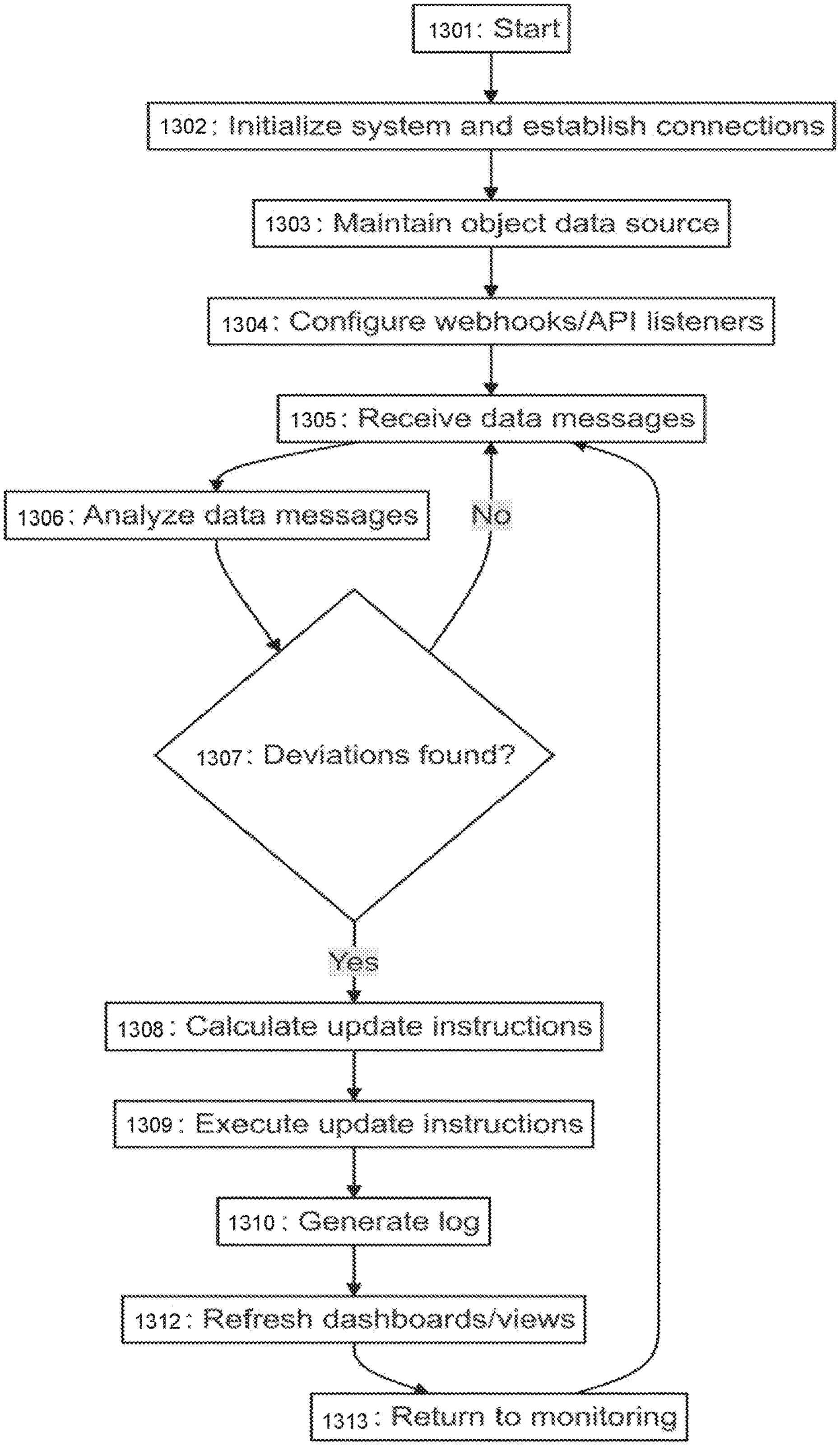
FIG. 13 is a flowchart depicting a process for managing data updates in a collaborative work management platform, consistent with some embodiments of the present disclosure.

FIG. 13 is a flowchart of a process for managing data updates in a collaborative work management platform, ensuring that the data presented in the system accurately reflects the reality documented in third-party applications used by a team of users, according to some embodiments of the present disclosure. This process may optionally utilize a machine learning model trained on historical data from the platform. The flowchart is implemented using a SaaS platform, such as the system depicted in FIG. 12, according to some embodiments of the present disclosure, for instance using correlation environment 1200. The machine learning model may be a supervised machine learning model (e.g., gradient boosting or neural network) that was trained on historical data. The training data optionally includes historical data objects linked to past boards, containing task statuses, user assignments, and project details and/or historical data messages from third-party software services 255, representing past process statuses. Such a model is trained to identify patterns and correlations between board data and third-party process data. After training, the model is deployed using a model serving framework (e.g., TensorFlow Serving or MLflow).

As shown at 1301, the system and establish connections with third-party applications (e.g., JIRA, Slack, SAP, Salesforce) are initialized, for instance via APIs or webhooks. As used herein a webhook is a method of augmenting or altering the behavior of a web page or web application with custom callbacks.

As indicated above, the system is designed to integrate with various cloud-based software services 255. Optionally, an API gateway (e.g., Kong or AWS API Gateway) is implemented to manage and secure all API interactions. The system supports multiple API protocols, including REST, GraphQL, and gRPC, to accommodate different service requirements. API calls are rate-limited and monitored to ensure fair usage and prevent overload.

For example, when the system may be a component of a SaaS platform. This grants the system access to core services of the platform, including database connections, authentication services, and API gateways. It loads configuration files specifying the third-party applications to connect with. The system can be configured to establish connections such as secure SSL/TLS connections with each third-party application's API endpoints. OAuth 2.0 or similar authentication protocols that can be used to authenticate and authorize access to third-party services.

The correlation environment 1200 may continuously monitor and receive multiple data messages from a plurality of software services connected to a network. The correlation environment 1200 may implement a flexible integration layer to facilitate communication between the correlation environment 1200 and various SaaS platforms. This layer supports multiple protocols to accommodate different platform requirements for platforms supporting REST architecture, the system exposes endpoints following OpenAPI 3.0 specifications. These endpoints handle CRUD operations on resources representing tasks, projects, and user data. Example endpoint structure: GET/api/v1/tasks POST/api/v1/projects PUT/api/v1/users/{user_id}. For more complex data requirements, a GraphQL server is implemented, allowing SaaS platforms to request precisely the data they need. This implementation may be used in all respective embodiments wherein communication between platforms is monitored, for example in FIGS. 13 and 14.

As shown at 1302, an object data source containing multiple data objects linked to one or more boards is maintained. These boards indicate task statuses for multiple tasks assigned to users with credentials to access the boards that can be configured, for example, to document project data, for instance at the platform 100. As used herein a data object may be a representation of a real-world entity in programming, containing both data and the methods to manipulate that data. A task status may be a current state of a task in a project management system, such as "Not Started," "In Progress," "Completed," etc.

Optionally, the multiple data objects are stored in a distributed database system (e.g., PostgreSQL with sharding) that manages the data objects. Each data object may be structured as a JSON document, containing metadata about its associated board, tasks, and user assignments. Optionally, an indexing service (e.g., Elasticsearch) is employed to enable fast querying and retrieval of objects. Optionally, a caching layer (e.g., Redis) is implemented to reduce database load for frequently accessed objects.

Optionally, as shown at 1303, webhooks or API listeners to monitor relevant activities in connected third-party applications are configured and activated. The system may dynamically generate unique webhook URLs for each connected third-party service. These webhook URLs may be registered with the respective third-party applications through their APIs. For services without webhook support, the system can be configured to set up scheduled jobs to poll their APIs at regular intervals. Optionally, a load balancer (e.g., NGINX) can be configured to distribute incoming webhook requests across multiple server instances.

As shown at 1304, data messages from the connected software services 255 are received over the network, optionally continuously. These messages can contain information about process statuses in the third-party applications related to the project that is partially or fully executed independently from the platform's boards. The message monitoring can be achieved using an event-driven architecture (e.g., using Apache Kafka) that is implemented to handle incoming data messages. Each received message may be validated for authenticity using HMAC signatures or similar mechanisms. Valid messages may be parsed and normalized into a standard internal format for further processing. The system may implement rate limiting and backoff strategies to handle potential spikes in incoming data. As shown at 1305, this allows analyzing the received data messages in conjunction with the existing data objects in the platform, for instance using the above-described machine learning model. The trained model may be used to enhance the deviation identification process where input features are extracted and normalized from current data messages and board objects. In such embodiments model may process these features to predict potential deviations and their significance. Additionally, or alternatively, for example, a stream processing engine (e.g., Apache Flink) can be used to analyze the incoming data in real-time. The engine joins the streaming data with the existing data objects retrieved from the database. Complex Event Processing (CEP) techniques may be applied to detect patterns and correlations in the data.

As shown at 1306, deviations between the task statuses recorded in the platform's boards and the process statuses reported by the third-party applications are identified based on the analysis. Examples of such deviations might include:

1. Task Status Mismatch: A task marked as "Completed" on the SaaS platform's board, but showing as "In Progress" in the third-party project management tool.
2. Deadline Discrepancy: A task deadline recorded as June 15th on the SaaS platform, but updated to June 20th in the integrated calendar application.
3. Resource Allocation Conflict: A team member assigned to two concurrent tasks in the SaaS platform, but shown as on leave in the HR management system.
4. Budget Variance: A project budget recorded as $50,000 in the SaaS platform's financial module, but showing $55,000 in the connected accounting software.
5. Scope Change: A feature marked as "Approved" in the SaaS platform's product backlog, but tagged as "Under Review" in the requirements management tool.

When no deviations are found, the process returns to 1305 to continue monitoring. Optionally, a rule engine (e.g., Drools) can be employed to define and evaluate conditions for identifying deviations. Machine learning models can be used to identify subtle or complex deviations. The system may maintain a state machine for each task to track its progression and detect unexpected state changes.

As shown at 1307 and 1308, when deviations are identified, proceed to step 1308, instructions to update the affected boards based on the identified deviations are calculated. This may involve determining which specific fields or attributes are to be modified and how. The results from the deviation identification process are evaluated. Model outputs may be used to refine the update instructions calculated. If deviations are found, their severity and impact are assessed using predefined criteria, for example as described below. A decision engine may determine whether to proceed with updates based on the deviation assessment. A domain-specific language (DSL) may be used to express update instructions in a platform-agnostic manner. The system may generate a dependency graph to determine the optimal order of updates. Conflict resolution algorithms may be applied to handle cases where multiple updates affect the same data object.

The system may employ a multi-faceted approach to assess the impact of identified deviations. A machine learning model, such as a gradient boosting algorithm or a neural network, may be utilized to analyze various impact factors. This model could be trained on historical project data, including past deviations and their consequences.

The impact assessment module may interface with the project management database to extract relevant metrics. For instance, it may use graph traversal algorithms to analyze task dependencies and determine the scope of influence. Time sensitivity could be evaluated using critical path analysis algorithms, which identify tasks that directly affect project timelines. Resource allocation impact may be quantified through optimization algorithms that simulate various resource distribution scenarios. These algorithms could utilize linear programming techniques to maximize efficiency under the new constraints imposed by the deviation.

Financial implications may be calculated using predictive models that consider both direct costs and opportunity costs. These models could incorporate Monte Carlo simulations to account for uncertainty in financial projections.

To assess quality impact, the system may employ natural language processing (NLP) techniques to analyze project requirements and deliverable specifications, comparing them against the current project state post-deviation.

Stakeholder impact could be evaluated using sentiment analysis algorithms applied to recent communications and feedback. This may involve processing unstructured data from various sources such as emails, chat logs, and survey responses. Compliance assessment may utilize rule-based systems that check the deviated state against a database of regulatory requirements and internal policies. This could be implemented using a forward-chaining inference engine.

The system may use anomaly detection algorithms to identify potential data integrity issues resulting from the deviation. These algorithms could be based on statistical methods or machine learning techniques such as isolation forests.

System performance impact may be assessed through predictive performance modeling, using time series analysis of system metrics and extrapolating the effects of the deviation. The outputs from these various analytical processes may be aggregated using a weighted scoring system, with weights dynamically adjusted based on the specific context of the project and organization. This aggregated score could then be used to categorize the overall impact into predefined levels (e.g., low, medium, high, critical). The impact assessment results may be presented through a dashboard interface, potentially utilizing data visualization libraries to create interactive charts and graphs. This comprehensive, data-driven approach to impact assessment enables informed decision-making regarding deviation response strategies.

As shown at 1309, the calculated instructions to update the relevant boards, ensuring that the platform's data accurately reflects the current state of the project as documented in the third-party applications, are executed. Updates may be within a transactional context to ensure data consistency. Optionally, the system proceeds to execute the instructions only when the user approves the update. If the user declines, the system logs the decision and may trigger a review process.

As shown at 1310 a log of the updates made may be generated and stored for auditing and machine learning model training purposes. When a machine learning model is being used, the model may be updated with the new data to improve future deviation detection and update calculations.

As shown at 1312 any dashboards or views that are affected by the updates may be refreshed in real time to ensure users see the most current and accurate project status. Optionally, a notification about the recent update may be shown for a predetermined time period, or until a user is exposed to said notification.

As shown at 1313, the process returns to 1305 to continue the monitoring and updating process.

Optionally, a real-time notification service is implemented using WebSocket connections. When a deviation is identified, a notification is generated and sent to relevant users' contact details, for instance dashboards, notification center, and/or as a notification present on to the user. The notification may include a detailed description of the identified deviation, visual indicators of the affected tasks or processes, a selectable graphical element (e.g., a button) to approve the execution of update instructions. User interactions with the notification are captured and logged for auditing purposes.

Optionally, a real-time notification service is implemented using WebSocket connections. When a deviation is identified, a notification is generated and sent to relevant users' contact details, for instance dashboards, email, notification center, or as a banner on the board. The notification may include a detailed description of the identified deviation, visual indicators of the affected tasks or processes, a selectable graphical element (e.g., a button) to approve the execution of update instructions. User interactions with the notification are captured and logged for auditing purposes.

For example, consider a case where a critical bug is identified in a third-party application (e.g., GitHub) that is integrated with the SaaS platform. The system may detect this deviation through its continuous monitoring of the GitHub issue tracker. Upon detection, the following sequence of events may occur:

1. The system automatically generates a notification detailing the critical bug, including its severity level, potential impact, and the affected components.
2. This notification is immediately sent to the development team leads and project managers.
3. Simultaneously, the system may update the status of related tasks on the development board from "In Progress" to "Blocked" or "Needs Attention".
4. Optionally, the notification can include a visual representation of the affected tasks on the development board, highlighting the potential ripple effects on dependent tasks and timelines.
5. A selectable "Initiate Emergency Protocol" button may be included in the notification, which, when clicked, triggers a predefined set of actions such as creating a new high-priority task for bug fixing, reallocating resources, and adjusting project timelines.
6. The system logs all interactions with this notification, including who viewed it, when they viewed it, and any actions taken in response.

This real-time, context-aware notification system ensures that critical issues are promptly communicated and acted upon, maintaining the integrity and efficiency of the development process across integrated platforms.

The analysis of data messages and internal data objects may be performed using a combination of stream processing and batch processing techniques. Apache Kafka can be employed for real-time message ingestion and processing, while Apache Spark can be utilized for more complex, batch-oriented analyses. This hybrid approach allows the environment 1200 to identify deviations quickly while still supporting deep, historical analysis when required.

For instance, the stream processing might immediately flag the task status mismatch or deadline discrepancy, while the batch processing could uncover longer-term trends such as recurring resource allocation conflicts or gradual budget variances across multiple projects.

Changes in the boards may be monitored using an event sourcing pattern, where each modification is recorded as an immutable event in an event store. This approach not only provides a complete audit trail but also enables the environment 1200 to replay events for analysis or to reconstruct the state of the board at any point in time. A separate service, implemented using a microservices architecture, is responsible for processing these events and identifying changes relevant to external software services. This event sourcing approach would be particularly useful in tracking the evolution of deviations over time. For example, it could reveal how a minor scope change in the product backlog gradually escalated into a significant feature divergence between the SaaS platform and the requirements management tool.

According to some embodiments of the present disclosure, generative AI agents as defined in co filed application titled "methods for implementing artificial intelligence capabilities in software applications", which the content thereof is incorporated herein by reference, are deployed on the third-party software services 255 and/or platform 100. These agents are granted appropriate user-level access to their respective platforms. On third-party services, AI agents may monitor user activities and system events and/or generate structured data messages summarizing relevant changes or actions and transmit these messages to the main system via APIs. On platform 100, a master AI agent having credentials to access and update the system's boards receives and processes messages from third-party AI agents. Uses natural language processing may be to interpret incoming data and generate appropriate update instructions. All AI agent actions are logged and monitored for security and auditing purposes.

Optionally, the system can be configured with predictive capabilities to analyze historical patterns of deviations and updates. This functionality employs advanced time series analysis techniques, such as ARIMA models or recurrent neural networks, to identify trends and seasonal patterns in project data across multiple platforms. By leveraging these historical insights, the system can predict future deviations based on current project data and historical patterns. This predictive module utilizes ensemble learning methods, combining multiple machine learning algorithms to enhance prediction accuracy. Upon identifying potential future deviations, the system proactively generates suggested preventive actions. These suggestions are formulated using a combination of rule-based systems and case-based reasoning, drawing from a knowledge base of successful past interventions.

A natural language processing module may be incorporated into the system to handle unstructured data from various sources. This module can employ state-of-the-art NLP techniques, including transformer-based models like BERT or GPT, to interpret free-text comments, chat logs, and other unstructured data sources. The module extracts relevant information using named entity recognition and relationship extraction algorithms, mapping this information to the structured data schema of the project management boards. Furthermore, the NLP module can generate human-readable summaries of identified deviations and updates using abstractive summarization techniques, ensuring that complex cross-platform changes are communicated clearly to all stakeholders.

The system may incorporate an intelligent update scheduling mechanism that analyzes update patterns and user behavior. This mechanism can employ unsupervised learning algorithms, such as k-means clustering or hidden Markov models, to identify patterns in user activity across different platforms. By understanding these patterns, the system can automatically adjust the frequency and timing of updates. This adaptive scheduling aims to minimize disruptions to user workflows while ensuring data timeliness. The mechanism may also incorporate reinforcement learning techniques to continuously optimize its scheduling decisions based on user feedback and system performance metrics.

A permission management module may be implemented to handle dynamic access control across multiple platforms. This module can be configured to utilize role-based access control (RBAC) principles, extended with attribute-based access control (ABAC) for finer-grained permissions. The module can be configured to continuously monitor user activities across connected third-party applications, using this information to update a user's effective permissions in real-time. To ensure data privacy and security during cross-platform updates, the module implements data transformation and masking techniques, ensuring that sensitive information is appropriately handled based on the user's permissions in each system.

The system may generate and maintain a comprehensive dependency graph of tasks across multiple platforms. This graph is constructed using graph database technologies, allowing for efficient storage and querying of complex relationships. The dependency graph is dynamically updated as new information is received from various platforms, using graph algorithms to maintain consistency and identify circular dependencies. The system leverages this graph structure to prioritize updates, employing critical path analysis algorithms to identify tasks that have the most significant impact on project timelines. This allows for intelligent update propagation, ensuring that changes to critical tasks are immediately reflected across all relevant platforms.

An advanced anomaly detection module may be incorporated into the system to identify unusual patterns or outliers in data messages and update patterns. This module employs a combination of statistical methods and machine learning techniques, including isolation forests and autoencoders, to detect anomalies in multidimensional data streams. The anomaly detection algorithms are adaptive, continuously learning from new data to refine their understanding of normal behavior. When potential data quality issues or security concerns are identified, the system flags these for review, generating detailed reports that contextualize the anomaly within the broader project data landscape. The anomaly detection may be any identification of rare items, events or observations which raise suspicions by differing significantly from the majority of the data.

The system may include functionality to analyze the efficiency of different third-party tools based on the frequency and nature of updates flowing through the integration. This analysis employs data mining techniques to extract usage patterns and performance metrics for each connected tool. The system utilizes these insights to generate comprehensive reports on tool usage and effectiveness. These reports may include visualizations of data flow between systems, metrics on data quality and timeliness, and recommendations for optimizing the tool ecosystem. By providing this strategic insight, the system supports informed decision-making in IT strategy and tool selection, helping organizations to maximize the value of their software investments and streamline their project management processes.

The above embodiments provide advantages in the field of project management and cross-platform data synchronization. By ensuring real-time data synchronization, the system significantly reduces manual data entry and the risk of human error in updating project statuses. This constant reflection of the most up-to-date information from various third-party tools and services leads to improved decision-making capabilities. Stakeholders benefit from a more accurate and comprehensive view of project status across multiple platforms, enabling faster and more informed decision-making based on real-time, cross-platform data.

The above embodiments also contribute to increased productivity by reducing the time spent on manual status updates and cross-referencing information from different tools. This allows team members to focus on their core tasks rather than administrative updates. Furthermore, the system enhances collaboration by facilitating better communication between team members using different tools and platforms. By providing a single source of truth for project status, it reduces miscommunication and confusion among team members.

One of the key features of the above embodiments is its capability for proactive issue management. The early detection of deviations between planned tasks and actual progress can enable proactive problem-solving before issues escalate. This preemptive approach to project management can significantly reduce the impact of potential setbacks.

The use of machine learning makes it both customizable and scalable. It can adapt to specific organizational workflows and improve over time, and can be scaled to handle multiple projects and large organizations with complex tool ecosystems. This adaptability ensures that the system remains effective as an organization grows and evolves. By providing a comprehensive project overview without the need to constantly switch between multiple tools, the system reduces the cognitive load on team members. This streamlined approach to information access and management can lead to improved focus and efficiency.

In another exemplary embodiment of the presently disclosed subject matter, the system incorporates an AI module capable of establishing dynamic connections with external components through APIs. This module is designed to handle complex communication scenarios, even with previously unknown external systems.

The AI module can be configured to receive a set of data and rules governing specific communication actions. It can also accept user input that defines the intended type of communication between a first component (within the system) and an external component of a software service such as 255. This communication can be unidirectional or bidirectional, depending on the user's needs.

Upon receiving this information, the AI module can be configured to initiate a self-training session. During this process, the AI module can analyze the provided data and rules, examines relevant web resources, and reviews past usage patterns within the application. The goal is to generate a model that can deduce how to translate the user's intention into a suitable form that aligns with the communication rules and data, while fulfilling the user's requirements.

The self-training session may involve analyzing the user's input to understand the desired type of communication, examining the communication data and rules to determine which rules should be applied and/or creating and storing a conversion index that maps between the communication rules and data of the first component and those of the external component.

Once the index is prepared, the AI module tests may test, makes any necessary corrections, and establishes the connection.

In cases where the volume of communication data and rules exceeds the capacity of a generative AI engine, the AI module employs a novel approach. It converts the communication data and rules into a list of known API query examples (such as in GraphQL). Each example may encapsulate several rules. This converted set serves as a learning dictionary for the AI module.

The process for handling complex API interactions involves retrieving valid API queries associated with the first component, extracting a comprehensive description for each query, converting the query description into a storable format (such as a vector), and storing the description in the storable format along with the associated query as metadata in a repository (the dictionary, such as vectorDB).

When a new connection needs to be established, the AI module analyzes the user input and transforms it into the storable format, optionally searches for similarities in the learning dictionary, and uses the closest results as templates for interacting with the generative AI engine to construct a valid API query.

This approach allows the system to dynamically adapt to new external components and complex API structures, significantly enhancing its interoperability and flexibility.

Optionally, after an API connection is established, a context-aware diagnostic AI Generative AI agent may be executed. This generative AI agent is designed to provide intelligent, context-sensitive diagnostics and problem-solving across the integrated SaaS ecosystem.

The Context-Aware Diagnostic AI Generative AI agent leverages the system's comprehensive understanding of the interconnected platforms to offer nuanced, situational awareness in its diagnostic processes. This generative AI agent may analyze issues across multiple integrated platforms, understanding how problems in one system might affect or be affected by conditions in another. Optionally, by accessing historical data from connected services 255, the generative AI agent can identify recurring issues or potential root causes that might not be apparent when looking at a single platform in isolation.

Optionally, using machine learning algorithms, the generative AI agent can be configured to predict potential issues before they occur, based on patterns and conditions across the integrated ecosystem. When issues are identified, the generative AI agent may automatically route tickets to the most appropriate team or individual, taking into account the cross-platform nature of the problem.

For end-users, the generative AI agent may provide step-by-step guidance for resolving issues, dynamically adjusting its instructions based on the user's actions and the real-time state of the affected systems.

Users may interact with the generative AI agent using natural language, describing their issues in their own words. The generative AI agent can use advanced NLP to understand the context and intent behind user queries.

Optionally, beyond responding to user-reported issues, the generative AI agent can be configured to actively monitor system health across all integrated platforms, alerting administrators to potential problems before they impact end-users.

This Context-Aware Diagnostic AI Generative AI agent represents a significant advancement in IT support and system maintenance for complex, multi-platform environments. By providing intelligent, context-sensitive diagnostics and solutions, it reduces downtime, improves user satisfaction, and allows IT teams to focus on more strategic initiatives rather than routine troubleshooting.

Figure 14:
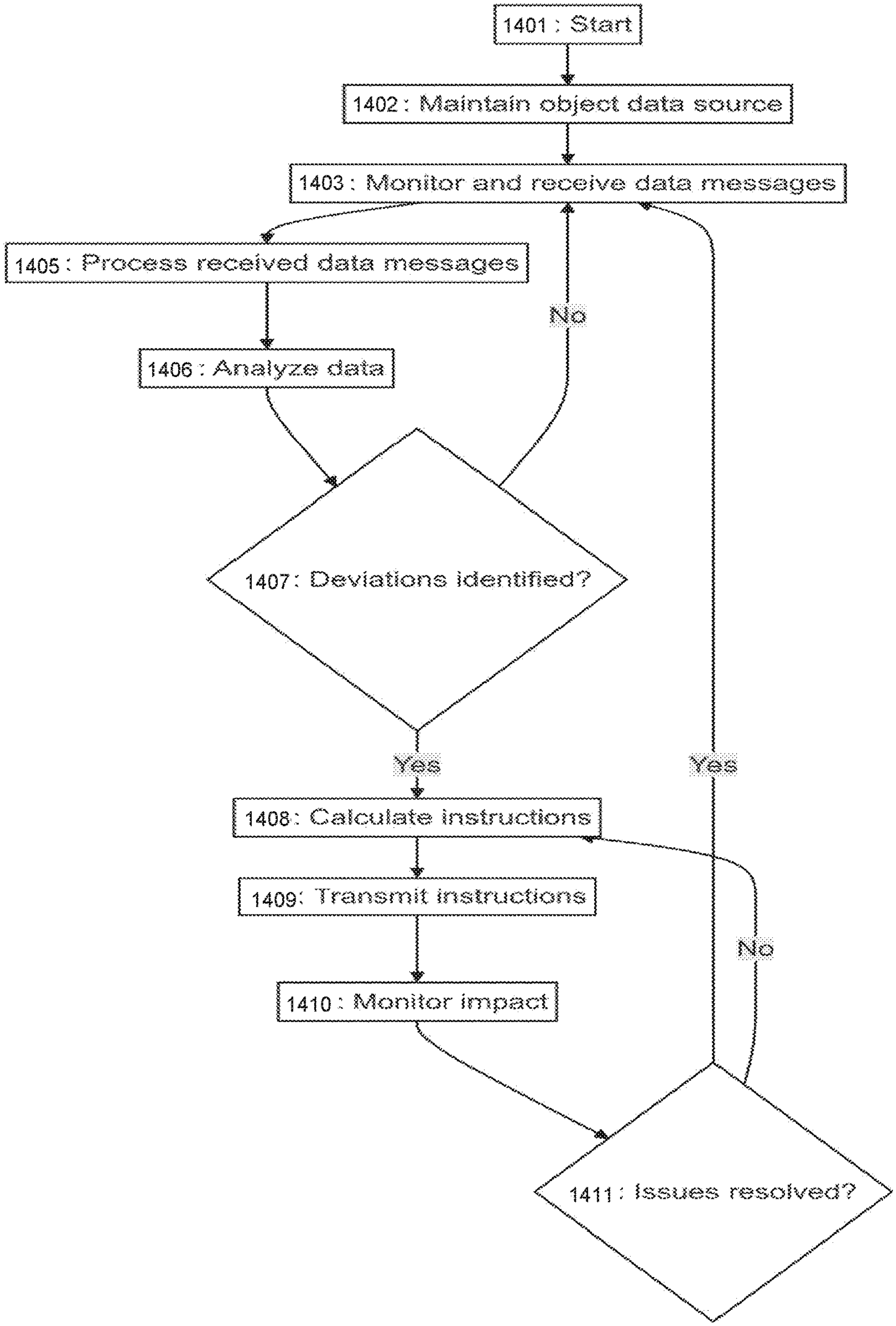
FIG. 14 is a flowchart depicting a process for managing software services and coordinating actions across multiple platforms, consistent with some embodiments of the present disclosure.

Reference is also made to FIG. 14 is a flowchart depicting a process implemented by the claimed system for managing software services 255 and coordinating actions across multiple platforms, according to some embodiments of the present disclosure. The flowchart is implemented using a SaaS platform, such as the system depicted in FIG. 12, according to some embodiments of the present disclosure, for instance using correlation environment 1200.

As shown at 1401, the process is initiated by maintaining an object data source (reference numeral 1402) containing multiple data objects linked to one or more boards assigned to a project. These boards indicate a plurality of task statuses for multiple tasks assigned to one or more users who have credentials to access the boards.

Herein is an exemplary implementation of the correlation environment 1200 and/or the SaaS platform 100 described with reference to any of the figures herein, for instance with reference to FIG. 13 or FIG. 14. The correlation environment 1200 and/or the SaaS platform 100 may maintain an object data source using a distributed database architecture, such as Apache Cassandra or MongoDB, to ensure high availability and scalability. This database stores multiple data objects, each representing a task, user, or project element, linked to one or more boards within the project management platform. The boards are implemented as dynamic, real-time collaborative interfaces, utilizing WebSocket technology for instant updates across all connected clients. Task statuses are stored as enumerated values within the data objects, allowing for efficient querying and indexing.

In some embodiments, the generative AI model utilizes a transformer-based architecture, specifically a variant of the GPT (Generative Pre-trained Transformer) model. The model comprises an encoder-decoder structure with multi-head attention mechanisms. The encoder consists of N identical layers, each containing two sub-layers: a multi-head self-attention mechanism and a position-wise fully connected feed-forward network. The decoder may be also composed of N identical layers, incorporating an additional sub-layer that performs multi-head attention over the output of the encoder stack.

The model may be pre-trained on a diverse corpus of SaaS platform data, including but not limited to: project management boards, task descriptions, user interactions, and cross-platform workflows. The pre-training process utilizes a masked language modeling objective, where the model learns to predict randomly masked tokens in the input sequence.

The model may be fine-tuned for specific SaaS integration tasks using a dataset curated from historical cross-platform interactions, workflow patterns, and user behaviors. This fine-tuning process employs a combination of supervised learning on labelled data and reinforcement learning to optimize for task-specific objectives.

The deployment of the model utilizes a distributed inference architecture to ensure low-latency responses. This architecture may comprise:

1. A load balancer to distribute incoming requests.
2. Multiple inference servers, each hosting an instance of the fine-tuned model.
3. A caching layer to store frequently accessed results and reduce computation overhead.
4. A monitoring system to track model performance and trigger retraining when necessary.

Reference is now made again to FIG. 14. As shown at 1403, correlation environment 1200 continuously monitors and receives multiple data messages from a plurality of software services connected to a network (reference numeral 1404). These software services manage multiple software processes that are executed independently from the one or more boards with regard to the project.

The correlation environment 1200 may be designed to integrate with a diverse ecosystem of software services, encompassing collaborative platforms (e.g., Slack, Microsoft Teams), project management tools (e.g., Jira, Trello), communication systems (e.g., Email, VoIP), and productivity applications (e.g., Google Workspace, Microsoft Office) with the SaaS platform 100. This wide-ranging integration may be facilitated through a modular architecture with service-specific adapters, allowing for easy expansion to new platforms and services as they emerge in the market.

To facilitate communication with the external software services, the environment 1200 can implement a robust API gateway using technologies such as Kong or AWS API Gateway, which handle authentication, rate limiting, and protocol translation, supporting both REST and GraphQL interfaces. The environment 1200 receives data messages from these services through webhook endpoints, which are automatically scaled using a serverless architecture like AWS Lambda or Google Cloud Functions to handle varying loads.

As shown at 1405, correlation environment 1200 processes the received data messages, extracting relevant information. At least some of these data messages indicate a plurality of process statuses of at least some of the multiple software processes managed by the third-party applications.

As shown at 1406 correlation environment 1200 analyses the data from the received messages in conjunction with the data objects maintained in the object data source. This analysis may be performed to identify one or more deviations between the plurality of task statuses recorded in the environment 1200's boards and the plurality of process statuses reported by the third-party software services.

The analysis of data messages and internal data objects may be performed using a combination of stream processing and batch processing techniques. Apache Kafka may be employed for real-time message ingestion and processing, while Apache Spark may be utilized for more complex, batch-oriented analyses. This hybrid approach allows the environment 1200 to identify deviations quickly while still supporting deep, historical analysis when required.

Changes in the boards may be monitored using an event sourcing pattern, where each modification may be recorded as an immutable event in an event store. This approach not only provides a complete audit trail but also enables the environment 1200 to replay events for analysis or to reconstruct the state of the board at any point in time. A separate service, implemented using a microservices architecture, may be responsible for processing these events and identifying changes relevant to external software services. Deviations might be as exemplified above and may be identified as explained above.

As shown at 1407 when deviations are identified, the process proceeds to step 1408. When no deviations are found, the environment 1200 returns to step 1403 to continue monitoring incoming data messages.

As shown at 1408, based on the identified deviations, correlation environment 1200 calculates instructions for at least some of the multiple software processes. These instructions are designed to address the deviations and bring the third-party processes back in line with the project status as reflected in the boards.

Examples of instructions that the correlation environment 1200 might calculate to address the deviations mentioned earlier. For example, here are some examples based on the previously identified deviations:

For the Task Status Mismatch: Instruction: "Update task status in third-party project management tool from 'In Progress' to 'Completed' for Task ID: T1234. Verify completion criteria and sync task metadata."

For the Deadline Discrepancy: Instruction: "Adjust task deadline in integrated calendar application from June 20th to June 15th for Task ID: T5678. Update all associated milestones and notify team members of the revised timeline."

For the Resource Allocation Conflict: Instruction: "Reassign Task ID: T9012 from John Doe to available team member Jane Smith. Update resource allocation in HR management system to reflect John Doe's leave status from June 1st to June 7th. Trigger workflow to notify project manager of resource change."

For the Budget Variance: Instruction: "Reconcile budget discrepancy in connected accounting software. Increase recorded budget from $50,000 to $55,000 for Project ID: P3456. Flag for financial review and update all related financial forecasts and reports."

For the Scope Change: Instruction: "Revert feature status in requirements management tool from 'Under Review' to 'Approved' for Feature ID: F7890. Sync feature description and acceptance criteria between platforms. Notify product owner and development team of status confirmation."

These instructions are designed to be actionable by the respective third-party software processes, bringing them into alignment with the status reflected in the SaaS platform's boards. Each instruction includes specific actions to be taken, relevant identifiers (e.g., Task ID, Project ID), and may also include additional steps such as notifications or secondary updates to ensure comprehensive synchronization across the integrated systems.

The correlation environment 1200 would transmit these instructions to the appropriate software services, potentially using APIs or other integration methods supported by each third-party service. The execution of these instructions would then be monitored to ensure the deviations are successfully resolved and the systems are brought back into alignment.

As shown at 1409, correlation environment 1200 transmits the calculated instructions to at least some of the plurality of software services. This transmission may occur through various channels, such as APIs, webhooks, or other integration methods supported by the third-party services. Instructions for external software processes may be calculated using business rules and/or machine learning models such as the generative AI model described above. These models, implemented using frameworks such as TensorFlow or PyTorch, are trained on historical data to predict the most effective actions based on the current context.

The transmission of instructions, notifications, and action requests to external software services may be managed by a message broker system, such as RabbitMQ or Apache Pulsar. To initiate actions within the user interfaces of external software services, the environment 1200 may leverage each service's API or SDK. For services that support it, the environment 1200 uses OAuth 2.0 for secure, delegated access. Custom middleware may be developed for each supported service to translate the environment 1200's generic instruction format into service-specific API calls or user interface updates.

Optionally, the correlation environment 1200 maintains a bidirectional mapping between tasks in its boards and corresponding processes or activities in external software services. This mapping may be stored in a graph database, such as Neo4j, which allows for efficient traversal and querying of complex relationships. The mapping may be continuously updated based on user actions and system events, ensuring it remains accurate over time.

Machine learning algorithms, particularly ensemble methods combining gradient boosting machines and neural networks, may be employed to predict the impact of changes. These models are trained on historical data including user interactions, task completions, and project outcomes. The training process may be automated and scheduled to run periodically, ensuring the models remain up-to-date with the latest patterns and trends.

As shown at 1410 correlation environment 1200 may monitor the impact of the transmitted instructions, waiting for feedback or confirmation from the third-party services. As shown at 1411 when the deviations have been successfully addressed, the process may return to step 1403 for continued monitoring. When issues persist, the environment 1200 may return to step 1408 to recalculate and retransmit instructions as necessary.

In some cases, the instructions calculation process 1408 incorporates a dependency analysis mechanism. When calculating instructions, the environment 1200 can be configured to evaluate the interdependencies between various software processes managed by different third-party applications. It can identify sub-processes that are contingent upon the status of tasks in other processes. Using a graph-based representation of these dependencies, the environment 1200 determines the optimal sequence of sub-process executions. This approach ensures that instructions are generated not in isolation, but with a holistic view of the project's interconnected workflows, thereby maintaining consistency and efficiency across all integrated platforms.

The analysis of data messages and data objects can be performed using an advanced machine learning model. This model employs a hybrid architecture combining convolutional neural networks (CNNs) for feature extraction from structured data and long short-term memory (LSTM) networks for capturing temporal dependencies in task progressions. The model may be implemented using a distributed machine learning framework, allowing for scalable processing of large volumes of data across multiple nodes. Real-time inference may be facilitated through model deployment on specialized hardware accelerators, ensuring rapid analysis and decision-making.

The machine learning model may undergo a training process utilizing a rich dataset of historical project information. This dataset encompasses historical data objects linked to past project boards, including task statuses, user assignments, and project outcomes. Additionally, it incorporates historical data messages from the integrated software services, providing a comprehensive view of how external processes interacted with and influenced past projects. The training process employs transfer learning techniques, allowing the model to leverage knowledge gained from diverse projects and adapt it to new, domain-specific scenarios. Regularization methods such as dropout and L2 regularization are applied to prevent overfitting and ensure generalizability.

A generative AI agent may be used for transmitting instructions to the integrated software services. This agent may be equipped with credentials to access the environment 1200's boards and possesses a deep understanding of the project context. Utilizing natural language processing and generation techniques, the agent formulates instructions that are contextually appropriate and aligned with the specific terminology and workflows of each target software service. The agent employs reinforcement learning to continuously improve its communication effectiveness based on the responses and outcomes observed from previous interactions.

To facilitate seamless interaction with third-party software services, the environment 1200 may deploy generative AI agents that are registered as users within these services. These agents utilize advanced natural language understanding and generation capabilities to interpret and respond to communications within the context of each service. By operating as native users, the agents can access and interact with service-specific features and data, providing a bridge between the central system and the distributed ecosystem of tools used in the project. The generative AI agents registered in third-party software services may be configured with specific credentials and permissions tailored to their roles within those services. These permissions are managed through a centralized identity and access management system, ensuring that each agent has the necessary access to perform its functions while adhering to security and compliance requirements. The environment 1200 employs role-based access control (RBAC) and attribute-based access control (ABAC) mechanisms to dynamically adjust agent permissions based on the evolving needs of the project and organizational policies.

The generative AI agent may be adapted for transmitting instructions incorporating a natural language generation (NLG) module. This module can be trained on a diverse corpus of service-specific documentation, API specifications, and historical interaction logs. Using this knowledge, the agent dynamically formulates instructions in formats and terminologies that are natively compatible with each receiving software service. The NLG process employs context-aware template generation and slot-filling techniques, ensuring that the generated instructions are not only syntactically correct but also semantically aligned with the target service's conventions and workflows.

The machine learning model may undergo periodic updates through a continuous learning pipeline. This pipeline ingests data on the outcomes of previously calculated instructions, including their effectiveness in resolving deviations and any subsequent adjustments made by users. The update process employs online learning techniques, allowing the model to adapt to changing project dynamics and emerging patterns in real-time. A version control system for machine learning models may be implemented, enabling easy rollback in case of performance degradation and facilitating A/B testing of model improvements.

To accommodate the diverse landscape of software service platforms, the environment 1200 may implement an adaptive communication protocol framework. This framework dynamically selects and configures the appropriate communication protocols based on the specific requirements and capabilities of each integrated service. It supports a wide range of protocols including REST, GraphQL, gRPC, and WebSocket, as well as legacy protocols for older systems. The framework employs protocol buffers for efficient data serialization and includes built-in mechanisms for handling rate limiting, retries, and error recovery, ensuring robust and reliable communication across all integrated platforms.

Throughout this process, the environment 1200 maintains a continuous feedback loop, ensuring that the project status reflected in its boards remains synchronized with the actual progress of tasks across various third-party applications. This approach allows for real-time coordination and prompt addressing of any discrepancies that may arise during the project lifecycle.

Optionally, this process may be executed in parallel to the process depicted in FIG. 13, executing a feedback loop wherein when a deviation between boards which indicate task statuses for multiple tasks assigned to users with credentials to access the boards documenting project data in the SaaS platform 100 and statues of third party applications may be detected, instructions for the third party applications are calculated and send to the third party applications, aiming to nullify or decrease the deviation.

In some embodiments, the AI agent can be configured to reside as an app on the user's browser. This configuration allows the AI agent to gain access to all the information shown to the user that may be relevant to the platform. By operating at the browser level, the AI agent can observe and analyze user interactions, screen content, and data flow in real-time, providing a more comprehensive understanding of the user's context and needs within the SaaS platform. Furthermore, the AI agent can be designed to utilize the mouse and keyboard, and provide instructions to the browser to apply commands controlling them, instead of or in addition to using API requests. This capability allows the AI agent to interact with the SaaS platform and third-party applications in a manner that closely mimics human user behavior. For example, the AI agent may:

1. Move the cursor and click on specific elements to navigate through the interface.
2. Input text into forms or fields using virtual keyboard commands.
3. Scroll through pages or drag-and-drop elements as needed.
4. Interact with dropdown menus, checkboxes, and other UI components.

This approach provides several advantages:

1. It allows the AI agent to operate in scenarios where API access is limited or unavailable.
2. It can interact with legacy systems or applications that don't have modern API interfaces.
3. It can perform actions that closely replicate human user workflows, potentially uncovering usability issues or inefficiencies in the process.

By combining browser-level access with the ability to control mouse and keyboard inputs, the AI agent can execute complex sequences of actions across multiple applications and interfaces, further enhancing its capability to detect, analyze, and resolve deviations in real-time.

The above embodiments provide advantages in the field of project management and cross-platform software integration, addressing critical challenges faced by modern organizations in coordinating complex, multi-faceted projects across diverse digital ecosystems. One significant benefit is its ability to maintain real-time synchronization between a centralized project management platform and multiple third-party software services. This synchronization substantially reduces the risk of data inconsistencies and miscommunications that often plague projects involving multiple tools and teams. By automatically identifying and reconciling deviations between task statuses and process statuses across different platforms, the environment 1200 ensures that all stakeholders are working with the most up-to-date and accurate project information at all times.

The use of advanced machine learning models for data analysis and instruction calculation provides a level of intelligent decision-making that surpasses traditional rule-based systems. This AI-driven approach allows for more nuanced and context-aware management of complex project workflows, adapting to the unique characteristics and requirements of each project. The environment 1200's ability to learn from historical data and continuously improve its performance over time ensures that it becomes increasingly effective and efficient in managing projects as it accumulates more operational experience.

Another key advantage of the disclosed subject matter may be its proactive approach to project management. By calculating and transmitting instructions to third-party software services based on identified deviations, the environment 1200 can preemptively address potential issues before they escalate into significant problems. This proactive stance helps to minimize project delays, reduce resource wastage, and maintain overall project momentum.

The environment 1200's use of generative AI agents for interacting with third-party software services represents a significant leap forward in inter-application communication. These agents, capable of formulating contextually appropriate instructions and adapting to the specific requirements of each software service, enable a level of seamless integration that was previously unattainable. This approach not only enhances the efficiency of cross-platform operations but also reduces the need for manual intervention in routine coordination tasks.

Furthermore, the disclosure's flexible and extensible architecture, capable of integrating with a wide range of software services, provides organizations with unprecedented versatility in their choice of project management tools. This flexibility allows businesses to leverage their existing software investments while still benefiting from centralized project coordination and oversight.

In one exemplary embodiment of the present disclosure, the system may be configured to initiate a cascade of operations across multiple integrated third-party applications in response to a status change within the SaaS platform. This functionality demonstrates the system's capability to orchestrate complex, cross-platform workflows while maintaining centralized control.

For instance, the system may be programmed to recognize a status change of a software development project from "Planning" to "In Development" within the SaaS platform as a trigger event. Upon detection of this trigger event, the system may execute the following sequence of operations:

1. The system may interface with a version control service, such as GitHub, via its API. It may programmatically initiate the creation of a new development branch specific to the project. Concurrently, it may configure branch protection rules according to predefined security protocols. The system may further instantiate a project board within the version control service, populated with tasks extracted from the SaaS platform's project data.
2. Simultaneously, the system may interact with a CI/CD service, exemplified by Jenkins. Through this interface, the system may automatically configure a new pipeline tailored to the project requirements. This configuration may include setting up automated build processes, implementing test protocols, and preparing staging environments for subsequent deployments.
3. The system may also engage with a team communication platform, such as Slack. It may programmatically generate a new channel dedicated to the development team. An automated message announcing the project's commencement may be dispatched through this channel. Additionally, the system may configure integrations to facilitate the relay of notifications from the version control and CI/CD services to this communication platform.
4. Furthermore, the system may interface with a documentation platform, exemplified by Confluence. It may automatically generate a template for technical specifications based on predefined standards. The system may create a designated space for sprint planning documents and configure access permissions for the development team members, as extracted from the SaaS platform's user data.

This exemplary embodiment illustrates the system's capacity to translate a single status change within the SaaS platform into a comprehensive series of actions across multiple third-party applications. This functionality serves to streamline project initiation processes, ensure consistency across diverse platforms, and significantly reduce the time required to transition from project planning to active development.

Figure 15:
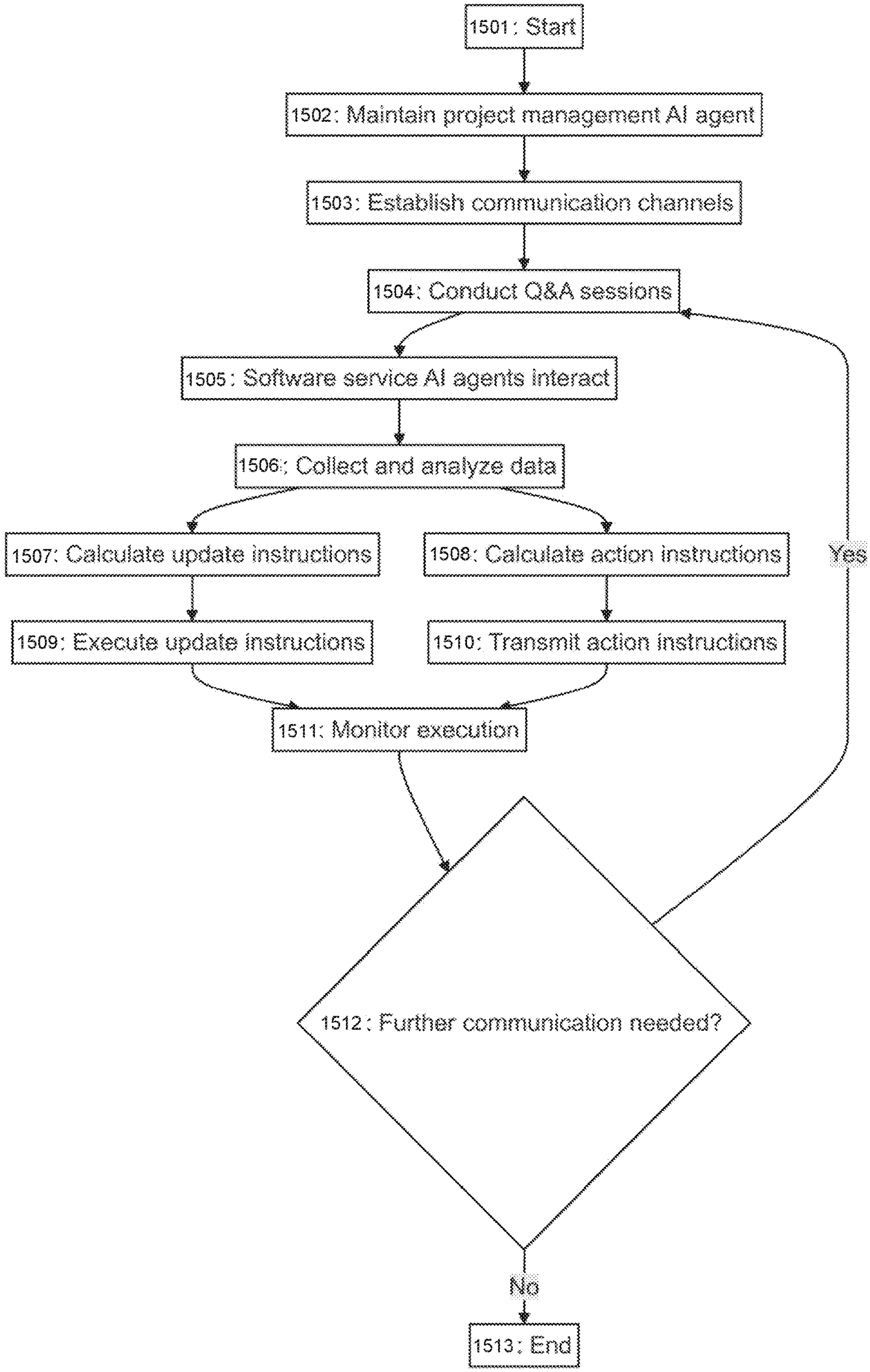
FIG. 15 is a flowchart depicting a process for managing communication between services and a project management software platform using AI agents, consistent with some embodiments of the present disclosure.

Reference is also made to FIG. 15 which is a flowchart depicting a process for managing communication between services (255) and a project management software platform (100) using AI agents according to some embodiments of the present disclosure. The flowchart is implemented using a SaaS platform, such as the environment 1200 depicted in FIG. 12, according to some embodiments of the present disclosure, for instance using correlation environment 1200.

As shown at 1501, the process begins with the initialization of the environment 1200, including the project management software platform (100) and the connected services (255).

As shown at 1502, a project management software platform AI agent is maintained. This agent is designed to interact with alphanumeric data stored in multiple data objects within the platform (100). The agent utilizes natural language processing and machine learning algorithms to understand and manipulate the data effectively.

As shown at 1503 text-based communication channels are established between the project management software platform AI agent and multiple software service AI agents. These channels serve as the primary means of information exchange between the platform and the various connected services.

As shown at 1504 question-and-answer sessions on the established text-based communication channels are established. These sessions involve the project management software platform AI agent and one or more of the multiple software service AI agents. Natural language processing (NLP) may be used for facilitating the question-and-answer sessions between the project management software platform AI agent and the software service AI agents. The environment 1200 may employs NLP techniques, including contextual word embeddings and sentiment analysis, to ensure nuanced understanding and generation of responses. This allows for more natural, context-aware communication between the AI agents, enhancing the quality and efficiency of information exchange. When transmitting action instructions to software services, the project management software platform AI agent may employ a natural language generation (NLG) module. This module dynamically formulates instructions in formats and terminologies that may be natively compatible with each receiving software service. It utilizes a combination of template-based generation and neural text generation models, ensuring that the instructions may be not only syntactically correct but also semantically aligned with the target service's conventions and workflows.

The initiation of question-and-answer sessions may be governed by an intelligent trigger module. This module monitors both the project management boards and the software processes for predefined events or conditions that warrant communication. These triggers can be based on various factors such as task status changes, approaching deadlines, resource allocation conflicts, or anomalous patterns detected by the AI agents. The trigger system employs a combination of rule-based logic and machine learning-based predictive models to determine when to initiate sessions, ensuring timely and relevant communications while avoiding unnecessary interactions.

As shown at 1505, during these sessions, the software service AI agents interact with their respective software services (255). These services manage multiple software processes and operate independently from the project management boards within platform (100).

As shown at 1506, data generated from the question-and-answer sessions is collected and analyzed. This analysis involves natural language understanding and information extraction techniques to derive meaningful insights from the conversations.

As shown at 1507, based on the analyzed data, update instructions for the project management boards within platform (100) are calculated. These instructions may be designed to reflect the latest information and status updates obtained from the software service AI agents.

As shown at 1508, optionally simultaneously with step 1507, or as an alternative depending on the analysis results, the environment 1200 calculates action instructions for the software processes managed by the services (255). These instructions are formulated to align the external processes with the overall project goals and timelines.

As shown at 1509 the calculated update instructions may be executed on the project management boards within platform (100). This may involve modifying task statuses, updating timelines, or adjusting resource allocations.

As shown at 1510, the action instructions are transmitted over a network to the respective software services (255). This transmission is carried out securely, ensuring that each service receives only the instructions relevant to its processes.

Optionally, as shown at 1511 the execution of both the update instructions and the action instructions are monitored, allowing collecting feedback on their implementation and effectiveness. Based on the feedback and ongoing project needs, the environment 1200 determines if further communication is required. If so, the process returns to step 1504 to initiate new question-and-answer sessions. If not, the process concludes. This process ensures continuous, AI-driven communication and synchronization between the project management software platform (100) and the various connected services (255), enabling efficient and coordinated project management across multiple software environments.

The process depicted in FIG. 15 can be expanded to encompass the concept of AI agents communicating directly to create dynamic, live integrations between applications. This approach represents a significant advancement over traditional, static API integrations. Optionally, the question-and-answer sessions is a direct AI-to-AI communication channel between the project management software platform AI agent and a selected software service AI agent. This channel may be established using a secure, low-latency protocol optimized for AI agent interactions. The AI agents may engage in a dynamic dialogue to understand each other's capabilities, data structures, and operational parameters. This dialogue utilizes advanced natural language processing and semantic understanding algorithms to facilitate mutual comprehension between potentially disparate systems. Based on the initial dialogue, the AI agents may collaboratively design a temporary, context-specific API structure. This structure is not predefined or role-based, but rather dynamically generated to suit the immediate integration needs identified by both AI agents. The AI agents may implement the dynamically generated API structure in real-time, establishing a live, two-way synchronization channel between their respective platforms. This implementation involves on-the-fly code generation and deployment within secure sandboxes in each system. As the integration operates, both AI agents may continuously monitor its performance and effectiveness. They analyze data flow patterns, latency, and the relevance of exchanged information to the current project context. The AI agents may engage in periodic reassessment dialogues, evaluating the current integration structure against evolving project needs and system states. These dialogues may be triggered by significant events, detected inefficiencies, or regular intervals. Based on the reassessment, the AI agents may collaboratively refine and upgrade the integration structure. This may involve modifying data exchange formats, adjusting synchronization frequencies, or completely redesigning aspects of the API to better serve current requirements.

Optionally, the project management software platform AI agent employs a sophisticated machine learning model to interact with alphanumeric data and conduct question-and-answer sessions. This model, built on a deep neural network architecture, combines natural language processing capabilities with domain-specific knowledge of project management concepts. It utilizes attention mechanisms and transformer architectures to effectively parse and generate contextually relevant responses, ensuring meaningful interactions with both the stored data and the software service AI agents.

Optionally, this machine learning model undergoes extensive training using a rich dataset comprising historical project information. This dataset includes historical data objects linked to past project boards, encompassing task statuses, user assignments, and project outcomes. Additionally, it incorporates logs of past question-and-answer sessions between the platform AI agent and various software service AI agents, providing insights into the nature and resolution of historical software process queries. The training process employs transfer learning techniques, allowing the model to leverage knowledge gained from diverse projects and adapt it to new, domain-specific scenarios.

Optionally, the correlation environment 1200 is designed to integrate with a wide array of software services commonly used in professional environments. These include collaborative platforms (e.g., Slack, Microsoft Teams), project management tools (e.g., Jira, Trello), communication systems (e.g., Email, VoIP), and productivity applications (e.g., Google Workspace, Microsoft Office). This comprehensive integration is facilitated through a modular architecture with service-specific adapters, allowing for easy expansion to new platforms and services as they emerge in the market. To ensure secure and authorized access, the software service AI agents may be registered as users within their respective software services 255, 100, complete with specific credentials and permissions. These agents utilize advanced authentication protocols, such as OAuth 2.0, to maintain secure sessions. Their permissions may be managed through a centralized identity and access management system, employing role-based access control (RBAC) and attribute-based access control (ABAC) mechanisms to dynamically adjust agent permissions based on the evolving needs of the project and organizational policies.

The calculation of update instructions and action instructions may be performed using a specialized machine learning model. This model employs advanced analytics techniques, including time series analysis and anomaly detection algorithms, to identify patterns and discrepancies between project management board data and software process data. It utilizes ensemble methods, combining multiple algorithms such as random forests and gradient boosting machines, to ensure robust and accurate instruction generation.

The correlation environment 1200 may maintain a comprehensive log of all question-and-answer sessions, calculated instructions, and their outcomes. This log is implemented using a blockchain-inspired append-only data structure, ensuring the immutability and traceability of all recorded events. Each log entry is timestamped and cryptographically signed, providing a tamper-evident record of system actions. This logged data serves dual purposes: it provides a detailed audit trail for compliance and review, and it forms a valuable dataset for continuous improvement of the AI models through reinforcement learning techniques.

The project management software platform AI agent may undergo periodic updates through a continuous learning pipeline. This pipeline ingests data on the outcomes of previously calculated instructions and executed actions, including their effectiveness in resolving issues and any subsequent adjustments made by users. The update process employs online learning techniques, allowing the agent to adapt to changing project dynamics and emerging patterns in real-time. A version control system for AI models is implemented, enabling easy rollback in case of performance degradation and facilitating A/B testing of improvements.

The process depicted in FIG. 15 replaces static, predefined APIs with dynamic, AI-driven communication channels. The ability of AI agents to establish, maintain, and continuously optimize integrations in real-time provides unprecedented flexibility and efficiency. This approach drastically reduces the time and resources typically required for traditional API development and maintenance, allowing systems to adapt swiftly to changing project requirements and technological landscapes. Moreover, by employing AI agents to conduct ongoing question-and-answer sessions, the environment 1200 ensures a high level of data synchronization across diverse platforms. This real-time, intelligent synchronization significantly reduces data inconsistencies and latencies that often plague multi-platform projects. The result is a more coherent and up-to-date project ecosystem, minimizing errors and improving decision-making capabilities. Also, the ability to analyze patterns and discrepancies between project management board data and software process data allows for more intelligent workload distribution. By identifying bottlenecks or underutilized resources across different platforms, the AI agent can suggest or automatically implement optimizations, leading to improved resource allocation and project efficiency. For example, an AI agent of a management platform such as Monday.com interacts with a co-pilot style AI agent writing code. This interaction could involve the Monday.com AI agent communicating project requirements, deadlines, and specific coding tasks to the co-pilot AI. The co-pilot AI, integrated with an IDE or code repository, could then generate code snippets, suggest optimizations, or even complete entire modules based on the project specifications provided. As development progresses, the co-pilot AI could report back to the Monday.com agent about completion status, potential roadblocks, or areas where additional clarification is needed. This bi-directional communication allows for real-time updates to project timelines and resource allocation within Monday.com. If the co-pilot AI identifies a particularly challenging coding task, it could prompt the Monday.com agent to allocate additional time or resources to that specific part of the project. Moreover, this integration could extend to code review processes. The co-pilot AI could analyze code quality and adherence to project standards, reporting its findings back to the Monday.com agent. This could then trigger automated updates to the project status, creation of code review tasks, or notifications to relevant team members, all without manual intervention.

Figure 16:
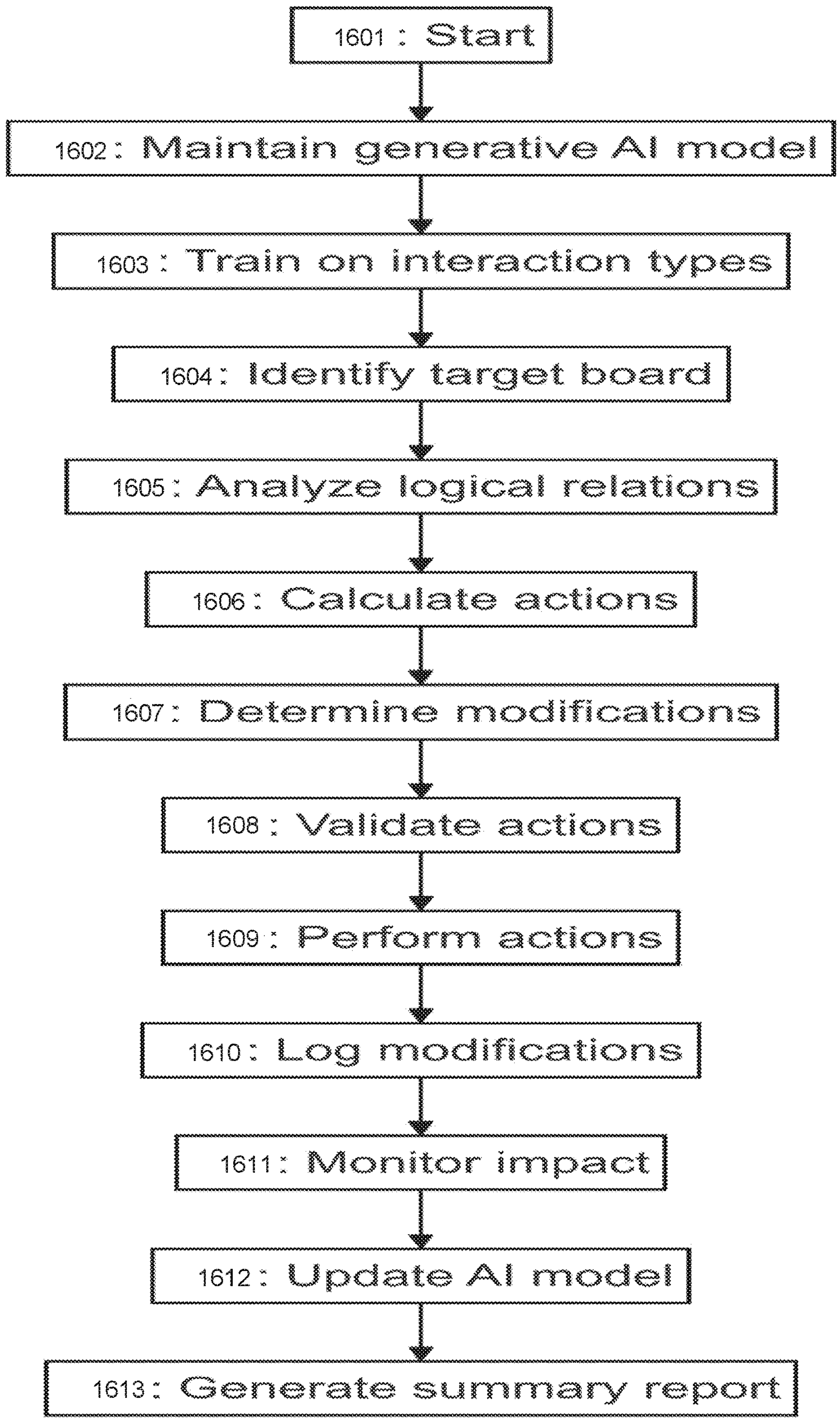
FIG. 16 is a flowchart depicting a process for using generative artificial intelligence for intent-based interaction within a project management system, consistent with some embodiments of the present disclosure.

Reference is also made to FIG. 16 which is a flowchart depicting a process for using generative artificial intelligence for intent-based interaction within a project management system according to some embodiments of the present disclosure. The flowchart is implemented using a SaaS platform, such as the system depicted in FIG. 12, according to some embodiments of the present disclosure, for instance using correlation environment 1200. As used herein an intent based interaction is a method of human-computer interaction where the system receives a user's input describing a goal to be achieved without specifying exactly and entirely how the process to achieve the goal should be implemented, and attempts to understand and act upon the user's intentions rather than just their literal commands.

As shown at 1601, the process begins with the initialization of, including the loading of, the generative artificial intelligence (AI) model.

As shown at 1602, a generative AI model that has been trained on multiple interactions of various users with alphanumeric data is maintained. This data is stored in a plurality of items representing the alphanumeric data across different boards within the environment 1200. Optionally, the generative AI model's training process includes exposure to a curated dataset of board organizations and data management strategies identified as best practices. These best practices may be codified into the model using reinforcement learning techniques, allowing the AI to recognize and promote optimal board structures and data handling methods.

As shown at 1603, the training data for the AI model focuses on the types of actions performed on the data, such as creating, editing, moving, or deleting items, without including the actual content of the data. This approach ensures privacy and allows the model to learn general interaction patterns.

As shown at 1604, a target board for analysis is identified. This could be triggered by various events such as user access, scheduled reviews, or system-detected anomalies.

As shown at 1605, the generative AI model performs an in-depth analysis of the logical relations between the items in the target board. This analysis considers factors such as item placement, connections, dependencies, and metadata. The analysis may include a deep examination of user inputs provided to edit or update data within the target board. This involves parsing user interaction logs, analyzing the frequency and nature of edits, and identifying patterns in data manipulation across different users and roles. Natural language processing techniques may be applied to understand the context and intent behind user inputs, allowing the environment 1200 to infer user goals and preferences.

Optionally, the environment 1200 conducts an analysis of user interaction logs using machine learning algorithms specialized in pattern recognition. These algorithms identify recurring sequences of actions that indicate repetitive tasks. The environment 1200 quantifies the frequency and complexity of these tasks to assess their potential for automation.

Optionally, the AI model incorporates a set of predefined heuristics and learned patterns to detect instances of suboptimal use of platform elements within the target board. This includes identifying underutilized features, inefficient data structures, or redundant processes.

Optionally, the analysis of logical relations employs graph theory algorithms to map out item dependencies within the board. The environment 1200 constructs a directed acyclic graph (DAG) representing task dependencies and uses topological sorting to optimize workflows, ensuring efficient task sequencing and resource allocation.

As shown at 1606, based on the analysis, the AI model calculates one or more actions to be performed on the target board. These actions may be designed to improve the board's structure, efficiency, or usability.

As shown at 1607, the calculated actions may include modifications to the board structure, such as reorganizing items, creating new groupings, or adjusting hierarchies. They may also involve metadata changes like updating tags, labels, or status indicators.

Optionally, if the AI model determines that there is insufficient information to perform certain actions, it deploys an AI agent specifically designed for user interaction. This agent autonomously reaches out to relevant users through the platform's messaging system. It uses natural language generation to formulate context-aware queries, seeking the missing information necessary to complete the planned actions.

Optionally, AI agent employs advanced workflow analysis algorithms to identify bottlenecks or mismatches in the project workflow. It correlates task dependencies, completion rates, and user responsibilities to pinpoint the source of delays or inefficiencies. Once identified, the agent initiates targeted communication with the relevant users, presenting the issue and soliciting input for resolution.

As shown at 1608, the proposed actions may be validated against predefined rules and constraints to ensure they align with organizational policies and best practices. As shown at 1609, without requiring specific instructions from a user, the environment 1200 may proceed to perform the identified actions on the target board.

As shown at 1610, as the actions may be being executed, the environment 1200 logs each modification, creating a detailed record of the changes made by the AI. As shown at 1611, the environment 1200 may monitor the impact of the performed actions, collecting data on user interactions with the modified board.

As shown at 1612, this feedback data is then used to update and refine the generative AI model, improving its decision-making capabilities for future interactions. Optionally, based on the identified patterns of repetitive tasks, the environment 1200 generates automated workflow suggestions. These suggestions may be presented to the user through an interactive interface that allows for customization and fine-tuning. The environment 1200 uses predictive modelling to estimate the time and effort savings for each suggested automation.

Optionally, the generative AI model undergoes periodic retraining using a federated learning approach (e.g., a machine learning technique that trains an algorithm across multiple decentralized edge devices or servers holding local data samples, without exchanging them). This allows the model to incorporate new user interactions and feedback from multiple instances of the environment 1200 while maintaining data privacy. The updated model is deployed using a canary release strategy to ensure stability and performance improvements.

As shown at 1613, the process concludes with the environment 1200 generating a summary report of the actions taken and optionally, their initial impact, which can be reviewed by system administrators or relevant stakeholders. Optionally, an interactive chat interface where users can discuss and inquire about the AI agent's outputs is provided by the environment 1200. This interface can be powered by an explainable AI module that provides transparency into the reasoning behind each recommendation or action. It references the specific platform context, including board structure, data relationships, and historical patterns that influenced the AI's decision-making process.

Optionally, for detected suboptimal use cases, the environment 1200 generates tailored recommendations for more efficient use of platform elements. These recommendations may be prioritized based on their potential impact and ease of implementation. The environment 1200 uses data visualization techniques to clearly communicate the benefits of each recommendation to the user.

Optionally, the environment 1200 implements a real-time monitoring module that tracks user interactions with the target board. This module uses stream processing techniques to analyze user actions as they occur. Based on this real-time data, the AI generates proactive suggestions for improving board utilization, which are presented to users through non-intrusive notifications. After performing the automated actions, the environment 1200 may generate a detailed natural language explanation of the changes made and their expected impact. This explanation is created using advanced natural language generation techniques, translating complex AI decisions into clear, human-readable text that contextualizes the actions within the board's specific use case.

In one exemplary embodiment, the longitudinal analysis module may be applied to optimize the structure and functionality of a customer support board within the SaaS platform. The board may initially comprise the following columns:

1. A text column (Column A) containing the verbatim content of client support tickets.
2. A status column (Column B) where a user manually selects a status based on their interpretation of the sentiment expressed in the ticket text.
3. Another status column (Column C) where a user manually selects a status based on their assessment of the urgency derived from the ticket text.

The longitudinal analysis module may track the following metrics over time:

1. The average time taken for users to populate Columns B and C for each ticket.
2. The consistency of status selections across different users for similar ticket content.
3. The correlation between initial status selections and final resolution outcomes.

Through its analysis, the AI agent may recognize patterns indicating inefficiencies and inconsistencies in the manual status selection process. Concurrently, the AI agent may identify that an AI-powered column feature capable of automated sentiment analysis and urgency detection is available within the account's feature set or can be readily integrated.

Based on these insights, the AI agent may generate a recommendation to the user, proposing the implementation of two AI-powered smart columns to replace the manual status columns. The recommendation may include:

1. A detailed analysis of the potential time savings, projecting the reduction in manual input time based on historical data.
2. A comparison of consistency metrics between manual selections and AI-powered classifications, demonstrating the potential for improved standardization.
3. A proposed implementation plan, including steps for data migration and user training.

The AI agent may further suggest A/B testing methodology, where a subset of tickets is processed through both the manual and AI-powered systems in parallel, allowing for direct comparison of efficiency and accuracy.

Upon implementation of the AI-powered columns, the longitudinal analysis module continues to monitor performance metrics, including:

1. The speed of ticket classification using the AI-powered system.
2. The correlation between AI-generated classifications and final resolution outcomes.
3. User feedback and override frequency for AI-generated classifications.

These ongoing analyses enable the system to continuously refine the AI models underlying the smart columns, potentially leading to the development of custom classification algorithms tailored to the specific linguistic patterns and urgency criteria relevant to the organization's support ticket ecosystem.

This exemplary application of the longitudinal analysis module demonstrates the system's capacity for ongoing optimization of board structures and workflows. By leveraging historical data, current user behaviors, and available AI capabilities, the system can proactively suggest and implement improvements that enhance efficiency, consistency, and overall effectiveness of the SaaS platform's utilization.

The process described in FIG. 16 provides an ability to analyze user interaction logs and identify patterns of repetitive tasks represents a significant advancement in workflow optimization. Namely a process of identifying and implementing improvements in a sequence of industrial, administrative, or other processes. By employing sophisticated machine learning algorithms for pattern recognition, the system can detect nuanced, complex patterns that might be imperceptible to human observers. This capability allows for the automation of not just simple, repetitive tasks, but also more complex sequences of actions, leading to substantial improvements in productivity and efficiency. The implementation of a federated learning approach for model updating may provide a mechanism for continuous improvement while maintaining data privacy. This technique allows the AI model to learn from a wide range of user interactions across multiple system instances without centralizing sensitive data. The release strategy for model deployment ensures that improvements may be introduced safely, minimizing the risk of system-wide disruptions. The incorporation of stream processing techniques for real-time monitoring of user interactions enables the system to provide immediate, context-aware suggestions. This real-time capability transforms the system from a passive tool into an active collaborator, capable of identifying and addressing inefficiencies as they occur. The proactive nature of these suggestions can significantly reduce the time lag between problem identification and resolution.

Figure 17:
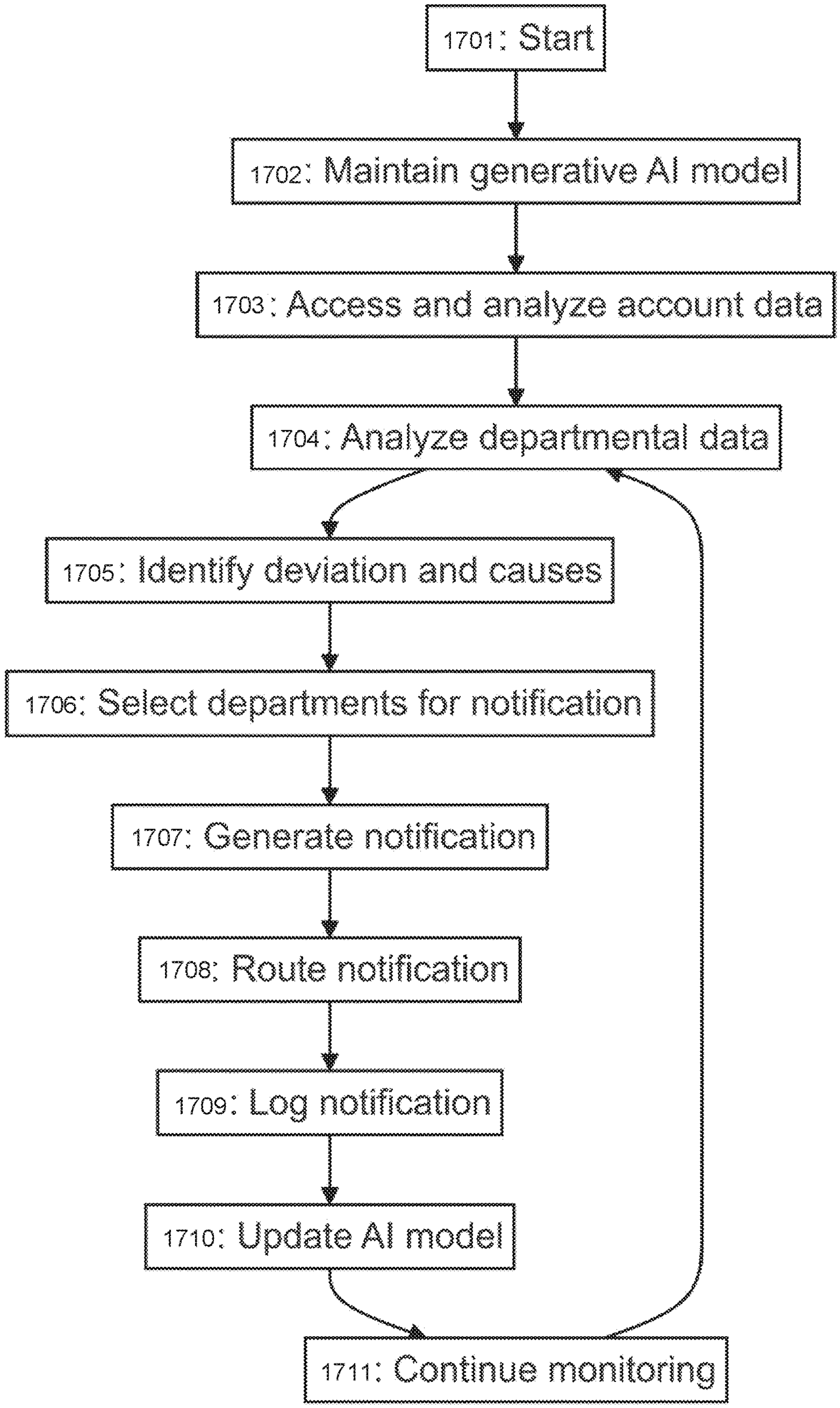
FIG. 17 is a flowchart depicting a process for AI-driven cross-departmental account health monitoring and notification within a SaaS platform, consistent with some embodiments of the present disclosure.

Reference to FIG. 17 is a flowchart depicting a process for AI-driven cross-departmental account health monitoring and notification within a SaaS platform according to some embodiments of the present disclosure. The flowchart is implemented using a SaaS platform, such as the environment 1200 depicted in FIG. 12, according to some embodiments of the present disclosure, for instance using correlation environment 1200. As shown at 1701 and 1702, the initialization of the environment 1200, including loading the generative AI model. The environment 1200 maintains a generative AI model that has been trained on diverse datasets encompassing organizational structures, departmental interactions, and work management platform data from multiple accounts. This training utilizes advanced machine learning techniques such as transfer learning and multi-task learning to capture complex interdepartmental dynamics.

Optionally, the AI model's training process is augmented with predictive modelling capabilities. This involves the use of advanced time series forecasting techniques, such as prophet or ARIMA models, combined with machine learning algorithms for pattern recognition. This enhancement allows the model to predict future deviations based on historical data and current trends, enabling proactive notification and prevention of potential issues.

As shown at 1703, the environment 1200 accesses a target account and analyses the SaaS platform data associated with it. This analysis employs natural language processing and entity recognition algorithms to identify and categorize different departments within the account.

Optionally, the environment 1200 introduces an interdepartmental analysis module that constructs a graph representation of departmental dependencies and workflows. Graph analysis algorithms may be applied to identify potential bottlenecks or inefficiencies in cross-departmental processes. The AI model then generates optimization recommendations using a combination of heuristic algorithms and machine learning techniques, aimed at improving interdepartmental collaborations As shown at 1704, for each identified department, the environment 1200 analyses work management platform data. This step involves deep learning models, such as LSTM networks, to interpret actions in the context of their respective divisions. The environment 1200 looks for deviations from regular workflows, utilizing anomaly detection algorithms and time series analysis.

Optionally, the environment 1200 incorporates a sprint analysis module that uses time series forecasting and trend analysis to examine task completion patterns across multiple sprints. Machine learning algorithms, such as gradient boosting machines, may be employed to identify recurring postponements or delays in task completion. The AI model then uses these insights, combined with resource allocation data, to deduce potential staffing issues in specific departments. When staffing issues may be identified, the system generates targeted notifications with AI-driven recommendations for addressing these issues, routing them to relevant departments such as Human Resources.

As shown at 1705, upon detecting a deviation in a first department, the environment 1200 activates the AI model to identify work patterns or underlying causes for the deviation. This involves causal inference techniques and pattern recognition algorithms to establish relationships between observed behaviors and potential root causes.

Optionally, the deviation identification process is enhanced with a prioritization mechanism. This mechanism employs a multi-criteria decision-making algorithm that considers factors such as financial impact, resource utilization, and alignment with business objectives. The AI model uses this prioritization to ensure that the most critical deviations may be addressed first, optimizing overall account health management. Optionally, the environment 1200 employs a specialized generative AI model to conduct a detailed analysis of resource utilization patterns before and during the identified deviation. This model uses transformer architecture with attention mechanisms to process time-series data on resource allocation, employee workloads, and task completion rates. The generative AI applies causal inference techniques to establish relationships between resource utilization patterns and the observed deviation.

The model may categorize the probable cause of the deviation into two main categories: over-utilization or under-utilization of resources. For over-utilization, it identifies indicators such as consistently high workloads, increased overtime, or patterns of employee turnover. For under-utilization, it looks for signs of idle resources, prolonged task completion times, or repetitive bottlenecks in workflows. The generative AI may then synthesize its findings into a coherent narrative, explaining the likely chain of events that led to the deviation. This narrative is incorporated into the notification generated in Step 1707, providing the selected department(s) with a clear, context-rich understanding of the issue.

Furthermore, the generative AI produces tailored recommendations to address the identified cause. For over-utilization scenarios, it might suggest strategies for workload redistribution, hiring plans, or employee retention programs. For under-utilization, it could recommend process optimizations, additional training programs, or the adoption of new tools to enhance productivity.

These AI-generated insights and recommendations may then be fed back into the main AI model to inform the selection of the most appropriate department(s) to address the issue, ensuring a comprehensive, cause-driven approach to resolving the deviation.

As shown at 1706, the AI model then assesses the capability and relevance of other departments to address the identified issue. This assessment uses a combination of knowledge graph analysis and similarity scoring to determine which department(s) may be best positioned to handle the problem.

As shown at 1707, the environment 1200 generates a detailed notification about the identified deviation. This notification includes information about the nature of the deviation, its potential impact on the organization, and recommended actions to address it. Natural language generation techniques may be employed to create clear, context-appropriate messages.

Optionally, the notification generation process is enhanced with a recommendation engine that leverages the AI model's understanding of departmental capabilities and resources. This engine uses a combination of rule-based systems and neural networks to generate tailored, actionable recommendations for remedying the identified deviation. These recommendations may be customized based on the selected department's historical performance, available resources, and current workload.

Optionally, the environment 1200 implements a user interface for notification review and approval. This interface uses role-based access control to ensure only authorized personnel can access it. It provides visualization tools for easy comprehension of AI-generated notifications and allows for modifications. An approval workflow is implemented, using digital signatures and audit logging for accountability.

As shown at 1708, the environment 1200 automatically routes the generated notification to the selected department(s). This routing process utilizes the organization's communication infrastructure, such as email systems or internal messaging platforms, ensuring the notification reaches the appropriate personnel.

Optionally, the environment 1200 automatically implements an integration layer that connects with existing communication channels and work management tools used by the account. This layer uses APIs and webhooks to seamlessly deliver notifications through platforms like Slack, Microsoft Teams, or email systems. It also integrates with project management tools to track resolution progress, using data synchronization techniques to ensure consistency across platforms. Data synchronization may be any process of maintaining data consistency across multiple platforms or applications, ensuring that the same data is available and up-to-date in all systems.

As shown at 1709, the environment 1200 may log the notification and tracks its receipt and any subsequent actions taken. This logging process feeds back into the AI model, providing data for future refinement of the notification and routing processes.

As shown at 1710, the AI model may be updated based on the outcomes of the notification and any actions taken. This update process uses reinforcement learning techniques to improve the model's decision-making capabilities over time.

Optionally, the AI model update process is expanded to include a cross-account learning module. This module aggregates anonymized data on notification outcomes and remedial actions across multiple accounts. It employs federated learning techniques to update the global AI model while preserving account-specific privacy. This approach significantly enhances the model's ability to identify deviations, select appropriate departments, and suggest effective solutions across diverse organizational contexts.

As shown at 1711, the environment 1200 continues to monitor the account, looking for any further deviations or improvements resulting from the notification. This ongoing monitoring creates a feedback loop that allows for continuous optimization of the account health monitoring process. Optionally, the environment 1200 implements a resolution tracking module that monitors the progress of addressing the identified issue. This module employs event-driven architecture to capture real-time updates on issue resolution. It analyzes the effectiveness of the selected department using key performance indicators (KPIs) and custom metrics. The results of this analysis may be fed into the AI model using online learning techniques, allowing for continuous improvement in department selection and notification routing.

Optionally, implementation of online learning techniques and the cross-account learning module represents a major advancement in the system's ability to learn and improve. By leveraging federated learning, the system can aggregate insights across multiple accounts without compromising data privacy. This results in a more robust, generalizable AI model that continuously enhances its performance in identifying deviations, selecting appropriate departments, and suggesting effective solutions. The integration of advanced time series forecasting and predictive modelling capabilities enables the system to anticipate potential issues before they occur. This proactive approach to account health management can significantly reduce the impact of deviations on overall business operations, allowing organizations to address problems in their nascent stages.

The incorporation of sprint analysis modules and interdepartmental analysis tools (leverages sophisticated data processing techniques such as time series analysis, graph theory, and machine learning algorithms. This allows for deeper, more nuanced insights into organizational dynamics, workflow efficiencies, and resource allocation, leading to more informed decision-making.

In one exemplary embodiment, the system may be configured to identify and analyze deviations from established workflows within the Research and Development (R&D) department of an organization. The system may implement data collection module that continuously collect data from various sources, including:

a) Sprint planning and execution data from the project management platform.

b) Time tracking data from the organization's time management system.

c) Resource allocation data from the human resources management system d) Historical project completion data from the organization's data warehouse.

Optionally, the system further includes a time series analysis component that may analyze the collected data over multiple sprint iterations, focusing on:

a) Task completion rates.

b) Frequency and duration of task postponements.

c) Patterns in resource utilization.

Optionally, the system may construct and analyze dependency graphs representing:

a) Task dependencies within sprints.

b) Inter-project dependencies.

c) Resource allocation across multiple projects.

Optionally, the system further is utilizing supervised and unsupervised learning algorithms to:

a) Identify recurring patterns in task postponements.

b) Classify causes of delays based on historical data.

c) Predict potential bottlenecks in upcoming sprints.

In operation, the system may detect a pattern of task postponements in the R&D department over several sprint iterations. The time series analysis component may flag this as a significant deviation from the expected workflow, triggering a deeper analysis. The graph theory-based dependency analysis may reveal that the postponed tasks may not be isolated incidents but form a connected subgraph within the larger project dependency network. This subgraph may correspond to a specific area of technological expertise. The machine learning component, trained on historical project data, may classify this pattern of postponements. It may rule out factors such as employee performance issues or task complexity, instead identifying resource constraints as the primary cause. Based on this analysis, the system may generate a detailed report including:

1. A quantitative analysis of the impact of postponements on overall project timelines.
2. A visualization of the affected task dependency network.
3. A comparative analysis of resource allocation in successful vs. delayed projects.

The system may then automatically notify the Human Resources department, providing:

1. A summary of the identified resource constraint.
2. A specific list of required skills derived from the analysis of postponed tasks.
3. A proposed timeline for resource acquisition based on project criticality.
4. Potential impacts on ongoing and upcoming projects if the resource gap is not addressed.

Furthermore, the system may suggest interim measures, such as:

1. Temporary reallocation of resources from lower-priority projects.
2. Identification of potential upskilling opportunities for existing team members.
3. Evaluation of outsourcing or contractor engagement for specific task subsets.

This exemplary application demonstrates the system's capacity to leverage complex analytical techniques for identifying subtle, systemic issues within organizational workflows. By correlating data across multiple dimensions and departments, the system can provide actionable insights that go beyond surface-level project management, addressing root causes of efficiency bottlenecks and enabling proactive, data-driven decision-making in resource allocation and skill acquisition.

Figure 18:
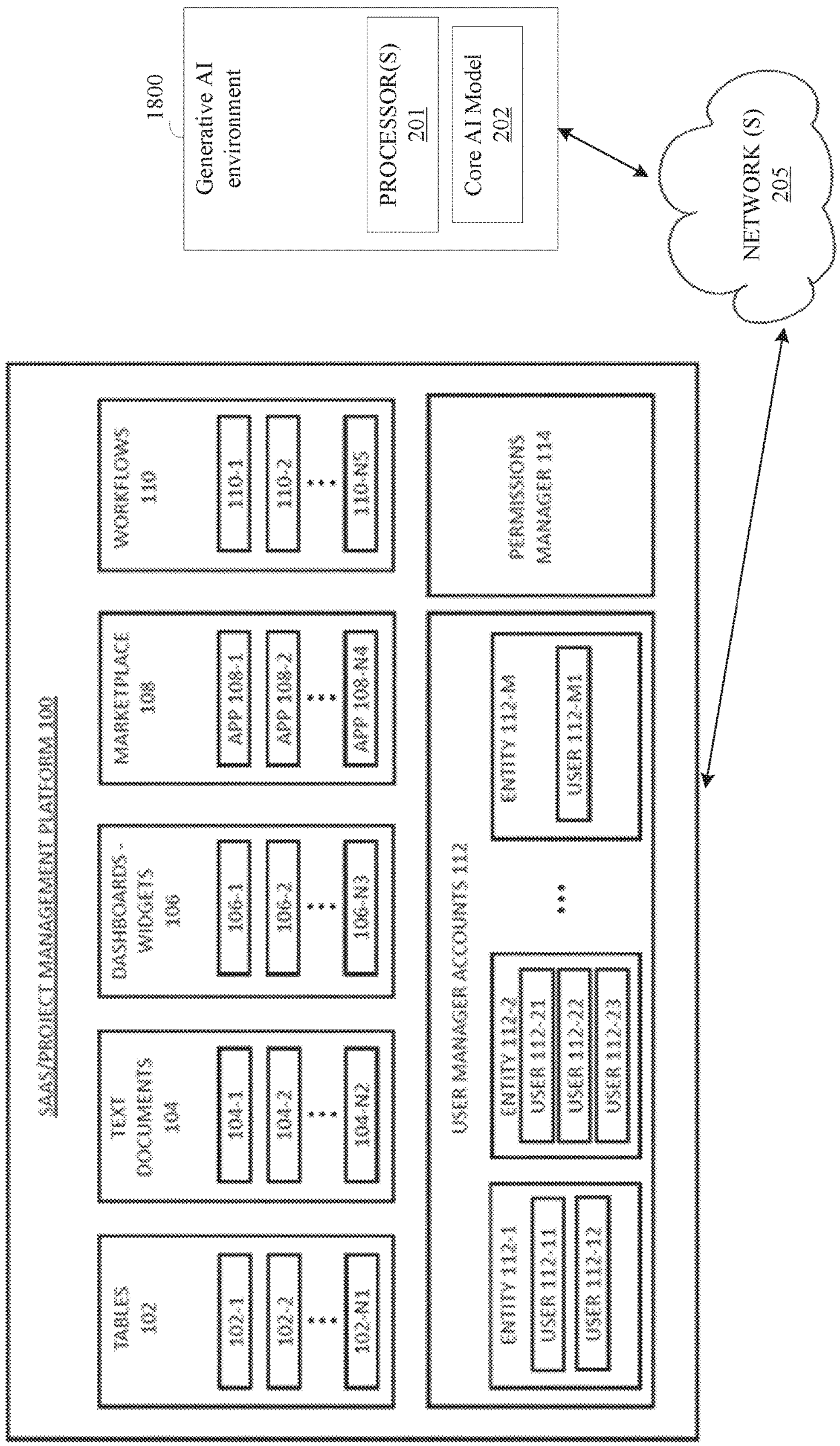
FIG. 18 is a block diagram of an exemplary SaaS platform and generative AI environment, according to some embodiments of the present disclosure.

Reference is now made to FIG. 18 which is a block diagram of an exemplary SaaS platform 100 and generative AI environment 1800, according to some embodiments of the present invention. Although the generative AI environment 1800 is depicted as a separate environment it can be part of the SaaS platform 100 itself. The generative AI environment 1800 may be in communication with the SaaS platform 100 as described in any of the embodiments below, for instance via network 205 or directly based on any common software component communication protocols or in the common process of executing software components.

As illustrated, SaaS platform 100 includes a plurality of SaaS platform elements, namely Tables 102, Text documents 104, Dashboards 106, Marketplace 108, and Workflows 110. Each of these SaaS platform elements includes a plurality of SaaS platform sub-elements respectively 102-1 through 102-N1 for Tables 102, 104-1 through 104-N2 for Text documents 104, 106-1 through 106-N3 for Dashboards 106, APP 20 through APP 108-N4 for Marketplace 108 and 110-1 through 101-N5 for Workflows 110, wherein N1, N2, N3, N4 and N5 represent natural numbers.

It is to be appreciated that these SaaS platform elements may collaborate seamlessly. For instance, a text document (e.g., 104-1) might incorporate data from a table (e.g., 102-1), and a dashboard/widget (e.g., 106-1) might display data originating from a table (e.g., 102-1). This integration may ensure a cohesive and flexible user experience, allowing different components of the platform to work together effectively and dynamically share data. Additionally, it is to be appreciated that the utilizations of data originating from a first SaaS platform element (e.g., a table), by a second SaaS platform (e.g., a widget included a plurality of graphical representations) may not necessarily lead to additional memory allocation on a SaaS platform server. This efficiency may be achieved because the data is not duplicated for each view (a table view or a dashboard/widget view). Instead, the data may be dynamically imported from the first SaaS platform element, often using pointers to their specific locations in memory. This approach ensures that the original data remains intact and avoids the overhead associated with creating multiple copies, thereby optimizing memory usage and improving the overall performance of the server. For example, when a user of the SaaS platform requests a graphical representation (widget view) of data from a table, the platform may retrieve the necessary data by referencing the memory locations where the data is stored, rather than creating new instances of the data. These references, or pointers, serve as links to the original data, enabling the server to efficiently handle multiple requests without incurring significant memory costs. By leveraging this process, the SaaS platform may support numerous simultaneous views and graphical representations without a proportional increase in memory usage. Furthermore, this approach allows for real-time data updates to be reflected instantly across all views. Since all views point to the same data source, any changes to the data are immediately visible, ensuring consistency and accuracy. This process may be advantageous in environments where data is frequently updated, such as in financial systems, real-time analytics, and monitoring applications. Several entity or organization accounts (user management accounts) 112 (112-1 to 112-M, M being a natural number) may be affiliated with SaaS platform 100 and managed via a user manager. Each of these entity accounts may include at least one user account. For example, entity account 112-1 includes two user accounts 112-11, 112-12, entity account 112-2 three user accounts 112-21, 112-22, and 112-23, and entity account 112-M one user account 112-M1. Within the context of the disclosed embodiments, an entity account may refer to the central account managing the overall SaaS platform subscription, billing, and settings. Within this entity account, multiple user accounts may be created for different individuals within the entity/organization. User accounts may have their own login credentials, access privileges, and settings. The entity account owner or administrators may have control over access, permissions, and data segregation. User accounts may collaborate and share resources within the entity account while maintaining a personalized experience. Each of the user accounts 112 may include different permutations of SaaS platform elements such as a plurality of tables, text documents, dashboards, marketplace applications (e.g., 108) in association with the above-mentioned SaaS platform elements 102, 104, 106, 108, and 110. Accordingly, various SaaS platform elements or sub-elements may include metadata associated with users. Metadata associated with users may provide additional information and context about the users themselves, their profiles, roles, preferences, and interactions within the SaaS platform. Examples of metadata may include user profiles, roles and permissions, activity logs, usage indications, preferences and settings, user associations/relationships, user history or a combination thereof.

As used herein a user account may be associated with a human or generative AI agent. The generative AI agent or a generative AI model executing prompts may be implemented in a computerized generative AI environment 1800 using a Core generative AI model 202 that incorporates Natural Language Understanding (NLU) and Natural Language Generation (NLG) capabilities. This Core generative AI model can be a transformer-based model (e.g., GPT-3.5, GPT-4, or open-source alternatives like BERT or T5) executed in a framework such as PyTorch or TensorFlow and deployed on the environment 1800 (e.g., part of platform 100 or a separate system communicating with the platform 100) such as an NVIDIA Triton Inference Server or TensorFlow Serving.

When the computerized generative AI environment 1800 is executed separately from the platform it may communicate therewith via digital data communication (e.g., a communication network 205). Examples of communication networks include a local area network ("LAN"), a wide area network ("WAN"), and the Internet.

The core model provides the foundation for both NLU and NLG functionalities. It receives processed input from the NLU component and sends raw output to the NLG component for refinement.

The NLU processes incoming messages, extracting intents and entities. It feeds processed information to the Core generative AI model and updates Context Management. The NLG receives raw output from the Core generative AI model, refines it based on context, and produces human-readable responses.

The NLU may be implemented using libraries such as spaCy or NLTK for text processing and intent/entity extraction. The NLG may be implemented using template-based systems like Jinja2 or neural-based approaches such as GPT-3 Application Programming Interface (API) or fine-tuned GPT-2, which receive raw output from the Core generative AI model, refine it based on context from Context Management, and produce human-readable responses.

Optionally, the generative AI agent can be executed as in the generative AI environment 1800 or as part of the platform 100 by one or more processors 201. When executed in a separate environment, an API Integration Layer may be implemented to facilitate communication between the generative AI environment 1800 and the SaaS platform 100. This layer may include a RESTful API client (e.g., Python requests library), GraphQL client (e.g., gql for Python), and/or OAuth 2.0 for authentication (e.g., authlib library). It sends platform responses to the Core generative AI model and Context Management and receives actions to execute from a decision engine. The decision engine processes information from the Core generative AI model, consults a memory and knowledge base, and determines actions. It then either initiates tasks via the Task Planning Module or generates responses through NLG.

Optionally, the generative AI environment includes a context management module, task planning module, and a decision engine to provide contextual information to the Core generative AI model. The task planning module receives high-level objectives from the decision engine, breaks them down into steps, and coordinates with the API integration layer for execution. The Memory and Knowledge Base component interacts with the Core generative AI model, Decision Engine, and Context Management, providing long-term storage and retrieval of information. It's queried by the Core generative AI model and Decision Engine and updated based on new interactions and learning.

All or some of the components collect data from other components for performance tracking, error detection, and system optimization. In operation, the Decision Engine orchestrates overall behavior, the Task Planning Module manages multi-step processes, and the Context Management ensures coherence across interactions. This interconnected architecture allows for flexible, context-aware interactions while maintaining security and scalability.

In addition, each of these user accounts may include one or more private apps, that have been specifically designed and tailored to suit the needs of a user and that employ functionalities offered by or in association with SaaS platform 100 (via SaaS platform elements 102, 104, 106, 108, and 110 or their associated sub-elements). Private apps are exclusively accessible to users who are affiliated with an entity owning or implementing that app. These applications may not be publicly available (i.e., not on the market/publicly offered on the marketplace 108) and may only be accessed by individuals who have specific authorization or are part of the designated user group. The privacy settings associated with these apps restrict access to ensure that only authorized users can use and interact with them. This level of privacy and restricted access helps maintain confidentiality, control, and security over the app's functionalities and data, limiting usage to approved individuals within the user account. Centralization of user access and authorization management is performed by a permission manager 114 enabling administrators to control and regulate user privileges, ensuring that users have appropriate levels of access to data, features, and resources based on their roles and responsibilities. Permissions Manager 114 may offer granular control, and role-based access, facilitating efficient user management, collaboration, and compliance monitoring. Its objective is to enhance data security, streamline user administration, and maintain proper governance within the SaaS platform.

Still referring to FIG. 18, SaaS platform 100 may include one or more management tools that may involve a combination of one or more SaaS platform element or sub-element. For example, a solution may leverage data stored in one or more tables and offer comprehensive data visualization through prebuilt dashboards and widgets, furnishing users with deep and meaningful insights into their operations. In some embodiments, these tools may enable visualization of alphanumeric data in a non-alphanumeric manner. For instance, instead of conventional tables or charts, these tools may employ immersive graphical interfaces or interactive simulations to depict complex datasets. These visualizations may encompass versatile views such as Kanban boards, timeline representations, Gannt charts, or other representations, offering users diverse perspectives and facilitating informed decision-making. This approach enables users to interact with the data in a more intuitive and engaging manner, facilitating deeper understanding and analysis. Each of these management tools may be coupled to one or more user accounts 112 and may operate synergistically within SaaS platform 100, empowering users to streamline and optimize their sales processes, from lead generation to deal closure. These tools leverage the analytical capabilities of the SaaS platform to provide users with actionable insights and facilitate efficient management of their sales.

In order to provide meaningful data visualizations, management tools may access one or more data structures. A data structure refers to any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include a data pool (whether a structured or an unstructured pool), an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. Additionally or alternatively, some or all of the data structure may be organized using the Ruby on Rails web application framework. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures. A data structure may include a plurality of data items and may define the relationship between the items and the operations that may be performed on them. Each item may include one or more characteristics associated with a value (e.g., an alphanumeric value). A data structure may include a plurality of items. Examples of items may include but are not limited to a deal, a transaction, a client account, a prospect, a task, a user record, or an order. A characteristic of an item may include any distinctive feature or quality that helps to identify or define an item. The characteristics of items may include, for example, a deal size, an associated level of risk, one or more associated salespersons, a client name, a phase in the sales funnel, a client type, one or more due dates, a rate of completion, comments, or any additional feature or quality relevant to an item included in a data structure. The characteristics of an item may present relationships and patterns that offer valuable insights into customer behavior, sales trends, and operational efficiencies. For instance, analyzing the relationship between deal size and associated risk levels can help identify high-risk, high-reward opportunities or tracking the performance of salespersons in relation to deal phases and completion rates can highlight strengths and areas for improvement within the sales team.

The plurality of items of a data structure may be associated with a common objective. A common objective refers to a shared goal or aim. Examples of common objectives in a business context include increasing revenues, sales, profitability, customer retention, or number of customers; or decreasing waste, expense, or loss of customers. In general, a common objective can refer to increasing a positive measure and/or decreasing a negative measure. In this context, a common objective may guide the arrangement and interaction of the individual elements towards a shared purpose or goal. This objective could span a broad spectrum, ranging from high-level aspirations, such as maximizing profitability or efficiency, to more specific aims, such as streamlining processes or achieving targeted outcomes. Whether the objective is overarching or focused, the association between the items and the common objective underscores the cohesion and purposefulness of the data structure, driving meaningful insights and outcomes. A comprehensive visualization of the data structure may provide valuable insights into the common objective. By presenting the relationships and patterns inherent within the data structure, such a visualization may enable a deeper understanding of how individual items contribute to the overarching goal. This comprehensive view may facilitate the identification of key trends, dependencies, and potential optimizations that can propel progress towards achieving the common objective. Moreover, by offering a holistic perspective, the visualization may empower user (e.g., salesperson, salesperson manager etc.) to make informed decisions and strategic adjustments, leveraging the collective knowledge embedded within the data structure to drive towards the desired common objective.

Some disclosed embodiments may involve stored data such as alphanumeric data which are accessible when a user interacts with graphical elements having a plurality of graphical characteristics. Within the context of this disclosure, alphanumeric data refers to data composed of either or both letters (alphabetic) and numbers. This type of data may include any combination of the 26 letters of the English alphabet (A-Z, a-z) and the 10 numeric digits (0-9). Additionally, alphanumeric data may also encompass ideograms, such as those used in Chinese or Japanese characters, or characters from any other alphabet, such as Cyrillic, Hebrew, Greek, or Arabic. A graphical element is a visual component that conveys information. By way of non-limiting examples, graphical elements can include shapes, lines, colors, textures, images, icons, and symbols. Discrete graphical elements refer to individual visual components that are distinct from one another, enabling visual comparison between them. Each element may adopt a plurality of graphical characteristics such as shape, color, size/dimensions, borderline, texture or position with respect to a screen and/or other presented elements, that may be used to visually encode information. In this disclosure, unless specified otherwise, a graphical element may equally refer to the visual representation/entity as presented on a display and/or to the underlying data model of the visual representation that can be readily understood and manipulated by a processing device and that includes properties defining the graphical characteristics of the visual representation.

By way of example with reference to FIG. 18, a platform 100 may maintain tables 102 by storage, or any combination thereof. FIG. 1B illustrates an exemplary table structure, referred to herein as table 300, that may include multiple columns and rows, consistent with some embodiments of the present disclosure. In some embodiments, the table 300 may be displayed using a computing device (e.g., the computing device or software running thereon). The table 300 may be associated with a project (e.g., "Project 1" in FIG. 1B) and may include, in the multiple rows and columns, tasks (e.g., in rows including "Task 1," Task 2," or "Task 3") and data characteristics for the tasks. Such data characteristics can be persons (e.g., in a column 332), indicating which user entities are associated with the task/are assigned to the tasks, details (e.g., in a column 334) of the tasks, statuses (e.g., in a column 342) of the tasks, due dates (e.g., in a column 336) of the tasks, timelines (e.g., in a column 340) of the tasks, or any other data characteristic of the task. For example, in a project with the common objective of launching a new product, the table might be structured as follows: Task 1 could be "Market Research," assigned to a generative AI Agent. Task 2 might be "Product Design," assigned to John from the R&D department. Task 3 could be "Financial Projections," assigned to Michael from the Finance department. Each task contributes to the common goal of product launch, and people are assigned from the departments most relevant to each task's requirements. This structure enables cooperation across departments to reach the common objective efficiently. The status column might show "In Progress" for Market Research, "Not Started" for Product Design, and "Completed" for Financial Projections, giving a quick overview of the project's progress towards the launch goal. A task may refer to a part or a portion of a project. A task may be performed by an entity (e.g., an individual or a team or a generative AI agent assigned to the task). In some embodiments, a task may be represented by a row of cells in a task table. In some embodiments, a task may be represented by a column of cells of a task table. An entity may refer to an individual, a team, a group, a department, a division, a subsidiary, a company, a contractor, a generative AI agent, or any independent, distinct organization (e.g., a business or a government unit) that has an identity separate from those of its members, or a combination thereof.

As illustrated in FIG. 1B, the at least one processor may maintain a plurality of tables (e.g., including the tables 300) and other information (e.g., metadata) associated with the plurality of tables. Each table (e.g., one of the tables 300) of the plurality of tables may include a plurality of rows (e.g., the rows of "Task 1," Task 2," and "Task 3" in the table 300) and columns (e.g., columns 332, 336, 340, 332, and 334 of the table 300).

Consistent with some disclosed embodiments, at least one processor may be configured to maintain a second table with rows and columns defining second cells. A second table may include a sub-table of the first table, a sub-table of another table, a separate table associated with the same project as the first table, a separate table associated with a different project from the project of the first table, a table associated with a same project of a same entity, a table associated with a different project of the same entity, a table associated with a same project of different entity (e.g., a second user or a teammate or a generative AI agent), or any other combinations and permutations thereof. A second table may include tables as previously described above, including horizontal and vertical rows for presenting, displaying, or enabling access to information stored therein.

A relationship between the first and the second table may be hierarchical. A hierarchical relationship, as used in the context of this disclosure, may refer to a relationship based on degrees or levels of superordination and subordination. For example, in some embodiments, the first table may be a table associated with a task or a project and the second table may be a sub-table of the first table associated with the same project or a different project. In such a scenario, the first table may be considered a superordinate table and the second table may be considered a subordinate table.

Other examples of hierarchical relationships between a first and a second table are described herein. In some embodiments, an entity may be associated with one or more projects, and the first table may be a table associated with a first project of the entity, and the second table may be a table associated with a second project of the entity. In such a case, the first table may be the superordinate table and the second table may be the subordinate table. Alternatively, the first table may be the subordinate table and the second table may be the superordinate table. In some embodiments, the first table and the second table may be tables or sub-tables associated with different entities, different projects of a same entity, different projects of different entities, or other combinations thereof.

In some disclosed embodiments, the first and the second tables may be associated with or may be a part of a workflow. A workflow may refer to a series of operations or tasks performed sequentially or in parallel to achieve an outcome. A workflow process may involve managing information stored in tables associated with one or more entities, one or more projects within an entity, or projects across multiple entities. In an exemplary workflow process, a freelancer may create an invoice and send it to a client, the client may forward the invoice to the finance department, the finance department may approve the invoice and process the payment, the customer relations department may pay the freelancer. Similarly, the workflow process may involve sending a notification from the freelancer to the client in response to a status of the invoice being "Done," mirroring the received invoice to the finance department, updating a status (e.g., not yet paid, in process, approved, and so on) of the invoice processing, and updating a status in response to payment transmitted to the freelancer.

In the context of this disclosure, it is important to note that the assignment of a generative AI agent to a cell of a table such as 300 by a user triggers the assignment of that AI agent to the respective task and its associated information, characteristics, or entities of the project as documented in the respective row or column to which the agent is added. This assignment process is designed to be automatic and seamless when the user adds the agent to the respective cell, table, or sub-table. For instance, if a user assigns a generative AI agent to a cell in the "Person" column (332) of a specific task row, the generative AI agent is automatically granted access and assigned to all relevant information pertaining to that task, including its details, status, due date, and/or timeline. This automatic assignment may extend to any sub-tables or linked data sources associated with that task. Furthermore, the generative AI environment 1800 may automatically provision appropriate credentials to the generative AI agent, allowing it to perform actions and access information within the scope of its assigned task. These credentials are dynamically adjusted based on the context of the assignment, ensuring that the AI agent has the necessary permissions to fulfill its role while maintaining data security and access control protocols. This streamlined approach to AI agent assignment and credential management enables efficient integration of AI capabilities into project workflows, enhancing productivity and decision-making processes. As used herein, any assignment of the generative AI agent as a user to task or action may be performed by the addition of the agent by a human user who uses an interactive graphical user interface presenting the respective table to a cell in the respective table, for instance by adding or selecting an avatar of the agent to the cell.

As described herein, when indicating that the generative AI agent is assigned with a role, for instance in a team assigned to a project documented in one or more table structures, the role may be given as an outcome of adding the generative AI agent to a table such as 300, by a user. In use, post adding the agent to a cell, the environment 1800 automatically creates a role for that agent based on the context of its assignment. This role definition process is dynamic and contextual, taking into account the specific characteristics of the table, the task, and/or the project as a whole. For example, when an AI agent is assigned to a row having a marketing campaign task indicated in the "Task Details" column (334), the generative AI environment 1800 might automatically define its role as a "Content Strategy Assistant." In this role, the AI agent would be granted permissions to analyze past campaign data, suggest content ideas, and even draft preliminary marketing copy. Similarly, if an AI agent is added to a row having a software development task indicated in the "Task Details" column (334), it might be assigned the role of "Project Progress Monitor." In this capacity, the generative AI environment 1800 could be authorized to track task completions, identify potential bottlenecks, and send automated status updates to team members. These automatically generated roles are not static; they can evolve based on the AI agent's interactions and performance within the project ecosystem and/or changes in the values of the cells of the table. This dynamic role creation and evolution allow for a flexible and adaptive integration of AI capabilities into diverse project environments, enhancing the overall efficiency and intelligence of the project management process.

Figure 19A:
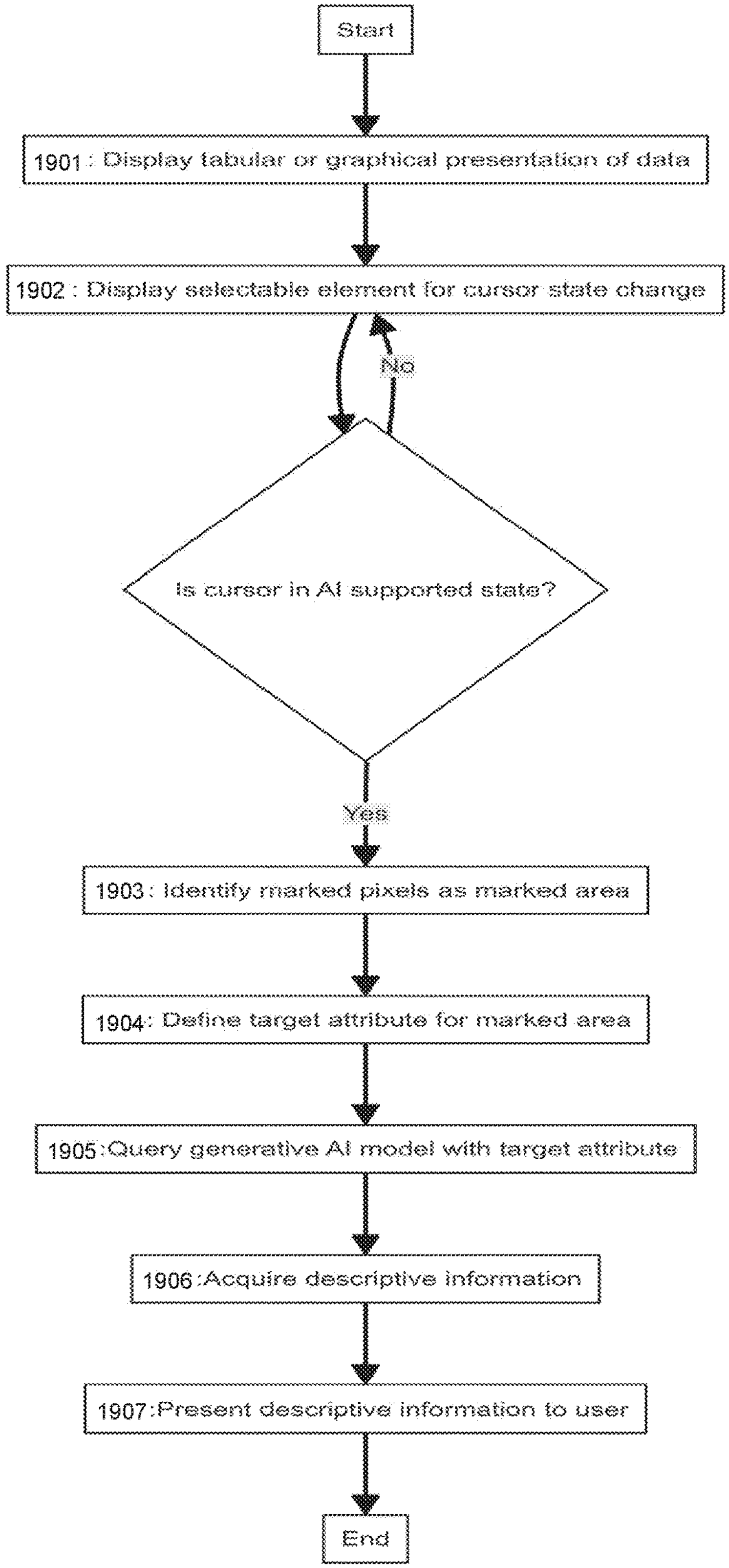
FIG. 19A is a flowchart illustrating a process for querying a generative AI model about structured data in a SaaS platform, according to some embodiments of the present disclosure.

FIG. 19A is a flowchart of an exemplary process implemented by one or more processors (201) of the generative AI environment 1800 for integrating generative AI into a SaaS platform according to some embodiments of the present invention. The process is optionally executed using the generative AI environment 1800 or by the exemplary SaaS platform 100 and the generative AI environment 1800.

The flowchart is implemented using a SaaS platform, such as the system depicted in FIG. 18, according to some embodiments of the present invention, for instance using the generative AI environment 1800.

The flowchart illustrates an exemplary process for querying a generative AI model about structured data in a SaaS platform, according to some embodiments of the present invention. The process is optionally executed using the AI environment 1800 or by the exemplary SaaS platform 100 and the generative AI environment 1800. Reference is also made to FIGS. 19B-19E which are screenshots on exemplary tabular presentation of data on a user interface of the SaaS platform 100, together with an example of a selectable element that allows a user to change the status of a graphical cursor and/or the effect of using the graphical cursor in an AI-supported state according to some embodiments of the present invention. As used herein, an AI-supported state is a mode of operation within a software interface where a generative AI model is actively engaged to assist with user interactions. In this state, user actions (such as selecting data or issuing commands) are interpreted and processed by the generative AI environment 1800 to provide enhanced functionality, insights, or automated actions beyond what is available in the standard interface state.

Figure 19B:
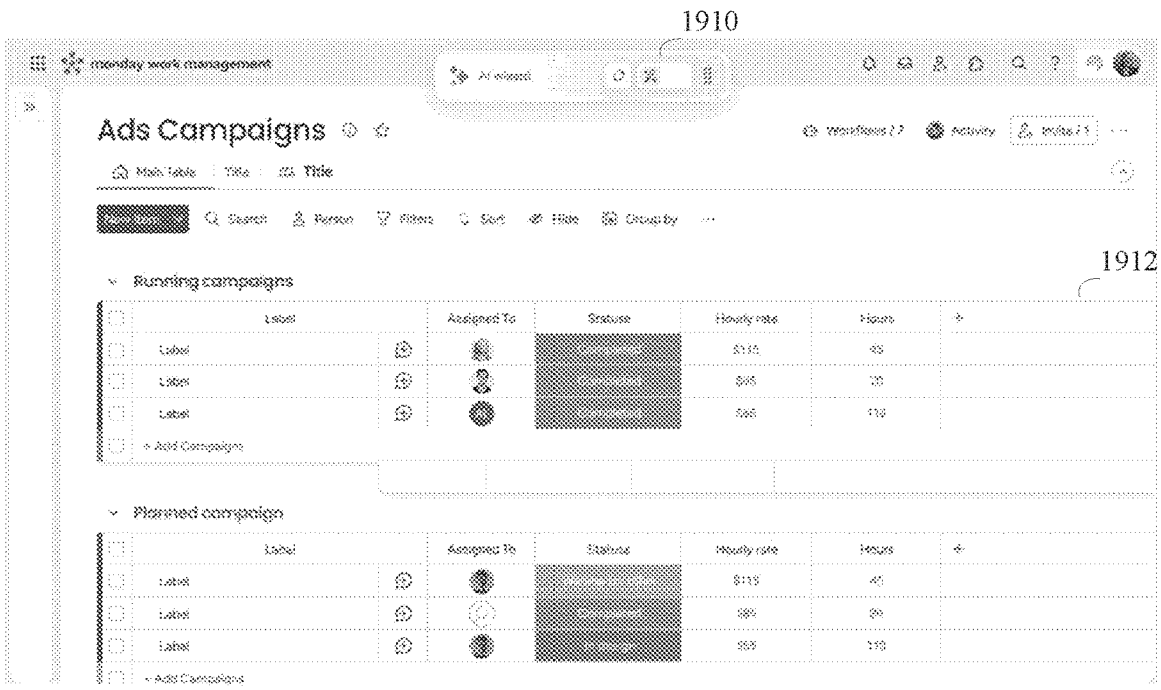
FIG. 19B depicts an example user interface showing a selectable element for changing the cursor state and AI-supported functionality, according to some embodiments of the present disclosure.

As shown at 1901, the platform 100 displays a tabular or graphical presentation of data on a user interface of the SaaS platform, such as board 1912 in FIG. 19B. This presentation may include project management data, sales data, or any other structured data relevant to the platform's functionality. Optionally, the display is on a computer monitor, laptop screen, tablet, or even a large touchscreen display for collaborative environments.

As shown at 1902, the platform 100 instructs displaying a selectable element that allows a user to change the status of a graphical cursor from a general state to an AI-supported state. This selectable element may be implemented as a graphical button or virtual toggle switch within the user interface, such as toggle 1910 in FIG. 19B. As used herein, an AI-supported functionality is a state wherein a generative model is queried about data or elements marked by the curser, optionally together with additional data.

Alternatively, changing the status of the graphical cursor to the AI-supported state replaces standard mouse functionality with AI-dedicated functionality. This may involve altering the behavior of mouse clicks or hover actions to trigger AI queries instead of standard interface interactions operated by common input devices. In some cases, the graphic icon of the curser itself may be changed to reflect the change in the state, for instance, the icon can be presented as a wand instead of an arrow, as depicted in icon 1913 of FIG. 19C.

Optionally, the selectable element can be a physical button mounted on an input device. For example, a dedicated button on a mouse could be toggled between normal and AI-supported modes, a specific key or key combination on a keyboard (e.g., "AI Mode" key or Ctrl+Shift+A) could switch cursor states. In another example, for touchscreen devices, a physical button on the device's frame could be toggled to activate AI mode. This physical implementation provides tactile feedback and allows users to switch modes without navigating on-screen menus, potentially speeding up workflows.

Optionally, when the curser is in an AI-supported state, its regular operation method is changed. For example, normal left-click operations that were used for selecting or activating elements can be replaced with AI query triggers specific to the clicked item and/or area. Optionally, drag operations initiate area-based AI analysis and/or group analysis for the dragged object and the dropped area and/or item instead of moving or resizing elements. Optionally, hover actions show AI-generated tooltips with insights about the hovered element and/or area instead of standard information. This transformation essentially turns the cursor into an "AI probe" for exploring the data.

Optionally, the generative AI model is trained on historical project data. This training improves the model's ability to identify relevant platform elements and actions, enhancing its effectiveness over time. Optionally, the SaaS platform data queried in this process is stored as a plurality of items representing the data in tables, underlining the structured nature of the data being analysed.

As shown at 1903, when the graphical cursor is in the AI-supported state, the generative AI environment 1800 identifies an area, for instance a plurality of pixels, marked by the user using the graphical cursor. These marked pixels define a region of interest within the tabular or graphical presentation, which is referred to as the marked area. As used herein the curser covers a mouse curser or a touch-screen finger indicator and .ir any other graphical element facilitating a user to mark a displayed area.

This can involve the generative AI environment 1800 identifying an area, for example a plurality of pixels, marked by the user using the graphical cursor when it is in the AI-supported state. This marked area defines a region of interest within the tabular or graphical presentation.

The marked area may be an area confined, fully or partly, in a scribble drawn using the graphical cursor when it is in the AI-supported state. The marked area may be an area that was clicked on using the graphical cursor when it is in the AI-supported state.

Example 1: Cells in a Table

In the case of a tabular presentation, the marked area could correspond to one or more cells within the table. For instance:

1. Single Cell Selection: The user might select a single cell in a project management table. For example, the cell contains the value "Q3 2024" in the "Deadline" column for a specific task. The generative AI environment 1800 would identify the pixels encompassing this cell as the marked area.
2. Multiple Cell Selection: The user could drag the cursor to select multiple adjacent cells. For example, in a sales data table, they might select a range of cells showing monthly revenue figures for a particular product line over the past year. The generative AI environment 1800 would identify all the pixels covering these selected cells as the marked area. Reference numeral 1923 in FIG. 19C exemplifies a multi cell selection as the curser is dragged to select a group of cells from 2 different columns. FIG. 19E exemplifies a selection of cells in a column as the curser is placed on top of the header of the column.
3. Non-Contiguous Selection: Some interfaces allow for selecting non-adjacent cells by holding a modifier key (e.g., Ctrl or Cmd) while clicking. The user might select several cells from the "Status" column for different tasks. The generative AI environment 1800 would identify the pixels of these non-contiguous cells as separate parts of the marked area.

Example 2: Point in a Graph

For a graphical presentation, such as a line graph, bar chart, or scatter plot, the marked area could be a specific point or region on the graph. For instance:

1. Single Point Selection: In a line graph showing website traffic over time, the user might click on a specific point representing a traffic spike. The generative AI environment 1800 would identify the pixels around this point as the marked area, potentially including both the x and y axis values (e.g., the date and the traffic count).
2. Bar Selection: In a bar chart comparing quarterly sales across different regions, the user might select a particular bar. The generative AI environment 1800 would identify the pixels comprising this bar as the marked area, encompassing both the height of the bar (representing the sales value) and its category (the specific region and quarter).
3. Area Selection: In a scatter plot showing customer lifetime value versus acquisition cost, the user might drag to select a cluster of points. The generative AI environment 1800 would identify relevant pixels within this dragged area as the marked area, potentially including multiple data points.

In all these cases, the generative AI environment 1800 can be configured to recognize the GUI elements that the user interacts with using the GUI input devices. According to one exemplary embodiment to implement the above, the generative AI environment 1800 can translate the user's physical interaction with the interface (via mouse, touchpad, touchscreen or the like) into a set of selected pixels. These pixels are then mapped back to the underlying data they represent, whether that's specific cell values in a table or data points in a graph. This mapping allows the generative AI environment 1800 to determine the target attribute(s), which forms the basis of the query to the generative AI model in the following steps.

Optionally, the surroundings of the selected area are analyzed to provide context. For example, in a table, it might consider column and row headers, adjacent cells, and any applied filters or sorting. In a graph, it could look at axis labels, legends, and overall trends in the data. It might also consider user-specific context, like their role, recent activities, or frequently accessed data. This context enriches the AI query, allowing for more nuanced and relevant responses.

As shown at 1904, the generative AI environment 1800 determines at least one target attribute for the marked area. This target attribute may be based on the data contained within the marked area or the context of the surrounding data.

Figure 19C:
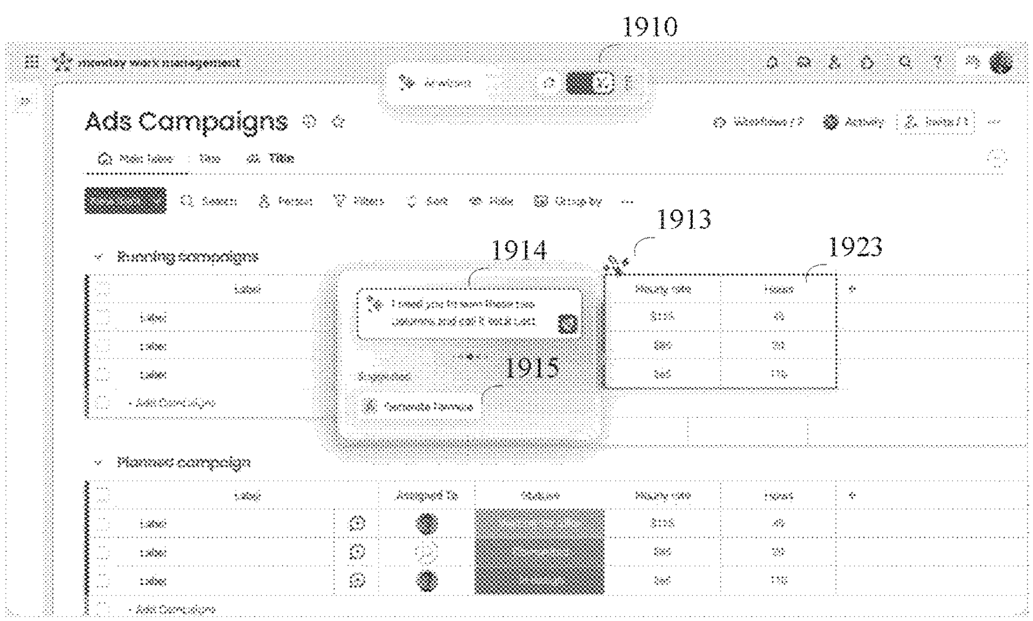
FIG. 19C illustrates an example of multi-cell selection in AI-supported state, according to some embodiments of the present disclosure.
Figure 19D:
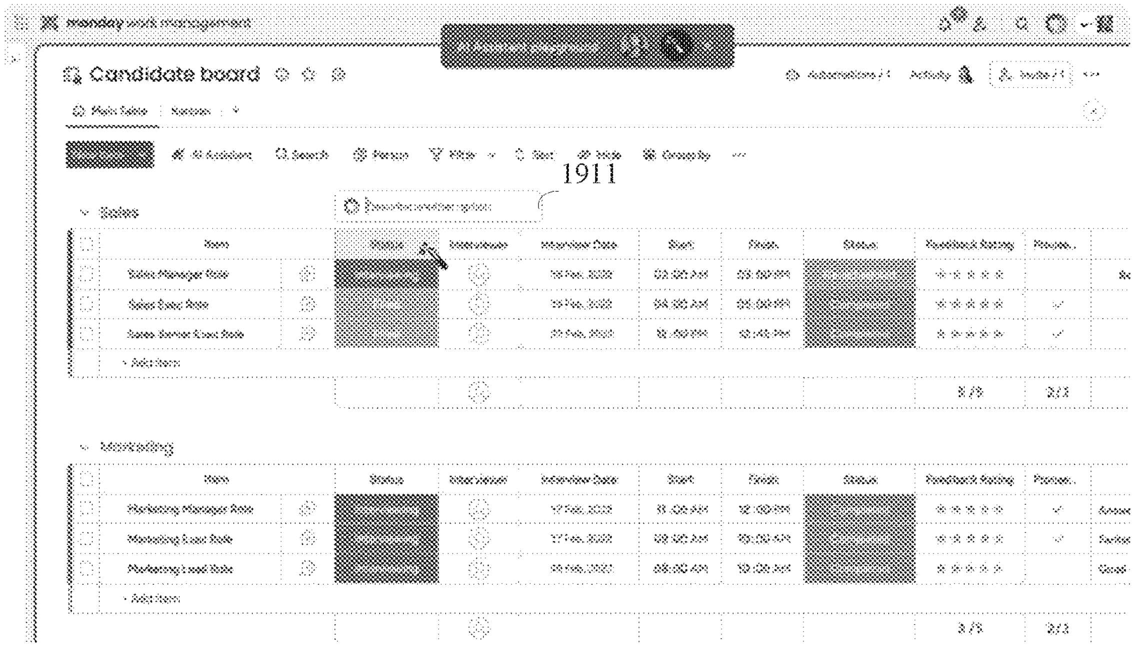
FIG. 19D shows an example of column selection and a chat interface for user queries, according to some embodiments of the present disclosure.
Figure 19E:
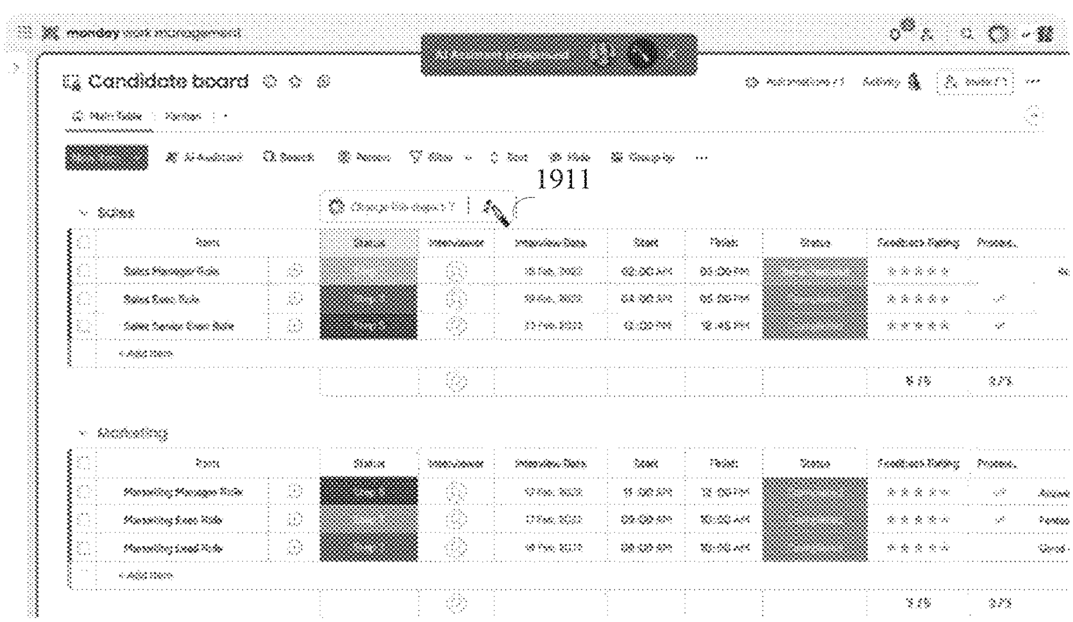
FIG. 19E depicts the result of AI-driven data transformation based on user query, according to some embodiments of the present disclosure.

Optionally, as illustrated by element 211 in FIGS. 19D and 19E and in 214 in FIG. 19C, the generative AI environment 1800 incorporates a command line interface, also referred to as a chat box, to enable users to define specific prompts regarding the marked area. This feature enhances the AI-supported functionality by allowing for more precise and customized queries. As used herein, an AI-supported functionality is a state wherein a generative model is queried about data, GUI elements or data within the context of or more GUI elements marked by the user (e.g., with a curser).

For instance, in FIG. 19D, the user has selected a status column to be processed by the generative AI model. Upon this selection, the generative AI environment 1800 presents the chat box 1911, providing an interface for the user to input additional queries related to their selection. In the illustrated example, the user has entered the query "change these steps 1-7" in association with the selected status column.

The generative AI model then interprets the user's intent based on this input and the selected data. In this case, the model deduces that the user wishes to transform the status descriptions from textual representations of process steps to numerical representations indicating the step's position in the sequence.

Following this interpretation, the generative AI model proceeds to modify the status values accordingly. As shown in FIG. 19E, the transformation has been applied. For example, the status 'open position', which represents the initial step in a seven-stage recruitment process, has been changed to 'step 1'. This modification is applied consistently across all status entries, converting each textual description to its corresponding numerical step in the process.

This functionality demonstrates the generative AI model's capability to understand context, interpret natural language queries, and execute data transformations based on user intent. It showcases the system's ability to bridge the gap between user-friendly, natural language interactions and structured data manipulations within the SaaS platform.

As shown at 1905, the generative AI environment 1800 queries the generative AI model with the target attribute. The generative AI model may be a large language model or other machine learning model trained on relevant domain knowledge and data structures similar to those used in the SaaS platform.

Optionally, different mouse-click operations in the AI-supported state trigger different AI functionalities. For example, a left-click might initiate an AI query based on visual and contextual information from the marked area, while a right-click could generate automatic suggestions for the clicked portion of the display. The suggestions may be presented in a user interface popped out in proximity to the curser as shown in 1915 of FIG. 19B. Optionally, middle-click (or scroll wheel click) might compare the selected data point to relevant benchmarks or historical data. Optionally, double-click could initiate a deep-dive analysis, providing exhaustive details about the selected data. This approach gives users quick access to different levels and types of AI assistance. The AI-dedicated functionality may enable the user to question specific portions of the displayed GUI elements for information. This could involve presenting an input user interface adapted to receive targeted queries from the user about the selected data. The generative AI environment 1800 may also determine a context of the target attribute within the data presentation and include this context in the query to the generative AI model. This context-aware querying can provide more relevant and insightful responses from the generative AI model.

As shown at 1906, the generative AI environment 1800 acquires descriptive information about the targeted one or more attributes from the generative AI model. This descriptive information may include insights, analysis, or recommendations based on the queried data.

As shown at 1907, the generative AI environment 1800 presents the acquired descriptive information to the user, optionally through the user interface of the SaaS platform. In some embodiments, the descriptive information returned by the generative AI model includes recommendations based on the determined context of the target attribute. These recommendations may suggest actions, highlight trends, or provide predictive insights based on the queried data and its context.

The acquired descriptive information may be presented as interactive elements within a messaging interface. In such embodiments, the generative AI environment 1800 maintains a chat-like interface where users can converse with the generative AI environment 1800 about the data. For example, when the generative AI environment 1800 references specific data points or sets, it can generate interactive elements that users may manipulate directly in the chat. These elements may share the same graphical characteristics (color schemes, fonts, styles) as the original data presentation in boards of the SaaS platform, for consistency. For example, if discussing sales data, the generative AI environment 1800 might generate a mini bar chart in the chat that users can click on to see more details or even modify to see how changes might affect projections.

Optionally, generative AI environment 1800's responses can include actionable recommendations. For example, for a sales dashboard, it might suggest focusing on high-performing products or regions and in a project management context, it could recommend resource reallocation based on task progress and deadlines. In another example, for financial data, it might propose investment strategies or cost-cutting measures based on observed trends. These recommendations would be tailored to the user's role and the specific context of the queried data. In some cases, the recommendations can be shown in association with corresponding buttons, and upon selection thereof, the recommendations can be performed by the AI agent. The generative AI environment 1800 may implement a dynamic recommendation interface within the SaaS platform's graphical user interface. This interface can be manifested in multiple forms:

1. Inline Buttons: The generative AI environment 1800 may render actionable buttons directly adjacent to or below the textual recommendation in the generative AI environment 1800's response. These buttons are dynamically generated based on the content of the recommendation and are visually consistent with the platform's design language.
2. Floating Action Panel: A semi-transparent panel may appear at the edge of the user's screen, containing a list of recommended actions represented as clickable buttons. This panel can be collapsed or expanded as needed.
3. Context Menu Integration: The generative AI environment 1800 may integrate recommendation buttons into the right-click context menu of relevant data elements within the SaaS platform interface.
4. Modal Dialog: For complex recommendations requiring multiple steps or confirmations, the generative AI environment 1800 may present a modal dialog box containing the recommendation details and associated action buttons.

The placement and visual styling of these buttons are determined dynamically based on factors such as screen real estate, user preferences, and/or the nature of the recommendation. Upon user selection of a recommendation button, the generative AI environment 1800 initiates a multi-step process with some or all of the following:

1. Action Validation: The AI agent first validates the current state of the generative AI environment 1800 to ensure the recommended action is still applicable.
2. Permission Check: The generative AI environment 1800 verifies that the user has the necessary permissions to execute the recommended action.
4. Resource Allocation: If required, the generative AI environment 1800 allocates necessary computational resources to perform the action.
5. Execution: The AI agent leverages its integration with the SaaS platform's API to execute the recommended action. This may involve updating database records, modifying configurations, triggering workflows, and/or generating reports.
6. Real-time Feedback: As the action is being performed, the generative AI environment 1800 provides real-time visual feedback to the user, such as progress bars or status messages.
7. Outcome Verification: Post-execution, the AI agent verifies the outcome of the action against the expected result.
8. User Notification: The generative AI environment 1800 notifies the user of the action's completion and any relevant outcomes or next steps.
9. Logging and Learning: The generative AI environment 1800 logs the execution of the recommendation and its outcomes, feeding this data back into the AI model to improve future recommendations.

This real-time interaction allows for quick what-if scenarios and immediate data manipulation based on AI insights. Optionally, a visual consistency is maintained between presentation of original data in the area indicated by the curser and AI-generated interactive elements generated to present the descriptive information. For example, color schemes are matched, so a "warning" color in the original data (e.g., red for overdue tasks) is used consistently in the interactive elements. Optionally, Fonts are kept the same for readability and brand consistency. Optionally, sizes of elements are proportionally scaled to fit within the messaging interface while maintaining relative size relationships from the original data. This consistency allows users to quickly understand the relationship between the AI-generated elements and the source data.

Optionally, the generative AI environment 1800 can be specifically trained to understand and reproduce the graphical elements of the SaaS platform. Optionally, the model learns the design language of the platform, including standard chart types, color codes, and icon usage and use it to scale and adapt visualizations for different contexts (e.g., full dashboard vs. chat interface). Optionally, SVG or other vector formats are generated using the model to ensure high-quality graphics at any scale. This specialized training allows the generative AI environment 1800 to create visualizations that feel native to the platform, enhancing the user experience.

Optionally, the interactive elements are set to allow immediate update of data in the related data structure. When a user modifies a value using an AI-generated interactive element, the change is instantly reflected in the original data structure. Websockets or similar technology may be used to ensure real-time synchronization across all views of the data. Optionally, visual cues (like brief highlighting or animations) could be used to draw attention to the updated values in the main data presentation.

Optionally, the AI environment 1800 may also maintain a history of queries and corresponding descriptive information. This historical data can be used to improve subsequent queries to the generative AI model, enhancing the relevance and accuracy of the generative AI environment 1800's responses over time. The AI environment 1800 can be configured to maintain a log of user queries and AI responses. It may track which types of queries users frequently make about certain data types and/or record which AI responses users find most helpful (perhaps through user feedback mechanisms). Optionally, over time, the generative AI environment 1800 can learn to prioritize certain types of insights or analysis based on user behavior. This historical data allows the AI environment 1800 to become more personalized and effective in its responses, anticipating user needs and providing increasingly relevant information. By implementing these features, the SaaS platform creates a sophisticated, context-aware AI assistant that can significantly enhance data analysis and decision-making processes for users across various roles and industries.

As indicated above with reference to 1911 and 1914 a context-sensitive input field such as the depicted chat box appears near the cursor when clicking in AI mode. Optionally, voice input activation button for asking questions about the selected area is provided. The context-sensitive input field may include a structured query builder that allows users to formulate complex questions about the data through a series of dropdown menus or checkboxes. These interfaces would be designed to help users articulate their questions about the data in ways the generative AI environment 1800 can effectively process.

Optionally, the generative AI model can be trained based on project management information and/or access data that includes the project management information. For example, charts showing task dependencies and timelines, burndown charts tracking project progress, resource allocation tables displaying team member assignments, risk assessment matrices, and budget tracking spreadsheets. The generative AI model provides insights such as identifying critical path tasks, suggesting resource reallocation, or predicting potential delays based on current progress.

In one embodiment of the present invention, the generative AI model employs an architecture based on the transformer model, similar to GPT (Generative Pre-trained Transformer). The model comprises an encoder-decoder structure with multiple layers of self-attention mechanisms and feed-forward neural networks. The encoder portion of the model consists of N identical layers, where N is an integer greater than or equal to 6. Each encoder layer comprises two sub-layers: a multi-head self-attention mechanism and a position-wise fully connected feed-forward network. Layer normalization is applied to each sub-layer, followed by a residual connection around each normalized sub-layer.

The decoder portion also consists of N identical layers. In addition to the two sub-layers in each encoder layer, the decoder inserts a third sub-layer, which performs multi-head attention over the output of the encoder stack. Similar to the encoder, layer normalization and residual connections are employed around each sub-layer.

The multi-head attention mechanism allows the model to jointly attend to information from different representation subspaces at different positions. This is achieved by linearly projecting the queries, keys, and values h times with different, learned linear projections, where h is an integer greater than or equal to 8. These projected versions are then processed in parallel, yielding h output values that are concatenated and once again projected, resulting in the final output.

The model may be pre-trained on a large corpus of SaaS platform data, including but not limited to: user interactions, workflow patterns, data structures, and domain-specific information relevant to various SaaS applications. Fine-tuning can be performed using transfer learning techniques to adapt the model to specific SaaS environments and use cases.

In some cases, the integration of the generative AI model into the SaaS platform is achieved through a modular, microservices-based architecture of the generative AI environment 1800. This architecture ensures loose coupling between the AI components and the existing SaaS platform, allowing for flexibility and scalability.

A dedicated AI Service, which can be an aggregation of more than one service, can act as an intermediary between the SaaS platform and the generative AI model. This service may be responsible for one or more of:

1. Request Handling: Receiving and pre-processing requests from various SaaS platform components.
2. Context Management: Maintaining and updating contextual information for each user session.
3. Model Invocation: Sending appropriately formatted prompts to the generative AI model and receiving responses.
4. Response Processing: Post-processing model outputs for integration back into the SaaS platform.

The AI Service may communicate with the SaaS platform components via a RESTful API, using JSON for data interchange. For real-time updates and notifications, a WebSocket protocol is implemented, allowing for bidirectional communication between the AI Service and the SaaS platform.

To manage data flow and ensure consistency, an Event Bus may be implemented using a publish-subscribe pattern.

This allows different components of the SaaS platform to subscribe to relevant AI-generated events and updates.

A Feature Flag system may be incorporated to enable gradual rollout of AI capabilities and easy toggling of features. This system allows for A/B testing of different AI functionalities and graceful degradation in case of AI service interruptions.

Data synchronization between the AI model and the SaaS platform can be achieved through a combination of batch processing for large-scale updates and real-time streaming for immediate changes. A Change Data Capture (CDC) system monitors the SaaS platform's databases for updates, ensuring the AI model always has access to the most current data.

The integration may be containerized using Docker, with orchestration handled by Kubernetes, allowing for easy deployment, scaling, and management of the AI services across different environments. This architecture ensures seamless integration of the generative AI capabilities into the SaaS platform, providing a robust, scalable, and flexible system that can adapt to changing requirements and growing data volumes.

Reference is now also made to FIG. 20 which illustrates a flowchart depicting a computer-implemented process for querying a generative AI model about information presented by a Software as a Service (SaaS) platform according to some embodiments of the present invention. The process enhances user interaction with complex data structures and leverages AI capabilities to provide actionable insights.

The process is optionally executed using the generative AI environment 1800 or by the exemplary SaaS platform 100 and the generative AI environment 1800.

As shown at step 2001, an artificial intelligence (AI) agent is maintained for instance by the generative AI environment 1800. This generative AI agent is uniquely configured to interact with SaaS platform data of a project, functioning as a virtual team member assigned to the project. This configuration allows the generative AI agent to understand the context and nuances of the project data, much like a human team member would.

As described herein, the generative AI agent may be executed to act as an expert collaborator having a variety of specialized functionalities. These range from assisting with daily tasks to managing complex team dynamics. The following sections detail an example of how the AI agent leverages its understanding of the software platform and user behavior to provide tailored, context-aware assistance across different scenarios.

Optionally, the generative AI agent can be based on a generative AI model that is trained on historical project data of the SaaS platform. This training improves the model's ability to identify relevant platform elements and actions, enhancing its effectiveness over time. Optionally, the SaaS platform data queried in this process is stored as a plurality of items representing the data in tables, underlining the structured nature of the data being analysed.

Optionally, the generative AI model employed in this process is trained on historical project data. This training improves the model's ability to identify relevant platform elements and actions, enhancing its effectiveness over time and allowing it to learn from past interactions and outcomes.

At step 2002, the SaaS platform data is displayed on a screen. This data is presented in at least one tabular structure comprising a plurality of interactive cells. The interactive nature of these cells allows users to engage directly with the data, such as data shown and/or stored in tabular structure(s), setting the stage for more complex interactions.

Subsequently, as shown at 2003, the generative AI environment 1800 identifies a portion of the screen marked by the user. This identification is facilitated through a graphical user interface (GUI) controlling device, which may include, but is not limited to, a mouse, touchpad, or touchscreen interface.

In one embodiment, the process of identifying the portion of the screen is refined to include a two-step analysis. First, the generative AI environment 1800 determines the number of UI elements selected within the marked area. This quantification allows for a more granular understanding of the user's selection. Subsequently, the generative AI environment 1800 associates the selected UI elements into one or more subgroups based on their characteristics. This subgrouping enables more nuanced interpretation of the user's intent and facilitates more accurate AI responses.

Building upon this subgrouping capability, the generative AI environment 1800 can identify similar UI elements, such as headlines or columns, and group them together. This grouping occurs regardless of the total number of individual elements selected, allowing for intelligent categorization of diverse data sets within a single selection. Such functionality is particularly useful in complex SaaS environments with multifaceted data structures.

Optionally, contextual analysis is used by the generative AI environment 1800 within the identified portion of the table structure. This analysis informs the subsequent querying process, ensuring that the generative AI model's interpretation is grounded in the broader data landscape. By considering the context, the generative AI environment 1800 can provide more relevant and accurate responses to user queries.

When identifying platform elements, the generative AI environment 1800 may consider both the marked portion and the context of the surrounding data in the table structure. This dual consideration allows for more accurate and relevant element identification, enhancing the generative AI environment 1800's ability to understand and respond to user queries.

Following the identification of the marked portion, as shown at 2004, the generative AI environment 1800 queries the generative AI model with this identified portion of the screen. This querying process is multi-faceted and comprises three primary operations:

Firstly, as shown at 2004A, the generative AI environment 1800 identifies one or more platform elements included in the identified portion. These elements may encompass various components of the SaaS platform, such as specific data fields, UI components, or functional modules.

Secondly, as shown at 2004B, the generative AI environment 1800 determines relationships between the identified platform elements. This determination may involve analyzing data dependencies, functional connections, or hierarchical structures within the SaaS platform.

Thirdly, as shown at 2004C, the generative AI environment 1800 determines at least one action to perform on the identified platform elements. This determination is based on the previously established relationships and the context of the user's interaction.

Finally, as shown at 2005, the process culminates in instructing the generative AI agent to notify the user of performable actions. These actions are specifically tailored to suit the determined relationships and the identified platform elements, ensuring relevance and utility to the user's current context within the SaaS platform.

This process enables more intuitive and context-aware interactions between users and complex data structures. By leveraging artificial intelligence to interpret user actions and suggest relevant operations, the present invention enhances productivity and user experience in SaaS environments.

In some implementations, the actions determined by the generative AI environment 1800 include providing context-based recommendations. These recommendations leverage the generative AI environment 1800's understanding of the data context and potential user needs, offering valuable insights and suggestions for user action.

The process may also include a mechanism for updating the table structure to reflect changes made by the generative AI agent after performing actions. This ensures that the displayed data remains current and consistent with any AI-driven modifications, maintaining data integrity across the SaaS platform.

To enhance user control and understanding, the generative AI environment 1800 may present a preview of the determined action(s) to the user before instructing the generative AI agent to perform them. This preview step allows for user validation and ensures transparency in AI-driven actions.

The generative AI environment 1800 also employs different AI behaviors based on the nature of the identified portion. For example, when two columns are selected, the generative AI environment 1800 provides automation encompassing both columns. When an action icon is selected, the generative AI environment 1800 assesses its relevance to the displayed table. For selections with unconnected elements, the user may be presented with a request for clarification. Selections with mostly connected elements trigger comprehensive generative AI environment 1800 output.

Lastly, it's noted that the SaaS platform data queried in this process may be stored as a plurality of items representing the data in tables. This structured storage approach underlies the generative AI environment 1800's ability to efficiently process and analyze complex data sets.

Optionally, the generative AI environment 1800 dynamically adapts to various user selection patterns. When a user selects two columns within the table structure, the generative AI environment 1800 automatically recognizes this as a potential comparative analysis scenario. In response, it initiates an automated process that encompasses both columns, providing insights that may include correlation analysis, trend comparisons, or other relevant statistical evaluations. This feature significantly reduces the time and effort required for users to perform complex data analyses.

Furthermore, the generative AI environment 1800 demonstrates contextual awareness when dealing with action icons within the table structure. Upon selection of such an icon, the generative AI environment 1800 doesn't merely execute the associated action blindly. Instead, it performs a rapid relevance assessment, evaluating whether the action is appropriate or recommended for the current state of the displayed table. This intelligent filtering helps prevent inadvertent data manipulations and guides users towards more meaningful interactions with their data.

As indicated above, the SaaS platform data may be stored as a plurality of items representing the data in tables. This tabular structure provides a robust foundation for data organization, facilitating efficient querying, analysis, and manipulation by both the generative AI environment 1800 and human users. The structured nature of the data storage also enables more accurate context interpretation and relationship mapping between different data elements.

Reference is also made to FIG. 21 that illustrates a flowchart depicting a computer-implemented process for querying a generative artificial intelligence (AI) model about color context in structured data, according to some embodiments of the present invention. The process is optionally executed using the generative AI environment 1800 or by the exemplary SaaS platform 100 and the generative AI environment 1800.

This process enhances data analysis by incorporating color-based context into AI interpretations. FIG. 21 illustrates a color-context aware data analysis system implemented within a SaaS platform environment. As used herein a color-context aware data analysis is a method of data analysis that incorporates the semantic meaning of colors used in data presentation to enhance interpretation and insights. This approach allows a generative AI model to consider color-based context when analyzing structured data, potentially leading to more nuanced and accurate interpretations based on industry-specific or user-defined color-coding conventions. The system utilizes a generative AI model to interpret and analyze tabular data structures with a unique focus on color-based context. At the core of the system is a neural network-based generative AI model that optionally has been trained on vast datasets of color-coded information. This model employs a combination of neural networks (NNs) for processing visual data and transformer architectures for understanding contextual relationships. The model's training process involves techniques such as transfer learning and fine-tuning to recognize industry-specific color conventions and their semantic meanings.

As shown at 2101, a tabular data structure is maintained, for instance by the SaaS platform 100. The tabular data structure may be implemented as a multi-dimensional array, where each cell not only contains alphanumeric data but also metadata about its visual properties, including color values (e.g., RGB), opacity, and other graphic attributes. This rich data structure allows for responding to queries from a user as described below. The queries can target both content and visual characteristics simultaneously as exemplified below. This rich data structure may serve as the foundation for the color-context analysis. In parallel, at 2102, this tabular data structure is displayed to the user, allowing for visual interaction with the data. The tabular data structure may be part of a Software as a Service (SaaS) platform interface or any other cloud-based business software environment.

In one example, the SaaS platform 100 maintains a two-dimensional tabular structure with rich metadata. Each cell within this structure contains not only alphanumeric data but also comprehensive metadata detailing its visual properties. These properties include, but are not limited to, color values (such as RGB), opacity levels, and various other graphic attributes. This enriched data structure facilitates complex queries that can simultaneously target both content and visual characteristics. To illustrate the significance of color-based context, consider the following exemplary implementation. In a project management scenario, the SaaS platform 100 utilizes color-coding to convey task status information. For instance, the text "In Progress" may appear in different colors to indicate varying levels of urgency or attention required. When displayed in yellow, it signifies that the task is actively being worked on but not urgent. The same text rendered in red, however, alerts users that the task is behind schedule and requires immediate attention. Without this color-based differentiation, both instances would appear identical, potentially leading to critical misinterpretations of task priorities.

Another example is in financial reporting applications, the SaaS platform 100 can be configured to employ color to represent performance metrics relative to predefined targets or historical data. Numerical values, such as revenue figures, can be dynamically color-coded. For example, black text might indicate performance within expected parameters, green text could signify exceeding targets, while red text would alert users to performance below expectations. Thus, a value like "$500,000" carries significantly different implications depending on its color, providing instant insights that would not be immediately apparent in a monochromatic display.

This color-context capability serves as the foundation for advanced context related data analysis within the SaaS platform 100. The tabular data structure, along with its rich color-based contextual information, is displayed to the user through the SaaS platform interface or other cloud-based business software environments. This implementation enables users to visually interact with the data, leveraging the additional layer of information provided by the color-coding to make more informed and rapid decisions based on complex data sets.

As shown at 2103 a generative AI model may be maintained. This model is specifically adapted to be prompted with at least a portion of the tabular data structure, enabling processing and analyzing the structured data effectively. The generative AI model can be trained based on a history of color-context interpretations. The historical data maintenance is implemented using a time-series database that stores past color-context interpretations. This database can be periodically used to retrain and fine-tune the generative AI model, implementing a form of continual learning that improves performance over time.

At 2104, the system receives a first user query. This query pertains to a selected portion of the tabular data structure, indicating the user's initial area of interest within the data.

The system then proceeds to 2105, where it queries the generative AI model with the selected portion. This query results in the acquisition of a first contextual output, representing the generative AI environment 1800's initial interpretation of the data without color context.

In 2106 the system receives a user input that associates at least one component of the selected portion with a color. This color association adds a new layer of context to the data. 2104 and 2106 may utilize event-driven programming to capture user inputs. In some cases, the generative AI environment 1800 may employ a pixel-perfect selection algorithm that can identify and record the exact pixels marked by the user, translating these selections into precise data ranges within the tabular structure. In other cases, the color is derived from the database as one of the data characteristics of a datapoint.

Optionally, the generative AI model's configuration may allow it to interpret identical alphanumeric values differently based on their associated color properties within the tabular data structure.

Optionally, relationships between color-associated components and non-color-associated components within the selected portion are analyzed. This analysis derives additional context, further enriching the generative AI environment 1800's interpretation of the data.

Optionally, the generative AI model is trained to recognize common color-coding conventions used in various industries or project management methodologies. In some cases, the color-coding conventions cab ne recognized globally, or be recognized based on a local use in an account. This training enhances the model's ability to provide relevant and accurate interpretations across different domains.

Following this color association, at step 2107, the system again queries the generative AI model. This time, the query includes the color-associated selected portion. The result is a second contextual output that takes into account the newly added color information. The difference between the first and second outputs is recognized within the generative AI model's processing pipeline, specifically in its interpretation layer. This layer is designed to consider both the textual content and the associated color metadata when generating contextual outputs.

For example, consider a project management scenario where a user selects a column of task statuses (such as column 342 in FIG. 1B). In the initial query (step 2105), without color association, the AI model might provide a generic summary of task distribution. However, after color association (step 2107), the model's interpretation can be changed significantly.

An exemplary initial output (step 2105), can read: "The selected column contains 10 tasks: 4 are marked as 'In Progress', 3 as 'Completed', and 3 as 'Pending'.". An exemplary color-associated output (step 2107) can read: "The selected column indicates varying levels of urgency among 10 tasks. 4 tasks marked 'In Progress' are color-coded yellow, suggesting normal progression. However, 3 'Pending' tasks are highlighted in red, indicating critical delays requiring immediate attention. The 3 'Completed' tasks in green suggest successful on-time completion.".

In the above example, the color association enables the AI model to provide an actionable interpretation of the data, recognizing urgency levels and potential issues that were not apparent from the text alone. This enhanced contextual understanding allows offering more valuable insights and recommendations to the user, demonstrating the significant impact of color-based context in data analysis within the SaaS platform. The difference between the first and second outputs is directly associated with the color of the component(s) in the tabular data structure. This difference demonstrates how color context can significantly alter the generative AI environment 1800's interpretation and analysis of the data. This process allows using color not just as a visual element but as a meaningful context that can influence AI-driven insights. It allows for more nuanced and potentially more accurate interpretations of structured data, opening up new possibilities for data visualization and analysis in various fields.

2105 and 2107 may involve data preprocessing wherein the selected portion of the tabular structure is converted into a tensor representation that preserves both the alphanumeric values and color information. The generative AI model may generate high-dimensional embeddings for the input data, capturing both semantic and visual features. Attention mechanisms within the model may set to focus on relevant parts of the input, considering color-based relationships and to produce a contextual output using a decoder structure, which can be fine-tuned to generate different types of insights or recommendations. While referred to separately, 2105 and 2107 can be combined, can be practically implemented as a single query detailing both textual content and color context.

The ability to interpret the same alphanumeric value differently based on color may be achieved through numerous methods. For example, by using a multi-modal fusion approach that combines separate neural pathways for processing numeric data and color data, which are then integrated in higher layers of the network to produce a unified interpretation. A generative adversarial network (GAN) component may be utilized, for instance a GAN trained to understand existing color schemes and to generate new color recommendations within the context of the data.

Following step 2107 in FIG. 21, the system may identify an area in a display, for example a plurality of pixels, marked by the user, defining color attributes for a specific region of the tabular data structure. It then queries the generative AI model with both the selected portion and these color attributes, acquiring additional contextual information. Based on this information, the system calculates instructions to color another region of the tabular data structure and executes these instructions. This allows to extrapolate color-based insights to other parts of the data.

If required, after step 2107, recommendations for contexed based color usage may be generated based on the generative AI model's interpretation of existing color context within the tabular data structure. This feature allows the generative AI environment 1800 to suggest optimal color coding for data visualization and interpretation.

For example, the generative AI agent can be configured to suggest color coding for unmarked portions of the tabular data structure based on its interpretation of existing color-coded sections. This proactive action extends the color-context analysis beyond user-defined areas, enhancing data visualization and interpretation across the entire tabular structure.

For example, consider the tabular structure shown in FIG. 19B, which represents a project management board. In this scenario, the "Status" column has been partially color-coded by the user:

1. "Completed" tasks are marked green
2. "Stuck" tasks are marked red
3. "Waiting for other" tasks are marked orange.

However, some rows in the "Status" column remain unmarked. The generative AI agent, upon analyzing the existing color-coded sections, can suggest extending this color scheme to the unmarked areas. The process would work as follows:

1. The AI agent analyzes the existing color-coded cells in the "Status" column, recognizing the pattern: green for completed tasks, red for blocked tasks, and yellow for in-progress tasks.
2. For the unmarked cells in the "Status" column, the AI agent examines the textual content and context of each cell.
3. Based on this analysis, the AI agent suggests appropriate colors for the unmarked cells. For instance:
   - A task with the status "Under review" might be suggested to be colored orange, indicating it is near completion but not yet done.
   - A task marked "Not started" might be suggested to be colored blue, signifying it's planned but not yet in progress.
4. The AI agent may present these suggestions to the user, possibly through a pop-up interface similar to the one shown in FIG. 19B (element 1915), but tailored for color suggestions.
5. The interface could display previews of how the table would look with the suggested color coding applied, allowing the user to accept, modify, or reject the suggestions.
6. If accepted, the system applies the suggested color coding to the previously unmarked cells, creating a consistent color scheme across the entire "Status" column.

Reference is also made to FIG. 22 that illustrates a flowchart depicting a computer-implemented process for generating interactive elements in a messaging session, leveraging an AI agent utilized as a chatbot that is capable of utilizing graphical representations of UI elements in its output, according to some embodiments of the present invention. This process enhances user interaction with tabular data through an AI-driven messaging interface, and increasing clarity of alphanumeric data in the messaging interface while concurrently providing context thereto. The process is optionally executed using the generative AI environment 1800 or by the exemplary SaaS platform 100 and the generative AI environment 1800.

As shown at 2201, the SaaS platform 100 displays data in a tabular structure. This structure comprises a plurality of interactive cells, each possessing distinct graphical characteristics such as color, font, borders, or icons.

As shown at 2202 a messaging session is maintained with a generative AI agent within a messaging GUI element. This messaging interface serves as the primary interaction point between the user and the AI agent.

As shown at 2203, the generative AI environment 1800 identifies a query about the tabular structure within the messaging session. This could be a natural language query typed by the user or selected from predefined options. The query, as well as the entire messaging session, can occur within the SaaS platform on which the tabular structure is displayed, or in a different third-party app.

As shown at 2204, the generative AI environment 1800 involves prompting a generative AI model with the identified query. The generative AI model, trained on both textual and visual data, processes the query in the context of the tabular structure. Optionally, the generative AI model is specifically trained to recognize and replicate graphical characteristics. It can be configured to employ a combination of computer vision techniques and style transfer learning to analyze the visual aspects of the tabular structure. The model uses this analysis to generate visually consistent interactive elements, essentially functioning as an AI-driven UI designer.

Optionally, the generative AI model can be configured to incorporate a color interpretation module. As described above. Shortly, this module can be configured to analyze the color-based context in the tabular structure using color theory algorithms and domain-specific knowledge bases. The interpreted color context influences both the content and appearance of the generated interactive elements, ensuring that color-based meanings are preserved and reflected.

As shown at 2205, the generative AI environment 1800 uses the generative AI model for generating a response that is associated with a subgroup of the plurality of interactive cells. This response is based on the model's understanding of the query and its analysis of the tabular data.

As shown at 2206, an interactive element is generated within the messaging GUI element. In some cases, in addition to the textual response, the interactive element also includes a graphical, interactive representation of at least one UI element from one or more of the tabular structures that are associated with the query. In such cases, the interactive element can be configured to mimics the structure and/or visual characteristics of the referenced one or more cells. In some cases, the interactive element is a mirrored instant of the one or more cells, that function identically to the same one or more cells in the corresponding table.

Optionally, the system ensures that the generated interactive element mimics the common graphical characteristics of the corresponding cells in the tabular structure. These characteristics include color schemes, font types and sizes, and overall styling. This visual consistency is achieved through a style transfer algorithm that extracts and applies the relevant CSS properties.

In some embodiments, the generative AI agent is capable of generating multiple interactive elements within a single message response. Each of the interactive element can be configured to correspond to a different subgroup of the tabular structure, allowing for complex, multi-faceted interactions. This is achieved through a modular generation approach where each interactive element is created independently but with awareness of the others.

As shown at 2207 the generated interactive element may share common graphical characteristics with the corresponding member(s) of the subgroup it represents. This visual consistency helps users quickly associate the interactive element with the relevant data in the table.

As shown at 2208, the system may add the interactive element as part of the message response in the messaging session. This integration allows users to interact with and modify data directly within the messaging interface.

Optionally, the system implements a real-time data synchronization mechanism. This mechanism may operate in one or both of the following modes:

System-Initiated Command Mode: In this mode, the interactive elements can trigger pre-defined system commands. For example, an interactive element might include a button labeled "Set to 5," which, when activated, instructs the system to change a specific value in the underlying data structure to 5. This mode allows for rapid, predefined data manipulations without requiring direct user input of values.

User-Driven Manual Edit Mode: the interactive elements can provide user interface components that allow direct manual editing of data values. For instance, an interactive element might present an editable text field where the user can input a new value for a specific data point.

In both modes, when a user may interact with these elements to modify a value, whether through a system-initiated command or manual edit, the change is immediately propagated to the underlying tabular structure. This propagation is accomplished through WebSocket connections or a similar real-time communication protocol, ensuring data consistency across all views of the SaaS platform.

As described in preceding sections of this disclosure, the interactive elements generated within the messaging interface may not be mere representations of the data, but rather function as instances of the cells from the original tabular structure. These instances are implemented as pointers to the corresponding entries in the database. This architecture ensures that any modifications made through the interactive elements in the messaging interface directly affect the source data, maintaining a single source of truth across the entire system.

Optionally, the system continuously monitors user interactions with the generated interactive element. It can provide context-aware suggestions or validations using a separate inference model that considers the current state of the data, historical interactions, and predefined business rules. These suggestions appear as tooltips or inline messages within the messaging GUI.

The generative AI model ability to utilize graphical representations of UI elements in its output is central to this process. It enables the generative AI environment 1800 to create rich, visually consistent interfaces that bridge the gap between conversational interaction and data manipulation. By replicating the graphical characteristics of the original tabular structure, the bot ensures that users can seamlessly transition between viewing data in the table and interacting with it in the messaging session.

Optionally, the system maintains an interaction history database that records all user interactions with the generated interactive elements. This historical data is used to periodically retrain and fine-tune the generative AI model, implementing a feedback loop that continuously improves the model's response quality and relevance.

Optionally, the entire process depicted in FIG. 22 is integrated into a Software as a Service (SaaS) platform interface. This integration allows for seamless data flow between the messaging component and other platform services, leveraging cloud-based resources for scalability and performance. This process represents a significant advancement in AI-driven user interfaces, combining the intuitiveness of chat interactions with the power of direct data manipulation, all while maintaining visual consistency across different interface elements.

Reference is now also made to FIG. 23 that illustrates a flowchart depicting a computer-implemented process for operating a software as a service (SaaS) platform, with a focus on cross-application generative AI agent interaction triggered by user mentions, according to some embodiments of the present invention. The process is optionally executed using the generative AI environment 1800 or by the exemplary SaaS platform 100 and the generative AI environment 1800. As used herein, a cross-application generative AI agent interaction is a capability within a SaaS platform where a generative AI agent can perform actions or access information across multiple applications or platform elements based on a single user interaction or command. This allows for seamless integration of AI assistance across different components of the SaaS ecosystem, enabling more efficient and comprehensive task completion without requiring the user to switch between different applications manually.

As shown at 2301, a messaging session with a generative AI agent is maintained, for instance by the generative AI environment 1800. This messaging session serves as an interface for user-AI interaction within the SaaS platform. The generative AI agent may be a generative AI agent as described herein.

At 2302, the system identifies a section of text message issued by a user that textually refers to an alphanumeric identifier of the generative AI agent in a first platform element.

This identification may be triggered for example by the use of an "@" sign followed by the generative AI agent's name in the chat interface of the first application. The system may use a regular expression parsing to identify these mentions in real-time as users type in the messaging interface.

Optionally, when the generative AI agent's identifier is recognized, the system initiates a secure authentication process. This process involves generating temporary credentials or tokens for the generative AI agent, allowing it to access the messaging session and relevant platform elements. These credentials are managed by a secure key management service and are time-limited for enhanced security.

The generative AI agent's capability to perform actions across multiple platform elements from a single mention as described herein may be implemented through a task decomposition and routing system. This system may break down complex instructions into atomic tasks, determine the relevant platform elements for each task, and manage the execution flow across these elements. The system may use a combination of rule-based logic and machine learning models to optimize task distribution and execution.

At 2303 text and platform elements in a certain platform element are used to identify one or more user instructions in the messaging session. The system employs natural language processing (NLP) techniques to parse the user's message and extract actionable instructions.

In 2304, the system identifies references to one or more platform elements other than the certain platform element that are associated with the instructions. This step is crucial for enabling cross-application functionality, as it determines which other applications or elements within the SaaS platform need to be accessed or modified.

In the context of step 2304, the system may employ a microservices architecture that allows different applications within the SaaS platform to communicate. Each application may expose a standardized API, enabling the generative AI agent to interact with them seamlessly. This cross-application functionality is managed by an orchestration layer that routes requests and data between applications.

For scenarios where the certain platform element and other elements are within the same application, the system may utilize an intra-application communication framework. This framework allows different modules or components of the application to interact, leveraging shared memory or internal messaging queues for efficient data exchange.

At 2305 a generative artificial intelligence (AI) model associated with the generative AI agent is being prompted. This model is tasked with generating SaaS platform instructions for changing one or more values in the identified platform elements, in accordance with the user instructions.

Optionally, the generative AI model is trained on a diverse dataset that includes examples of cross-platform interactions and context. It uses transfer learning techniques to apply knowledge from one platform element to another, and employs attention mechanisms to focus on relevant contextual cues across different elements.

Optionally, the system maintains a dedicated database for storing the history of cross-platform actions triggered by generative AI agent mentions. This historical data may be used in a continuous learning pipeline that periodically retrains the generative AI model, using techniques like incremental learning to improve its performance over time.

At 2306, the system executes the SaaS platform instructions generated by the generative AI model. This execution may involve API calls to different applications within the SaaS ecosystem, database updates, or other programmatic actions to effect the requested changes.

Optionally, the system generates a visual representation of the affected platform elements. This visualization is created using a dynamic rendering engine that can produce interactive diagrams or flowcharts. It leverages data from the executed instructions to show before-and-after states of the modified elements.

In 2307, the system notifies the user of the execution. This notification may be sent back through the original messaging session, closing the interaction loop.

The notification process in step 2307 is enhanced with a context-aware notification system. This system determines the most appropriate platform element for sending the notification based on user preferences, current active sessions, and the nature of the executed action. It uses a publish-subscribe model to ensure notifications are delivered in real-time.

Optionally, the notification is extended to include detailed messaging within the original messaging session. The system generates a structured message that outlines the changes made, optionally using a template engine to format the information clearly and consistently.

In this process actions may be triggered in one application (or multiple applications) by mentioning the generative AI agent in another application. This is achieved through a cross-application communication layer that allows the generative AI agent to seamlessly operate across different elements of the SaaS platform.

The generative AI agent's ability to understand context across different applications is powered by a unified data model that represents the entire SaaS ecosystem. This model allows the generative AI environment 1800 to make informed decisions about how to interpret and execute user instructions, even when they involve multiple platform elements. This process represents a significant advancement in SaaS platform operation, enabling more natural and efficient user interactions by allowing users to initiate complex, cross-application workflows through simple chat commands. It leverages the power of AI to bridge the gaps between different platform elements, creating a more integrated and responsive user experience.

Reference is now also made to FIG. 24 that illustrates a flowchart depicting a computer-implemented process for using generative artificial intelligence for intent-based interaction with a SaaS platform, focusing on the AI-driven creation of platform elements based on user requirements. The process is optionally executed using the generative AI environment 1800 or by the exemplary SaaS platform 100 and the generative AI environment 1800.

As shown at step 2401, a plurality of task tables are maintained for instance by the exemplary SaaS platform 100. Each task table contains multiple items, with each item defined by a row of cells, and each cell associated with a specific workflow step. This structured data forms the foundation for the generative AI environment 1800's understanding of workflow processes within the SaaS platform.

Optionally, the exemplary SaaS platform 100 maintains a plurality of task tables, each containing multiple items. Each item is defined by a row of cells, with each cell associated with a specific workflow step. This structured data forms the foundation for the generative AI environment 1800's understanding of workflow processes within the SaaS platform. The task tables are stored in a distributed database system, allowing for efficient access and real-time updates.

At 2402, a generative AI model is maintained for instance by the AI environment system 1800. This model is trained based on analysis of interactions with alphanumeric data stored in the plurality of task tables, enabling it to understand patterns and relationships within the workflow data.

Optionally, a natural language processing (NLP) module is used to receive and interpret natural language requests to build platform elements. This module uses advanced language models (e.g., BERT or GPT) to parse the request and extract key information. The generative AI model then analyzes this parsed data in the context of the existing SaaS environment to deduce the main requirements of the requested platform element.

Optionally, the generative AI model maintenance includes a feedback loop mechanism. This mechanism collects user feedback and usage data of created platform elements, using techniques like A/B testing and user behavior analytics. The collected data is then used to fine-tune the generative AI model through techniques such as reinforcement learning and online learning.

Optionally, the generative AI model is maintained using a transformer-based architecture such as GPT (Generative Pre-trained Transformer). This model is continuously trained using federated learning techniques on the alphanumeric data stored in the task tables. The training process involves:

1. Data preprocessing: Cleaning and normalizing input data
2. Embedding generation: Creating dense vector representations of task table elements
3. Self-supervised learning: Predicting masked elements in the task tables
4. Fine-tuning: Adjusting the model based on specific SaaS platform use cases The model uses attention mechanisms to understand patterns and relationships within the workflow data, enabling it to generate contextually relevant platform elements.

At step 2403, the system receives a user selection indicative of a desired platform element to be added to the SaaS platform. This could be a natural language request or a selection from predefined options. Optionally, a user selection indicative of a desired platform element to be added to the SaaS platform is received. This input is processed through a natural language understanding (NLU) module, which uses named entity recognition and intent classification to interpret the user's requirements.

Optionally, the NLU module or any generative AI agent described herein identify user intent through various forms of input, moving beyond traditional command-based interactions. This intent-based user interface allows for a more natural and intuitive interaction between the user and the software platform.

The generative AI agent (or NLU) module are capable of processing inputs in multiple formats, including natural language text, voice commands, gestures and actions within the user interface, and/or selections of UI elements. When a user provides input through any of these methods, the generative AI agent analyzes the input to determine the user's underlying intention. This analysis can take into account not only the literal content of the input but also the context of the user's current task, historical interactions, where the query initiated from, and the overall state of the account in the platform.

For example, if a user selects a status column in a project management board and says "change this to steps 1 through 7", the generative AI agent understands that the intention is to convert text-based status descriptions into a numerical sequence. It can then proceed to implement this change without requiring the user to specify the exact steps or use predetermined commands.

In cases where the user's intent is not immediately clear, the generative AI agent may be programmed to engage in a clarifying dialogue. It may ask follow-up questions or present options to the user, ensuring that it accurately understands and executes the desired action. This iterative process allows for a more collaborative and responsive interaction between the user and the generative AI agent.

Moreover, the generative AI agent can interpret non-textual inputs as indicators of intent. For instance, assigning the generative AI agent to a specific item in a table might be interpreted as granting permission to access and manage that item's data. This ability to infer intent from actions allows for more efficient workflows and reduces the need for explicit instructions.

The intent-based UI also allows the generative AI agent to import or simulate familiar UI elements from other applications when needed. This feature can help users provide input in a context they're accustomed to, further streamlining the interaction process.

By leveraging this intent-based approach, our generative AI agent can function more like a knowledgeable colleague than a tool, understanding and executing complex tasks based on natural human communication. This significantly reduces the learning curve for new users and increases overall productivity by allowing users to focus on their goals rather than on how to operate the software. Moreover, this process can be extended to handle complex, multi-element interactions within the SaaS platform. For instance, when a user requests to "build me a board to manage supply for a company X" the generative AI environment 1800 doesn't merely create a simple, isolated board. Instead, it intelligently chooses and integrates the right components across multiple platform elements. These components are selected not only for their individual functionalities but also for their potential to work together synergistically. The generative AI environment 1800 considers how automations can utilize the data in these various platform elements to create a fully automated, interconnected board. This holistic approach results in a comprehensive solution that anticipates the user's needs, incorporating data flows, automated processes, and intelligent insights across multiple aspects of supply management for company X. By understanding the broader context and potential of the request, the AI agent delivers a solution that is greater than the sum of its parts, further exemplifying its role as a sophisticated, context-aware collaborator in the SaaS environment.

At 2404, the generative AI model is used to calculate instructions for adding the platform element, for instance based on the intent. Here, the main requirements of the requested platform element in the context of the user's request are deduced. The existing workflow structures (i.e., project management pipelines, task assignment hierarchies, approval processes, data input forms, reporting dashboards, and integration points with external systems), and user interactions may be analyzed to understand the intent behind the request.

Following the deduction, the generative AI model may employ a hierarchical task decomposition algorithm. This algorithm breaks down the main requirement into specific functionalities and data display needs. It utilizes a knowledge graph that maps relationships between different SaaS platform functionalities and data types to ensure comprehensive coverage of the deduced requirements.

Optionally, when the generative AI model is prompted with the processed user requirements, it employs a multi-step reasoning process for understanding the existing workflow structures, breaking down complex requirements into atomic tasks, matching required functionalities to existing platform capabilities, and proposing new elements where existing ones don't suffice. The model may output a set of instructions for adding the platform element, formatted in a domain-specific language interpretable by the SaaS platform's execution engine.

In 2405, one or more workflow steps are implemented by two or more platform elements. This step involves breaking down the deduced requirements into specific functionalities and determining what data should be shown to satisfy these requirements. The system executing the process may identify one or more workflow steps by two or more platform elements involving functional decomposition of the workflow step, capability matching with existing platform elements and/or compatibility analysis between potential implementing elements.

At 2406, the generative AI model is utilized to calculate which of the two or more platform elements would be most suitable for the workflow in the SaaS platform context. The generative AI environment 1800 considers factors such as user preferences, existing workflow structures, and platform capabilities to make this determination.

Optionally, the analysis is used to determine the most suitable platform elements. It uses a multi-criteria decision-making algorithm that considers factors such as functionality match, performance metrics, user preferences, and integration complexity. This algorithm generates a scoring matrix for potential elements and selects the optimal combination.

Optionally, a preview of the platform element is generated and presented to the user, for instance using a sandboxed environment. This preview is presented to the user through an interactive interface. User feedback is collected via a structured feedback mechanism, which is then analyzed by the generative AI model. The model uses this analysis to adjust its instructions, potentially triggering a re-execution of 705 and 706 if changes are needed.

Optionally, the generative AI model calculates which of the identified platform elements would be most suitable for the workflow. This calculation may involve a multi-criteria decision analysis considering factors such as functional fit, user preferences. performance metrics, and/or integration complexity. Monte Carlo simulations may be used to predict the effectiveness of different element combinations. A/B testing recommendations for ambiguous cases may be used.

In case where several elements are to be added—the ones that are chosen are selected by their ability to be used in automation later/in accordance with how other accounts used them.

In 2407, the instructions to implement the platform element are performed. This involves constructing the new element using the selected components, integrating it into the existing workflow, and ensuring it meets the deduced requirements.

Optionally, constructing the new element involves an automated build process wherein a component-based architecture is used where platform elements are modular and can be dynamically assembled. A build orchestrator manages the process, using dependency injection to combine the determined suitable elements into a cohesive new platform element.

Optionally, the platform elements referred to herein are implemented as flexible, multi-purpose components. Boards are implemented as Kanban-style interfaces, dashboards as customizable data visualization panels, and workflows as directed graph structures representing process flows. Each type is built on a common framework allowing for consistent integration and interaction within the SaaS platform.

Optionally, a detailed instruction set for adding the platform element is used. This involves a layout engine for arranging visual components, a data binding system for configuring data sources, and an event-driven programming model for setting up interactive features. These systems work together to create a fully functional and integrated platform element.

Optionally, the system executing the process executes the calculated instructions to implement the platform element by element instantiation in a sandboxed environment, integration with existing workflow structures, data binding and state management setup, user interface generation, automated testing of the new element and/or gradual rollout with real-time monitoring for any issues.

The intent-based user interface, combined with the generative AI model-based functionalities ensures that the AI model continually enhances its role as an expert collaborator, providing increasingly valuable assistance as it gains more context and understanding of user preferences and workflows.

This process may be implemented as a continuous learning pipeline that runs parallel to the main process flow. This pipeline constantly monitors user interactions with created platform elements, collecting usage data, performance metrics, and explicit user feedback. This data is used to update the generative AI model through techniques like incremental learning and adaptive boosting, ensuring the model's recommendations and builds improve over time. These technical implementations ensure that the SaaS platform can efficiently handle complex, user-intent driven creation of platform elements. The system's ability to understand natural language requests, deduce complex requirements, and autonomously construct and refine suitable platform elements represents a significant advancement in AI-driven SaaS platform customization and expansion.

This process provides an ability to understand user intent, deduce complex requirements, and autonomously construct suitable platform elements. The generative AI environment 1800 acts as an intelligent system architect, capable of designing and implementing custom workflow solutions based on high-level user inputs. This approach leverages the generative AI environment 1800's deep understanding of the SaaS platform's structure and capabilities, allowing it to create tailored solutions that seamlessly integrate with existing workflows. By automating the process of platform element creation, it significantly reduces the time and expertise required to extend and customize the SaaS platform, enabling more agile and responsive business processes.

In one embodiment of the present invention, the system's ability to choose between multiple potential implementations for each workflow step is demonstrated in the context of a customer relationship management (CRM) process within a SaaS environment.

For instance, consider a workflow step labeled "Lead Qualification." The generative AI model, upon analyzing the user's specific SaaS environment, historical data, and current requirements, may identify multiple potential implementations for this, for instance a rule-based scoring system, a machine learning-based predictive model and/or a hybrid approach combining human input with automated scoring.

The generative AI model then evaluates these options based on various factors, including but not limited to:

a) The volume of lead data available in the user's system
b) The complexity of the user's sales cycle
c) The accuracy requirements specified by the user
d) The available computational resources in the user's SaaS environment
e) The level of human expertise available for lead qualification After this comprehensive analysis, the system might determine that for this particular user, the hybrid approach (option 3) is optimal. This decision could be based on the generative AI environment 1800's assessment that while the user has sufficient data for some automation, their sales cycle complexity requires human insight for optimal results.

The generative AI environment 1800 then proceeds to implement this hybrid approach by:

generating a machine learning model to provide initial lead scores, creating an interface for sales representatives to review and adjust these scores, and/or implementing a feedback loop where human adjustments are used to continually improve the machine learning model.

Reference is now also made to FIG. 25 that illustrates a flowchart depicting a computer-implemented process for using generative artificial intelligence to create custom SaaS platform products by combining functionalities from existing products. This process leverages the concept of instant product by functionality to create tailored solutions based on client requirements. This embodiment of the present invention may be based on a SaaS platform architected on a modular structure, comprising a series of specialized building blocks that form the foundation of each product within the platform. This modular architecture can be conceptualized as a sophisticated "digital Lego" system, where each block represents a distinct functionality or feature.

The platform's architecture may include a Core Framework serving as the base layer upon which all products are built. This framework encompasses essential services such as user authentication, data storage, and basic UI rendering. Atop this foundation, the system implements Functional Modules, which are self-contained units of functionality that can be combined to create various products. These modules may include, but are not limited to, Data Visualization, Workflow Automation, Reporting and Analytics, Communication and Collaboration, and Integration and API functionalities.

Further enhancing the platform's capabilities are Product-Specific Modules, which are specialized building blocks designed for specific products within the SaaS platform. For example, a CRM product might incorporate Lead Scoring and Sales Pipeline modules, while a Project Management product could utilize Gantt Chart and Resource Allocation modules. The architecture also incorporates a Customization Layer, allowing for the fine-tuning and adaptation of modules to meet specific client needs.

Optionally, to support the functionality of this modular system, an Inter-module Communication Protocol is used, providing a standardized method for modules to interact and share data. This protocol ensures seamless integration regardless of the combination of modules used, thereby maintaining system cohesion and efficiency.

The generative AI environment 1800 interacts with this modular structure, for example through a multi-step process. Initially, it analyzes client requirements and maps them to existing functional and product-specific modules. Subsequently, it identifies optimal combinations of these modules to fulfill the client's needs. The generative AI environment 1800 then utilizes the customization layer to adjust modules as necessary, ensuring a tailored fit for the client's specific requirements. Finally, the generative AI environment 1800 employs the inter-module communication protocol to ensure all selected modules work harmoniously within the newly created product.

This modular approach, when coupled with the generative AI environment 1800's capability to intelligently select and combine modules, allows for the rapid creation of highly customized SaaS products. It enables the system to leverage existing, well-tested components while still providing a tailored solution, significantly reducing development time and ensuring reliability.

Moreover, this architecture facilitates easy updates and expansions of the platform's capabilities. New modules can be seamlessly integrated into the system, immediately becoming available for the generative AI environment 1800 to incorporate into future custom products.

This embodiment of the present invention thus represents a significant advancement in the field of SaaS platform development and customization, offering unprecedented levels of flexibility, efficiency, and adaptability in creating bespoke software solutions.

The process is optionally executed using the generative AI environment 1800 or by the exemplary SaaS platform 100 and the generative AI environment 1800.

As shown at 2501, a plurality of products are maintained within the SaaS platform 1800. Each product contains a set of unique, product-specific functionalities. These functionalities are built on a common base, referred to as WorkOS, which provides a consistent foundation for all products.

Optionally, a collaborative development environment is executed by the system 1800 or the platform 100 to allow users to be assigned to specific products and to create and modify functionalities. This environment uses version control and merge request systems to manage user-created functionalities, ensuring they integrate seamlessly with the product ecosystem.

As shown at 2502, the system 1800 receives an input, including specification of requirements for a new SaaS platform product. For example, this input may be in the form of a detailed brief or a set of desired features and outcomes.

Optionally, a natural language processing (NLP) module can be applied to analyze the specification. The analysis may be a semantic analysis and keyword extraction techniques may be applied to identify key functionalities required, creating a structured representation of the requirements for the generative model to process.

As shown at 2503 a generative AI model is prompted with the user specification. This generative AI model has been trained on comprehensive data documenting the existing plurality of products and their functionalities. The generative AI model's task is to identify required functionalities for the new product, drawing from two or more of the existing products.

Optionally, the generative model in step 803 is trained using a combination of supervised learning on labeled product data and unsupervised learning techniques like clustering to recognize unique functionalities. It employs attention mechanisms to focus on distinctive features across different products.

As shown at 2504, instructions to assign the required functionalities to the new SaaS platform product are calculated. These functionalities originate from at least two different existing products, allowing for novel combinations that best fit the client's requirements.

Optionally, as shown at 2504, a constraint satisfaction algorithm is used to ensure that the selected functionalities collectively fulfill the new product requirements. This algorithm considers interdependencies between functionalities and optimizes for complete requirement coverage.

Optionally, the instructions include a data structure adaptation module. This module uses schema mapping and data transformation techniques to ensure that the data structures of different functionalities can work together cohesively in the new product environment.

Optionally, the generative AI environment 1800 executing the process activates a recommendation engine that analyzes the selected functionalities and compares them against the full product catalog. Using collaborative filtering and association rule learning, it suggests additional complementary functionalities that could enhance the new product.

Optionally, the generative AI environment 1800 executing the process performs compatibility checks using a rule-based expert system. This system identifies potential conflicts between selected functionalities and employs a resolution engine that suggests alternatives or modifications to ensure compatibility.

At step 2505, the generative AI environment 1800 executing the process executes the calculated instructions to create the new product. This process provides an ability to mix and match functionalities from different products to create a custom solution. For example, the system could combine work management features with email tracking capabilities from a CRM to create a specialized docketing feature for a law firm product.

Optionally, the generative AI environment 1800 executing the process employs a UI generation engine that creates a cohesive interface for the new product. This engine uses design principles and templates from existing products, recognizing that the UI design itself is a building block used by the platform. This approach treats UI components as modular, reusable elements within the SaaS ecosystem. The UI generation engine can dynamically assemble these UI building blocks, adapting them to the specific needs of the new product while maintaining consistency with the platform's overall design language. This modularity in UI design allows for rapid prototyping, easy customization, and seamless integration of new functionalities into existing interfaces. Moreover, the UI generation engine enables the described environment to create intuitive, familiar interfaces for new products by leveraging UI patterns that users are already accustomed to from other parts of the platform. This not only accelerates the product creation process but also enhances user adoption by providing a consistent and familiar user experience across different products within the SaaS platform.

Optionally, the generative AI environment 1800 executing the process is built on a modular architecture that allows for dynamic adjustments post-creation. It includes a runtime functionality manager that can add or remove functionalities on-the-fly, using dependency injection and hot-swapping techniques to modify the product without downtime.

Optionally, the generative AI environment 1800 executing the process employs an automated documentation generator. This tool creates comprehensive documentation for the new product, using natural language generation techniques to explain the combination of functionalities and provide usage instructions.

This approach is made possible by the modular architecture of the SaaS platform, where each functionality is a self-contained unit that can be plugged into different products. The WorkOS base ensures compatibility and consistency across all products and functionalities.

The generative AI model allows understanding the user requirements and mapping them to the most suitable combination of existing functionalities. It considers factors such as feature compatibility, user experience coherence, and overall product efficacy when making its selections.

The generative AI environment 1800 may incorporate a dynamic pricing model, where the cost (or "seat charge") is based on the number and complexity of features included in the custom product. This allows for flexible and fair pricing that aligns with the value provided to the client.

By automating the process of product creation through AI-driven functionality combination, this generative AI environment 1800 may reduce the time and resources required to develop new, tailored SaaS products. It enables the platform to rapidly respond to specific client needs without the need for extensive custom development, while still providing highly personalized solutions.

Optionally, the generative AI environment 1800 executing the process incorporates a dynamic licensing cost calculator that runs parallel to the main process. This calculator uses a weighted scoring system based on the complexity and value of each included functionality to determine the final licensing cost for the new product.

Optionally, a multi-objective optimization algorithm is used to select functionalities that collectively fulfill the new product requirements. This algorithm considers factors such as feature coverage, user experience coherence, and potential synergies between functionalities.

Optionally, a functionality customization engine is used with parameterized templates and code generation techniques to adapt each required functionality to the specific needs of the new product, modifying data models, business logic, and UI components as necessary.

Optionally, a dynamic pricing engine is runs parallel to the main process. This engine uses machine learning models trained on historical pricing data to calculate a fair and competitive licensing cost based on the number, type, and complexity of functionalities included in the new product.

Optionally, the calculated instructions include a data structure adaptation module. This module uses schema matching algorithms and automated ETL (Extract, Transform, Load) processes to ensure that the data structures of different functionalities can work cohesively in the new product environment.

Optionally the generative AI environment 1800 executes the process activates a recommendation engine powered by a hybrid collaborative and content-based filtering system. This engine analyzes the selected functionalities and user requirements to suggest additional complementary functionalities that could enhance the new product's capabilities.

Optionally the generative AI environment 1800 executes the process implements a continuous learning pipeline that uses federated learning techniques to periodically update the generative model. This allows the model to learn from newly created products across different instances of the platform while maintaining data privacy.

At 2505, the generative AI environment 1800 that executes the process executes the calculated instructions to create the new product. Optionally, generative adversarial networks (GANs) are used to create a cohesive and intuitive user interface that seamlessly integrates the functionalities of the required functionalities, ensuring a consistent user experience.

Optionally, natural language generation models fine-tuned on technical documentation are used to create comprehensive, easy-to-understand documentation for the new product.

In some embodiments, the generative AI environment 1800 for using generative artificial intelligence for creating SaaS platform products comprises additional features and functionalities as described in the following paragraphs. Referring again to FIG. 25, in one embodiment, each of the plurality of products (2502) maintained by the generative AI environment 1800 comprises a plurality of shared functionalities and one or more product-specific functionalities. The shared functionalities may include common features across multiple products, such as user authentication, data storage, or basic reporting capabilities. Product-specific functionalities are unique to each product and may include specialized tools or features tailored to specific use cases or industries.

In another embodiment, the input received by the generative AI environment 1800 (2503) comprises a specification of user requirements for the new SaaS platform product. This specification may be in the form of natural language descriptions, structured data, or a combination thereof. The generative AI environment 1800 is configured to interpret and process this input to guide the creation of the new product.

In a further embodiment, when prompting the generative model (2504), the generative AI environment 1800 is configured to identify required product-specific functionalities to be included together with shared functionalities in the new SaaS platform product. This process involves analyzing the user requirements and determining which unique features are necessary, in addition to the standard shared functionalities, to meet the specified needs.

In yet another embodiment, the one or more processors are further configured to perform additional steps in the product creation process. Specifically, the generative AI environment 1800 identifies two or more overlapping functionalities from the required functionalities. These may be features that serve similar purposes but originate from different existing products. The generative AI environment 1800 then utilizes the generative model to determine which of the overlapping functionalities should be included in the new SaaS platform product. This determination may be based on factors such as efficiency, user experience, compatibility with other selected functionalities, and alignment with the overall product requirements.

The aforementioned embodiments enhance the generative AI environment 1800's ability to create tailored SaaS platform products by intelligently combining and optimizing functionalities from existing products, while ensuring that the new product meets specific user requirements and maintains overall coherence and efficiency.

For clarity and consistency, the following terms are defined for use throughout this specification:

"AI agent instance" refers to an instantiated artificial intelligence entity actively operating within the system "NETA (Never Ever Tired Assistant) agent" refers to a specific subclass of persistent AI agent instances designed for continuous operation with maintained identity and memory across sessions "Agent profile" refers to the configuration parameters, permissions, and behavioral settings for any AI agent instance "Skills" refer to discrete, executable functions that can be dynamically assigned to AI agent instances "Knowledge resources" refer to structured or unstructured information repositories accessible to AI agent instances "Computational resources" refer to processing power, memory, and token consumption • "User profile" refers to human user configuration data including credentials and permissions "Behavioral profile" refers to interaction patterns and communication preferences within agent profiles "Orchestration layer" refers to the overall coordination system managing multi-agent interactions "Orchestration engine" refers to the processing logic within the orchestration layer • "Orchestrator" refers to specific instances managing individual communication threads Throughout this disclosure, consistent terminology is employed to describe the integrated AI agent instance ecosystem. An "AI agent instance" refers to any instantiated artificial intelligence entity operating within the system, whether personalized, modular, or specialized. "NETA (Never Ever Tired Assistant) agents" represent a specific subclass of persistent AI agent instances designed for continuous operation with maintained identity and memory across sessions. "Agent profiles" define the configuration parameters, permissions, and behavioral settings for any AI agent instance, stored in centralized registries for consistent deployment. "Skills" refer to discrete, executable functions that can be dynamically assigned to AI agent instances, while "knowledge resources" encompass structured or unstructured information repositories accessible to AI agent instances based on their permissions. The "credential management system" provides unified authentication and authorization across all system components, ensuring consistent identity validation and access control regardless of which embodiment is processing a particular request.

Optionally, the centralized AI agent instance management system 3000 operates as a coordinating layer across multiple specialized environments within the broader SaaS platform ecosystem. Optionally, integration with correlation environment 1200 enables the system 3000 to manage AI agent instances responsible for cross-platform data synchronization, deviation detection, and workflow coordination between the primary SaaS platform and external software services. These AI agent instances optionally receive deployment instructions, computational resource allocations, and operational parameters through the control interface module 3040, while their cross-platform activities are monitored and logged through the agent tracking module 3020.

Optionally, coordination with generative AI environment 1800 facilitates management of natural language processing AI agent instances, content generation AI agent instances, and conversational AI entities. The dashboard interface module 3030 optionally displays utilization metrics and performance indicators for generative AI computational resources, while the system 3000 optionally enforces token-based computational resource limits and manages model deployment across different SaaS platform elements. The agent tracking module 3020 optionally maintains performance baselines for generative AI agent instances, tracking metrics such as response latency, context retention accuracy, and task completion rates across various interaction modalities.

Optionally, cross-platform synchronization systems interface with system 3000 through standardized API endpoints and webhook configurations. The control interface module 3040 optionally manages credentials and permissions for AI agent instances operating across multiple platforms, ensuring consistent identity management and access control. The system 3000 optionally coordinates with external platform management systems to maintain AI agent instance identity persistence, synchronize memory reservoirs, and manage cross-platform task delegation, enabling seamless AI agent instance operation regardless of the host environment or interaction modality.

Reference is also made to FIG. 26A which illustrates an embodiment of a personalized artificial intelligence (AI) agent instance system 2600 configured to deliver adaptive, context-aware interactions for individual users across multiple digital environments while generating distinctly different personalized responses to identical task inputs based on individual user profile configurations. The system 2600 optionally integrates with the credential database 110 and agent registry 120 as described above with reference to FIGS. 1-25, ensuring operational continuity, security, and unified identity management across platforms while dynamically adapting to user-specific profiles and organizational contexts.

Optionally, the system 2600 may integrate seamlessly with the broader AI agent instance ecosystem through standardized terminology and interface protocols. AI agent instances that may be operating within this embodiment optionally maintain consistent identity through the unified credential management system, access modular skills through the centralized skill registry, operate within compliance boundaries defined by metadata guidelines, participate in orchestrated communication protocols, and report operational metrics to the centralized management dashboard, ensuring that terminology and operational concepts remain consistent across all system components.

Optionally, the personalized AI agent instance system 2600 may operate within a broader SaaS platform ecosystem comprising multiple interconnected applications, third-party services, and data sources. The AI agent instance-first communication model described herein optionally addresses personalized, context-aware interactions that vary significantly between users based on their distinct access permissions, credentials, and historical interaction patterns, while optionally complementing broader cross-platform workflow orchestration and data synchronization functions as described above with reference to FIGS. 1-25.

FIGS. 26B and 26C demonstrate the foundational principle of the AI agent instance-first communication model through an exemplary unified human-AI agent instance chat interface. These figures illustrate how AI agent instances function as first-class participants within multi-user communication threads, appearing with equal visual prominence alongside human participants. FIG. 26B shows the primary interaction panel displaying a chronological conversation flow for the "mondayGPT Team," where both human users (identified by initials like "ML," "RM," "Mr. T") and AI agent instances (clearly marked with "[AI]" tags, such as "Tasker [AI]") exchange messages using identical interface elements including timestamps, reply options, and reactions.

The secondary information panel in FIG. 26C optionally provides administrative clarity by explicitly distinguishing participant types while maintaining unified interaction functions. A dedicated "AI agent instances" section optionally lists automated participants (e.g., "Tasker AI agent instance") with controls for adding additional AI agent instances, while a separate "Users" section displays human participants. This architectural approach ensures that AI agent instances can participate naturally in conversations while maintaining transparency about their artificial nature through clear attribution and organizational structure.

Unlike general-purpose AI integrations that treat AI as external tools, the AI agent instance-first communication model optionally positions AI agent instances as first-class platform citizens with persistent identity, memory, and behavioral adaptation functions. This approach optionally addresses user-centric personalization and context preservation, distinguishing it from task-specific or workflow-oriented AI implementations by ensuring that identical inputs from different users generate different personalized responses based on their individual user profile configurations.

FIG. 26D illustrates the intelligent orchestration engine logic 200 that governs AI agent instance participation and prevents overwhelming conversational threads with unnecessary responses. The orchestration process begins when a message is posted in a thread (step 202), whereupon a central orchestration engine intercepts and evaluates the message (steps 204-206). This evaluation encompasses semantic analysis of keywords, contextual relevance based on AI agent instance memory and tracked tasks, domain scope matching, and policy compliance checks.

The orchestration engine's decision logic (step 208) optionally determines whether the message content warrants AI agent instance engagement based on relevance to tracked tasks or alignment with an AI agent instance's defined areas of operation. When relevance is confirmed, the system 2600 optionally authorizes AI agent instance engagement and selectively provides context to appropriate AI agent instances (steps 210-212). Conversely, irrelevant messages optionally result in AI agent instances remaining dormant (step 214), preserving conversational clarity and computational efficiency. Additional control measures (step 216) optionally include rate limiting and suppression policy enforcement before any AI agent instance response reaches the conversation thread.

Optionally, the personalized AI agent instance system 2600 may interface with broader platform functions including: (a) cross-application data synchronization engines that maintain consistency across multiple SaaS applications, (b) intent-based interaction systems that translate natural language commands into platform actions, and (c) workflow orchestration layer systems that coordinate complex multi-step processes across different applications.

The system 2600 includes a storage layer 2610 configured to maintain a user registry 2652 that maps user identifiers to corresponding user profiles 2614, as exemplified in FIGS. 26E and 26F. Each user profile 2614 optionally is associated with at least one of an individual user or a team, and defines three fundamental components that drive personalized AI agent instance behavior and enable differentiated response generation:

- Credentials for Accessing Applications: Optionally, authentication credentials for accessing at least one application and data source, wherein different users possess different credential sets that directly determine what information sources the AI agent instance can access when processing task requests.
- Knowledge Resource Access Permissions: Optionally, permissions to knowledge resources associated with that user profile, specifying which knowledge bases, memory reservoirs, and information repositories the AI agent instance may access when generating responses for that specific user, creating discrete information boundaries that result in substantively different response content.
- Historical Interaction Patterns: Optionally, behavioral profiles specific to at least that user profile, capturing each user's communication preferences, preferred response formats, interaction rhythms, and task completion methodologies that enable theme personalization.

These figures demonstrate the personalized one-to-one interaction channel between users and their dedicated AI agent instances (NETA (Never Ever Tired Assistant) agents). FIG. 26E shows the dedicated "You and Your NETA" channel within the broader communication platform interface, providing a persistent space for continuous, context-aware collaboration between the user and their assigned AI agent instance.

The conversation view displays how NETA (Never Ever Tired Assistant) agents engage proactively, offering suggestions based on recent activities, synthesizing insights from other conversation threads, and demonstrating memory of past interactions within the dedicated channel. FIG. 26F illustrates the status bar that optionally provides users with visibility into their AI agent instance's current operational parameters, including active personality profiles (e.g., "Analytical+Calm"), memory access scopes (e.g., "Work Projects+Scheduling Data"), and enabled skill packs (e.g., "Reporting, Summarization, Calendar Management"). Each user profile 2614 optionally stores encrypted credentials for multiple enterprise and consumer applications, defines permissioned access to organizational and personal memory reservoirs, and captures interaction models derived from prior exchanges.

FIG. 26G demonstrates the system's support for multiple specialized AI agent instances per user, each operating under distinct operational paradigms. The figure illustrates user "Timmi" associated with three different AI agent instance types: a Core Private NETA for personal assistance with private data access, a Work NETA scoped specifically for enterprise functions and organizational data, and a shared Finance Assistant Bot accessible to multiple team members for collaborative financial tasks.

Each AI agent instance optionally is represented with distinct visual indicators showing their specific functions (general assistance icons for private AI agent instances, work-related functions for enterprise AI agent instances, financial tools for specialized bots), memory access permissions (personal files, company databases, shared financial data), and governance structures (private user control, enterprise policy compliance, team-based permissions). This modular architecture ensures clear operational boundaries while enabling users to leverage appropriate AI agent instance functionality across different contexts and responsibilities.

The system 2600 optionally implements user profile cloning functionality that enables replication of AI agent instance behavioral patterns while maintaining data privacy. When a user profile is designated for cloning, the system creates a template configuration that preserves the AI agent instance's communication style, interaction preferences, and behavioral parameters while systematically removing all personal information. During this cloning process, any user-specific personal data, such as historical interaction patterns, private knowledge resources, personal memory reservoir content, credential information, or entries from the original agent profile, is omitted from the cloned configuration. The cloned configuration serves as a template that is then newly associated with the new user or team, inheriting their specific permissions and contextual parameters, thereby enabling the cloned AI agent instance to maintain the same conversational manner and interaction style of the original without the risk of sharing personal information of the original AI agent instance's user.

The cloning process optionally implements differential privacy techniques to ensure that behavioral patterns are preserved at an aggregate level while individual data points are protected. The system maintains separate configuration layers for behavioral templates and personal data, enabling clean separation during the cloning operation. Cloned agent profiles undergo validation to ensure no residual personal information persists in the template, with automated scanning for potentially identifying characteristics or data remnants before deployment to new users or teams. The cloning functionality supports organizational deployment scenarios where successful AI agent instance configurations can be replicated across departments while maintaining appropriate data boundaries and user privacy protections.

One or more processors 2620 instantiate and execute a dedicated AI agent instance 2612 for each user identifier. When the AI agent instance 2612 receives an input indicative of a task from a first user having a first user profile 2614, the AI agent instance performs access actions using the credentials and knowledge resources specified in the respective knowledge resource access permissions to acquire task-specific data 2630 of the first user profile 2614. Each AI agent instance 2612 optionally retrieves and processes task-relevant data from its authorized sources, executes reasoning models tuned to the user's historical behavior, and generates personalized responses 2632 that are explicitly tailored to the user's operational context based on the task-specific data acquired from the access actions.

When a second user having a second user profile 2614 provides the same input indicative of an identical task, the system 2600 optionally generates a different personalized response 2632 for the second user, wherein the difference is derived from the difference in knowledge resource access permissions between the two user profiles 2614. This fundamental differentiation operates across both content personalization (what information is included) and theme personalization (how information is presented).

Optionally, the system 2600 implements advanced token optimization protocols within the AI agent instance 2612. Prior to generating personalized responses 2632, the optimization engine optionally performs multi-stage data processing including content relevance scoring to identify high-value information segments, semantic compression algorithms that preserve meaning while reducing token count, and intelligent context windowing that maintains response accuracy while minimizing computational overhead.

The optimization engine optionally preprocesses input data, identifying relevant segments and eliminating redundant or low-value content prior to model invocation. For example, when a project manager uploads a 150-page technical specification for review, the AI agent instance optionally applies semantic analysis, parses and indexes the document, extracting only the sections relevant to the query, such as the impact of design changes on delivery timelines. This selective processing optionally reduces computational cost by up to 75% while maintaining response quality through selective content preservation and intelligent summarization techniques. The storage layer optionally maintains consistency between user profile permissions and the operational boundaries of the AI agent instance, ensuring that optimization and response synthesis never inadvertently expose unauthorized data. For example, if a user's credentials restrict access to only regional sales figures, the optimization engine optionally excludes global or restricted financial data during preprocessing, guaranteeing that outputs remain compliant with internal governance policies.

Optionally, the system 2600 maintains a continuous operational state so that when a user transitions between platforms, for example, from a collaborative board to a secure messaging thread, the AI agent instance optionally preserves context, conversation history, and task assignments without requiring manual handoff instructions.

FIGS. 26H and 26I illustrate how AI agent instance responses 2632 integrate seamlessly into human communication patterns while maintaining clear ownership attribution. FIG. 26H demonstrates AI message threading that conforms to native reply mechanisms, with AI agent instance responses using identical visual formatting to human replies including proper indentation, timestamp alignment, reply anchor lines, and consistent message flow styling. AI agent instances 2612 optionally access the same UI components as human users for posting responses, including native "reply" and "@mention" tools, ensuring natural conversation threading without requiring special interface elements.

FIG. 26I shows the graphical attribution layer that optionally provides transparency regarding AI agent instance ownership and alignment. Each AI agent instance-generated message optionally includes visual ownership indicators such as attribution badges near message headers, avatar overlays showing user association, or side-tags displaying ownership relationships (e.g., "John Dow" "Support Bot by Elad" "Task Assistant (EH)" "Scheduler AI"). These attribution markers optionally maintain consistent spacing and alignment regardless of sender type, utilize color-coding and iconography tied to owner profiles, and may include additional metadata in tooltips or audit logs depending on organizational access levels.

The communication style slider interface optionally operates as an interactive graphical element embedded directly within the chat environment 2632, enabling real-time behavioral modification without interrupting conversational flow. The slider interface optionally generates dynamic configuration parameters that range from formal business communication (parameter value 0.1) to casual conversational tone (parameter value 0.9), with intermediate settings for professional-friendly (0.3), collaborative (0.5), and approachable-expert (0.7) communication styles. When users interact with the slider interface, the system 2600 optionally immediately translates the visual position into backend configuration parameters stored in the user profile 2614, ensuring that subsequent AI agent instance responses reflect the selected communication style without requiring session restart or manual configuration.

This continuity is coordinated by the orchestration engine 125, ensuring that the AI agent instance behaves as a coherent, persistent participant regardless of the interface in which it is engaged. The orchestration engine optionally may also generate a dynamic task graph that visualizes dependencies across threads and applications, creating linked task graphs that identify dependent deliverables, deadlines, and responsible AI agent instances when teams work across multiple workspaces.

Optionally, the orchestration engine 125 may manage personalized AI agent instance behaviors and user-centric interactions, while interfacing with broader platform orchestration layer systems that handle cross-application workflow coordination, data synchronization, and intent-based command processing across multiple SaaS applications as described above with reference to FIGS. 1-25.

FIGS. 26J and 26K demonstrate the system's support for granular, context-specific behavioral controls that allow users to customize AI agent instance behavior for individual threads or tasks. FIG. 26J illustrates a per-thread behavior configuration interface accessible through settings controls near thread headers. This interface optionally provides interactive toggles and dropdown menus for parameters such as AI agent instance visibility levels (read-only, respond to mentions, proactive mode), tone selectors defining output formality and style, mute toggles for suppressing AI agent instance output entirely, and expiration logic for time-limited behavioral overrides.

FIG. 26K shows the user-defined context anchoring mechanism that enables temporal control over AI agent instance memory and response scope. Users can designate earlier messages as reference points through right-click context menus, with selected anchor points becoming visually highlighted while earlier content is de-emphasized. An adjustable overlay beneath the anchor point optionally provides controls for defining retrospective message windows (e.g., "Last 10 messages," "Messages from this date"), creating bounded memory scopes that AI agent instances use for contextually accurate responses prefixed with temporal summaries like "Since that point . . . " or "Following the anchor message, here's an update."

The visual configuration interface optionally implements comprehensive user interaction monitoring through behavioral analytics algorithms that track user engagement patterns, preference selection frequencies, and configuration modification sequences. The monitoring system optionally records interaction metadata including time spent on different configuration sections, frequency of parameter adjustments, and correlation patterns between user role and preferred settings. This monitoring data is automatically processed and stored in the user profile 2614 as interaction preference indicators, enabling the system 2600 to provide predictive configuration suggestions and identify optimal default settings for similar user roles or organizational contexts.

Optionally, in some optional embodiments, the system 2600 implements interactive configuration functions wherein AI agent instances 2612 generate interactive user interface elements directly within chat responses, and user interactions with these elements immediately affect the AI agent instance's backend configuration parameters, providing conversational configuration interfaces without requiring separate settings panels.

In multi-user environments, the orchestration layer governs the AI agent instance's participation by analyzing the relevance of ongoing discussions, enforcing rate limits, and applying suppression policies to prevent redundant or distracting responses. By aligning its activity with the current conversational context and organizational policies, the AI agent instance presents itself as a constructive participant rather than a reactive utility.

The system also supports adaptive behavioral modulation based on historical usage data and real-time feedback. Over time, the AI agent instance optionally adjusts its tone, verbosity, and content focus in response to user feedback and observed behavioral patterns. For example, when a user repeatedly edits the AI agent instance's summaries for brevity, the AI agent instance optionally autonomously shifts to producing more concise outputs. These adaptations build a uniquely personalized interaction style that blends seamlessly with the user's workflows, delivering a user experience that becomes increasingly natural and intuitive while maintaining the fundamental principle that different users with different profiles receive different personalized responses to identical task inputs.

The system optionally provides cross-application conversation continuity. When a user transitions from a first application to a second, the AI agent instance optionally automatically retrieves and presents relevant conversation history from the first application within the interface of the second. For example, a marketing director discussing campaign metrics in a chat application can switch to a dashboard tool, where the AI agent instance optionally immediately displays the prior conversation thread and offers context-sensitive actions such as generating a visual performance report based on the discussion.

When the AI agent instance 2612 is automatically launched in a second application environment, the system 2600 optionally implements proactive context inheritance protocols that retrieve and preload conversation history, active task states, and behavioral configurations from the first application. The context loading mechanism optionally utilizes encrypted context packages that include message threading data, user preference snapshots, and task completion status indicators. This automated context loading ensures seamless operational continuity, enabling users to resume conversations and continue workflows without manual context reconstruction or loss of interaction history.

Optionally, in another optional embodiment, the system supports cross-thread context management and dynamic task graph construction. When related topics or dependent tasks are discussed in separate threads, the AI agent instance optionally detects these connections and optionally suggests coordinated actions. For instance, if a team is discussing budget allocations in one workspace and related hiring plans in another, the AI agent instance may identify the dependency and prompt the user with, "Would you like me to link the budget forecast here to the hiring plan discussion?" This ability to detect and act on inter-thread relationships improves consistency, reduces duplicative work, and enables more informed decision-making across collaborative environments.

This continuity extends to intra-application context transitions, enabling the AI agent instance to maintain awareness when users navigate between different boards, workspaces, or modules within a single application. A product owner reviewing backlog items in one workspace can switch to a sprint-planning board, where the AI agent instance optionally references recent backlog discussions and prompts the user with context-specific actions, reducing errors and accelerating decision-making.

When the AI agent instance is automatically launched in a second application, it optionally not only retrieves the historical conversation context but also preloads active task states, enabling a seamless handoff of ongoing workflows. For example, a sales manager reviewing a pipeline report in a CRM platform might move to a messaging platform to coordinate with the team. The AI agent instance, recognizing the context of the transition, optionally preloads the relevant sales data into the thread and proposes next steps, such as scheduling follow-up calls or generating tailored opportunity summaries for stakeholders.

These conversational contexts and operational states are maintained across application boundaries by leveraging the credential sets defined in the user profile. Credentials ensure that all cross-application continuity respects organizational security policies while enabling users to benefit from consistent, optionally stateful interactions.

Optionally, the system maintains a continuous memory state and operational context across multiple sessions. By optionally preserving encrypted session objects within distributed cache layers, the AI agent instance can resume workflows, retrieve recent conversational states, and continue executing tasks even when a user reconnects after a session timeout or moves to a different platform interface. For example, a product manager drafting a requirements document in a collaborative board may pause their work, later opening a messaging thread on a mobile device. The AI agent instance optionally retrieves the stored context from the cache, recalls the last active task, and proposes the next action without requiring the user to repeat instructions, thereby creating the impression of a single, uninterrupted interaction.

The architecture provides measurable benefits through its integrated approach to AI agent instance-human collaboration. Continuous state management and seamless cross-platform context reduce user friction and eliminate repetitive configuration steps. Adaptive learning and profile-driven behavior result in outputs that align closely with user expectations, improving trust and adoption. The unified interface approach demonstrated in FIGS. 26B-26C ensures that AI agent instances feel like natural conversation participants rather than external tools, while the orchestration engine logic shown in FIG. 26D prevents conversational chaos through intelligent response filtering and coordination.

At the same time, scoped credential access and orchestrated participation ensure organizational compliance, security, and auditability while preserving a fluid, user-centric experience. The multi-AI agent instance ownership model illustrated in FIG. 26G enables users to leverage specialized functionality across different contexts without sacrificing operational boundaries, while the threading and attribution mechanisms shown in FIGS. 26H-26I maintain conversation clarity and accountability. The behavioral configuration and context management functions demonstrated in FIGS. 26J-26K provide users with precise control over AI agent instance behavior while supporting both immediate customization needs and long-term adaptive learning.

This comprehensive embodiment represents a fundamental shift from traditional reactive AI assistants toward optionally persistent, contextually aware digital companions that enhance rather than interrupt human collaborative workflows across diverse digital environments, with the core innovation being the systematic generation of different personalized responses to identical task inputs based on individual user profile configurations that define both access functions and interaction preferences.

A historical analysis module 2625 optionally maintains comprehensive behavioral profiles that systematically capture the one or more historical interaction patterns including user communication preferences, preferred response formats, interaction timing preferences, and task completion methodologies. The module optionally implements machine learning algorithms that analyze user behavior over time, identifying patterns in AI agent instance intervention preferences, communication style evolution, and task delegation preferences to enable increasingly precise personalization.

The historical analysis module optionally enables the AI agent instance to review past occurrences of similar user actions, evaluate outcomes, and incorporate those results into future decision-making. For example, when a project manager requests a progress report for a recurring initiative, the AI agent instance optionally retrieves past reports, identifies patterns in prior feedback, and generates a draft that reflects the manager's established preferences for format and granularity.

Behavioral profiles optionally support adaptive behavior based on historical usage patterns and collaboration preferences. For example, a team leader who consistently accepts proactive scheduling suggestions will trigger the AI agent instance to offer such suggestions earlier in the workflow, while a user who routinely dismisses meeting reminders will experience fewer unsolicited prompts.

The AI agent instance optionally adapts its behavior and knowledge resource access patterns based on the credentials, permissions, and interaction history defined in the user profile. For example, a financial analyst with tiered access to multiple internal datasets can rely on the AI agent instance to assemble cross-departmental reports without risking exposure to unauthorized information. When a query would require restricted data, the AI agent instance optionally omits sensitive content and instead provides a compliance-friendly response, preserving organizational integrity while maintaining user trust.

Adaptive behavior also extends to tone, verbosity, and content focus. Over time, the AI agent instance optionally refines the presentation of its responses, learning to deliver concise, action-oriented summaries for users who prefer brevity, or more comprehensive analyses for users who value detail. This refinement process occurs transparently and continuously, providing a more natural and productive user experience that evolves alongside the user's communication patterns and preferences.

Optionally, the system 2600 maintains bidirectional communication with external SaaS platforms through standardized APIs and webhook interfaces. When personalized AI agent instances interact with data from connected third-party applications, the system optionally preserves user-specific context and behavioral patterns while ensuring data consistency across platforms through dedicated synchronization protocols as described above with reference to FIGS. 1-25.

The optimization engine optionally preprocesses input data, identifying relevant segments and eliminating redundant or low-value content prior to model invocation. For example, when a project manager uploads a 150-page technical specification for review, the AI agent instance optionally parses and indexes the document, extracting only the sections relevant to the query, such as the impact of design changes on delivery timelines. This selective processing optionally reduces computational cost while delivering a focused, actionable summary to the user. The AI agent instance 2612 optionally supports distributed deployment across heterogeneous computing environments including local execution on user devices, network-based execution through secure communication interfaces, cloud platform deployment, edge device implementation, and hybrid configurations that dynamically allocate processing based on security requirements and performance optimization. The distributed architecture optionally maintains consistent AI agent instance behavior and functions regardless of deployment location through centralized configuration synchronization and unified identity management protocols.

The system supports the instantiation of multiple AI agent instances for a single user, each specializing in a distinct domain or functional area. These specialized AI agent instances optionally operate under a common profile but maintain independent operational contexts and task queues. For example, a senior engineer may have a development AI agent instance focused on code review and a documentation AI agent instance optimized for knowledge resource updates. When the engineer switches tasks, the appropriate AI agent instance optionally activates automatically, ensuring that domain-specific knowledge is applied without manual reconfiguration.

Each specialized AI agent instance optionally may access a distinct subset of the knowledge resources specified in the user profile, guided by domain-specific permissions. For instance, a financial analyst's portfolio AI agent instance might have read/write access to investment data and compliance guidelines, while their research AI agent instance interacts only with public market data feeds. This separation of permissions enhances security and ensures that each AI agent instance provides focused, relevant responses aligned with operational needs.

Multiple AI agent instances optionally can coordinate to deliver integrated, personalized outcomes. The orchestration engine optionally synchronizes their interactions, enabling AI agent instances to share context where permitted and combine results to support complex workflows. For example, in preparing a quarterly business review, an analytics AI agent instance may generate performance summaries while a presentation AI agent instance formats those findings into slide decks. This coordinated output eliminates redundant effort and enables seamless transitions between analytical and presentation tasks.

The knowledge resource combination functionality 2615 optionally implements sophisticated semantic linkage generation algorithms that create weighted relationship indicators between related concepts across accessible knowledge resource modules. The semantic linkage engine optionally utilizes transformer-based embedding models to identify conceptual relationships, generates confidence scores for inter-concept connections, and maintains relationship graphs that adapt based on user interaction patterns and contextual relevance. For example, when a user accesses financial reporting modules alongside project management knowledge resources, the system optionally automatically generates semantic linkages between budget categories and project phases, enabling the AI agent instance 2612 to provide integrated insights that span multiple knowledge domains while respecting access permissions defined in the user profile 2614.

The user profile optionally includes organizational context parameters that inform AI agent instance behavior and permissions. These parameters optionally may reflect the user's hierarchical position within the organization, relevant teams or departments, and specific responsibilities. For example, a department head may have access to aggregated reporting data across multiple divisions, while a team lead has access only to their unit's performance metrics. The AI agent instance optionally respects these parameters, ensuring that data and insights are tailored appropriately to the user's organizational context.

Organizational context parameters optionally may also include role-based credentials that define granular read/write permissions for specific data sources. For example, a compliance officer's AI agent instance may be able to access audit logs and regulatory updates but cannot modify operational data. These role-based constraints prevent unauthorized operations and ensure that AI agent instance actions remain consistent with corporate governance and security policies.

Optionally, in an optional configuration, the system implements modular memory reservoirs that segregate data into personal, organizational, thread-local, and scratchpad contexts. These reservoirs optionally allow fine-grained control over what data the AI agent instance retains, how long it retains it, and in what contexts the data is surfaced. For example, a user may pin certain research notes to a long-term personal reservoir while allowing brainstorming session content to expire after a defined period. Optionally, drag-and-drop interfaces allow users to move information between reservoirs, providing intuitive control over their digital memory environment. Optionally, administrative dashboards allow organizations to audit and govern these reservoirs, applying expiration policies and retention rules to ensure compliance with internal data governance frameworks.

Optionally, in some configurations, organizational context parameters further define memory profiles that specify which reservoirs of user-specific interaction data are available to each AI agent instance. For example, a support AI agent instance may access customer service histories and ticket resolutions, while a finance AI agent instance is limited to financial ledgers and planning documents. This fine-grained control allows organizations to deploy intelligent AI agent instances at scale while preserving strict boundaries between departments and data domains, maintaining compliance and operational integrity.

The system optionally incorporates conflict resolution logic that evaluates and resolves discrepancies when user-configured AI agent instance settings conflict with organizational policies. This logic optionally operates as an arbitration layer within the orchestration engine, ensuring that user preferences are respected whenever possible but never in violation of compliance, security, or operational mandates. For example, a user might configure their AI agent instance to automatically summarize internal meeting transcripts. If those transcripts contain content flagged as restricted by corporate policy, the AI agent instance optionally will gracefully redact sensitive sections and issue a notification, allowing the user to remain informed while preserving security boundaries.

Hierarchical precedence rules optionally determine which settings take priority when conflicts arise. These rules are expressed in a structured policy graph, where organizational policies typically outrank user-level preferences, but user settings are retained wherever there is no direct conflict. For instance, in a regulated finance environment, a trader's AI agent instance may be configured to proactively suggest trades, but when compliance rules prohibit trading on certain securities, the AI agent instance optionally will suppress those suggestions while continuing to provide permitted insights.

Detailed audit trails are maintained for all policy override decisions, creating a transparent record for both users and administrators. These logs optionally include timestamps, affected operations, and the rationale for each override event. For example, when a user requests a data export that exceeds their role's access scope, the system optionally records the attempted operation, the applied rule preventing execution, and the response provided to the user.

The system optionally supports hybrid deployment models in which the AI agent instance can operate locally on a user device or connect to cloud-based services through secure network interfaces. This flexibility allows organizations to balance performance, privacy, and compliance needs without compromising functionality. For example, a field engineer working in a low-connectivity environment may rely on the locally deployed AI agent instance to access cached instructions and diagnostic tools. When connectivity is restored, the AI agent instance optionally synchronizes with cloud services, updating task states and knowledge resources without requiring user intervention.

Locally deployed AI agent instances optionally maintain compatibility with cloud-based features by using the same credentials and knowledge resource access permissions defined in the user profile. This unified identity management ensures that actions performed offline remain consistent with enterprise policies and that subsequent synchronization events do not create version conflicts or compliance risks. For example, a compliance officer preparing a regulatory report on a secure workstation can rely on the local AI agent instance to draft sections of the report. Upon reconnection to the corporate network, the report and related logs are securely integrated with the organization's compliance archives, preserving an auditable history of the interaction.

The system optionally includes protocol adapters that mediate communication between different AI systems or infrastructure layers while preserving user profile integrity. These adapters optionally translate data structures, enforce security rules, and synchronize operational states between heterogeneous environments. For example, in a multinational enterprise with region-specific AI infrastructure, the protocol adapter ensures that an AI agent instance configured in a European data center can securely interact with applications hosted in North American or Asia-Pacific environments.

A historical analysis module optionally maintains detailed behavioral profiles for each user. These profiles optionally capture long-term interaction patterns, such as the user's preferred level of AI agent instance intervention, communication style, and responsiveness to suggestions. Over time, this module builds a rich behavioral dataset that allows the AI agent instance to tailor its behavior to the user's habits, goals, and context.

The system optionally monitors user acceptance rates for different types of suggestions, learning which interventions are helpful and which are not. For example, a financial analyst who regularly uses risk forecasts provided by the AI agent instance but ignores real-time market alerts will see future interactions prioritized toward actionable risk summaries while non-critical alerts are deprioritized. The system optionally may maintain detailed metrics on user acceptance rates for different types of suggestions, categorizing interactions by context, urgency, and suggestion type to optimize future recommendations.

Behavioral profiles also optionally track the preferred level of information granularity across different task types. During management briefings, a senior manager's AI agent instance may deliver high-level summaries, while the same AI agent instance provides detailed, data-driven responses for deep-dive planning sessions.

The historical analysis module optionally monitors user corrections and integrates those adjustments into future interactions. If a user consistently modifies the tone or structure of generated emails, the AI agent instance optionally incorporates these changes into subsequent drafts, reducing repetitive edits and creating outputs that align more closely with the user's style.

The system optionally identifies user stress indicators, such as rapid, fragmented input patterns or repeated urgent task requests, and adjusts its support behavior. When a user is under time pressure, the AI agent instance optionally suppresses non-critical notifications and instead focuses on delivering concise, actionable responses that help the user meet immediate deadlines. Stress indicators optionally may include rapid successive queries, fragmented input patterns, repeated urgent requests, or deviation from established interaction rhythms.

Predictive models optionally analyze task sequencing, timing preferences, and completion methods. When a user begins a quarterly reporting process, the AI agent instance optionally proactively retrieves relevant data sources, prepares draft templates, and pre-fills fields based on the user's historical workflows.

Predictive models also optionally create personalized templates for recurring tasks. For example, an operations manager drafting a weekly status update will find that the AI agent instance has pre-assembled the standard sections, populated them with current metrics, and highlighted anomalies requiring attention.

Predictive models optionally learn the user's preference for autonomous AI agent instance action versus explicit confirmation. A product manager who routinely approves suggested backlog updates without review will see future updates applied automatically, while a compliance officer who prefers to approve every change will always receive confirmation prompts.

The predictive analysis optionally may also extend to availability and receptivity modeling, where the AI agent instance predicts optimal times for delivering suggestions or reminders based on historical engagement patterns.

The system optionally provides a visual configuration interface that allows users to assemble and personalize their AI agent instances from modular components. Users can add, remove, or rearrange these modules through drag-and-drop interactions, and the interface immediately reflects these changes in the behavior of the AI agent instance.

Interactive control elements such as sliders, toggles, and selection menus optionally translate user adjustments into optimized AI agent instance prompts without requiring the user to understand or edit technical parameters. A slider labeled "Response Detail" allows a marketing manager to fine-tune the verbosity of the AI agent instance's summaries from brief headlines to comprehensive reports.

For example, a communication style slider ranging from formal to casual optionally automatically adjusts response tone and terminology, with the interface integrated directly within the chat environment for immediate configuration without interrupting workflow.

Optionally, in another optional embodiment, the system includes a simulation environment within the visual configuration interface that allows users to preview and test AI agent instance behaviors before deploying configuration changes. For example, when adjusting response verbosity or tone parameters, a user may enter a test prompt to observe how the AI agent instance would respond under the updated settings. This preview capability allows users to fine-tune preferences without risking unintended changes in live workflows. In collaborative settings, administrators may simulate configurations for shared AI agent instances to ensure that personality, tone, and response patterns align with organizational guidelines before those changes are applied broadly.

The interface optionally provides preview and validation functions. When a user adjusts a parameter, the interface optionally generates example outputs so the user can immediately see how the change will affect the AI agent instance's responses.

The configuration interface optionally monitors user interactions to learn configuration preferences and usage patterns. These observations are stored in the user profile, enabling the AI agent instance to predictively suggest configuration adjustments.

Optionally, in some implementations, the configuration interface integrates directly within the conversational interface, allowing adjustments without leaving the workflow. When a user types "Make the response shorter," the system optionally automatically adjusts the verbosity slider and confirms the change in the chat interface.

Additional controls optionally include sliders designed for communication style adjustment, ranging from formal to casual tones, or from cautious to proactive behavior.

Natural language-based personalization optionally allows users to configure and refine the behavior of their AI agent instances through conversational feedback rather than technical interfaces. The system optionally interprets user instructions expressed in ordinary language, translates them into configuration parameters, and updates the user profile accordingly.

This conversational interface optionally supports iterative dialogue, allowing users to fine-tune their preferences over time.

Users optionally can customize the personality and response patterns of the AI agent instance by providing examples of preferred communication styles.

The system optionally can also infer personalization parameters by analyzing historical conversation patterns.

The AI agent instance optionally learns a user's proficiency level across different domains and adjusts the complexity of its responses, providing detailed explanations to novices and succinct, high-level summaries to specialists.

Optionally, in some configurations, the system adjusts its behavior based on workflow patterns it observes over time, enabling the AI agent instance to proactively suggest optimizations without explicit user prompts. For example, when a marketing coordinator frequently generates weekly campaign summaries and distributes them to a standard set of recipients, the AI agent instance can pre-draft the summary and prepare a distribution list, presenting the draft for approval to streamline the process while maintaining user oversight.

The system optionally may build personalized response templates derived from prior successful interactions, allowing the AI agent instance to generate outputs that align closely with a user's established tone, style, and formatting preferences. For instance, a customer service specialist who repeatedly edits outgoing responses in a particular style may find future drafts already incorporating the preferred phrasing and structure, reducing repetitive adjustments and improving efficiency.

Optionally, in some embodiments, natural language corrections provided during active interactions are applied immediately, updating internal parameters without requiring manual profile adjustments or system restarts. For example, when a user types, "Use a more formal tone," during an email draft, the AI agent instance optionally adjusts its tone modulation instantly for that session and records the preference for future outputs, ensuring consistent alignment with user expectations.

Optionally, in an optional embodiment, the system provides multilingual support and translation functions that allow the AI agent instance to participate in conversations across languages while maintaining context and tone. When enabled, the AI agent instance optionally detects language mismatches in a thread and transparently provides translated messages alongside the original content, preserving nuance and intent. For example, in a cross-border project meeting, a message written in German may appear in English for an English-speaking participant, while retaining its original format for German-speaking participants. The AI agent instance optionally adapts tone and terminology to match the conversational style preferences defined in each user profile, ensuring that translations feel natural rather than mechanical. Users optionally may toggle between the original and translated versions of any message, and organizations can configure rules for automatic or manual translation depending on compliance and security policies.

Compliance-aware translation rules optionally may also be applied in multilingual environments. For instance, sensitive contractual terms or protected personal information can be automatically redacted or masked during translation to prevent unintended exposure. Organizations can configure governance policies to restrict automated translation in certain regulatory contexts or to maintain a human review loop for high-sensitivity content. These safeguards ensure that multilingual collaboration features remain consistent with enterprise compliance and security frameworks.

These natural language personalization features optionally foster a highly adaptive user experience where the AI agent instance evolves organically alongside user preferences. Over time, this adaptation enhances trust, reduces friction in daily workflows, and ensures that outputs remain contextually relevant without requiring technical knowledge from the user. As a result, the AI agent instance becomes a seamless extension of the user's own workflow, reducing configuration overhead and improving overall efficiency.

The system optionally may support distributed deployment, allowing the AI agent instance to operate consistently across cloud platforms, edge devices, and hybrid environments. For example, a field technician in a remote location may interact with a locally deployed AI agent instance for diagnostics while offline. When network connectivity is restored, the local AI agent instance optionally synchronizes operational states and updates knowledge modules from cloud environments, preserving a seamless user experience without data loss or inconsistency.

Optionally, in an optional embodiment, the system implements a modular skill architecture where new skills or updates can be deployed without affecting the core behavior of the AI agent instance. Each skill optionally operates in a secure, sandboxed environment, ensuring that experimental or third-party modules cannot compromise system stability, security, or compliance. For example, when a team adds a specialized data visualization skill to a planning AI agent instance, the new capability becomes available immediately while the AI agent instance's core personality, reasoning, and permissions remain unchanged. This approach allows organizations to evolve their AI agent instance ecosystem iteratively, safely adopting new functionalities while maintaining a stable and predictable user experience.

Optionally, in an optional embodiment, the system may integrate ambient context capture to enhance the AI agent instance's situational awareness and support richer, more contextually relevant responses. With user permission, the AI agent instance can join virtual meetings or passively monitor shared audio channels to generate structured summaries, action items, and contextual updates. For example, during a project kickoff call, the AI agent instance may compile a summary of decisions, create a task list assigned to relevant participants, and surface related documents from organizational knowledge resources. These notes are stored in an appropriate memory reservoir and surfaced automatically in subsequent interactions, allowing team members to continue the discussion or execute follow-up tasks without manually reconstructing meeting outcomes. Privacy and compliance settings ensure that ambient data capture is transparent and governed by explicit user or administrative controls.

Optionally, in some configurations, the sandbox layer implements strict isolation policies enforced through a combination of containerization, permission gates, and continuous runtime monitoring. Each skill optionally operates within a constrained execution environment that prevents unauthorized file access, network calls, or escalation of privileges. When anomalous behavior is detected—such as excessive memory usage, unauthorized API calls, or prolonged execution times—the orchestration engine can terminate the skill instance gracefully while preserving system stability. This architecture ensures that experimental or third-party skills can be deployed without jeopardizing the integrity or security of the core AI agent instance framework.

Optionally, in certain deployments, distributed nodes balance computational loads. For instance, during peak operational periods, large-scale analytical tasks may execute on cloud servers, while lightweight conversational interactions are handled by edge devices, ensuring that responsiveness is maintained while optimizing system performance.

In a healthcare environment, an edge-deployed AI agent instance optionally can process sensitive patient data locally to comply with regulatory requirements while offloading anonymized aggregate insights to the cloud for broader analysis. This hybrid model reduces latency for critical, on-site decision-making while maintaining compliance and enabling enterprise-level reporting. Similarly, in financial institutions, edge AI agent instances can perform real-time fraud detection locally while sharing risk signals with cloud-based analytics engines to refine predictive models.

The system optionally can combine modular knowledge resources in real time, presenting the AI agent instance with a unified, context-aware knowledge environment. For example, when a product manager initiates a session related to a new feature, the system may combine engineering specifications, customer feedback logs, and market data into a unified contextual model, enabling the AI agent instance to deliver richer and more actionable insights without requiring the user to query multiple sources individually. This synthesis ensures that the user receives comprehensive and contextually relevant information in a single interaction, reducing the need for manual cross-referencing and accelerating decision-making processes. These modular knowledge resources optionally may be systematically partitioned by skill categories (technical, analytical, communication) and personal data categories (individual preferences, organizational context, historical patterns), with clear separation between organizational modules and user-specific modules.

These combinations create semantic linkages between related concepts across different knowledge modules. A customer success manager, for instance, may request an account status update, prompting the AI agent instance to present a consolidated report linking support history, billing data, and usage trends. This unified presentation allows users to make informed decisions faster and with greater confidence.

The system optionally may enforce hierarchical access priorities when knowledge conflicts arise. Sensitive or restricted data remains masked or redacted for users lacking the requisite credentials, while authorized users receive full data access. This feature ensures strict compliance with organizational governance without impeding the AI agent instance's ability to deliver valuable context.

As contextual parameters shift during an active session, the system optionally can reconfigure the semantic linkages among knowledge resources, ensuring that the AI agent instance remains aligned with the user's evolving intent. For example, when a conversation transitions from discussing customer satisfaction to analyzing operational bottlenecks, the AI agent instance optionally seamlessly shifts to operational performance data while maintaining session continuity.

By unifying modular knowledge resources in this manner, the system delivers a context-aware interface that enhances productivity and reduces cognitive load while ensuring consistent, reliable results.

Optionally, in another optional embodiment, the system extends its functionality to serve as a cognitive layer for robotics and other embodied platforms. The AI agent instance can interface with hardware systems through standardized protocols, providing reasoning, planning, and natural language interaction functions to physical devices. For example, in a warehouse environment, the AI agent instance may coordinate autonomous robots performing inventory checks, integrating real-time sensor data with operational schedules to optimize task execution. Similarly, in a home automation setting, the AI agent instance may act as a conversational interface for coordinating multiple devices, such as adjusting environmental settings or retrieving contextual information based on user commands. This optional extension allows the same personalized, context-aware intelligence that supports digital workflows to enhance interactions with physical systems.

Optionally, in some configurations, the system may associate new AI agent instances automatically with an existing user profile. This optional association allows a newly provisioned AI agent instance to immediately adopt the user's stored preferences, access permissions, and interaction history. For example, when a new analytics-focused AI agent instance is deployed for a team member, it can begin providing tailored insights without requiring manual configuration, streamlining onboarding and enhancing user satisfaction.

The system optionally supports secure profile sharing across authorized AI agent instances within an organization. This feature enables different AI agent instances to operate consistently with shared personalization data while respecting organizational security controls. For instance, a sales team may share a unified tone and reporting style across its pipeline management, client communication, and forecasting AI agent instances, creating a cohesive experience while preserving data segregation and compliance.

Integrated personalization effects optionally may be applied, allowing the AI agent instance to combine access rights, knowledge scope, individual preferences, and real-time context in a harmonized response. For example, during a quarterly review, a financial analyst may request performance data, and the AI agent instance will present it in the preferred tabular format, using role-based data filters, and propose follow-up actions aligned with the analyst's historical workflows, all without additional configuration.

These optional integrated personalization effects deliver a user experience that feels seamless and intuitive, reducing friction while ensuring that each interaction is operationally compliant, contextually accurate, and individually tailored.

Optionally, in multi-tenant SaaS environments, the personalized AI agent instance system 2600 may operate as a specialized layer within a broader AI-enabled platform architecture. This layer optionally handles user personalization, behavioral adaptation, and context-aware interactions, while relying on underlying systems for cross-platform data management, workflow orchestration, and general AI computational resource allocation as described above with reference to FIGS. 1-25.

FIG. 26L illustrates the computer-implemented method 2601-2607 for providing personalized artificial intelligence AI agent instance responses based on user profiles, utilizing the system architecture described in the preceding embodiments. This flowchart demonstrates the sequential process by which the personalized AI agent instance system 2600 transforms individual user contexts into tailored AI interactions, ensuring that identical task inputs generate distinctly different responses based on each user's unique profile configuration.

The method begins at step 2601 with the maintenance phase, where the one or more processors 2620 establish and continuously update the user registry 2652 that maps user identifiers to their corresponding user profiles 2614. This foundational step involves three critical substeps: updating user credentials (2601*a*) as organizational roles evolve, modifying knowledge resource access permissions (2601*b*) to reflect changing authorization levels, and continuously learning from historical interaction patterns (2601*c*) to refine each user's behavioral profile. For example, when a marketing manager receives a promotion to director level, the system optionally automatically updates their credentials to include access to management-level financial data while preserving their accumulated interaction preferences for report formatting and communication style.

Following the registry maintenance, the method proceeds to step 2602, the AI agent instance instantiation phase, where dedicated AI agent instances 2612 are created and configured for each user identifier. This instantiation process comprises loading user-specific configuration parameters (2602*a*), establishing secure credential contexts (2602*b*), and initializing personalized knowledge graphs (2602*c*) that reflect each user's unique access boundaries and behavioral patterns. The instantiation process ensures that each AI agent instance operates within a sandboxed environment that cannot access information beyond its assigned user's permissions, while simultaneously optimizing response generation based on that user's demonstrated preferences and interaction history.

The method advances to step 2603, where the instantiated AI agent instance receives task-indicative input from a user possessing a defined user profile. This input reception phase encompasses both literal interpretation of the user's request (2603*a*) and contextual analysis of factors (2603*b*) including the user's current project context, recent interaction patterns, and organizational position. For instance, when both a junior analyst and a senior management representative submit the identical query "analyze quarterly performance," the system recognizes that despite the textual similarity, the underlying requirements and appropriate response depth differ significantly based on each user's role and historical interaction patterns.

Step 2604 represents the access action performance phase, which serves as the core differentiation mechanism of the personalized AI agent instance system 2600. During this critical phase, the AI agent instance leverages the credentials and knowledge resource access permissions defined in the user's profile to acquire task-specific data tailored to that particular user's context and authorization level. This process involves credential validation (2604*a*) to ensure the user maintains current access to referenced systems, knowledge resource querying (2604*b*) to retrieve information within the user's permission scope, and data synthesis (2604*c*) to combine information from multiple authorized sources into a coherent dataset for response generation. Continuing the quarterly performance analysis case, the junior analyst's AI agent instance might access departmental performance metrics and standard reporting templates, while the senior management representative's AI agent instance retrieves company-wide financial data, competitive intelligence, and strategic planning documents.

The method then progresses to step 2605, the personalized response generation phase, which synthesizes the acquired data and historical interaction patterns into tailored outputs.

Throughout this methodological flow, the system implements step 2606, maintaining continuous feedback loops that capture user interactions with generated responses. This feedback process includes interaction outcome logging (2606*a*), personalization algorithm refinement (2606*b*), and knowledge resource access pattern updates (2606*c*). This iterative improvement process ensures that the AI agent instances 2612 become increasingly effective at delivering precisely tailored responses that reflect not only the user's formal permissions and credentials but also their evolving preferences, knowledge levels, and organizational contexts. The method concludes with step 2607, where the interaction outcome is systematically logged and fed back into the user's historical interaction patterns, creating a self-improving cycle that enhances future response personalization while maintaining strict adherence to the security and access control parameters defined in each user's profile configuration.

The personalized AI agent instance system 2600 interfaces with modular capability provisioning through standardized data flow protocols. When a personalized AI agent instance 2612 encounters a task requiring functions beyond its current configuration, the AI agent instance queries the tool registry 2732 as described above with reference to FIGS. 1-25 through secure API endpoints. The query includes the AI agent instance's unique identifier, the user's credential set from the user profile 2614, and a task specification that describes the required functions. The modular system 2700 validates the request against the user's permissions, provisions the appropriate skill module within a secure sandbox, and returns execution results to the personalized AI agent instance for integration into the personalized response 2632, ensuring that enhanced functions are delivered within the user's established behavioral and access parameters.

The personalized AI agent instance system 2600 optionally provides the foundational user-centric interaction layer upon which the modular AI agent instance operations as described above with reference to FIGS. 1-25 operate. While the personalized system focuses on delivering tailored user experiences through adaptive behavior and contextual awareness, the modular system provides the underlying functions architecture that enables personalized AI agent instances to access specialized functions and knowledge resources as needed. The integration of these systems allows personalized AI agent instances to maintain their user-specific behavioral patterns while acquiring enhanced functions through the secure, governed provisioning mechanisms as described above with reference to FIGS. 1-25.

Reference is also made to FIG. 27A which illustrates an embodiment of a system 2700 for modular AI agent instance operation that provides secure, flexible, and scalable orchestration of functions and knowledge resources. This architecture allows organizations to provision and manage AI functions, enabling AI agent instances to perform complex tasks while maintaining strict compliance and operational governance. The system integrates with a credential management system 2740, which anchors all AI agent instance operations through continuous authentication, permission validation, and audit mechanisms. For example, in an enterprise deployment, thousands of AI agent instances can operate concurrently across business units while the credential system enforces uniform security and governance policies across the environment.

Optionally, the system 2700 may integrate seamlessly with the broader AI agent instance ecosystem through standardized terminology and interface protocols. AI agent instances that may be operating within this embodiment optionally maintain consistent identity through the unified credential management system, access modular functions through the centralized skill registry, operate within compliance boundaries defined by metadata guidelines, participate in orchestrated communication protocols, and report operational metrics to the centralized management dashboard, ensuring that terminology and operational concepts remain consistent across all system components.

For clarity, certain terms are defined as used throughout this description. A "skill" refers to a modular, executable function that can be invoked by an AI agent instance to perform a discrete task, such as generating summaries, performing analytics, or interfacing with third-party APIs. A "knowledge resource" refers to a structured or unstructured knowledge base, governed by defined access boundaries, that AI agent instances can query to retrieve or store data. A "sandbox" refers to an isolated, secure execution environment where skills operate separately from the AI agent instance's core reasoning logic, preventing unauthorized actions and ensuring predictable behavior. The "credential management system" refers to the foundational security framework that validates AI agent instance identity and enforces permissions for all interactions with skills and knowledge resources.

A storage subsystem 2750 optionally maintains synchronized registries: a tool registry 2752, which contains metadata for available skills, and a knowledge resource registry 2754 which catalogs organizational knowledge resources. Each registry entry optionally defines operational scope, data boundaries, input and output formats, encryption requirements, and version histories. These registries are continuously synchronized across distributed environments, ensuring consistency and availability in hybrid deployments. For example, when an administrator publishes a new analytics module for the finance department, the update optionally propagates across data centers and edge nodes within seconds, making the module immediately discoverable through the user interface 2720 while maintaining version integrity and audit traceability.

Each knowledge resource in the knowledge resource registry 2754 optionally comprises a distinct information repository with comprehensive access parameter definitions that specify data retrieval permissions through role-based access matrices, content boundaries that define information scope limitations, and hierarchical information access levels ranging from basic read-only access with summary data to comprehensive full-access permissions including modification rights and historical data retrieval. For example, a financial knowledge resource may provide basic access level users with quarterly summary reports while comprehensive access level users receive detailed transaction histories, forecasting models, and budget modification functions.

Optionally, the modular AI agent instance system 2700 may operate as a foundational execution layer within a broader SaaS platform ecosystem that includes personalized AI agent instances, cross-platform data synchronization, and intent-based interaction functions as described above with reference to FIGS. 1-25. While other system components focus on user personalization, context awareness, and cross-application workflows, system 2700 optionally provides the secure, modular execution environment and functions orchestration that enables these higher-level AI functionalities.

Optionally, the storage subsystem 2750 may further maintain an agent profile registry 2755, which serves as a centralized repository for storing and managing AI agent instance configurations within the system 2700. Each entry in the agent profile registry 2755 optionally contains a structured representation of an AI agent instance's functions, including references to authorized skills from the tool registry 2752, accessible knowledge resources from the knowledge resource registry 2754, and credential specifications validated by the credential management system 2740. The agent profile registry 2755 optionally enables version control of AI agent instance configurations, allowing administrators to track changes to AI agent instance functions over time and maintain multiple profile variations for different operational contexts. Profile entries optionally include metadata such as creation date, last modification, performance metrics, and usage statistics, facilitating optimization and management of AI agent instance deployments across the organization.

The system includes a user interface 2720 enabling users to discover, configure, and manage AI agent instance functions. This interface optionally presents internal organizational skills, user-specific modules, and curated third-party skills, allowing users to assemble tailored AI agent instance profiles. For instance, a financial analyst may configure an AI agent instance by combining an internally approved forecasting skill with a third-party market data connector, enabling the AI agent instance to generate comprehensive quarterly projections. The interface optionally abstracts technical complexity, allowing users to compose skills through intuitive selection and configuration controls while the system enforces security and compatibility constraints. In one scenario, a manager assembling a "budget planning AI agent instance" can preview how that AI agent instance would perform tasks under the selected configuration before deployment.

Optionally, the system 2700 implements optional stateless functions management through assessment protocols that operate without requiring persistent AI agent instance identity storage across sessions. The assessment engine optionally performs evaluation of instantiated AI agent instance functions against incoming task requirements, automatically provisions required skills from the tool registry 2752 through just-in-time skill acquisition, and maintains continuous validation of AI agent instance permissions during task execution without storing AI agent instance state information between operational sessions. This optional stateless approach enables the system to scale efficiently while maintaining security boundaries through session-specific permission validation.

FIG. 27B illustrates an exemplary AI agent instance configuration panel providing a mechanism for users to define or modify the behavior and functions of an automated AI agent instance. This interface facilitates the assignment of personality profiles and functional skills to a specific AI agent instance core through a drag-and-drop interface. Users can visually select and assemble behavioral and functional components for an AI agent instance. In this case, the user selects a personality profile template labeled "Supportive" and assigns multiple skills including "Task Extraction," "Calendar Coordination," and "Daily Recap Generation" functions to the AI agent instance core.

FIGS. 27C and 27D demonstrate how different assigned personality profiles affect an AI agent instance's communication style while executing the same core function. FIG. 27C shows an AI agent instance configured with a "Friendly" personality profile executing a summarization skill with a casual tone ("Hey team, here's a quick breakdown of what we talked about!"), while FIG. 27D shows the same AI agent instance with a "Formal" personality profile producing a professional tone ("The following outlines key discussion points from today's meeting.").

The system supports complex multi-industry deployments with specialized skills tailored to specific domains. In healthcare environments, AI agent instances may combine HIPAA-compliant patient data analysis skills with regulatory reporting modules and clinical decision support knowledge resources. For example, a clinical research AI agent instance could access anonymized patient databases through secure knowledge resources, apply statistical analysis skills to identify treatment patterns, and generate compliance-ready reports using regulatory formatting modules. The credential management system ensures that all access adheres to healthcare privacy regulations, with automatic audit trails for regulatory inspection.

For example, in financial services, AI agent instances may orchestrate risk assessment skills with market data knowledge resources and regulatory compliance modules. A portfolio management AI agent instance might combine quantitative analysis skills from the tool registry with market data from approved financial knowledge resources, applying risk modeling skills while ensuring all operations comply with SEC regulations. The system's boundary enforcement prevents AI agent instances from accessing unauthorized trading platforms or personal financial data, even when integrated with third-party financial applications.

In another scenario, manufacturing environments demonstrate the system's ability to integrate IoT sensor data knowledge resources with predictive maintenance skills and supply chain optimization modules. A production planning AI agent instance could analyze equipment sensor data through industrial knowledge resources, apply predictive analytics skills to forecast maintenance needs, and coordinate with supply chain modules to optimize part ordering. The modular architecture allows the same AI agent instance framework to adapt to different manufacturing contexts, from automotive assembly to pharmaceutical production, by simply reconfiguring available skills and knowledge resources.

The tool registry 2752 and knowledge resource registry 2754 optionally operate as independent data stores with autonomous synchronization mechanisms that maintain current availability information without requiring centralized coordination. Each registry optionally implements distributed update protocols that propagate functions changes, knowledge resource availability modifications, and permission updates across system components through eventual consistency algorithms. The autonomous synchronization ensures that skill and knowledge resource availability information remains current while enabling independent operation of registry components during network partitions or maintenance periods.

Optionally, the user interface 2720 may provide a comprehensive AI agent instance profile creation workflow that guides users through the process of associating skills and knowledge resources with new AI agent instances. When a user initiates the creation of a new AI agent instance profile, the interface optionally presents available skills from the tool registry 2752 and knowledge resources from the knowledge resource registry 2754 in an organized, filterable view. Users can select desired skills through drag-and-drop operations, dropdown menus, or search functionality. Upon selection, the system optionally automatically queries the credential management system 2740 to verify that the chosen combination of skills and knowledge resources is approved for association within the user's organizational context and access permissions.

Optionally, the verification process may involve the credential management system 2740 evaluating the proposed skill and knowledge resource associations against organizational policies, security constraints, and user authorization levels. This verification includes checking for conflicts between selected skills, ensuring compliance with data access restrictions, and validating that the requesting user has sufficient privileges to create AI agent instances with the specified functionality. Only upon successful verification does the system proceed to create the new AI agent instance profile, which is then stored in the agent profile registry 2755 with appropriate metadata and audit trails.

The credential management system 2740 optionally provides comprehensive centralized authentication validation that controls access to both skills in the tool registry 2752 and knowledge resources in the knowledge resource registry 2754 through multi-stage verification protocols. The system optionally performs identity validation of AI agent instances before skill registry access, authenticates knowledge resource access requests against encrypted credential objects stored in secure databases, enforces functions boundaries through permission verification during operation execution, and generates comprehensive audit trails that cryptographically link all AI agent instance actions to authenticated credential sources for compliance and security monitoring.

One or more processors 2710 instantiate AI agent instances 2730 that query the registries upon initialization to identify available skills and accessible knowledge resources. The credential management system 2740 optionally validates these queries in real time, confirming permissions before any execution. This ensures that AI agent instances operate strictly within defined operational boundaries. For example, when a new engineer joins a product development team, the engineer's AI agent instance can immediately access approved design repositories but is prevented from retrieving production configuration files until the appropriate permissions are granted.

FIG. 27E illustrates an exemplary workflow for installing a new functional skill into an automated AI agent instance. The process emphasizes review, validation, and safe activation stages: (1) Initiation through the NETA Generator interface, (2) Skill selection (e.g., "Customer Sentiment Analysis"), (3) Metadata review showing implementation type and required permissions, (4) Validation checking compatibility with the AI agent instance's existing configuration, (5) Sandboxed loading providing a safe, isolated space for testing, and (6) Confirmation of the skill's readiness for simulation or deployment.

FIG. 27F shows a "Skill Store" or marketplace interface allowing users to discover, evaluate, and install new functional skills. The GUI optionally provides browsing and filtering skills based on implementation type, functional domain, or compatibility requirements. Each skill optionally includes metadata such as version number, creator, and required permissions, with simulation preview options. The figure depicts a user selecting a "Task Prioritizer" skill and assigning it to their "Work NETA."

FIG. 27G illustrates conditional, on-demand skill acquisition triggered by task analysis during active conversation. The workflow shows: (1) Task encounter ("Can you sort these items by urgency?"), (2) Skills assessment revealing a missing skill, (3) Skill discovery querying the central repository including Candidate identification ("Urgency Classifier"), (4) Simulation and verification using current context, (5) Scoped activation with appropriate constraints (6) Conditional installation if validated, and (7) Task execution using the newly acquired skill.

The instantiated AI agent instances 2730 optionally implement intelligent knowledge resource discovery algorithms that autonomously determine relevant information sources from accessible knowledge resources based on semantic analysis of task requirements. The knowledge resource selection engine optionally analyzes task context, identifies conceptual matches between task objectives and available knowledge repositories, and constructs information access strategies that optimize data retrieval efficiency while respecting access credential boundaries. This autonomous determination eliminates the need for manual knowledge resource specification while ensuring comprehensive information gathering within authorized boundaries.

Optionally, the system 2700 may interface seamlessly with personalized AI agent instance architectures as described above with reference to FIGS. 1-25. When personalized AI agent instances require specific skills, such as data analysis, natural language processing, or third-party API integration, they invoke modular skills from the tool registry 2752 through the credential management system 2740. This separation of concerns allows personalized AI agent instances to focus on user context and behavioral adaptation while leveraging standardized, secure execution modules for functional skills.

Optionally, upon AI agent instance instantiation, processors 2710 may follow a structured initialization sequence that leverages the agent profile registry 2755. The initialization process begins by retrieving the AI agent instance's designated profile from the registry, which contains pre-validated associations between skills and knowledge resources. The AI agent instance then queries the tool registry 2752 to identify specific tools and skills relevant to the current operational context, cross-referencing these against the functions defined in its profile.

Simultaneously, the AI agent instance accesses the knowledge resource registry 2754 to identify knowledge bases and information repositories that align with its assigned tasks, using the access credentials established during the profile creation process.

During operational execution, instantiated AI agent instances optionally may orchestrate their assigned skills and knowledge resources to generate responses to user inputs. The AI agent instances optionally evaluate incoming requests against their profile-defined skills, selecting appropriate tools from their authorized skill set and accessing relevant information from their permitted knowledge resources. This orchestration process ensures that AI agent instances operate strictly within the boundaries established during profile creation while maximizing the utility of their assigned skills for task completion.

Optionally, the agent profile registry 2755 implements profile sharing functionality that enables secure copying and sharing of functions permissions and knowledge resource access rights between different AI agent instances through version-controlled profile templates. The functions permissions optionally define specific operational scope including data manipulation functions such as read, write, and modify operations, communication functions including internal messaging and external API access, and system integration functions for third-party service connections. Knowledge resource access rights optionally specify authorized data source access based on organizational role assignments, departmental hierarchy positions, and security clearance levels maintained through centralized policy management.

Optionally, the system 2700 implements a modular access control architecture that establishes differentiated permission structures for organizational and personal knowledge access. The architecture optionally provides read-write permissions for organizational knowledge resources based on departmental hierarchy validation through active directory integration, exclusive read-write permissions for user-specific knowledge resources restricted to associated user accounts through individual credential validation, and configurable cross-module access rules that enable controlled sharing of personal data with organizational modules subject to explicit user authorization managed through the agent profile registry 2755.

During operation, AI agent instances orchestrate skills and knowledge resources to execute complex workflows. For example, when a compliance officer requests a regulatory risk assessment, the AI agent instance optionally retrieves policies from an internal compliance knowledge resource, processes the content using a rule-evaluation skill, and generates a structured report highlighting key exposure areas and recommended mitigations. These orchestrated workflows allow the system to support complex, multi-step processes while maintaining security and traceability.

The orchestration functions extend to complex cross-functional workflows that span multiple departments and external systems. In a product development scenario, a project coordination AI agent instance might initiate by accessing design specifications from engineering knowledge resources, applying version control skills to track changes, then triggering manufacturing feasibility analysis using specialized assessment modules. The AI agent instance optionally coordinates with external supplier APIs through approved integration skills while maintaining strict access boundaries. When the engineering team updates designs, the AI agent instance optionally automatically propagates changes to relevant downstream processes, notifying affected departments through configured communication skills while logging all actions for project audit purposes.

Educational institutions demonstrate another complex orchestration pattern where AI agent instances combine student performance analysis skills with curriculum optimization knowledge resources and administrative compliance modules. A student success AI agent instance might analyze learning pattern data from educational knowledge resources, apply predictive modeling skills to identify at-risk students, and coordinate intervention strategies using counseling and tutoring skills. The system ensures student privacy through fine-grained access controls while enabling cross-departmental collaboration between academic advisors, instructors, and support staff.

Optionally, the user interface 2720 implements advanced natural language processing functions that translate user goal descriptions into specific skill selections through semantic parsing algorithms that analyze user intent, map desired outcomes to available skills, and present functions options in terms of user-focused benefits rather than technical implementation details. The automated skill mapping engine optionally operates transparently, enabling users to describe objectives such as 'analyze customer satisfaction trends' and automatically identifying relevant data analysis skills, sentiment processing skills, and visualization tools without exposing underlying technical complexity to users.

The architecture supports adaptation to organizational changes. When permissions or roles are updated, for example, when an engineer gains access to a new design knowledge resource, the AI agent instance optionally automatically updates its operational scope during the next synchronization cycle. Conversely, when access is revoked, the credential management system enforces the change instantly across all active sessions, ensuring that no stale credentials persist. In one use case, a contractor's temporary access to a proprietary model library can automatically expire after a set period, with no administrative intervention required.

Optionally, the system 2700 handles secure skill execution and knowledge resource access, while delegating higher-level orchestration, user personalization, and cross-platform coordination to specialized system components as described above with reference to FIGS. 1-25. For example, when a personalized AI agent instance determines that a user needs financial analysis skills, it requests execution of specific financial analysis skills through system 2700's sandboxed environment, while maintaining its own context about the user's preferences, historical interactions, and personalization settings.

Optionally, in an optional embodiment, the system enables discovery and configuration of AI agent instance skills from multiple sources, including organizational skill repositories, user-specific libraries, and approved external marketplaces. For example, a human knowledge resources manager could assemble a talent insights AI agent instance by combining internal HR data analysis skills with a verified third-party diversity benchmarking module. If no existing module meets a specific need, the system can generate a custom skill through automated code synthesis, validate it in a sandbox, and log the deployment for audit purposes, ensuring both flexibility and control.

Optionally, the system 2700 incorporates AI agent instance state serialization and deserialization functions that support seamless AI agent instance migration between heterogeneous computing environments while preserving functions access permissions and knowledge resource authorizations. The serialization protocol optionally captures AI agent instance configuration state, active skill associations, knowledge resource access credentials, and operational context in encrypted state packages that enable AI agent instances to migrate between cloud platforms, edge devices, and on-premises infrastructure without losing authorized functions or requiring credential re-provisioning.

FIG. 27H illustrates the comprehensive NETA Generator interface providing an environment for configuring, testing, and refining automated AI agent instances. The interface comprises four key components: (1) An integrated component library containing available skills and personality profiles, (2) A main configuration canvas displaying the AI agent instance's visual architecture with connected modules, (3) An interactive preview window allowing users to input hypothetical scenarios and view simulated AI agent instance responses, and (4) Advanced simulation controls enabling testing under varying conditions without altering the core configuration.

Optionally, in some configurations, the credential management system 2740 serves as the core security architecture. Before an AI agent instance can interact with a skill or knowledge resource, its identity and permissions are validated. Every action, including queries, updates, and writes, is logged with a cryptographic signature linking the action to the credential source. This immutable audit trail enables organizations to meet compliance requirements in regulated industries such as finance and healthcare, where traceability and accountability are mandatory.

Optionally, the credential management system 2740 maintains detailed authorization matrices that map specific skill and knowledge resource combinations to user roles and organizational policies. During the AI agent instance profile creation process, this system optionally performs validation of proposed associations, preventing the creation of AI agent instance profiles that would violate security protocols or exceed authorized access boundaries. The system logs all association requests and their outcomes, creating an audit trail that supports compliance monitoring and security analysis. This integration ensures that the modular architecture maintains security integrity while enabling flexible AI agent instance configuration.

Optionally, an optional embodiment provides technical boundary enforcement. AI agent instances are restricted to their assigned scopes and cannot perform unauthorized operations, even indirectly. For example, an AI agent instance without email permissions cannot use another system's integration credentials to send emails on behalf of a user. Attempts to perform out-of-scope actions are blocked in real time, and the AI agent instance provides a context-aware notification explaining the restriction and, where permitted, suggesting a request path for obtaining the required authorization.

Knowledge resources in the registry optionally define structural, security, and versioning parameters that AI agent instances must respect. For instance, a legal research AI agent instance accessing encrypted case archives must present valid credentials and use approved decryption protocols. The system's versioning ensures backward compatibility for legacy workflows while maintaining data integrity as updates are applied. In practice, this allows AI agent instances running different model versions to coexist without breaking ongoing workflows.

Optionally, in another optional embodiment, the processors implement semantic validation to ensure compatibility between user requests, available skills, and accessible knowledge resources. If a user requests a task requiring an unavailable skill, the AI agent instance optionally generates a recommendation to enable the needed module or to request provisioning from an administrator. This prevents execution errors and optimizes task fulfillment while reducing administrative overhead.

Logging is performed for every functions invocation and knowledge resource access. These logs optionally not only provide auditability but also support optimization by identifying high-usage skills or redundant modules. For example, if an analytics skill is heavily used by multiple departments, administrators can promote it as a standard module, improving efficiency and reducing duplication. Insights from these logs can also drive automated recommendations for retiring outdated or underused skills.

Optionally, in another optional embodiment, the system includes a centralized store that AI agent instances query when new tasks exceed their current configuration. For example, a logistics AI agent instance responding to a supply chain disruption could request access to an advanced optimization skill. Upon approval, the skill is provisioned, validated in a sandbox, and made available to the AI agent instance without requiring system restarts. This on-demand expansion of functions allows organizations to remain agile in dynamic environments.

Optionally, the centralized skill store and on-demand functions provisioning may directly support the intent-based interaction and workflow creation as described above with reference to FIGS. 1-25. When users express intents through natural language or configure new platform elements, the system 2700 optionally provides the modular skills needed to fulfill those intents. For instance, when a user requests creation of a "customer sentiment analysis dashboard," system 2700 optionally provisions the necessary sentiment analysis, data visualization, and reporting skills while maintaining security boundaries through the sandbox architecture.

The architecture supports profile and skill sharing to accelerate deployment. Teams can clone proven configurations across AI agent instances while maintaining independent access controls. For example, a compliance audit AI agent instance developed for one division can be cloned for another division with slight modifications, preserving consistency while honoring role-based permissions. Version tracking and attribution records ensure that all changes are auditable and reversible.

Knowledge resources optionally may be partitioned by departmental domain to enforce security and compliance. Cross-domain collaboration requires explicit authorization, and all shared access is time-bound and audited. For example, during a merger, finance and legal AI agent instances may be granted temporary shared access to due diligence data, with permissions automatically expiring after the project concludes. This controlled sharing minimizes security risks while enabling cross-functional collaboration.

Skills management allows AI agent instances to adjust their functions in real time. If a sales analyst enables a new forecasting module, the associated AI agent instance optionally updates its operational scope immediately, integrating the module into active workflows without interruption. Attribute changes are enforced by the credential system, ensuring boundary compliance while supporting agility. This adaptability is particularly valuable in fast-moving industries where operational requirements evolve frequently.

All skills operate in isolated sandboxes separate from the AI agent instance's reasoning core. This isolation ensures that experimental or third-party modules cannot affect system stability. If a module fails or exhibits anomalous behavior, the sandbox optionally automatically terminates it, preserving the integrity of the AI agent instance. Audit logs capture the failure details for diagnosis and remediation, enabling administrators to improve reliability over time.

FIG. 27I demonstrates the architecture of an AI agent instance composed of modular skills sourced from a centralized registry. The AI agent instance profile includes a "Subscribed Skills" panel with entries referencing skill IDs, types (internal/external), and current versions. The registry UI lists skill metadata including name, version history, author, tags, type, permission scope and compatibility matrix. Skills are not copied into the AI agent instance but maintained as references allowing updates or revocations, with skill execution decoupled from AI agent instance instantiation and treated as an injectable runtime dependency.

FIG. 27J shows an administrative dashboard interface within the AI agent instance management portal, displaying user accounts with their associated AI agent instances. Administrators can view linked AI agent instance profiles and active skills, toggle allowed skill categories, configure memory access permissions, activate or suspend AI agent instance participation, and assign required organizational AI agent instances to user profiles. All administrative actions are logged for auditability with rollback options available for permission or skill configuration changes.

The sandbox architecture optionally implements containerized execution using Docker-based isolation with computational resource quotas and network restrictions. Each skill optionally operates within allocated CPU and memory limits, preventing computational resource exhaustion attacks. Network access is governed by explicit allowlists defined in the skill metadata, ensuring modules can only communicate with approved endpoints. For example, a data analysis skill might be restricted to accessing specific database ports while being blocked from general internet access. The sandbox monitoring system optionally tracks computational resource utilization patterns, automatically scaling computational resources for high-demand skills while maintaining isolation boundaries.

Skill deployment optionally follows a comprehensive validation pipeline that includes static code analysis, dependency verification, and behavioral testing in isolated environments. When a new natural language processing skill is submitted, the system optionally verifies that all dependencies are from approved repositories, scans for security vulnerabilities using automated tools, and executes comprehensive test suites to validate expected behaviors. The deployment system optionally maintains version compatibility matrices, ensuring that skill updates don't break existing AI agent instance configurations. Rollback mechanisms allow instant reversion to previous versions if issues are detected in production environments.

AI agent instances optionally autonomously source and synthesize information from available knowledge resources to fulfill task requirements. For example, when generating a quarterly performance dashboard, the AI agent instance optionally retrieves operational, financial, and customer data from authorized knowledge resources, processes them with approved analytical skills, and generates a comprehensive report. This automation improves productivity while ensuring compliance with organizational policies.

A unified interface optionally abstracts the complexity of skill-knowledge resource orchestration, allowing users to focus on desired outcomes rather than technical configurations. For instance, a user may simply request "prepare a supplier risk assessment," and the AI agent instance optionally orchestrates the appropriate modules and datasets to generate the report, while maintaining strict security boundaries. This abstraction reduces user training requirements and promotes consistent, policy-compliant results.

Optionally, the unified interface integrates seamlessly with the SaaS platform components as described above with reference to FIGS. 1-25. When users interact with collaborative boards or project management interfaces, the modular AI system operates transparently in the background. For instance, when a user assigns an AI agent instance to a task in a project board as described above with reference to FIGS. 1-25, the AI agent instance optionally automatically queries the tool and knowledge resource registries to identify relevant skills for that task type. The credential management system optionally coordinates with the SaaS platform's existing permission manager to ensure consistent access controls across both the modular AI system and the broader platform functionality.

Optionally, the system's natural language processing functions enhance the intent-based interactions as described above with reference to FIGS. 1-25. When users provide natural language instructions to AI agent instances within the SaaS platform (such as "analyze quarterly performance data"), the modular system optionally translates these requests into specific skill and knowledge resource combinations. The AI agent instance might combine financial analysis skills from the tool registry with quarterly data from organizational knowledge resources, presenting results through the unified interface while maintaining full traceability of which modules were used and which data sources were accessed.

Optionally, the modular AI agent instance system 2700 provides the underlying functions infrastructure for broader SaaS platform functionalities including collaborative boards, project management interfaces, and cross-application workflows as described above with reference to FIGS. 1-25. When users interact with table structures or assign AI agent instances to tasks within the main SaaS platform, the system 2700 optionally provides the execution environment where task-specific skills are invoked. The credential management system 2740 optionally coordinates with the SaaS platform's permission manager to ensure unified access controls across both the modular execution layer and the user-facing platform components.

The registries support distributed synchronization with version control and atomic update mechanisms to prevent conflicts. Propagation rules govern how updates are applied across environments, ensuring sensitive modules remain internal while shared updates are distributed to authorized AI agent instances in external-facing systems. This allows organizations to maintain strict security perimeters while enabling seamless collaboration where appropriate.

Optionally, in another optional embodiment, administrators can revoke access across the environment. If a user leaves the organization, the credential management system optionally terminates all associated sessions, revokes tokens, and immediately blocks access to skills and knowledge resources, ensuring that no stale permissions can be exploited. This immediate enforcement minimizes risk and supports compliance in highly regulated industries.

Optionally, in an optional embodiment, the system 2700 provides intelligent functions recommendation functionality within the user interface 2720, allowing users to describe desired goals in natural language. The system optionally applies advanced natural language processing to interpret these descriptions, automatically identifying relevant skills that align with the expressed outcomes. For example, when a marketing manager types "help me automate social media campaign reporting," the system optionally translates this into a recommended configuration that includes analytics, visualization, and publishing skills, presenting the results in terms of user benefits rather than technical complexity.

Optionally, in some implementations, the system conducts automated workflow analysis to identify opportunities for enhanced functionality. When recurring patterns or bottlenecks are detected, the system optionally proactively recommends skills to optimize those workflows. For example, an operations coordinator who repeatedly requests inventory updates could receive a suggestion to add a supply-chain monitoring module, reducing manual steps and improving real-time visibility.

The recommendation interface optionally uses user-centric language to describe potential enhancements. Instead of displaying technical descriptors like "API connector module v3.2," the interface optionally presents actionable statements such as "This enhancement will allow your AI agent instance to automatically pull supplier lead times and generate daily restock forecasts." This abstraction encourages adoption by focusing on clear benefits.

To further improve usability, the system optionally may present scenario-based demonstrations showing "before and after" improvements. For instance, a sales manager considering a predictive pipeline module may see a simulation demonstrating how projected revenue accuracy improves with the enhancement, enabling informed decision-making.

Optionally, in some cases, trial periods are provided for new skills. A user evaluating an advanced reporting skill can enable the functions in a sandbox mode for a limited period, experience the potential benefits, and then decide whether to keep the functions active. This controlled exposure builds user confidence and reduces resistance to adopting new tools.

Personalized recommendations optionally may also be generated by analyzing individual user interaction patterns. For example, a research analyst frequently conducting manual cross-dataset comparisons may be prompted to enable a semantic data-linking skill, with the interface highlighting expected efficiency gains based on past usage history.

Users maintain control over enhancements and can approve or decline them based on transparent explanations of the benefits, scope, and security implications. Once accepted, enhancements are seamlessly integrated into the AI agent instance's workflow, without requiring manual boundary reconfiguration or redeployment. Over time, this results in measurable productivity improvements, as AI agent instances autonomously leverage optimized configurations tailored to evolving user and organizational needs.

Optionally, in another optional embodiment, the system provides comprehensive knowledge resource management to support AI agent instances operating across multiple applications and operational contexts. This functionality optionally organizes structured and unstructured information into accessible repositories, enabling AI agent instances to perform contextual inference and deliver insights without requiring users to manage complex integrations.

The system optionally implements advanced indexing and semantic search mechanisms that allow AI agent instances to retrieve information based on contextual relevance and natural language queries. For example, a project manager preparing a stakeholder update could ask, "Show me the latest risk assessments," and the AI agent instance would locate and synthesize relevant entries from distributed knowledge resources, even if those entries are stored across multiple applications.

Optionally, knowledge resources that may be managed by system 2700 serve multiple system layers within the broader SaaS platform architecture as described above with reference to FIGS. 1-25. User-specific knowledge modules optionally support personalized AI agent instance behaviors as described above with reference to FIGS. 1-25, while organizational knowledge resources provide consistent information access for cross-application workflows and intent-based interactions. The semantic search and indexing functions enable other system components to retrieve contextually relevant information without direct knowledge resource management.

Synchronization protocols ensure that knowledge resources remain consistent across distributed deployments. Updates made in one environment are propagated to others with eventual consistency guarantees, ensuring that AI agent instances working in remote or offline contexts always receive the most current and accurate information when synchronization resumes.

Organizational knowledge resources optionally may store machine-readable policies, procedures, and regulatory data, enabling AI agent instances to deliver compliance-aware guidance. For example, when a procurement AI agent instance drafts a vendor contract, it can automatically flag terms that deviate from internal policy or regulatory guidelines, reducing legal risk and review time.

The system also maintains user-specific knowledge modules containing historical interactions, task patterns, and personal preferences. This information allows AI agent instances to adapt automatically, providing recommendations and insights tailored to the individual user's workflows. For example, a legal assistant AI agent instance could recall a user's preferred formatting for briefs and automatically apply it when drafting new documents.

Historical conversation archives, decision records, and task execution logs optionally may also be preserved, allowing AI agent instances to reference prior actions when planning new tasks. In one scenario, a product development AI agent instance can automatically retrieve past design decisions when analyzing a request for a new feature, ensuring continuity and reducing redundant work.

Semantic embeddings and vector similarity search enable advanced cross-referencing and contextual retrieval. For example, when a support engineer queries "issues related to API latency," the AI agent instance can retrieve technical logs, past support tickets, and related knowledge entries, presenting a prioritized list of knowledge resources ranked by contextual relevance.

Knowledge resources optionally may be updated based on conversation outcomes, task completions, or explicit user inputs. AI agent instances can autonomously propose updates when they identify missing or outdated information. For example, after completing a customer integration, a solutions engineer AI agent instance might generate a draft knowledge resource entry summarizing key lessons learned, subject to user approval before publication.

Automated quality assessment routines optionally evaluate the accuracy and consistency of new entries, flagging anomalies for human review where necessary. Optionally, collaborative editing functions further support multi-user curation, with conflict resolution workflows to prevent data loss when simultaneous edits occur.

Optionally, the knowledge resource management system implements advanced semantic understanding through vector embeddings and graph neural networks. When organizational policies are updated, the system optionally automatically identifies related knowledge entries across different departments and applications. For example, when a company updates its data retention policy, the system optionally propagates relevant changes to HR knowledge resources, IT security knowledge resources, and compliance documentation simultaneously. The semantic analysis ensures that related concepts are updated consistently, even when they use different terminology across departments.

Cross-application knowledge inference enables AI agent instances to synthesize information from disparate sources without requiring manual integration. A strategic planning AI agent instance might combine financial performance data from accounting systems, market analysis from sales knowledge resources, and regulatory updates from compliance knowledge resources to generate comprehensive strategic recommendations. The system optionally maintains provenance tracking for all inferences, allowing users to understand how conclusions were derived and which knowledge resources contributed to specific insights.

Optionally, in another optional embodiment, the system supports container-based AI agent instance deployment, ensuring consistent execution environments across diverse infrastructure providers while maintaining strict boundary enforcement. This capability allows organizations to run AI agent instances seamlessly across on-premises servers, private clouds, and public cloud environments without reconfiguration.

The system also optionally provides AI agent instance state serialization and deserialization, enabling AI agent instances to migrate between environments or recover from disaster scenarios without losing context. For example, during a data center outage, active AI agent instances can be serialized, transferred to a backup environment, and resumed with full context and permissions intact, minimizing downtime and preserving operational continuity.

A unified knowledge resource interface optionally merges organizational and user-specific knowledge modules into a context-aware, personalized view for each AI agent instance. This merging respects permission boundaries, ensuring that sensitive data remains protected while still enabling seamless contextual reasoning.

For example, a finance AI agent instance analyzing budget variances may combine departmental expense data from organizational modules with a user-specific model containing personal annotations, producing a richer and more actionable analysis. Data lineage tracking ensures that users and administrators can always distinguish between organizational and personal sources, maintaining transparency and supporting compliance.

Optionally, in some embodiments, the system implements functions conflict resolution, applying hierarchical rules when user-configured skills conflict with organizational policies. For example, if a user attempts to activate an external API integration not approved by compliance, the system will block the activation and suggest policy-compliant alternatives, preserving both user productivity and enterprise security.

Profile sharing and copy functionality allow rapid deployment of proven configurations across teams. For instance, a customer support AI agent instance profile optimized for handling high-volume inquiries can be cloned across regional teams, ensuring consistent experiences while allowing local customization for language or regulatory differences.

The unified interface integrates personalized functions usage with knowledge resource access, delivering combined modular effects that enhance user productivity without requiring technical configuration. Users can request outcomes in natural language, and AI agent instances transparently orchestrate the necessary skills and data sources, reducing complexity while maximizing efficiency.

Edge deployment scenarios demonstrate the system's adaptability to distributed computing environments. In retail environments, local AI agent instances at individual stores can operate with reduced skill sets while maintaining synchronization with central skills. A store management AI agent instance might use local inventory analysis skills and customer behavior knowledge resources while periodically synchronizing with corporate knowledge resources for policy updates and performance benchmarking. The system handles intermittent connectivity gracefully, queuing updates and maintaining operational continuity even when network connections are unstable.

Multi-tenant cloud deployments showcase the system's scalability and isolation functions. In a shared services environment, multiple organizations can operate independent AI agent instance ecosystems while sharing underlying infrastructure. Each tenant's skills and knowledge resources remain completely isolated through cryptographic boundaries and separate registry namespaces. The credential management system ensures that no cross-tenant access is possible, even when AI agent instances from different organizations are running on the same physical hardware. Computational resource allocation algorithms prevent noisy neighbor effects while maintaining performance guarantees for each tenant.

Optionally, system 2700 may serve as the secure execution and functions management foundation for AI-enabled SaaS platform operations as described above with reference to FIGS. 1-25. While other system components handle user personalization, cross-platform synchronization, and high-level workflow orchestration, system 2700 ensures that all AI functions execute within controlled, auditable, and secure boundaries. This architectural separation enables the broader platform to provide sophisticated AI-driven user experiences while maintaining enterprise-grade security, compliance, and operational governance.

FIG. 27K illustrates an exemplary workflow for the computer-implemented method for modular AI agent instance operation using functions and knowledge resources, which may be implemented by the system 2700 described in FIG. 27A and consistent with embodiments as described above with reference to FIGS. 1-25. The method provides a comprehensive approach to creating, configuring, and deploying AI agent instances with specific functions tailored to organizational needs.

The process begins at step 2750, where the system provides a user interface 2720 that enables users to discover, select, configure and associate available skills and knowledge resources with an AI agent instance. This user interface 2720 optionally may present the available options through an organized, filterable display that allows users to browse skills by category, function, or compatibility requirements. The interface 2720 optionally may include search functionality and recommendation systems to assist users in identifying relevant skills and knowledge resources.

As shown at step 2752, the method involves maintaining comprehensive registries within the storage subsystem 2750. The tool registry 2752 optionally maintains a catalog of available skills, wherein each skill comprises a distinct executable function with defined parameters and operational scope. Concurrently, the knowledge resource registry 2754 optionally maintains available knowledge resources, wherein each knowledge resource comprises a distinct information repository with defined access parameters. These access parameters optionally specify data retrieval permissions, content boundaries, and information scope ranging from basic to comprehensive access levels, allowing for granular control over information access.

The storage subsystem 2750 further optionally maintains the credential management system 2740, which is configured to provision authentication credentials and manage access permissions for AI agent instances to skills and knowledge resources. Additionally, the agent profile registry 2755 optionally stores structured representations of AI agent instance configurations, as described above with reference to FIGS. 1-25.

At step 2754, the processors 2710 receive input for associating selected skills and knowledge resources with an AI agent instance for creating a new AI agent instance profile. This input optionally may be received through the user interface 2720 via various interaction methods, including drag-and-drop operations, selection menus, or direct specification of desired skills. The association process allows users to define the scope and functions of the AI agent instance by selecting appropriate combinations of skills and knowledge resources.

The method proceeds to step 2756, where the system performs verification with the credential management system 2740 to ensure that the associated skills and knowledge resources are approved to be associated with an AI agent instance profile. This verification process involves checking organizational policies, security constraints, and user authorization levels to ensure compliance with established governance frameworks. The credential management system 2740 optionally evaluates the proposed associations against predefined rules and access control mechanisms.

Upon successful verification, as shown at step 2758, the system creates a new AI agent instance profile and adds it to the agent profile registry 2755. This profile contains structured metadata defining the AI agent instance's functions, authorized skills, accessible knowledge resources, and operational parameters. The profile serves as a persistent configuration that can be referenced and updated as needed.

The method culminates at step 2760 with the instantiation of an AI agent instance based on the created profile. Upon initialization, the AI agent instance optionally receives its respective profile from the agent profile registry 2755, providing it with the necessary configuration data to operate within its defined scope. The AI agent instance then identifies from the functions specified in the profile those that are relevant for generating responses to user input, ensuring that only appropriate skills are utilized for each interaction.

Simultaneously, the AI agent instance optionally identifies accessible knowledge resources from the registry based on its profile and access credentials established through the credential management system 2740. This ensures that the AI agent instance operates within its authorized data boundaries while maximizing the utility of available information sources.

Finally, the AI agent instance optionally executes operations using the identified skills and knowledge resources to generate responses to user input. This execution occurs within the secure, sandboxed environment as described above with reference to FIGS. 1-25, ensuring that operations remain within defined boundaries while providing effective assistance to users.

The method optionally may include additional steps for monitoring AI agent instance performance, updating profiles based on usage patterns, and providing feedback mechanisms for continuous improvement. The method optionally may also incorporate the advanced features as described above with reference to FIGS. 1-25, including dynamic skills acquisition, cross-platform integration, and intelligent workflow optimization.

This method enables organizations to deploy AI functions that are both powerful and precisely controlled, ensuring that AI agent instances operate within appropriate boundaries while providing maximum value to users across diverse operational contexts.

Optionally, the modular AI agent instance system 2700 operates under compliance governance provided by the metadata-guided operation system 2800 as described above with reference to FIGS. 1-25. Before any skill is executed or knowledge resource accessed, the system 2700 optionally queries the structured metadata 2840 to validate that the requested operation conforms to organizational policies and regulatory requirements. The tool registry 2752 optionally maintains compliance tags for each skill indicating their operational constraints, while the knowledge resource registry 2754 includes access control metadata that references the compliance guidelines. When an AI agent instance 2730 requests functions provisioning, the credential management system 2740 optionally coordinates with the metadata validation system to ensure that the combination of user credentials, requested skills, and target knowledge resources complies with all applicable guidelines before authorizing execution.

Optionally, the modular AI agent instance operation system 2700 as described above with reference to FIGS. 1-25 provides flexible functions provisioning that operates within the compliance framework established by the metadata-guided operation system as described above with reference to FIGS. 1-25. While the modular system enables dynamic skill acquisition and knowledge resource access, the metadata-guided system ensures that all such operations conform to organizational policies and regulatory requirements. This relationship ensures that the flexibility and adaptability provided by modular operations never compromise the security, compliance, or governance standards required for enterprise deployment.

Reference is also made to FIG. 28A which illustrates an embodiment of a system 2800 for metadata-guided AI agent instance operation implementing compliance controls for restricted content access and generation monitoring that enforces strict compliance controls for content access, generation monitoring, and behavioral regulation. The system comprises one or more processors 2820 configured to load AI agent instance operational guidelines as structured metadata 2810 defining permitted actions the AI agent instance may perform, operational parameters specifying how actions should be executed, and behavioral constraints governing AI agent instance decision-making. The system further instantiates and executes AI agent instances 2830 that access the loaded metadata guidelines before performing any action, wherein each AI agent instance is configured to receive input requesting performance of actions and execute actions strictly in accordance with the metadata-defined permissions and parameters.

The one or more processors 2820 optionally maintain a comprehensive database containing AI agent instance operational guidelines 2840 associated with each user account, wherein each AI agent instance operational guideline defines compliance rules for AI agent instance operations through structured policy definitions. The database optionally implements persistent storage of compliance rules using encrypted data structures that associate user identifiers with specific operational constraints, behavioral parameters, and permission boundaries. The database optionally maintains version control of guideline modifications, enabling rollback functions and audit trail preservation for regulatory compliance requirements.

The structured metadata 2810 optionally is organized in a hierarchical format that enables efficient rule evaluation and inheritance patterns. The permitted actions optionally include defined scope boundaries with temporal restrictions that specify time-of-day operational windows and user role-based limitations that correspond to organizational hierarchy positions. The operational parameters optionally specify execution context requirements including multi-factor authentication levels and environmental validation procedures that verify secure execution environments. The behavioral constraints optionally include response tone requirements that maintain professional communication standards and escalation procedures that automatically transfer requests to human oversight when AI agent instance functions are exceeded or when actions require elevated authorization levels.

Optionally, the system 2800 may integrate seamlessly with the broader AI agent instance ecosystem through standardized terminology and interface protocols. AI agent instances optionally may be operating within this embodiment maintain consistent identity through the unified credential management system, access modular functions through the centralized skill registry, operate within compliance boundaries defined by metadata guidelines, participate in orchestrated communication protocols, and report operational metrics to the centralized management dashboard, ensuring that terminology and operational concepts remain consistent across all system components.

Optionally, the AI agent instances 2830 may be implemented as persistent, personalized AI agent instances, referred to as NETA (Never Ever Tired Assistant) agents, that function as first-class participants within collaborative digital environments. Each NETA (Never Ever Tired Assistant) agent optionally operates with a unique AI agent instance ID and maintains persistent identity across multiple communication threads, memory reservoirs, and skill configurations. Unlike traditional assistants limited to reactive, single-user interactions, these AI agent instances optionally maintain continuity across conversations, adapt their behavior over time, and proactively contribute to shared workflows without requiring explicit prompting each time input is desired.

When compliance violations are detected during input evaluation, the AI agent instances 2830 optionally implement intelligent alternative action generation through intent analysis algorithms that parse user objectives and map desired outcomes to permitted actions within compliance boundaries. The alternative action engine optionally analyzes user intent from the original input through semantic understanding models, identifies functionally equivalent operations that achieve similar outcomes while respecting compliance rules, and presents these alternatives to users with clear explanations of how the suggested actions accomplish user objectives without violating organizational policies or regulatory requirements.

The structured metadata 2810 optionally defines modular AI agent instance components including for example: • Personality Profiles: Optionally defining the tone, style, and interaction demeanor of an AI agent instance, which may be swapped independently of functions • Skills: Optionally, encapsulated task modules that may be prompt-based, script/code-based, or integration-based, executing in secure sandboxes • Memory Reservoirs: Optionally, structured data stores segmented by domain (e.g., Work, Personal, Thread-Local) and governed by per-AI agent instance read/write permissions • Context Windows: Optionally, bounded sets of messages, memory entries, or other data visible to an AI agent instance when formulating responses, actively enforced by orchestrators The one or more processors 2820 optionally orchestrate the loading and continuous validation of operational metadata 2810, ensuring that each AI agent instance executes in a controlled and auditable environment. The system optionally implements an intelligent orchestration engine responsible for managing AI agent instance visibility and participation per thread, speaking frequency and response suppression logic, and thread join/leave decisions based on semantic relevance. Each conversation optionally may instantiate a dedicated orchestration module (referred to as a "scoped orchestrator"), which operates as a lightweight orchestration module tied to a single conversation thread, initialized upon thread creation and retired upon closure.

Optionally, the AI agent instances 2830 implement selective data incorporation protocols when processing third-party data sources by applying compliance filters that parse external data to identify compliant segments, extract authorized information portions for inclusion in responses, and omit violating segments without indicating to users that data filtering has occurred. The selective incorporation process optionally maintains response coherence while ensuring that only compliant data portions are presented to users, preserving the appearance of comprehensive data access while maintaining strict adherence to organizational data governance policies.

The orchestration logic optionally prevents AI agent instances from overwhelming conversations through relevance calculation using keyword/context matching, memory relevance, recent interaction history, and user policy rules. When a message is posted in a thread, the orchestration engine optionally evaluates relevance based on for example: • Tokenization and Parsing: Optionally decomposing messages into tokens using natural language tokenizers and mapping to semantic features via embedding models • Relevance Scoring: Optionally computing composite relevance scores for each AI agent instance assigned to the thread • Decision Logic: Optionally granting AI agent instance visibility and response authorization only when relevance scores exceed defined thresholds • Rate Limiting and Suppression: Optionally preventing AI agent instances from replying too frequently and ensuring AI agent instances do not duplicate responses when skill scopes intersect AI agent instances are instantiated with metadata-aware operational contexts, enabling precise alignment with organizational governance requirements across applications, environments, and user interactions. The system supports cross-thread synthesis where AI agent instances observe live message streams across multiple concurrent conversation threads, detect intent, extract actionable items, and reason across thread boundaries to ensure relevant task continuity and coordination. Each AI agent instance optionally maintains a thread-level awareness graph, enabling synthesis of related information discussed in parallel conversations.

Optionally, a dedicated compliance monitoring AI agent instance operates as an intelligent compliance layer within the AI agent instance ecosystem. Unlike traditional rigid compliance frameworks, this compliance monitoring AI agent instance functions as a specialized AI agent instance with its own reasoning capabilities, contextual understanding, and/or adaptive response mechanisms. The compliance monitoring AI agent instance optionally operates in multiple deployment configurations including direct monitoring through desktop applications or browser extensions that analyze screen content in real-time, indirect monitoring as a middleware AI agent instance positioned within the communication chain between user interactions and operational AI agent instances, and hybrid monitoring that combines both direct observation and communication interception.

The compliance monitoring AI agent instance optionally implements intelligent content analysis that goes beyond keyword matching or rule-based filtering. The monitoring AI agent instance utilizes natural language understanding to comprehend context, intent, and potential compliance implications of both user inputs and AI agent instance outputs. When deployed as a direct monitoring solution, the compliance AI agent instance analyzes visual screen content, application interfaces, and user interactions through optical character recognition and interface element detection, enabling real-time assessment of compliance risks as users interact with AI-enabled applications.

When operating as a middleware AI agent instance, the compliance monitoring AI agent instance optionally intercepts communication flows between users and operational AI agent instances, performing real-time analysis of message content, attachment scanning, and contextual risk assessment. The middleware deployment enables the compliance AI agent instance to modify, redact, or block communications that violate organizational policies while providing explanatory feedback to users about compliance requirements and alternative approaches.

The compliance monitoring AI agent instance optionally maintains its own behavioral profile and learning capabilities, enabling adaptation to organizational compliance patterns and emerging risk scenarios. The monitoring AI agent instance can recognize patterns of compliance violations, identify users or contexts that require additional oversight, and provide proactive guidance to prevent violations before they occur. Advanced implementations may include predictive compliance assessment where the monitoring AI agent instance anticipates potential violations based on conversation context and user behavior patterns.

The compliance monitoring AI agent instance optionally integrates with the orchestration layer described above, participating in multi-agent communications while maintaining its specialized compliance focus. During collaborative sessions, the compliance AI agent instance can observe interactions between multiple operational AI agent instances and users, ensuring that collective outputs comply with organizational policies and regulatory requirements. The monitoring AI agent instance may intervene in real-time to flag potential violations, suggest alternative approaches, or escalate issues to human oversight when automated resolution is insufficient.

Optionally, the system 2800 is further configured to cause the AI agent instances 2830 to determine whether requested actions conform with the permitted actions through a two-stage validation process that first analyzes permissions then processes intent. The system optionally transforms user intent expressed in natural language into specific AI agent instance actions only when metadata permissions explicitly allow such transformations. AI agent instances optionally generate explanatory responses when refusing to perform actions not explicitly permitted by the metadata guidelines, and adapt their operational behavior based on metadata-specified constraints and procedures.

Optionally, the content replacement system implements advanced formatting preservation algorithms that maintain original visual characteristics including text length consistency through content scaling, visual layout preservation through spatial positioning algorithms, font characteristics maintenance including typography and styling attributes, spacing relationships preservation through proportional adjustment mechanisms, and visual element positioning that ensures replacement content integrates seamlessly within existing interface layouts. These formatting preservation functions ensure that content replacement operations appear transparent to users and modified responses maintain visual equivalence to unmodified responses.

When processing natural language requests, the system optionally employs enhanced natural language interpretation comprising: • Semantic Analysis: Optionally analyzing user input to identify intent within metadata-defined operational boundaries • Skills Matching: Optionally matching identified intent against available AI agent instance functions and permissions • Permission Validation: Optionally ensuring proposed actions align with metadata-defined permitted operations before execution • Conversational Context Maintenance: Optionally maintaining dialogue context across multiple conversational turns subject to metadata-specified memory and retention constraints Optionally, the AI agent instance operational guidelines 2840 define comprehensive escalation procedures for systematic management of requests requiring elevated authorization. The escalation framework optionally includes automated detection of actions that exceed defined permissions through functions boundary analysis, structured escalation pathways that route requests to appropriate human oversight based on organizational hierarchy and authorization levels, and escalation logging that maintains audit trails of elevated requests including approval workflows and decision rationales for compliance documentation and policy refinement purposes.

Optionally, the system 2800 implements comprehensive audit and logging requirements that generate timestamped records of all permission evaluations and action executions through cryptographic audit trails. The logging system optionally captures AI agent instance decision-making processes including compliance rule evaluations, alternative action generations, content modification operations, and escalation events. Each audit record optionally includes AI agent instance identifier, user account association, action classification, compliance rule references, decision timestamps, and cryptographic signatures that ensure non-repudiation and support regulatory reporting requirements.

If an action is permitted, the AI agent instance optionally performs the operation according to defined parameters, including execution context, allowed data sources, and behavioral tone constraints. The system optionally may implement conditional skill acquisition where AI agent instances encountering tasks beyond current permissions automatically query a central skill repository for relevant skills, simulate candidate skills using available data, and temporarily install validated skills within governance constraints.

Optionally, the structured metadata 2810 further defines execution context requirements specifying environmental conditions necessary for action performance, including memory reservoir access permissions and contextual data injection mechanisms. The system supports structured memory stores segmented by domain with configurable read/write permissions for each AI agent instance. Each memory reservoir optionally operates as a typed, indexed data store organized as collections of memory entries tagged with metadata including source, type, content, creation timestamps, expiration policies, priority levels, and visibility scopes.

Optionally, collaborative session context analysis comprises comprehensive automated analysis of conversation history and participant roles when AI agent instances 2830 join existing collaborative sessions, subject to access permissions defined in the AI agent instance operational guidelines 2840. The collaborative session context optionally includes active conversation topics extracted through semantic analysis, participant organizational roles verified through directory services integration, shared document references with access permission validation, and task status indicators maintained in structured data formats that enable AI agent instances to understand collaboration state while respecting information access boundaries.

Optionally, the system 2800 implements cross-context action replication functionality wherein the orchestration engine monitors and records specific actions performed by AI agent instances 2830 within first operational environments and enables adaptive application of those actions across different operational environments. The replication system optionally logs successful action sequences through structured action templates, validates cross-context applicability through environment compatibility analysis, and applies recorded actions to new contexts while maintaining compliance with logging permissions defined in the AI agent instance operational guidelines 2840.

Optionally, the system 2800 implements action template management through automated decomposition algorithms that break complex actions into atomic operations, each individually validated against compliance rules defined in the AI agent instance operational guidelines 2840. The template storage system optionally maintains reusable action sequences with variable placeholders that comply with data handling parameters specified in the operational guidelines. Template execution optionally includes parameter validation, compliance re-verification, and context adaptation to ensure that replicated actions maintain adherence to current organizational policies and regulatory requirements.

The system optionally implements a Memory Interface Layer (MIL) that enforces access policies through for example: • Scoped Read/Write Access: Optionally AI agent instances accessing only explicitly assigned reservoirs via access control lists and role-based access control • Memory Promotion/Demotion: Optionally users and privileged AI agent instances flagging entries as persistent, demoting transient ones, or suppressing access for defined durations • TTL Management: Optionally configurable time-to-live for entries with soft-deletion unless retained for audit or summarization • Drag-and-Drop Context Injection: Optionally users directly placing contextually relevant content into AI agent instance interfaces to create temporary or scoped memory entries The metadata optionally may specify execution context requirements for certain actions, such as requiring a secure environment, multi-factor authentication, or administrator approval, with AI agent instances either delaying execution or escalating requests through defined approval workflows when conditions are not met.

FIG. 28B illustrates an exemplary workflow for memory ingestion and processing by an automated AI agent instance. This workflow demonstrates how different types of input information received by the AI agent instance are analyzed, categorized, and stored into appropriate memory structures or reservoirs, optionally with different retention policies. The figure depicts the AI agent instance receiving multiple distinct inputs simultaneously or sequentially. In this specific scenario, three different input types are shown entering the workflow: (1) an uploaded file provided to the AI agent instance, (2) a project task, optionally dragged and dropped by the user onto an interface associated with the AI agent instance, and (3) a referenced calendar event, perhaps linked or mentioned in a conversation. Each of these inputs is directed towards a central processing component, referred to as a "memory preprocessor." This preprocessor is responsible for analyzing the incoming data through several substeps: Optionally tagging (assigning relevant keywords or metadata tags to the input data for easier retrieval and contextualization), classification (determining the type or category of the information), and reservoir assignment (deciding the appropriate memory reservoir or storage location based on the classification, source, or predefined rules). Following preprocessing, the workflow shows the distinct handling and storage outcomes for each initial input: the uploaded file content is designated for long-term memory storage and assigned to a "Work" memory reservoir, the user-dragged project task is classified as temporary scoped context with a defined retention period (e.g., 24 hours), and the referenced calendar event metadata is processed and stored within a dedicated "Scheduling" memory reservoir.

FIG. 28C illustrates an exemplary memory sorting and distribution flow performed by an automated AI agent instance. This flow demonstrates how the AI agent instance processes incoming user messages originating from a single communication thread and intelligently sorts and distributes the information contained within them into multiple, distinct memory reservoirs based on context or content analysis. The figure depicts an AI agent instance processing a sequence of user messages received within one specific chat thread, focusing on parsing different topics or intents expressed within a single conversational context. The workflow shows the AI agent instance analyzing individual messages from this thread and directing the information derived from each message to different, appropriate memory reservoirs. The figure provides specific cases of this distribution: a message containing "Need to finalize the budget" is processed and directed into a "Work" memory reservoir, another message such as "Buy more printer paper" is analyzed and sorted into a "Shopping" memory reservoir, and a third message like "Don't forget Mom's birthday" is identified as personal and stored in a "Personal" memory reservoir. The figure optionally may visually represent these stored memory entries with color-coding for each reservoir and Time-to-Live (TTL) indicators showing persistence or expiration time, reflecting different retention policies applied based on the reservoir or content type.

FIG. 28D presents an exemplary graphical user interface designed for memory management, allowing a user to view, inspect, and control the information currently stored or remembered by their associated automated AI agent instance(s). The interface displays the AI agent instance's memory content, organized primarily by memory reservoir (e.g., separating "Work," "Personal," "Scheduling" memories), with memories presented using either a timeline layout arranging entries chronologically or a card-based layout where each distinct memory item is represented as an individual card. Each displayed memory entry optionally includes associated metadata comprising details such as the source of the memory, the origin AI agent instance if multiple AI agent instances contribute to a shared memory space, timestamps indicating when the memory was created or last updated, and optionally expiration dates or TTL indicators. The interface optionally provides interactive controls enabling users to actively manage the AI agent instance's memory through buttons or interactive elements that allow actions such as: Optionally promote (increase the importance or persistence of a specific memory item), demote (decrease the importance or shorten the lifespan of a memory item), delete (explicitly remove a memory item from the AI agent instance's recall), and transfer (move a memory item between different scopes or reservoirs). The interface also optionally visually distinguishes temporary contextual information with context cards or entries injected temporarily into the AI agent instance's working memory, displayed with clear visual decay timers or progress bars indicating their transient nature and remaining lifespan before automatic expiration.

Optionally, the structured metadata 2810 further defines escalation procedures for handling actions that exceed current metadata permissions and skill execution parameters. The system supports a modular, extensible Skill Store architecture allowing AI agent instances to acquire new skills either by user selection or in response to specific task requirements. Skills are encapsulated task modules that may be prompt-based, script/code-based, or integration-based, executing in secure sandboxes with defined interfaces while maintaining isolation of AI agent instance core logic.

Each skill optionally is defined by a skill manifest—a structured metadata record encapsulating the skill's identifier, type (internal or sandboxed), input and output schema, required permissions, and execution constraints. The manifest enables the AI agent instance framework to validate, route, and monitor skill behavior consistently across diverse deployment environments, optionally including expiration windows, scope boundaries, and compatibility flags ensuring only AI agent instances with matching functions may activate skills.

Skill acquisition optionally occurs through validation pipelines where skill metadata is verified for compatibility with AI agent instance configuration, execution contexts are determined (internal loading vs. sandbox provisioning), and secure isolation boundaries are established. For external skills, the system optionally provisions secure sandbox environments using technologies like WebAssembly virtual machines, containerized microservices, or serverless function execution contexts, with skill code prohibited from accessing private user data, AI agent instance configuration, or other skills unless specifically declared in manifests and approved by system policy layers.

Optionally, the structured metadata 2810 further defines audit and logging requirements for tracking AI agent instance compliance with metadata guidelines, including comprehensive logging where every action is timestamped, attributed, and cryptographically signed to ensure non-repudiation. The system supports advanced collaborative session context analysis where AI agent instances joining collaborative sessions automatically acquire real-time context such as conversation history, participant roles, and task status subject to metadata-defined permissions.

Optionally, collaborative session context analysis comprises for example: • Conversation History Analysis: Optionally automatically analyzing conversation history and participant roles when AI agent instances join existing sessions • Shared Document Integration: Optionally extracting relevant context from shared documents, task boards, and calendar events when metadata guidelines permit access • Task Status Tracking: Optionally identifying ongoing tasks and current status within metadata-specified operational parameters • Communication Style Adaptation: Optionally adapting AI agent instance communication style according to metadata-defined behavioral constraints while matching established conversation tone Optionally, the natural language processing system implements cross-board action replication with intelligent adaptation where AI agent instances detect patterns of successful operations in one context and suggest adapted workflows in similar environments. Action templates validated against metadata policies enable workflow replication while maintaining compliance and auditability. This includes analyzing action semantics to determine context-specific versus universally applicable components, mapping data fields and relationships between different contexts within metadata-specified boundaries, and providing user confirmation interfaces before executing replicated actions.

Optionally, the AI agent instances 2830 validate metadata compliance with organizational policies and regulatory requirements before initiating any operational sequence, supporting conversational AI suggestion popups with action injection where AI agent instances surface message suggestions through contextual overlays activated by recent conversational activity. Suggestions appear as floating popups, pinned sidebars, or suggestion bubbles adjacent to relevant content, allowing users to inject proposed messages into conversations as if authored by them.

The system enables auto-surfacing UI overlays triggered by task inference where AI agent instances monitor thread content, identify intent signals, and surface context-relevant UI components inline without explicit commands. When users mention tasks such as scheduling, file sharing, or approval requests, the system interprets intent through recognition and surfaces interactive UI components including calendar widgets, file uploaders, and checklists that are prefilled with extracted metadata.

AI agent instance messages are structured to conform visually and behaviorally to human user interaction patterns, using native reply mechanisms such as threaded replies or @mentions rather than special AI agent instance bubbles. This ensures natural integration and consistent visual experience across participants, with AI agent instances accessing the same UI components as human users while maintaining attribution through visual ownership indicators linked to their associated users.

Optionally, the AI agent instances 2830 generate compliance reports documenting adherence to metadata-defined constraints accessible only to administrative users and not available to regular users. The system incorporates an administrative control framework allowing organizations to manage both users and their associated AI agent instances through role-based access control distinguishing between regular users, team leads, and administrators with varying modification privileges.

Optionally, administrative features include for example: • Skill Policy Management: Optionally administrators restricting installation of certain skills or pre-installing required organizational skills • Memory Scope Enforcement: Optionally defining which memory reservoirs AI agent instances may access and applying redaction or expiration policies • AI agent instance Activation Control: Optionally authorizing which AI agent instances operate in specific contexts while disabling others • Credential Provisioning: Optionally pre-approving integration tokens at organizational levels for external skills All administrative actions optionally may be logged for auditability with rollback options available for permission or skill configuration changes. The system supports intelligent feature promotion based on changelog integration where AI agent instances become contextually aware of newly released product features and organically introduce relevant updates to users based on live conversation threads or behavior patterns.

Optionally, the AI agent instances 2830 may update their behavioral models based on metadata guideline modifications without requiring system restart through real-time updates to the metadata layer 2810. The system supports dynamic updates without requiring AI agent instance restarts or service interruptions, allowing organizations to adapt instantly to regulatory changes, policy adjustments, or evolving risk landscapes while ensuring AI agent instance behavior remains consistent with current requirements.

Optionally, the system implements real-time compliance monitoring during content generation where draft communications and content creation are analyzed for compliance violations in real-time. This includes preventing transmission of messages about restricted topics based on recipient analysis and content sensitivity assessment, such as detecting and preventing emails about international meetings to unauthorized recipients.

Optionally, version-controlled metadata guidelines may enable rollback to previous operational parameters if new policies cause unintended operational disruptions. AI agent instances optionally may adapt to metadata updates in real time while maintaining operational continuity and compliance with current governance frameworks through hierarchical metadata inheritance where general rules are supplemented by role-specific overrides.

Optionally, the system 2800 maintains version-controlled metadata guidelines enabling comprehensive workflow scenarios. For example, in a product development thread titled "Q3 Feature Launch," when Dana mentions "We need to finalize the demo schedule and align with marketing," Dana's NETA (Never Ever Tired Assistant) agent responds within metadata-defined parameters: "I'll prepare a preliminary schedule and loop in the marketing team's NETA." Simultaneously, the orchestrator identifies that a Project Planner Bot has metadata-tagged functions for "Schedule Coordination" and activates it appropriately.

In compliance-sensitive environments, the system demonstrates coordinated delegation where a product manager joining a support escalation thread and writing "We need full logs and a QA plan update ASAP" triggers the orchestrator to detect that no single AI agent instance is suited for both tasks. The system routes requests according to metadata-defined functions: logs to the "Incident Tracker Bot" and QA plan to the "Release Prep NETA," then posts a synthesized message: "Logs are being collected; QA plan update will follow within 24 hours."

The system supports multilingual collaboration where users may define interface languages with AI agent instances capable of translating both their own messages and those of human participants, rendering them individually for each viewer. When a participant types in their native language, their associated NETA (Never Ever Tired Assistant) agent intercepts the message, detects multilingual conversation context, and simultaneously translates the message into native languages of other participants while maintaining tone consistency through personality settings.

Optionally, the system 2800 supports hierarchical metadata inheritance and cross-platform AI agent instance deployment where AI agent instances maintain persistent digital identity spanning multiple modalities and communication platforms. Each AI agent instance retains its unique AI agent instance ID, personality profile, and memory reservoir mappings regardless of host environment, enabling operation across web chat, mobile apps, voice calls, and desktop applications without loss of continuity or context.

AI agent instances created within the system optionally may be exported to external web platforms, collaborative applications, or digital ecosystems beyond the originating environment. Exported AI agent instances optionally maintain assigned skill packs, memory permissions, and behavioral configurations while adapting input/output interfaces to match hosting platform protocols. This supports multi-tenant AI agent instance ecosystems where single NETA (Never Ever Tired Assistant) instances operate in internal workspaces, customer-facing interfaces, and partner platforms simultaneously under governed policy constraints.

The architecture extends to physical robotic systems and embodied AI agent instances where robotic platforms adopt NETA (Never Ever Tired Assistant)-based configurations to govern behavior, decision-making policies, and task-specific skill execution. Robotic AI agent instances optionally subscribe to skills from registries, inherit memory scoping rules, and adjust responses based on active conversational threads, sensor inputs, or environmental triggers, extending agentic principles into embodied robotics domains.

Optionally, the system 2800 provides real-time metadata validation ensuring AI agent instance actions remain within defined operational boundaries through comprehensive technical implementation including event-driven, real-time messaging architecture using WebSocket protocols, pub-sub layers, or RESTful polling frameworks. Each thread optionally includes context trackers, semantic indices, and user-role matrices with messages routed through orchestration layers that interpret content, throttle responses, and determine relevance.

The implementation supports deployment variations from small team configurations with single-AI agent instance backends and shared skill/memory services to large enterprise deployments with AI agent instances as distributed microservices across Kubernetes clusters featuring custom data isolation, sandboxing, and orchestration logic. Authentication is handled via standard SSO or OAuth2 flows with access tiered by user role, while administrative control layers allow designated users to configure AI agent instance permissions, pre-approve skill access, and define memory policies centrally.

All technical components optionally may be implemented using standard web frameworks, cloud infrastructure providers, and AI inference systems including LLM APIs or containerized inference runtimes. Variations optionally may include mobile-native implementations, VR/AR overlays, or embedded AI agent instance hardware, demonstrating the system's adaptability across diverse deployment environments while maintaining consistent metadata-guided operation and compliance controls.

Optionally, the AI agent instances 2830 may interpret natural language requests within the constraints of metadata-defined permitted actions, wherein natural language interpretation comprises semantic analysis of user input to identify intent, functions matching against available AI agent instance functions, and permission validation before executing corresponding actions. Users interact with AI agent instances through natural language prompts that are automatically filtered through the metadata compliance layer, where the AI agent instance interprets intent, validates permissions, and executes only approved operations, enabling safe conversational workflows in compliance-sensitive environments.

Optionally, the AI agent instances 2830 may be configured to operate within Software as a Service (SaaS) platforms, functioning as virtual team members within collaborative table structures as described above with reference to FIGS. 1-25. Each NETA (Never Ever Tired Assistant) agent can be assigned to specific items in tabular data structures, inheriting metadata-defined access permissions that correspond to the data characteristics and workflow requirements of the assigned tasks.

Users interact with AI agent instances 2830 through conversational prompts that are filtered through metadata guidelines before execution. The natural language processing interface enables users to communicate with AI agent instances using conversational prompts that are interpreted within metadata-defined operational boundaries, providing technical advancement over basic natural language processing through integrated compliance checking.

Optionally, the system 2800 supports intent-based interactions where users can communicate with AI agent instances 2830 through natural language inputs that are automatically filtered through the metadata compliance layer. The AI agent instances interpret user intent, validate permissions, and execute only approved operations, enabling safe conversational workflows in compliance-sensitive environments.

Optionally, the AI agent instances 2830 execute corresponding actions only when metadata permissions explicitly allow the requested operations. The system transforms user intent expressed in natural language into specific AI agent instance actions only when metadata permissions explicitly allow such transformations, implementing a structured two-stage validation process that first analyzes permissions then processes intent.

Optionally, the metadata guidelines 2810 extend to cross-platform synchronization, where AI agent instances 2830 maintain consistent behavioral constraints across multiple integrated software services as described above with reference to FIGS. 1-25. The system monitors data flow between platforms, applying metadata-defined rules to ensure compliance is maintained during cross-platform operations and data synchronization activities.

On-the-fly context acquisition enables AI agent instances 2830 joining collaborative interfaces to automatically acquire real-time conversation context and participant information subject to metadata-defined access permissions. AI agent instances joining collaborative sessions automatically acquire real-time context such as conversation history, participant roles, and task status subject to metadata-defined permissions, ensuring coordinated behavior and continuity without risking unauthorized disclosure of sensitive data.

Optionally, the system 2800 implements AI computational resource management within the metadata compliance framework, treating AI agent instances as controlled computational resources subject to metadata-defined allocation limits. This ensures that AI functions are distributed according to organizational policies while maintaining audit trails for all computational resource utilization.

Optionally, collaborative session context analysis comprises automatically analyzing conversation history and participant roles when AI agent instances 2830 join existing collaborative sessions, subject to metadata-defined access permissions, wherein collaborative session context comprises active conversation topics, participant organizational roles, shared document references, and task status indicators maintained in structured data formats. The system performs comprehensive analysis of collaborative contexts while ensuring all information access complies with established metadata constraints and participant permission levels.

Optionally, the AI agent instances 2830 perform contextual data analysis of structured environments while operating within metadata-defined boundaries as described above with reference to FIGS. 1-25. The analysis considers column types, data relationships, and workflow patterns, but all insights and recommendations are filtered through compliance controls to ensure adherence to organizational policies and regulatory requirements.

Optionally, collaborative session context analysis comprises extracting relevant context from shared documents, task boards, and calendar events only when metadata guidelines permit such access. The system integrates information from multiple collaborative sources while maintaining strict adherence to access control policies defined in the metadata framework.

Optionally, collaborative session context analysis comprises identifying ongoing tasks and current status within the boundaries of metadata-specified operational parameters. The system tracks collaborative work progress and task dependencies while operating within the constraints established by the organizational governance framework.

Optionally, collaborative session context analysis comprises adapting AI agent instance communication style according to metadata-defined behavioral constraints while matching established conversation tone. AI agent instances also adapt their communication style according to behavioral constraints defined in the metadata, maintaining compliance while adjusting tone and complexity for different contexts, such as using formal structured output in legal workflows while employing more conversational tone in internal project collaboration without breaching compliance policies.

Optionally, the system 2800 further comprises cross-board action replication with intelligent adaptation, wherein the system monitors and records specific actions performed by AI agent instances 2830 within a first context, subject to metadata-defined logging permissions, enabling context-specific adaptation across different operational environments. The system supports cross-board action replication, where AI agent instances detect patterns of successful operations in one context and suggest adapted workflows in similar environments, with action templates validated against metadata policies before execution to ensure that replicated workflows remain compliant and auditable.

Cross-board action replication further comprises detecting when users transition between different boards, contexts, or application areas within the same software platform, automatically identifying previous actions performed in similar contexts that may be relevant to the current board or context, presenting users with options to replicate successful action sequences from previous boards with context-appropriate parameter modifications, maintaining cross-board conversation continuity enabling users to reference and continue discussions initiated in different application contexts, and learning user preferences for automatic action suggestion versus explicit approval for cross-board action replication.

Optionally, the system 2800 further comprises isolated memory management, wherein the AI agent instances 2830 designate information as distinct memory silos separate from collaborative knowledge, enabling storage of confidential information that remains detached from general knowledge resources accessible to other users. To protect sensitive information, the system supports isolated memory management, allowing AI agent instances to create secure memory silos for confidential data that remain detached from general knowledge resources and are accessible only under strictly validated conditions, preventing accidental exposure.

The system stores action templates that represent sequences of operations that comply with metadata-specified operational parameters. The system optionally maintains libraries of validated action templates that encapsulate proven workflows while ensuring continued compliance with governance requirements.

Optionally, the system 2800 detects when AI agent instances transition to second contexts where similar actions could be beneficial, as permitted by metadata guidelines. The system continuously analyzes operational contexts to identify opportunities for beneficial workflow replication while maintaining compliance with all applicable metadata constraints.

Replicated actions are executed with appropriate parameter modifications based on metadata-defined adaptation rules. When replicating successful workflows, the system optionally automatically adjusts parameters to ensure compatibility with the new operational context while maintaining adherence to governance requirements.

Cross-board action replication comprises analyzing action semantics to determine which components are context-specific versus universally applicable, according to metadata-defined analysis parameters. The system optionally employs semantic analysis to distinguish between transferable and context-dependent elements of successful workflows.

Cross-board action replication comprises mapping data fields and relationships between different contexts within the constraints of metadata-specified operational boundaries. The system optionally maintains comprehensive mapping of data relationships across different operational contexts while ensuring all mappings comply with established governance frameworks.

Cross-board action replication comprises providing user confirmation interfaces before executing replicated actions, as required by metadata-defined authorization procedures. The system optionally implements appropriate human oversight mechanisms for workflow replication, ensuring that automated suggestions receive proper validation before implementation.

Cross-board action replication comprises storing successful action replication patterns as templates for future scenarios, subject to metadata-specified storage policies. The system builds institutional knowledge by capturing and cataloging successful workflow patterns while maintaining appropriate data governance and retention policies.

Action template storage and execution comprises decomposing complex actions into atomic operations that can be individually validated against metadata guidelines. Complex workflows are broken down into constituent elements that can be independently verified for compliance, enabling granular governance control.

Action template storage and execution comprises storing action templates with variable placeholders that comply with metadata-defined data handling parameters. Templates incorporate flexible parameters that can be safely customized for different contexts while maintaining compliance with data protection requirements.

Action template storage and execution comprises implementing action execution validation to ensure replicated actions conform with metadata-specified permissions and constraints. Every replicated action undergoes comprehensive validation to ensure continued compliance with current governance requirements.

Action template storage and execution comprises providing rollback functions for replicated actions according to metadata-defined error handling procedures. The system optionally maintains comprehensive audit trails and rollback functions for all automated actions, enabling rapid recovery from any compliance issues.

Optionally, the system 2800 further comprises natural language-driven interaction with enhanced metadata validation, wherein a natural language processing interface enables users to communicate with AI agent instances 2830 using conversational prompts that are interpreted within metadata-defined operational boundaries providing technical advancement over basic natural language processing through integrated compliance checking.

Users interact with AI agent instances 2830 by expressing natural language requests that are validated against metadata guidelines before execution. All natural language interactions undergo comprehensive validation to ensure compliance with organizational policies before any processing begins.

AI agent instances 2830 respond in natural language while adhering to metadata-specified communication constraints and behavioral parameters. AI agent instance responses are generated within established communication guidelines, ensuring appropriate tone, content, and disclosure levels for different organizational contexts.

Conversational intent detection comprises intent detection algorithms that analyze conversational context to identify user goals within the scope of metadata-defined permitted actions. The system optionally employs advanced natural language understanding to identify user intentions while ensuring all detected intents fall within approved operational boundaries.

Conversational intent detection comprises dialogue context maintenance across multiple conversational turns subject to metadata-specified memory and retention constraints. The system optionally maintains conversation context across extended interactions while adhering to data retention and privacy requirements defined in the metadata framework.

Conversational intent detection comprises response complexity and terminology adaptation based on metadata-defined communication parameters. AI agent instance responses are automatically calibrated to appropriate complexity levels and terminology based on user roles and organizational communication standards.

Conversational intent detection comprises users modifying AI agent instance behavior through conversational feedback only when metadata guidelines permit such modifications. User-driven AI agent instance customization is permitted only within bounds established by the organizational governance framework.

Natural language task assignment comprises enabling users to assign tasks to AI agent instances 2830 through casual conversation, with task validation against metadata-defined action permissions. Users can delegate work to AI agent instances through natural language while ensuring all assignments undergo appropriate authorization validation.

AI agent instance personalities and functions are modified by users describing desired behaviors, subject to metadata-specified behavioral constraints. AI agent instance customization is supported within established organizational guidelines for appropriate AI behavior and functions limits.

AI agent instance suggestions and recommendations are presented as natural conversation within metadata-defined communication boundaries. All AI agent instance-generated recommendations adhere to established communication protocols and disclosure limitations.

Multiple AI agent instances 2830 collaborate simultaneously through group conversation dynamics governed by metadata-specified coordination rules. Multi-AI agent instance collaboration is orchestrated according to governance requirements for information sharing and coordination protocols.

Conversational AI agent instance configuration comprises a natural language interface allowing users to configure AI agent instance 2830 behavior by describing preferences, subject to metadata-defined customization limits. Users can adjust AI agent instance behavior through natural language descriptions while remaining within approved customization boundaries.

Optionally, the system 2800 learns from natural language corrections and applies preferences to future interactions according to metadata-defined learning constraints. AI agent instance learning and adaptation functions operate within established limits for behavior modification and knowledge retention.

Configuration changes are immediately reflected in AI agent instance behavior while maintaining compliance with metadata guidelines. Real-time behavior adjustment functions ensure immediate responsiveness while preserving adherence to governance requirements.

Optionally, the system 2800 further comprises distributed metadata management wherein the metadata guidelines support AI agent instance deployment across distributed computing environments while maintaining consistent behavioral constraints regardless of underlying infrastructure deployment choices. The metadata management supports AI agent instance deployment across hybrid or multi-cloud environments, ensuring consistent enforcement of behavioral constraints regardless of infrastructure, with AI agent instances maintaining contextual pointers to organizational and user-specific knowledge modules while dynamically generating semantic linkages and honoring metadata-defined access rules.

Optionally, the system 2800 further comprises contextual knowledge resource management, wherein the metadata guidelines 2810 define contextual parameters for monitoring user sessions including one or more of user role identification, current task classification, and temporal context indicators, knowledge resource access permissions specifying which organizational modules and user-specific modules the AI agent instances 2830 may access based on the contextual parameters, and semantic linkage generation rules for creating weighted relationship indicators between related concepts across accessible knowledge resource modules.

Optionally, the AI agent instances 2830 are configured to instantiate active pointers to authorized organizational modules and user-specific modules based on metadata-defined access permissions, establish hierarchical access priorities between conflicting information sources according to metadata-specified priority rules, and generate personalized responses using the unified knowledge resource interface while maintaining compliance with metadata guidelines.

Optionally, the system 2800 further comprises natural language AI agent instance interaction, wherein users communicate with AI agent instances 2830 through conversational prompts that are interpreted and executed within metadata-defined operational boundaries without requiring technical configuration.

On-the-fly context acquisition enables AI agent instances 2830 joining collaborative interfaces to automatically acquire real-time conversation context and participant information subject to metadata-defined access permissions, delivering coordinated user experiences.

Optionally, the AI agent instances 2830 actively operate to acquire necessary functions to resolve functionality gaps, automatically expanding their functions set when encountering tasks beyond current permissions as allowed by metadata guidelines. The system enables dynamic functions expansion within governance constraints, allowing AI agent instances to adapt to new requirements while maintaining compliance oversight.

Optionally, the system 2800 further comprises combined adaptive effects, wherein the system delivers coordinated user experiences by automatically combining metadata-guided operation, dynamic functions acquisition, and real-time context awareness to provide contextually appropriate responses without user intervention.

Optionally, the system 2800 may further comprise real-time compliance monitoring during content generation, wherein the system analyzes draft communications and content creation in real-time for compliance violations, including preventing transmission of messages about restricted topics based on recipient analysis and content sensitivity assessment, such as detecting and preventing emails about international meetings to unauthorized recipients. The system optionally may include real-time compliance monitoring during content generation where draft communications, summaries, or code generated by AI agent instances are analyzed for potential violations, such as unauthorized disclosures or prohibited topics, with outbound messages mentioning restricted events being automatically blocked or sanitized before delivery.

Optionally, the real-time compliance monitoring system further comprises intelligent content replacement functions, wherein the system 2800 implements semantic content substitution when violations are detected in AI-generated responses. Upon identifying restricted content within generated output, the system optionally analyzes the violating portion to determine contextual requirements including data type classification, semantic intent preservation, and formatting specifications, then automatically queries authorized data sources to identify semantically equivalent but compliant replacement content that maintains the original response's informational structure and communicative purpose.

Optionally, the content replacement process employs contextual data matching algorithms that preserve response coherence while ensuring compliance adherence. When restricted information is detected, the system optionally maintains semantic placeholders for violating content segments, searches approved data repositories for functionally equivalent information, and validates replacement candidates against both compliance requirements and contextual appropriateness before performing substitution operations that maintain logical flow and readability.

Optionally, the system 2800 may implement visual formatting preservation during content replacement operations, wherein graphical characteristics including font sizing, color schemes, spatial proportions, and layout positioning are maintained during content substitution to ensure seamless integration. The system optionally captures formatting metadata from original violating content including typography specifications, dimensional parameters, and visual styling attributes, then applies identical formatting to replacement content while adjusting text length and content density to preserve original visual balance and user interface consistency.

Visual formatting preservation comprises dynamic content scaling algorithms that automatically adjust replacement text length to match original spatial requirements, maintain consistent visual weight through typography optimization, preserve color coding and highlighting schemes according to organizational design standards, and ensure replacement content integrates naturally within existing interface layouts without disrupting user experience or revealing content modification operations.

Optionally, the content replacement system maintains data source integrity by prioritizing replacement content from the same or equivalent authorized sources as the original violating information. The system optionally implements source preference hierarchies where replacement content is selected first from the same data source as violating content when compliant alternatives exist, then from organizationally approved equivalent sources that maintain data consistency and reliability, ensuring that information quality and trustworthiness remain consistent while achieving compliance requirements.

Source integrity maintenance comprises establishing data provenance tracking for all replacement operations, maintaining quality metrics consistency between original and replacement content, implementing approval workflows for cross-source content substitution when same-source alternatives are unavailable, and providing audit trails documenting the source and rationale for all content replacement decisions to support compliance verification and regulatory reporting requirements.

Optionally, the system 2800 implements transparent content replacement wherein modified responses appear identical to unmodified content from the user perspective, with replacement operations executed in real-time during response generation without visible delays or indication of content modification. The system processes compliance validation and content replacement as integrated components of the standard response generation pipeline, ensuring that users receive seamlessly compliant content without awareness of underlying compliance processing or content substitution activities.

This enhanced system provides a comprehensive framework for metadata-guided AI agent instance operation that combines strict compliance controls with intelligent agentic communication functions. The integration of persistent AI agent instance identities, modular skill architectures, sophisticated memory management, and real-time orchestration creates a robust platform for deploying AI agent instances in collaborative environments while maintaining organizational governance and regulatory compliance.

FIG. 28E illustrates an exemplary workflow depicting a method for metadata-guided AI agent instance operation implementing compliance controls for monitoring AI generated response generation, according to some embodiments as described above with reference to FIGS. 1-25. This method may be implemented by the system 2800 described with reference to FIG. 28A, utilizing the one or more processors 2820, structured metadata 2810, and AI agent instances 2830 operating within the compliance-controlled environment.

The workflow begins at step 2851, where the one or more processors 2820 maintain a database with AI agent instance operational guidelines 2840 associated with a user account. Each AI agent instance operational guideline defines one or more sets of rules indicative of compliance instructions for use by any of one or more AI agent instances 2830. The AI agent instance operational guidelines optionally may be stored as structured metadata defining permitted actions the AI agent instance may perform, operational parameters specifying how actions should be executed, and behavioral constraints governing AI agent instance decision-making, as described above with reference to FIGS. 1-25.

At step 2852, the processors 2820 receive input indicative of an action to be performed by an AI agent instance 2830. This input optionally may originate from user interactions with the SaaS platform elements as described above with reference to FIGS. 1-25, including but not limited to table structures, dashboards, or workflow components. The input optionally may be received through natural language interfaces or intent-based interaction systems as described above with reference to FIGS. 1-25.

The process continues to step 2853, where the processors 2820 instantiate and execute an AI agent instance 2830 for providing a response to the input. The AI agent instance 2830 operates using at least one of two critical deduction processes that form the core of the compliance control mechanism. The AI agent instance 2830 optionally may be configured as a NETA (Never Ever Tired Assistant) agent with persistent identity and specialized functions as described above with reference to FIGS. 1-25.

At decision point 2854, the first deduction process is executed, wherein the AI agent instance 2830 deduces whether the input or the desired result violates at least one rule of the AI agent instance operational guidelines 2840. If a violation is detected, the process proceeds to step 2855 where action execution is prevented, and appropriate notifications or alternative actions may be initiated. This prevention step optionally may include logging the attempted violation for audit purposes and providing explanatory feedback to the user regarding why the action cannot be performed.

If no violation is detected at step 2854, the process proceeds to step 2856 where the AI agent instance 2830 generates a response to the input. Following response generation, the workflow advances to decision point 2857, implementing the second deduction process. Here, the AI agent instance 2830 deduces whether the generated response violates at least one rule of the AI agent instance's operational guidelines 2840 prior to provision thereof to the user.

If a violation is detected at step 2857, the process proceeds to step 2858 where the generated response is amended to mitigate the violation. This amendment process optionally may involve the intelligent content replacement functions described above, including semantic content substitution, visual formatting preservation, and source integrity maintenance. The amendment optionally may utilize the contextual data matching algorithms and dynamic content scaling features to ensure seamless integration of compliant replacement content.

Whether the response optionally proceeds from step 2856 with no violation detected or from step 2858 after amendment, the workflow continues to step 2859 where the compliant response is provided to the user. The system optionally may implement transparent content replacement wherein modified responses appear identical to unmodified content from the user perspective, as described above.

Throughout this process, the method optionally may incorporate the advanced features as described above with reference to FIGS. 1-25, including hierarchical access control schemes, cross-departmental monitoring functions, and intent-based interaction systems. The AI agent instances 2830 optionally may operate with varying credential sets and permissions based on their assigned roles within teams and organizational structures, as described above with reference to FIGS. 1-25.

The method optionally may include continuous monitoring and logging functions, where all deduction processes, violation detections, and content amendments are recorded for compliance verification and model improvement purposes. The system optionally may implement compliance monitoring during content generation as described above, ensuring comprehensive oversight of AI-generated communications and content creation activities.

Optionally, the metadata-guided AI agent instance operation system 2800 coordinates with orchestrated multi-AI agent instance communication through compliance-aware message routing as described above with reference to FIGS. 1-25. When AI agent instances 2830 participate in collaborative environments managed by the orchestration layer 2910, each AI agent instance's contributions are validated against the structured metadata 2840 before being released to the communication environment. The orchestration layer's message routing module interfaces with the compliance system to ensure that AI agent instance responses conform to organizational policies, that sensitive information is appropriately redacted based on recipient permissions, and that cross-AI agent instance collaboration respects the behavioral constraints and operational parameters defined in the metadata guidelines, enabling seamless multi-AI agent instance interaction within governance boundaries.

Optionally, the metadata-guided AI agent instance operation system 2800 establishes the compliance foundation upon which the orchestrated multi-AI agent instance communication system as described above with reference to FIGS. 1-25 operates. While the metadata system ensures that individual AI agent instance operations conform to organizational policies, the orchestration system coordinates collaborative interactions between multiple compliant AI agent instances. The integration of these systems enables sophisticated multi-AI agent instance workflows where multiple AI agent instances can collaborate effectively while maintaining strict adherence to the governance boundaries established by the metadata framework.

Reference is also made to FIG. 29A, which illustrates an embodiment of a system 2900 for orchestrated multi-AI agent instance communication providing integrated coordination for collaborative environments. The system instantiates multiple AI agent instances 2930 in a shared communication layer and uses an orchestration layer 2910 to coordinate their interactions. This orchestration layer comprises a message routing module, a timing controller, a relevance evaluation module, and a task delegation module, all managed by one or more processors 2920 to ensure synchronized collaboration and continuous memory consistency. The system optionally may instantiate multiple communication environment instances, each serving as a shared communication layer where multiple AI agent instances can interact collaboratively. Each instance optionally maintains its own orchestration layer and AI agent instance coordination protocols.

The one or more processors 2920 instantiate communication environment instances 2901 as dedicated shared communication layers that serve as foundational frameworks for multi-AI agent instance collaboration. Each communication environment instance 2901 optionally operates as an isolated collaborative space where multiple AI agent instances 2930 and human participants can interact through coordinated communication protocols. The system 2900 supports multiple concurrent communication environment instances, each optionally maintaining independent orchestration layers 2910 and AI agent instance coordination protocols while sharing underlying infrastructure computational resources for efficient operation.

Optionally, the system 2900 may integrate seamlessly with the broader AI agent instance ecosystem through standardized terminology and interface protocols. AI agent instances optionally may be operating within this embodiment maintain consistent identity through the unified credential management system, access modular functions through the centralized skill registry, operate within compliance boundaries defined by metadata guidelines, participate in orchestrated communication protocols, and report operational metrics to the centralized management dashboard, ensuring that terminology and operational concepts remain consistent across all system components.

The message routing module captures every communication input, tagging it with metadata such as sender identification, timestamps, and contextual parameters. Messages are then directed to the most relevant AI agent instances based on semantic analysis and relevance scoring algorithms. For example, in a project management workspace, when a user updates a task card, the system routes that update to a scheduling AI agent instance for computational resource allocation and to a reporting AI agent instance for project status summaries. The orchestration layer optionally may actively acquire and maintain profiles of available AI agent instances, including their functions, specializations, and operational parameters. These profiles are continuously updated based on AI agent instance performance and availability, enabling AI agent instance selection for optimal task distribution. Each AI agent instance's outputs optionally may be presented with distinctive graphical characteristics including unique avatar representations, color coding, typography styles, and visual indicators that clearly identify the contributing AI agent instance. The user interface optionally maintains consistent visual attribution across all AI agent instance interactions, enabling users to quickly distinguish between different AI agent instance contributions and maintain awareness of multi-AI agent instance collaboration dynamics.

Optionally, the orchestration layer 2910 implements comprehensive structured processing protocols that operate through sequential coordination stages. The input capture stage optionally records communication inputs with associated metadata including sender identification through user authentication tokens, precise timestamps for temporal sequencing, and contextual parameters that characterize message intent and priority levels. The routing stage optionally applies semantic analysis algorithms that evaluate message content against AI agent instance functions stored in AI agent instance profiles, utilizing natural language processing models to determine optimal AI agent instance selection for task execution. The response coordination stage optionally implements output management protocols that sequence AI agent instance responses, prevent conflicts, and maintain conversational coherence through intelligent response ordering and conflict resolution mechanisms.

Optionally, the timing controller optionally implements response coordination protocols, including response-halting mechanisms. This ensures that if new, higher-priority inputs arrive, AI agent instances pause pending responses, reanalyze the new context, and update their replies for coherence and accuracy.

Optionally, the timing controller within the orchestration layer 2910 implements sophisticated response-halting mechanisms that monitor incoming communication inputs for higher-priority or contextually relevant content. When the system detects that new inputs supersede or modify the context for pending AI agent instance responses, the halting mechanism optionally immediately pauses response generation, triggers re-evaluation of AI agent instance assignments, and updates response strategies based on the new contextual information. This dynamic response management ensures that AI agent instance outputs remain relevant and accurate even in rapidly evolving collaborative environments.

The structured processing protocols optionally operate as continuous feedback loops where each processing stage informs subsequent coordination decisions through real-time relevance assessment algorithms. The feedback mechanism optionally monitors communication patterns, analyzes AI agent instance performance metrics, and adjusts orchestration strategies based on collaborative effectiveness measurements. This adaptive processing ensures that the orchestration layer 2910 continuously optimizes AI agent instance coordination based on observed interaction patterns and emerging task requirements.

The task delegation module dynamically assigns responsibilities to AI agent instances, while maintaining clear attribution of actions. In a marketing campaign scenario, the analytics AI agent instance may process data trends, while the content AI agent instance drafts messaging, and the compliance AI agent instance checks regulatory constraints—all coordinated transparently through the orchestration layer.

A cross-AI agent instance memory synchronization subsystem 2940 ensures that all participating AI agent instances share a consistent context. This enables smooth multi-AI agent instance collaboration, where different AI agent instances can contribute insights without redundant queries or inconsistent states. The user interface 2950 presents this unified collaboration in a single pane, allowing users to interact naturally with the team of AI agent instances as though they were human collaborators.

Optionally, the system 2900 incorporates a centralized credential management system 2945 that securely stores authentication data for AI agent instances 2930 and enables seamless access to multiple software applications and data sources. The credential management architecture optionally implements encrypted credential objects stored in secure databases with role-based access controls, distributed credential repositories that utilize cryptographic validation for multi-platform authentication, and federated authentication networks that enable token-based access across diverse software ecosystems. This comprehensive credential infrastructure ensures that AI agent instances can operate across organizational boundaries while maintaining security and access control integrity.

Optionally, the system 2900 implements user access control mechanisms 2946 that require explicit user approval before AI agent instances 2930 access new application contexts or data sources. The access control interface optionally presents permission requests through contextual dialogs that specify the requested knowledge resource, intended usage, and security implications. Users can approve, deny, or configure automated approval rules for future similar requests, with all access decisions logged for audit purposes and potential revocation. These control mechanisms ensure that AI agent instance functions expand only with explicit user consent while maintaining transparency in knowledge resource access patterns.

Optionally, in an optional embodiment, the orchestration layer 2910 implements a structured processing sequence that processes every communication input through four coordinated stages: (i) receiving all inputs with metadata; (ii) routing the inputs to the most relevant AI agent instances; (iii) managing coordinated output protocols; and (iv) halting pending responses when higher-priority or contextually relevant inputs arrive.

This structured processing operates as a continuous feedback loop, enabling real-time adaptation. For example, in a live operations center, when an urgent system alert is received, the orchestration layer optionally automatically reprioritizes active AI agent instance tasks, halting less critical responses and reallocating AI agent instance computational resources to handle the urgent issue first.

When multiple human users participate in the communication environment, the orchestration layer optionally implements coordinated response protocols. The system waits for input from all active users before generating comprehensive responses, and when a user fails to provide expected input within predetermined timeframes, designated AI agent instances optionally automatically generate reminder communications to facilitate continued collaboration.

Optionally, the system 2900 provides a comprehensive AI agent instance management interface 2947 that delivers visual oversight and control functions for AI agent instance operations within communication environment instances. The management interface optionally displays real-time AI agent instance status indicators, active task assignments, computational resource utilization metrics, and collaboration effectiveness measurements. Administrators can adjust AI agent instance participation parameters, modify orchestration policies, and configure cross-AI agent instance coordination rules through intuitive graphical controls that abstract technical complexity while providing granular operational control over multi-AI agent instance collaborative workflows.

Optionally, the orchestration layer 2910 enables AI agent instances 2930 to contact users privately for additional information following requests made in the shared communication environment instance. The private communication mechanism creates secure, direct channels between AI agent instances and users that operate outside the shared collaborative space while maintaining context linkage to the original request. These private interactions allow AI agent instances to gather sensitive information, clarify ambiguous requirements, or request authorization for elevated actions without disrupting the collaborative flow or exposing confidential details to other participants.

FIG. 29B illustrates an exemplary implementation of cross-thread task synthesis where an automated AI agent instance performs multi-thread analysis and coordination. The figure depicts how an AI agent instance, connected to and monitoring multiple distinct communication threads (such as "Thread A: Pricing Discussion" and "Thread B: Marketing Launch Plan"), can identify semantic relationships between statements made across those threads, build an internal representation of related tasks, and propose or initiate coordinating actions. The AI agent instance maintains thread-level awareness graphs that enable synthesis of related information discussed in parallel conversations, identifying semantic relationships between statements made across different threads. For example, when the AI agent instance monitors a pricing discussion thread where one user states "We still haven't finalized the pricing model" and simultaneously observes a marketing launch planning thread where another user mentions "I'll need final numbers from pricing to update the launch deck," the AI agent instance establishes semantic links between these statements, recognizes their dependency, and surfaces coordinated tasks or notifications to relevant stakeholders.

FIG. 29C demonstrates the multilingual communication support functions of the orchestration layer 2910. The figure illustrates an exemplary live, dynamic chat interface demonstrating real-time, AI agent instance-mediated multilingual translation among participants. The system facilitates seamless communication in multilingual environments by leveraging personalized AI agent instances associated with each user. These AI agent instances automatically detect the language preferences of participants within a conversation and perform real-time translation of messages, ensuring each participant can send and receive communications in their own native or preferred language. For instance, participants "Rui" (speaking Portuguese), "Zoe" (speaking English), and "Hiroshi" (speaking Japanese) can communicate naturally, with each AI agent instance translating messages into the recipients' preferred languages while maintaining tone consistency and providing transparency metadata about the translation process.

The cross-AI agent instance memory synchronization subsystem 2940 implements comprehensive context sharing protocols that ensure all participating AI agent instances 2930 maintain consistent operational context throughout collaborative task execution. The synchronization mechanism prevents redundant queries by sharing information discovery results across AI agent instances, eliminates inconsistent states through real-time context updates, and maintains collaborative coherence by ensuring that all AI agent instances operate from identical understanding of task progress, participant roles, and shared objectives.

The AI agent instances 2930 implement autonomous information collection protocols that enable AI agent instances to gather required data and knowledge resources for task completion without requiring explicit user intervention. The autonomous collection system utilizes AI agent instance permissions and access credentials to query relevant data sources, synthesize information from multiple repositories, and compile comprehensive response materials while operating within the security boundaries established by the credential management system 2945 and user access controls.

FIG. 29D illustrates the secure skill execution architecture through sandbox isolation. The figure provides a structural view of how skill modules operate in isolation from the AI agent instance's central processing unit. The diagram features a distinct "Sandbox Environment" boundary that visually separates skill module execution context from other components. Within this sandbox, specific skill modules are shown residing with validated API calls and controlled interfaces pointing outwards to external knowledge resources. The "AI agent instance Core" is depicted as a separate, protected entity outside the sandbox boundary, with visual cues emphasizing its inaccessibility from within the sandbox. This architecture ensures that dynamically installed skills are executed within secure runtime containers that prevent direct access to AI agent instance core logic, user profiles, or long-term memory without explicit authorization.

FIG. 29E depicts the thread-level orchestrator lifecycle and operation of conversation-specific orchestrator AI agent instances. The figure illustrates how orchestrators are dynamically instantiated for individual chat threads and manage the flow of information and AI agent instance participation within that specific conversation's context. The orchestrator performs real-time evaluation of incoming messages, content matching against AI agent instance functions, and policy enforcement including rate-limiting and visibility rules. Upon thread closure, the conversation-specific orchestrator manages disposition of unresolved context or pending tasks, either transferring them to successor thread orchestrators for continuity or archiving them in global task maps or centralized knowledge resources for future reference.

The orchestration layer 2910 coordinates dynamic construction of interactive user interface elements within host platform interfaces through standardized component libraries and real-time interface generation algorithms. The dynamic UI system maintains coordinated visual consistency across different platform contexts while adapting interface elements to match host application design patterns. This capability enables seamless integration of collaborative features into diverse software environments without requiring platform-specific customization or disrupting existing user workflows.

The system 2900 implements comprehensive knowledge resource integration 2948 that provides AI agent instances 2930 with controlled access to organizational and user-specific knowledge modules based on AI agent instance permissions and user authorization levels. The knowledge integration architecture supports both organizational repositories containing shared institutional knowledge and personal knowledge modules containing user-specific information, preferences, and historical interaction patterns. Access to knowledge modules is governed by the credential management system 2945 and enforced through the orchestration layer 2910 to ensure appropriate information boundaries while enabling comprehensive knowledge synthesis for collaborative task completion.

FIG. 29F shows the structural implementation of conversational AI suggestion popups with action injection functions. The figure demonstrates the structural layout of a chat interface incorporating AI-generated suggestion popups that surface outside of the main chat stream. These suggestions appear as contextual overlays, such as floating popups, pinned sidebars, or suggestion bubbles, activated by recent conversational activity or specific intents. The suggestions do not interrupt the message stream but appear adjacent to relevant content, allowing users to preview, modify, or directly inject proposed messages into the conversation while maintaining attribution at the user level.

FIGS. 29G, 29H, and 29I illustrate the auto-surfacing UI overlay system triggered by task inference. These figures demonstrate the structural operation of dynamically inserted contextual overlays within the communication interface. When users mention certain tasks, such as scheduling, file sharing, or approval requests, the system interprets this through intent recognition algorithms and surfaces context-relevant UI components inline without explicit commands. The overlays are rendered as panels directly beneath triggering messages, modal dialogs anchored to message IDs, or embedded UI cards that become interactive upon user interaction. These components are contextually prefilled using the AI agent instance's extracted metadata and respect chat layout constraints while maintaining thread continuity.

The system may further include a credential management system integrated across platforms to securely store authentication data for all AI agent instances. Credentials may be stored in centralized encrypted databases, distributed repositories with cryptographic validation, or blockchain-based networks with token-based access enforcement.

Users retain fine-grained control over AI agent instance permissions. When AI agent instances attempt to access new applications, boards, or data repositories, the system generates a permission request interface prompting users to approve, deny, or set automated rules for future access. Granular controls can differentiate between read-only, write, and execution permissions, with all approvals logged for audit and potential revocation.

In one enterprise scenario, an HR AI agent instance may request access to payroll data to update benefit reports. The system prompts the HR manager to approve the action, ensuring compliance and transparency.

In some embodiments, the user interface 2950 displays AI agent instances in a dedicated frame distinct from human participants, enhancing clarity and reducing cognitive overload. Status indicators show each AI agent instance's current role, active tasks, and availability.

The system may also present dedicated inter-AI agent instance communication threads. These private threads, visible to users but not editable, show reasoning chains and collaborative negotiations between AI agent instances. For instance, during a product launch, the marketing, analytics, and compliance AI agent instances may coordinate messaging details transparently in a dedicated panel, while users observe but do not disrupt the flow.

User moderation controls allow human overseers to intervene, pausing or redirecting AI agent instance collaboration when needed, without halting the overall orchestration process.

The orchestration layer 2910 employs semantic relevance scoring to determine AI agent instance participation in threads, assessing message content, AI agent instance functions, workload, and permissions.

The system includes anti-recursion safeguards to prevent circular activation patterns, ensuring that conversations remain coherent and efficient. For example, if two AI agent instances propose similar recommendations in parallel, the system deduplicates their output to deliver a single, optimized response.

AI agent instances may contact users privately for sensitive follow-up questions, while maintaining context from shared discussions. This enables efficient, privacy-compliant workflows.

For example, during a legal review, a compliance AI agent instance may privately request additional contract details from the lead attorney, integrating the clarified data into the shared collaborative summary without exposing confidential specifics.

Each user may be provisioned with a persistent AI agent instance identity that maintains context and behavioral history across multiple threads and applications. Visual ownership indicators in the interface link AI agent instance actions back to their associated human users, fostering trust and accountability.

For example, in an engineering team, the "BuildOps AI agent instance" might always represent the lead developer, maintaining consistent style, preferences, and domain knowledge across stand-ups, code reviews, and release planning.

In another embodiment, the orchestration layer 2910 coordinates proactive information gathering. AI agent instances analyze current task requirements, detect missing data, and autonomously engage with relevant users or knowledge resources.

For instance, in a clinical research workflow, a documentation AI agent instance may recognize missing trial results, prompt a data analyst AI agent instance to retrieve approved data from the secure repository, while the system coordinates notifications to the team once the report is updated. This automation ensures gathered data is synthesized across AI agent instances, enabling tasks to progress without manual intervention while maintaining full traceability and compliance.

The orchestration layer supports seamless multilingual communication, storing original and translated content and presenting user interfaces in the preferred language of each participant.

For example, during an international strategy meeting, Japanese and German participants see localized content, while shared tasks remain synchronized in the underlying workflow. Translation confidence scores and source metadata are displayed for transparency.

The system dynamically constructs interactive UI elements to match workflow needs, pulling components from pre-registered libraries or third-party APIs.

For example, when a logistics AI agent instance schedules a shipment, the orchestration layer generates a tracking panel directly inside the workspace, enabling real-time status updates and confirmations without switching platforms.

A conversational interface enables natural collaboration among multiple AI agent instances, visible to users as transparent dialogue. AI agent instances negotiate task division, allocate computational resources, and explain reasoning in clear, human-readable language.

Conflict resolution between AI agent instances occurs through structured, observable dialogue, where users can intervene or approve decisions. For example, during financial planning, analytics and compliance AI agent instances may debate investment scenarios, presenting pros and cons before the user authorizes final actions.

Enhanced natural language-driven collaboration allows users to describe goals conversationally, triggering coordinated multi-AI agent instance workflows.

For example, a user might say, "Plan a product demo next week for our European clients." The orchestration layer coordinates the scheduling AI agent instance, marketing AI agent instance, and translation AI agent instance to plan, localize, and confirm the event without requiring manual configuration.

The orchestration layer 2910 incorporates modular skill architecture where AI agent instance functions are separated into distinct, reusable components. Skills may be prompt-based, code-based, or integration-based, and are stored in a centralized Skill Store that allows AI agent instances to acquire new functions either by user selection or in response to specific task requirements. Each skill is version-controlled and validated to ensure compatibility with AI agent instance permissions and memory scopes.

For example, when a user's AI agent instance encounters a request to "sort these items by urgency" but lacks the necessary capability, the AI agent instance queries the Skill Store for relevant skills, identifies an "Urgency Classifier" skill, simulates its behavior using available data, and upon validation, installs and activates the skill to fulfill the original request.

The system maintains structured memory reservoirs segmented by domain such as "work," "personal," or "scheduling," with configurable read and write permissions for each AI agent instance. Each memory reservoir operates as a typed, indexed data store organized as collections of memory entries tagged with metadata including source identification, content type classifications, temporal tags, priority indicators, and visibility scopes.

Memory entries are processed through an ingestion pipeline that classifies content type, assigns semantic tags using transformer-based entity extraction, determines appropriate reservoir assignment based on content categorization and user policy, and establishes lifecycle parameters including expiration policies and update schedules. For instance, a message containing "Need to finalize budget" is analyzed, categorized as a work-related task, and stored in the "Work" memory reservoir with appropriate tags and time-to-live settings.

The orchestration layer 2910 enables cross-thread task synthesis where AI agent instances monitor multiple concurrent conversation threads and autonomously extract tasks from natural, unstructured language even when not issued as explicit commands. AI agent instances maintain thread-level awareness graphs that enable synthesis of related information discussed in parallel conversations, identifying semantic relationships between statements made across different threads and building internal representations of related tasks.

For example, when an AI agent instance monitors a pricing discussion thread where one user states "We still haven't finalized the pricing model." and simultaneously observes a marketing launch planning thread where another user mentions "I'll need final numbers from pricing to update the launch deck." the AI agent instance establishes semantic links between these statements, recognizes their dependency, and surfaces coordinated tasks or notifications to relevant stakeholders.

The system provides visual configuration interfaces including a NETA Generator that allows users to assemble AI agent instances from reusable components through drag-and-drop functionality. The interface includes component libraries containing categorized skill modules and personality profile templates, a main configuration canvas displaying visual representations of AI agent instance architecture, interactive preview windows for testing AI agent instance behavior with hypothetical scenarios, and simulation controls for evaluating behavior across different tones and contexts.

Users can select personality profiles such as "Supportive" or "Analytical" and combine them with skill modules like "Task Extraction," "Calendar Coordination," or "Daily Recap Generation." The modular separation of personality from functions enables runtime personality swapping without retraining and supports reuse of skill packs across teams or organizational roles.

The orchestration layer 2910 implements intelligent conversation management through thread-level orchestrators that are dynamically instantiated for individual communication threads. Each thread-specific orchestrator manages information flow and AI agent instance participation within that conversation context, performing real-time message evaluation, content matching against AI agent instance functions, and policy enforcement including rate-limiting and visibility rules.

Upon thread closure, the conversation-specific orchestrator manages disposition of unresolved context or pending tasks, either transferring them to successor thread orchestrators for continuity or archiving them in global task maps or centralized knowledge resources for future reference and broader analysis.

The system incorporates advanced user interface features including conversational AI suggestion popups that surface message suggestions outside the main chat stream through contextual overlays such as floating popups, pinned sidebars, or suggestion bubbles activated by recent conversational activity or specific intents. These suggestions appear adjacent to relevant content without interrupting the message stream and allow users to preview, modify, or directly inject proposed messages into conversations.

Auto-surfacing UI overlays are triggered by task inference when users mention activities such as scheduling, file sharing, or approval requests. The system interprets intent through recognition algorithms and surfaces context-relevant UT components inline, such as calendar widgets, file uploaders, or checklists, without requiring explicit commands. These overlays are interactive, context-aware, and prefilled with relevant metadata extracted from thread content.

The orchestration layer 2910 supports secure skill execution through sandbox isolation where dynamically installed skills are executed within secure runtime containers that prevent direct access to AI agent instance core logic, user profiles, or long-term memory without explicit authorization. Skills are validated through compatibility checking with AI agent instance configurations and loaded into WebAssembly containers, serverless functions, or other secure execution environments that enforce strict boundaries and controlled interfaces.

Each skill execution is logged in runtime audit trails capturing details such as skill version, calling AI agent instance, input and output hashes, execution time, and any errors or permission violations. This audit capability supports compliance monitoring and debugging, particularly in enterprise or regulated environments where full traceability of AI agent instance actions is required.

The system enables administrative control frameworks allowing designated users to manage both human users and their associated AI agent instances through role-based access control distinguishing between regular users, team leads, and administrators. Administrators can modify AI agent instance functions tied to user accounts, restrict installation of certain skills, pre-install required organizational skills, define memory access permissions, and activate or suspend AI agent instance participation based on organizational policies.

Administrative dashboards provide interfaces for configuring AI agent instance functions, memory permissions, and skill governance across user populations. All administrative actions are logged for auditability with rollback options available for permission or skill configuration changes, ensuring scalable, trust-managed agentic deployment across organizational structures.

The orchestration layer 2910 facilitates intelligent feature promotion by integrating AI agent instances with product changelog feeds to make them contextually aware of newly released features. AI agent instances subscribe to structured changelog feeds and match new features against live user behavior, thread topics, or recent activity to detect organic opportunities for feature introduction. Suggestions are phrased according to active personality settings and subject to timing and confidence-based safeguards.

For instance, when users discuss improving project visibility across teams and a new "Public Templates Sharing" feature becomes available, an AI agent instance with "Helpful Advisor" personality settings may suggest "By the way, looks like you can now share templates publicly across teams. Want me to show you how?" This contextual, organic feature promotion increases capability discovery without disrupting collaborative workflows.

The system implements omni-AI agent instance architecture where AI agent instances maintain persistent digital identities spanning multiple modalities and communication platforms. Each AI agent instance retains its unique identifier, personality profile, and memory reservoir mappings regardless of host environment, enabling operation across web chat, mobile applications, voice calls, and desktop applications without loss of continuity or context.

Cross-modal state continuity is supported through context packaging and inheritance protocols that enable AI agent instances summoned into new environments to inherit active context windows from other instances. Context packages include message stacks, memory deltas, active task states, thread-specific orchestration settings, and user-specified temporary configurations, all encrypted and signed using session-specific tokens valid within defined temporal and access windows.

The orchestration layer 2910 manages concurrent multi-user input processing enabling AI agent instances to receive inputs from multiple users simultaneously, process them in parallel, and synthesize emergent shared understanding in real-time. AI agent instances maintain semantic maps of ongoing discussions, track user attribution, and utilize internal reasoning engines including transformer-based inference models and graph-based entity linking to identify convergences or conflicts between inputs.

When multiple users issue potentially conflicting statements, such as one user indicating a task is completed while another indicates it remains pending, AI agent instances detect entity conflicts through LLM-based entity matching and surface discrepancies either as clarification questions or flagged misalignments. This multi-perspective synthesis enables AI agent instances to function as information bridges, identifying where viewpoints diverge and prompting reconciliation before task execution or escalation.

The system provides response orchestration and coordination through lightweight frameworks managing user experience in multi-AT agent instance conversational environments. Response sequencing ensures that when multiple AI agent instances are active in shared threads, their responses are staggered, prioritized, or grouped to preserve readability and reduce perceived latency. Coordination primitives include first-response signaling, reply gating and suppression, and sub-thread formation and reintegration.

The orchestration layer 2910 incorporates typing indicators and visual cues allowing users to see which AI agent instances are active, pending, or observing, with AI agent instances emitting intent signals before producing final messages to improve anticipatory comprehension. Reply planner modules evaluate context window overlap, AI agent instance skill specialization, past performance, and token availability to make optimal sequencing decisions among multiple eligible AI agent instances.

The orchestration layer 2910 implements cross-context action template management wherein action templates are created automatically when users perform successful task sequences within any application context or board environment. The system monitors user interactions across different platforms and identifies completion patterns through behavioral analysis algorithms that track sequential user actions, decision points, and successful task resolution outcomes. When a user successfully completes a multi-step process, such as project setup workflows or approval sequences, the orchestration layer automatically captures this as a structured action template, recording both the functional steps taken and the contextual parameters that enabled success, including user roles, data dependencies, timing constraints, and environmental variables.

Template storage and retrieval mechanisms enable semantic matching of current user contexts against historical successful patterns through natural language processing and contextual similarity algorithms. When users transition to new application contexts or board environments, the system identifies relevant templates by comparing semantic features of the current context against stored template metadata, including task objectives, knowledge resource requirements, and stakeholder involvement patterns. Template application includes automatic parameter adaptation to match new context requirements while preserving core functional sequences, enabling users to replicate successful workflows across different organizational contexts, project types, or application environments without manual reconfiguration of underlying process logic.

The system enables explicit template invocation wherein users can reference previous work performed in different contexts or boards through natural language commands processed by the orchestration layer. For example, users may state "replicate the approval process we used for the marketing campaign in this product launch context," triggering the system to identify relevant action templates, adapt parameters to the current context, and guide users through the replicated workflow with appropriate modifications. This explicit invocation mechanism maintains full user control over when and how successful patterns are reused while providing intelligent assistance in adapting those patterns to new circumstances.

The centralized credential management system implements advanced technical infrastructure including a token refresh queue that automatically executes credential renewal operations before expiration using asynchronous background processes, ensuring continuous AI agent instance authentication without service interruption. The credential database comprises hierarchical permission tree data structures that map AI agent instance identifiers to platform-specific access rights through cascading permission inheritance, enabling efficient management of complex organizational access patterns. AI agent instance operational state preservation utilizes serialization mechanisms that convert AI agent instance context data into encrypted session objects stored in distributed cache memory, with network traffic monitoring functions that track cross-application API calls initiated by AI agent instances to maintain seamless state continuity as AI agent instances transition between different software applications under orchestration layer coordination.

The orchestration layer 2910 may support multi-AI agent instance coordination within SaaS platform table structures, where AI agent instances can be assigned to specific items in collaborative boards and workflows. When multiple AI agent instances operate within the same table structure, the message routing module ensures that AI agent instances with complementary functions, such as data analysis, task scheduling, and compliance checking, coordinate their actions on shared data items while maintaining clear attribution and avoiding conflicts.

The system 2900 may implement intent-based interaction protocols that enable users to trigger coordinated multi-AI agent instance responses through natural language commands. When a user expresses an intent such as "analyze this project's risks and update the timeline," the task delegation module automatically coordinates relevant AI agent instances, risk analysis assigned to a specialized AI agent instance, timeline updates to a scheduling AI agent instance, and stakeholder notifications to a communication AI agent instance, all working in parallel within the orchestrated environment.

The orchestration layer 2910 may coordinate contextual data analysis across multiple AI agent instances by distributing analysis tasks based on column types, data relationships, and workflow patterns within SaaS platform structures. For example, when analyzing a project management board, one AI agent instance may focus on status column patterns, another on timeline dependencies, and a third on computational resource allocation, with results synthesized through the cross-AI agent instance memory synchronization subsystem 2940 to provide comprehensive insights.

The system 2900 may enable coordinated proactive information gathering where multiple AI agent instances collaborate to identify missing data, reach out to relevant team members, and synthesize collected information. The task delegation module assigns specific information-gathering responsibilities to AI agent instances based on their functions and access permissions, while the timing controller ensures that follow-up actions are properly sequenced to avoid overwhelming users with simultaneous requests.

The orchestration layer 2910 implements intelligent AI computational resource allocation, treating AI agent instances as limited computational resources that must be efficiently distributed across concurrent tasks and users. The system maintains computational resource pools for different AI agent instance types and coordinates their deployment to ensure optimal utilization while preventing computational resource conflicts. When demand exceeds available AI agent instances, the orchestration layer implements queuing mechanisms and priority-based allocation strategies.

The system 2900 supports cross-application AI agent instance coordination where AI agent instances maintain persistent identities and context across multiple SaaS platform elements, tables, dashboards, workflows, and marketplace applications. The orchestration layer manages AI agent instance transitions between different platform contexts while preserving collaborative state, ensuring that multi-AI agent instance workflows can span across diverse SaaS environments without losing coordination or context.

The orchestration layer 2910 coordinates interactive analysis sessions where multiple AI agent instances contribute different analytical perspectives to user queries about AI-generated outputs. When users request explanations for complex AI-driven insights, the system orchestrates responses from specialized AI agent instances, one providing statistical analysis, another explaining business context, and a third offering actionable recommendations, all coordinated through the message routing module to deliver comprehensive, multi-faceted explanations.

The system 2900 enables coordinated color-context and visual analysis where multiple AI agent instances collaborate to interpret visual data presentations. The orchestration layer coordinates AI agent instances specializing in different aspects of visual analysis, color interpretation, pattern recognition, and contextual meaning, synthesizing their insights through the cross-AI agent instance memory synchronization subsystem to provide comprehensive visual data analysis within SaaS platform interfaces.

FIG. 29J illustrates the computer-implemented method 2950 for orchestrated multi-AI agent instance communication with integrated coordination. This method implementing the system architecture through sequential steps including communication environment instantiation may be performed by the orchestration layer 2910, which creates a dedicated communication space where multiple AI agent instances 2930 can interact collaboratively. The shared communication environment serves as the foundational layer for all subsequent multi-AI agent instance interactions and maintains the contextual framework necessary for coordinated task execution. Multiple communication environment instances may be instantiated simultaneously, each serving distinct projects or user groups while maintaining independent orchestration protocols.

At step 2952, the method proceeds with acquiring profiles of one or more artificial intelligence (AI) AI agent instances that are available for communication. The orchestration layer 2910 actively acquires and maintains profiles of available AI agent instances 2930, including their functions, specializations, and operational parameters as described above. These profiles are continuously updated based on AI agent instance performance and availability, enabling dynamic AI agent instance selection for optimal task distribution. The AI agent instance profile acquisition process may utilize machine learning-based relevance scoring algorithms to assess AI agent instance suitability for specific communication contexts and task requirements.

As shown at step 2953, the method implements cross-AI agent instance memory synchronization for collaborative task completion by two or more of the AI agent instances. This step leverages the cross-AI agent instance memory synchronization subsystem 2940, ensuring that all participating AI agent instances share a consistent context and enabling smooth multi-AI agent instance collaboration where different AI agent instances can contribute insights without redundant queries or inconsistent states. The memory synchronization facilitates knowledge sharing and contextual awareness across the AI agent instance ecosystem.

At step 2954, the method implements an orchestration layer for the first instance, comprising a series of coordinated sub-processes that manage the multi-AI agent instance communication workflow. The orchestration layer implementation encompasses the message routing module, timing controller, relevance evaluation module, and task delegation module managed by the one or more processors 2920, to ensure synchronized collaboration and continuous memory consistency.

As shown at substep 2954A, the orchestration layer maintains knowledge of all profiles of entities participating in the first instance, wherein the profiles comprise one or more profiles of AI agent instances. This knowledge maintenance involves continuously tracking AI agent instance functions, availability status, and performance metrics to facilitate informed task delegation decisions. The orchestration layer may employ semantic analysis and machine learning-based algorithms to update and refine profile information based on observed AI agent instance interactions and outcomes.

At substep 2954B, the orchestration layer receives, in the first instance, communication inputs with associated metadata of the inputs. The message routing module captures every communication input, tagging it with metadata such as sender identification, timestamps, and contextual parameters as described above. This comprehensive metadata collection enables the orchestration layer to make informed routing decisions and maintain full traceability of communication flows within the shared environment.

As shown at substep 2954C, the orchestration layer assesses received communication inputs and coordinates task distribution between one or more selected AI agent instances based on the one or more profiles of AI agent instances, based on deduced relevance. This assessment utilizes semantic analysis and machine learning-based relevance scoring algorithms to determine optimal AI agent instance selection and task routing, as detailed in the message routing module description. The relevance evaluation module processes the communication context against AI agent instance functions to identify the most suitable AI agent instances for task execution.

At substep 2954D, the orchestration layer instantiates the one or more of the selected AI agent instances for receiving an output. The task delegation module dynamically assigns responsibilities to AI agent instances while maintaining clear attribution of actions, as described above. This instantiation process may involve activating dormant AI agent instances or allocating computational resources to ensure responsive task execution within the shared communication environment.

As shown at substep 2954E, the orchestration layer provides the received output in the first instance wherein the outputs are provided with graphical characteristics indicative of the one or more selected AI agent instances. Each AI agent instance's outputs are presented with distinctive graphical characteristics including unique avatar representations, color coding, typography styles, and visual indicators that clearly identify the contributing AI agent instance, as detailed above. The user interface 2950 maintains consistent visual attribution across all AI agent instance interactions, enabling users to quickly distinguish between different AI agent instance contributions and maintain awareness of multi-AI agent instance collaboration dynamics.

The method 2950 may implement the structured processing sequence described above, processing every communication input through four coordinated stages: receiving all inputs with metadata, routing the inputs to the most relevant AI agent instances, managing coordinated output protocols, and halting pending responses when higher-priority or contextually relevant inputs arrive. This structured processing operates as a continuous feedback loop, enabling real-time adaptation as described above.

When multiple human users participate in the communication environment, the orchestration layer may implement coordinated response protocols as described above. The system waits for input from all active users before generating comprehensive responses, and when a user fails to provide expected input within predetermined timeframes, designated AI agent instances automatically generate reminder communications to facilitate continued collaboration.

The orchestrated multi-AI agent instance communication system 2900 operates under supervision of the centralized AI agent instance management system 3000. The orchestration layer 2910 reports AI agent instance participation metrics, computational resource consumption, and collaborative outcomes to the agent tracking module 3020 for performance monitoring and optimization. The dashboard interface module 3030 displays real-time collaboration statistics, including active communication threads, AI agent instance participation rates, and cross-AI agent instance task completion metrics. The control interface module 3040 enables administrators to configure orchestration policies, adjust AI agent instance participation thresholds, and manage collaborative permissions across multiple communication environments, ensuring that multi-AI agent instance orchestration aligns with organizational governance while providing visibility into collaborative AI operations.

The orchestrated multi-AI agent instance communication system 2900 described in the preceding embodiment enables sophisticated collaborative workflows that require oversight and administration through the centralized AI agent instance management system detailed in the following embodiment. While the orchestration system focuses on coordinating real-time AI agent instance interactions and collaborative task execution, the centralized management system provides the administrative infrastructure necessary for monitoring, controlling, and optimizing AI agent instance operations at enterprise scale. This relationship ensures that collaborative AI functions can be deployed and managed effectively across large organizational environments.

Within the context of this centralized AI agent instance management system, terminology alignment ensures consistent interpretation across integrated platform environments. An "AI agent instance" refers to the broad class of artificial intelligence entities capable of autonomous action within software environments, encompassing both stateless functional AI agent instances and persistent conversational entities. A "generative AI agent instance" specifically denotes AI agent instances utilizing large language models or similar generative architectures for natural language understanding, content creation, and contextual reasoning. NETA (Never Ever Tired Assistant) agents represent a specialized subclass of persistent AI agent instances designed for continuous operation across collaborative environments, maintaining identity, memory, and behavioral consistency across sessions, platforms, and interaction modalities.

The system 3000 manages all categories of AI agent instances through unified interfaces while respecting their distinct operational characteristics. Generative AI agent instances interfacing with the system 3000 may operate within correlation environments for cross-platform data synchronization, within generative AI environments for natural language processing and content generation, or as integrated components within the primary SaaS platform architecture. This terminology framework ensures consistent AI agent instance classification, computational resource allocation, and capability assessment across all integrated system components.

Reference is also made to FIG. 30A which illustrates an embodiment of a system 3000 for centralized AI agent instance management and control implementing modular management components orchestrated by one or more processors 3010. The system 3000 comprises an agent tracking module 3020, a dashboard interface module 3030, and a control interface module 3040 that together provide discovery, oversight, and administration of deployed AI agent instances across an enterprise environment. In operation, the system aggregates operational telemetry, analyzes computational resource consumption and token usage, and presents actionable controls that allow administrators to activate, deactivate, tune, and constrain AI agent instance behavior while preserving security and compliance. The system 3000 supports persistent AI agent instances, referred to herein as NETA (Never Ever Tired Assistant) agents, which function as autonomous participants within collaborative digital environments, maintaining continuity across conversations and adapting their behavior over time based on user interactions, organizational policies, and contextual requirements.

The following embodiment may represent a specific implementation of the centralized AI agent instance management principles described in the broader system architecture. This system 3000 may serve as a concrete manifestation of the AI computational resource management and cross-platform coordination functions outlined in the preceding embodiments.

The agent tracking module 3020 implements comprehensive computational token tracking algorithms that monitor each AI agent instance's computational resource consumption through real-time metering systems. The tracking system maintains per-AI agent instance counters that record computational tokens consumed over specified time periods including hourly, daily, and monthly intervals, generates expected token usage projections based on AI agent instance workload analysis and historical consumption patterns, and implements predictive modeling algorithms that forecast computational resource requirements based on usage trends, seasonal patterns, and planned organizational changes. The dashboard interface module 3030 presents detailed token usage analytics with cost projections that include current spend rates, projected monthly costs, and optimization recommendations for reducing computational overhead while maintaining service quality.

The agent tracking module 3020 monitors AI agent instances currently deployed across the platform, including selective monitoring of AI agent instances deployed across specified portions or subsets of the SaaS platform as determined by administrative configuration, maintaining per-AI agent instance counters for computational token consumption over defined periods and generating expected token usage projections based on workload mix and historical patterns. The tracking module maintains comprehensive data associated with each monitored AI agent instance, including performance metrics, interaction logs, and operational context data. For example, a sales-enablement AI agent instance may exhibit predictable weekday peaks before quarterly close; the module identifies this trend and anticipates the increased token budget necessary to sustain responsiveness. The tracking module implements AI agent instance-centric participation models wherein AI agent instances are treated as full participants in multi-user communication threads, appearing within conversation interfaces alongside human users with equal visual and interaction status. Each AI agent instance maintains a unique AI agent instance ID associated with one or more of a User ID for personalized AI agent instances, a Team ID for shared role-based AI agent instances, a Scope ID defining operational boundaries, a set of modular functions defining functions, a personality profile governing tone and behavioral preferences, and a memory profile specifying accessible memory reservoirs with defined read/write permissions.

The dashboard interface module 3030 optionally implements Per-Provider Breakdown functionality 3031 that enables administrators to filter and analyze performance metrics based on the underlying Large Language Model (LLM) provider supporting each AI agent instance. The Per-Provider Breakdown interface presents comparative analytics across different LLM providers including response latency distributions, token consumption efficiency, error rates by provider, cost per interaction comparisons, and capability-specific performance metrics. This functionality enables administrators to identify optimal provider configurations for specific use cases, detect provider-specific performance issues, and make informed decisions about LLM provider allocation across the AI agent instance ecosystem.

The Per-Provider Breakdown optionally includes provider-specific computational resource utilization tracking that monitors computational resource consumption patterns unique to each LLM provider, enabling cost optimization and performance tuning at the provider level. The interface presents side-by-side comparisons of provider performance across identical task categories, highlighting strengths and weaknesses of different LLM providers for specific organizational functions such as code generation, document analysis, or customer service interactions. The breakdown functionality extends to provider-specific error analysis, tracking failure modes, timeout patterns, and quality degradation scenarios specific to individual LLM providers.

The Per-Provider Breakdown interface optionally implements advanced filtering capabilities that enable administrators to segment performance data by provider, time period, user demographics, task categories, and organizational departments. For example, administrators can analyze how different LLM providers perform for code generation tasks specifically within the engineering department during peak development periods. The interface provides exportable reports that document provider performance comparisons, cost-benefit analyses, and optimization recommendations for procurement and vendor management purposes.

The control interface module 3040 optionally implements Global Provider Switch functionality that provides centralized control for administrators to modify the default LLM provider for AI agent instances across the organization. The Global Provider Switch interface enables administrators to specify default providers for new AI agent instance deployments, schedule provider migrations during maintenance windows, implement gradual rollout strategies for provider changes, and maintain provider preference hierarchies based on task categories or organizational departments.

The Global Provider Switch optionally includes impact assessment tools that simulate the effects of provider changes before implementation, providing administrators with predictive analytics about performance impacts, cost implications, and potential compatibility issues. The switch functionality supports both immediate global changes and scheduled transitions, with rollback capabilities to restore previous provider configurations if issues arise during migration. Advanced implementations may include automatic failover mechanisms that switch to alternative providers when primary providers experience service disruptions or performance degradation.

The Global Provider Switch interface optionally implements conditional switching logic that applies different provider selections based on contextual parameters such as task complexity, security requirements, geographic location, or regulatory compliance needs. For example, the system may automatically route sensitive financial analysis tasks to on-premises LLM providers while directing general productivity tasks to cloud-based providers. The switch functionality maintains audit trails of all provider change decisions, including timestamps, authorization approvals, and rollback events for compliance and operational transparency.

The dashboard interface module 3030 provides a centralized management console presenting aggregated utilization metrics, detailed computational resource consumption data including computational resource usage patterns, real-time status and activity summaries, and token analytics with cost projections and optimization recommendations. In one configuration, the dashboard surfaces a comparative panel that highlights outlier AI agent instances with elevated error frequency or unusually long response latencies, enabling targeted remediation. The dashboard interface module 3030 incorporates an orchestration engine layer responsible for managing AI agent instance visibility and participation per thread, participation frequency and response suppression logic, and thread join or leave decisions based on semantic relevance. This orchestration logic prevents AI agent instances from overwhelming conversations or triggering unnecessary responses through relevance calculations using keyword and context matching, memory relevance analysis, recent interaction history evaluation, and user policy rule enforcement. The orchestration engine maintains causal interaction graphs that associate each AI agent instance-generated message with its source task, originating message, and prior triggers to prevent recursive or cyclic AI agent instance activation patterns.

The control interface module 3040 provides comprehensive management of AI agent instance operational parameters including behavioral constraints that govern AI agent instance communication style, response complexity, and interaction protocols, access permissions that define data source authorization levels and application integration boundaries, memory allocation limits that control AI agent instance context window sizes and information retention policies, and capability activation settings that enable or disable specific skill modules based on organizational requirements and user authorization levels. These operational parameters are configurable through intuitive interface controls that translate user preferences into technical configuration parameters without requiring specialized knowledge.

The AI agent instance utilization metrics displayed through the dashboard interface module 3030 comprise comprehensive performance indicators including task completion rates measured through automated outcome tracking, response time measurements that capture median and tail latencies across different task categories, error frequency indicators that categorize failures by type such as parsing errors, permission denials, and upstream service timeouts, and user satisfaction scores collected through post-interaction feedback mechanisms and behavioral analysis of user engagement patterns. These metrics are aggregated across multiple temporal dimensions and presented with comparative benchmarking against organizational performance baselines.

The control interface module 3040 may expose governance actions through the same consolidated console, allowing administrators to activate or deactivate specific AI agent instances, modify operational parameters and permissions, and set computational resource allocation limits, computational resource allocation adjustments based on usage patterns, and comprehensive usage limit configurations including token budgets, computational thresholds, and operational boundaries, such as maximum token budgets, concurrency caps, or time-of-day throttles. These adjustments take effect without system restart, ensuring continuous service while enforcing policy updates. The control interface module 3040 supports modular skill management wherein AI agent instances acquire functions through discrete, executable skill modules that may be prompt-based, code-based, or integration-based for connecting to external APIs or systems. Skills are maintained in a centralized skill registry with version control 3042, compatibility matrices, and security validation, enabling dynamic skill installation, removal, and rollback functions. Each skill executes within secure sandbox environments that prevent direct access to AI agent instance core logic, user profiles, or long-term memory without explicit authorization, ensuring system integrity while supporting extensible functionality.

The system 3000 implements selective rollback functions through the control interface module 3040 that enable administrators to revert functions to previous versions for individual AI agent instances or coordinated groups. The rollback interface presents version history timelines with performance impact assessments, allows selective rollback targeting specific AI agent instance cohorts based on role, department, or usage patterns, and maintains rollback audit trails that document version changes, performance impacts, and administrative decision rationales. The rollback process includes automated compatibility validation and impact assessment to prevent system instability during version transitions.

The control interface module 3040 incorporates deployment isolation management 3041 that monitors skill deployments within secure sandbox environments for each AI agent instance. The isolation system implements containerized execution environments that prevent skill modules from affecting AI agent instance core functionality, monitors computational resource consumption and performance metrics during skill deployment phases, and provides real-time deployment status tracking including queued, installing, validating, and active deployment states. The isolation management includes automated failure recovery mechanisms that rollback failed deployments and maintain system stability during experimental skill installations.

AI agent instance utilization metrics may include task completion rates, median and tail response times, error indicators stratified by category such as parsing failure, upstream timeout, or permission denial, and user satisfaction scores collected through post-interaction prompts. Operational parameters include behavioral constraints governing tone, verbosity, and escalation rules, access permissions defining data scopes and write boundaries, memory allocation limits, and capability activation settings for skill modules gated by policy. The system implements structured memory stores, referred to as memory reservoirs segmented by domain such as work, personal, or thread-local contexts, with configurable read/write permissions for each AI agent instance. These reservoirs operate as typed, indexed data stores organized as collections of memory entries tagged with metadata including source attribution, content type classifications, temporal tags, priority indicators, and visibility scopes. Memory entries carry configurable time-to-live policies, and expired entries are soft-deleted unless retained for audit or summarization purposes.

The marketplace interaction functionality implements intelligent recommendation algorithms that automatically generate AI agent instance suggestions based on user role analysis and workflow pattern recognition. The recommendation engine analyzes user interaction histories, identifies productivity improvement opportunities through workflow analysis, and suggests AI agent instance functions that align with user responsibilities and organizational objectives. The recommendation system presents suggestions through contextual interfaces that explain expected benefits, demonstrate potential workflow improvements through scenario modeling, and provide trial mechanisms for evaluating AI agent instance effectiveness before full deployment.

The system 3000 implements architecture-agnostic credential management 3042 through the control interface module 3040 that provides centralized credential management accessible by AI agent instances regardless of deployment architecture. The credential management architecture supports AI agent instances deployed as microservices within container orchestration platforms, embedded components integrated directly into application frameworks, and API-based integrations that operate through external service calls. The architecture-agnostic design ensures consistent credential provisioning, token management, and access control enforcement across heterogeneous deployment environments while maintaining unified security policies and audit functions.

The agent tracking module 3020 may maintain performance baselines and trend lines for each AI agent instance, enabling detection of regressions after a skill update or model change. For instance, if a knowledge resource-retrieval skill upgrade increases latency beyond a defined service level objective, the dashboard flags the regression and proposes a rollback using version control management described herein. The tracking module supports cross-platform AI agent instance persistence wherein each AI agent instance maintains a persistent digital identity that spans multiple modalities and communication platforms. Unlike traditional chatbots confined to single instances, these AI agent instances retain their unique AI agent instance ID, personality profile, and memory reservoir mappings regardless of the host environment, enabling operation across web chat interfaces, mobile applications, voice calls, and desktop applications without loss of continuity or context. AI agent instance states are updated in real time through a centralized state management layer, enabling seamless handoff of memory, ongoing tasks, and conversational context between different interaction modalities.

The enterprise orchestration functions implemented through the dashboard interface module 3030 present complex orchestration and integration functions in terms of business outcomes and user productivity improvements. The business outcomes presentation includes workflow efficiency metrics that translate technical performance data into productivity improvements, cost-benefit analyses that demonstrate return on investment for AI agent instance deployments, and operational impact assessments that quantify process improvements through AI agent instance automation. The interface abstracts technical complexity while providing executives and business stakeholders with actionable insights into AI agent instance value delivery and organizational impact.

The system 3000 implements dedicated database instance management 3043 through the control interface module 3040 that enables instantiation of dedicated database instances for each user account. The database management system provisions isolated database environments containing both organizational knowledge resource content and user-specific information while maintaining logical separation between data domains through access control mechanisms, encryption boundaries, and query isolation protocols that prevent cross-contamination of sensitive information.

Error rates and failure patterns can be correlated across AI agent instance types and deployment environments. In a representative use case, the system identifies that optical character recognition dependent AI agent instances fail disproportionately on a specific document format; the dashboard recommends enabling a format-normalization preprocessor for affected AI agent instances and projects the token delta and cost tradeoff. The system implements intelligent orchestration logic that operates per thread or as a system-wide governance layer, with each thread initializing a local orchestrator instance responsible for batching inputs, suppressing redundant AI agent instance responses, injecting context-relevant overlays, and delegating tasks to the most appropriate AI agent instance. Global orchestrators may be configured to ensure compliance such as prohibiting AI agent instances in legal threads unless authorized, enforce off-hour suppression policies, and optimize computational load distribution across AI agent instances while maintaining response quality and user experience.

User interaction frequency and satisfaction scores may be tracked at the AI agent instance and department levels. The system highlights AI agent instances that drive strong outcomes but experience low adoption rates, recommending lightweight onboarding flows or in-product guidance mechanisms to improve utilization. The system supports multilingual personalization wherein each user may define interface languages with automatic translation of communication content to preserve semantic accuracy, tone, and intent. AI agent instances are capable of translating both their own messages and those of human participants, rendering them individually for each viewer to support multilingual collaboration within the same thread while allowing users to communicate in their native language and ensuring all participants receive content in their preferred format.

The dashboard interface may generate alerts and notifications for AI agent instances approaching configured computational resource limits or exhibiting operational anomalies such as spikes in 5xx upstream errors or surges in refusals due to permission denials. Administrators can subscribe to alert channels and route them to incident management tooling. The system implements conversational AI suggestion mechanisms where AI agent instances surface message suggestions outside of the main communication stream through contextual overlays including floating pop-ups, pinned sidebars, or suggestion bubbles activated by recent conversational activity or specific intent detection. These suggestions appear asynchronously through a parallel user interface channel, separate from the chat flow, and may include prefilled text, alternate phrasings, or action-ready drafts that users can preview, modify, or directly inject into conversations while retaining proper attribution.

Bulk management operations are supported by the control interface 3040, enabling administrators to apply configuration changes to multiple AI agent instances simultaneously such as enforcing stricter redaction policies across all legal-domain AI agent instances or scheduling automated maintenance including nightly skill cache refresh or weekly model checkpoint validation. The system supports auto-surfacing user interface overlays triggered by task inference, wherein AI agent instances dynamically trigger interactive interface components within communication interfaces based on inferred task-related user intent. When users mention certain tasks such as scheduling, file sharing, or approval requests, the system interprets this through intent recognition and surfaces context-relevant interface components including calendar widgets, file uploaders, or approval workflows inline without explicit commands, preserving thread continuity while providing relevant interactive functionality.

Export and reporting functions may provide usage analytics and compliance documentation as signed artifacts including comma-separated values files, portable document format reports, or JSON Lines exports suitable for procurement review or regulatory audits. These reports include token spend by cost center, data access events by source, and version change logs with full audit trails. The system implements administrative control frameworks allowing organizations to manage both users and their associated AI agent instances through role-based access control that distinguishes between regular users, team leads, and administrators. Administrators can modify AI agent instance functions tied to subordinate user accounts, implement skill policy management to restrict installation of certain skills or pre-install required organizational skills, enforce memory scope boundaries, control AI agent instance activation and deactivation permissions, and provision credentials for external skills at the organizational level.

In some configurations, the dashboard includes AI agent instance marketplace display functionality that visualizes available AI agent instances, their capability summaries, and specialization domains. Performance analytics including task completion rates and satisfaction metrics integrate directly into each listing, accompanied by compatibility badges indicating supported organizational roles and data types such as finance ledgers, customer relationship management objects, or code repositories. The marketplace presents AI agent instance functions in user-outcome terms tied to utilization metrics shown elsewhere in the dashboard, enabling users to evaluate AI agent instances by demonstrated results, watch scenario-based demonstrations of workflow improvements, and proceed through benefit-focused selection and deployment paths with personalized recommendations based on role and historical usage patterns.

Deployment options may include preview, trial, and full activation modes. In preview mode, the dashboard simulates an AI agent instance's impact using historical data; in trial mode, the AI agent instance operates within a constrained sandbox against a subset of live traffic; in full activation, the AI agent instance enters production with monitoring and rollback guardrails enabled. The system supports trial mechanisms that permit in-context evaluation where prospective AI agent instances operate on a user's actual workflow subset under heightened guardrails. Comparative analysis tools highlight user-relevant differences between similar AI agent instances including accuracy on domain-specific data, cost per thousand tokens, and average turnaround times, while success tracking attributes changes in key performance indicators to the trialed AI agent instance.

Skill deployment management allows simultaneous rollout of new skills to multiple compatible AI agent instances, with per-instance progress tracking reflected in real time. The dashboard renders deployment state including queued, installing, validating, and active phases, suppressing complex technical details in favor of clear operational narratives. The system implements dedicated agentic communication threads for inter-AI agent instance collaboration, wherein specialized mechanisms facilitate coordination or task delegation between two or more AI agent instances. When such inter-AI agent instance communication is required, the system instantiates dedicated agentic communication threads that manifest as distinct sub-threads, dedicated channels, or virtual rooms logically isolated from other communications, serving as structured logs of collaborative thinking processes and step-by-step execution of joint tasks.

Version control management maintains skill version history per AI agent instance. Administrators may selectively roll back a skill for a single AI agent instance or a cohort if post-deployment metrics regress. Deployment reports documenting successes, failures, and version transitions are appended to the analytics timeline for traceability. The system supports natural language interaction as the primary interface for marketplace discovery, configuration, and orchestration, wherein users can make requests such as trialing specific AI agent instances for defined time periods, with the dashboard coordinating constrained activations, monitoring impact on user-defined key performance indicators, and presenting keep or rollback decisions with supporting evidence.

Deployment isolation management executes skill updates in secure sandboxes such that a failed deployment for one AI agent instance does not propagate instability to others. Fault isolation tracking demonstrates to users that experimentation will not disrupt existing production behavior. The system implements user-defined historical context anchors with time-aware AI agent instance responses, providing users with mechanisms to explicitly assign earlier messages as anchor points for AI agent instance reference. This allows AI agent instances to respond to conversations from designated points forward, factoring in elapsed context and summarizing relevant changes while maintaining temporal integrity in AI agent instance interpretation and response generation.

Marketplace interaction functionality presents AI agent instance functions in user-outcome terms, tied to the same utilization metrics shown elsewhere in the dashboard. Users evaluate AI agent instances by demonstrated results, watch scenario-based demonstrations of workflow improvements, and proceed through a benefit-focused selection and deployment path with personalized recommendations based on role and historical patterns. The system supports scoped conversational settings for AI agent instance behavior customization, allowing users to define temporary context-specific behavioral settings that apply only within given chat threads or message windows. These scoped settings enable users to override global defaults for tone, verbosity, action visibility, memory access, or response frequency, creating localized behavioral contracts between AI agent instances and users that expire after thread closure, time thresholds, or user override actions.

Trial mechanisms may permit in-context evaluation, where a prospective AI agent instance operates on a user's actual workflow subset under heightened guardrails. Comparative analysis tools highlight user-relevant differences between similar AI agent instances including accuracy on domain corpus, cost per thousand tokens, and average turnaround times, while success tracking attributes changes in key performance indicators to the trialed AI agent instance. The system implements AI message replay mimicry for human-style chat participation, structuring AI agent instance messages to conform visually and behaviorally to interaction patterns of human users. AI agent instances use native reply mechanisms including threaded replies or mention systems rather than special AI agent instance-specific interfaces, ensuring natural integration and consistent visual experience across participants while maintaining proper attribution through visual ownership markers.

Architecture-agnostic credential management exposes centralized credential services through the dashboard that AI agent instances can consume irrespective of deployment topology. Credential management behaves consistently across microservices, embedded components, and API-based integrations, spanning on-premises, cloud, and edge environments, and supporting both synchronous and asynchronous retrieval patterns. The system implements graphical attribution layers for AI agent instance-user ownership identification in chat environments, introducing visual tagging systems that link AI agent instance messages directly to their associated users or owners through attribution badges shown inline with AI agent instance messages. These attribution indicators may include user names, roles, profile photos, color schemes, or iconography that visually tie AI agent instance and user identity, with ownership indicators remaining persistent across threads while remaining adjustable per organizational policy requirements.

To prevent design-around implementations, the dashboard ensures credential issuance, scoping, rotation, and revocation are consistently mediated for stateful services and stateless functions, and it maintains parity across single-tenant and multi-tenant deployment models. Hybrid deployments are supported where AI agent instance components operate across environments while sharing the same credential policy. The system supports selective memory and contextual drag-and-drop functionality providing fine-grained user and system-level control over memory in AI agent instances through structured memory stores segmented by domain with each governed by permission profiles, expiration policies, and contextual triggers. Users can drag and drop contextually relevant content including files, text, calendar items, or data blocks into AI agent instance interfaces to create temporary or scoped memory entries that may be designated as single-use, session-specific, or persistent, with AI agent instance behavior dynamically adjusting based on both long-term memory and temporary context injections.

Enterprise orchestration and compliance functions integrate a global orchestration layer with the dashboard to coordinate AI agent instance policy enforcement at scale. The system ties into structured changelog feeds, enabling AI agent instances to promote feature adoption with measurable impact surfaced in analytics. Administrative frameworks provide role-based access control over AI agent instance functions and memory permissions, while compliance monitoring spans organizational boundaries with unified reporting. The system implements intelligent feature promotion based on changelog integration, wherein AI agent instances become contextually aware of newly released product features and are empowered to organically introduce or recommend relevant updates to users based on live conversation threads or user behavior patterns, transforming AI agent instances from passive responders into intelligent product advocates capable of promoting feature adoption naturally within user experiences.

FIG. 30B illustrates an exemplary changelog-driven feature promotion workflow that demonstrates the intelligent feature promotion functions referenced in the centralized management system. The figure shows the logical workflow architecture including a centralized changelog service delivering structured updates to subscribing AI agent instances, a semantic parser that extracts feature keywords, target user groups, and suggested usage contexts, an AI agent instance-side listener that monitors live conversation events, a matching engine that compares thread topics against changelog items, and a UI rendering layer that surfaces contextual, personalized feature nudges through small banners above input boxes, sidebar cards, or inline assistant bubbles. The feature promotion mechanism operates through the dashboard's orchestration functions, ensuring that suggestions are optional, dismissible, and always surfaced with user-centric phrasing rather than marketing language. For example, in a collaborative workspace scenario, when users discuss improving project visibility across teams and Maya's NETA (Never Ever Tired Assistant) detects that a new "Public Templates Sharing" feature has launched with tags including "project management," "collaboration," and "templates," the AI agent instance leverages its "Helpful Advisor" personality setting to organically suggest: "By the way, looks like you can now share templates publicly across teams. Want me to show you how?" This contextual feature promotion integrates seamlessly with the dashboard's analytics and tracking functions, allowing administrators to monitor feature adoption rates, measure the effectiveness of AI agent instance-driven suggestions, and optimize recommendation algorithms based on user engagement patterns while maintaining full transparency and user control over feature discovery processes.

Predictive analytics estimate future computational resource requirements from usage trends, seasonal patterns, and planned rollouts. For example, ahead of a product launch, the dashboard projects the incremental token load for documentation and support AI agent instances, recommending temporary quota increases and budget reservations. The system integrates with structured changelog or product update feeds, enabling AI agent instances to semantically match ongoing conversation topics with newly released features and organically surface relevant capability suggestions through inline prompts, banners, or contextual overlays. This changelog integration includes a semantic parser that extracts feature keywords, target user groups, and suggested usage contexts, combined with an AI agent instance-side listener that monitors live conversation events and a matching engine that compares thread topics against changelog items.

Comparative performance benchmarks are computed between alternative configurations, such as two summarization AI agent instances using different prompt strategies. The console presents effect sizes such as percentage improvements in task completion and median latency reductions with confidence intervals derived from A/B task cohorts. The system enables concurrent multi-human input processing wherein AI agent instances receive inputs from multiple human users simultaneously, process these inputs in parallel, and synthesize emergent shared understanding in real-time. Each AI agent instance maintains a real-time semantic map of ongoing discussions, tracks user attribution, and utilizes internal reasoning engines including transformer-based inference models, graph-based entity linking, or task synthesis modules to identify convergences or conflicts between inputs and perform multi-perspective synthesis.

In some cases, cross-thread dependency detection and task reassignment are coordinated from the dashboard, enabling system-wide behavioral enforcement such as participation suppression, escalation rules, and policy-based AI agent instance selection by skill, memory scope, or context. Integrated compliance reporting packages event logs, access traces, and outcomes for regulatory submission. The system supports omni-AI agent instance architecture with persistent identity across platforms, wherein each AI agent instance maintains a persistent digital identity spanning multiple modalities and communication platforms. Unlike traditional chatbots confined to single instances, these AI agent instances retain unique identifiers, personality profiles, and memory reservoir mappings regardless of host environment, enabling operation across web interfaces, mobile applications, voice calls, and desktop applications without loss of continuity or context through centralized state management and context packaging protocols.

Intelligent changelog integration performs semantic parsing of update feeds to extract feature keywords, target cohorts, and usage contexts. A relevance engine maps new functions to live behavior observed in analytics, proposes promotions where likely beneficial, and respects feedback loops to suppress future recommendations that users consistently dismiss. The system implements LLM response orchestration user experience and multi-AI agent instance coordination through lightweight orchestration frameworks specifically designed to manage user experience in multi-AI agent instance conversational environments. This orchestration layer ensures that when multiple AI agent instances are active in shared communication threads, their responses are staggered, prioritized, or grouped to preserve readability and reduce perceived latency or collision through conversational traffic control governing when and how AI agent instances appear, speak, and thread their replies.

Administrative control features include skill policy management such as gating risky integrations behind security review, memory scope enforcement including read/write boundaries with redaction and expiration policies, and credential provisioning for external skills at the organizational tier, all mediated via dashboard roles for regular users, team leads, and administrators. The system supports extension to physical robotic systems and embodied AI agent instances, wherein robotic platforms including mobile service robots, collaborative robotic arms, or autonomous drones may adopt AI agent instance-based configurations to govern behavior, decision-making policies, and task-specific skill execution. Robotic AI agent instances may subscribe to skills from the registry, inherit memory scoping rules, and adjust responses based on active conversational threads, sensor inputs, or environmental triggers, serving as cognitive layers atop physical hardware enabling real-world interaction with users in dynamic task-driven settings.

Business-focused enterprise orchestration reframes complex coordination tooling in business-outcome language, presenting structured visualizations such as reduced handoff latency, meeting-free approvals, or lower resolution time per incident. Compliance insights are rendered as workflow optimization opportunities with prescriptive suggestions, and technical audit trails are translated into actionable recommendations for improving collaboration and AI agent instance effectiveness. The system implements concurrent multi-human input and AI agent instance fusion functions enabling AI agent instances to receive inputs from multiple human users simultaneously, process inputs in parallel, and synthesize emergent shared understanding in real-time. Each AI agent instance maintains real-time semantic maps of ongoing discussions, tracks user attribution, and utilizes internal reasoning engines to identify convergences or conflicts between inputs, performing multi-perspective synthesis rather than merely echoing inputs.

Changelog-driven feature guidance may be personalized to user goals and workflows, proposing targeted enhancements likely to reduce effort for specific roles. Users can accept recommendations directly from the console, with transparent descriptions of expected benefits and safeguards. The system supports task extraction and multi-thread context awareness enabling AI agent instances to operate across multiple concurrent conversation threads and autonomously extract tasks from natural unstructured language even when not issued as explicit commands. AI agent instances observe live message streams, detect intent, extract actionable items, and reason across thread boundaries to ensure relevant task continuity and coordination through thread-level awareness graphs that enable synthesis of related information discussed in parallel conversations.

A unified cross-platform experience maintains consistent AI agent instance personality and functions across devices and interaction methods. Conversation continuity persists as users switch platforms, while platform-specific adaptations such as mobile glance cards or kiosk read-only modes enhance rather than disrupt the core AI agent instance relationship. The system implements visual generator interfaces for creating, simulating, and managing AI agent instances through no-code visual configuration interfaces that allow users to assemble AI agent instances from reusable components including personality profiles, skill packs, memory policies, and orchestration rules. The generator abstracts technical complexity while providing transparency and fine-grained control over AI agent instance behavior, supporting both individual user customization and team-based deployment with version control and simulation tools for testing AI agent instance behavior under sample input scenarios before activation.

Centralized identity management serves as the source of truth for AI agent instance identity, configuration, and memory access policies. Context packaging and inheritance protocols allow new AI agent instances to inherit active context windows under controlled scopes, while session-specific encrypted tokens enforce temporal and access boundaries. Stateless runtime AI agent instances may pull behavioral models and memory references from centralized configuration at invocation time. The system supports separation of personality and skill components wherein AI agent instance personality modules govern communication style, tone, language use, and interactive demeanor through selectable templates, cultural references, or behavioral archetypes, while functions modules govern task-specific functions. This separation supports runtime personality swapping, reuse of skill packs across teams, and context-sensitive composition without requiring AI agent instance retraining or system-wide configuration changes.

Intelligent cross-platform adaptation includes modality adjustment supporting voice, chat, or form-based interactions, anticipatory context sharing when users transition devices, and unified credential and permission flows that operate transparently across all touchpoints. Ambient intelligence features adapt to environmental context while honoring user privacy preferences persisted in the dashboard. The system implements skill store and AI agent instance evolution architectures including modular extensible skill store frameworks that allow AI agent instances to acquire new functions either by user selection or in response to specific task requirements. Skills are encapsulated task modules that may be prompt-based, script-based, or integration-based, with version control and validation to ensure compatibility with AI agent instance permissions and memory scopes, supporting rollback to prior skill versions and simulation of skill behavior prior to activation.

Integrated collaboration with combined effects merges capability control, cross-platform consistency, knowledge access, and conversation continuity to deliver cohesive user experiences. The dashboard reduces cognitive load via intelligent information management while preserving user control; AI agent instances provide proactive assistance that respects individual work styles, and multi-AI agent instance collaboration remains transparent with clear attribution and accountable histories. The system supports AI agent instance core-skill isolation and secure sandbox execution enforcing strict isolation between core logic and identity of AI agent instances and any dynamically installed third-party or user-generated functional skills. Each AI agent instance possesses a core definition comprising immutable elements including unique identity, fundamental memory access permissions, and core behavioral guidelines, while skills are treated as separate potentially untrusted modules executed within isolated runtime containers or sandboxes that prevent direct access to AI agent instance core functions, identity, or fundamental policies.

Workflow acceleration may leverage cross-board action replication: when an AI agent instance sequence proves effective, the system captures it as a reusable template with context variables, proposes it in analogous contexts, and adapts parameters automatically under policy. Users can invoke replication explicitly by referencing earlier work such as requesting to replicate actions taken for previous similar situations, with the dashboard confirming scope and constraints before execution. The system implements intelligent orchestrator AI agent instances as persistent meta-AI agent instances responsible for managing AI agent instance interaction and policy execution within individual communication threads, with each conversation instantiating lightweight orchestrators scoped to specific threads and destroyed upon closure to prevent unnecessary system overhead while avoiding the need to broadcast every message to all AI agent instances globally.

Natural language interaction may be the primary interface for marketplace discovery, configuration, and orchestration. A user can make requests such as trialing specific AI agent instances for defined time periods, and the dashboard coordinates constrained activation, monitoring impact on user-defined key performance indicators, and presenting keep or rollback decisions with evidence. The system supports distributed infrastructure management across cloud, edge, and hybrid configurations with centralized monitoring and control through load balancing and computational resource allocation policies that optimize performance and cost while preserving unified visibility, with the dashboard surfacing saturation risks and recommending redistribution or vertical scaling for busy AI agent instance cohorts.

Distributed infrastructure management supports deployment across cloud, edge, and hybrid configurations with centralized monitoring and control. Load balancing and computational resource allocation policies optimize performance and cost while preserving unified visibility. The dashboard surfaces saturation risks and recommends redistribution or vertical scaling for busy cohorts. The system implements knowledge resource module management presenting organizational modules including human knowledge resources, code, marketing, and finance data alongside user-specific modules containing skill-based knowledge or personal notes, with semantic linkage maps showing weighted relationships across sources. The dashboard configures hierarchical access priorities, tracks data lineage in responses, and manages cross-module sharing rules subject to user authorization with dynamic combination events where modular knowledge resources are merged at runtime based on context.

Knowledge resource module management presents organizational modules such as human knowledge resources, code, marketing, and finance alongside user-specific modules including skill-based knowledge or personal notes with semantic linkage maps that show weighted relationships across sources. The dashboard configures hierarchical access priorities, tracks data lineage in responses, and manages cross-module sharing rules subject to user authorization. The system supports ambient awareness models wherein AI agent instances operate outside of explicit chat threads by monitoring ambient contextual signals through device-level integrations. When deployed on mobile devices or wearables, AI agent instances may utilize system permissions to access microphone input, calendar entries, location data, or sensor feeds, enabling AI agent instances to remain operational during live meetings, video calls, or in-person interactions while passively capturing relevant information including action items, spoken deadlines, or meeting summaries.

The AI agent instance activity monitor may record dynamic combination events where modular knowledge resources are merged at runtime based on context, log semantic linkage generation between related concepts, and track automatic reconfiguration when context parameters change, ensuring transparency and repeatability of knowledge assembly. The system extends to cross-application summoning scenarios wherein AI agent instances maintain persistent identity across applications and platforms, enabling users to begin interactions with AI agent instances in browser-based productivity tools and later invoke the same AI agent instances in native mobile applications or voice assistants while retaining core memory, skill sets, and personality configurations. AI agent instance states are updated in real time through centralized state management layers enabling seamless handoff of memory, ongoing tasks, and conversational context between different interaction modalities and host environments.

Dedicated database instance management may instantiate per-user database instances logically separating organizational and personal domains while enabling a unified knowledge interface for AI agent instances. This provides strong tenancy boundaries with consistent retrieval semantics across tenants. The system implements fine-grained memory ingestion workflows wherein AI agent instances process uploaded files, tasks, and events into memory reservoirs through memory preprocessors responsible for analyzing incoming data, assigning relevant keywords or metadata tags, determining appropriate categories, and deciding suitable memory reservoir assignments based on classification, source, or predefined rules, with distinct handling and storage outcomes including long-term memory storage, temporary scoped context with defined retention periods, or specialized reservoir assignment for specific functional domains.

The dashboard may render interactive capability demonstrations that preview how an AI agent instance would enhance a user workflow such as before and after comparisons of procurement cycle times, using either simulated data or safe subsets of live data with appropriate redactions. The system supports memory sorting and distribution flows wherein AI agent instances process incoming user messages from communication threads and intelligently sort and distribute contained information into multiple distinct memory reservoirs based on context or content analysis. This enables single conversational contexts to populate multiple specialized memory stores including work-related tasks, shopping items, or personal reminders, with each stored memory entry carrying associated metadata, color-coding, and time-to-live indicators reflecting different retention policies applied based on reservoir type or content classification.

Zero-configuration AI agent instance deployment allows users to discover and activate new AI agent instances that automatically inherit existing preferences and organizational policies. Initial runs prompt for any missing permissions and register the AI agent instance with the tracking, analytics, and compliance subsystems without manual wiring. The system provides transparent memory control interfaces enabling users to view, inspect, and control information stored by their associated automated AI agent instances through memory management interfaces that display AI agent instance memory content organized by memory reservoir with memories presented using timeline or card-based layouts, interactive controls for promoting, demoting, deleting, or transferring memory items between scopes, and visual distinction of temporary contextual information with decay timers or progress bars indicating transient nature and remaining lifespan before automatic expiration.

FIG. 30C illustrates the computer-implemented method 3300 for centralized management and control of AI agent instances within a SaaS platform, implementing the system architecture through sequential steps including AI agent instance monitoring across platform portions, management interface presentation, and control functionality provision as described in the system embodiments above.

The method 3300 begins at step 3301 with initialization of the centralized AI agent instance management system 3000, wherein processors 3010 establish the foundational infrastructure for managing AI agent instances across the SaaS platform environment. This initialization step includes loading configuration parameters, establishing secure communication channels with platform elements, and activating the integrated modular architecture comprising agent tracking module 3020, dashboard interface module 3030, and control interface module 3040.

At step 3302, the method 3300 proceeds with tracking, by one or more processors 3010, AI agent instances currently deployed across at least a selected portion of the SaaS platform. The tracking operation, implemented through agent tracking module 3020, involves monitoring data associated with the deployed AI agent instances, computational tokens consumed by each AI agent instance over specified time periods, and expected token usage based on AI agent instance workload and historical patterns. As described in the embodiments of the present disclosure, this tracking functionality enables the system 3000 to maintain comprehensive oversight of AI agent instance computational resource utilization and performance metrics across the platform environment.

The tracking step 3302 includes maintaining per-AI agent instance counters for computational token consumption over defined periods, as described in the embodiments disclosed herein. The agent tracking module 3020 may generate expected token usage projections based on workload mix and historical patterns, enabling predictive computational resource allocation. For example, consistent with embodiments described with reference to the SaaS platform implementations disclosed herein, a sales-enablement AI agent instance may exhibit predictable weekday peaks before quarterly close, and the tracking module 3020 identifies this trend to anticipate increased token budget requirements for maintaining responsiveness.

Proceeding to step 3303, the method 3300 involves presenting, by the one or more processors 3010, a management and control user interface for displaying the tracked data. This presentation step, implemented through dashboard interface module 3030, generates a centralized interface that displays AI agent instance utilization metrics and computational resource consumption data, real-time AI agent instance status and activity summaries, and token usage analytics with cost projections and optimization recommendations. The management and control UI serves as the primary interface through which administrators and users interact with the centralized AI agent instance management system 3000.

The presentation step 3303 includes displaying aggregated utilization metrics that provide comprehensive insights into AI agent instance performance across the platform. The dashboard interface module 3030 may present detailed computational resource consumption data including computational resource usage patterns, as described in embodiments of the present disclosure. The interface incorporates comparative analysis panels that highlight outlier AI agent instances with elevated error frequency or unusually long response latencies, enabling targeted remediation and optimization efforts.

At step 3304, the method 3300 continues with providing, by the one or more processors 3010, the management and control UI with control functionality for performing one or more actions on one or more of the AI agent instances currently deployed across at least the selected portion of the platform. This control functionality, implemented through control interface module 3040, enables administrators to actively manage and configure the deployed AI agent instances through the same consolidated interface used for monitoring and analysis.

The control functionality provided in step 3304 includes activation and deactivation functions for specific AI agent instances, allowing administrators to dynamically adjust the active AI agent instance population based on current needs and computational resource constraints. The control interface module 3040 may enable modification of AI agent instance operational parameters and permissions, ensuring that AI agent instances operate within appropriate boundaries and access levels. Additionally, the control functionality supports computational resource allocation adjustments and usage limit configurations, including features such as maximum token budgets, concurrency caps, and time-of-day throttles, as described in embodiments of the present disclosure.

The method 3300 may include additional steps for advanced AI agent instance management functions. These optional steps may involve implementing cross-platform AI agent instance persistence wherein each AI agent instance maintains a persistent digital identity spanning multiple communication platforms and interaction modalities, as described in embodiments disclosed herein. The method 3300 may include orchestration logic for managing AI agent instance participation in multi-user communication threads, preventing AI agent instances from overwhelming conversations through relevance calculations and context matching.

The method 3300 concludes with continuous monitoring and feedback loops, wherein the system 3000 maintains ongoing assessment of AI agent instance performance and computational resource utilization. This continuous operation ensures that the centralized management functions adapt to changing platform conditions and user requirements, providing sustained oversight and control of the AI agent instance ecosystem within the SaaS platform environment.

The integrated AI agent instance ecosystem which is depicted and described with reference to any of FIGS. 1-30C implements standardized API endpoints that enable secure communication between system components. The primary inter-system communication protocol utilizes RESTful APIs with JSON message formatting, where each request includes standardized headers for AI agent instance identification, user authentication tokens, and operation classification. Authentication between systems is managed through OAuth 2.0 with JWT tokens that include scope-limited permissions, expiration timestamps, and cryptographic signatures validated by the centralized credential management system. The API endpoint structure follows the pattern /api/v1/{system_identifier}/{operation_type}/{resource_identifier} where system_identifier distinguishes between personalized AI agent instances, modular operations, compliance validation, orchestration management, and centralized control.

Data format specifications ensure consistent information exchange across all system boundaries. User profile data is serialized using a standardized JSON schema that includes encrypted credential objects, permission arrays with role-based access control definitions, and behavioral parameter objects with versioning metadata. Skill module metadata follows a structured format containing execution requirements, input/output schemas, dependency specifications, and security constraints. AI agent instance communication messages utilize a standardized envelope format that encapsulates message content, sender authentication, recipient validation, compliance flags, and orchestration routing parameters, enabling seamless message processing across different system components while maintaining security and audit trails.

Authentication and authorization protocols implement a hierarchical security model where user credentials authenticate to the system through the centralized management layer, which then provisions service-specific tokens for accessing individual components. AI agent instances receive delegated authentication tokens that include user context, permission scope, and temporal validity constraints. Inter-system communication employs mutual TLS authentication with certificate validation, while API calls include HMAC signatures generated using shared secrets managed by the credential system. The authorization framework implements fine-grained permissions where each system component validates access rights for specific operations, ensuring that AI agent instance functions, knowledge access, and collaborative participation all operate within the authenticated user's authorized boundaries.

In a comprehensive optional embodiment, the integrated AI agent instance ecosystem combines personalized user interaction, modular capability provisioning, compliance-guided operation, orchestrated collaboration, and centralized management to deliver a unified platform for enterprise AI deployment. A user's interaction begins with their personalized AI agent instance 2612, which maintains their individual behavioral profile and access permissions as defined in the personalized AI agent instance system 2600. When the user requests a task requiring specialized functions, the personalized AI agent instance coordinates with the modular AI agent instance system 2700 to acquire appropriate skill modules while operating within the compliance boundaries established by the metadata-guided operation system 2800. If the task involves collaboration with other users or AI agent instances, the orchestrated multi-AI agent instance communication system 2900 coordinates the interactions while the centralized AI agent instance management system 3000 monitors performance, enforces policies, and provides administrative oversight across the entire workflow.

This integrated operation creates emergent functions that exceed the sum of individual system components. For example, when a financial analyst requests quarterly performance analysis, their personalized AI agent instance leverages the user's historical preferences for report formatting while dynamically acquiring advanced analytics skills through the modular system. The compliance system ensures that only authorized financial data is accessed based on the user's role and clearance level. If the analysis reveals trends requiring input from other departments, the orchestration system coordinates with marketing and operations AI agent instances to gather additional insights, while the centralized management system tracks computational resource consumption, monitors collaborative effectiveness, and ensures that all interactions comply with organizational governance policies. The result is a sophisticated, multi-AI agent instance workflow that delivers personalized, compliant, and comprehensive analysis without requiring manual coordination or configuration by the user.

The technical architecture supporting this integrated operation implements a service-oriented architecture where each embodiment provides specialized microservices that communicate through standardized interfaces. The personalized AI agent instance system serves as the user-facing layer, translating natural language requests into system operations while maintaining user context and behavioral adaptation. The modular system provides capability-as-a-service provisioning with secure sandbox execution and computational resource management. The compliance system operates as a policy enforcement layer that validates all operations against organizational requirements. The orchestration system provides workflow coordination services that manage multi-AI agent instance interactions and collaborative task execution. The centralized management system provides the administrative control plane that monitors, governs, and optimizes the entire ecosystem. This architectural approach enables organizations to deploy AI functions that are simultaneously powerful, compliant, scalable, and user-friendly.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

*As* used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally include a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a touch-sensitive layer such as a touchscreen, or keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above-described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the disclosure. Further combinations of the above features and implementations are also considered to be within the scope of some embodiments or implementations of the disclosure.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It should be appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the subject matter disclosed herein. It is intended that the specification and examples be considered as example only, with a true scope and spirit of the disclosed subject matter being indicated by the following claims. It is also intended that the sequence of steps shown in figures are only for illustrative purposes and are not intended to be limited to any particular sequence of steps. *As* such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable subcombination or as suitable in any other described embodiment of the disclosed subject matter. Certain features described in the context of various embodiments are not to be considered essential features of those embodiments, unless the embodiment is inoperative without those elements.

Although the disclosed subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. A system for modular artificial intelligence (AI) agent instance operation using skills and knowledge resources, comprising:

a skill registry maintained as an independent data store, maintaining available skills, each skill comprising a distinct executable capability with defined parameters and operational scope;

a knowledge resource registry maintained as a separate independent data store from the skill registry, maintaining knowledge resources accessible to a plurality of AI agent instances within an organization, wherein each knowledge resource comprises a distinct information repository with defined access parameters specifying data retrieval permissions, content boundaries, and information scope;

a credential management system configured to validate identity of AI agent instances and enforce permissions for interactions with skills in the skill registry and knowledge resources in the knowledge resource registry;

one or more processors configured to instantiate one of the plurality of AI agent instances, wherein the instantiated AI agent instance;

receives user input requesting performance of a task, identifies from the skill registry available skills relevant to the requested task, identifies from the knowledge resource registry accessible knowledge resources based on access credentials validated by the credential management system and associated with the instantiated AI agent instance, selects from the identified available skills those skills needed for the requested task, and dynamically incorporates the selected skills as operational capabilities of the instantiated AI agent instance based on the requested task, and executes operations using the selected skills as dynamically incorporated operational capabilities of the instantiated AI agent instance and the accessible knowledge resources to generate a response to the user input, wherein the selected skills are executed within isolated execution environments separate from core logic of the instantiated AI agent instance.

2. The system of claim 1, wherein the credential management system is further configured to provision authentication credentials for the instantiated AI agent instance and to manage the access credentials for the instantiated AI agent instance to access respective skills and respective knowledge resources.

3. The system of claim 2, wherein the credential management system provides centralized authentication validation that controls access to both skills in the skill registry and knowledge resources in the knowledge resource registry before agent operations proceed.

4. The system of claim 2, wherein the credential management system performs one or more of:

validation of AI agent instance identity and permissions before skill registry access, authentication of resource access requests against stored credential objects, enforcement of capability boundaries through real-time permission verification, and generation of audit trails linking AI agent instance actions to authenticated credential sources.

5. The system of claim 2, further comprising a user interface, wherein the user interface, skill registry, knowledge resource registry, and processors operate under security policies established by the credential management system to maintain consistent security enforcement across system components.

6. The system of claim 2, further comprising centralized access termination functionality, wherein the credential management system terminates access to skills and knowledge resources through revocation of authentication credentials, including automatic removal of departing users from knowledge resource access permissions to control database access in real-time.

7. The system of claim 2, further comprising knowledge base synchronization mechanisms that enable selective synchronization based on AI agent instance access permissions and resource availability managed by the credential management system.

8. The system of claim 1, further comprising an agent profile registry maintaining AI agent instance profiles that define which skills from the skill registry and which knowledge resources from the knowledge resource registry are associated with each of the plurality of AI agent instances.

9. The system of claim 8, further comprising a user interface that enables users to select and associate available skills and knowledge resources with the instantiated AI agent instance for creating new AI agent instance profiles in the agent profile registry.

10. The system of claim 8, further comprising profile sharing functionality that enables copying and sharing of capability permissions and resource access rights between different AI agent instances from the plurality of AI agent instances through the agent profile registry.

11. The system of claim 10, wherein the capability permissions define specific operational scope for the instantiated AI agent instance including data manipulation functions, communication functions, and system integration functions, and wherein the resource access rights specify which data sources the instantiated AI agent instance may access based on organizational role assignments and security policies.

12. The system of claim 8, further comprising a modular access control architecture that implements read-write permissions for organizational knowledge resources based on departmental hierarchy, exclusive read-write permissions for user-specific knowledge resources limited to associated user accounts, and configurable cross-module access rules enabling controlled sharing of personal data with organizational modules subject to user authorization through the agent profile registry.

13. The system of claim 1, wherein the one or more processors implement access control mechanisms that restrict operations to verified capabilities and authorized knowledge resources through permission validation protocols.

14. The system of claim 1, wherein capability management operates through dynamic assessment without requiring persistent AI agent instance identity storage across sessions.

15. The system of claim 14, wherein the dynamic assessment comprises real-time evaluation of AI agent instance skills against task requirements, automatic provisioning of required capabilities from the skill registry, and continuous validation of AI agent instance permissions during task execution.

16. The system of claim 1, wherein the instantiated AI agent instance autonomously determines relevant information sources from the accessible knowledge resources based on analysis of task requirements.

17. The system of claim 1, further comprising a unified interface that enables the instantiated AI agent instance to coordinate capability usage with resource access without requiring user specification of data sources or management of inter-system relationships.

18. The system of claim 1, wherein the skill registry and the knowledge resource registry implement autonomous synchronization mechanisms for maintaining current availability information.

19. The system of claim 1, further comprising a user interface, wherein the user interface implements natural language processing to translate user goal descriptions into skill selections and presents capability options in terms of user outcomes through automated skill mapping that operates without exposing technical implementation details to users.

20. The system of claim 19, wherein the system implements automated workflow analysis to identify capability enhancement opportunities and presents suggestions for workflow improvement through expanded functionality access.

21. The system of claim 1, further comprising AI agent instance state serialization and deserialization capabilities supporting AI agent instance migration between computing environments while preserving capability access permissions and resource authorizations.

22. The system of claim 1, wherein the selected skills dynamically incorporated as operational capabilities of the instantiated AI agent instance comprise at least one coordination skill that enables the instantiated AI agent instance to orchestrate task performance by delegating sub-tasks to one or more additional AI agent instances through a task delegation module, such that the instantiated AI agent instance executes the requested task by coordinating actions of and synthesizing outputs from the one or more additional AI agent instances through the dynamically incorporated coordination skill.

23. A computer-implemented method for modular artificial intelligence (AI) agent instance operation using skills and knowledge resources, comprising:

maintaining a skill registry as an independent data store containing available skills, each skill comprising a distinct executable capability with defined parameters and operational scope accessible to AI agent instances within an organization;

maintaining a knowledge resource registry as a separate independent data store from the skill registry containing knowledge resources accessible to AI agent instances based on associated access credentials, wherein each knowledge resource comprises a distinct information repository with defined access parameters specifying data retrieval permissions, content boundaries, and information scope;

receiving user input requesting performance of a task;

instantiating an AI agent instance from a plurality of AI agent instances operating within the organization;

causing the instantiated AI agent instance to identify from the skill registry available skills relevant to the requested task;

causing the instantiated AI agent instance to identify from the knowledge resource registry accessible knowledge resources based on access credentials validated by a credential management system and associated with the instantiated AI agent instance;

causing the instantiated AI agent instance to select from the identified available skills those skills needed for the requested task, and to dynamically incorporate the selected skills as operational capabilities of the instantiated AI agent instance based on the requested task; and causing the instantiated AI agent instance to execute operations using the selected skills as dynamically incorporated operational capabilities of the instantiated AI agent instance and the accessible knowledge resources to generate a response to the user input-, wherein the selected skills are executed within isolated execution environments separate from core logic of the instantiated AI agent instance.

* * * * *